Dec. 8, 1970 R. A. RAGEN 3,546,676

CALCULATOR

Filed Oct. 29, 1963 226 Sheets-Sheet 1

ROBERT A. RAGEN

INVENTOR

BY Rankin A. Milliken

ATTORNEY

Dec. 8, 1970 R. A. RAGEN 3,546,676

CALCULATOR

Filed Oct. 29, 1963

* VALUE OF SPEED UP CAPACITOR Cs IN PICOFARADS

† INDICATES ABSENCE OF 330 OHM RESISTORS I.E. SUBSTANTIALLY ZERO IMPEDANCE FROM EACH B TERMINAL TO ITS CORRESPONDING BASE.

* VALUE OF GATE CAPACITOR Cg IN pf.
** VALUE OF GATE RESISTOR Rg IN KILOHMS

Dec. 8, 1970 R. A. RAGEN 3,546,676

CALCULATOR

Filed Oct. 29, 1963

226 Sheets-Sheet 6

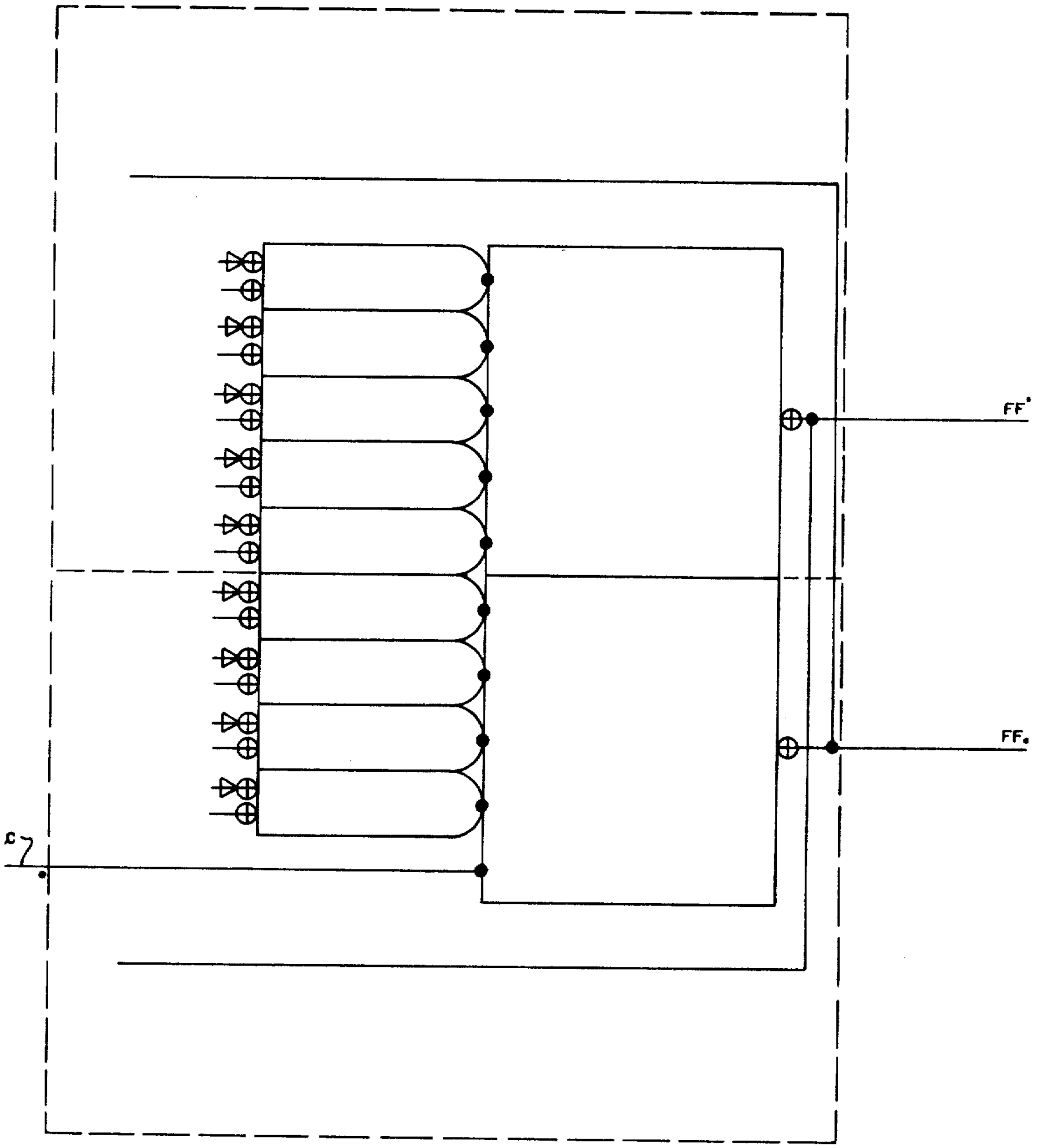
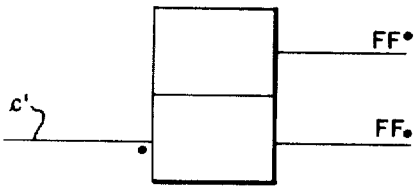
B. INPUT
FIG. 13
FIG. 14

Dec. 8, 1970 R. A. RAGEN 3,546,676

CALCULATOR

Filed Oct. 29, 1963

226 Sheets-Sheet 8

* DOTS MAY BE OMITTED WHERE AMBIGUITY WILL NOT RESULT.

Dec. 8, 1970 R. A. RAGEN 3,546,676
CALCULATOR
Filed Oct. 29, 1963 226 Sheets-Sheet 10
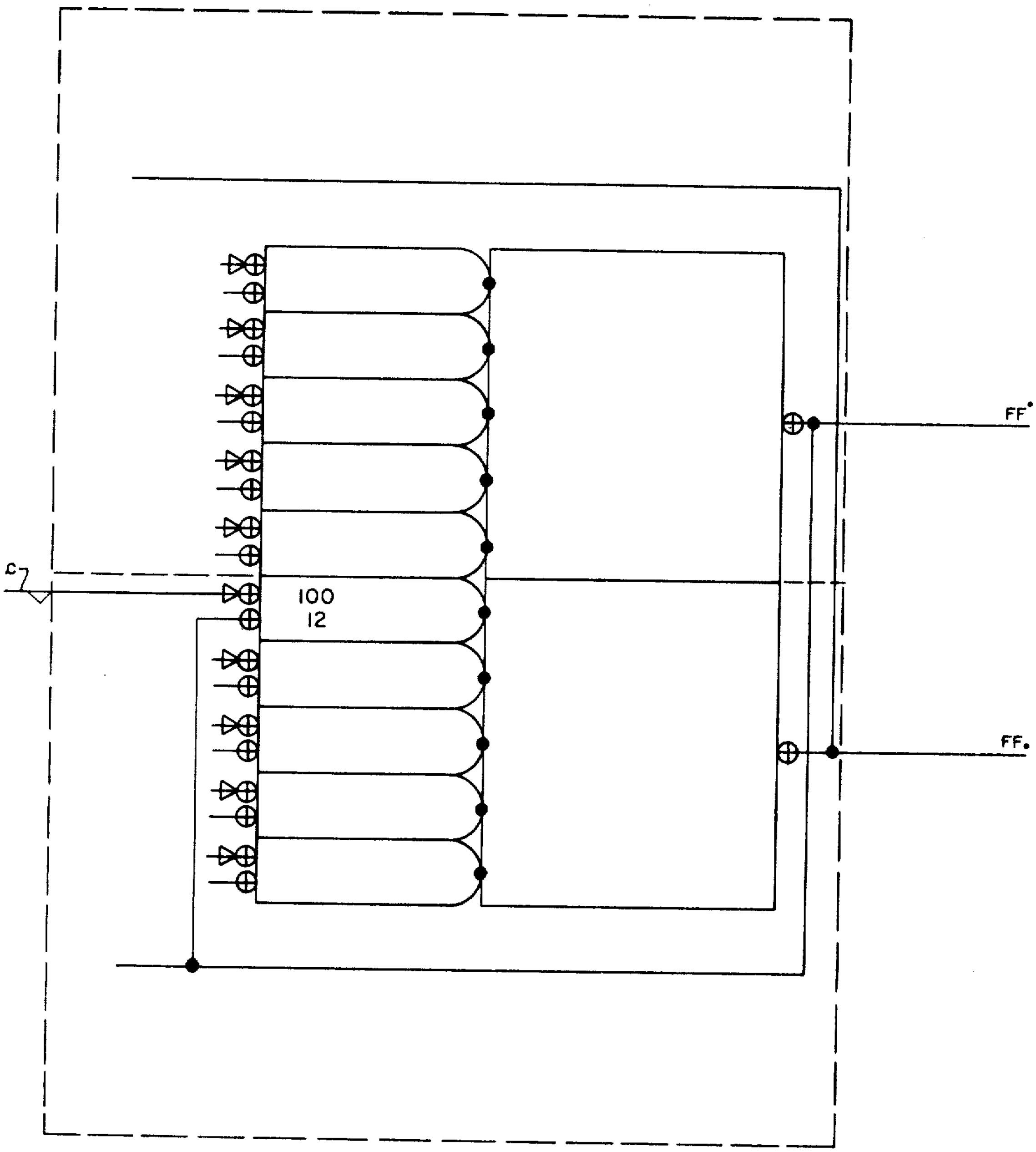
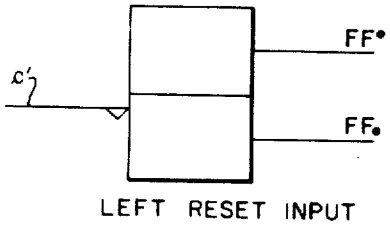
FIG. 20
FIG. 19

Dec. 8, 1970 R. A. RAGEN 3,546,676

CALCULATOR

Filed Oct. 29, 1963 226 Sheets-Sheet 11

Dec. 8, 1970 R. A. RAGEN 3,546,676
CALCULATOR
Filed Oct. 29, 1963 226 Sheets-Sheet 14
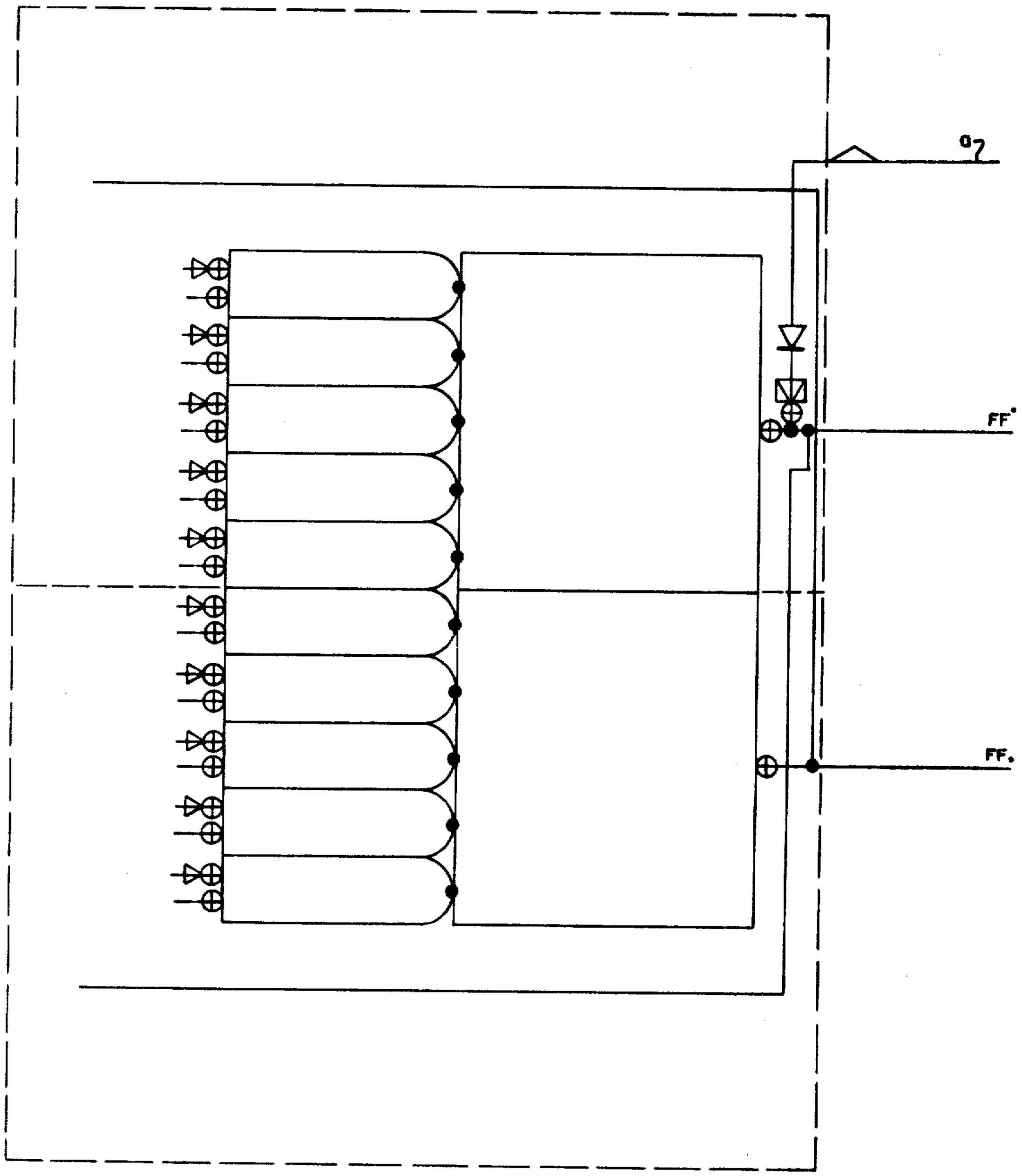
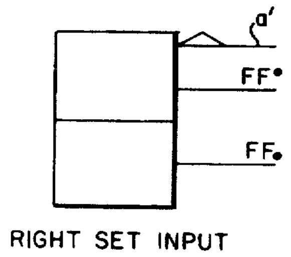
FIG. 28
FIG. 27

Dec. 8, 1970 R. A. RAGEN 3,546,676

CALCULATOR

Filed Oct. 29, 1963 226 Sheets-Sheet 16

Dec. 8, 1970 R. A. RAGEN 3,546,676

CALCULATOR

Filed Oct. 29, 1963 226 Sheets-Sheet 18

Dec. 8, 1970 R. A. RAGEN 3,546,676

CALCULATOR

Filed Oct. 29, 1963 226 Sheets-Sheet 19

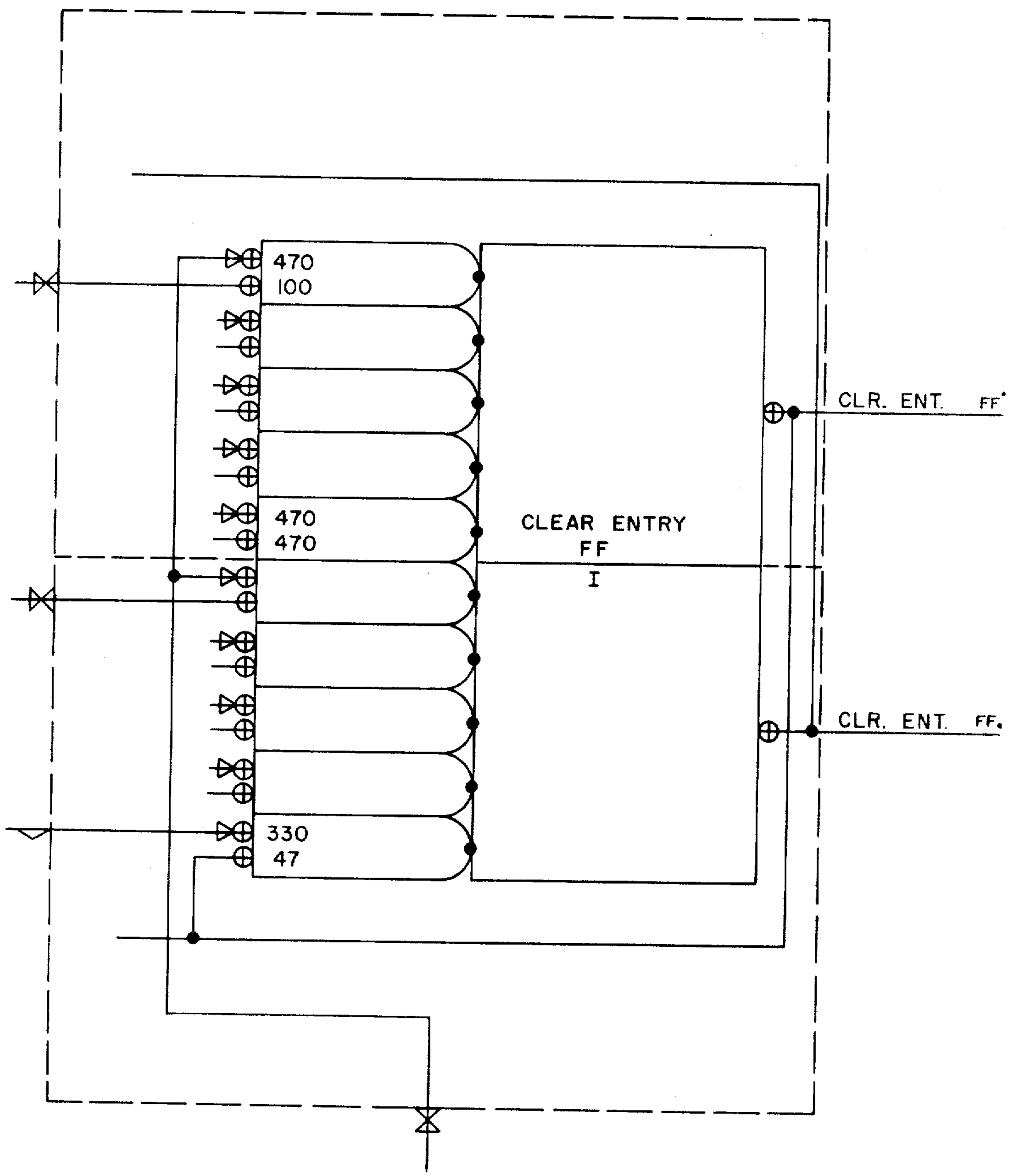
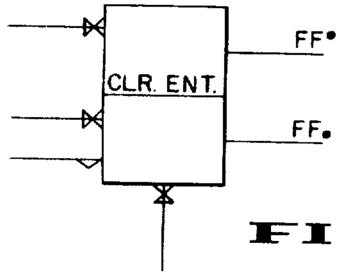
FIG. 39
FIG. 40

Dec. 8, 1970 R. A. RAGEN 3,546,676

CALCULATOR

Filed Oct. 29, 1963 226 Sheets-Sheet 22

Dec. 8, 1970 R. A. RAGEN 3,546,676

CALCULATOR

Filed Oct. 29, 1963 226 Sheets-Sheet 27

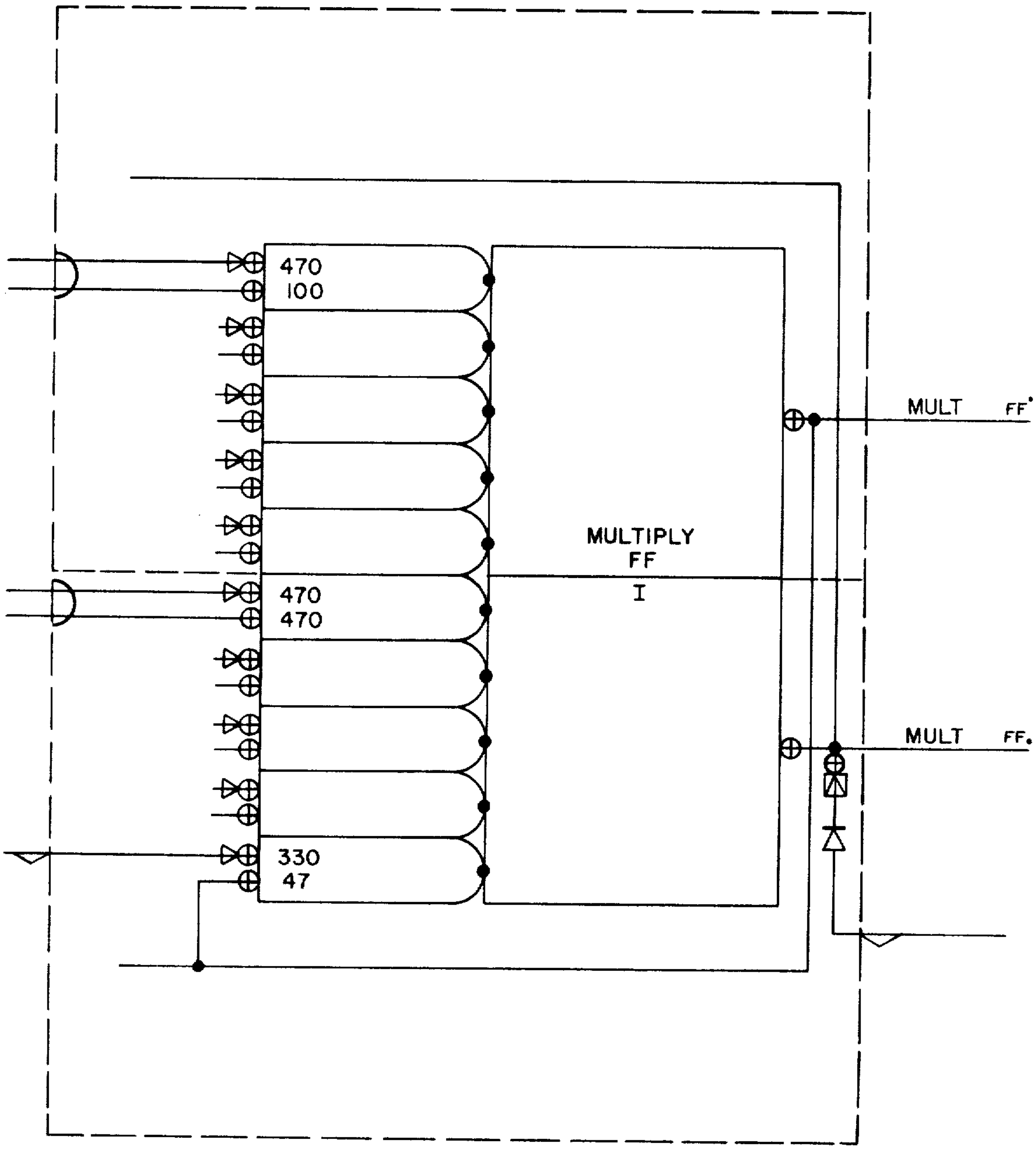
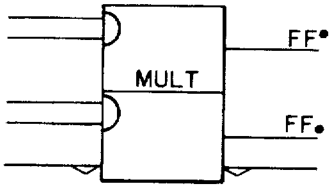
FIG_73
FIG_74

Dec. 8, 1970 R. A. RAGEN 3,546,676

CALCULATOR

Filed Oct. 29, 1963 226 Sheets-Sheet 48

Dec. 8, 1970 R. A. RAGEN 3,546,676

CALCULATOR

Filed Oct. 29, 1963 226 Sheets-Sheet 55

Dec. 8, 1970 R. A. RAGEN 3,546,676

CALCULATOR

Filed Oct. 29, 1963 226 Sheets-Sheet 65

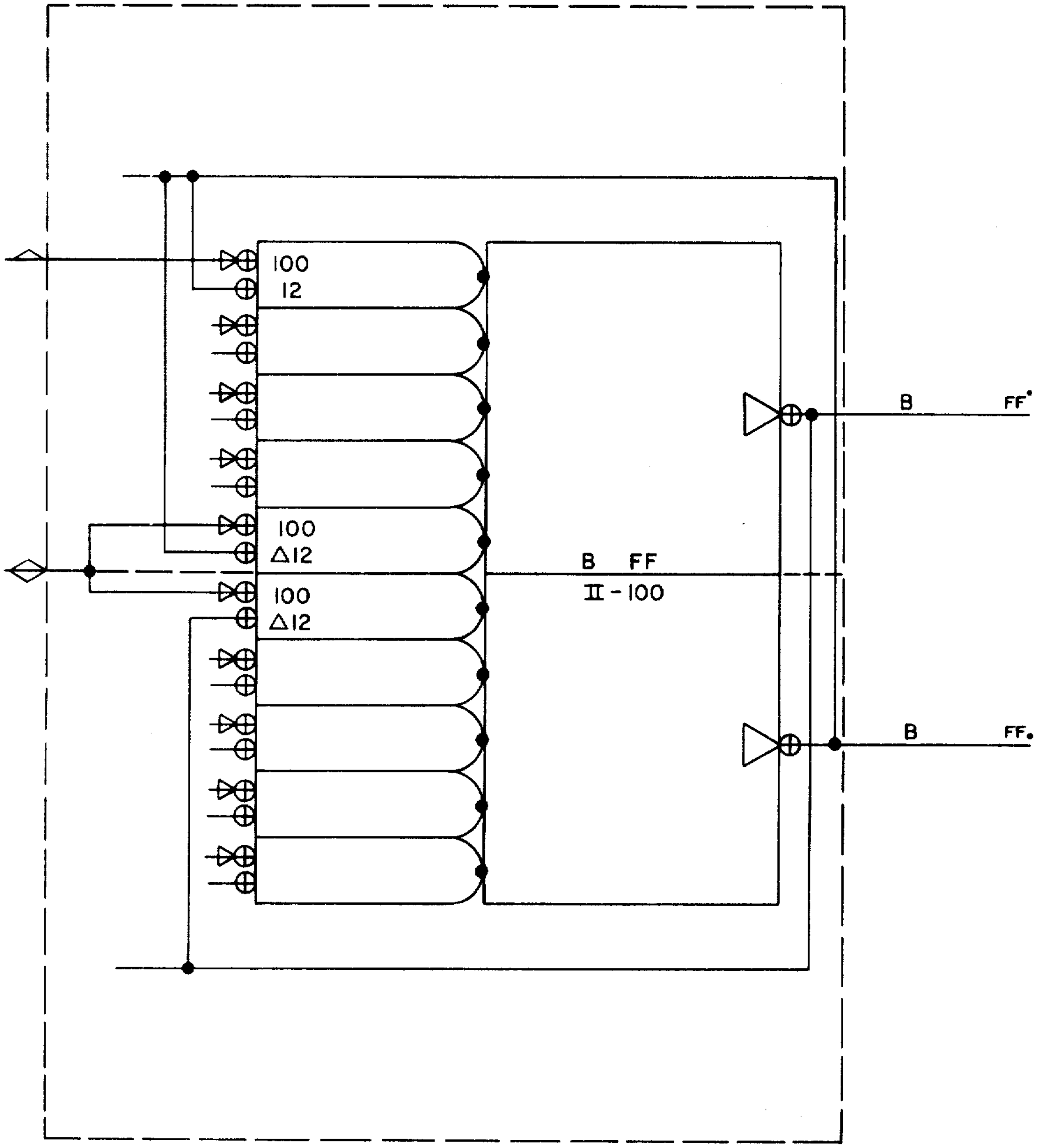
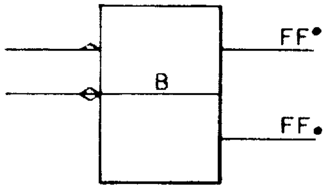
FIG_131
FIG_132

Dec. 8, 1970 R. A. RAGEN 3,546,676

CALCULATOR

Filed Oct. 29, 1963 226 Sheets-Sheet 69

Dec. 8, 1970 R. A. RAGEN 3,546,676

CALCULATOR

Filed Oct. 29, 1963 226 Sheets-Sheet 70

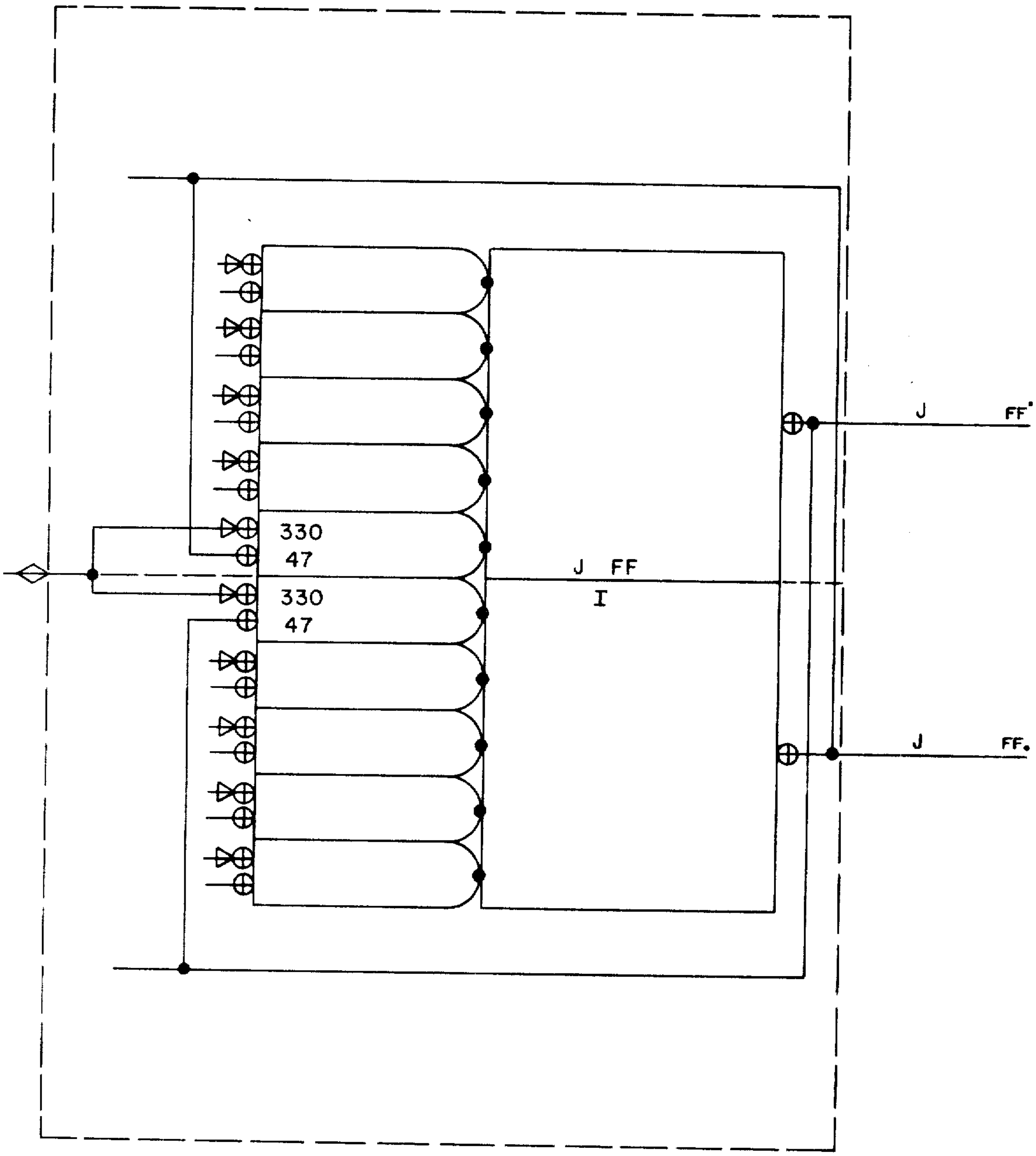
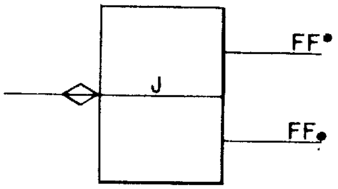
FIG. 145
FIG. 146

**N ABOVE LEAD = NO DIODE THEREIN.

* N= NO CAPACITOR, RESISTOR.

† BRACKETS AROUND R-B AND R-C INDICATE COLLECTOR CIRCUIT COMMON WITH OTHER GATE(S). XX="OTHER" GATE NO(S).

Dec. 8, 1970 R. A. RAGEN 3,546,676

CALCULATOR

Filed Oct. 29, 1963 226 Sheets-Sheet 87

EXAMPLE OF NOTATION:
P(2+9)P = "THE DECIMAL POINT IS IN THE SECOND OR NINTH PLACE."

FOR REMAINDER OF DECIMAL POSITION SWITCH SEE FIG. 205
a≡DPI a; b≡DPI b; etc.

Dec. 8, 1970 R. A. RAGEN 3,546,676

CALCULATOR

Filed Oct. 29, 1963 226 Sheets-Sheet 91

Dec. 8, 1970 R. A. RAGEN 3,546,676

CALCULATOR

Filed Oct. 29, 1963 226 Sheets-Sheet 96

Dec. 8, 1970 R. A. RAGEN 3,546,676

CALCULATOR

Filed Oct. 29, 1963 226 Sheets-Sheet 109

Dec. 8, 1970 R. A. RAGEN 3,546,676

CALCULATOR

Filed Oct. 29, 1963 226 Sheets-Sheet 118

Dec. 8, 1970 R. A. RAGEN 3,546,676

CALCULATOR

Filed Oct. 29, 1963 226 Sheets-Sheet 124

Dec. 8, 1970 R. A. RAGEN 3,546,676

CALCULATOR

Filed Oct. 29, 1963 226 Sheets-Sheet 126

Dec. 8, 1970 R. A. RAGEN 3,546,676

CALCULATOR

Filed Oct. 29, 1963 226 Sheets-Sheet 129

Dec. 8, 1970 R. A. RAGEN 3,546,676

CALCULATOR

Filed Oct. 29, 1963 226 Sheets-Sheet 132

Dec. 8, 1970 R. A. RAGEN 3,546,676

CALCULATOR

Filed Oct. 29, 1963 226 Sheets-Sheet 134

Dec. 8, 1970 R. A. RAGEN 3,546,676

CALCULATOR

Filed Oct. 29, 1963 226 Sheets-Sheet 135

Dec. 8, 1970 R. A. RAGEN 3,546,676

CALCULATOR

Filed Oct. 29, 1963 226 Sheets-Sheet 140

Dec. 8, 1970 R. A. RAGEN 3,546,676

CALCULATOR

Filed Oct. 29, 1963 226 Sheets-Sheet 145

Dec. 8, 1970 R. A. RAGEN 3,546,676

CALCULATOR

Filed Oct. 29, 1963 226 Sheets-Sheet 147

Dec. 8, 1970 R. A. RAGEN 3,546,676

CALCULATOR

Filed Oct. 29, 1963 226 Sheets-Sheet 154

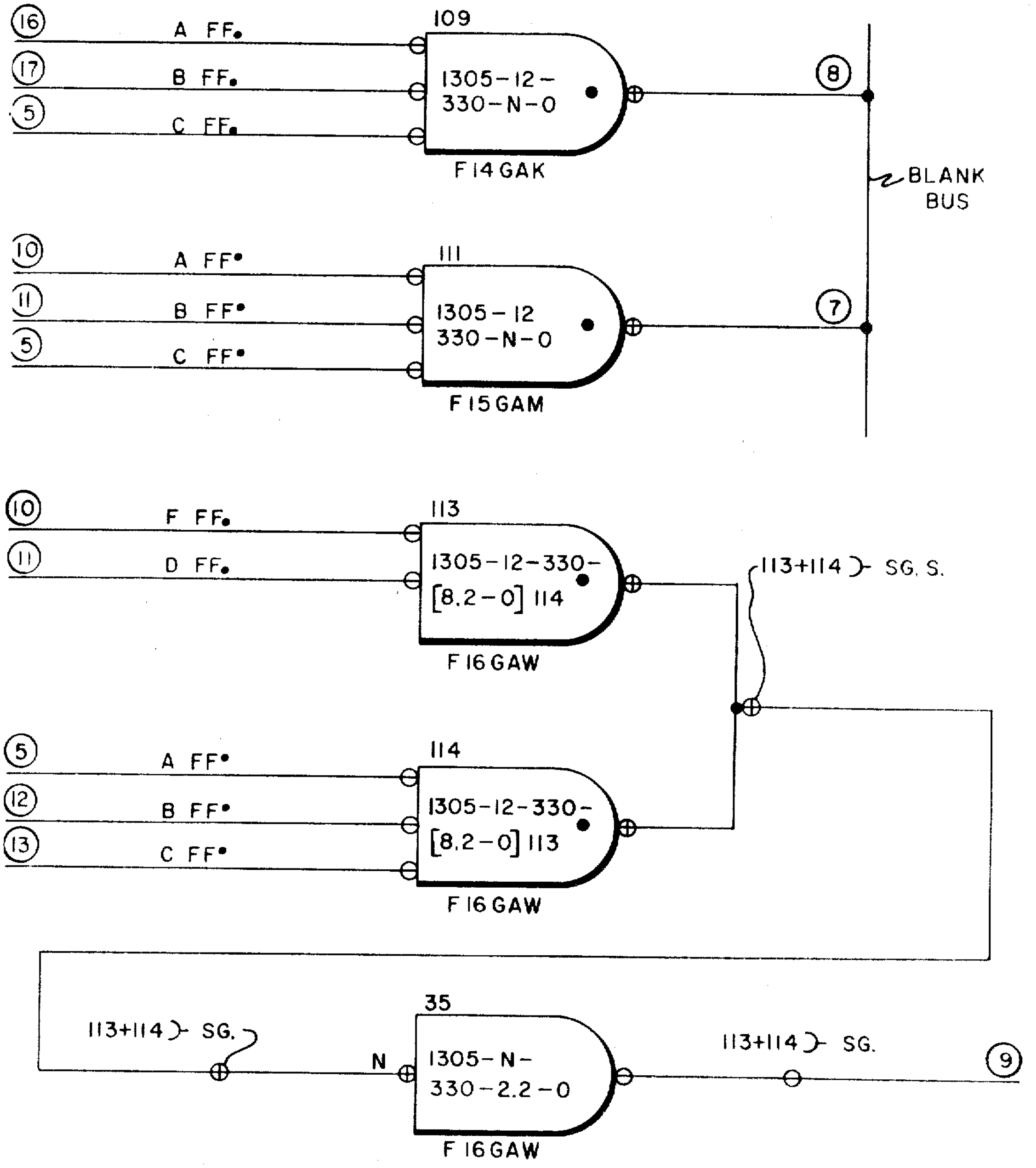
FIG. 2A7

Dec. 8, 1970 R. A. RAGEN 3,546,676

CALCULATOR

Filed Oct. 29, 1963 226 Sheets-Sheet 170

Dec. 8, 1970 R. A. RAGEN 3,546,676

CALCULATOR

Filed Oct. 29, 1963 226 Sheets-Sheet 173

AFTER ALL STAGES OF D CNTR. RESET:

| | KEY DEPRESSED | | | | | | | | | |
|---|---|---|---|---|---|---|---|---|---|---|
| | 0 | 1 | 2 | 3 | 4 | 5 | 6 | 7 | 8 | 9 |
| FF D5 | 0 | 0 | 0 | 0 | 0 | 1 | 1 | 1 | 1 | 1 |
| FF D4 | 0 | 0 | 0 | 0 | 1 | 1 | 1 | 1 | 1 | 0 |
| FF D3 | 0 | 0 | 0 | 1 | 1 | 1 | 1 | 1 | 0 | 0 |
| FF D2 | 0 | 0 | 1 | 1 | 1 | 1 | 1 | 0 | 0 | 0 |
| FF D1 | 0 | 1 | 1 | 1 | 1 | 1 | 0 | 0 | 0 | 0 |

FIG_295

DIGITS COUNTED ONTO DELAY LINE FROM C COUNTER

| "2" | FLIP FLOP | | | | |
|---|---|---|---|---|---|
| REC.PULSE# | C1 | C2 | C3 | C4 | C5 |
| 0 | 1 | 1 | 0 | 0 | 0 |
| 1 | 1 | 0 | 0 | 0 | 0 |
| 2 | 0 | 0 | 0 | 0 | 0 |

| "8" | FLIP FLOP | | | | |
|---|---|---|---|---|---|
| REC.PULSE# | C1 | C2 | C3 | C4 | C5 |
| 0 | 0 | 0 | 0 | 1 | 1 |
| 1 | 0 | 0 | 1 | 1 | 1 |
| 2 | 0 | 1 | 1 | 1 | 1 |
| 3 | 1 | 1 | 1 | 1 | 1 |
| 4 | 1 | 1 | 1 | 1 | 0 |
| 5 | 1 | 1 | 1 | 0 | 0 |
| 6 | 1 | 1 | 0 | 0 | 0 |
| 7 | 1 | 0 | 0 | 0 | 0 |
| 8 | 0 | 0 | 0 | 0 | 0 |

FIG_296

FIG_297 (1:1)

Dec. 8, 1970 R. A. RAGEN 3,546,676

CALCULATOR

Filed Oct. 29, 1963 226 Sheets-Sheet 182

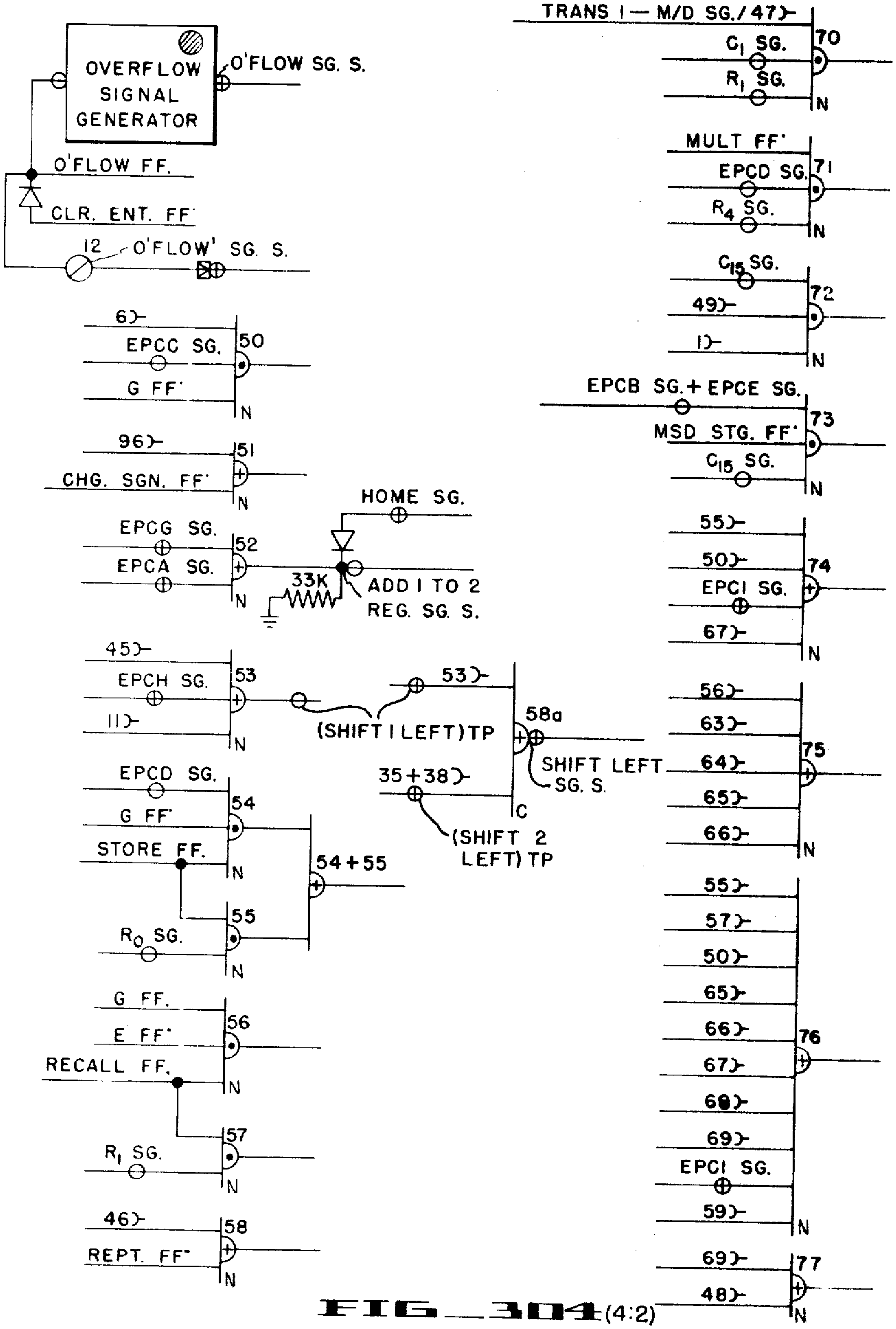
FIG. 304 (4:2)

Dec. 8, 1970 R. A. RAGEN 3,546,676
CALCULATOR
Filed Oct. 29, 1963 226 Sheets-Sheet 184
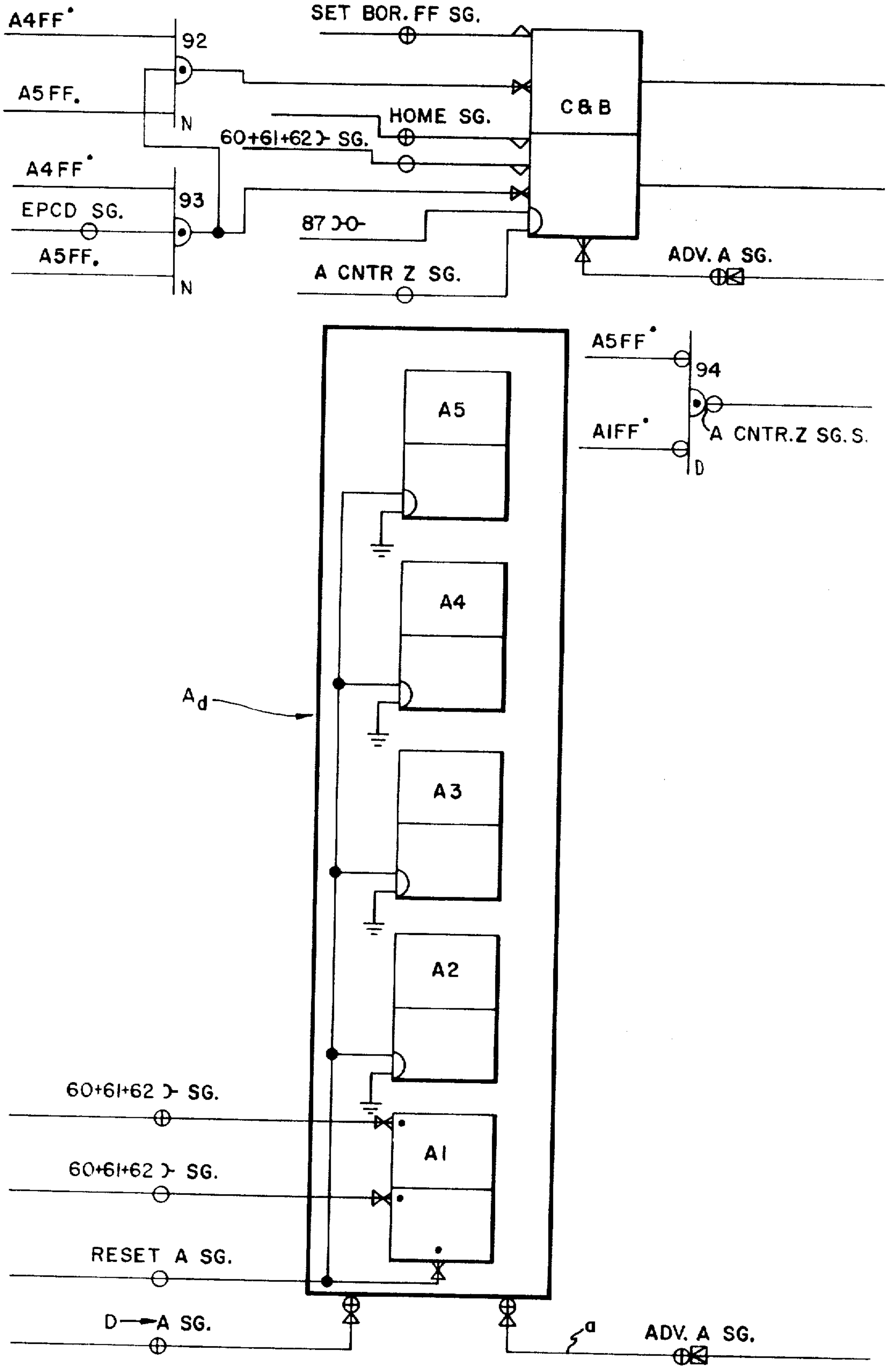
FIG_305 (5:1)

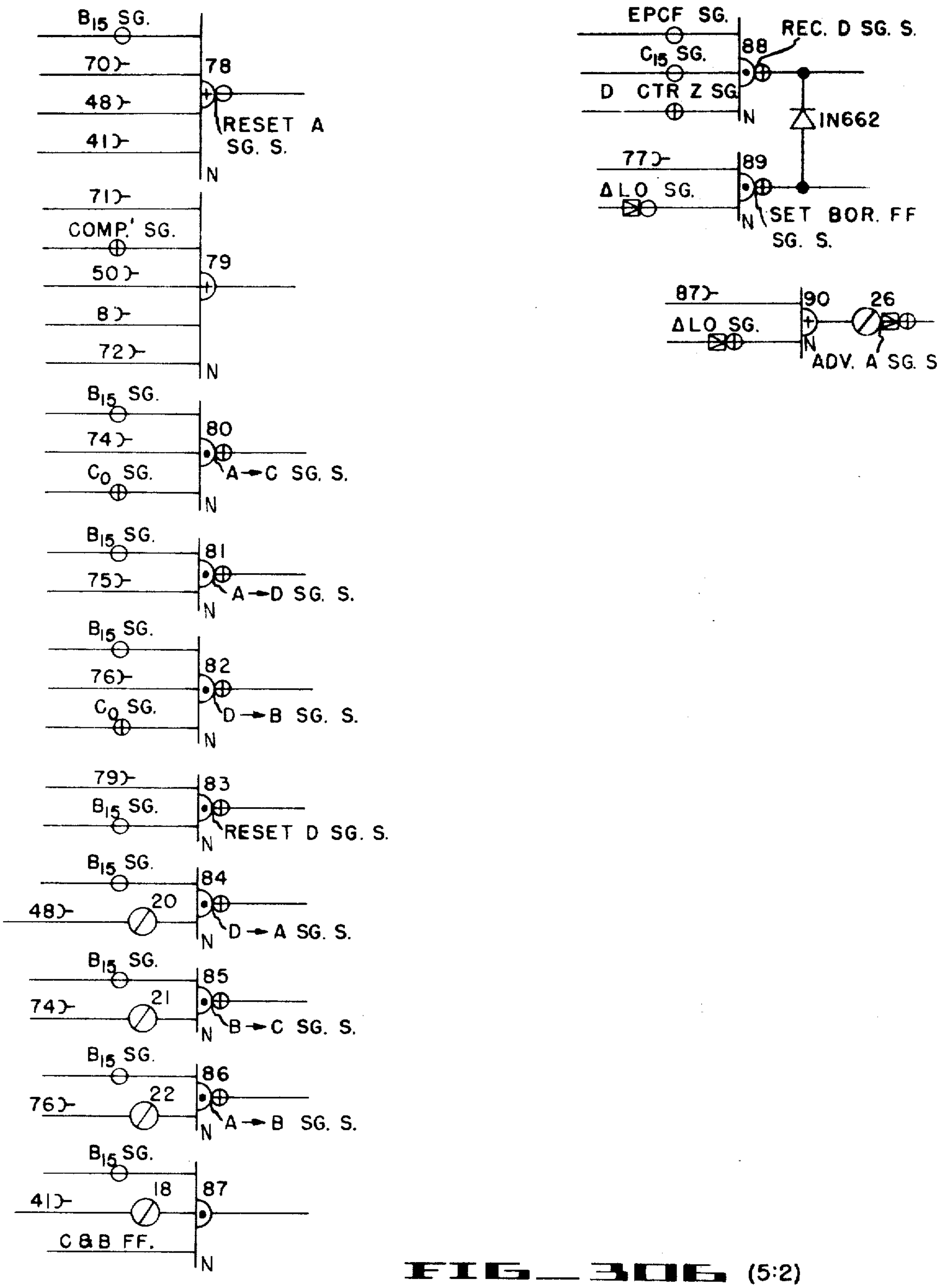
FIG. 306 (5:2)

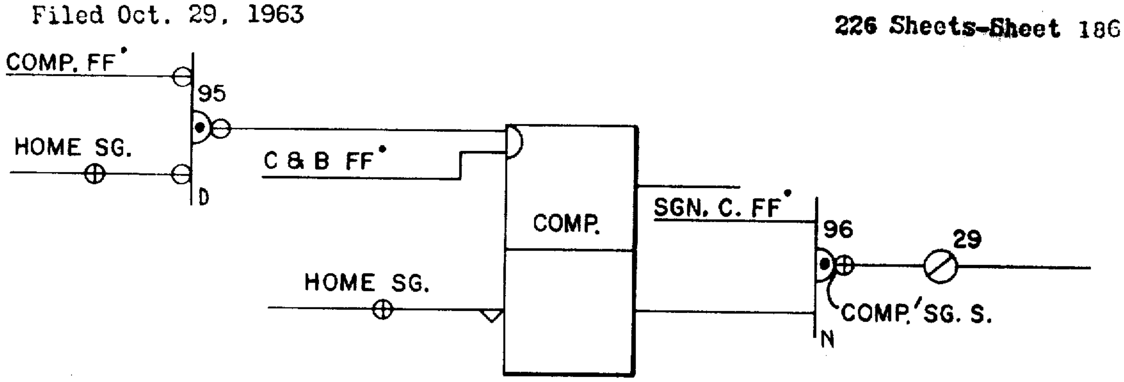
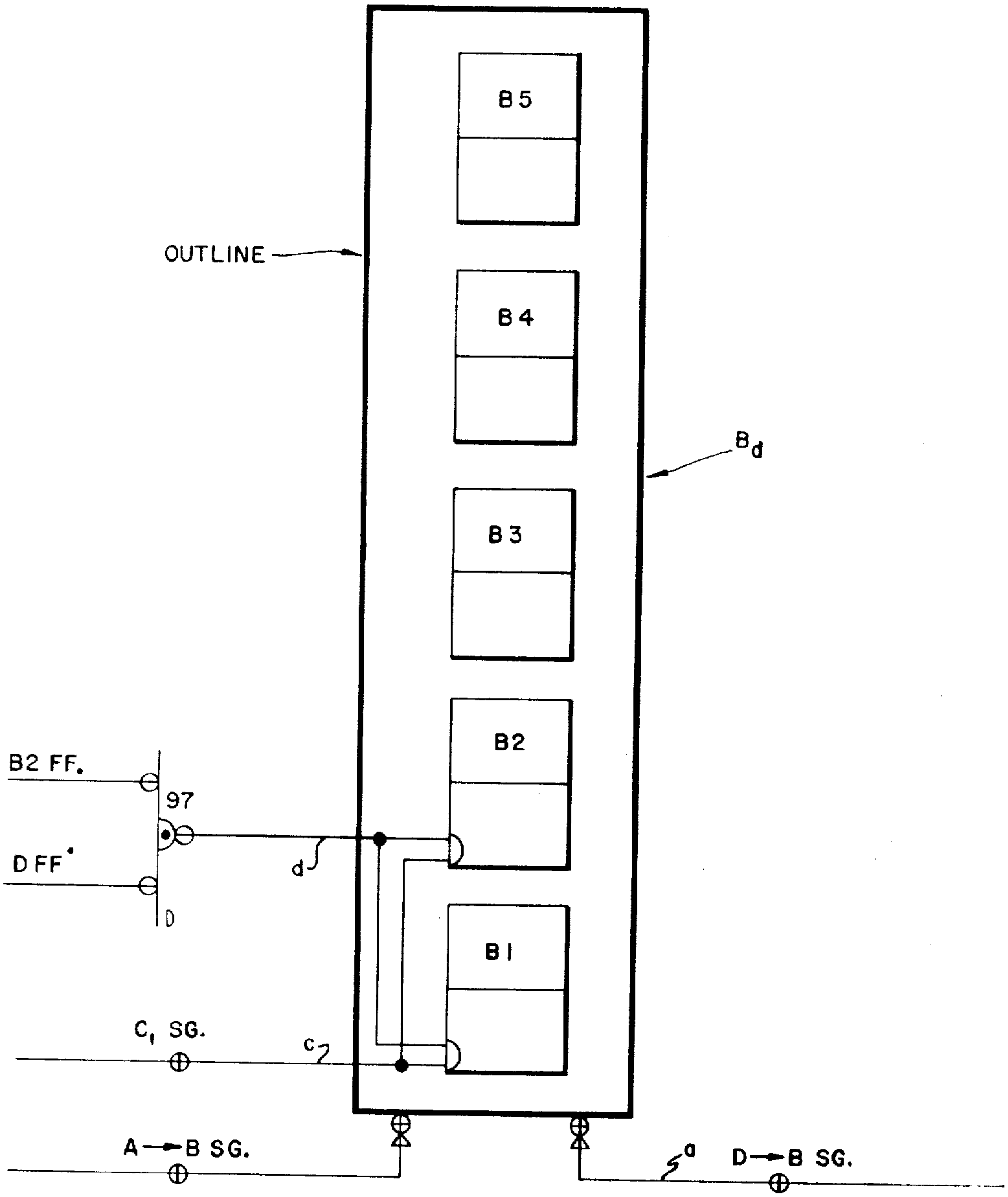
FIG. 307 (6:1)

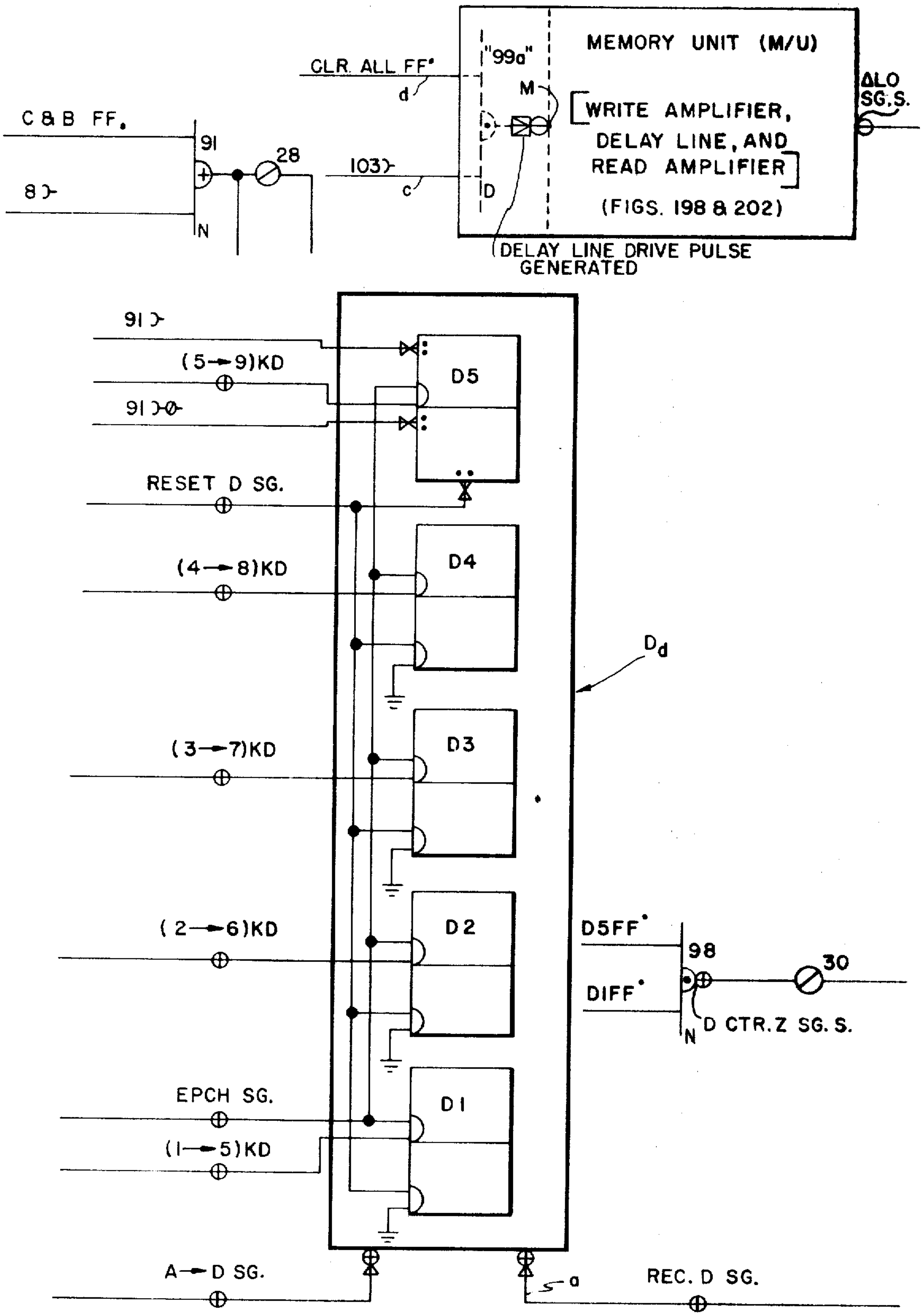
FIG. 308 (6:2)

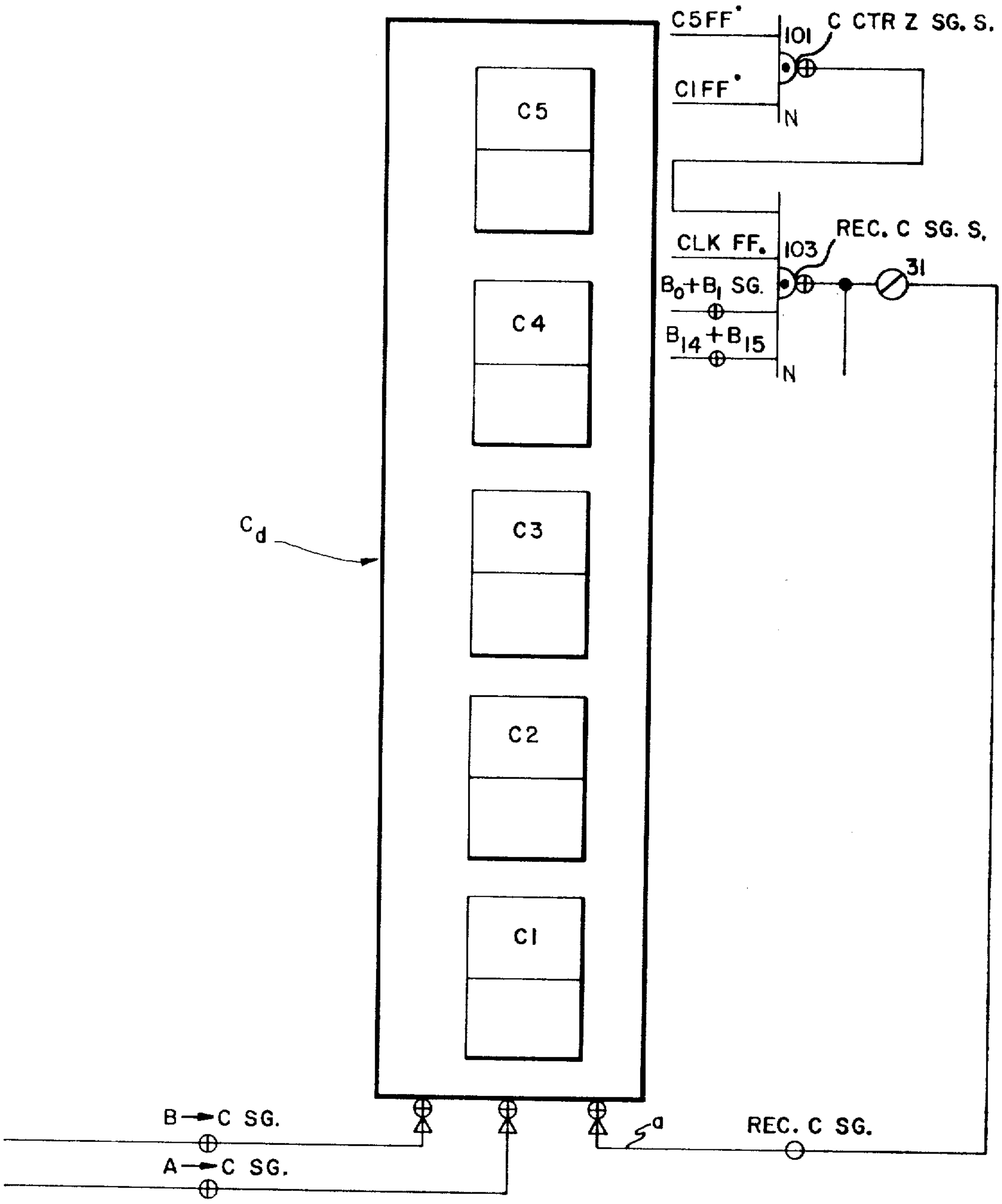
FIG. 309 (7:1)

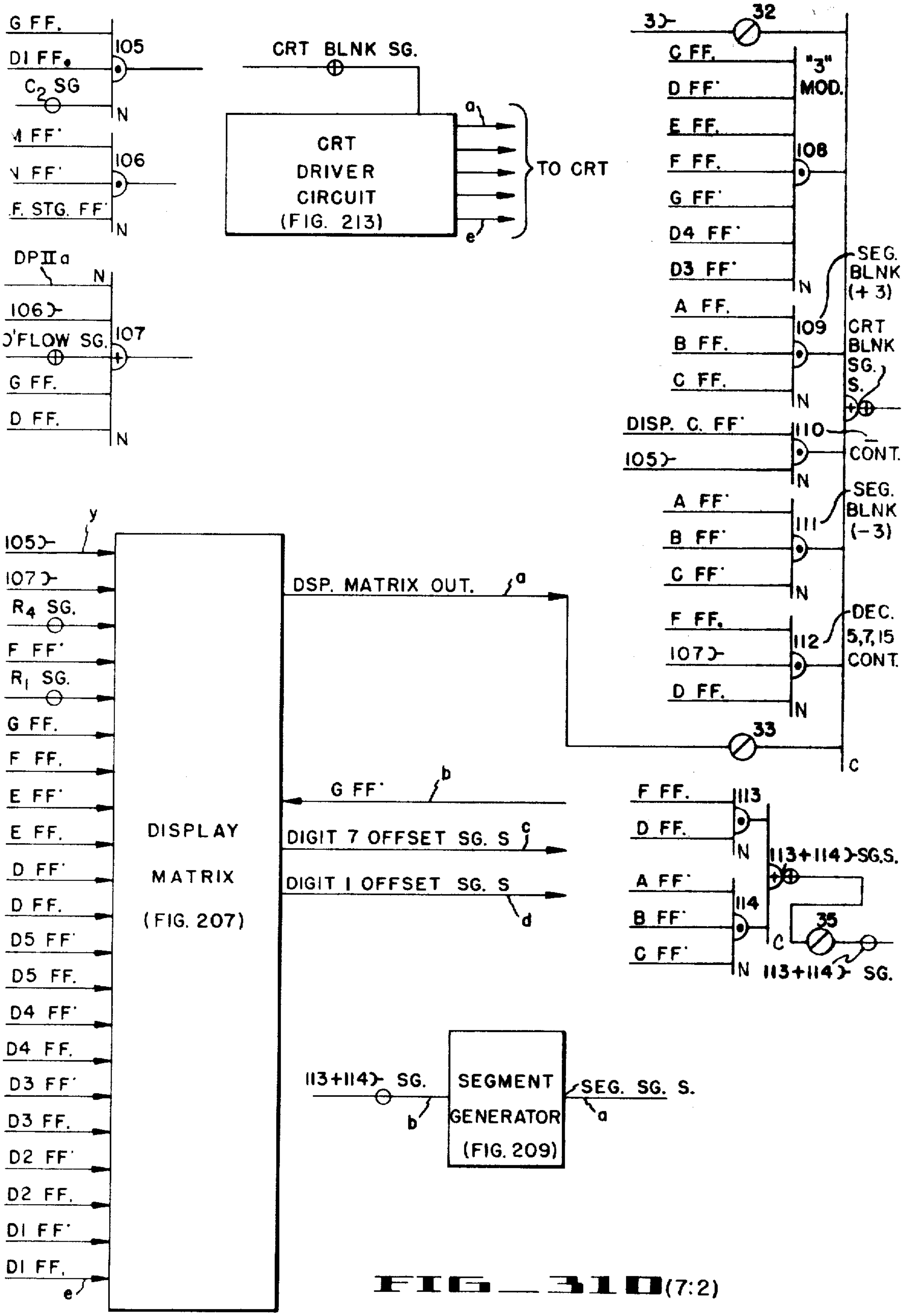
FIG. 310 (7:2)

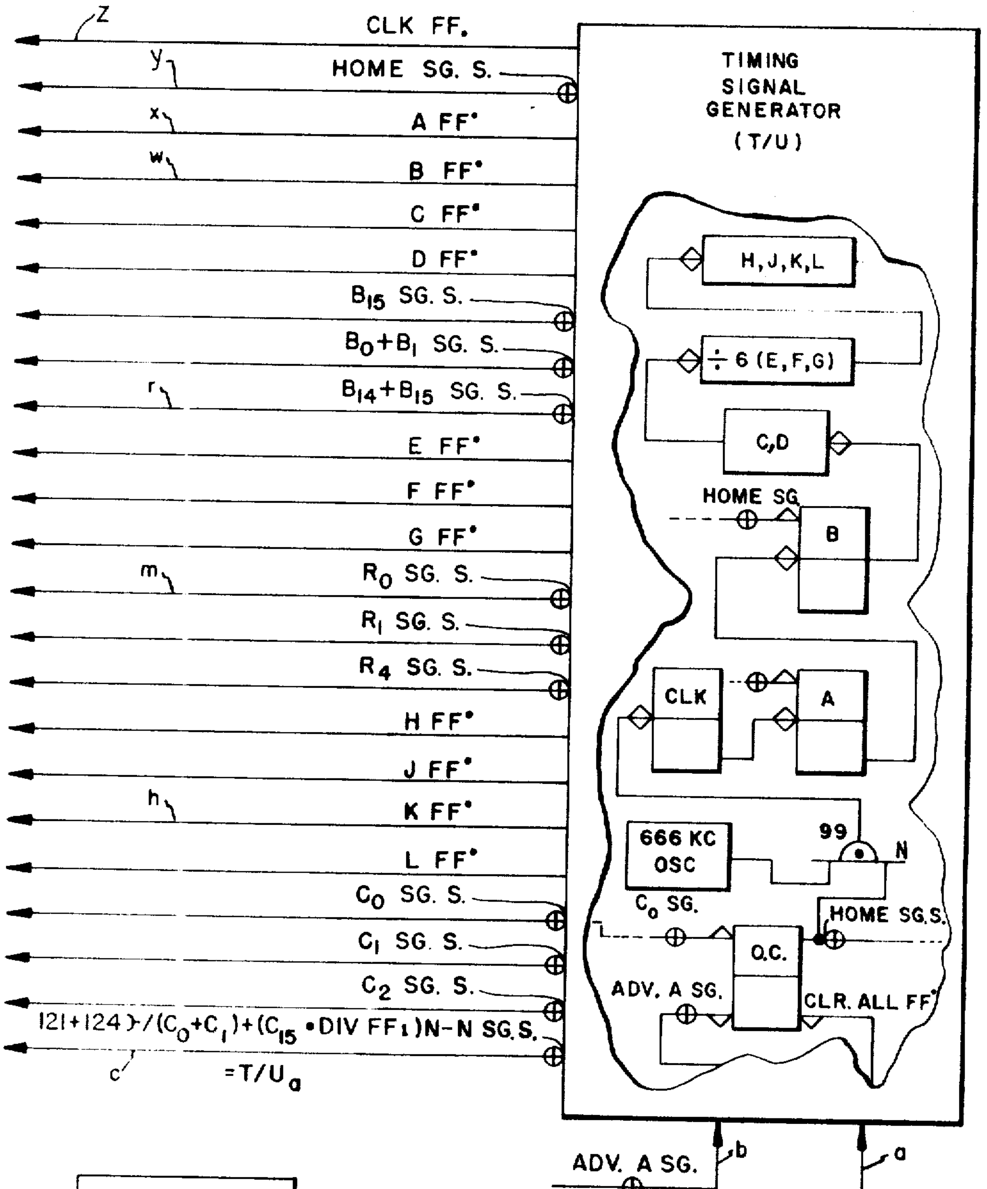
FIG. 311 (8:1)
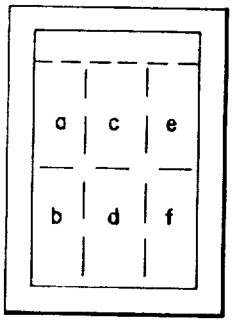
FIG. 312

FIG. 313 (8:2)

CARD (TYPICAL)

MOTHER BOARD (TYPICAL)

Dec. 8, 1970 R. A. RAGEN 3,546,676

CALCULATOR

Filed Oct. 29, 1963 226 Sheets-Sheet 193

Dec. 8, 1970 R. A. RAGEN 3,546,676

CALCULATOR

Filed Oct. 29, 1963 226 Sheets-Sheet 196

"1" Negative at aNd inputs

"1" pOsitive at Or inputs

D = Diode gate only.
N = Diode gate with inverter.
X = Extraordinary, i.e, not conforming to the above.
C = Common or shared collectors.

BINARY TABLE
| SEG. NUM. | COUNTER D | E | F | G |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 14 | 0 | 1 | 1 | 1 |
| 15 | 1 | 1 | 1 | 1 |
FIG. 338
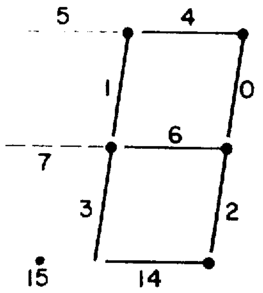
SEGMENT SEQUENCE
FIG. 339
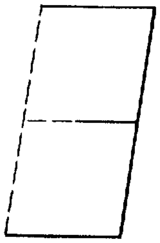
"3" MODIFICATION
FIG. 340
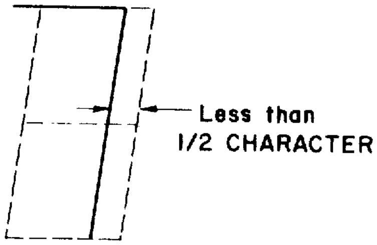
"7" OFFSET
FIG. 341
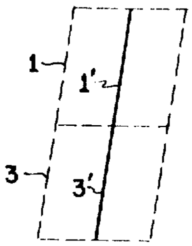
"1" OFFSET
FIG. 342

CELL NUMBERS

| LOCATION | NAME OF CELL | CONTENTS OF CELL |
|---|---|---|
| ON DISPLAY | C/R | (C/R) |
| ON LINE | C//R | (C//R) |

WHERE: C = COLUMN, AND R = REGISTER, OR ROW.

EXAMPLES:

7/3 = "THE CELL IN COLUMN SEVEN AND ROW THREE OF THE DISPLAY"

(11//4) = "THE CONTENTS OF THE CELL IN COLUMN ELEVEN AND REGISTER FOUR ON THE LINE"

---

$(X/\!/Y)^Z$ = "THE CONTENTS OF X//Y BEFORE SUBOPERATION Z"

$(X/\!/Y)_Z$ = "THE CONTENTS OF X//Y AFTER SUBOPERATION Z"

---

(X//Y"M") = "THE CONTENTS OF X//Y IS M. WHERE M IS 0, 1, 2, 3, 4, 5, 6, 7, 8, OR 9.

---

EXAMPLE:

$(6/\!/4\text{"}3\text{"})^{SL2}$ = "THE CONTENTS OF THE CELL IN COLUMN SIX AND REGISTER FOUR ON THE DELAY LINE IS THREE TALLY PULSES IN THE LOOP CYCLE BEFORE THE SHIFT DISPLAYED REGISTER TWO LEFT SUBOPERATION."

FIG. 347

Dec. 8, 1970 R. A. RAGEN 3,546,676

CALCULATOR

Filed Oct. 29, 1963 226 Sheets-Sheet 213

Dec. 8, 1970 R. A. RAGEN 3,546,676

CALCULATOR

Filed Oct. 29, 1963 226 Sheets-Sheet 220

Dec. 8, 1970 R. A. RAGEN 3,546,676

CALCULATOR

Filed Oct. 29, 1963 226 Sheets-Sheet 221

Dec. 8, 1970 R. A. RAGEN 3,546,676

CALCULATOR

Filed Oct. 29, 1963 226 Sheets-Sheet 222

MULTIPLY FLOW CHART

DECIMAL POINT COUNTER SHOULD COUNT 13 + (13 - DEC. POSITIONS).
( ) INDICATES ENTRY PHASE COUNTER POSITION.

Dec. 8, 1970 R. A. RAGEN 3,546,676

CALCULATOR

Filed Oct. 29, 1963 226 Sheets-Sheet 223

DECIMAL POINT COUNTER SHOULD COUNT 14 + DEC. POSITIONS.

( ) INDICATES ENTRY PHASE COUNTER POSITION.

United States Patent Office 3,546,676
Patented Dec. 8, 1970

3,546,676
CALCULATOR
Robert A. Ragen, Hayward, Calif., assignor to The Singer Company, a corporation of New Jersey
Filed Oct. 29, 1963, Ser. No. 319,704
Int. Cl. G06f *3/00, 15/02*
U.S. Cl. 340—172.5 10 Claims

ABSTRACT OF THE DISCLOSURE

A calculator having a processor comprising an arithmetic unit and a control unit, a last-in-first-out storage, a keyboard unit for entering data words into the storage and instructions, designating computing steps to be performed by the arithmetic unit, into the control unit, and a visual display for indicating the contents of the LIFO storage. The processor includes control circuitry for entering data words resulting from computing steps performed in accordance with instructions into the entry register of the storage. The processor also includes shifting circuitry for shifting the contents of each of the registers in the LIFO storage to the next adjacent register in a direction away from the entry register in response to the actuation of a digit key representing the first digit of a number.

TABLE OF CONTENTS Col.

1. ABSTRACT OF THE DISCLOSURE — 1
2. TABLE OF CONTENTS — 1
3. STATEMENT OF RELATED CASES — 2
4. FIELD OF ART — 2
5. PRIOR ART — 2
6. PROBLEMS SOLVED BY THE INVENTION — 3
7. OBJECTS OF THE INVENTION — 4
8. BRIEF DESCRIPTION OF THE FIGURES — 4
9. SYNOPSIS — 7
10. CONVENTIONS — 8
10.1. Signal Symbols — 8
10.2. Legends — 10
10.2.1. Point Designations — 11
10.2.2. Named Signal Designations — 12
10.2.3. Assertions — 13
10.3. Block Lead Designations — 15
11. EXPLANATION OF BLOCK SYMBOLS — 16
11.1. Flip-flops — 16
11.1.1. Flip-flop Definition Sheets — 21
11.1.2. Composite Flip-flop Input Definition Sheets — 22
11.1.3. B. Input — 22
11.1.4. B. Input — 23
11.1.5. Independent Gate Inputs — 23
11.1.6. Left Set Input — 24
11.1.7. Left Reset Input — 25
11.1.8. Complement Input — 26
11.1.9. Transfer Inputs — 26
11.1.10. Right Set Input — 27
11.1.11. Right Reset Input — 27
11.1.12. Flip-flop Definition Sheets — 27
11.2. Gates, Inverters, and Emitter Followers — 29
11.2.1. 1305 Gate — 30
11.2.2. Diode Gate — 32
11.2.3. Andor Gate — 32
11.2.4. 1499 Gate — 33
11.2.5. Inverters — 33
11.2.6. Emitter Follower — 34
11.3. Miscellaneous — 34
11.4. Major Subcircuit Block Symbols — 35
11.4.1. Digit Signal Generator — 35
11.4.2. Function Signal Generator — 35
11.4.3. Reset Signal Generator — 36
11.4.4. Common Key Signal Generator — 36
11.4.5. Decimal Position Signal Generator (I) — 37
11.4.6. Compare Signal Generator — 37
11.4.7. Row 1 Intensifier — 38
11.4.8. Overflow Signal Generator — 38
11.4.9. Read Amplifier — 38
11.4.10. 666 KC Oscillator — 39
11.4.11. Write Amplifier — 39
11.4.12. Decimal Position Signal Generator (II) — 39
11.4.13. Display Matrix — 40
11.4.14. Segment Generator — 40
11.4.15. Horizontal Staircase Generator — 40
11.4.16. CRT Driver Circuit — 41
11.4.17. Vertical Dot Generator — 41
11.4.18. Horizontal Dot Generator — 41
11.4.19. Horizontal Deflection Amplifier — 42
11.4.20. Vertical Deflection Amplifier — 42
11.4.21. Vertical Staircase Generator — 43
12. EXPLANATION OF MISCELLANEOUS DETAIL SHEETS — 43

Col.

12.1. Abbreviated Gate Symbols — 43
12.2. Field Word Format — 44
12.3. The Display Cells — 46
12.4. The Cell Number Nomenclature — 47
12.5. The Field Word-Display Raster Relationship — 47
13. VOCABULARY — 49
14. CONSTRUCTION — 49
14.1. The Cabinet — 49
14.2. The Printed Circuit Boards — 50
14.2.1. Cards — 50
14.2.2. Mother Boards — 50
14.3. The Mother Board Connections — 52
14.4. The Circuit Diagram — 53
14.4.1. Card Numbers — 54
14.4.2. Gate Numbers — 55
14.4.3. Inverter Numbers — 55
14.4.4. Pin Numbers — 55
14.4.5. Plug Numbers — 55
15. SIMPLIFIED BLOCK DIAGRAM — 56
16. OPERATION — 63
16.1. The Logic Diagram — 63
16.1.1. Coordinate Index Numbers — 64
16.1.2. Abbreviated Gate Symbols — 64
16.1.3. Abbreviated ANDOR Gate Symbol — 65
16.1.4. Location of Gates — 65
16.1.5. Abbreviated Entry Unit Symbol — 65
16.1.6. Abbreviated Digit Register Symbols — 66
16.1.7. Abbreviated Timing Unit Symbol — 68
16.2. The Operation of the Digisters — 69
16.2.1. Parallel Entry of Decimal Digits — 69
16.2.2. Sequential Transfers — 70
16.2.3. The A-digister — 71
16.2.4. The B-digister — 71
16.2.5. The C-digister — 71
16.2.6. The D-digister — 71
16.2.7. Sequential Readout of a Digister by Sequencing — 72
16.2.8. Addition and Subtraction by Sequencing — 72
16.3. The Clearing Operation — 72
16.4. Shift Left Register 1 (SL1) — 78
16.5. Digit Entry — 82
16.6. Automatic Decimal Alignment and Automatic Sequential Access Storage Operation — 87
16.7. Suboperation, Addition, and Subtraction — 89
16.7.1. Shift Left Register 1 — 90
16.7.2. Shift Left Register 2 — 90
16.7.3. Shift Down in Addition and Subtraction — 91
16.7.4. Shift Down in Multiplication and Division — 91
16.7.5. Shift Up — 91
16.7.6. Shift Up in Repeat — 91
16.7.7. Store — 92
16.7.8. Recall — 92
16.7.9. Addition — 93
16.7.10. Subtraction — 93
16.7.11. Complement — 94
16.7.12. Transfer 1→M D — 94
16.7.13. Add 1 to Register 2 — 94
16.8. Multiplication — 94
16.9. Division — 95
16.10. Suboperating Timing — 97
16.11. Display of Register Contents — 97
16.12. Decimal Alignment and Display — 100
17. SUMMARY OF THE INVENTION — 100
18. ALTERNATIVE EMBODIMENTS — 100

3. STATEMENT OF RELATED CASES

This application discloses subject matter common to U.S. patent application Ser. No. 725,960, filed May 1, 1968 by George H. Hare for "Calculator," which is a continuation of U.S. patent application Ser. No. 366,235, filed May 11, 1964, now abandoned.

4. FIELD OF ART

This invention relates to calculators, and, more particularly, to calculators adapted for at least one mode of data entry, viz., manipulation of a keyboard.

Further, this invention relates to calculators which employ electronic means for carrying out calculations, as distinguished from the prior art mechanical and electromechanical types employing gear trains, racks, electromagnetic relay banks, and similar devices.

Also, this invention relates to calculators which employ electronic means for displaying the data entering into, and resulting from, the calculations performed, as distinguished from the mechanical dials, and the like, of the prior art.

More particularly yet, this invention relates to electronic calculating devices of the highly compact type.

5. PRIOR ART

It has been broadly suggested in the prior art that a single electronic counter be used in a large-scale, complex bookkeeping machine for the purpose of up-dating stored records.

It has been known in the prior art (for instance, in the work of Eckert and Mauchly) to use delay lines for very short time storage of numerical data.

A sequential access "stack" type of organization has been employed in prior art, large-scale, high-speed, automatic sequence controlled computing devices in programming the arithmetic utilization of groups of "blind" registers.

6. PROBLEMS SOLVED BY THE INVENTION

Workers in the art have recognized the desirability of combining various principles and expedients which have evolved during the development of large-scale, automatic sequence controlled calculator technology, and automatic industrial controls technology, into a compact, quiet, high-speed, keyboard-controlled calculating device which would perform the four basic arithmetic operations, addition, subtraction, multiplication, and division.

It would be desirable to provide automatic decimal point setting facilities in such a compact electronic calculator, whereby the decimal point, as key-inserted during the entry of each multidigit number, or factor, in the calculation, would be "carried" automatically by the calculator mechanism, the decimal point appearing in its proper position in the result as displayed by the calculator.

It is highly desirable to provide, in keyboard-controlled calculating devices, retrievable, direct access, storage means which are capable of storing a multi-digit factor in response to the depression of a single key, and of retrieving the contents of this storage by depression of another single key.

In addition, acoustic delay lines are known which are extremely compact and free from the problems usually associated with moving parts. It is desirable to employ such delay lines in electronic apparatus, e.g., automatic sequence controlled calculating machines, as a substitute for more bulky storage means.

It is also well-known in the art that, where possible, the substitution of solid state components for space discharge devices is desirable for reasons of saving space, avoiding the problem of heat dissipation to a large degree, avoiding the use of filament voltage supplies, or ionizing supplies, and providing a device which is generally rugged and free from excessive difficulties due to mechanical shock.

Also, it is desirable, in an electronic, keyboard-controlled calculating device, to provide a keyboard arrangement having a large percentage of "unconditional" function keys, i.e., function keys the operation of which is independent of the setting of other keys. This freedom from "conditional" function keys, results, of course, in a greater freedom from arbitrary rules of calculator operation such as were characteristic of devices of the prior art, and which had to be thoroughly learned before proficiency could be attained in their use. This freedom from arbitrary rules of operation, then, can result in lowering the cost of training clerical operators, and extending the usefulness of such an electronic calculating device to embrace a class of "casual" users, such as scientists and technicians.

It is also desirable in connection with the instant invention to provide cathode-ray display means capable of displaying the contents of a plurality of stores, in addition to the current keyboard entry, or result of the previous calculational step, usually displayed in the accumulator "dials" of mechanical calculators.

It is also desirable in connection with the instant invention to provide automatic successive factor storage analogous to the "Polish stack" register organization found in some automatic sequence controlled electronic calculators.

It is desirable in connection with the instant invention to provide a display of the contents of these successive factor stores, wherein the rows in which the stores are displayed are so juxtaposed as to exhibit the order of entry and emission of the stored factors.

7. OBJECTS OF THE INVENTION

It is therefore an object of the present invention to provide a compact electronic calculating device including as its principal storage means an acoustic delay line.

Another object of the present invention is to provide an arithmetic unit in an electronic calculating device which is capable of arithmetically combining multi-digt numercal factors emitted by a storage means in "pulse-count," or "unitary," notation without the interposition of additional means for converting to a second form of ntation, and reconverting therefrom.

Another object of the present invention is to provide an electronic calculating device in which the arithmetic unit and the display unit share a single timing chain and a register.

Another object of the present invention is to provide a compact electronic calculating device substantially all of the function keys of which are free from conditioning by other keys.

Another object of the instant invention is to provide an electronic, keyboard-controlled calculating device having a multi-row, cathode-ray tube display.

Another object of the present invention is to provide a keyboard-controlled electronic calculating device having automatic decimal alignment.

Another object of the present invention is to provide a keyboard-controlled electronic calculating device having automatic successive factor storage means.

Another object of the present invention is to provide a keyboard-controlled electronic calculating device having automatic successive factor storage means, and means for displaying the contents of said storage means in such juxtaposition as to exhibit the sequence of entry and emission of said automatic successive factor storage means.

Another object of the present invention is to provide an arithmetic unit for an electronic calculating device which is adapted to receive numerical data in the form of a pulse train expressing said data in pulse, count, or unitary, notation, and which is adapted to transmit the results, or partial results, of arithmetically operating upon such data in the form of a pulse train in which said results, or partial results, are expressed in pulse-count, or unitary, notation.

Another object of the instant invention is to provide an arithmetic unit for an electronic calculating device comprising a plurality of single-digit registers, or "digisters," said digisters including a first sequenceable digister, a second sequenceable digister, and a non-sequenceable digister.

Another object of the present invention is to provide an arithmetic unit for an electronic calculating device including a plurality of digisters, one of said digisters being advanceable, one of said digisters being recedable, and one of said digisters being non-sequenceable.

Another object of the present invention is to provide a shared digister means and displayed digit selection means which enable the display of data being circulated in a high-speed memory.

Another object of the present invention is to provide means for allowing the display and timing chain to "free run" when the calculator is "cleared."

For a fuller understanding of the nature and objects of the invention, reference should be had to the following detailed description, taken in connection with the accompanying drawings, which drawings may be described as follows:

8. BRIEF DESCRIPTION OF THE FIGURES

FIGS. 11 through 30 are flip-flop input definition sheets used for explaining the nature and operation of the several types of composite flip-flop inputs of the instant embodiment;

FIGS. 170 and 171 show the circuit and symbol, respectively, of a pair of interconnected inverting gates designated ANDOR gate herein;

FIG. 207 illustrates the circuit of the display matrix;

Figure 225:
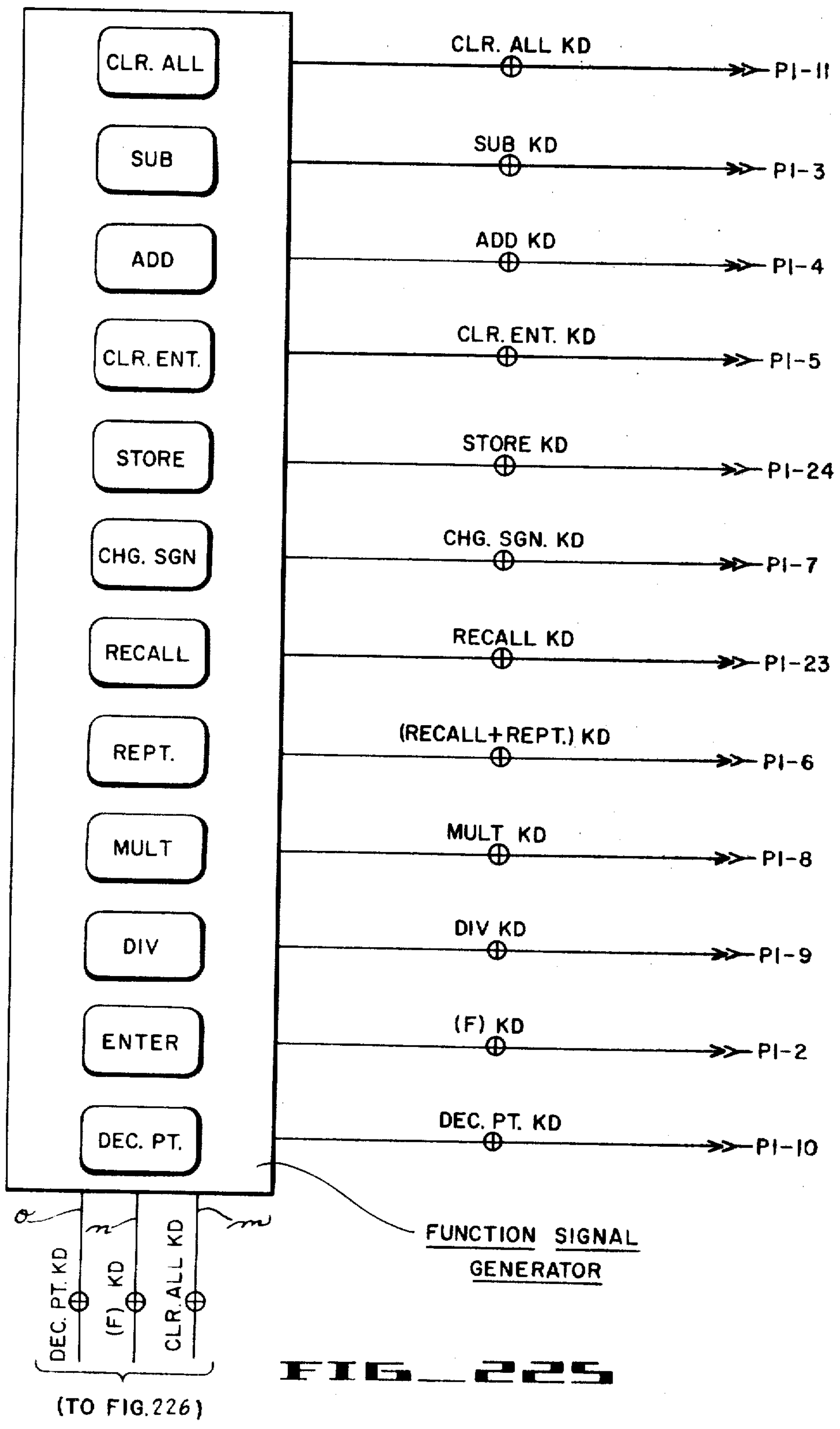
Figure 294:
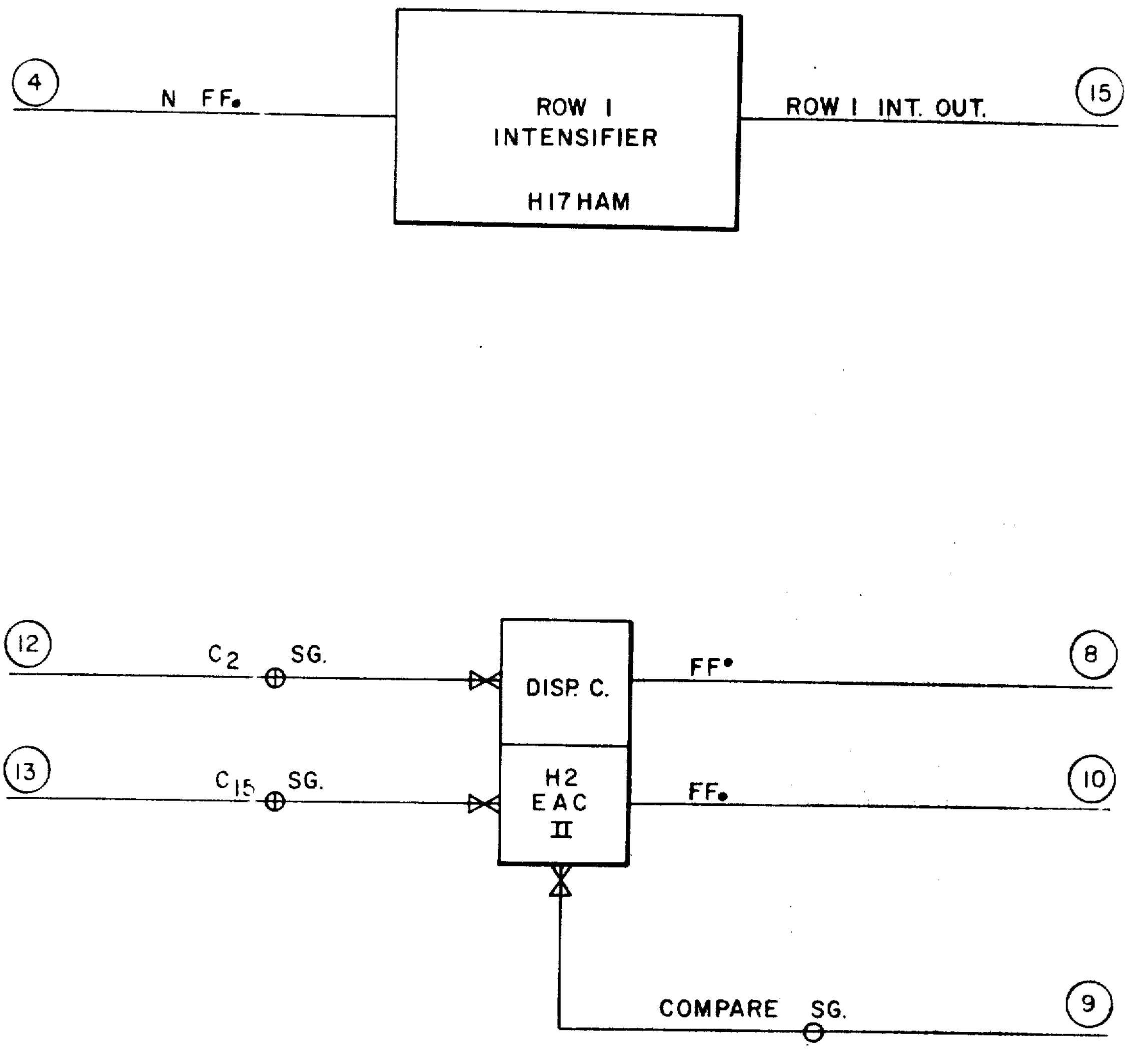
Figure 314:
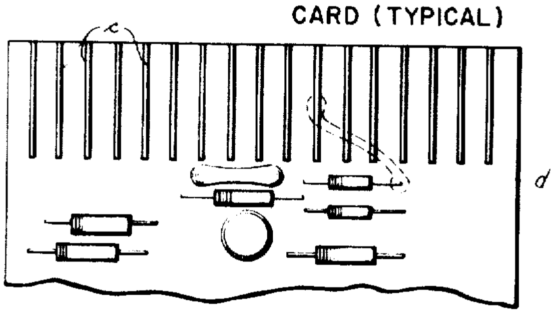
Figure 315:
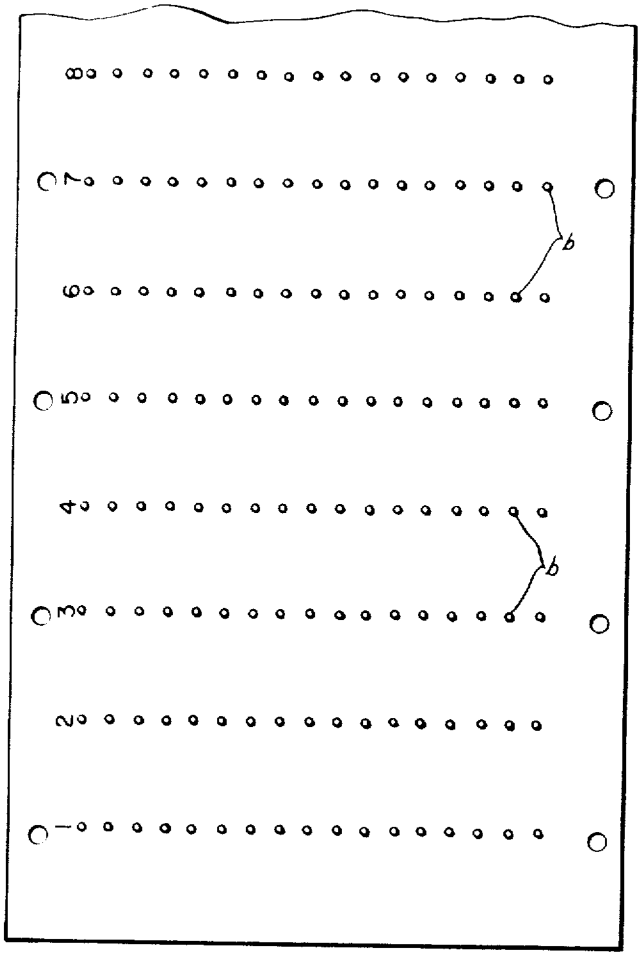
Figure 316:
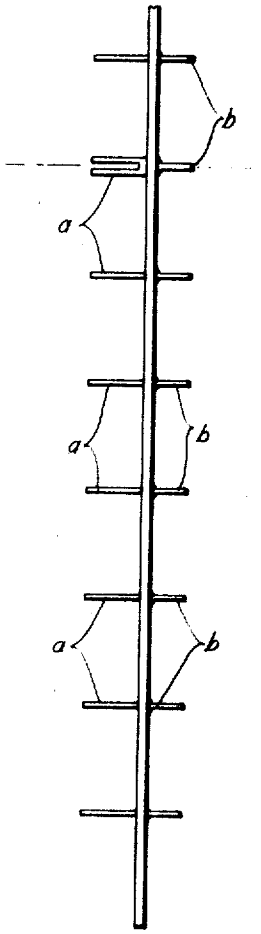
Figure 317:
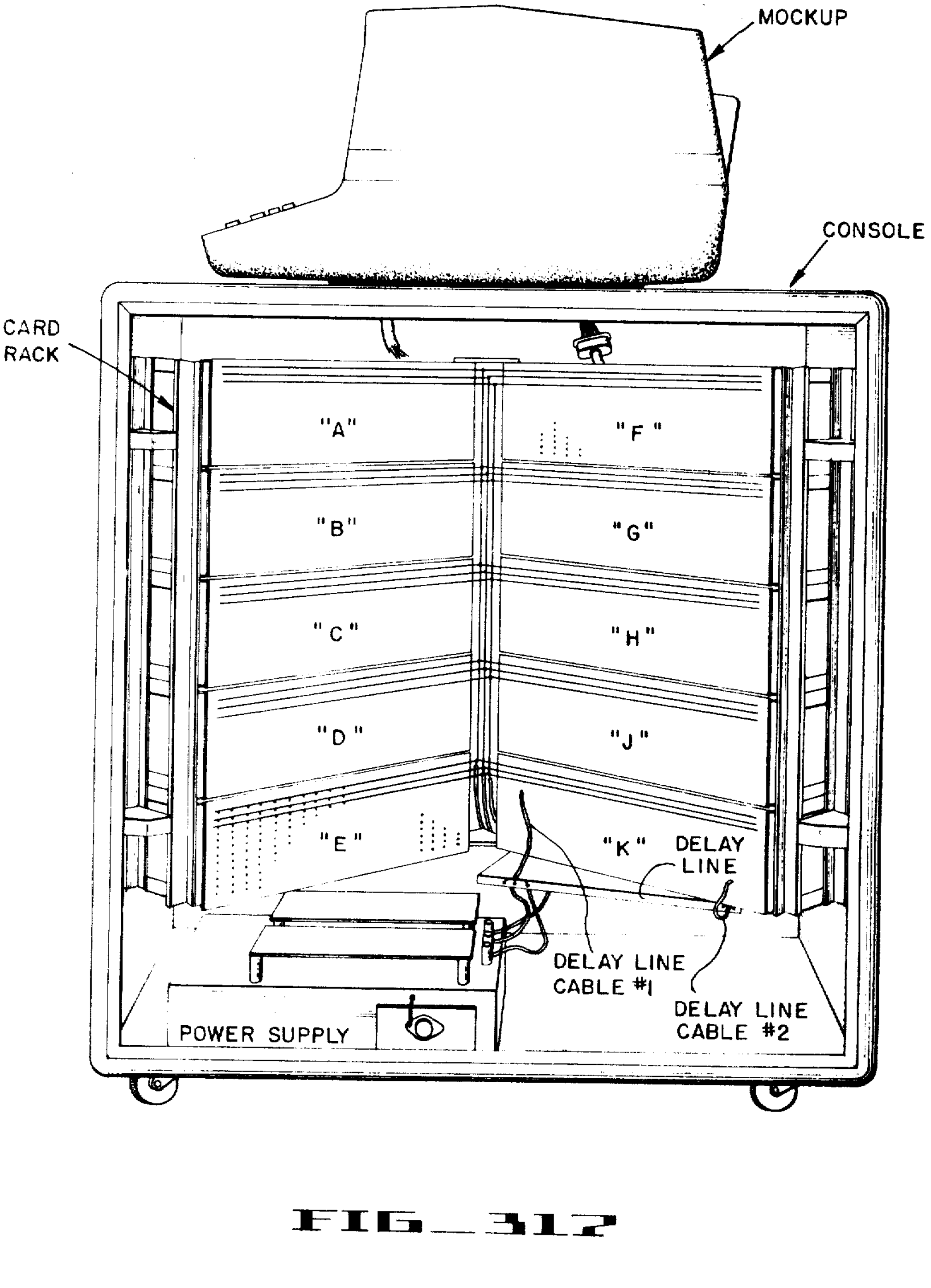
Figure 31B:
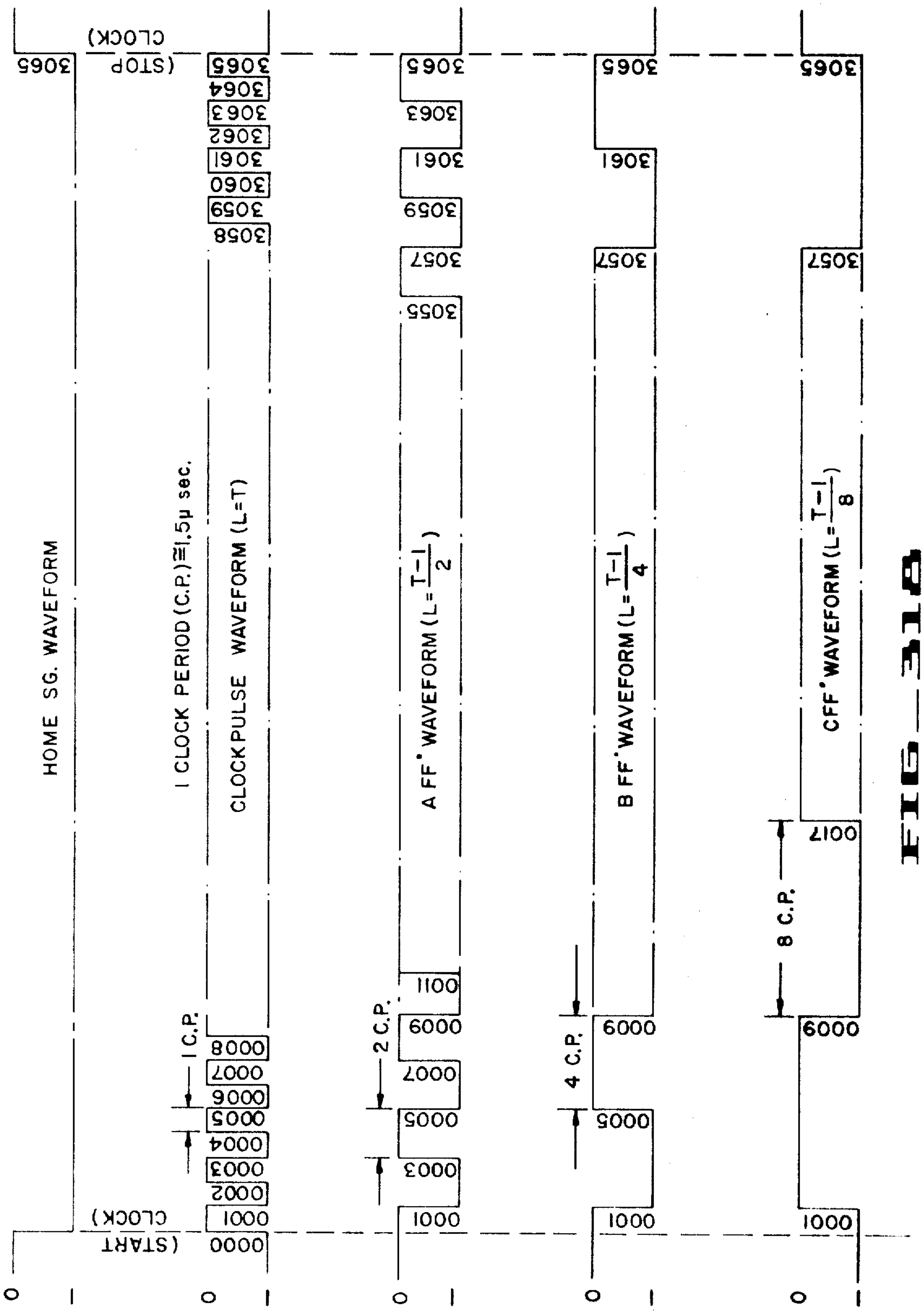
Figure 332:
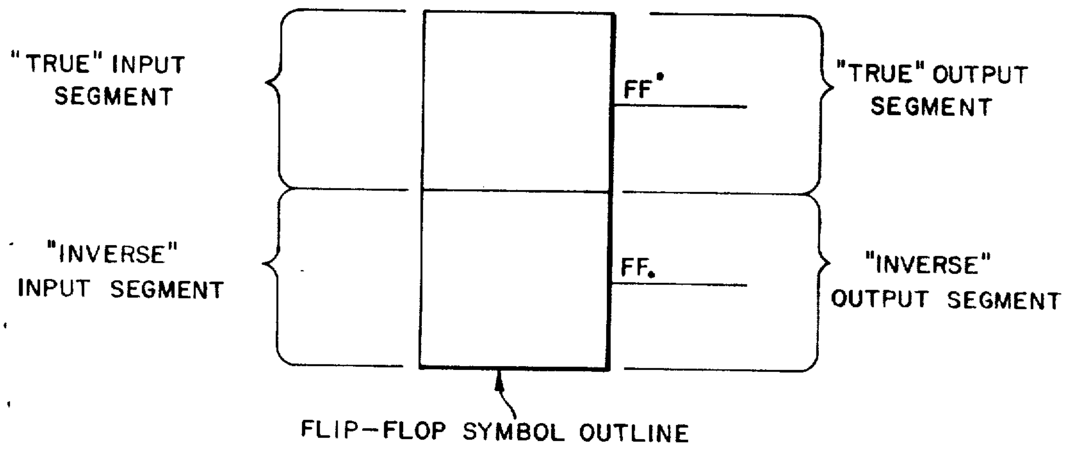
Figure 333:
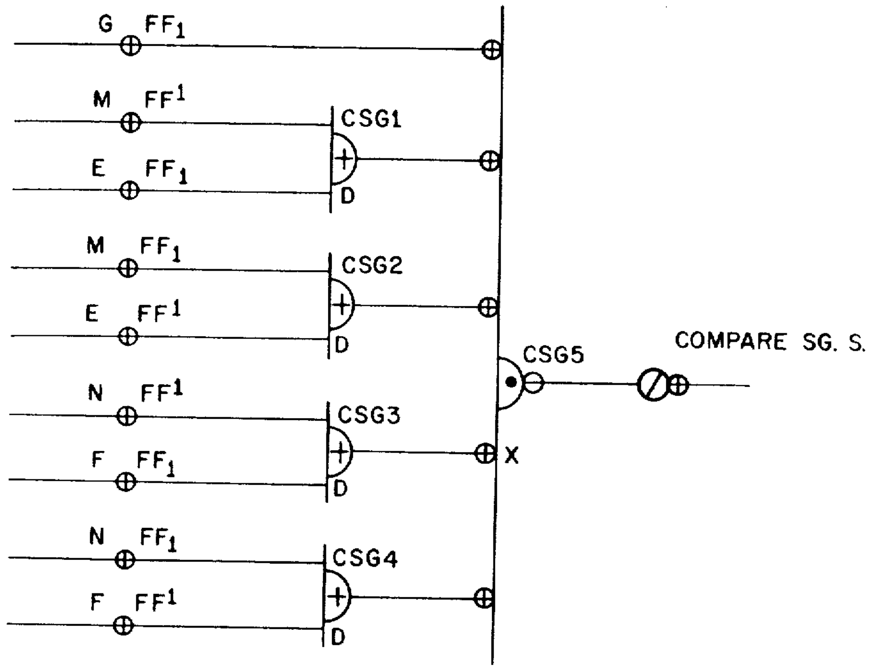
Figure 343:
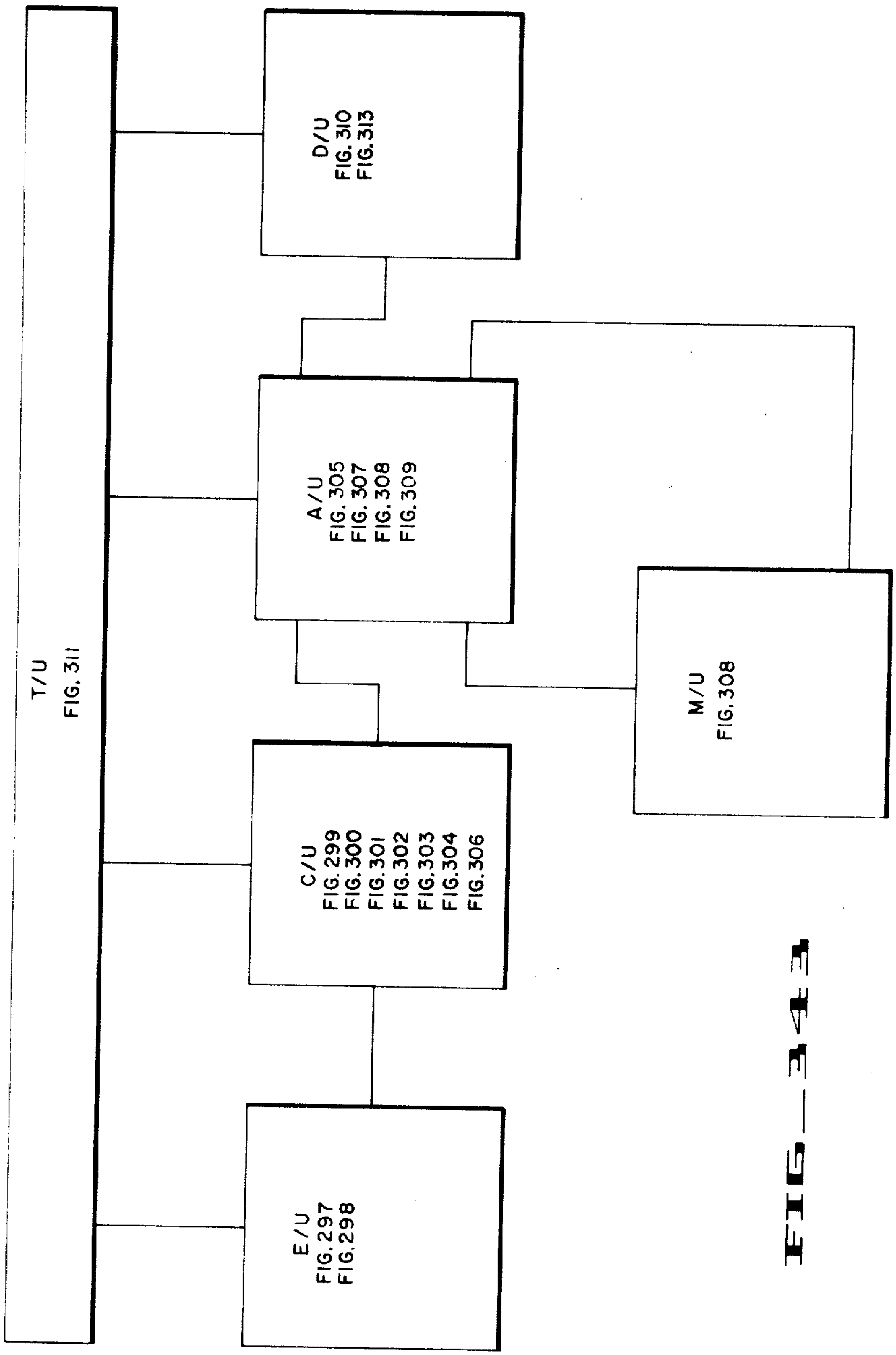
Figure 344:
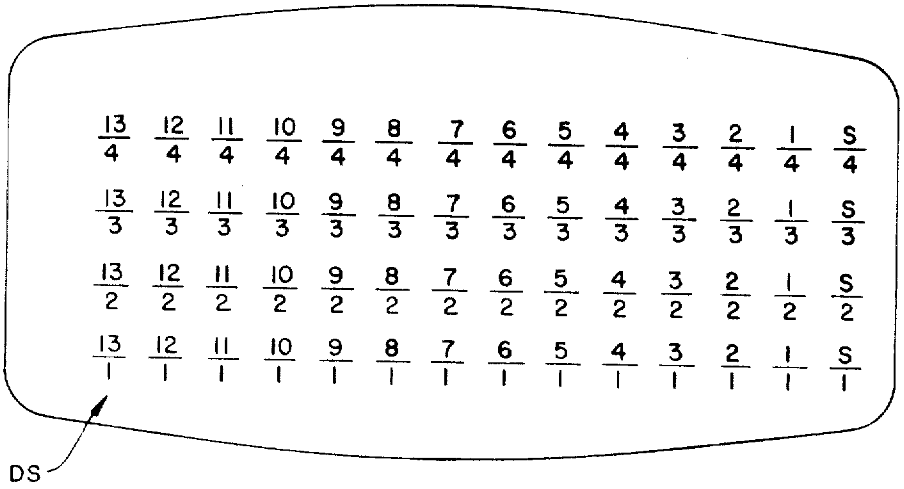
Figure 345:
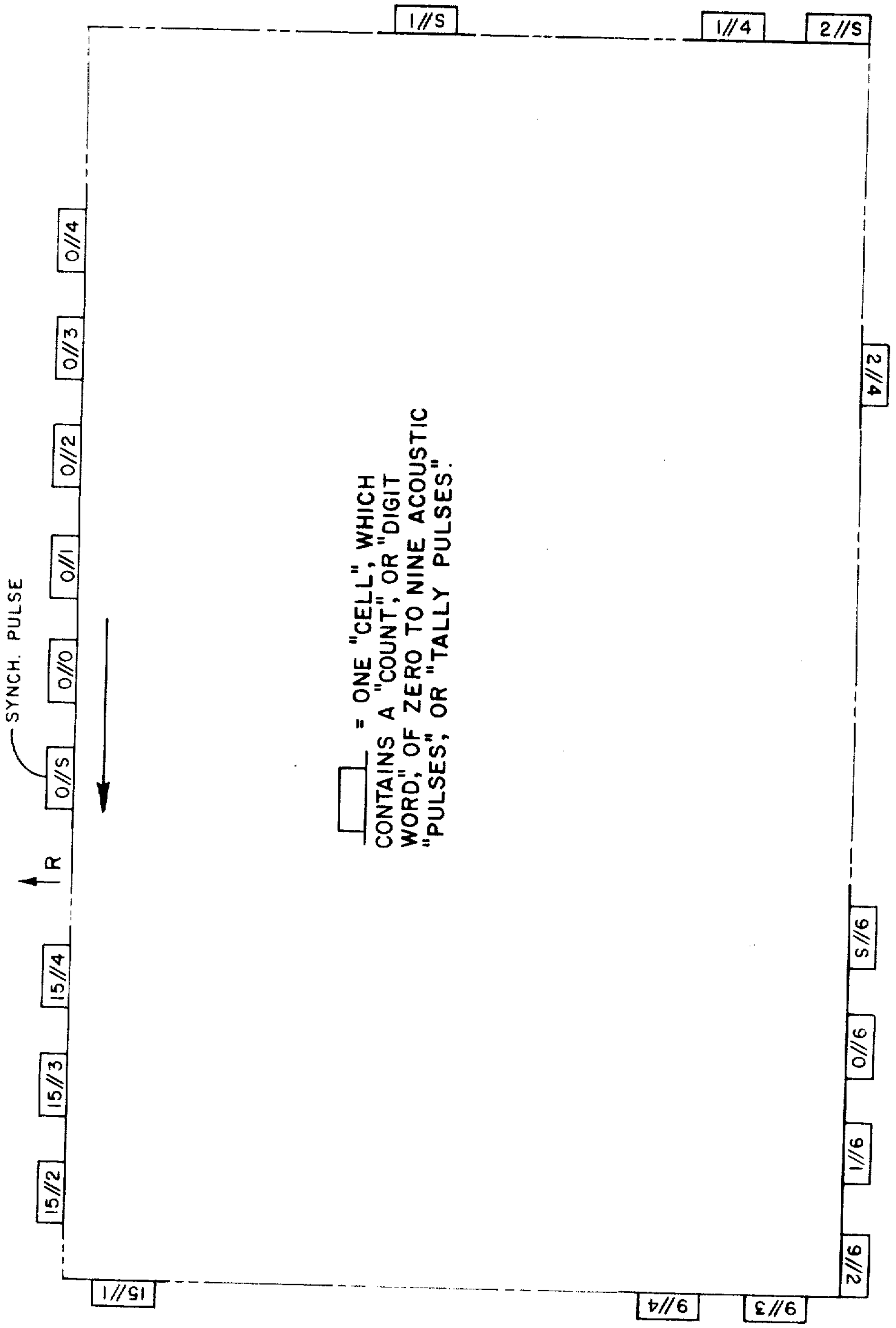
Figure 34E:
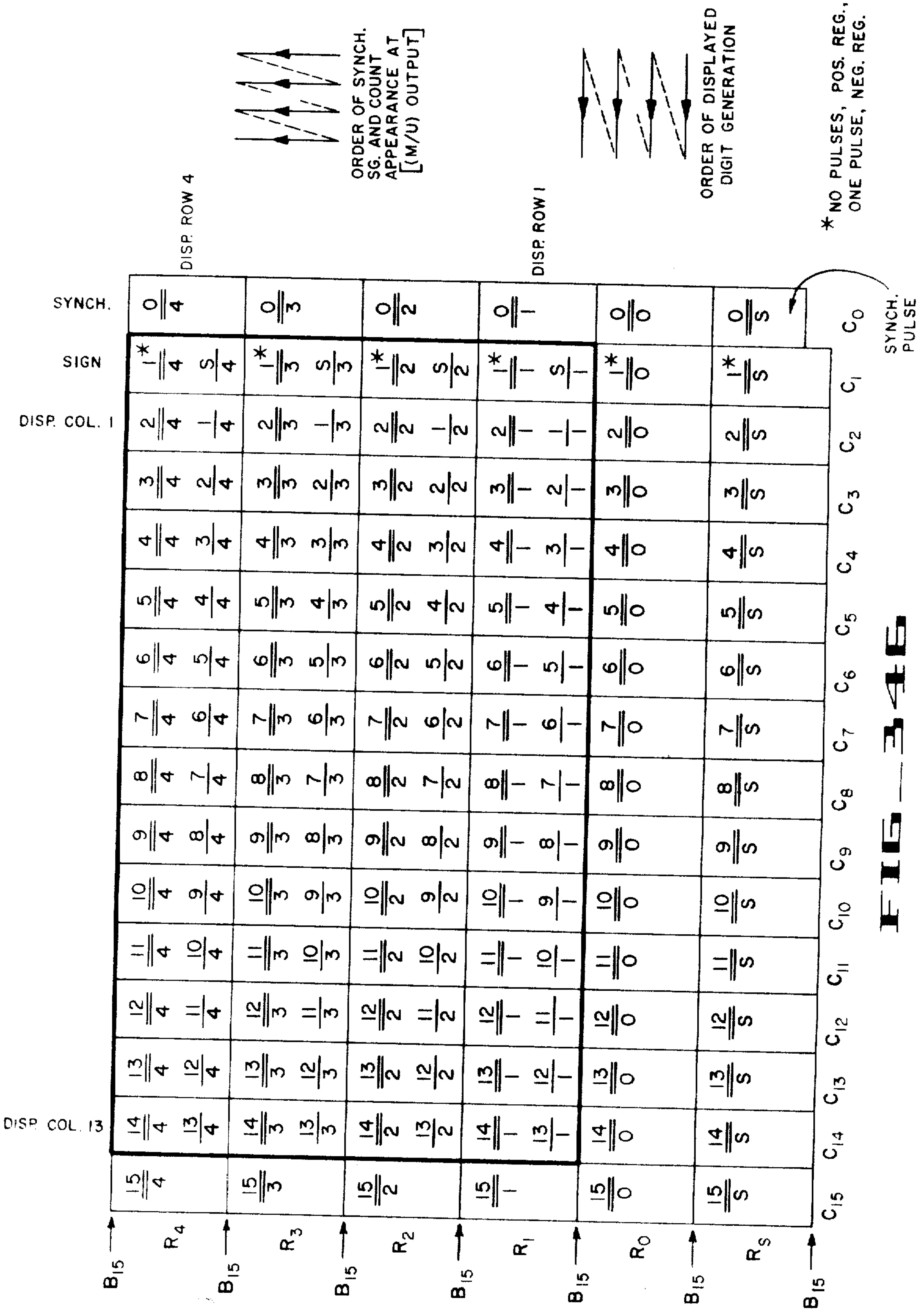
Figure 348:
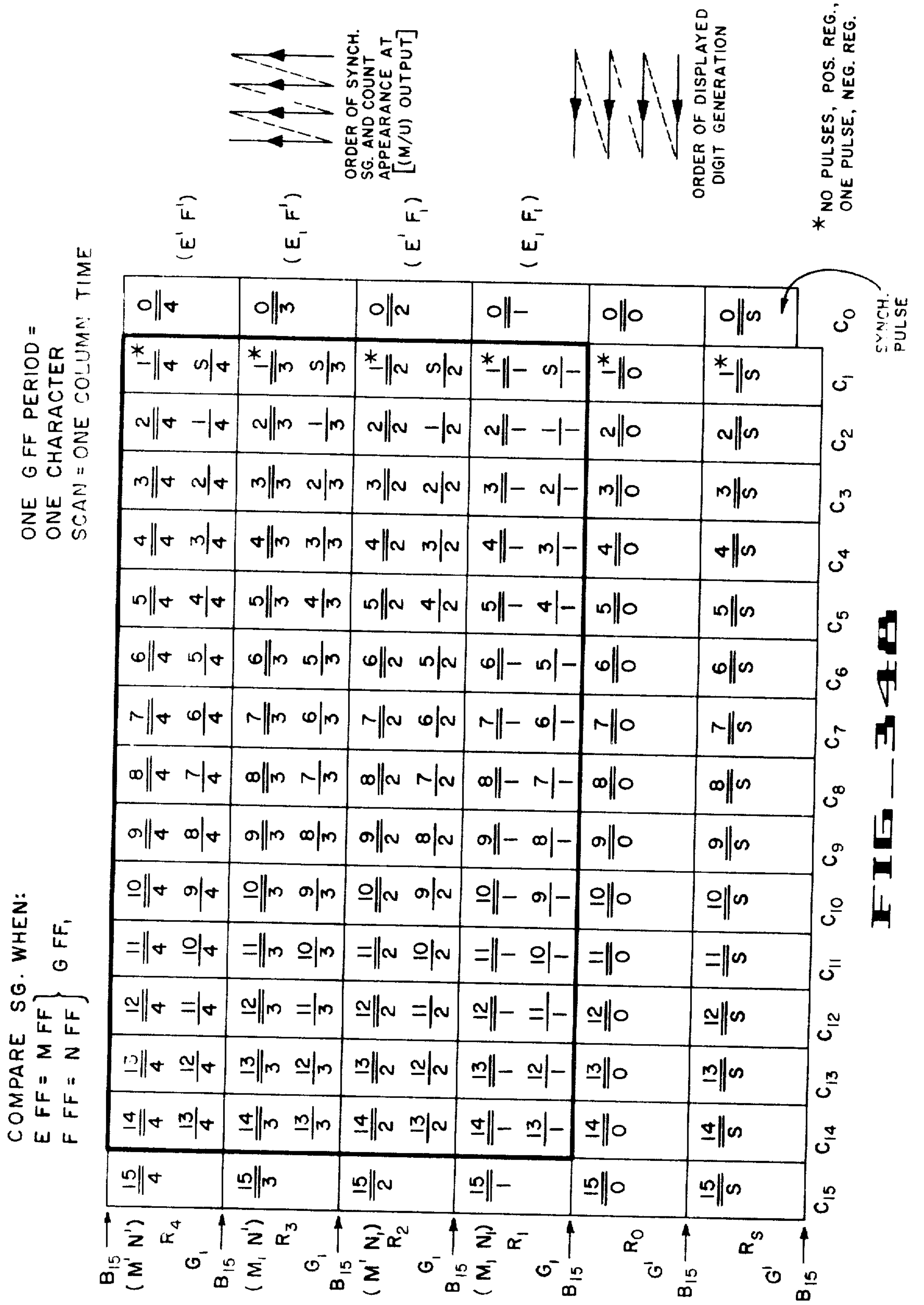
Figure 349:
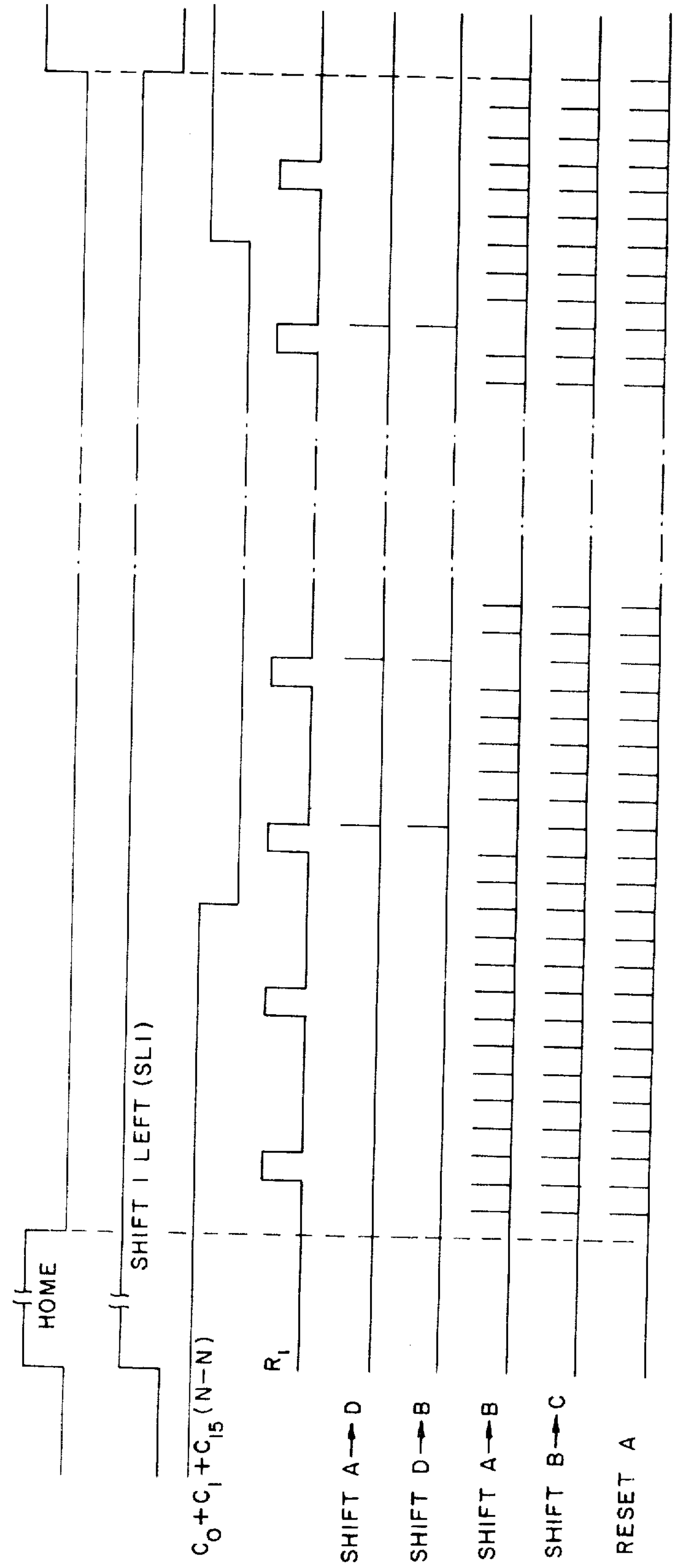
Figure 35O:
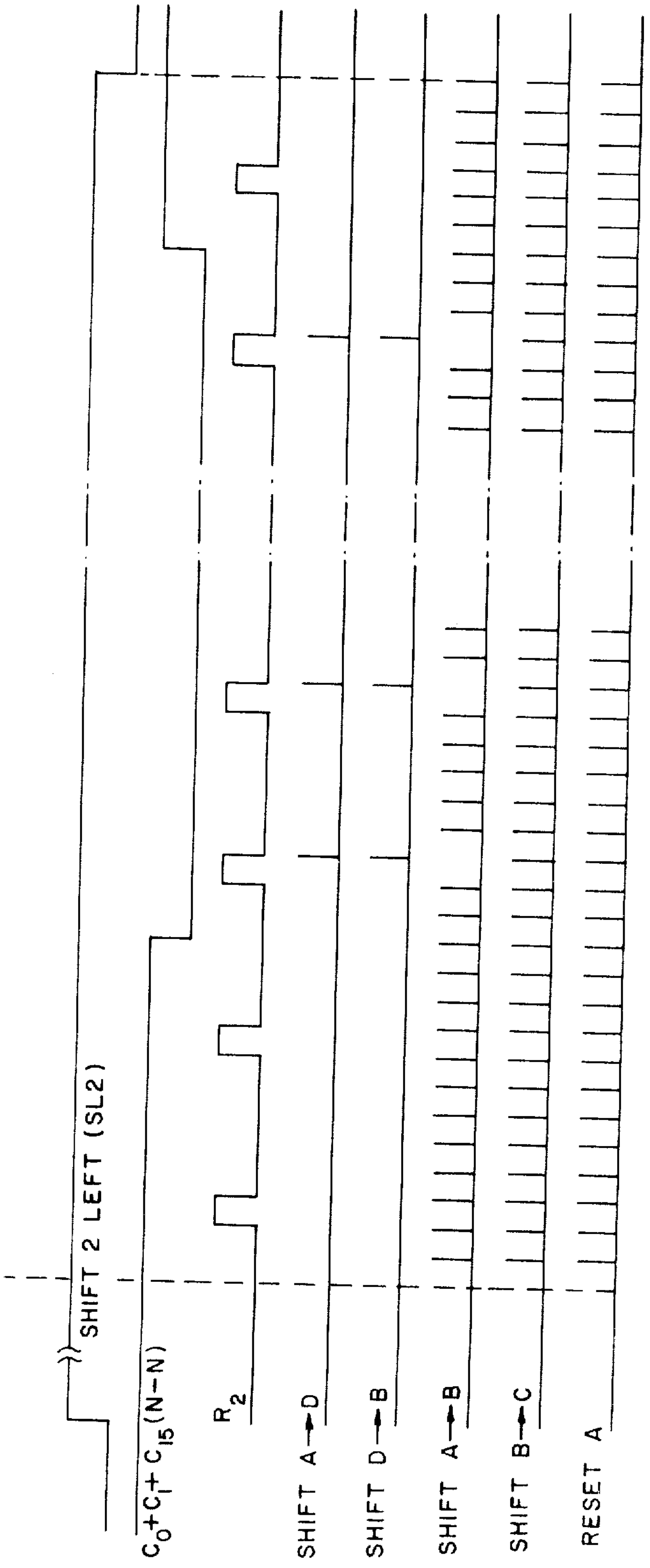
Figure 351:
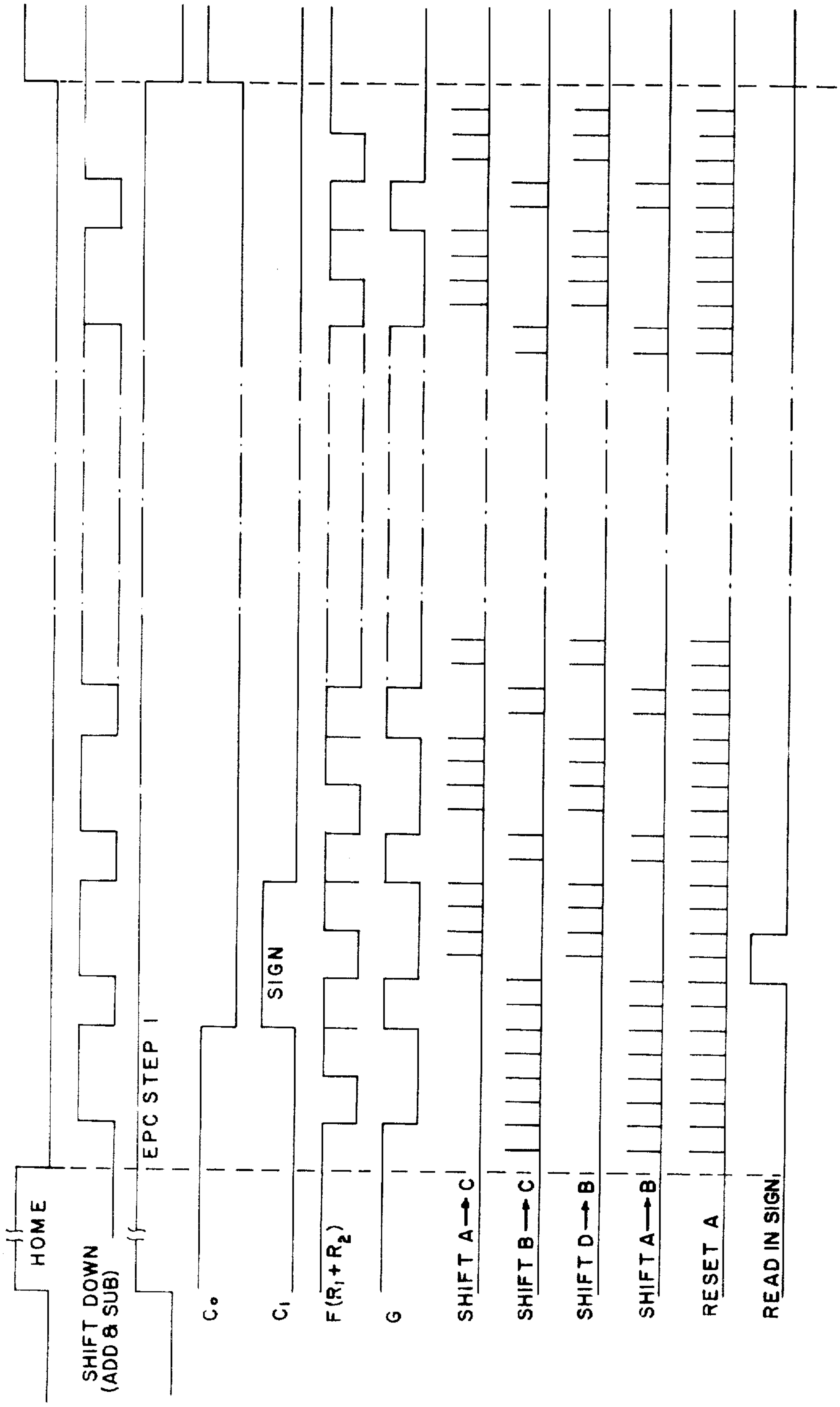
Figure 352:
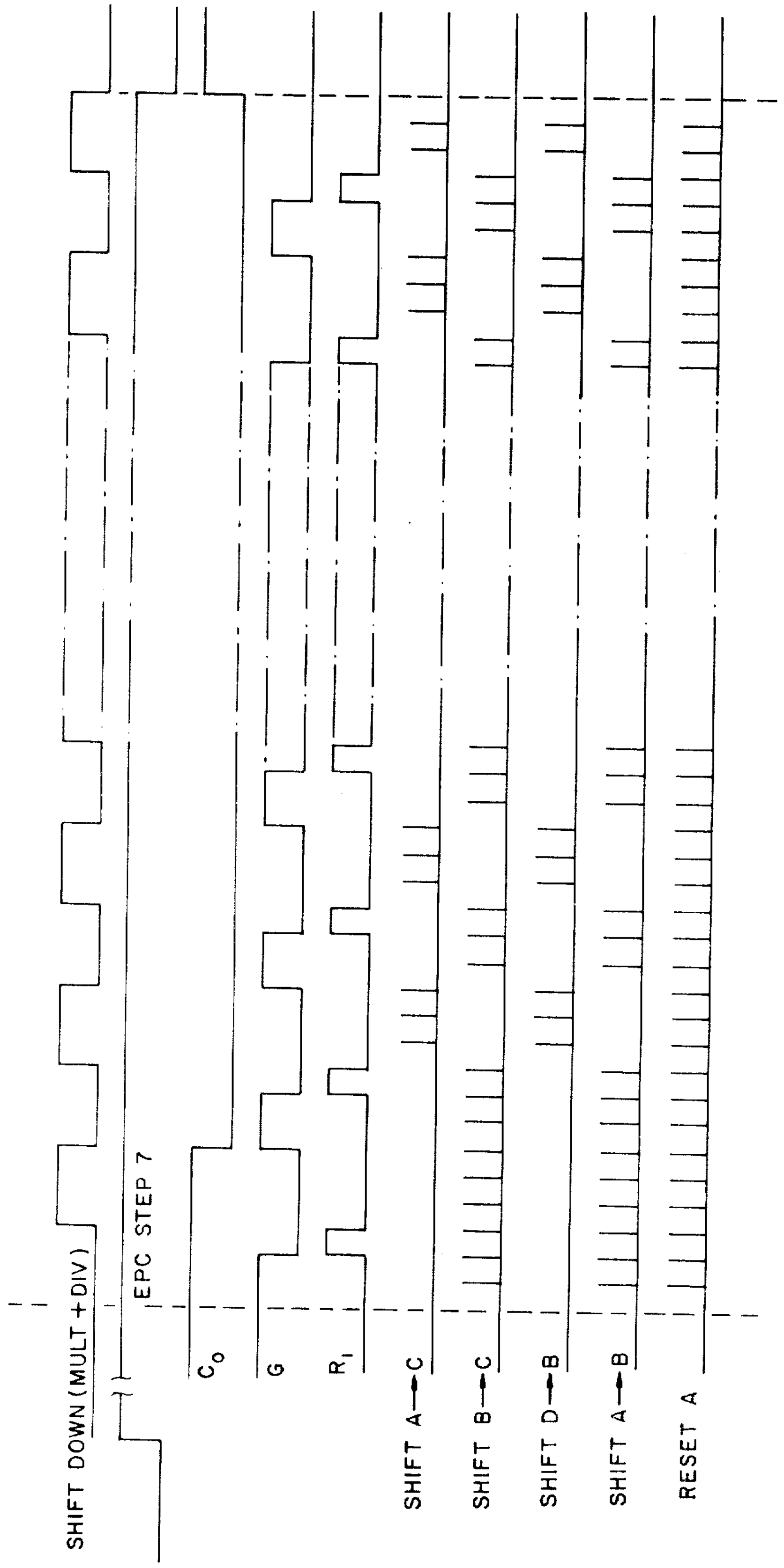
Figure 353:
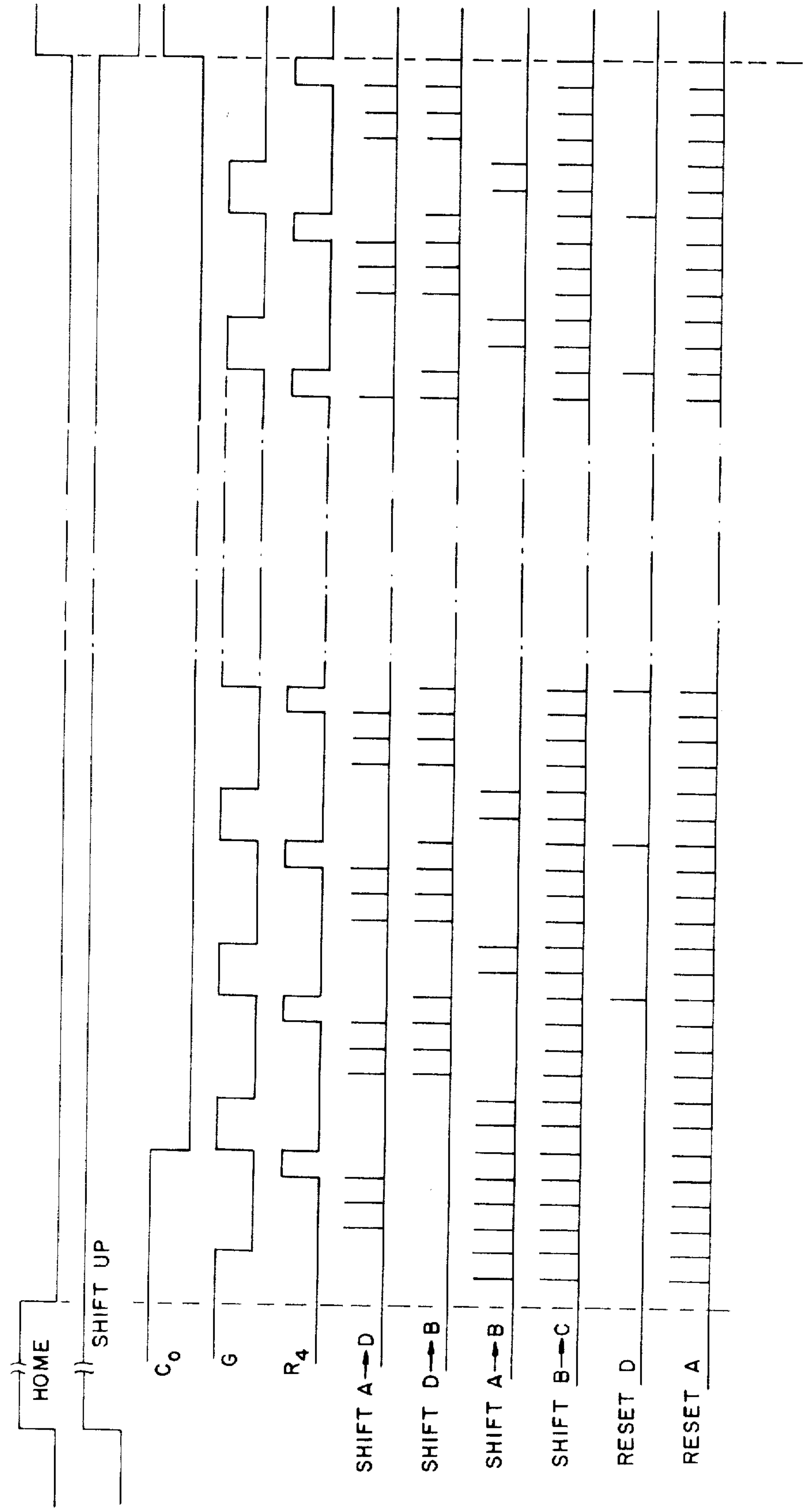
Figure 354:
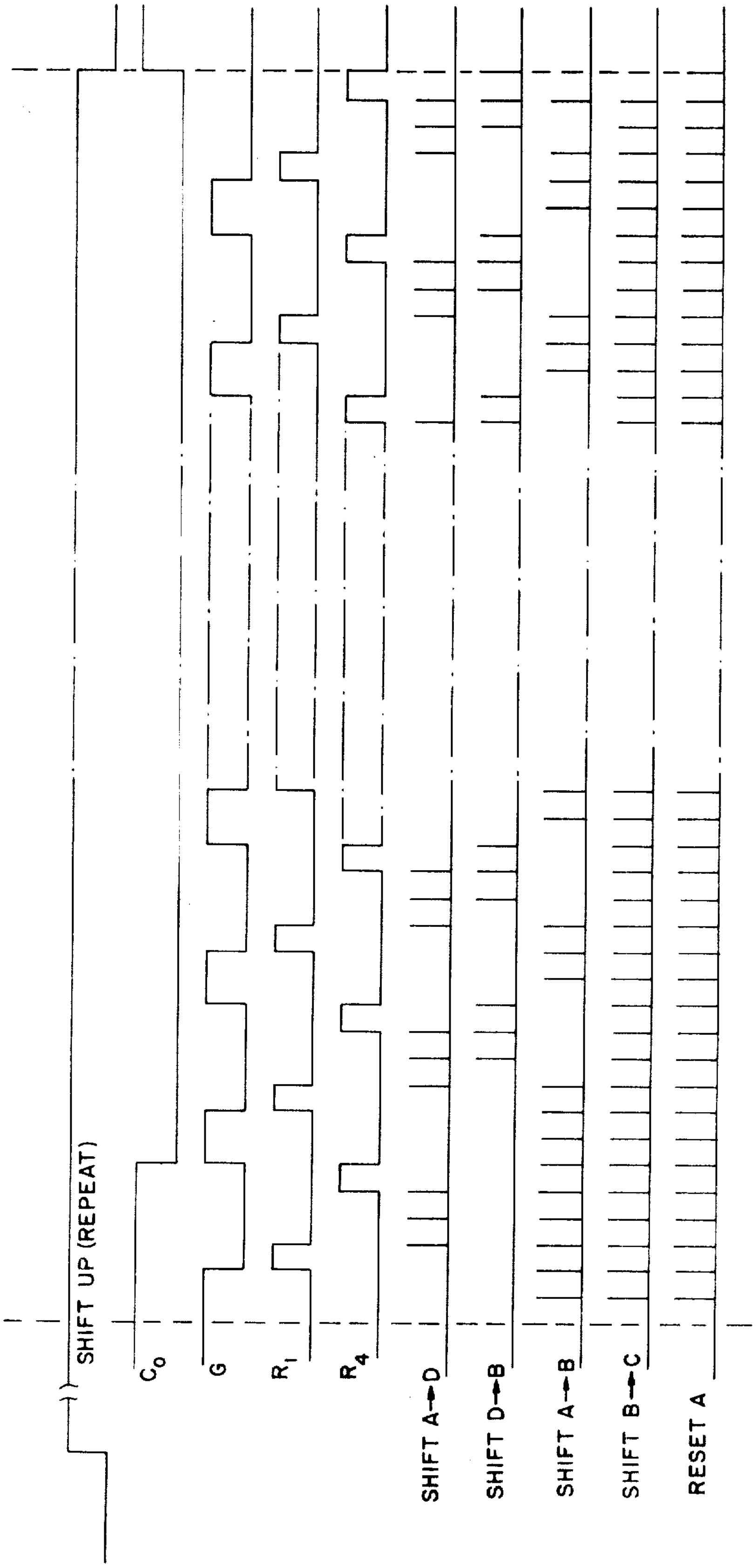
Figure 35:
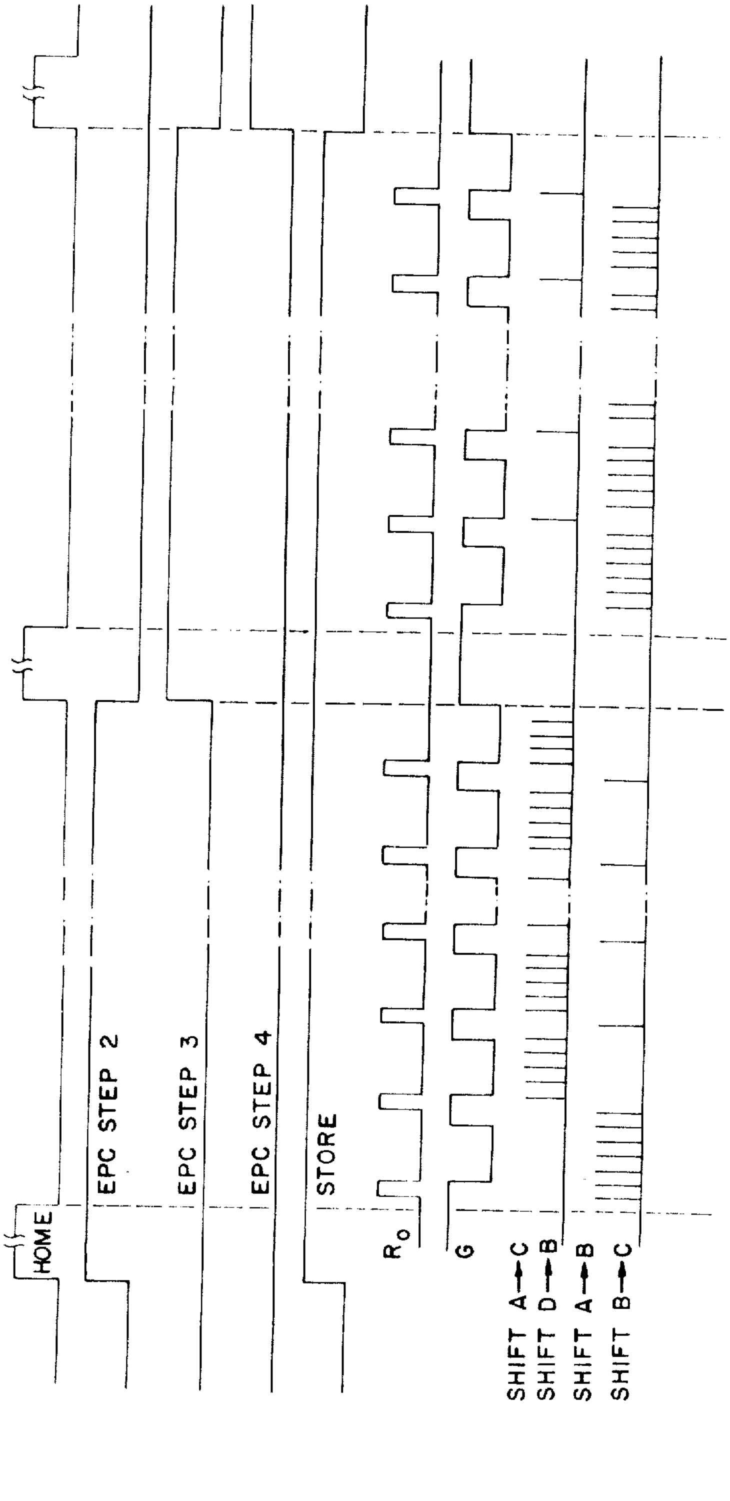
Figure 356:
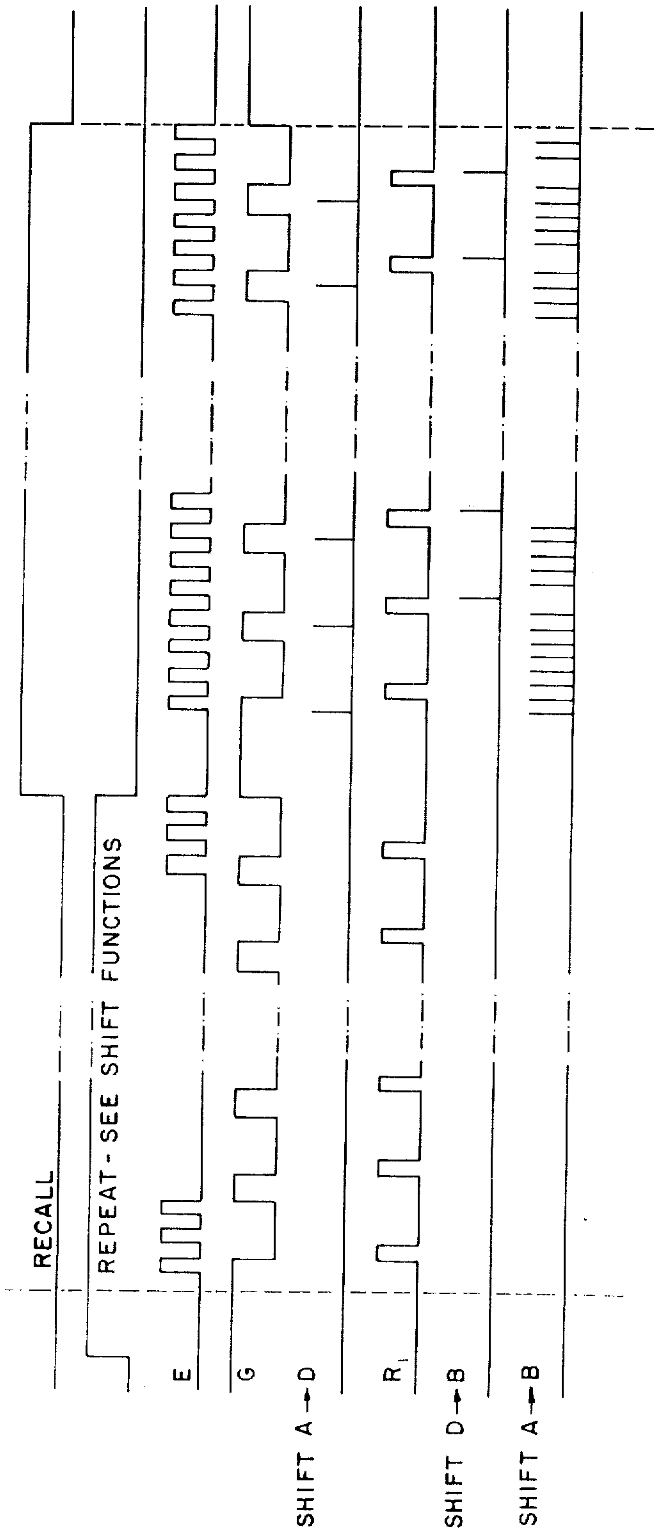
Figure 352:
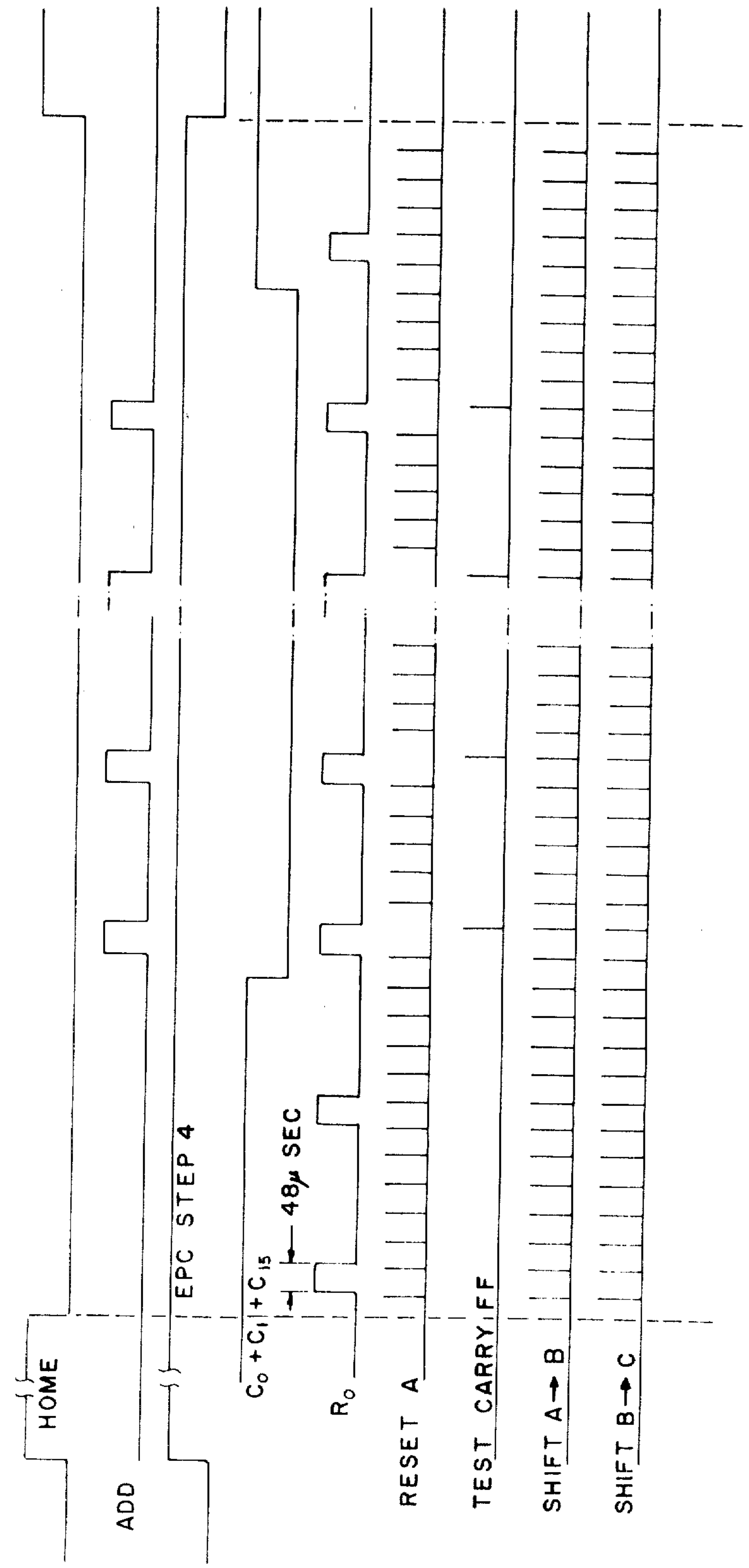
Figure 358:
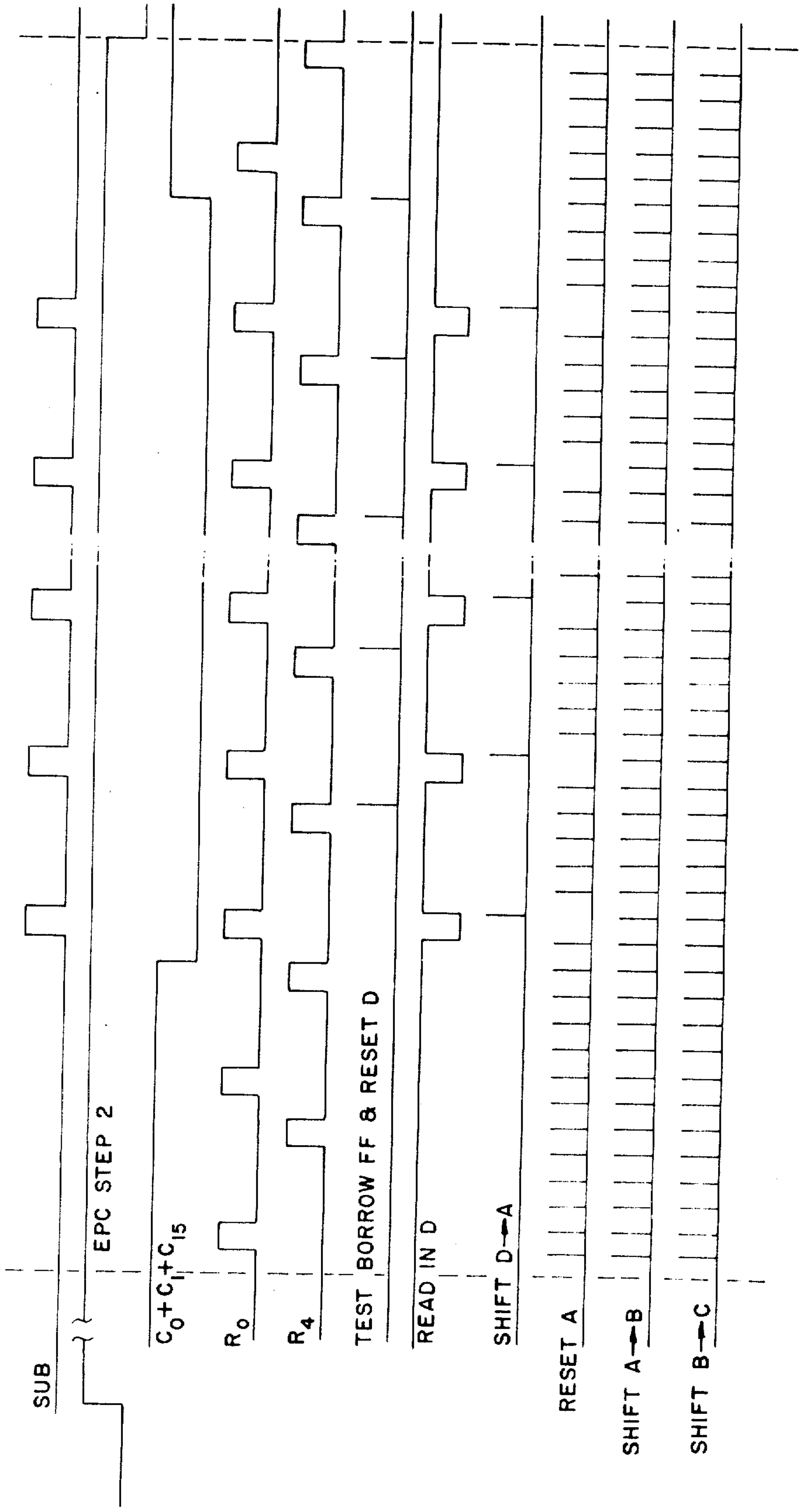
Figure 359:
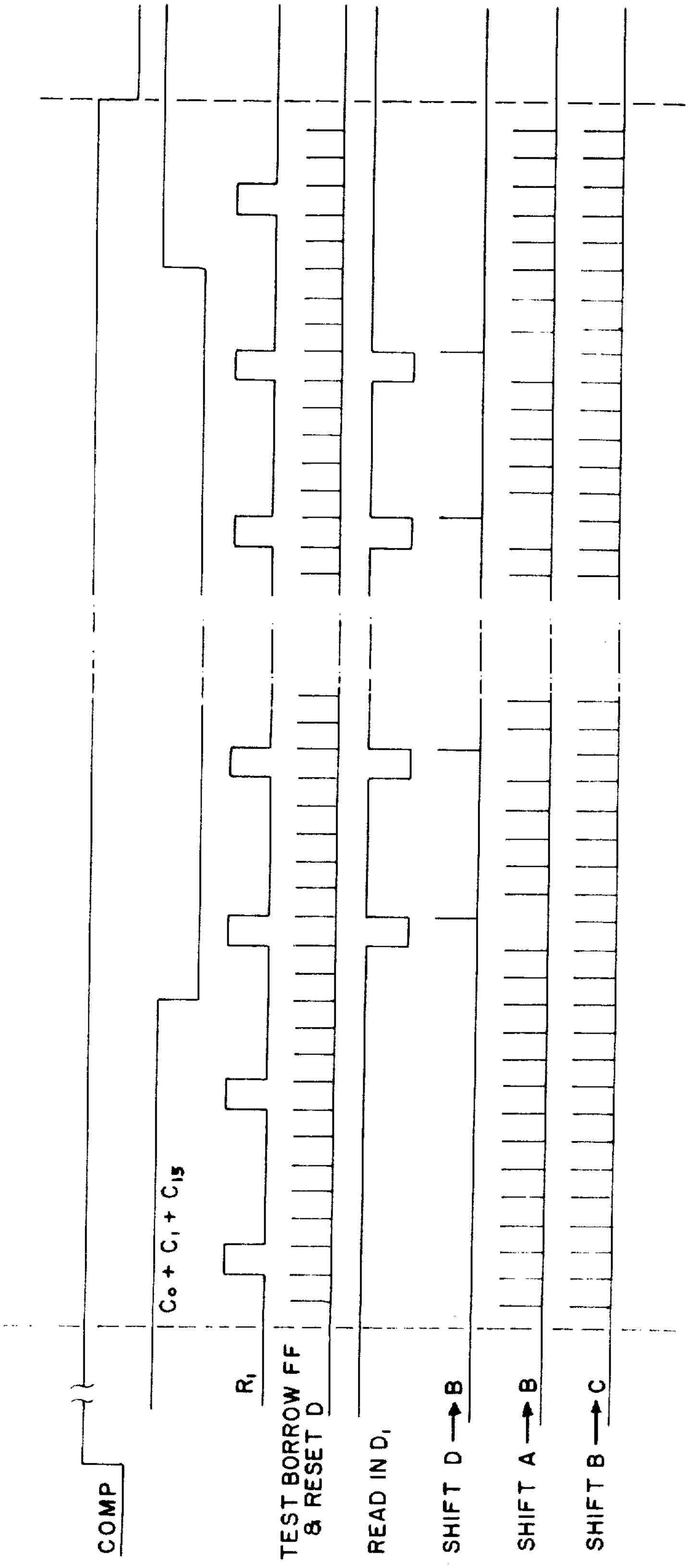
Figure 360:
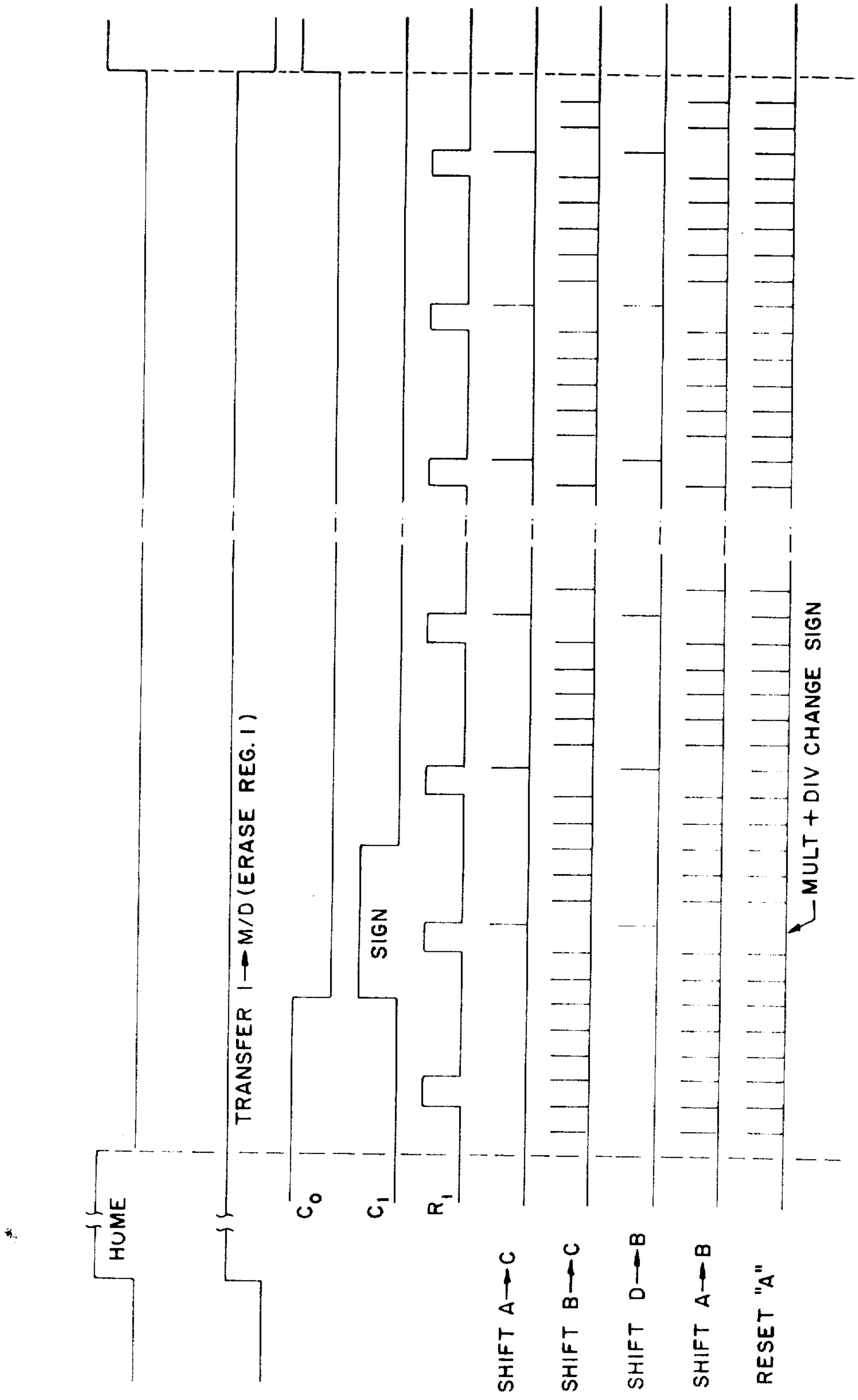
Figure 361:
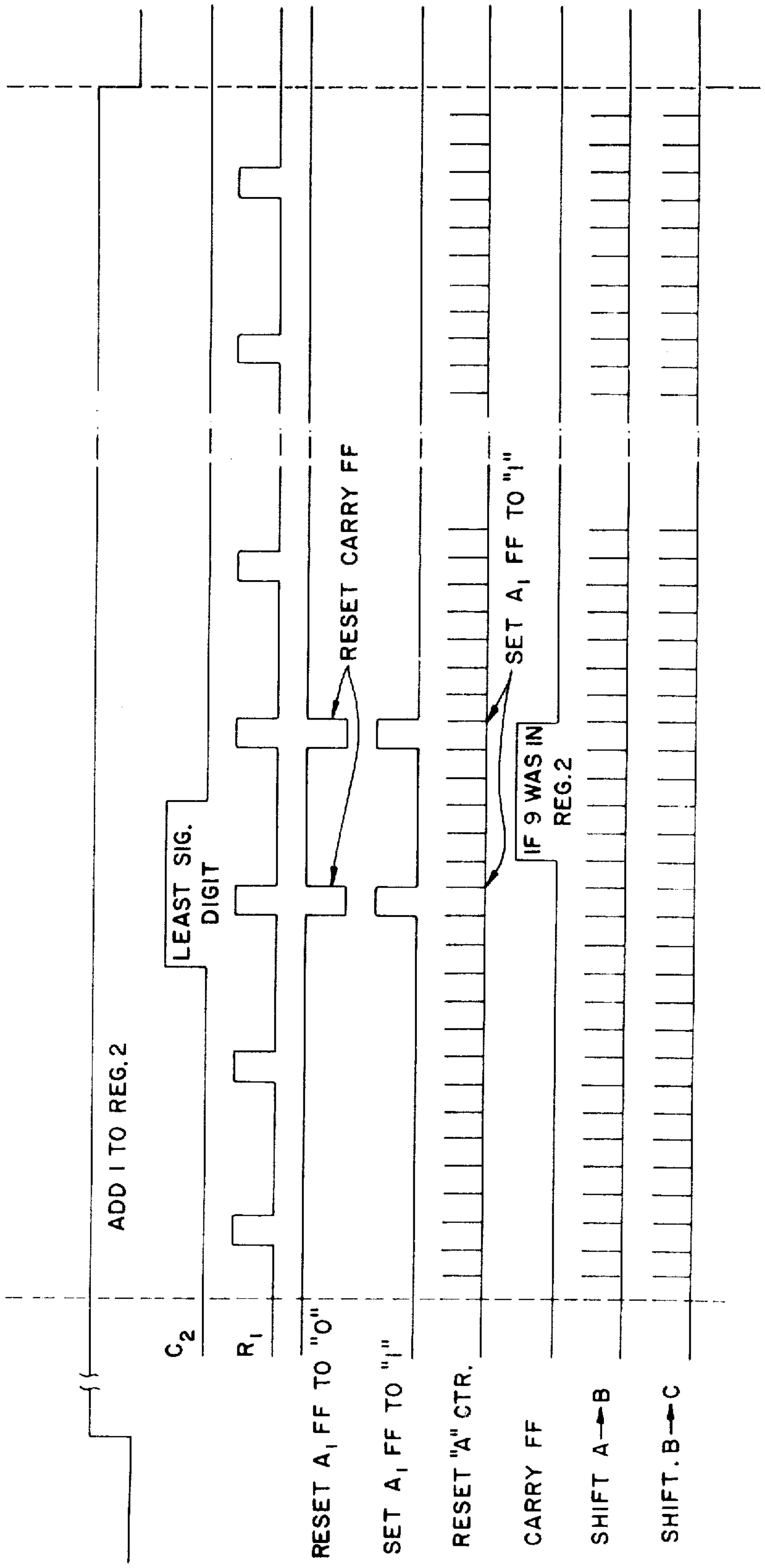
Figure 362:
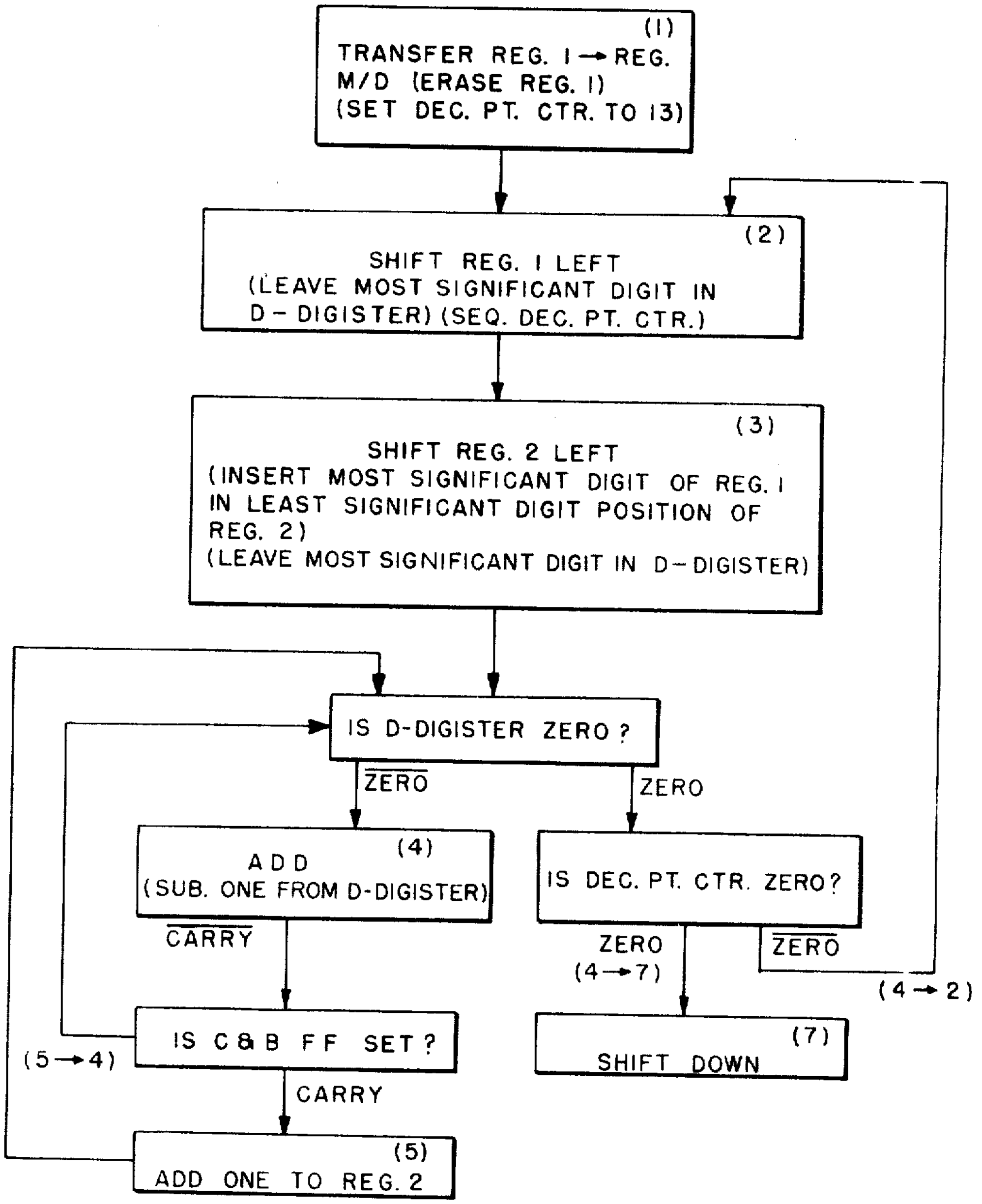
Figure 363:
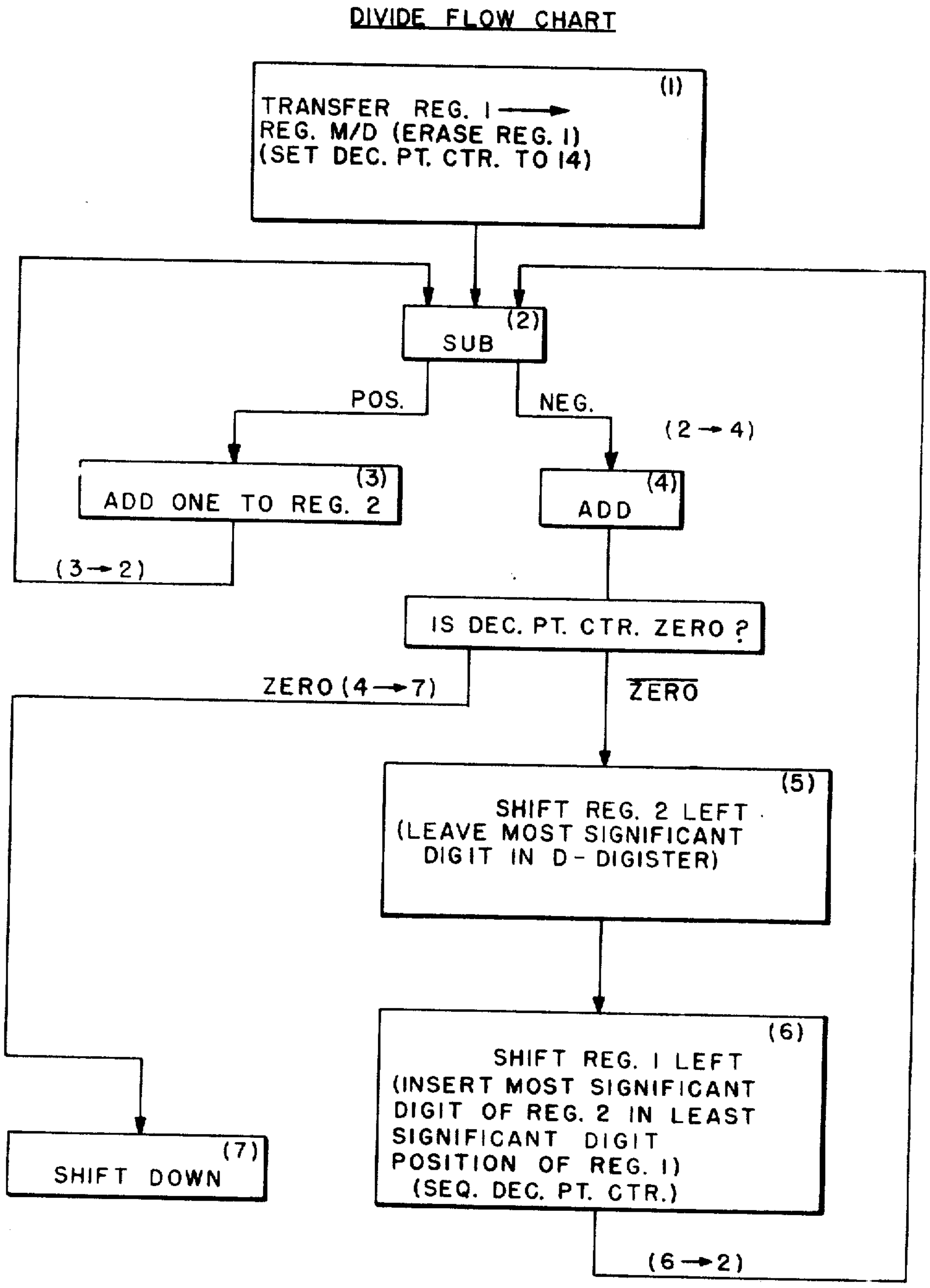
Figure 370:
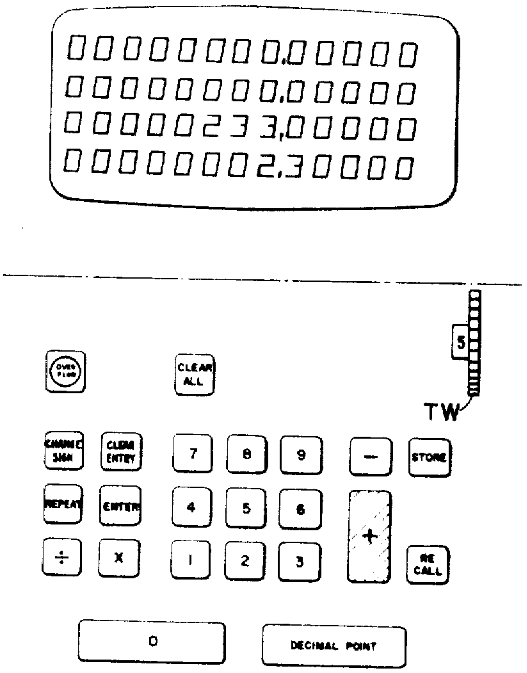
Figure 371:
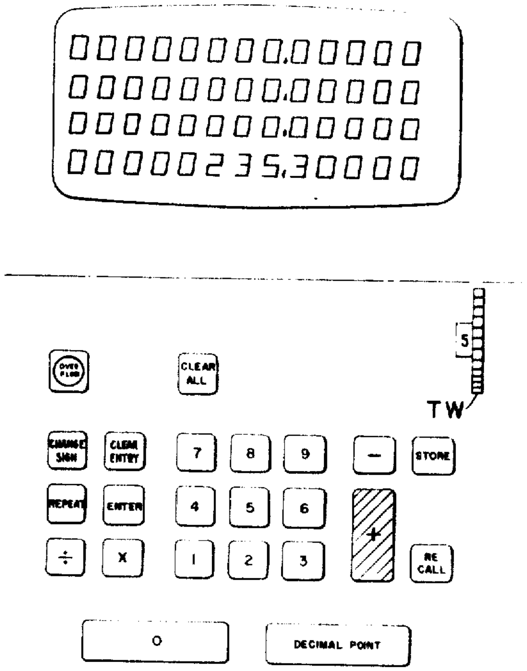
Figure 322:
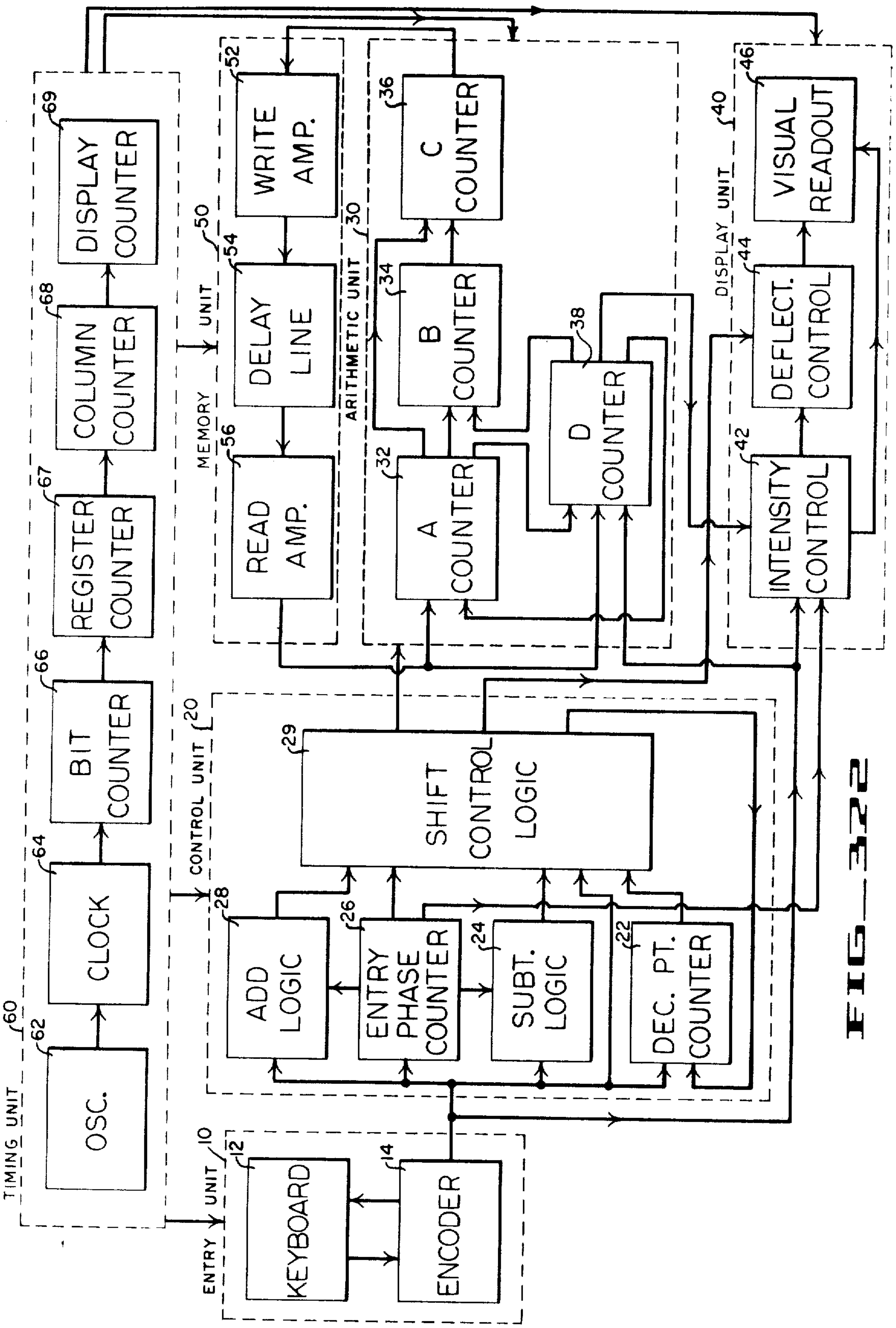

FIGS. 225 through 294 constitute a circuit diagram which may be employed for explaining the preferred form of the invention described herein;

FIGS. 295 and 296 show tabulations of digister operation;

FIGS. 297 through 313 constitute the logic diagram used for explaining the operation of the present embodiment;

FIG. 314 is a partial plan view of a typical printed circuit board of the type on which the circuits shown in FIGS. 225 through 294 are constructed;

FIGS. 315 and 316 show a partial view of a mother board;

FIG. 317 is an elevational view of the present embodiment illustrating the construction of the card racks, etc.;

FIGS. 318 through 323 are views of several signal trains used for explaining the function of the present embodiment;

FIGS. 324 through 331 show gate symbols used in the logic diagram;

FIG. 332 shows a flip-flop symbol defining certain parts of a flip-flop outline;

FIG. 333 shows a schematic diagram of the compare signal generator used for explaining the block symbol shown in FIG. 312 of the logic diagram;

FIGS. 334 through 337 show typical displays of decimal point settings and numerical results upon display screen DS;

FIG. 338 is a segment display timing table;

FIG. 339 shows the sequence of segments making up a digit;

FIG. 340 shows the modification of the central stroke of the digit "3" as it will appear on the display screen;

FIG. 341 shows how the digit "7" is offset, as it will appear on the display screen;

FIG. 342 shows the digit "1" offset as it will appear on the display screen;

FIG. 343 is a block diagram to aid in the explaination of the operation of the present invention;

FIG. 344 is a view of the display screen and shows the cells where the digits of the various registers will appear;

FIG. 345 is a schematic diagram showing the configuration of pulse groups circulating around the delay line;

FIG. 346 is a tabulation showing the relationship between the field word of information circulating in the delay line and the information displayed upon the display screen of the present embodiment;

FIG. 347 is a table explaining how the display cell numbers and loop cell numbers are defined herein;

FIG. 348 shows in diagrammatic form the Compare Signal which selects two digit words to be displayed;

FIG. 349 shows the waveform used in explaining the Shift Left Register 1 operation;

FIG. 350 shows the waveform used in explaining the Shift Left Register 2 operation;

FIG. 351 shows the waveform used in explaining the Shift Down during Add and Subtract operations;

FIG. 352 shows the waveform used in explaining the Shift Down during Multiplication and Division operations;

FIG. 353 shows the waveform used in explaining the Shift Up operation;

FIG. 354 shows the waveform used in explaining the Shift Up during Repeat operations;

FIG. 355 shows the waveforms used in explaining the Store operation;

FIG. 356 shows the waveform used in explaining the Recall operation;

FIG. 357 shows the waveform used in explaining the Addition operation;

FIG. 358 shows the waveform used in explaining the Subtraction operation;

FIG. 359 shows the waveform used in explaining the Complement operation;

FIG. 360 shows the waveform used in explaining the Transfer 1→M/D (Erase Reg. 1) operation;

FIG. 361 shows the waveform used in explaining the operation of Adding One to Register 2;

FIG. 362 shows a Flow Chart for Multiplication;

FIG. 363 shows a Flow Chart for Division;

FIGS. 364 to 369 show a typical operation and results as shown upon the display screen;

FIGS. 370 and 371 show a typical addition and retrieval operation, the several factors appearing upon the display screen as it would appear to an operator; and FIG. 372 is a simplified block diagram of the novel calculator.

9. SYNOPSIS

The device of the invention may best be understood by first becoming acquainted with the block diagram shown in FIG. 343.

As shown in this figure, the device of the invention may be seen to comprise six principal units, viz., the Timing Unit (TU), the Entry Unit (E/U), the Control Unit (C/U), the Arithmetic Unit (A/U), the Display Unit (D/U), and the Memory Unit (M/U). It will be understood, however, that the dichotomy between these units is not so clear or definite as might be implied from the block diagram of FIG. 343 since, for instance, one of the counters employed in the arithmetic unit is also employed as the digit store of the display unit. Also, the interconnection lines shown in FIG. 343 are merely generally suggestive of the existence of information transfer channels, and do not carry the implication that one such interconnection line necessarily represents a single wire, or cable, or that the information transferred along such an interconnection is necessarily unidirectional, or bidirectional.

T/:U The Timing Unit comprises a chain of flip-flops, or flip-flop counters, driven through their cycle by an oscillator, the output of which is gated to the complement input of the first flip-flop of the chain. The Timing Unit also includes a plurality of gates which, having inputs taken from outputs of selected flip-flops of the chain, produce output signals indicating the occurrence of certain significant time periods constituting particular phases of the operation of the embodiment described.

E/U: The Entry Unit comprises a plurality of switches actuated by the digit keys, and the function keys, each of said switches being associated with signal generating means.

The switches and signal generating means associated with the function keys operate, inter alia, to set one or more function key storage flip-flops, or key storage flip flops, whereby the identity of the operation currently being performed is preserved throughout the cycle of its performance.

The switches, gates, and signal generating, or shaping, circuits associated with the digit keys operate to produce sets of signals upon a corresponding plurality of signal lines which, when applied to one of the digisters of the Arithmetic Unit, serve to transfer the number entered upon the keyboard into the Arithmetic Unit.

C/U: The Control Unit comprises a plurality of gates adapted to "interpret" the functions entered into the function keys, and to provide a series of signals which control the sequence of suboperations performed by the Arithmetic Unit upon the "field word" of information circulating around the 'loop" which includes the Arithmetic Unit and the Memory Unit, thereby carrying out the calculation indicated by the function key depressed. The Control Unit also includes Decimal Position Signal Generators I and II, though these two devices might well be thought of as comprising a part of the Entry Unit, as noted hereinabove. The Entry Phase Counter, which orders the sequence in which the steps involved in performing arithmetic and other functions are carried out, is included in the Control Unit, as is the Decimal Point Counter, which, in co-operation with the aforementioned Decimal Position Signal Generators, takes part in the automatic decimal setting operation of the device of the invention.

A/U: The Arithmetic Unit comprises a plurality of digit registers, or "digisters," and a plurality of controlling gates peculiarly associated therewith. Digister A is a sequenceable digister or up counter into which the successive "digit words," or "counts," from the Memory Unit are inserted in the performance of calculations. Digister B is an intermediate, non-sequenceable digister, or storage counter which temporarily stores numerical information passing from digister A or digister D to digister C. Digister C is a recedable digister or down counter from which numerical information in pulse-count, or unitary, notation is returned from the Arithmetic Unit to the Memory Unit. Digister D is a counter which is shared between the Arithmetic Unit and the Display Unit, being employed both in calculation, and as the digit store for the Display Unit.

D/U: The Display Unit comprises a cathode-ray tube, sweeping means for sweeping out a plurality of rectilinear-trace character rasters arranged in a multi-row display raster upon its face, and blanking means responsive to the number stored in the D digister for blanking selected strokes in selected ones of said character rasters, thereby producing a numerical display of the information circulating in the loop.

M/U: The Memory Unit comprises an acoustic delay line having a delay of approximately five milliseconds, means for "launching" pulses thereupon, and means for receiving, amplifying, and shaping pulses derived therefrom. As noted hereinabove, the pulses for actuating said launching means are derived from the C-digister of the Arithmetic Unit, while the pulses received from the delay line, amplified, and shaped are inserted into the Arithmetic Unit by sequencing into the A-digister.

10. CONVENTIONS

The following symbology and nomenclature has been adopted to facilitate the study of the instant specification and drawings.

10.1. Signal Symbols

For convenience in discussion, the occurrence of certain potential levels, abrupt changes of potential level, and sequences of such changes are hereinafter designated as follows:

(a) The existence of the more positive of two binary potential levels upon a line is hereinafter called a "positive level signal," or "PL-signal."

(b) The existence of the more negative of two binary potential levels upon a line is hereinafter called a "negative level signal," or "NL-signal."

(c) The occurrence of an abrupt change from the more negative to the more positive of two potential levels upon a line is hereinafter called a "positive-going transition signal," or "PT-signal."

(d) The occurrence of an abrupt change from the more positive to the more negative of two potential levels upon a line is hereinafter called a "negative-going transition signal," or "NT-signal."

(e) A PL-signal, its immediately preceding PT-signal, and its immediately following NT-signal, taken together, are hereinafter called a "positive pulse signal," or "PP-signal."

(f) A NL-signal, its immediately preceding NT-signal, and its immediately following PT-signal, taken together, are hereinafter called a "negative pulse signal," or "NP-signal."

Figure 2:
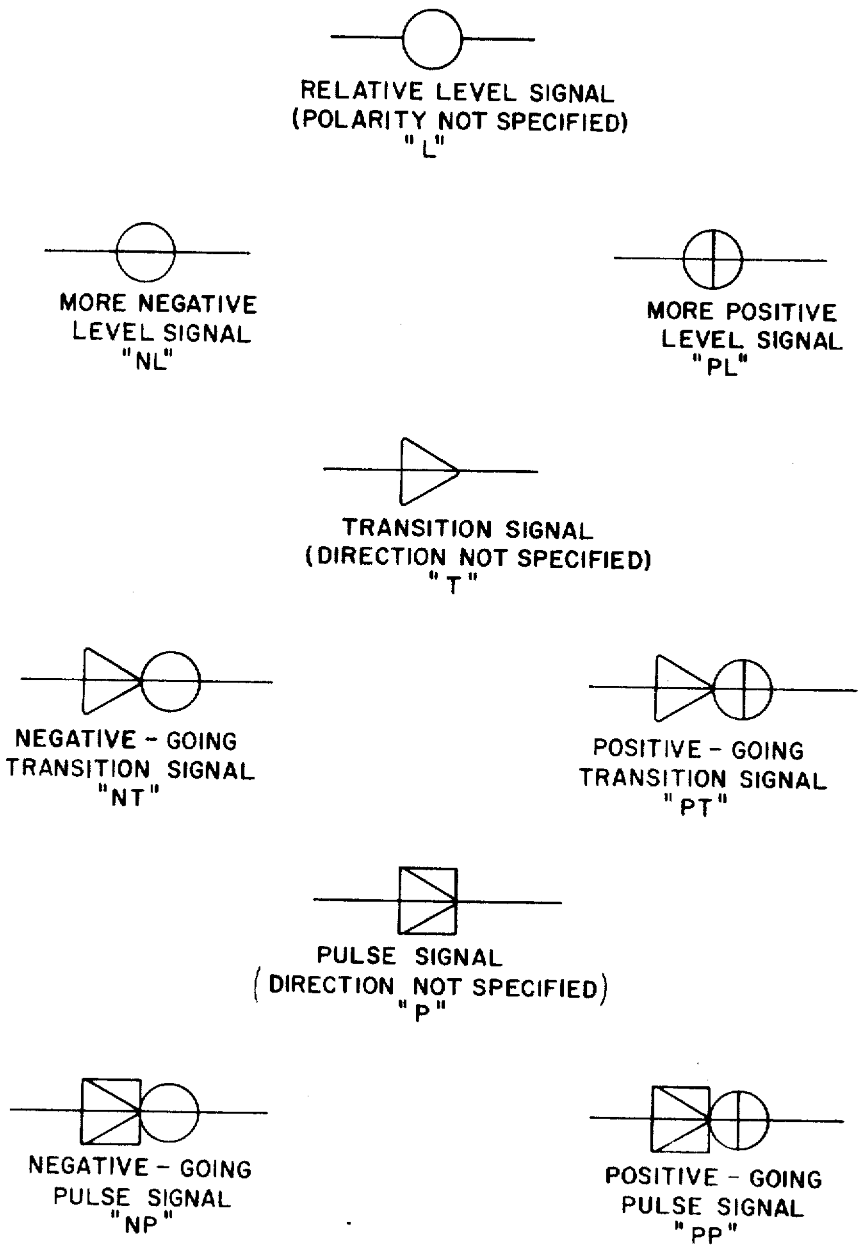
FIG. 2 illustrates the signal symbols used to denote electrical signal levels, abrupt changes of such signal levels, and sequences of such changes.

The nine symbols illustrated in FIG. 2 are hereinafter designated "signal symbols."

Each of these signal symbols denotes one, or more, of the signals defined immediately hereinabove.

Thus, the upper left-hand or NL, symbol signal of FIG. 2 denotes an NL-signal as defined in paragraph b above.

Similarly, the upper right hand signal symbol of FIG. 2 denotes a PL-signal.

The uppermost signal symbol on FIG. 2 denotes either a PL-signal or an NL-signal, but not both.

The middle figure in the left-hand column of FIG. 2 denotes an "NT-signal."

Similarly, the middle symbol in the right-hand column of FIG. 2 denotes a PT-signal.

The middle signal in the middle column of FIG. 2 denotes either an NT-signal or a PT-signal, but not both, and will hereinafter be designated a "T-signal symbol," or "T-symbol."

The lower signal symbol in the left-hand column of FIG. 2 denotes an NP-signal.

The lower signal symbol in the right-hand column of FIG. 2 denotes a PP-signal.

The lower signal symbol in the middle column of FIG. 2 denotes either an NP-signal or a PP-signal, but not both, and will hereinafter be designated a "P-signal symbol," or "P-symbol."

The horizontal line extending through each of the signal symbols of FIG. 2 and beyond, both to the right and to the left, represents an electrical interconnection line of the type found at many places throughout the drawings. The signal symbols of FIG. 2 will most frequently appear herein superposed upon the electrical interconnection lines of the drawings in the manner indicated by their superposition upon these short, horizontal lines in FIG. 2.

One of these signal symbols taken alone constitutes merely a partial statement, such as "A positive pulse signal occurs upon this line when . . . ," or "A positive level signal at this terminal is called the . . . ." For this reason, each of these signal symbols must have associated with it a legend, symbol, or the like, which gives significance to the signal symbol, i.e., completes the statement implied only in part by the signal symbol. The various ways in which these signal symbols are given significance by association with another symbol, a legend, or the like, are discussed in detail hereinafter.

The term "two binary potential levels," as used in the signal definitions above, refers to those two potential levels, either one or the other of which exists upon a binary information-carrying line at all times, except during very brief transition intervals. As example of such a binary information-carrying line is the FF· output line of the basic I flip-flop shown in FIG. 3. As may be seen from analysis of the wiring diagram of FIG. 3, the FF· line will carry one of two binary potential levels, viz., a potential level near ground when the left-hand transistor is conducting, or a negative potential level when the left-hand transistor is cut off.

The expressions "more positive," and "more negative," as used hereinabove, do not imply that either one of said two binary potential levels is specifically negative, positive, or at ground.

The term "pulse" as used herein, unless otherwise indicated, refers to a signal on a binary information-carrying line, the potential upon which remains at one of its two binary potential levels for a shorter time than it remains at the other binary level. A "pulse," as defined herein, occurs upon such a line when its potential goes from the longer-time level to the shorter-time level, and returns to the longer-time level. The pulses upon a line on which the shorter-time level is the more positive are herein called "positive pulses" The pulses occurring upon a binary information-carrying line whose shorter-time level is the more negative are herein called "negative pulses"

The term "pulse," as used herein, includes those pulses having extremely short intervals between the transitions defining their beginning an end, i.e., those pulses which are referred to as "spikes."

In addition, since two adjacent transitions and the included fixed level interval of a square wave (i.e., a wave, or signal, which remains at both binary levels for equal intervals) are sometimes taken together and called a "pulse," this special definition of "pulse" will be adopted herein, but only when it is clear that no confusion would result from such practice.

10.2. Legends

Upon or closely adjacent to those lines of the drawings which represent electrical interconnections, or signal lines, there will be found a substantial plurality of legends, either spelled out in full words, or stated at least in part in the form of abbreviations.

Figure 244:
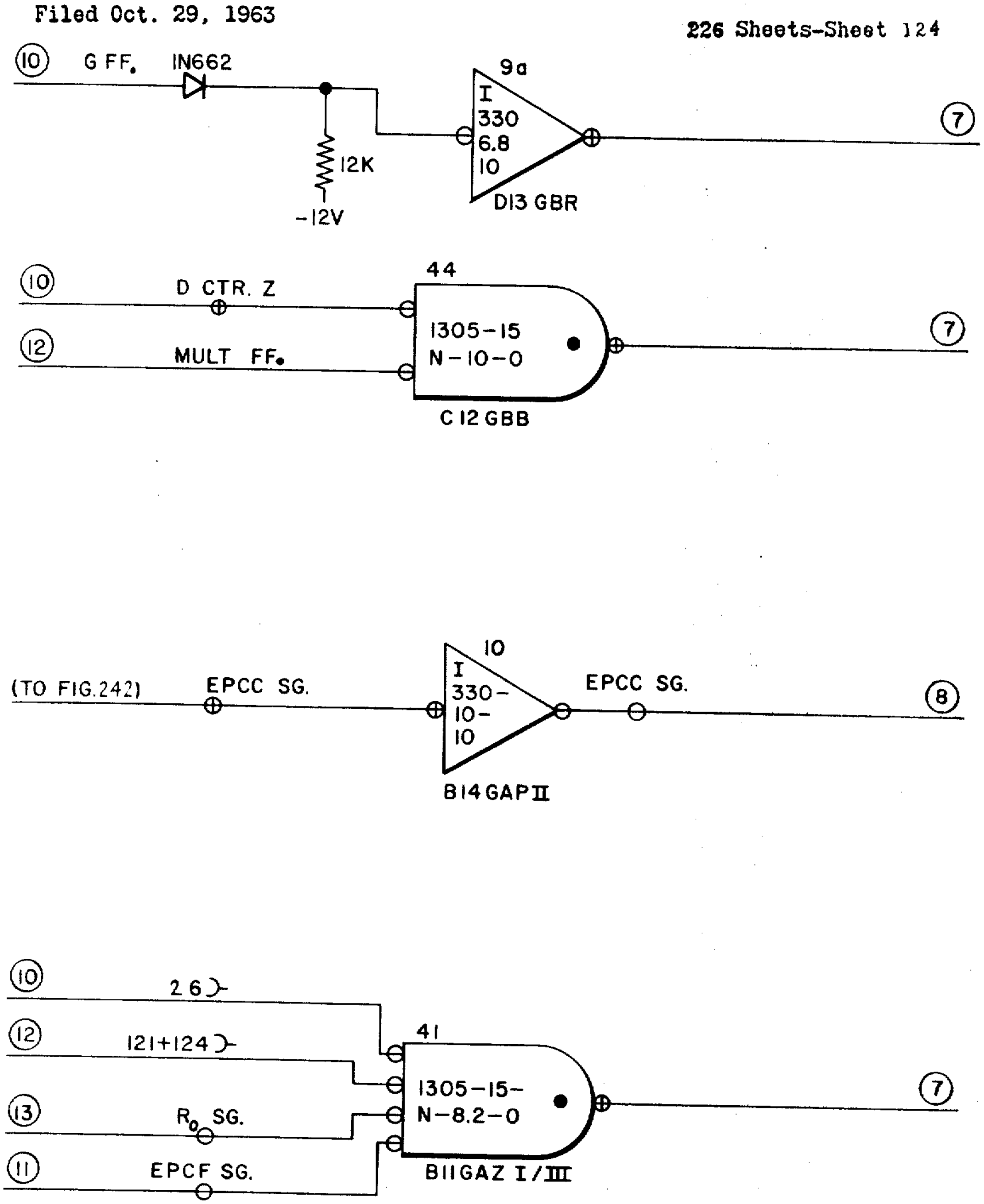

These legends serve to indicate the significance of certain associated signal symbols. For instance, some of these legends are so located with respect to a line that one-half of a signal symbol superposed upon the line is located between the legend and the line. An example of this practice is found in FIG. 244, where the input to inverter 10 has the legend "EPCC SG." written over it, and a PL-symbol is superimposed upon it directly under the legend, i.e., so that one-half of this PL-symbol is between the input line and the legend. Thus, the legend "EPCC SG." is associated with this PL-symbol, or completes the statement implied by the PL-symbol. A similar example of this practice can be seen upon the output line of the invertor 10.

This statement-completing association between a legend, a line, and a signal symbol may be indicated in other ways. Thus, where space is limited and clarity so requires, such a legend is located somewhat remote from its associated line and signal symbol and connected therewith by a lead line (with or without arrowhead as clarity dictates). An example of this practice may be found at the right-hand side of the block symbol shown in FIG. 197.

These legends are used to indicate the significance of their associated signal symbols in the sense in which the term "significance" is used hereinabove in defining the signal symbols.

Other means, however, are also used to define the significance of some of the signal symbols used herein, the method of employing legends constituting only one of the methods of giving operational significance to signal symbols.

A substantial plurality of the legends associated with various electrical interconnection lines in the drawings will be directly related to, and give significance to, signal symbols superposed upon those lines. However, other legends employed herein will not be related to signal symbols.

From above examples it may be seen that the legends associated with the various electrical interconnection lines of the drawings serve several different functions.

To this end, distinction is made herein between three classes of legends, and distinctive nomenclature, and symbology, are employed to identify the legends belonging to these classes.

10.2.1. Point Designations: The first class of legends recognized as distinct and treated separately herein is that class of legends which, when associated with an electrical interconnection line, indicate that the signal on that line is the same as, or differs only, say, by way of amplitude, from the signal derivable at the point designated by the legend. An example of such a point designation legend may be seen at the upper input of gate 105, shown in FIG. 278. The legend "G FF." will be found written upon the upper input terminal of gate 105. It should be noted that this legend is not associated with a signal symbol. Thus, this legend is merely the name of a point remote from this input terminal, viz the name of the lower, or "subdot," terminal of the flip-flop herein designated "G." The presence upon the upper input terminal of gate 105 of the name of this remote point (i.e., the lower terminal of the G flip-flop) indicates that the waveform of the signal derivable at the upper input of gate 105 is the same as the waveform derivable at the lower terminal of the G flip-flop, though, as will be apparent to those skilled in the art, the relative scale of the signal at these two points may differ, e.g., the more positive level ("PL") may be the same at both points, say, ground, but the more negative level ("NL") may be minus 12 volts at one point, and minus 6 volts at the other point. Thus, the waveform may be the same at the two points, while the relative scale, or absolute electrical magnitude of the signals, may differ as between the two points. This may result, for instance, from the fact that these two points are not coupled by a direct, i.e., substantially zero impedance, connection, but are coupled by means of, say, an emitter follower which changes the relative scale, or ground reference level, of the signal at one point with respect to that at the other without altering the waveform, or waveshape.

For convenience, the practice is adopted herein of designating points which are either; (a) directly interconnected by substantially zero impedance means, or (b) connected by means of elements which cause the same waveshape to appear at one point as at the other, though the relative scale, or ground level, may vary between the two points, as "logically connected." Thus, reverting to gate 105, the upper input terminal of gate 105 may be said to be logically connected to the lower output terminal of the G flip-flop, though it is not evident from inspection of FIG. 278 whether the upper terminal of gate 105 is directly connected to the lower output terminal of the G flip-flop, or connected thereto by means of intermediate elements which may alter relative levels, but which do not alter the waveshape.

The practice of employing point designation legends to indicate the logical connections of the flip-flop output terminals to other circuit points is extensively employed herein, the form of legend and its application to the associated line shown in connection with the inputs of gate 105 being uniformly employed throughout.

Figure 245:
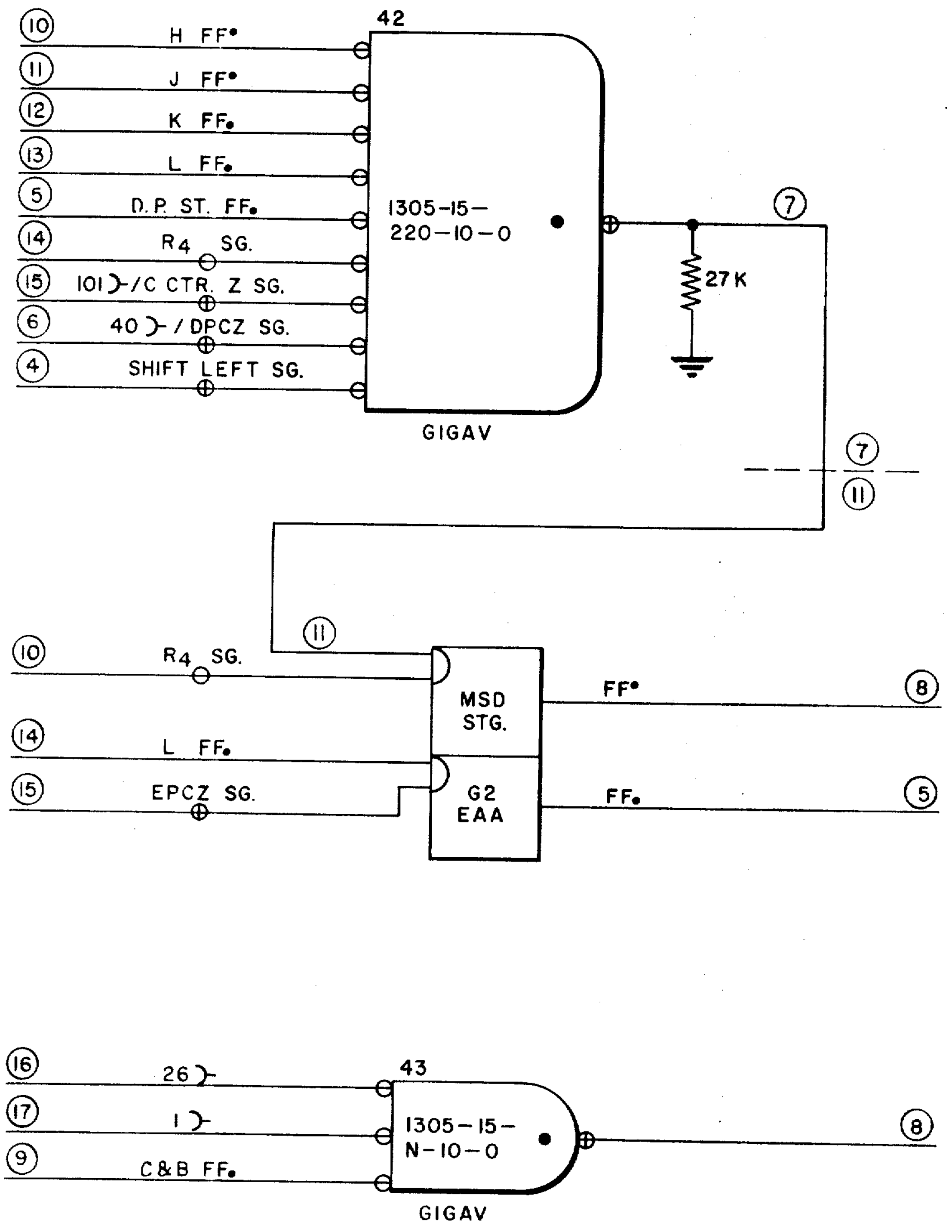

An additional type of point designation legend extensively employed herein is that used to indicate lines which are logically connected to the outputs of gates. An example of the symbology used for this purpose will be found at the upper input terminal of gate 43, shown in FIG. 245. Upon the upper input terminal of gate 43 will be found the number "26" followed by a symbol comprising a rightwardly-arched semicircle having a horizontal straight line extending from its center a distance to the right approximately equal to the radius of the semicircle. This symbol will herein be designated the "gate output symbol." The meaning of the legend on the upper input terminal of gate 43, then, is that that terminal is logically connected to the output of gate 26. Similarly, it may be seen that the middle input terminal of gate 43 is logically connected to the output terminal of gate 1.

Figure 259:
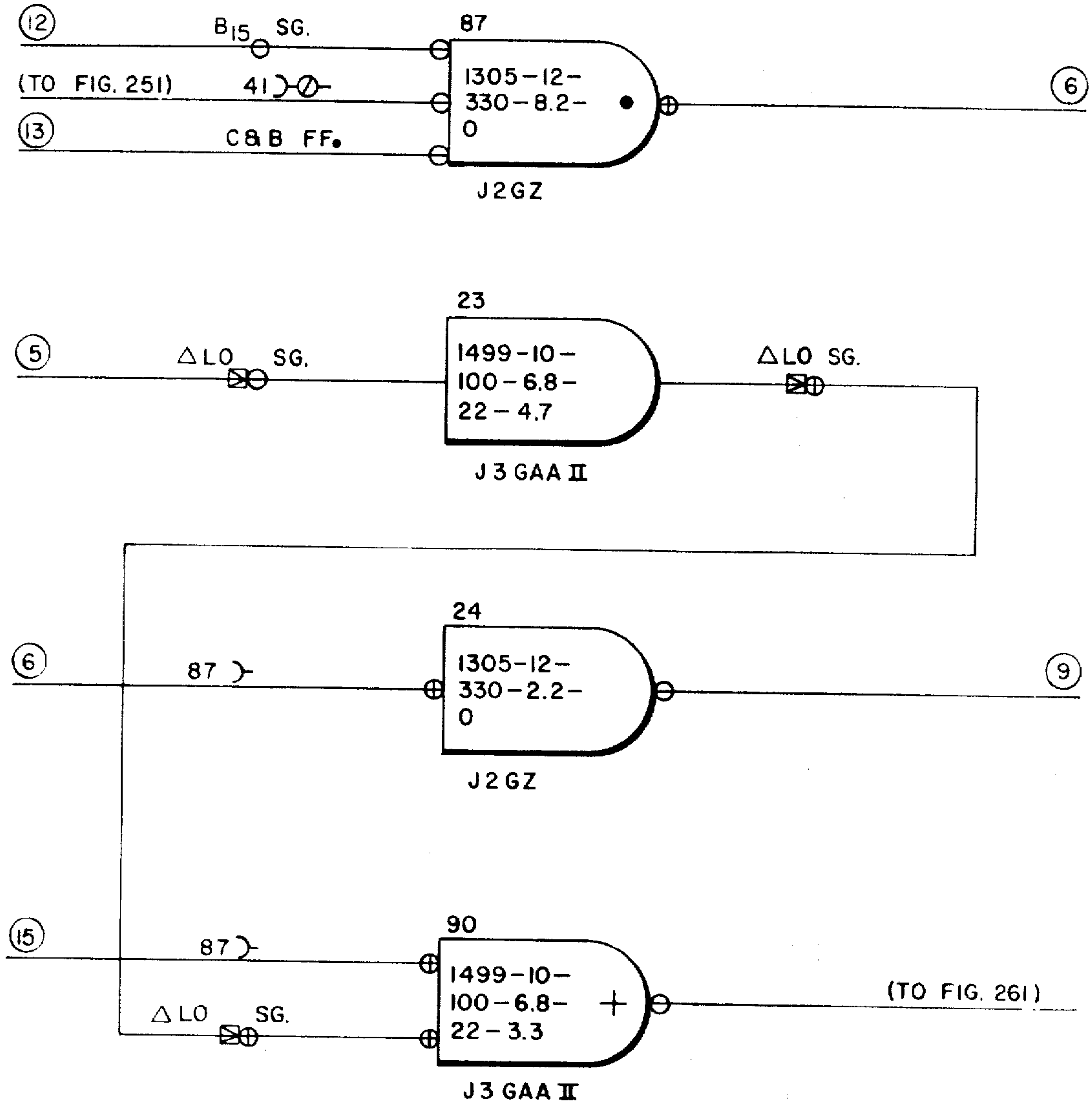

An additional convention relating to logical connections from gate outputs may be seen at the middle input terminal of gate 87, as shown in FIG. 259. On the middle input of gate 87 is shown the numeral "41" and the gate output symbol, but in addition, a circle with a diagonal line struck through it and an additional horizontal line is added to the gate symbol. This entire symbol is referred to herein as the "inverted gate symbol." The meaning of the inverted gate symbol, in the example of gate 87, is that the middle input terminal is logically connected to the output of an inverter, which is itself connected to the output of gate 41. As with the other "logical connections" referred to hereinabove, it should be borne in mind that the inverted gate symbol does not imply that merely one inverter is inserted between the output of gate 41 and the middle input of gate 87, but rather implies that the waveform on the middle input terminal to gate 87 is an inversion of the waveform derivable at the output of gate 41.

Finally for a thorough understanding of this notation, reference should be had to the input terminal of inverter 24, as shown in FIG. 259. In addition to the gate 87 output symbol found upon the input to inverter 24, there is also found a PL-symbol which is tangent to the straight left-hand edge of the inverter symbol. This PL-symbol is not related to the gate 87 output symbol, but serves, along with other signal symbols tangent to the inverter symbol, to define the nature of the inverter in the manner which will be described in detail hereinafter. Thus, those signal symbols located on terminal lines, and tangent to, gate symbols, flip-flop symbols, or other block symbols, should be disregarded when construing legends placed upon these terminal lines.

Figure 239:
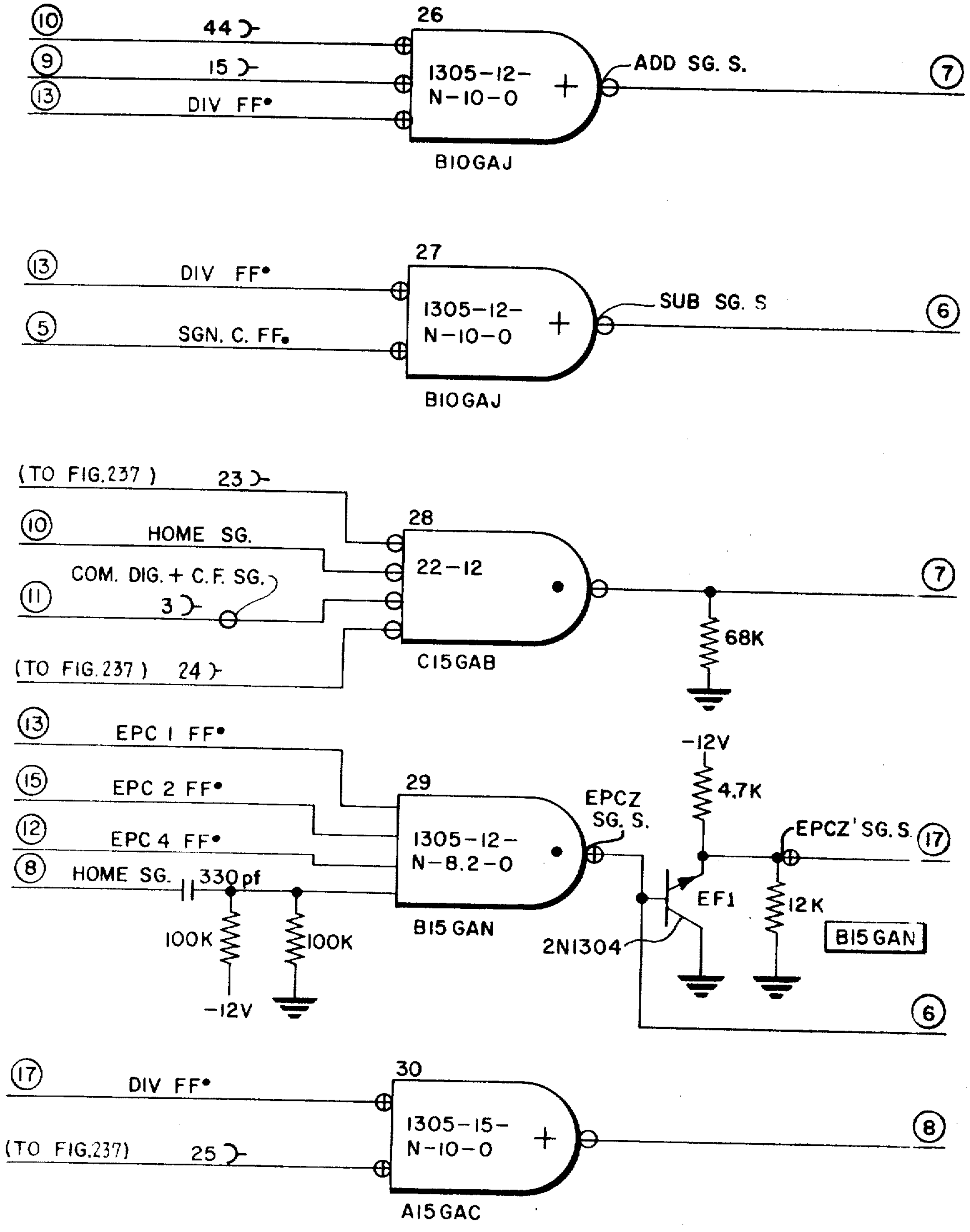

10.2.2 Named Signal Designations: The second class of legends which are treated as separate and distinct herein are those legends which constitute the name of a signal, e.g., the PL-signal, or the PP-signal, occurring at a point, rather than simply the name of a point, and are called "named signal legends." These signals are designated by unique names specially assigned thereto. The points at which these named signals originate (listed in table SS, Appendix M) are identified in the drawings by named signal source legends which comprise, first, the name of the signal, and, second, the abbreviation "SG. S.". In this abbreviation, "SG." stands for the word "signal," while "S." stands for "source." Thus, these points are identified as the sources of the named signals. For example, the output of gate 29, FIG. 239, is indicated as the "EPCZ SG. S.", i.e., the EPCZ signal source. The legend "EPCZ SG. S." occurs nowhere else in the drawings but at the output of gate 29. Thus, the EPCZ signal is identified as the PL-signal occurring at the output of gate 29, and that signal alone.

The waveform appearing at a named signal source may be found inverted at some remote location in the drawings. The occurrence of the named signal will be manifested at this remote location by a signal of opposite sign. For instance, if the named signal is a PL-signal, the simultaneous signal at said remote location will be an NL-signal. If a PT-signal, the remote signal will be an NT-signal, etc.

For this reason, a named signal legend may have the same signal symbol as that of its named signal source, or a signal symbol of opposite sign.

Figure 237:
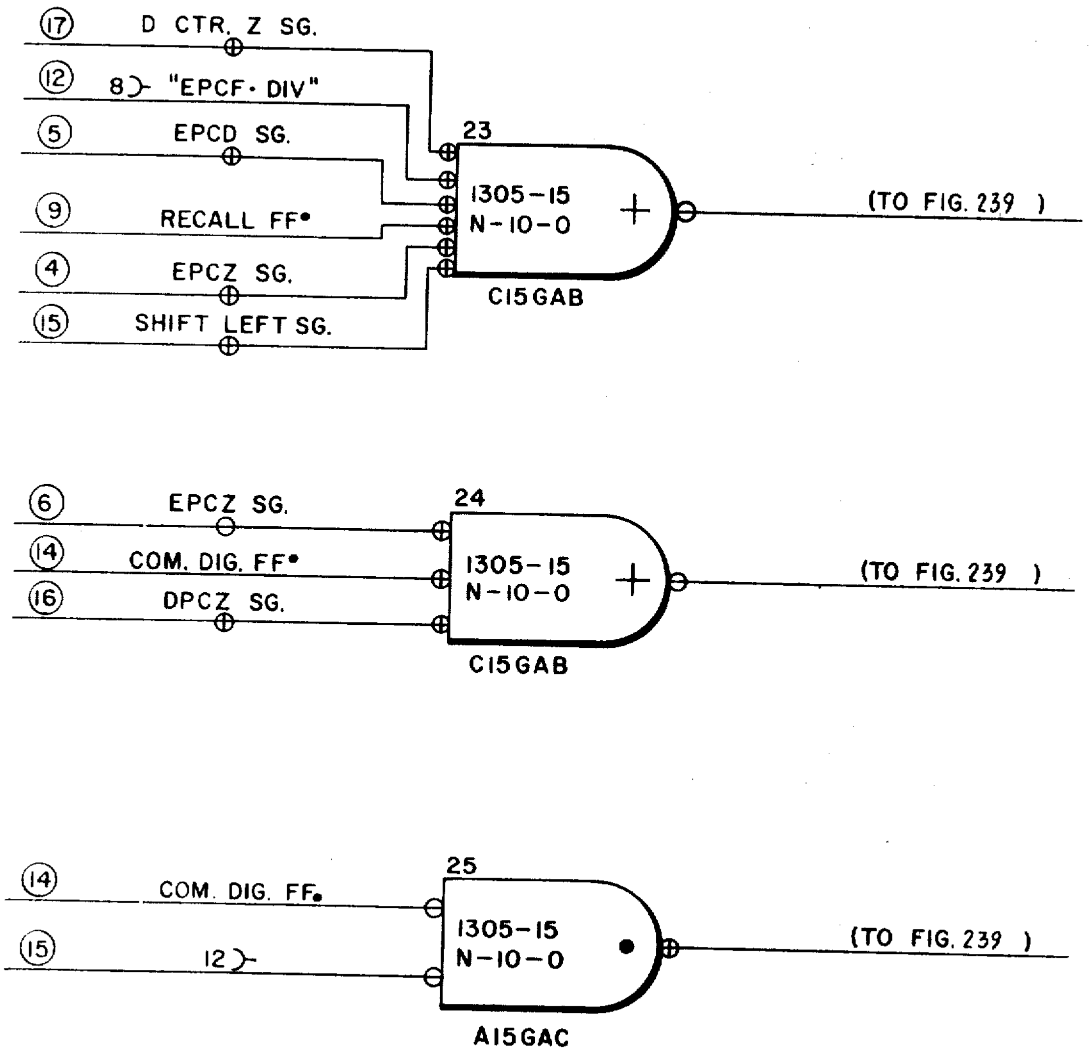

As an example of this, it will be found that the upper input terminal of gate 24, FIG. 237, carries the legend "EPCZ SG." directly over a NL-symbol superposed upon the input line. The EPCZ signal source (output of gate 29), as will be remembered from the example directly above, has a PL-signal symbol located thereat. Thus, it may be seen that the symbol associated with the named signal legend at the upper input of gate 24 is opposite in sign from the signal symbol associated with the source (output of gate 29). This indicates that the signal at the input of gate 24 has a waveform which is the inverse of the named signal waveform, i.e., the EPCZ signal which occurs at the output of gate 29. Put differently, the opposite signs of these signal symbols indicate that the occurrence of the named signal (PL) is indicated at the upper input of gate 24 by an NL-signal.

On the other hand, gate 23, FIG. 237, carries the legend "EPCZ SG.", and has associated with it the same signal symbol as the signal symbol associated with the EPCZ signal source. From this it may be seen, in accordance with the system of conventions employed herein, that the signal on this input of gate 23 will have the same waveform as the named signal, i.e., the signal at the EPCZ signal source, i.e., a PL-signal at gate 23 will accompany each PL-signal at the EPCZ SG. S.

When named signals are defined at their sources by transition, or pulse, signal symbols, the same convention applies. For example, the occurrence of the PP-symbol at the output of the reset signal generator, FIG. 227, and also at the lower, right-hand input of the EPC4 flip-flop, FIG. 238, both accompanied by a legend comprising at least in part the expression "RESET SG.", indicates that the signal occurring at the output of the Reset Signal Generator, which is named the RESET signal, also occurs at said input of the EPC4 flip-flop, taking the form of a positive-going pulse at both the reset input to the flip-flop and the output of the reset signal generator.

10.2.3. Assertions: The third class of legends recognized and treated as distinct herein is the class of legends which, though sometimes in abbreviated form, are statements, or assertions, about the state, or condition, of a device or sub-circuit, rather than names of electrical signals or points in the systems shown in the drawings. These assertion legends, or assertions, are most usually employed herein to indicate electrical conditions occurring within the circuit portion of the device of the invention in response to the manipulation of function keys, or switches, constituting part of the keyboard. Each of these assertion legends is associated with a signal symbol, either by means of a lead line from the assertion legend to the associated signal symbol, or by the fact that the associated signal symbol is superposed upon the interconnection line in such a way that one-half of it is located between the assertion legend and the line. In each such case, the signal symbol indicates the "electrical truth value" of the assertion. That is, the signal which will be present upon its line during the time when the associated assertion is true. An example of this may be found at the top of FIG. 225 upon the upper output line of the Function Signal Generator. The legend located directly above this upper output line is "CLR. ALL KD." On the upper output line directly below this legend is found a PL-symbol, which is the signal symbol associated with this legend. The expression "KD" is used herein to mean "*** key is depressed." Therefore, the meaning of this legend is the assertion that "The CLR. ALL key is depressed." The "electrical truth value" of this assertion, as defined hereinabove, is given by the PL-symbol located upon the output line. Thus, the meaning of the legend and signal symbol associated with the upper output line of the Function Signal Generator may be stated: "The more positive of two possible electrical signal levels appears upon this line when the CLR. ALL key is depressed." Similarly, the legend "ADD KD" and the associated PL-symbol found at the third input terminal from the top of the Function Signal Generator may be seen to have the same meaning as the following: "The more positive of two possible electrical signal levels appears upon this line when the ADD key is depressed." Similar meanings may be derived in a similar manner for all assertion legends herein which include the expression "KD." It should be noted at this point, by way of caveat, that the depression of the indicated keys leads the appearance of the accompanying "electrical truth signal" by approximately six milliseconds, because of the operation of the Common Key Signal Generator network as described hereinafter. Since, however, this six millisecond delay is negligible compared with the minimum key depression time of which a human operator is capable, and with the length of time during which the states of operation of the device of the invention brought about by key depression continue, these statements derived hereinabove, and derivable from the "KD" assertions, and their associated signal symbols, are true for the purpose of exposition of the overall operating principles of the device of the invention, and are so regarded herein.

In addition, the following assertion legend forms may be found herein:

The form "(*)BD," which is equivalent to the partial sentence "* is being displayed.".

The form "(*)BE," which is equivalent to the partial expression "* is being entered.".

The form "(*)TP," which is equivalent to the partial sentence "* is taking place.".

An example of another standard form of assertion legend is found upon the upper output terminal of Decimal Positions Signal Generator (I), which is shown in FIG. 227. Upon this upper output line is found the legend "P(5+9)P," which is located above a PL-symbol superposed upon the output line. The expression "P(*)P" is used herein to mean "The decimal point is in the * place." The "plus sign" in the legend is used, not in its arithmetic sense, but in its logical sense, and should be interpreted as "logical" OR. Thus, this legend, when taken in conjunction with its associated PL-signal symbol, is equivalent to the following sentence: "The more positive of two possible signal levels appears upon this line when the decimal point is in the 5th place or in the 9th place."

Figure 334:
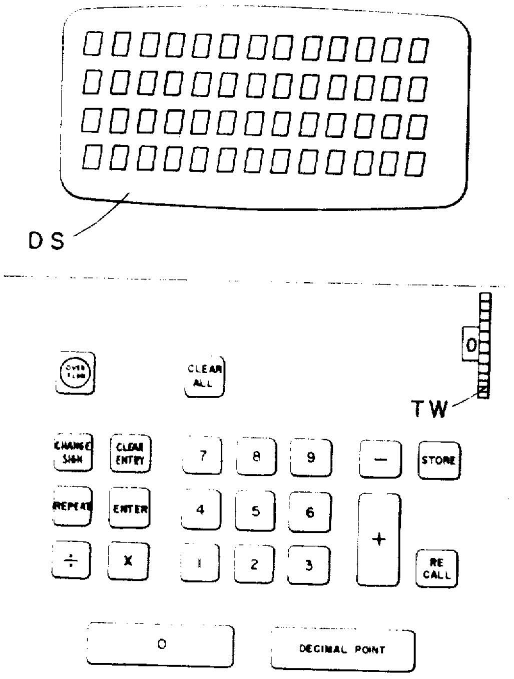
Figure 335:
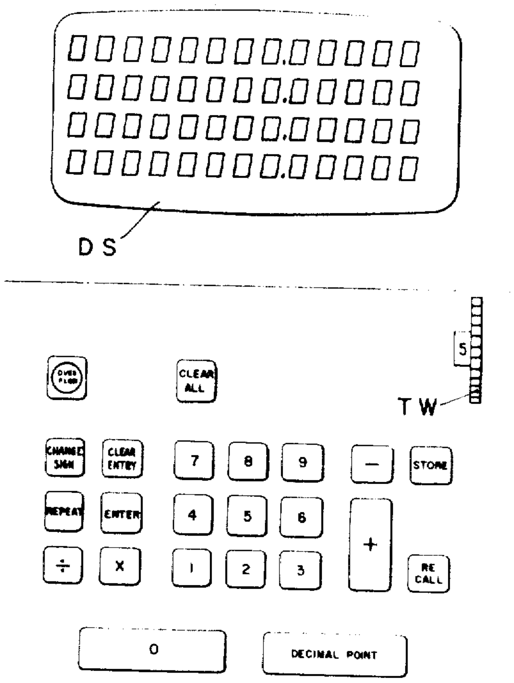
Figure 336:
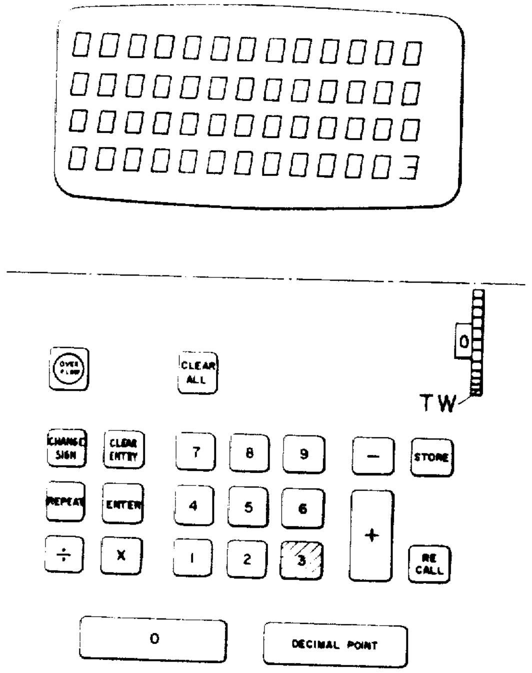
Figure 337:
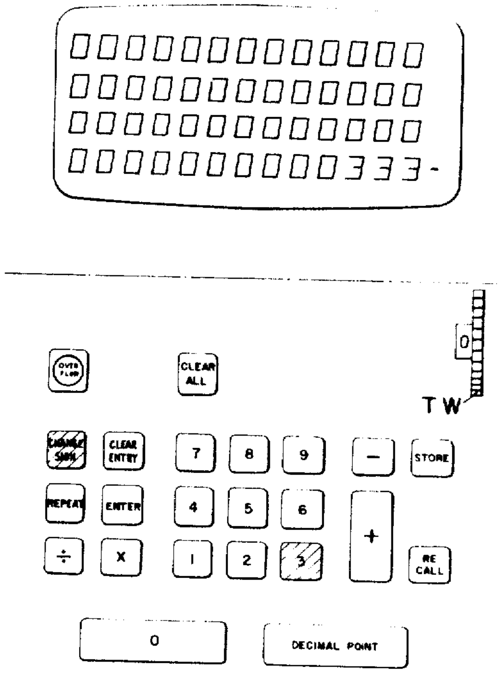

The expressions "place," and "decimal place," as used herein may be thought of as having meaning in connection with the four registers of thirteen orders which are displayed upon the cathode ray display screen means. For best understanding of these terms, reference should be had to FIG. 334, wherein a complete display constituting four registers of thirteen orders each, all filled with zeros, is shown within the oblong used schematically to define the area of the display screen DS. In this figure the decimal point setting thumbwheel TW is so set as to put the decimal point in each register in what is defined as the "0 place," as may be seen from the appearance of the zero in the "window" immediately to the left of thumbwheel TW. For this reason, no decimal point is shown in any of the 13-order registers on display screen DS. The decimal points may be thought of as being in the 0-place i.e., immediately to the right of the right-most column on the display screen DS, and suppressed so that they do not appear. In FIG. 335, by contrast, the decimal point setting thumbwheel TW is set in the decimal-point-in-the-fifth-place position, as may be seen from the appearance of the numeral "5" in the "window" immediately to the left of the thumbwheel. With this setting of the thumbwheel, the decimal points appear upon the display screen DS as shown in FIG. 335. That is, a decimal point appears in each register, the four decimal points being vertically aligned, and the vertical line of four decimal points being located to the left of the fifth column from the right of the display. It may be also said, of course, that the vertical line of decimal points appears to the right of the sixth column of digits from the right side of the display, but the most convenient way of remembering decimal point position as defined herein is to recall that the Nth decimal place is at the left of the Nth column of digits from the right-hand edge of the display. Thus defining the term "decimal place," and recalling the interpretation of the decimal place assertion legends, and associated signal symbols, as given above, it may be seen, for instance, that the decimal position assertion legend associated with the second output line from the top in Decimal Position Signal Generator (I) FIG. 190 may be interpreted to mean: "The more positive of two possible electrical signals appears upon this line when the decimal point is located to the left of the second column from the right on the display screen or when the decimal point is located to the left of the ninth column from the right on the display screen."

One additional form of assertion legend used at some places herein constitutes an assertion with regard to the state of a given flip-flop. Thus, the legend "F $FF_1$" located immediately above a PL-symbol upon an electrical interconnection line anywhere in the drawings indicates that that line at that point will carry a PL-signal at any time that the F flip-flop is "reset," and will carry an NL-signal whenever the F flip-flop is "set." On the other hand, the presence of the legend "F $FF^1$" immediately above a PL-symbol superposed upon an electrical interconnection line anywhere in the drawings will indicate that, upon that line, at that point, the more positive of two possible signal levels will exist when the F flip-flop is "set," and that the more negative of two possible electrical signal levels will exist, upon that line, at that point, when the F flip-flop is "reset."

As shown upon the output leads of Decimal Position Signal Generator (I), (see FIG. 227), the convention is employed herein of separating legends from mere identification codes, e.g., DPI*a*, by a slant mark. This same convention of using a slant mark is employed herein at many places to separate legends from each other.

10.3. Block Lead Designations

To facilitate the study of the instant application the practice is adopted throughout of identifying the leads of block symbols by means of lower case alphabetic letters assigned in the following manner:

First, a lead is selected which is to be designated "*a*." Wherever possible, this "*a*" lead is the uppermost lead on the right-hand edge of the block symbol. However, when assigning block lead designations to a block symbol which is so shaped that its right-hand edge is not clearly and unmistakably identifiable, then a lead located generally in the upper, right-hand corner of the block symbol is arbitrarily designated "*a*."

Second, the succeeding lower case letters, "*b*," "*c*," ****, are successively assigned to the remaining leads of the block symbol, passing clockwise therearound, i.e., so that the lead next below "*a*" in a clockwise direction along the outline (a lead on the right-hand edge of the block symbol, if any) will be designated "*b*," etc.

Figure 182:
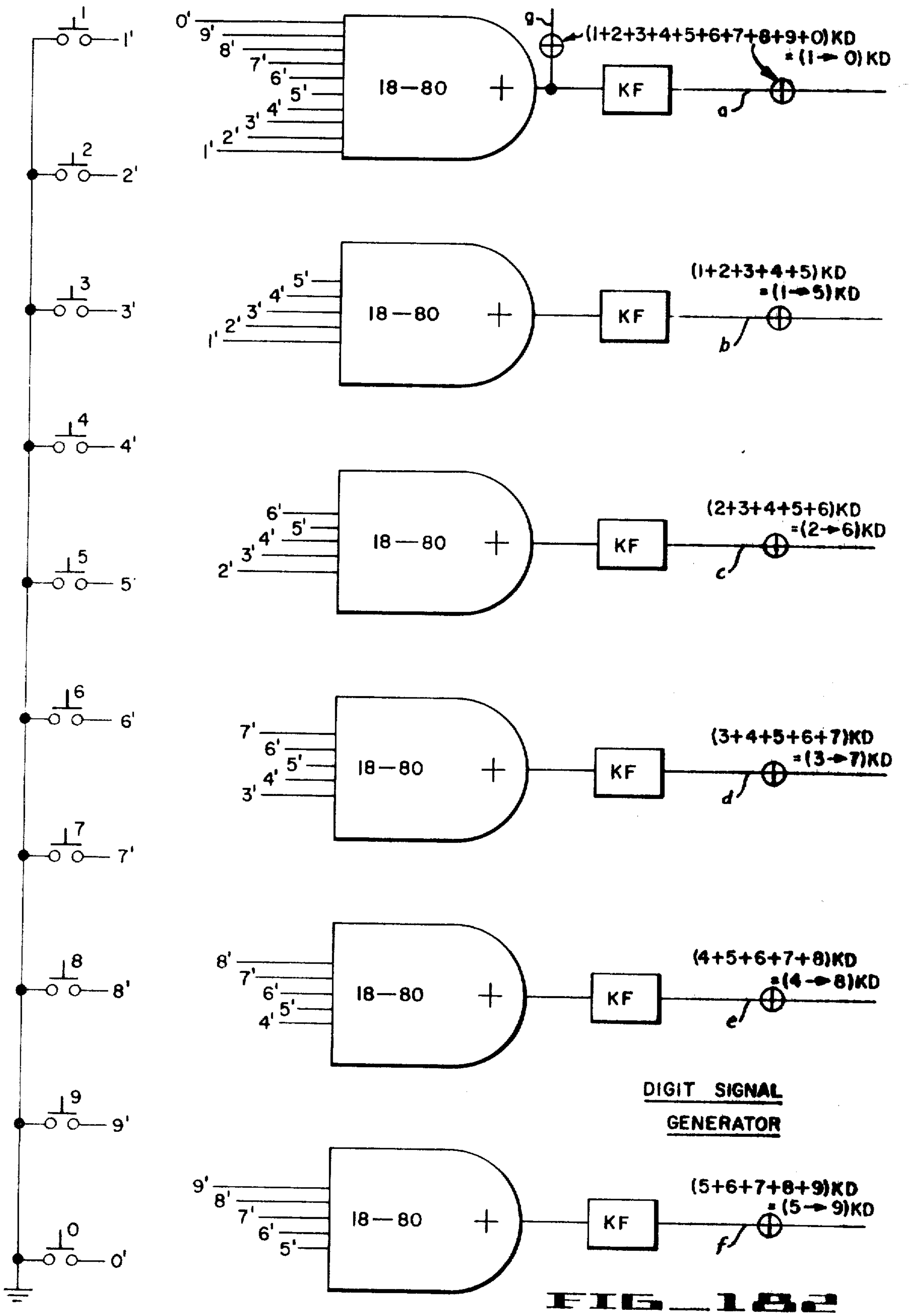
FIG. 182 shows the circuit of the digit signal generator of the instant embodiment, used for making numerical entries therein.
Figure 183:
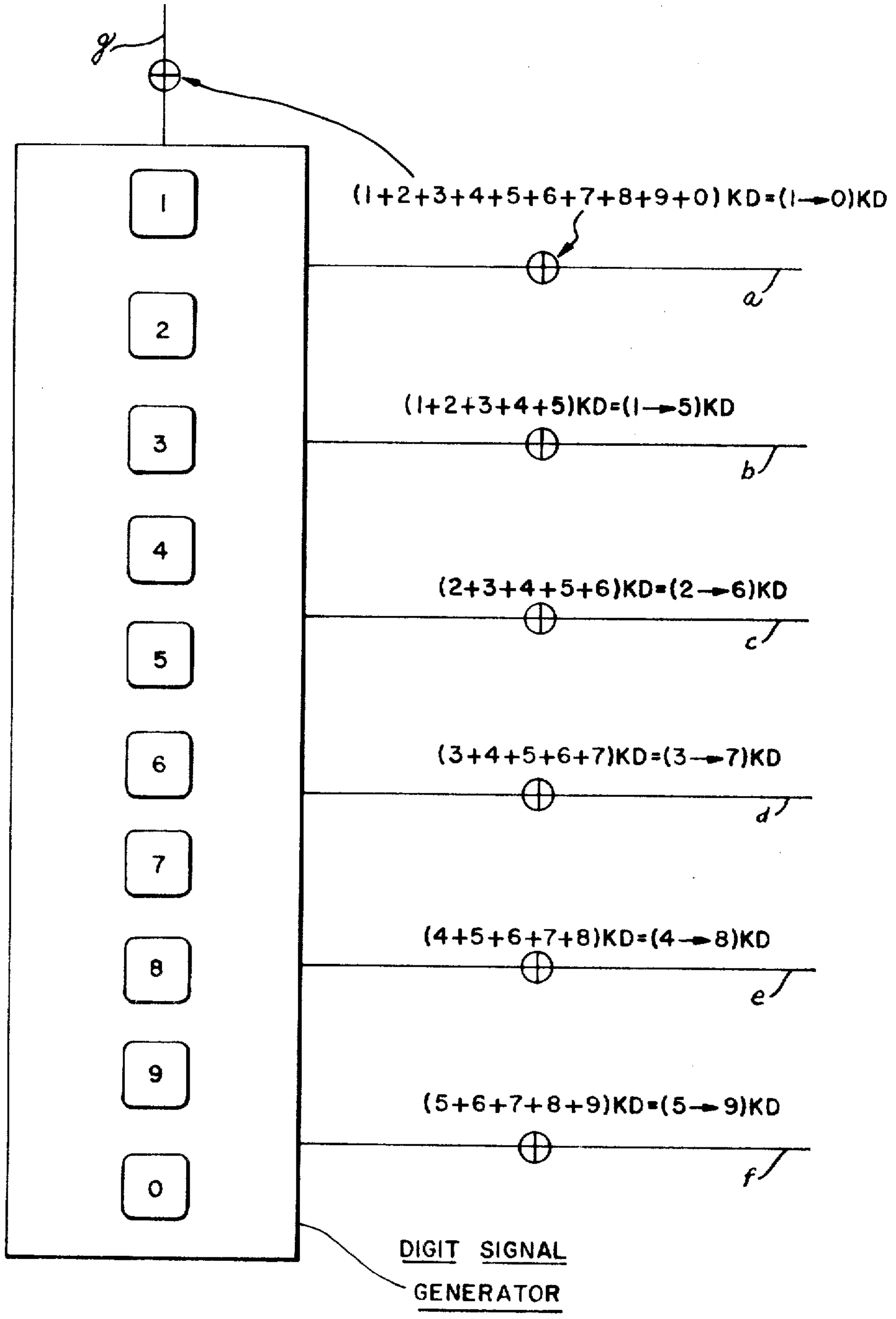
FIG. 183 shows the block symbol used to represent the digit signal generator in the circuit diagram herein.

An example of this practice may be found in FIG. 183, and the application of this practice may be seen by comparison of FIG. 183 with FIG. 182, noting that the block lead designations assigned in FIG. 183 are employed to identify the corresponding leads in the schematic circuit diagram of FIG. 182.

Further, as may be seen in FIG. 183, only such ones of these block lead designating lower case letters are shown in the drawings as are required for clear explanation, the designations of the unlettered leads being deducible by traversing the outline of the block symbol from the "*a*" lead in the clockwise direction. Thus, the lowest lead on the right-hand side of the Digit Signal Generator block symbol of FIG. 183 is the *f* lead. Similarly, the third lead from the top on the right-hand side of the Digit Signal Generator block symbol of FIG. 183 is the *c* lead.

Thus, the lower case alphabetic letters are used herein to designate certain leads which are more conveniently designated with respect to the figures in which they are found, rather than in a series continuing throughout the drawings. Where, however, it is desired to designate block symbol leads as originating at a particular block symbol, then the particular lead to be so identified is designated by a reference which comprises an identifier for the block symbol itself, with the lower case alphabetic letter designating the lead following. An example of this practice is found in FIG. 206, wherein the lead departing from the lower edge of the block symbol is designated "DPII*a*," the term "DPII" identifying the block symbol at which this particular "*a*" lead orginates. Also, lower case letters are occasionally employed herein to co-identify items found within a single sheet in a manner not consonant with the above-described conventions, as in the sheet containing FIGS. 7, 8, 9, and 10, e.g., see "*d*" and "*q*."

11. EXPLANATION OF BLOCK SYMBOLS

To facilitate the study of the instant specification and drawings, those block symbols which are used frequently throughout the specification and drawings are described and explained in this section. However, certain block symbols which are used infrequently herein, e.g., in connection with only one subcircuit, or subsystem, are described and explained in other parts of the instant specification.

11.1 Flip-flops

The embodiment of the instant invention described herein comprises sixty-two flip-flops as listed in Table FF (Appendix L). Each of these flip-flops comprises a basic flip-flop, either flip-flop I or flip-flop II, and one or more dynamic gates. In addition, certain ones of these flip-flops comprise emitter followers, diodes, etc., as indicated hereinbelow.

Figure 3:
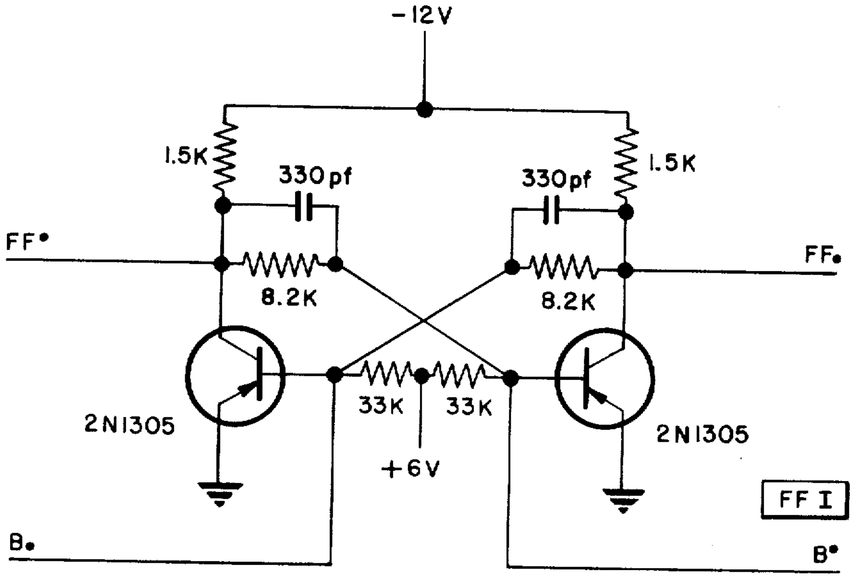
FIGS. 3 to 6 illustrate the basic flip-flop units, and the block symbols used to represent them, illustrating the composite flip-flops employed in the instant embodiment.
Figure 4:
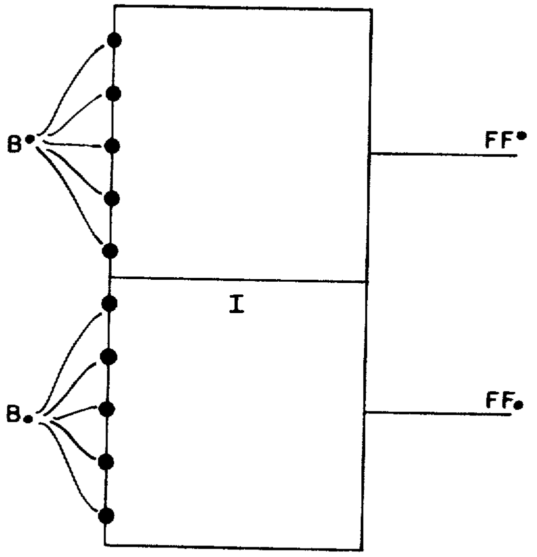
Figure 5:
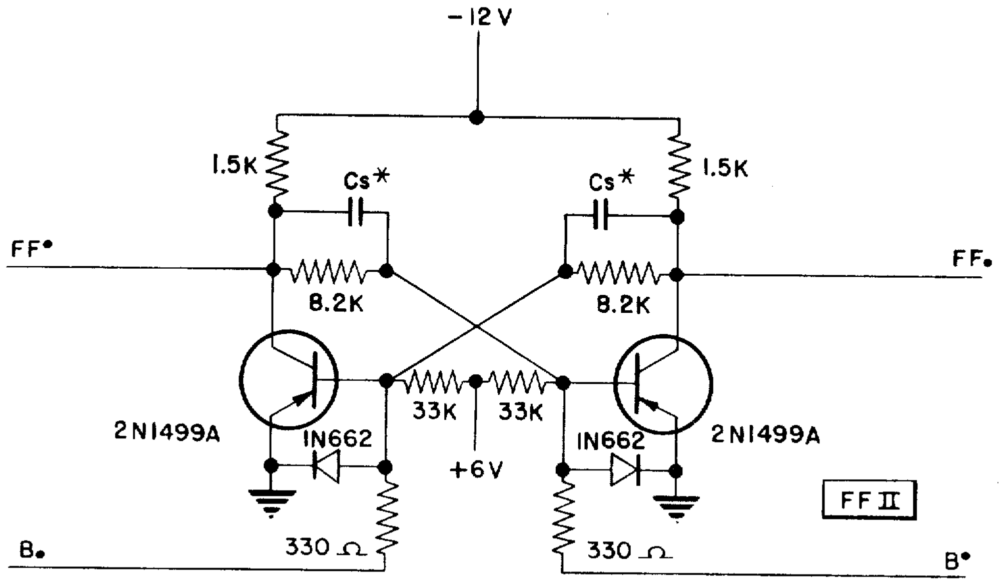
Figure 6:
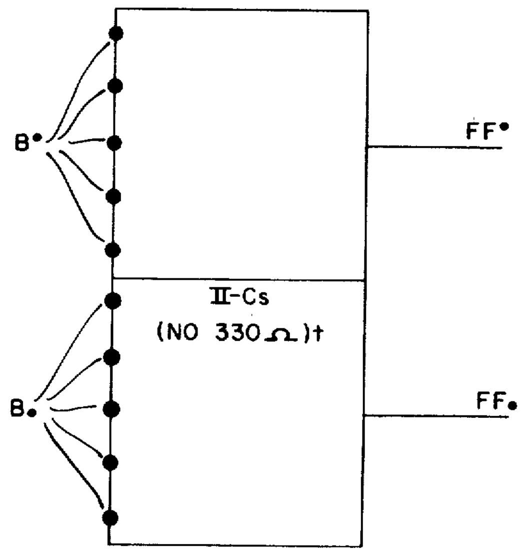

The particular circuits herein designated "flip-flop I" and "flip-flop II" are shown in FIGS. 3 and 5, respectively, while the block symbols employed herein to denote these flip-flops are shown in FIGS. 4 and 6.

As may be seen in FIG. 3, the circuit of flip-flop I comprises a pair of 2N1305-type transistors, by way of example, interconnected in a bistable circuit of a type well known to those skilled in the art by the name flip-flop (see, for example, Digital Computer Components and Circuits, R. K. Richards, 1959, D. Van Nostrand Co., Inc., New York, pp. 160 to 163). The collector terminal of one of these transistors (the left-hand transistor in FIG. 3) is designated the FF·, or "superdot," terminal of flip-flop I. Similarly, the collector terminal of the other transistor (the right-hand transistor as shown in FIG. 3) is designated the FF., or "subdot," terminal of flip-flop I.

The base terminal of the left-hand transistor as seen in FIG. 3 is designated the "B.," or "B-subdot," terminal of flip-flop I. The base terminal of the right-hand transistor as shown in FIG. 3 is designated the "B·," or "B-superdot," terminal of flip-flop I.

The block symbol shown in FIG. 4 is used to denote the circuit shown in FIG. 3 at those other places in the drawings wherein flip-flops comprising basic flip-flop I are shown. To identify this block symbol as that denoting flip-flop I, "I" is placed approximately centrally thereof, as shown in FIG. 4.

As may also be seen from FIG. 4, the FF· terminal of flip-flop I is shown in the corresponding block symbol as extending rightwardly from the upper half of the right edge thereof, while the FF. terminal is shown as extending rightwardly from the lower half of the right edge thereof. Thus, the upper flip-flop terminal can always be identified because the accompanying dot is located at the upper end of the letter-group FF which denotes it, while the lower flip-flop terminal can always be identified by the dot placed near the lower edge of the letter-group FF which denotes it. This convention is preserved throughout the instant specification and drawings, not only in connection with basic flip-flop I and basic flip-flop II, but also in connection with the sixty-two composite flip-flops found in Table FF.

Further examination of FIG. 4 will show that ten dots are located along its left-hand edge. Five of these dots are located in the upper half of the left-hand edge, and five in the lower half. As indicated by the symbol B· and its associated lead lines, the five dots located in the upper half of the left-hand edge of the block symbol shown in FIG. 4 may be considered to be directly connected to the B· terminal of the corresponding flip-flop I circuit. That is, each of the five dots located on the upper half of the left-hand edge of the flip-flop I block symbol represents a terminal directly connected, i.e., connected by means having negligible impedance, to the base terminal of the right-hand transistor of the flip-flop circuit to which it corresponds. Similarly, the five dots located on the lower half of the left-hand edge of the flip-flop I block symbol represent terminals which are directly connected to the base terminal of the left-hand transistor of the flip-flop circuit to which the block symbol corresponds.

For example, the lower dot located on the left-hand edge of the block symbol shown in FIG. 4 may be considered to represent the dot found immediately to the right of the base of the left-hand transistor in FIG. 3, such that a connection to this lower left-hand dot in FIG. 4 is the same as a connection to the corresponding dot in FIG. 3. Similarly, the other four dots located in the lower half of the left-hand edge of the symbol of FIG. 4 may be considered to represent the dot found immediately to the right of the base of the left-hand transistor in FIG. 3.

Similarly, the dots located on the upper half of the left-hand edge of the symbol of FIG. 4 may be considered to represent the dot located immediately to the left of the base of the right-hand transistor in FIG. 3.

Upon comparison of FIG. 3 with FIG. 4 it will be noted that the FF· terminal is adjacent (i.e., directly above) the B. terminal in FIG. 3, while in FIG. 4 the FF· terminal is adjacent (i.e., on the same horizontal level with) the B· terminal. Also, the FF. terminal is adjacent the B· terminal in FIG. 3, while in FIG. 4 the FF. terminal is adjacent the B. terminal. In other words, the positional interrelationship of the B and FF terminals of the block symbol of FIG. 4 may be thought of as reversed with respect to the same interrelationship as shown in the wiring diagram of FIG. 3. This convention of terminal reversal as between the wiring diagram and the block diagram has been adopted for the reason that cutting off the left-hand transistor will result in the appearance of a close-to-ground signal at the collector of the right-hand transistor (i.e., the FF. terminal). The signal required to cut off the left-hand transistor by way of its base (i.e., the B. terminal) is a signal slightly positive with respect to ground. The resulting signal at the FF. terminal will be a signal slightly negative with respect to ground, due to the internal drop in the right transistor. Slightly positive signals, such as that applied to the B. terminal to cut off the left transistor, and slightly negative signals, such as the resulting signal appearing at the FF. terminal, may be conveniently thought of as "nominal ground" signals, since these signal levels are considerably closer to ground than to any other logic level employed in the system. When the signal of B. and the resulting signal on FF. are so designated, then, it may be stated that the appearance of nominal ground (slightly positive) at the B. terminal results in the appearance of nominal ground (slightly negative) at the FF. terminal. By similar reasoning, the appearance of nominal ground (slightly positive) at the B· terminal results in the appearance of nominal ground (slightly negative) at the FF· terminal. Or, stated slightly differently, the appearance of nominal ground at the superdot input terminal results in the appearance of nominal ground at the superdot output terminal, while the appearance of nominal ground at the subdot input terminal results in the appearance of nominal ground at the subdot output terminal. In FIG. 3, however, the subdot input terminal is diagonally opposite the subdot output terminal, while the superdot input terminal is diagonally opposite the superdot output terminal. The reversal of terminals between FIG. 3 and FIG. 4 as mentioned hereinabove, however, puts the superdot input terminal opposite the superdot output terminal, and the subdot input terminal opposite the subdot output terminal. Thus, with respect to FIG. 4, the operation of the flip-flop may be kept in mind by merely recalling that the appearance of nominal ground at any one of the five upper input terminals results in the appearance of nominal ground at the upper output terminal, if not already there, while the appearance of nominal ground at any one of the five lower input terminals results in the appearance of nominal ground at the lower output terminal, if not already there. This "reversal" convention is employed uniformly in the instant specification and drawings.

The wiring diagram of basic flip-flop II (FIG. 5) is related to the block symbol denoting the basic flip-flop II (FIG. 6) in a manner analogous to the relationship between the wiring diagram of FIG. 3 and the block symbol of FIG. 4. Thus, the collector terminal of the left-hand (2N1499A) transistor of the basic flip-flop shown in FIG. 5 is designated the FF· terminal, while the collector terminal of the right-hand (2N1499A) transistor of FIG. 5 is designated the FF. terminal. Also, the FF· terminal is located above the FF· terminal in the block symbol of FIG. 6, thus preserving the same relationship between these two terminals as in the block symbol of FIG. 4. In the wiring diagram of the basic II flip-flop (FIG. 5), however, a 330 ohm resistor is interposed between the B terminals and the bases of the corresponding transistors, unlike the wiring diagram of FIG. 3 wherein the B terminals are the base terminals of the transistors. That is, the lower terminal of the left-hand 330 ohm resistor of FIG. 5 is the B. terminal of the basic II flip-flop, and not the base of the left-hand transistor of FIG. 5. In like manner, the lower terminal of the right-hand 330 ohm resistor of FIG. 5 is the B· terminal of the basic II flip-flop, and not the base of the right-hand transistor of FIG. 5. Thus, the five dots located on the upper half of the left-hand edge of the block symbol of FIG. 6, and labeled "B·", denote terminals connected directly (i.e., by means having negligible impedance) to the lower terminal of the right-hand 330 ohm resistor of FIG. 5. Observing the same convention, the five dots located on the lower half of the left-hand edge of the block symbol of FIG. 6, labeled "B.", denote terminals connected directly to the lower terminal of the left-hand 330 ohm resistor shown in FIG. 5.

As may be seen in FIG. 6, the block symbol denoting the basic II flip-flop has a "II" located near its center. Unlike the basic I flip-flop block symbol of FIG. 4, however, the identifying II located near the center of the block symbol of FIG. 6 has an additional term located immediately to its right. This additional term, identified as "$C_s$" in FIGS. 5 and 6, represents a group of Arabic numerals indicating the value in picofarads of the speedup capacitors of the flip-flop circuit to which the block symbol corresponds.

The further practice is employed herein of denoting a flip-flop which corresponds in all respects to the flip-flop of FIG. 5 except that its B terminals are connected directly to the bases of the corresponding transistors without the interposition of 330 ohm resistors, i.e., except that its B terminals are connected as in FIG. 3, by the block symbol of FIG. 6 having an additional note "(no 330Ω)" located in its lower half, as shown in FIG. 6, and there marked with a dagger.

Figure 7:
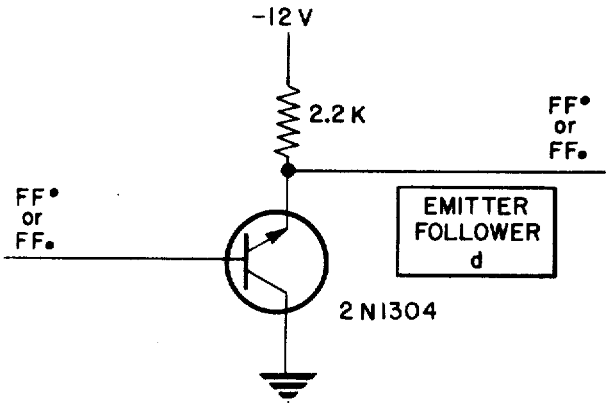
FIG. 7 illustrates the circuit of an emitter follower employed in outputs of several of the composite flip-flops.

In FIG. 7 is shown an emitter follower circuit hereinafter designated "emitter follower *d*." Many of the named flip-flops listed in Table FF include an emitter follower d in one, or both, of their FF outputs. An emitter follower d is said to be included in an output of a flip-flop when its base is directly connected to that output, the output (emitter terminal) of the emitter follower then being considered to be the output of the flip-flop, and being labeled "FF·" or "FF." according as its input is connected to the FF· or FF. output of the flip-flop. As an example, a flip-flop might comprise a basic I flip-flop having an emitter follower d in its FF. output. In this case, this flip-flop would comprise the circuit of FIG. 3 and the circuit of FIG. 7, the FF. terminal of FIG. 3 being directly connected to the base of the transistor of FIG. 7. The emitter terminal of the transistor of FIG. 7 would then be considered to be the FF. output of the composite flip-flop.

Figure 9:
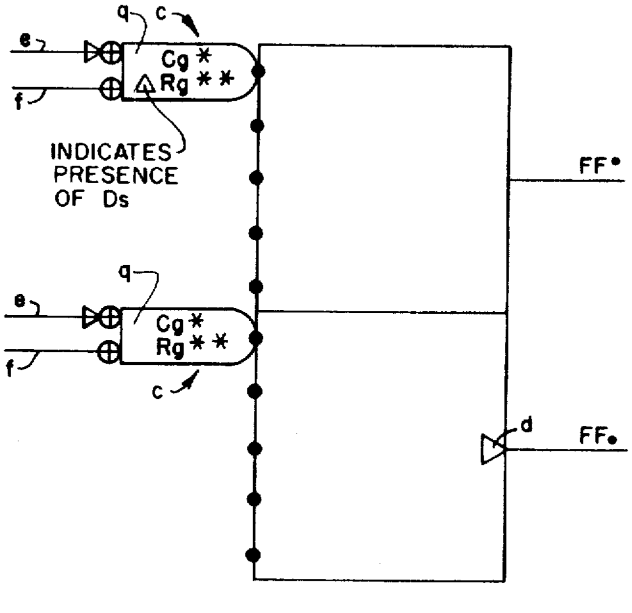
FIG. 9 shows the block symbol used to indicate a basic flip-flop and, in addition, a dynamic gate as in FIG. 8, and an emitter follower as in FIG. 7.

In FIG. 9 is shown the symbol used herein to indicate that an emitter follower d is included in an output of a flip-flop. The flip-flop block symbol shown in FIG. 9 includes a small triangle, labeled "d," located within the lower half of the block symbol and having its apex at the point of origin of the FF. terminal. The presence of this small triangle d at the FF. terminal indicates that an emitter follower d is included in the FF. output of the circuit corresponding to the block diagram of FIG. 9. Thus, a composite flip-flop circuit corresponding to the block symbol of FIG. 9 might comprise a basic I flip-flop circuit, as shown in FIG. 3, having an emitter follower d circuit, as shown in FIG. 7, connected to the collector of its right transistor, but no such emitter follower connected to the collector of its left transistor.

Figure 8:
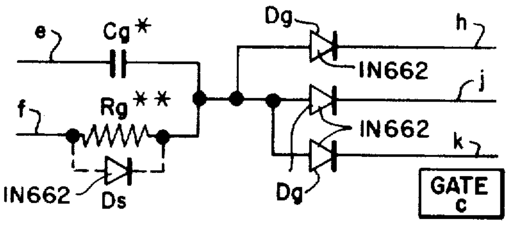

In FIG. 8 is shown a circuit designated as "gate c," or as a "dynamic gate." The upper, or "e," input of this gate is directly connected to the left terminal of the gate capacitor, designated "$C_g$"; the lower or "f," input terminal of this dynamic gate is connected to the left terminal of the gate resistor, designated "$R_g$." In some embodiments of this dynamic gate, the gate resistor is shunted by a speed up diode, designated "$D_s$." The right-hand terminal of the gate capacitor is directly connected to the right-hand terminal of the gate resistor. The particular dynamic gate circuit shown in FIG. 8 has three output terminals "h," "j," and "k." Each of these output terminals is connected to the cathode of a respective gate diode $D_g$, the anode of each gate diode being directly connected to the common junction of the right-hand terminals of the gate capacitor and the gate resistor.

While the dynamic gate circuit of FIG. 8 is shown as having three output terminals h, j, k, the dynamic gates actually employed at various parts of the embodiment of the instant invention described herein have variously one, two, and three outputs. The dynamic gates having other than three outputs are identical to the circuit shown in FIG. 8 except that one, or more, of the output terminals is eliminated and, along with it, its corresponding diode $D_g$.

Figure 10:
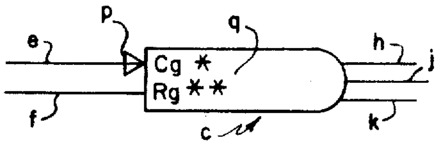
FIGS. 8 and 10 show a generalized dynamic gate circuit and symbol which is used to designate it.

Examples of the block symbol used herein to denote a dynamic gate are found in FIGS. 9 and 10. The outline, or "box," used to represent the dynamic gate is substantially the same as the outline, or "box," used to represent certain static gates, and inverters, elsewhere herein. This outline, or "box," is indicated in FIGS. 9 and 10 by the reference letter q, while "c," and a lead line with arrowhead, are used in FIGS. 9 and 10 to indicate complete dynamic gates, including their input and output connections. The terms "$C_g$" and "$R_g$" found within the "q-boxes" of FIGS. 9 and 10 represent, respectively, the value of the gate capacitor in picofarads and the value of the gate resistor in kilohms. Specific numerical values will, of course, be substituted for $C_g$ and $R_g$ in block symbols representing specific gates. The presence of a Δ immediately preceding the $R_g$ value in a given dynamic gate block symbol, as in the upper dynamic gate symbol in FIG. 9, indicates that, in the circuit corresponding to the given symbol, the gate resistor is shunted by a speedup diode $D_s$.

As shown in FIG. 9, the direct connection (i.e., by means having negligible impedance) of the output of a single-output dynamic gate to a B· input of a flip-flop is indicated by passing the extremity of the curved portion of the gate symbol outline, or "box," through the dot representing the B terminal. Thus, considering the upper dynamic gate shown in FIG. 9, the intersection of the right-hand curved end of the gate symbol "box" with the dot representing the upper B terminal indicates that the single output terminal of the dynamic gate circuit represented by this symbol is directly connected to the B· terminal of the basic flip-flop represented by the flip-flop block symbol of FIG. 9.

Figure 103:
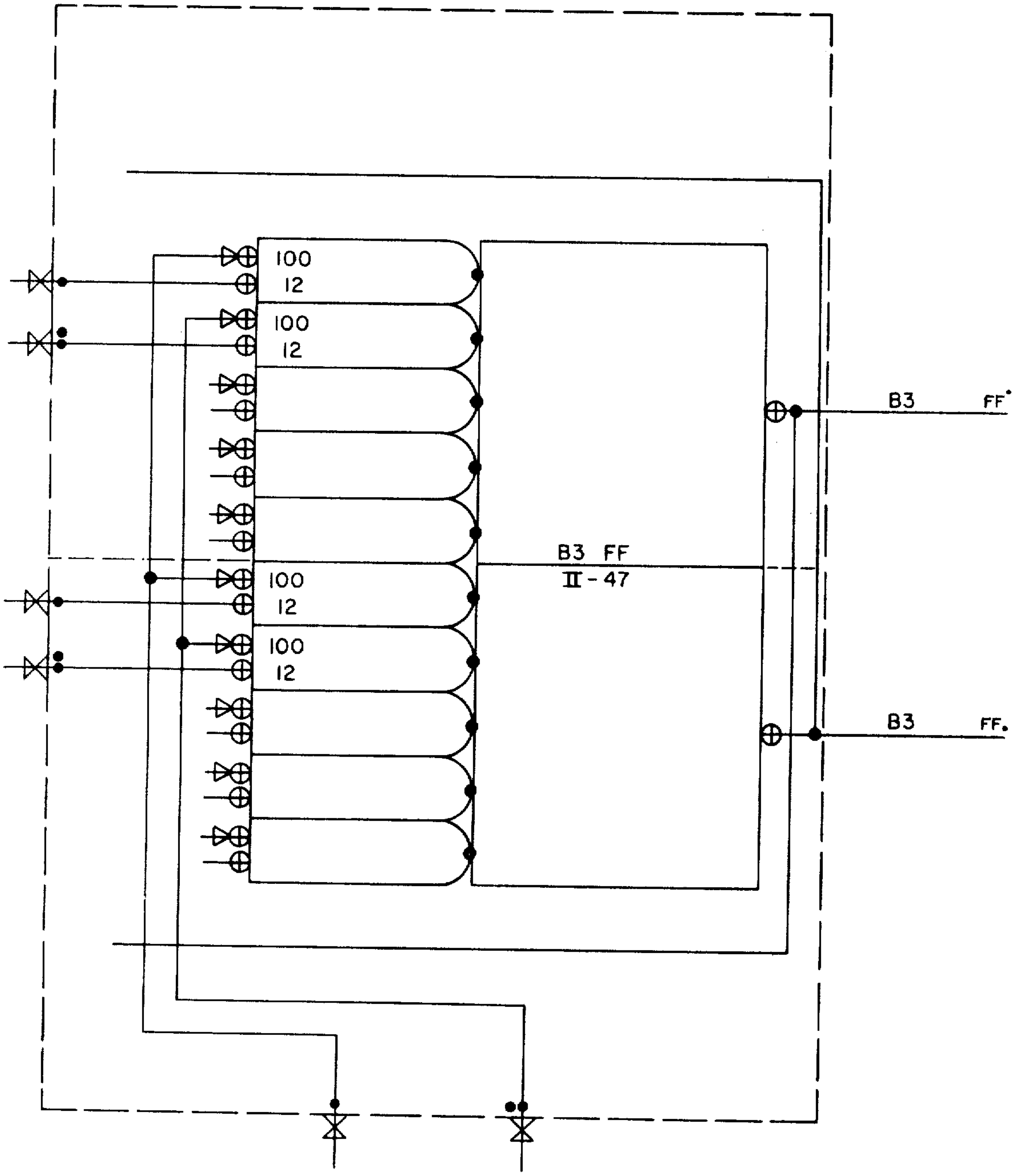
Figure 104:
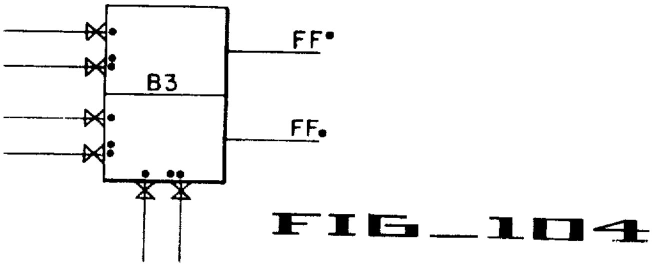
Figure 105:
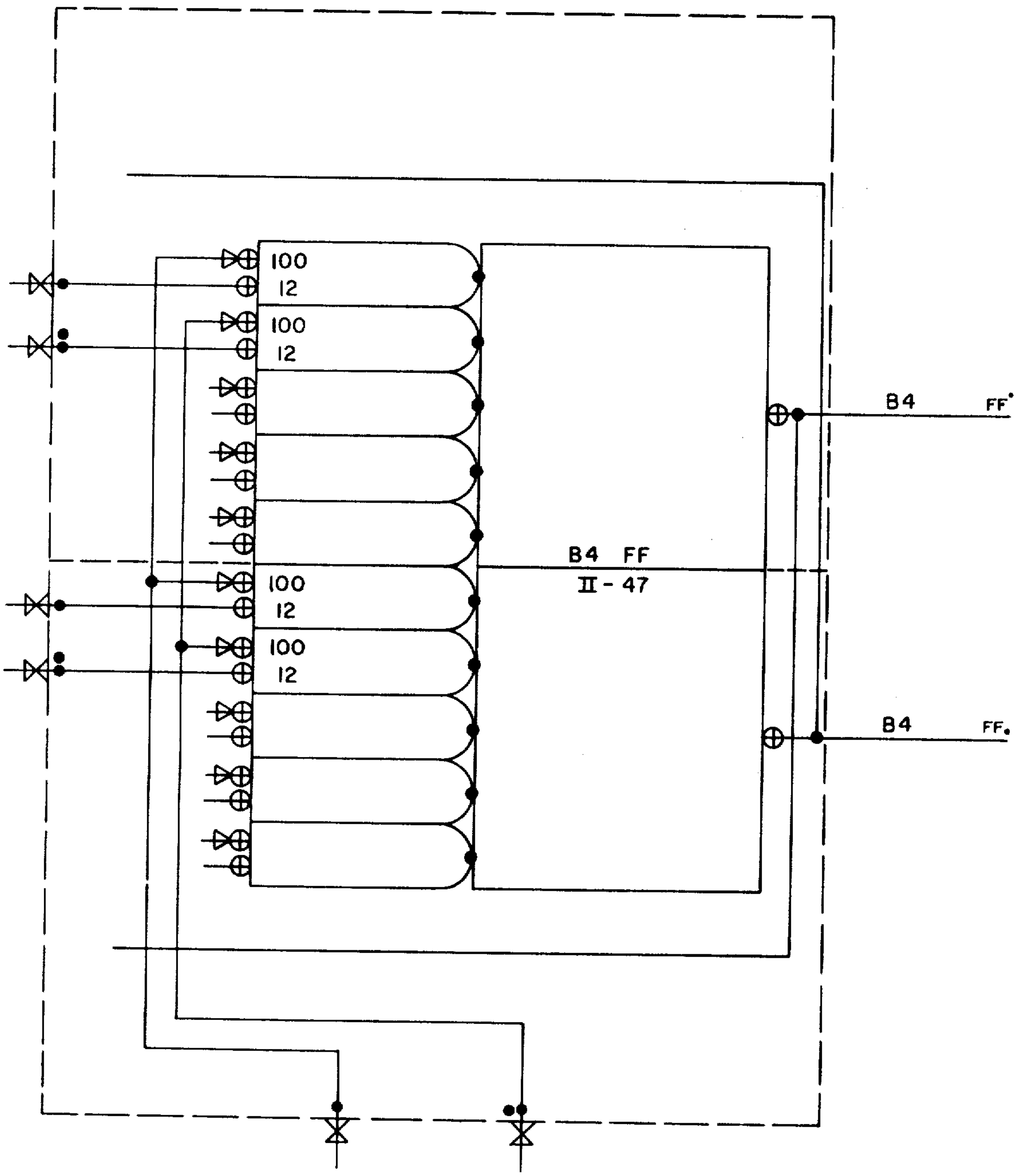
Figure 106:
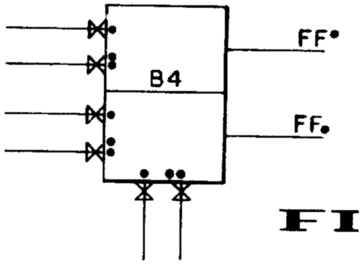
Figure 107:
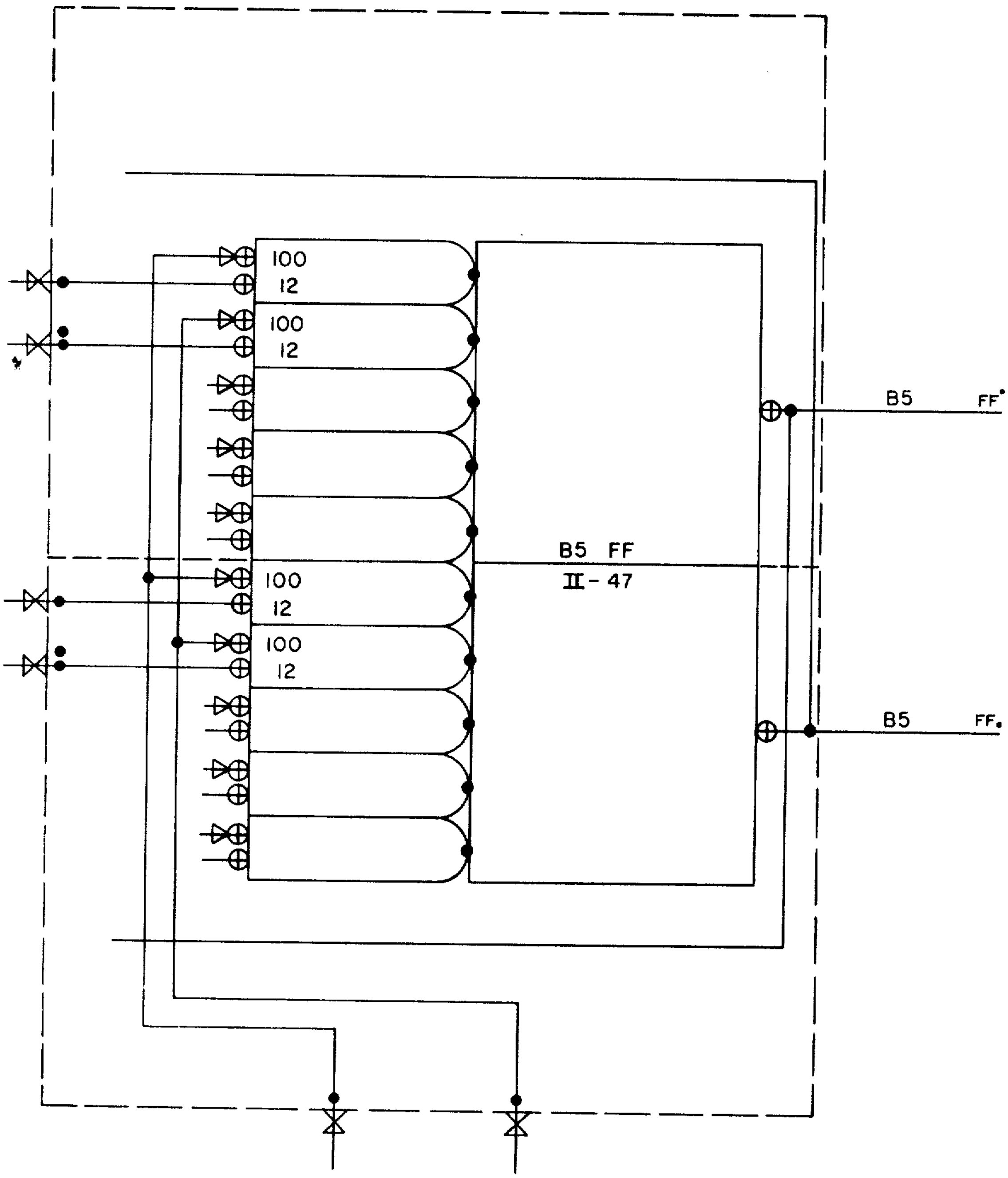
Figure 108:
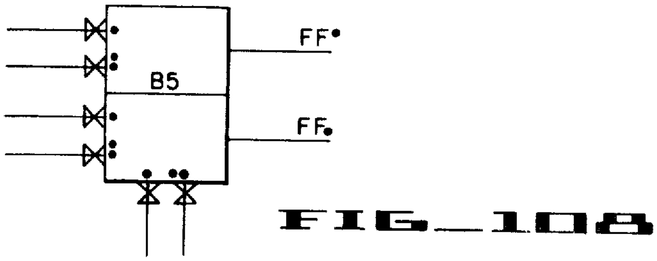
Figure 109:
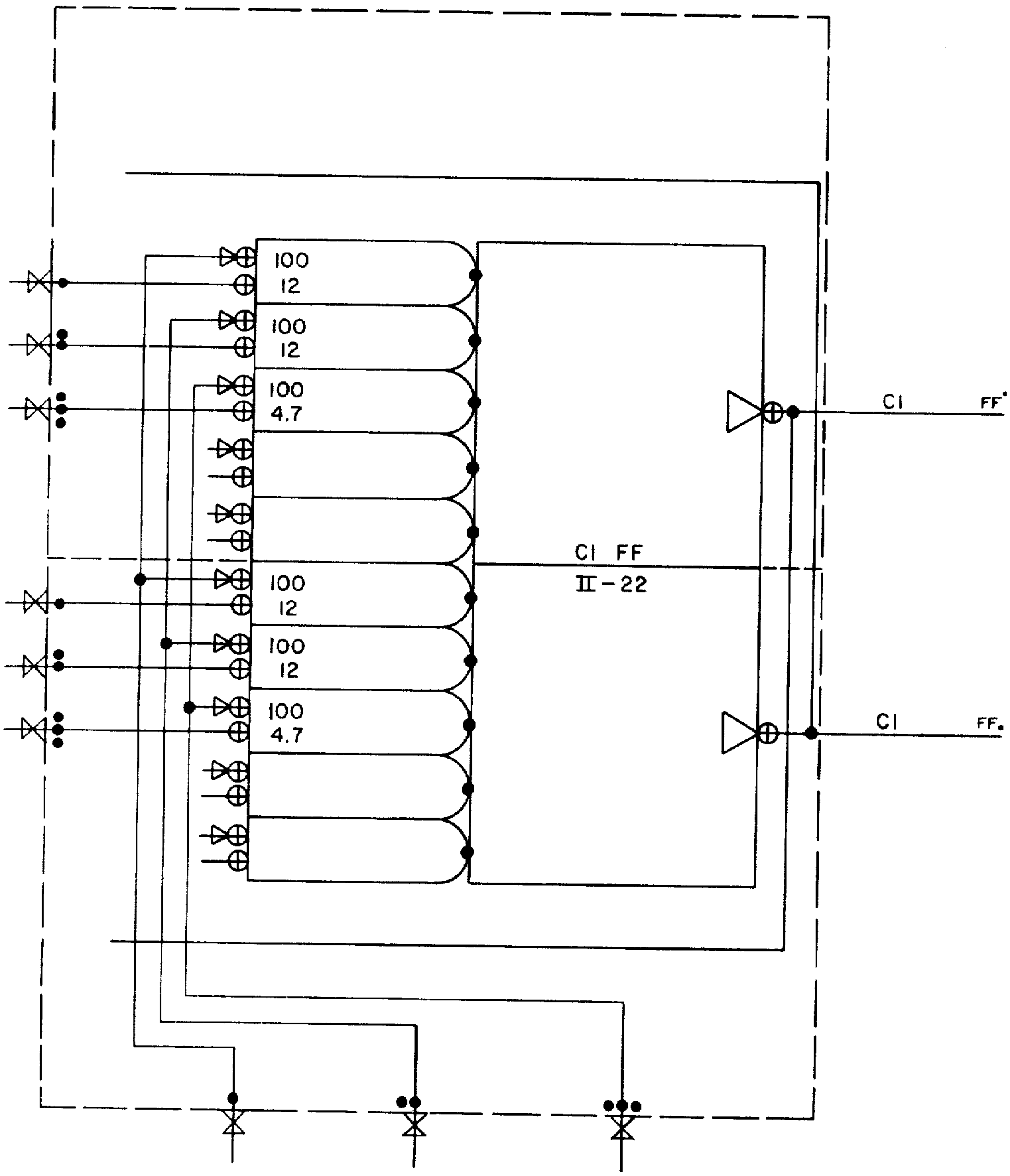
Figure 110:
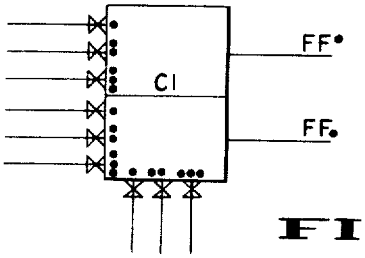
Figure 111:
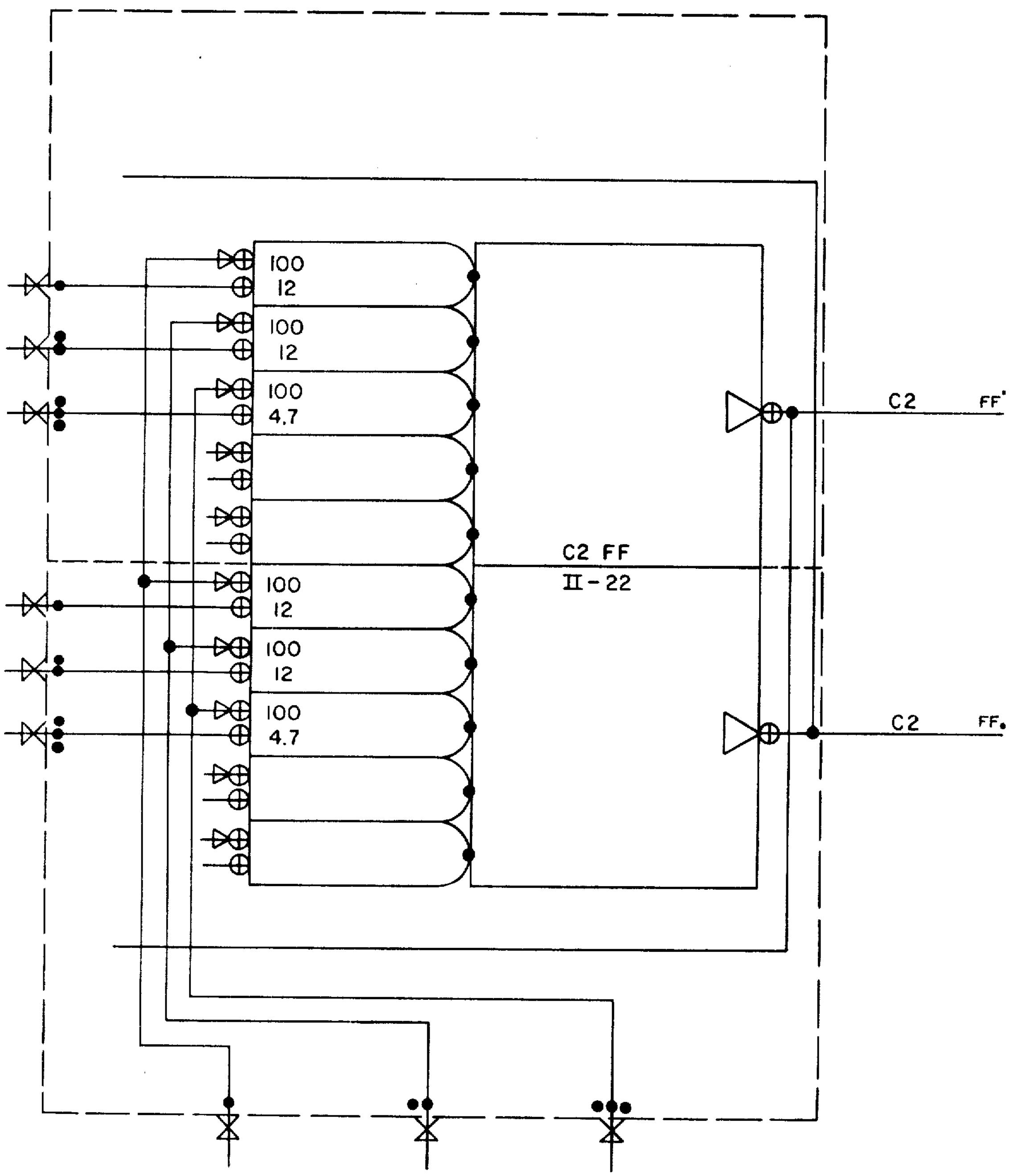
Figure 112:
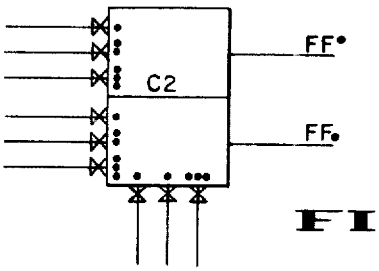
Figure 113:
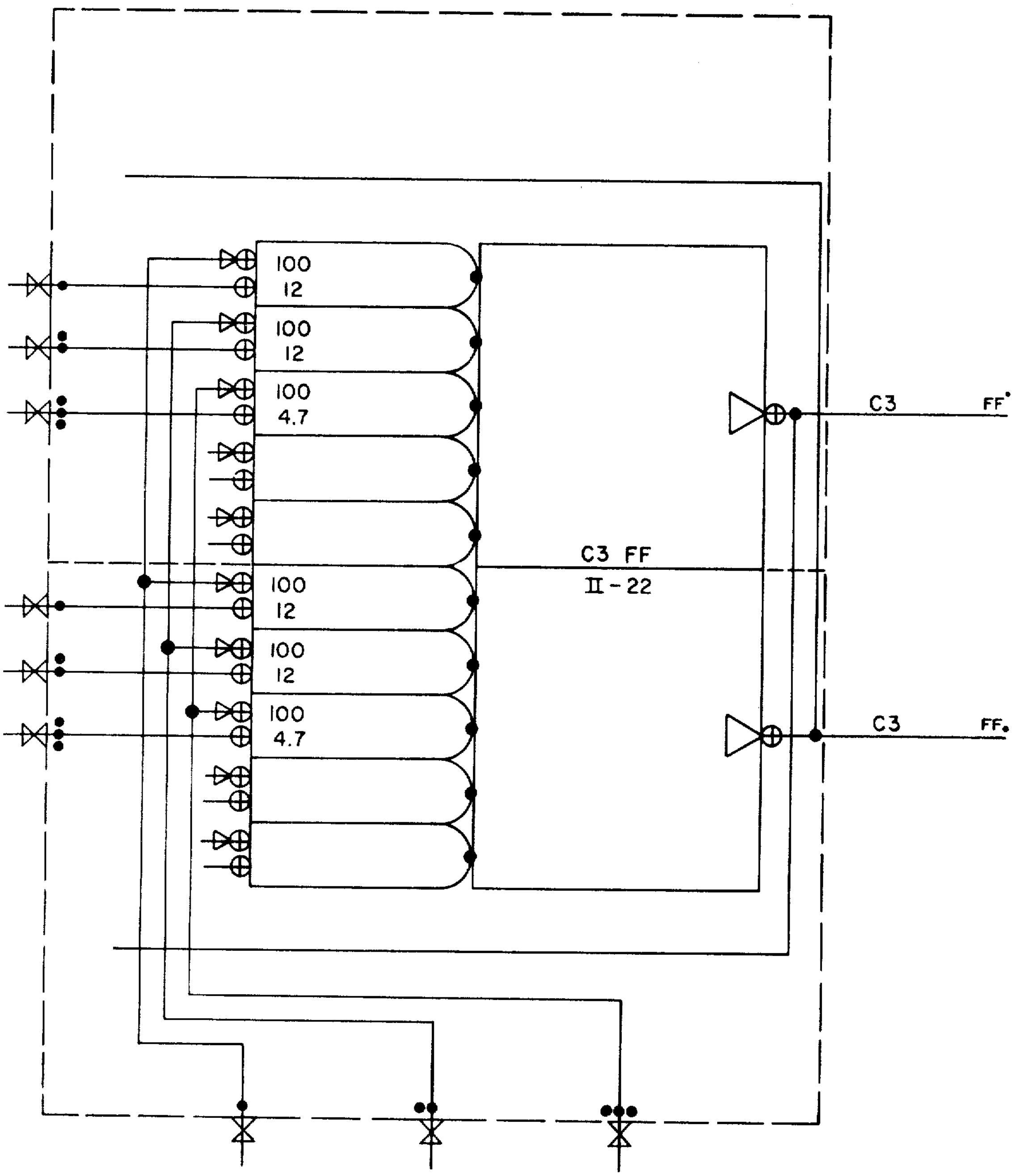
Figure 114:
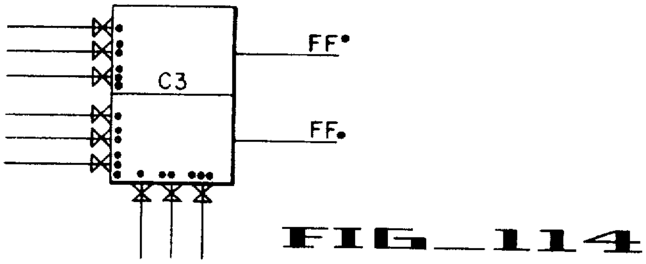
Figure 115:
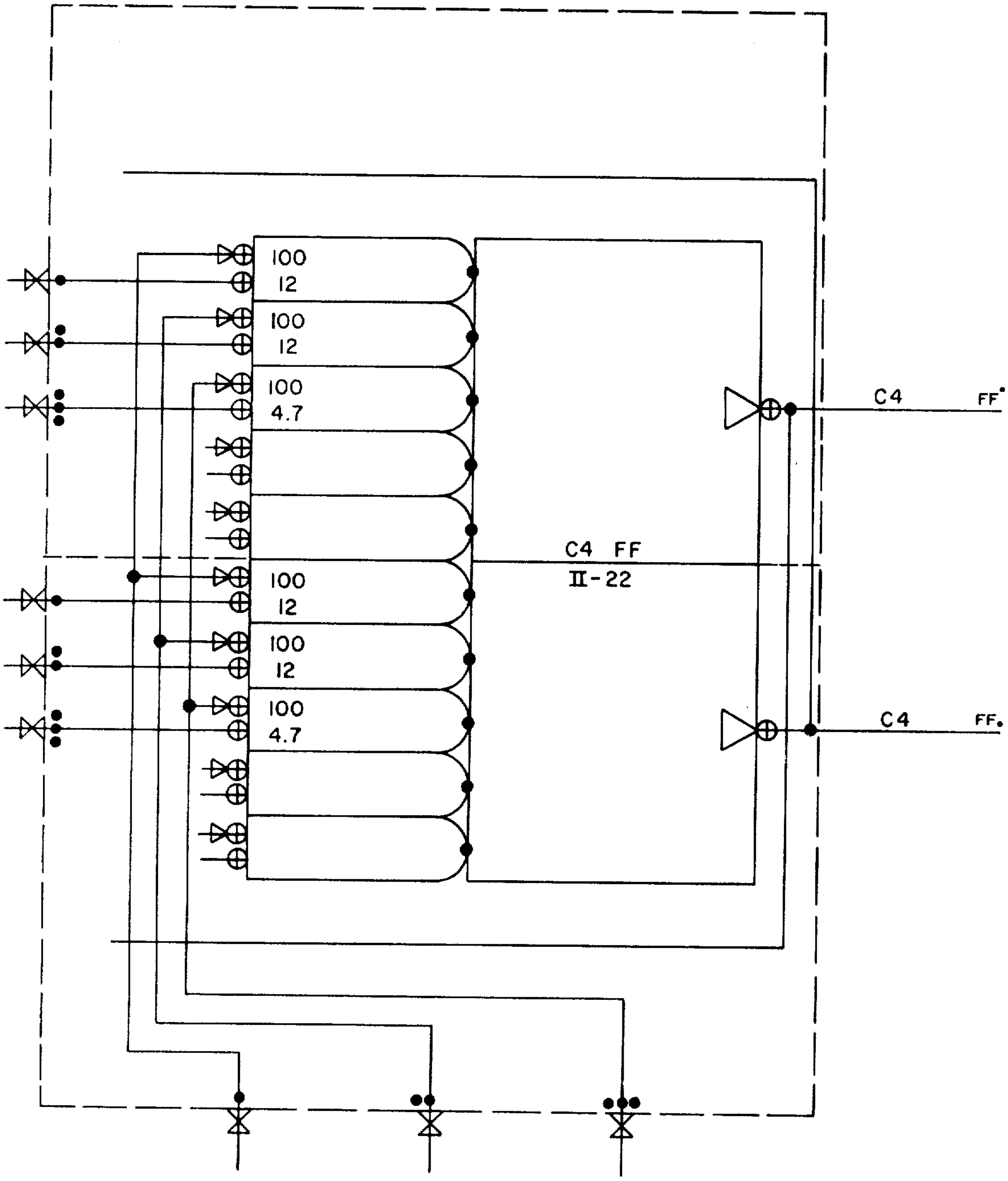
Figure 116:
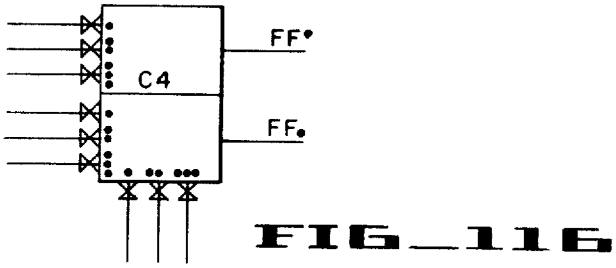
Figure 117:
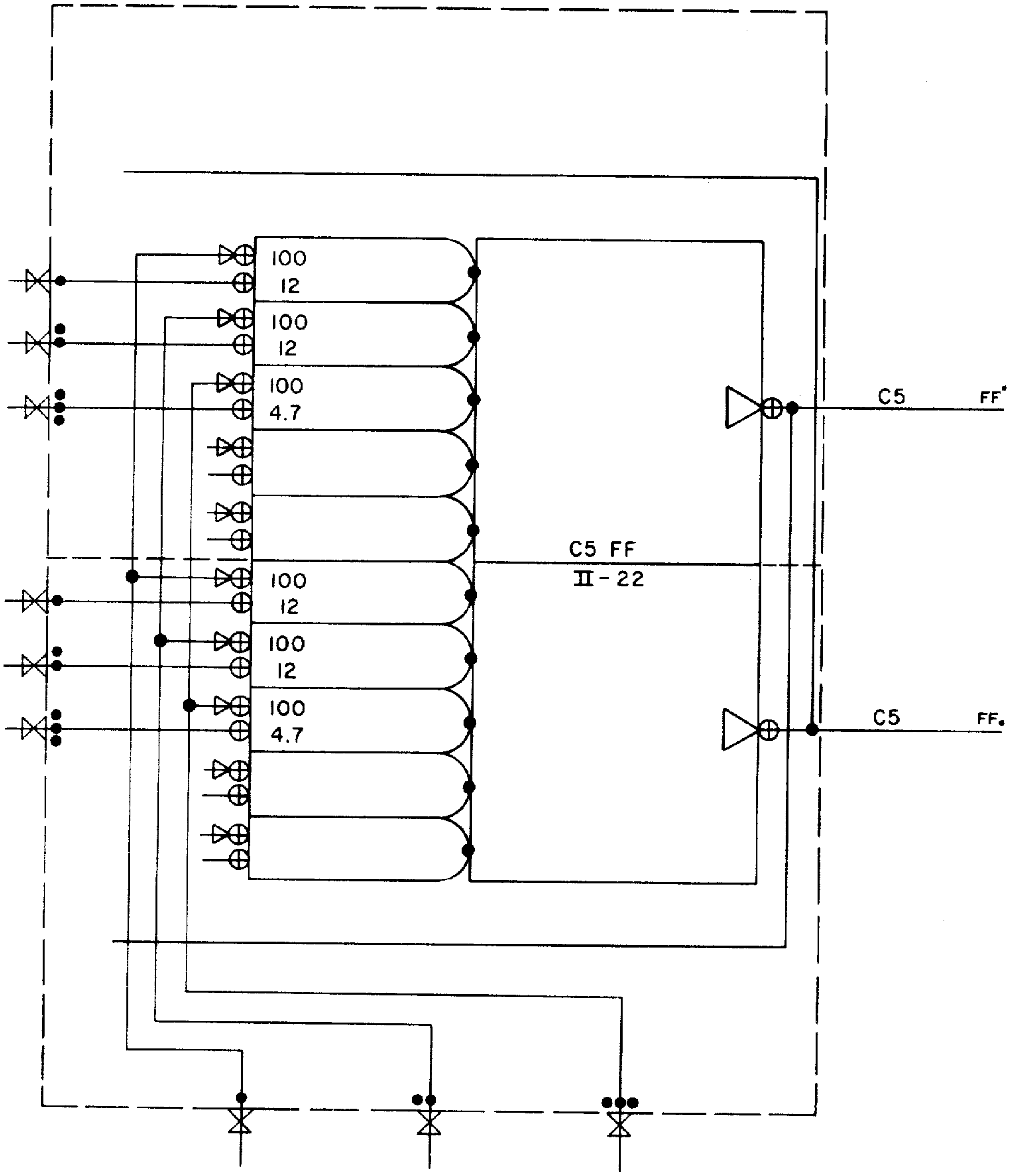
Figure 118:
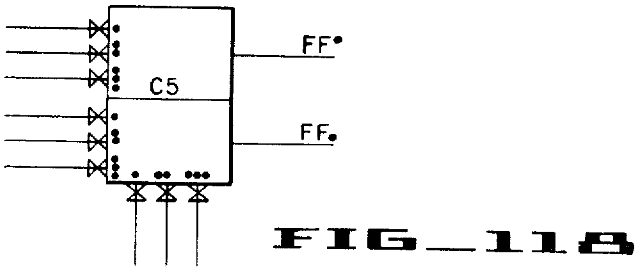
Figure 119:
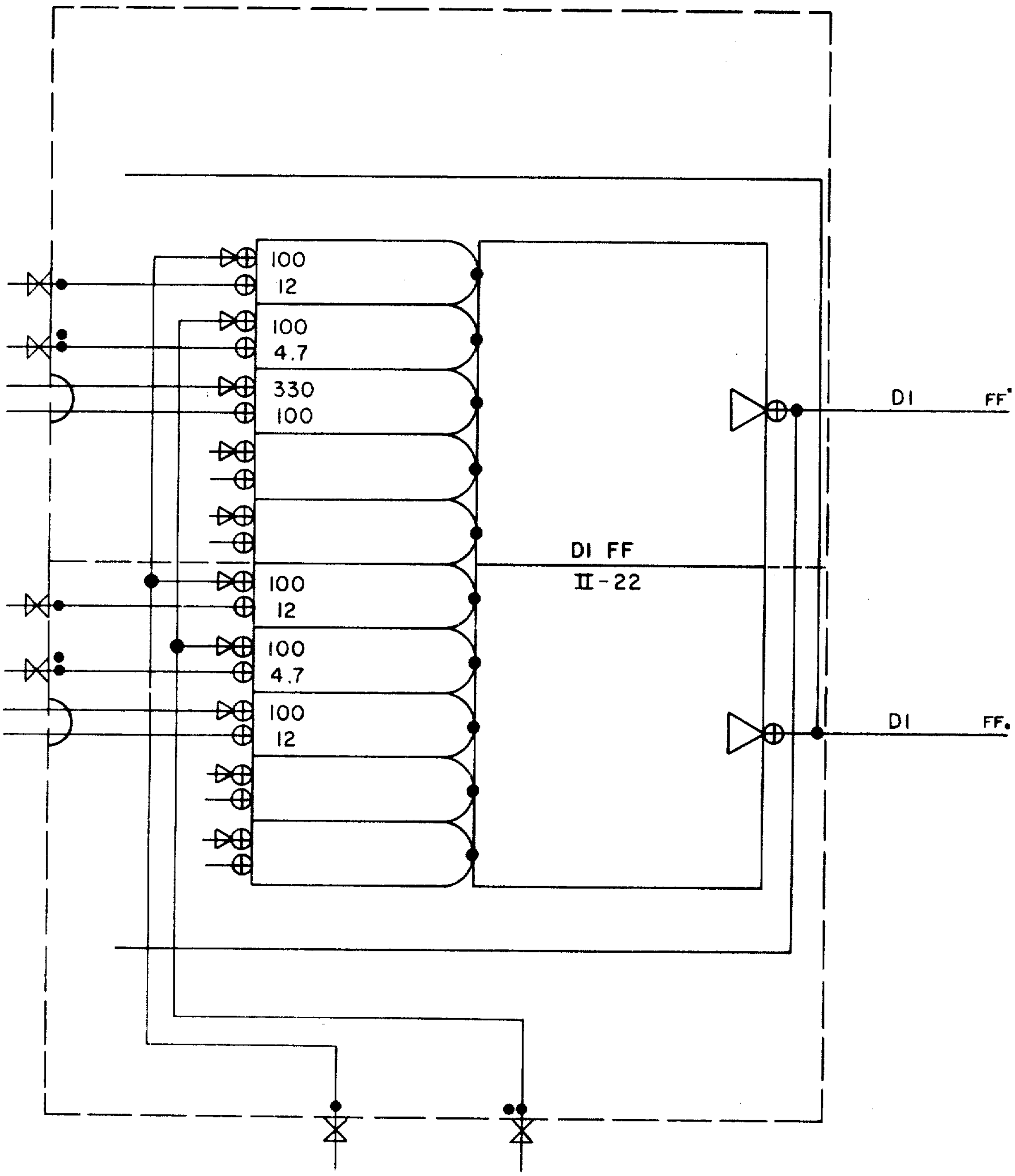
Figure 120:
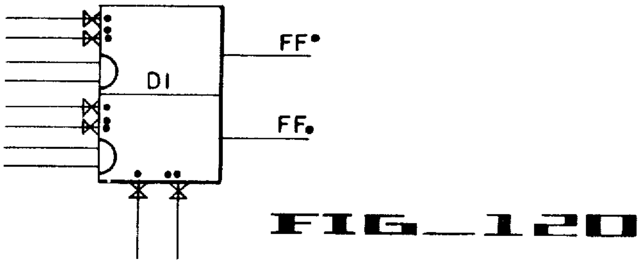
Figure 121:
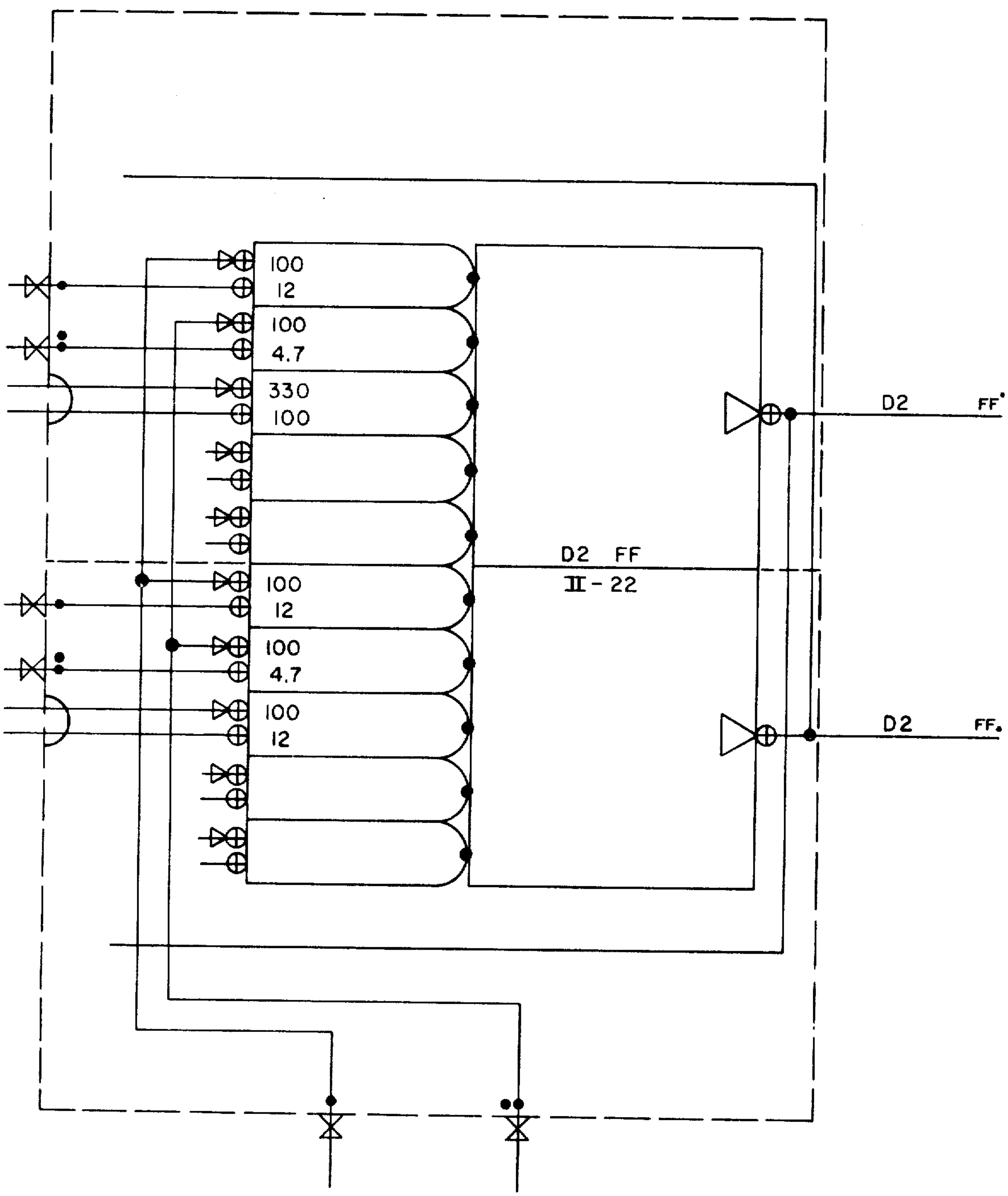
Figure 122:
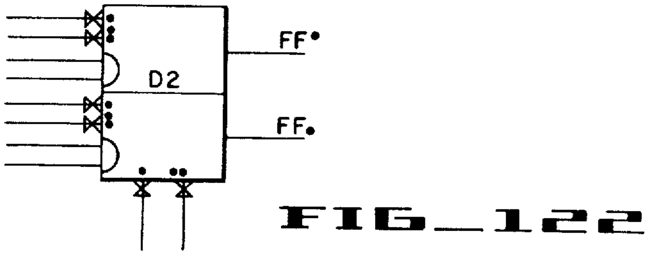
Figure 123:
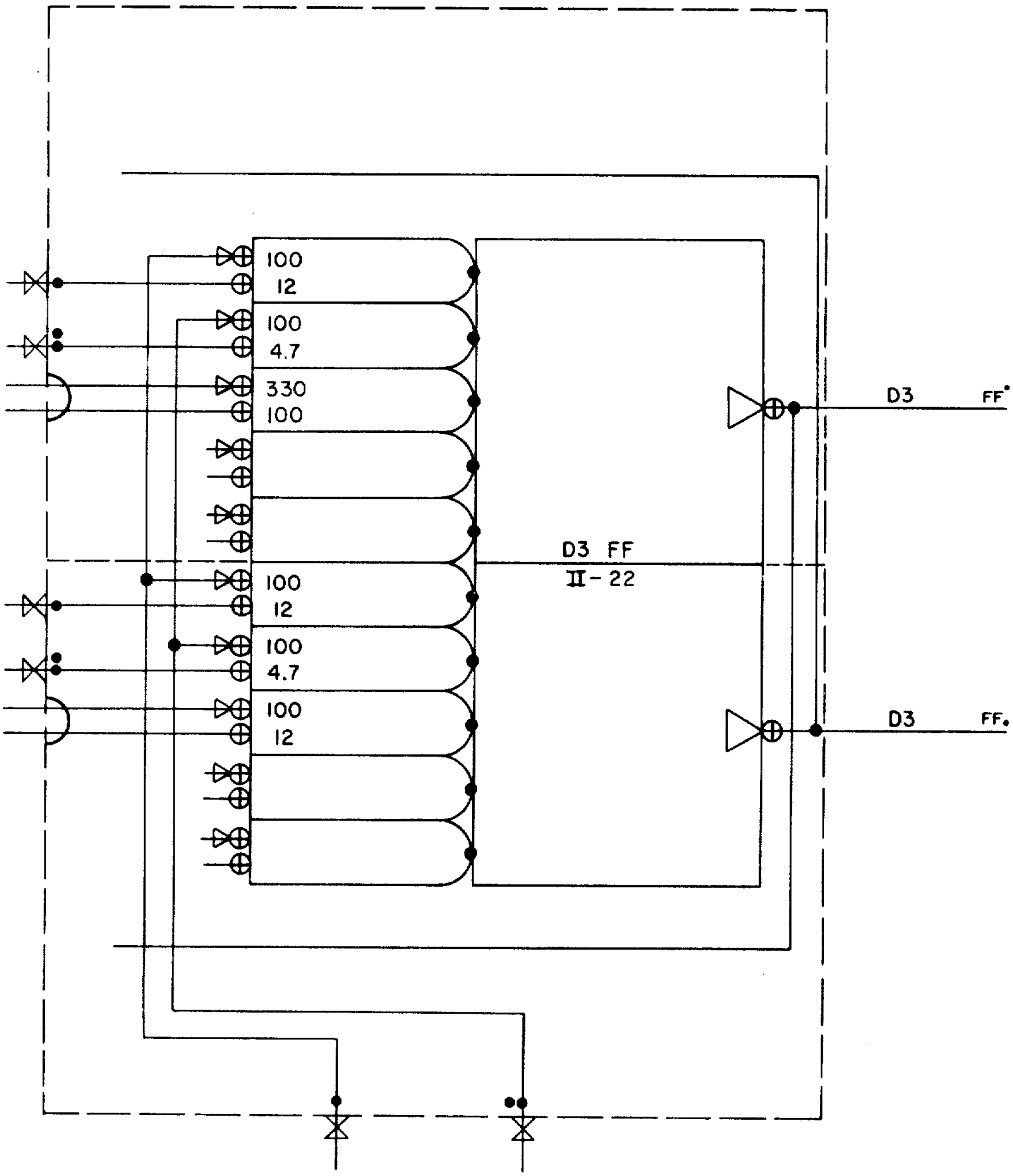
Figure 124:
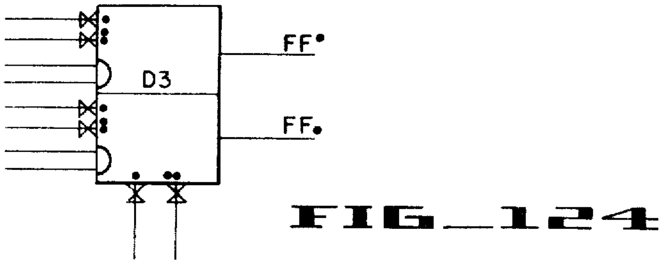
Figure 125:
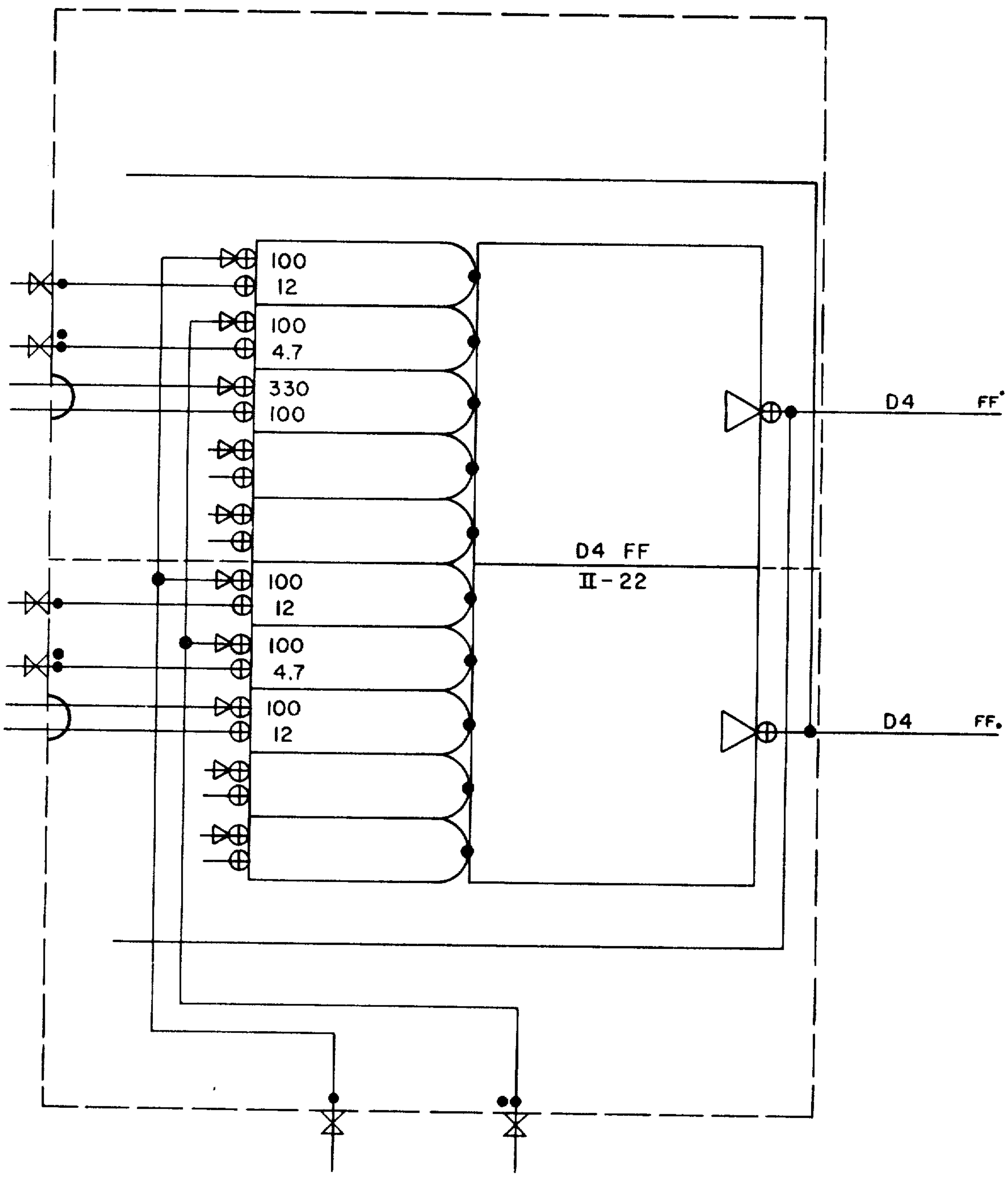
Figure 126:
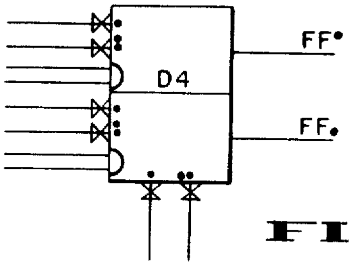
Figure 127:
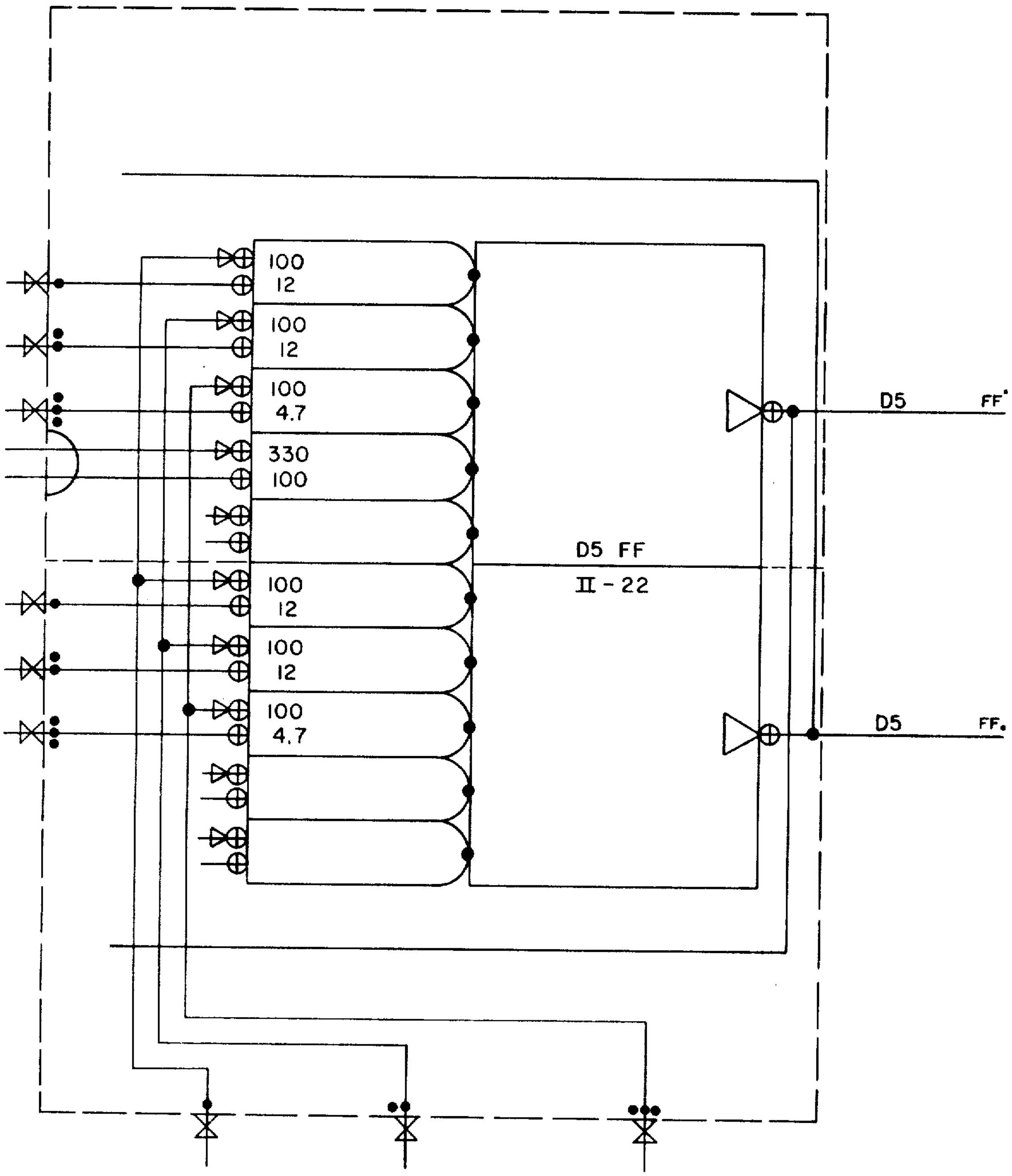
Figure 128:
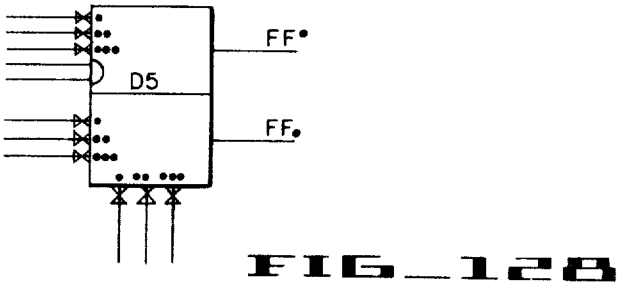
Figure 129:
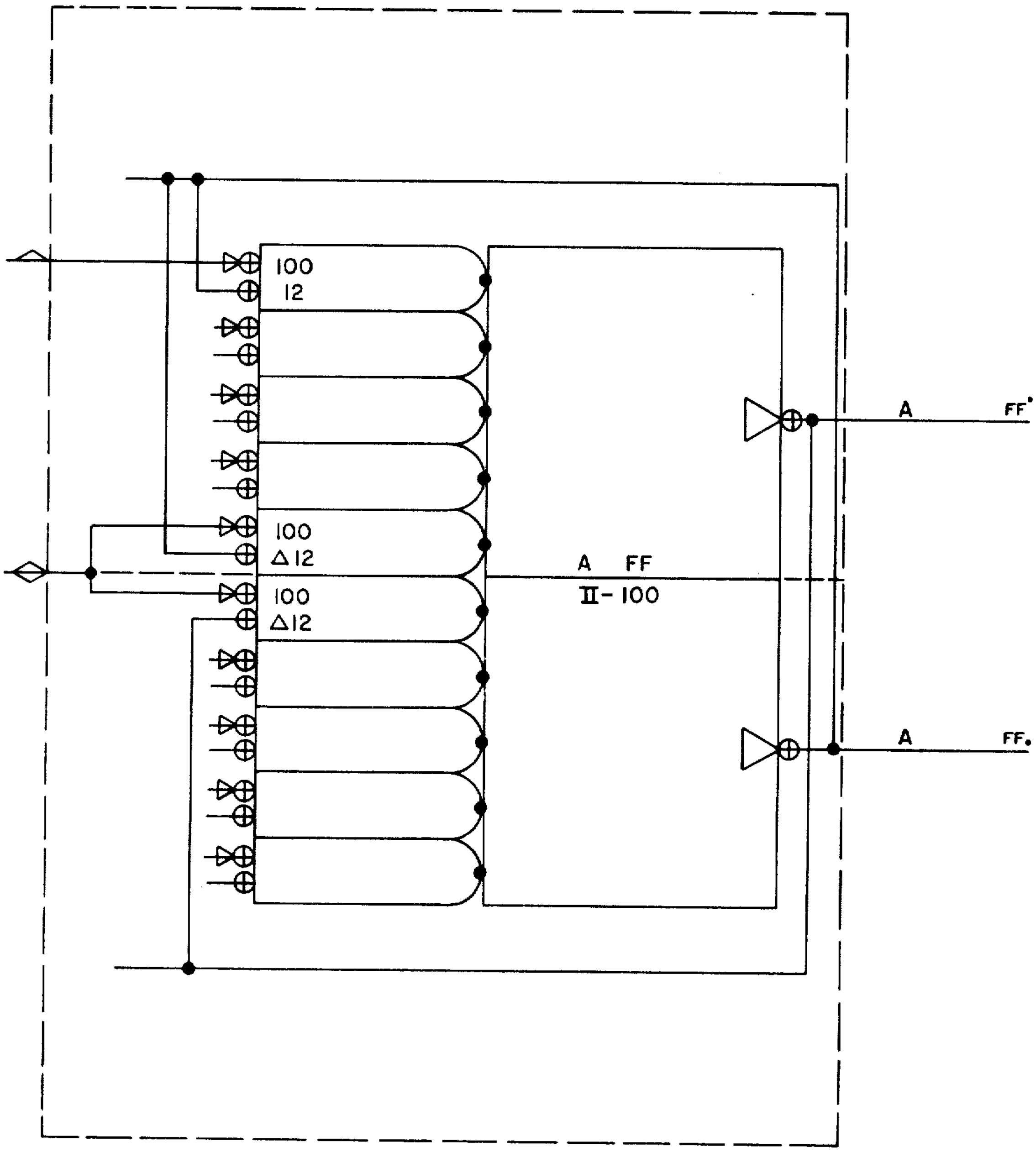
Figure 130:
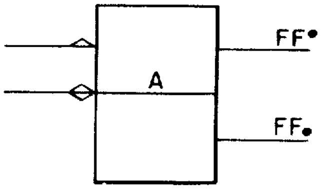
Figure 133:
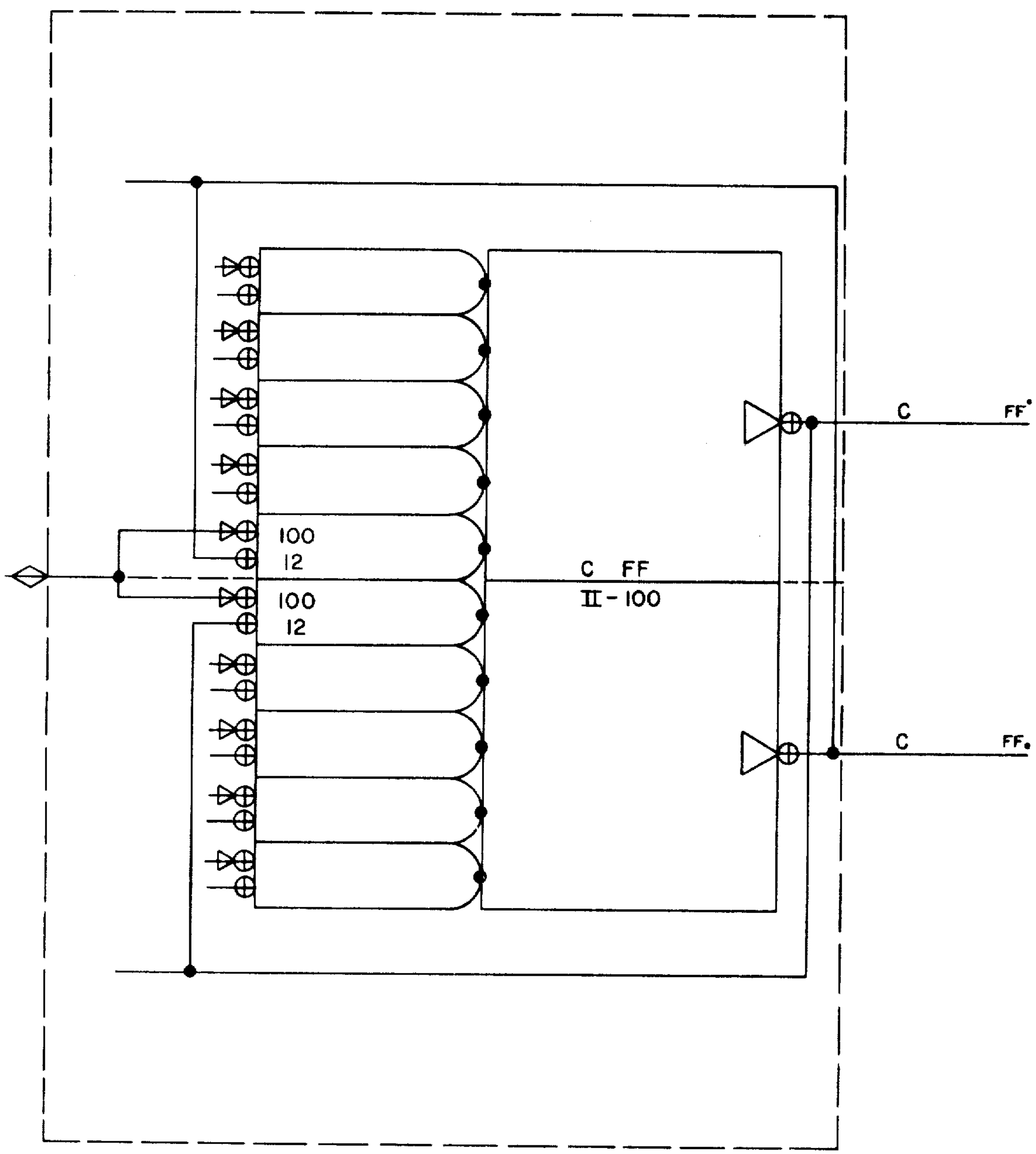
Figure 134:
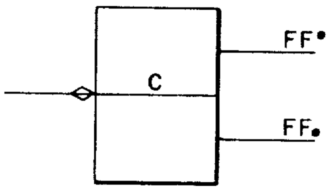
Figure 135:
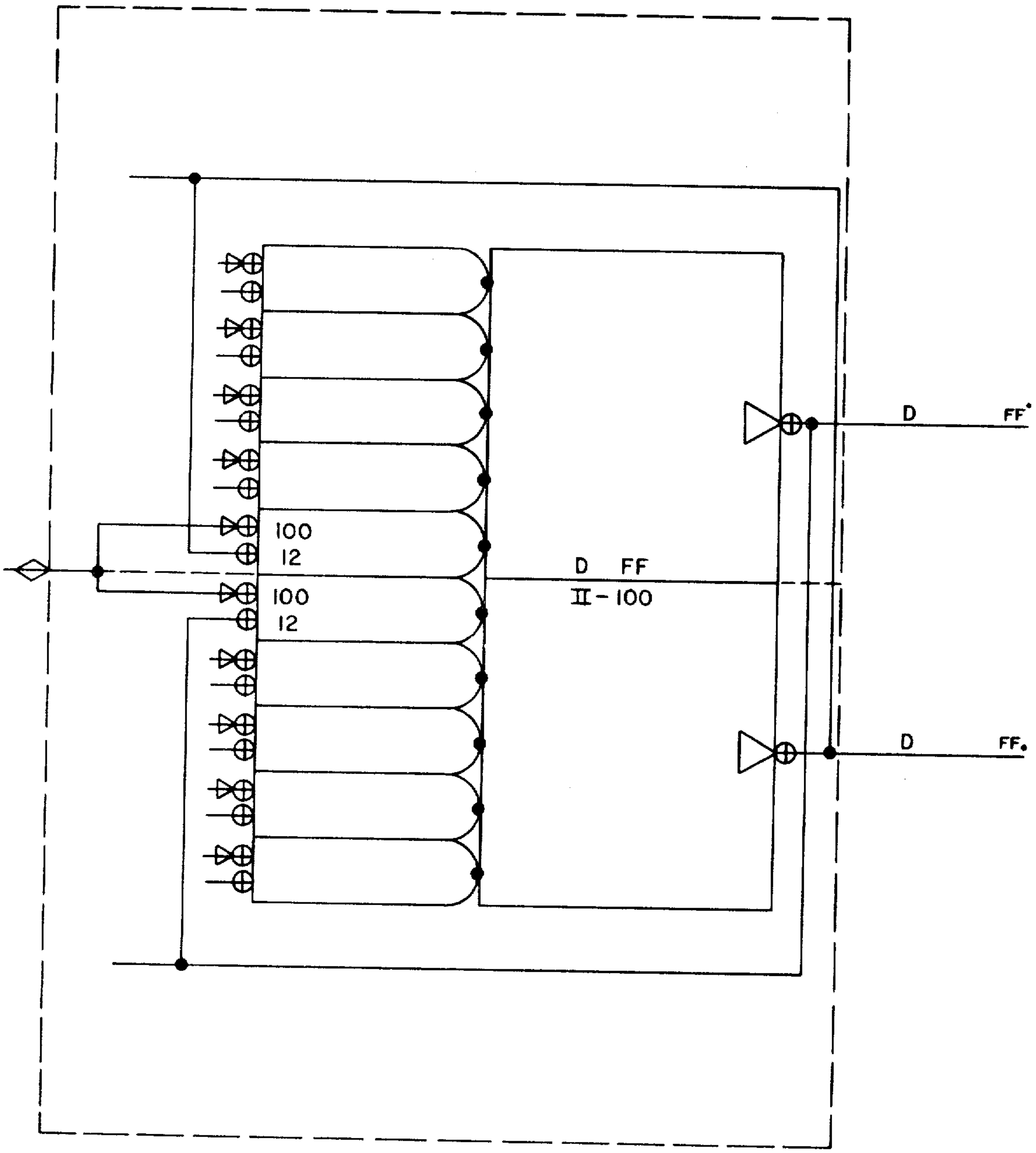
Figure 136:
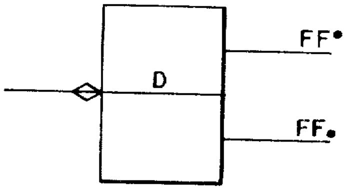
Figure 137:
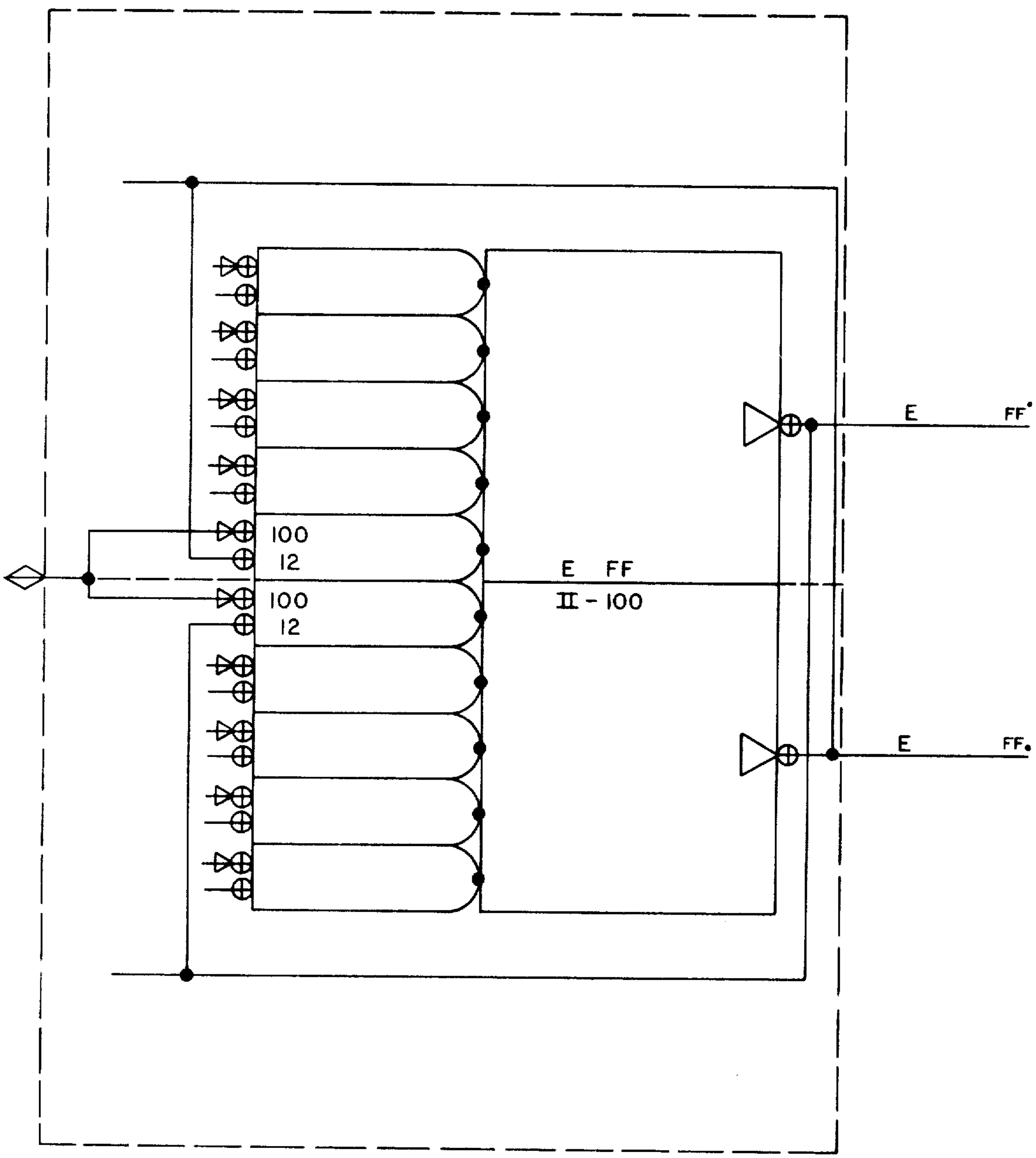
Figure 138:
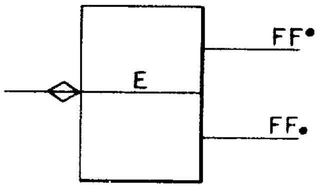
Figure 139:
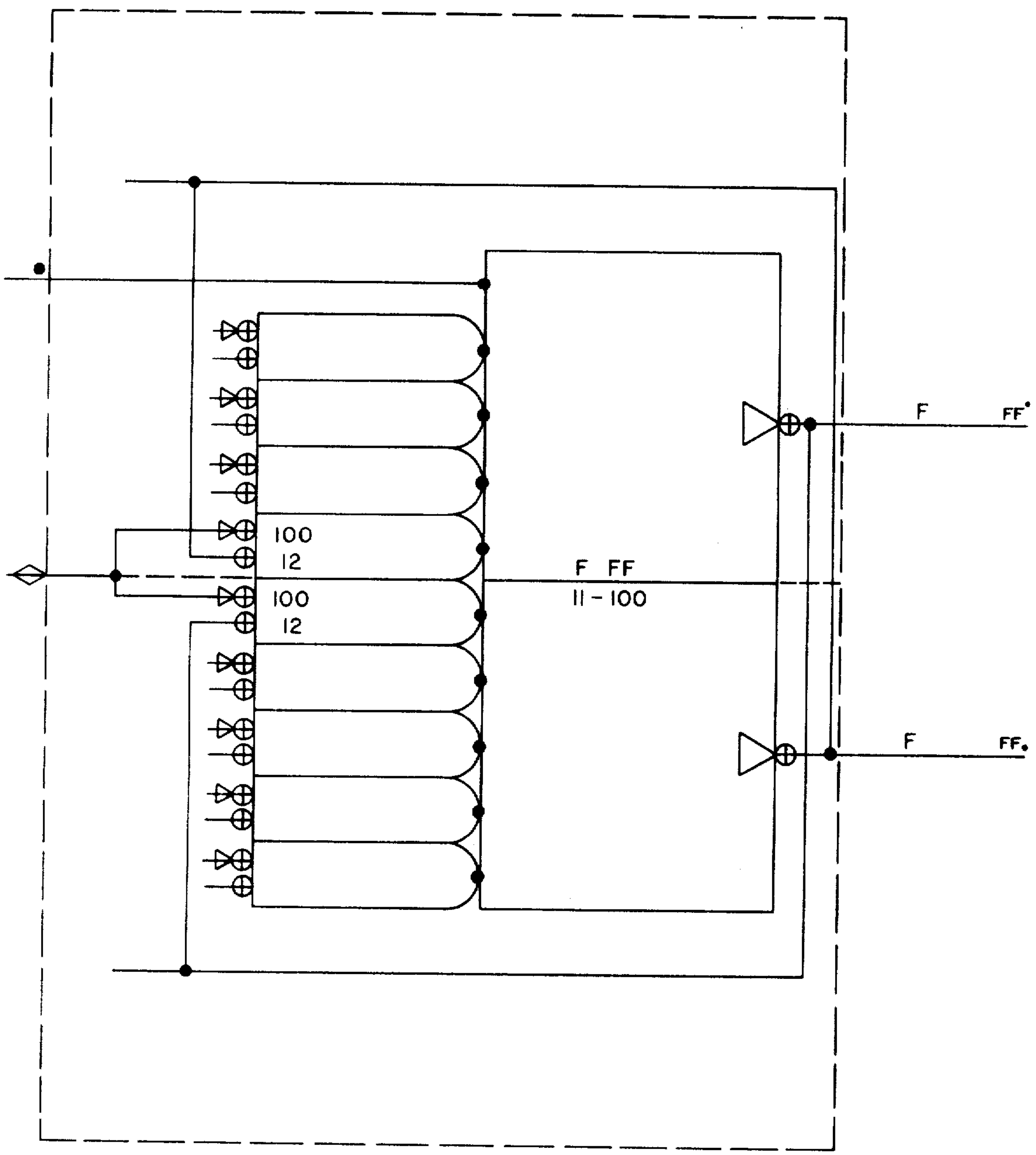
Figure 140:
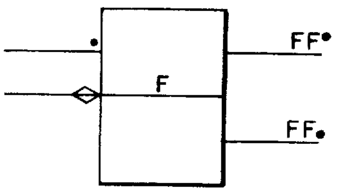
Figure 141:
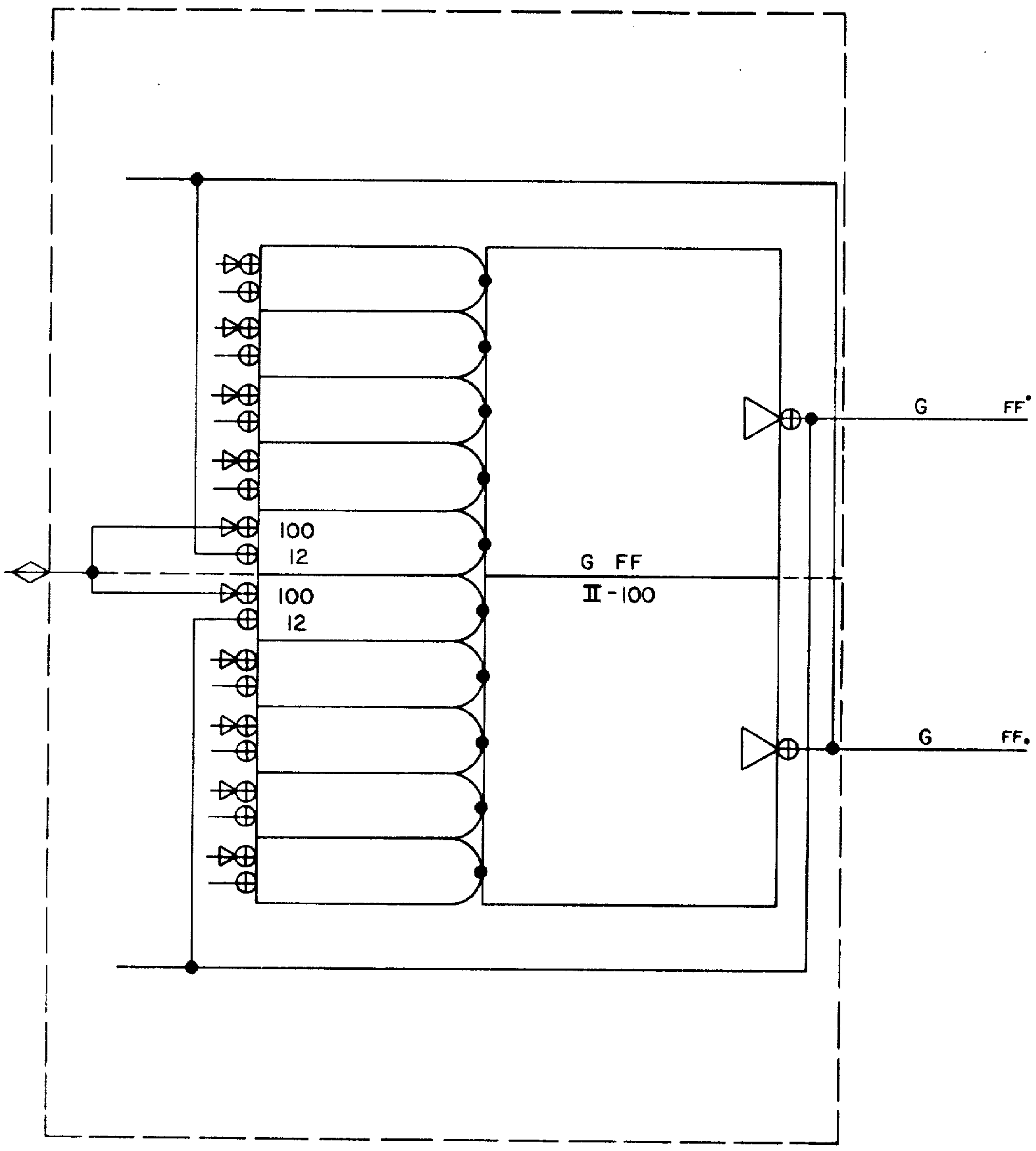
Figure 142:
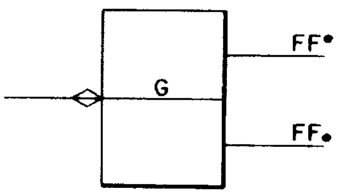
Figure 143:
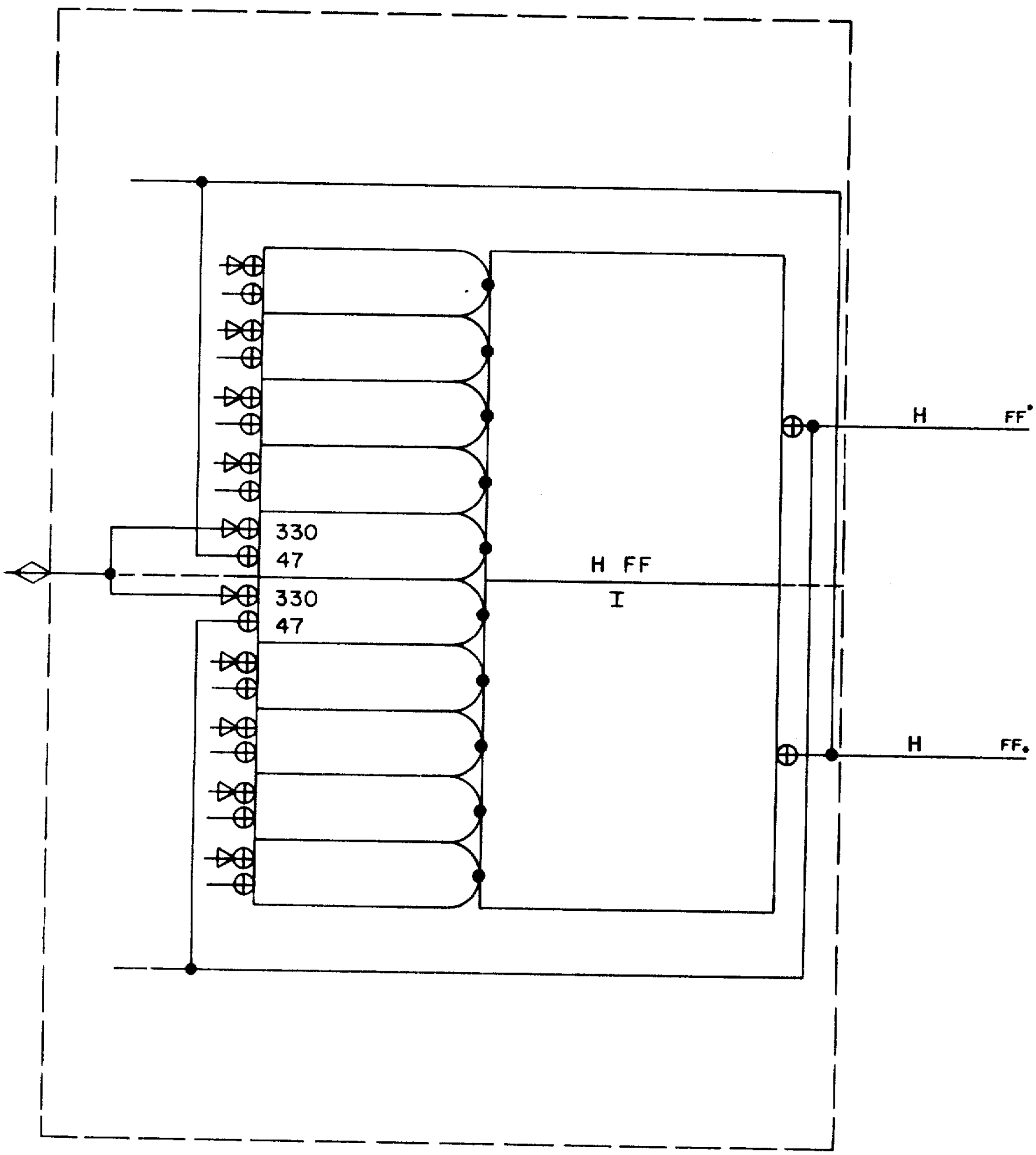
Figure 144:
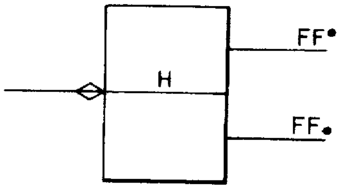
Figure 147:
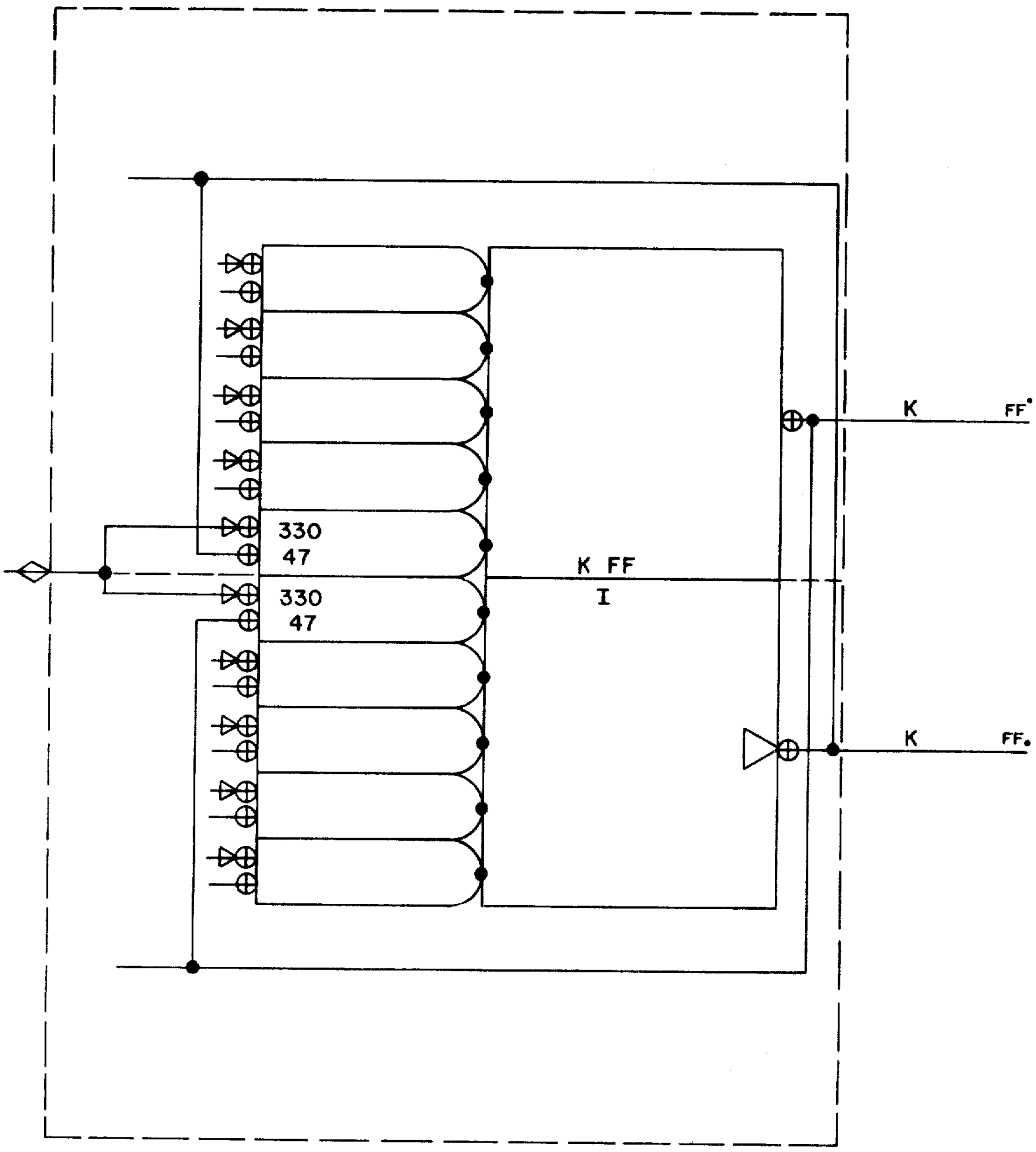
Figure 148:
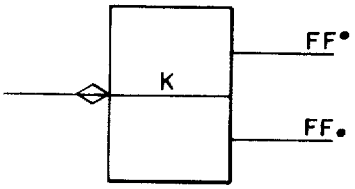
Figure 149:
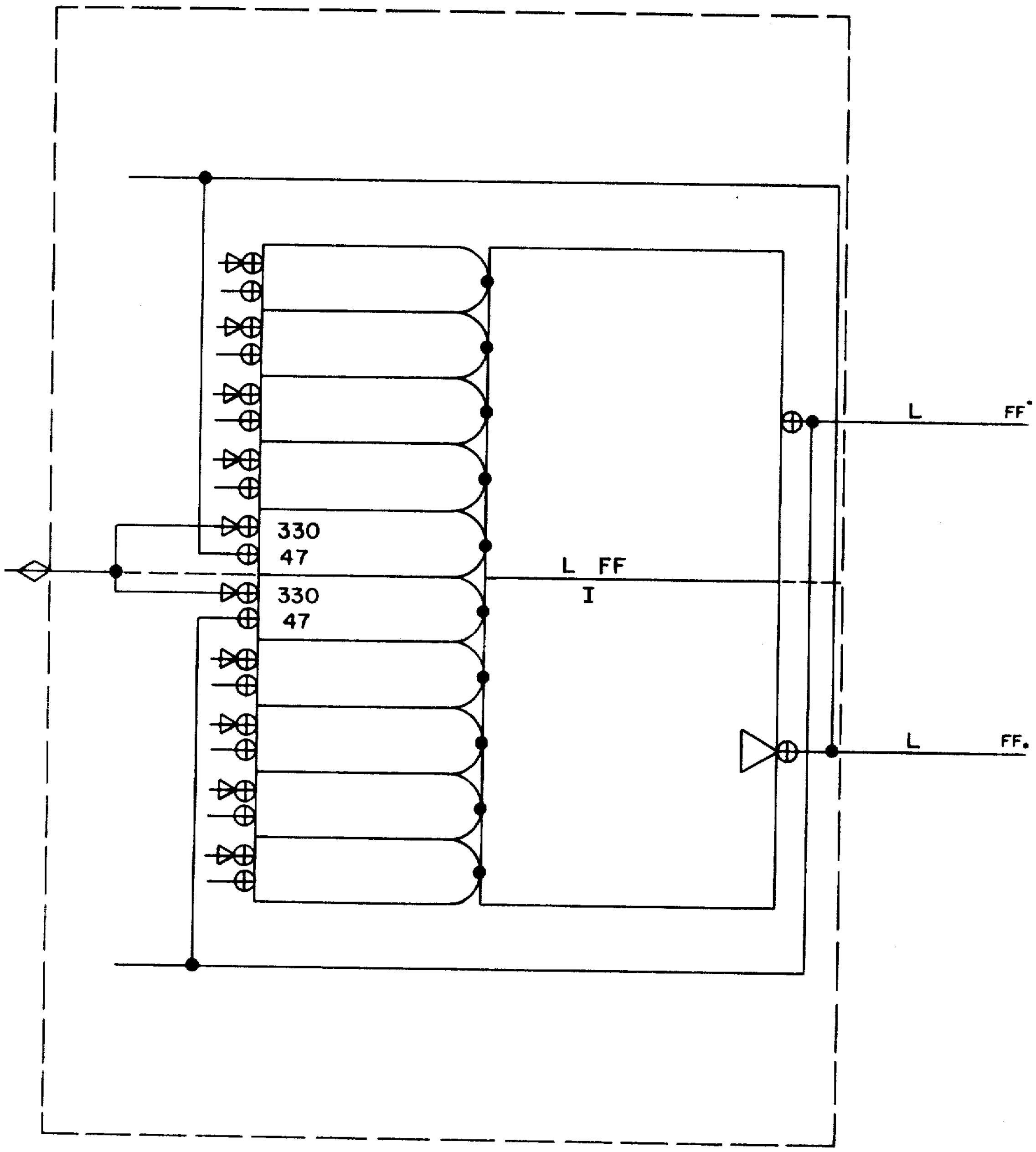
Figure 150:
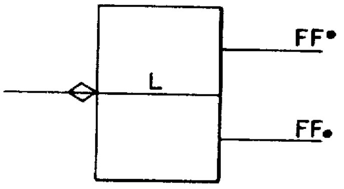
Figure 151:
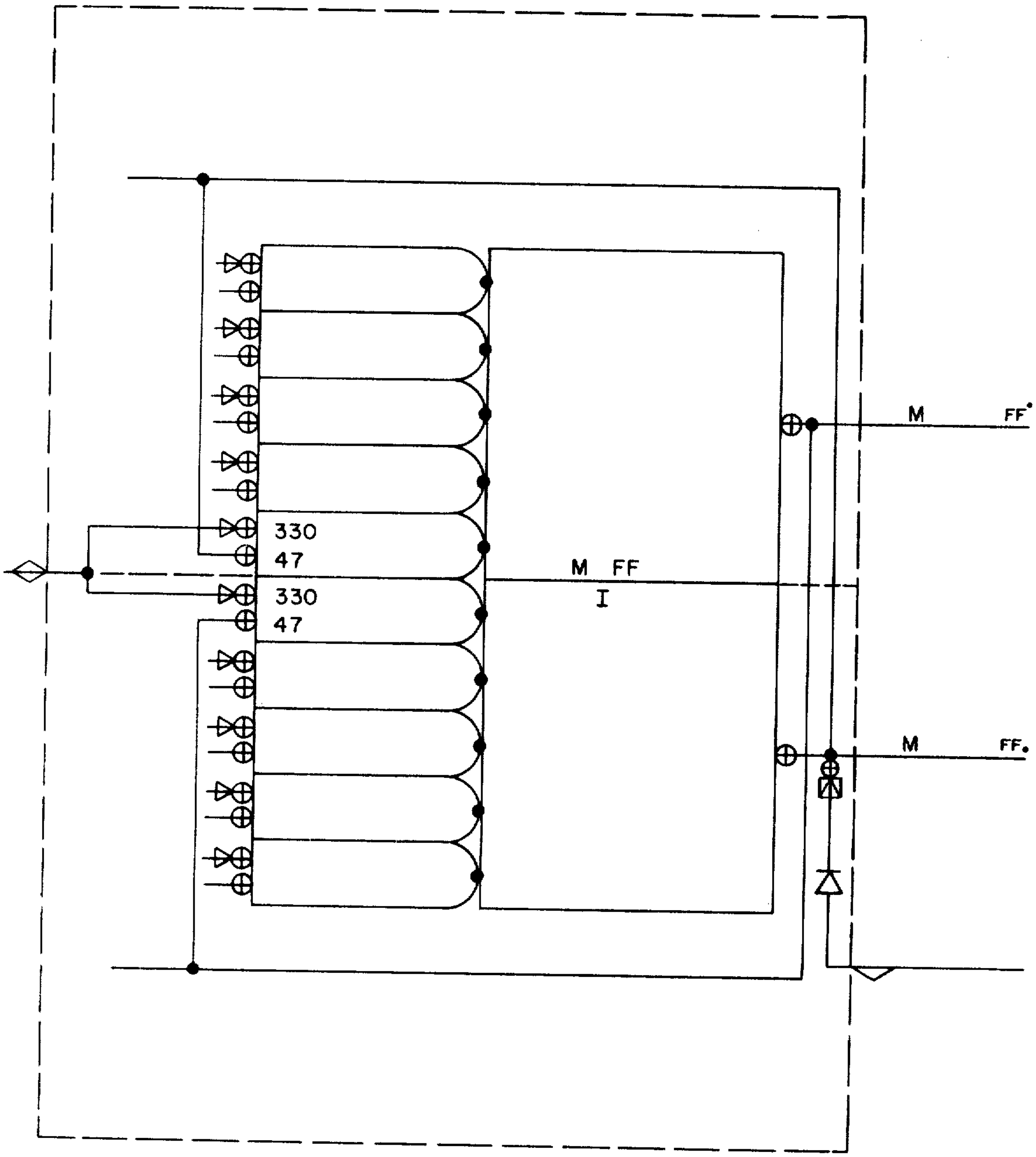
Figure 152:
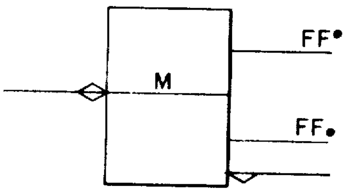
Figure 153:
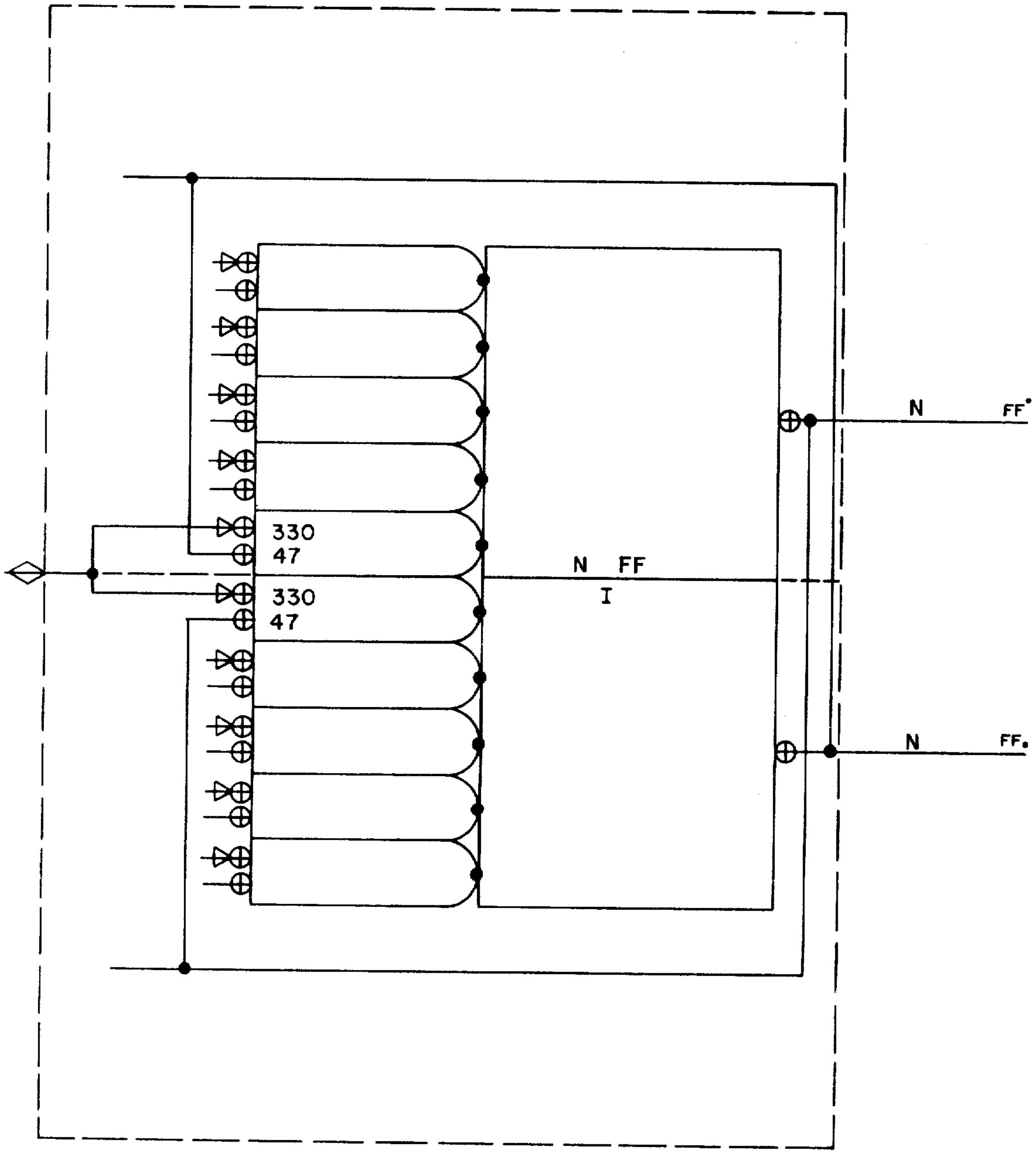

As an example of these conventions, reference should be had to FIG. 103. The expression "II–47" appearing at the center of the basic flip-flop block symbol of this figure indicates that the basic flip-flop is of the II-type, and has 47 picofarad speedup capacitors (see $C_s$ in FIG. 5). The dynamic gate symbol in the upper left-hand corner of FIG. 103, like all of the dynamic gate symbols herein, represents a variant of the circuit shown in FIG. 8. The specific variant of the circuit shown in FIG. 8, which is represented by the dynamic gate symbol in the upper left-hand corner of FIG. 103 may be deduced therefrom as follows: First, the numbers "100" and "12" found within the "box" of this dynamic gate symbol indicate that the gate capacitor in the circuit corresponding to this dynamic gate symbol has a value of 100 picofarads, and that the gate resistor of this circuit has a value of 12 kilohms. Second, the absence of a delta symbol (Δ) preceding the number "12" in this dynamic gate symbol indicates that the gate resistor of the corresponding circuit is not shunted by a speedup diode. Third, the PT-signal symbol located upon the upper input lead of this dynamic gate symbol, and tangent thereto, indicates that the signal necessary upon this line to produce gating action is a positive-going transition. The presence of this PT-signal symbol on this upper input lead also indicates that the upper input lead is the input lead connected to one terminal of the gate capacior. It should be noted at this point that, whenever a dynamic gate block symbol is shown herein, the upper input lead is the A.C. input lead, i.e., the lead to one terminal of the gate capacitor. Thus, wherever a dynamic gate block symbol is shown herein, the lower input is the D.C. lead, i.e., the lead to one terminal of the gate resistor.

The lower input lead of the dynamic gate block symbol in the upper left-hand corner of FIG. 103 may be seen to have a PL-signal symbol located thereupon, and tangent to the gate symbol outline. This PL-signal symbol on the lower input lead of the dynamic gate symbol indicates that a positive level signal is the signal necessary upon this lower input lead of the dynamic gate to produce a signal at the output of the gate.

Fourth, the curved end of the "box" of this upper left dynamic gate symbol in FIG. 103 passes through the dot representing the upper B terminal of the basic flip-flop. From this it may be deduced that this upper left dynamic gate in FIG. 103 has a single gate diode, $D_g$, the cathode of which is directly connected to the B· terminal of the basic flip-flop, i.e., to one terminal of a 330 ohm resistor in the basic flip-flop which has its other terminal connected directly to the base of the right-hand transistor of the basic flip-flop.

FIG. 10 shows the form of dynamic gate block symbol used herein to represent the multi-output dynamic gates used in conjunction with the Entry Phase Counter. The outline, or "box" of this symbol q is of the same shape as the "box" consituting a part of the dynamic gate symbol shown in FIG. 9. In FIG. 10, as in all dynamic gate symbols herein, the upper lead e is the A.C. lead, i.e., the lead attached to one terminal of the gate capacitor, while the lower input lead f is the D.C. lead, i.e., the lead attached to one terminal of the gate resistor. To simplify the dynamic gate symbol of FIG. 10, the lower, or D.C., input lead has no signal symbol located thereupon, while the upper, or A.C., lead has only a T-signal symbol located thereupon, rather than a complete PT-signal symbol. The signal symbol is omitted from each of these input lines in FIG. 10 (see dynamic gates in FIG. 9) because, upon consideration of FIG. 8, the only combination of input signals to the dynamic gate as defined herein which will produce a significant output signal is a positive-going transition on the A.C. input and a positive level signal on the D.C. input. Thus, the positive nature of the transition and level input signals necessary to cause the operation of the gate of FIG. 10 is apparent by necessary implication from FIG. 8, and need not be signified on the input leads of the dynamic gate symbol of FIG. 10. The same combination of inputs is necessary, of course, to operate the single-output type dynamic gate signified by the dynamic gate symbol shown in FIG. 9 and, thus, the positive level and positive-transition indicating signal symbols on the inputs of the dynamic gate symbols of FIG. 9 may be eliminated where confusion will not result. The two numbers found within the outline of a dynamic gate symbol of the type shown in FIG. 10 represent the value of the gate capacitor and the value of the gate resistor, respectively, in the same manner described in connection with the numerals located within the outlines of the dynamic gate block symbols of FIG. 9. The circuit configuration corresponding to the three output terminals of the block symbol of FIG. 10 *h, j, k* may be found by the reference to the same identifying lettters in FIG. 8.

Figure 156:
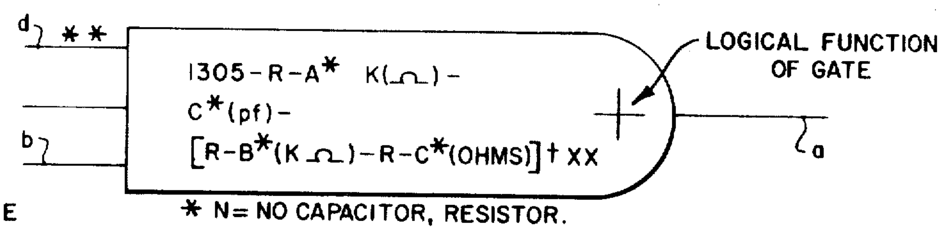
Figure 158:
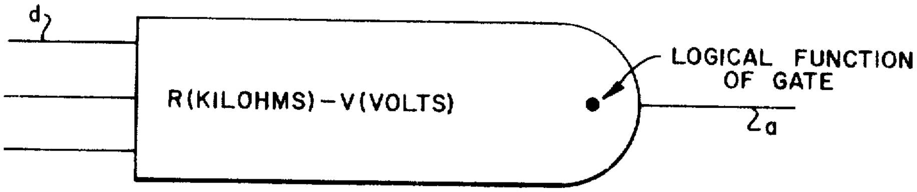

From FIGS. 156, 158, etc. it may be seen that the static gate block symbols used herein have the same outline, or "box," as is used to represent the dynamic gates. The dynamic gates shown in the drawings, however, may be distinguished from a static gate by the following characteristics. First, the two numbers found within the outline of a given dynamic gate symbol, and which represent the values of the gate capacitor and resistor, are located one-above the-other, and are not separated by a hyphen, as is the case with the component value identifying numbers found within the outlines of the static gate block symbols herein.

Second, the upper input terminal of every dynamic gate symbol will have an arrow-shaped T-signal symbol located thereupon, either as part of a more specific signal symbol, or alone. The static gate block symbol shown herein, on the other hand, will never have transition signal symbols located thereupon.

As noted hereinabove, the signal symbols found at the two inputs of the dynamic gate block symbols represent the only combination of input signals which will bring about the production of a significant output signal from the dynamic gate. The term "significant output signal" as used in connection with the dynamic gates means an output signal which, when applied to one of the B terminals of a basic flip-flop, will cut off the transistor associated with that B terminal, if that transistor is not already cut off.

It should be clearly understood at this point that the significance of the signal symbols tangent to static gate block symbols is different from the significance of signal symbols tangent to dynamic gate block symbols. Generally speaking, each signal symbol tangent to a static gate block symbol represents the electrical value of "1," i.e., logical one, at the point of tangency, i.e., on the lead passing into the static gate block symbol through that signal symbol, and the point of tangency.

11.1.1. Flip-Flop Definition Sheets: Each of the composite flip-flops listed in Table FF (Appendix L) is defined respectively in a single sheet of the drawings, containing two figures. These sheets are called "flip-flop definition sheets." The larger, odd-numbered, figure on each of these flip-flop definition sheets is a schematic circuit diagram of the composite flip-flop defined on that sheet. These schematic circuit diagrams are composed of the block symbols of basic flip-flops, dynamic gates, etc., as defined hereinabove. Thus, these schematic circuit diagrams may be interpreted in view of the more basic block symbols as defined hereinabove, and complete wiring diagrams of each composite flip-flop listed in Table FF derived thereby.

In addition to the odd-numbered circuit schematic figure on each of the flip-flop definition sheets, there is also a second, smaller, even-numbered figure showing a block symbol used to represent the circuit schematized in the odd-numbered figure.

11.1.2 Composite Flip-Flop Input Definition Sheets: Study of the above-mentioned flip-flop definition sheets, and comprehension of the system drawings including a large plurality of composite flip-flop block symbols is greatly facilitated by preliminary consideration of the relatively limited number of input types used in conjunction with composite flip-flop block symbols. Therefore, "flip-flop input definition sheets" are provided, viz., those sheets including FIGS. 11 through 30, and are considered first before discussion of the flip-flop definition sheets. Like the flip-flop definition sheets, each of these flip-flop input definition sheets contains two figures, one even-numbered and one odd-numbered. The larger, odd-numbered figure on each flip-flop input definition sheet is a schematic circuit diagram of a composite flip-flop having only one type of input. The smaller, even-numbered figure on each of the flip-flop input definition sheets is a block symbol representing the flip-flop circuit shown in the odd-numbered figure on the same sheet.

Figure 11:
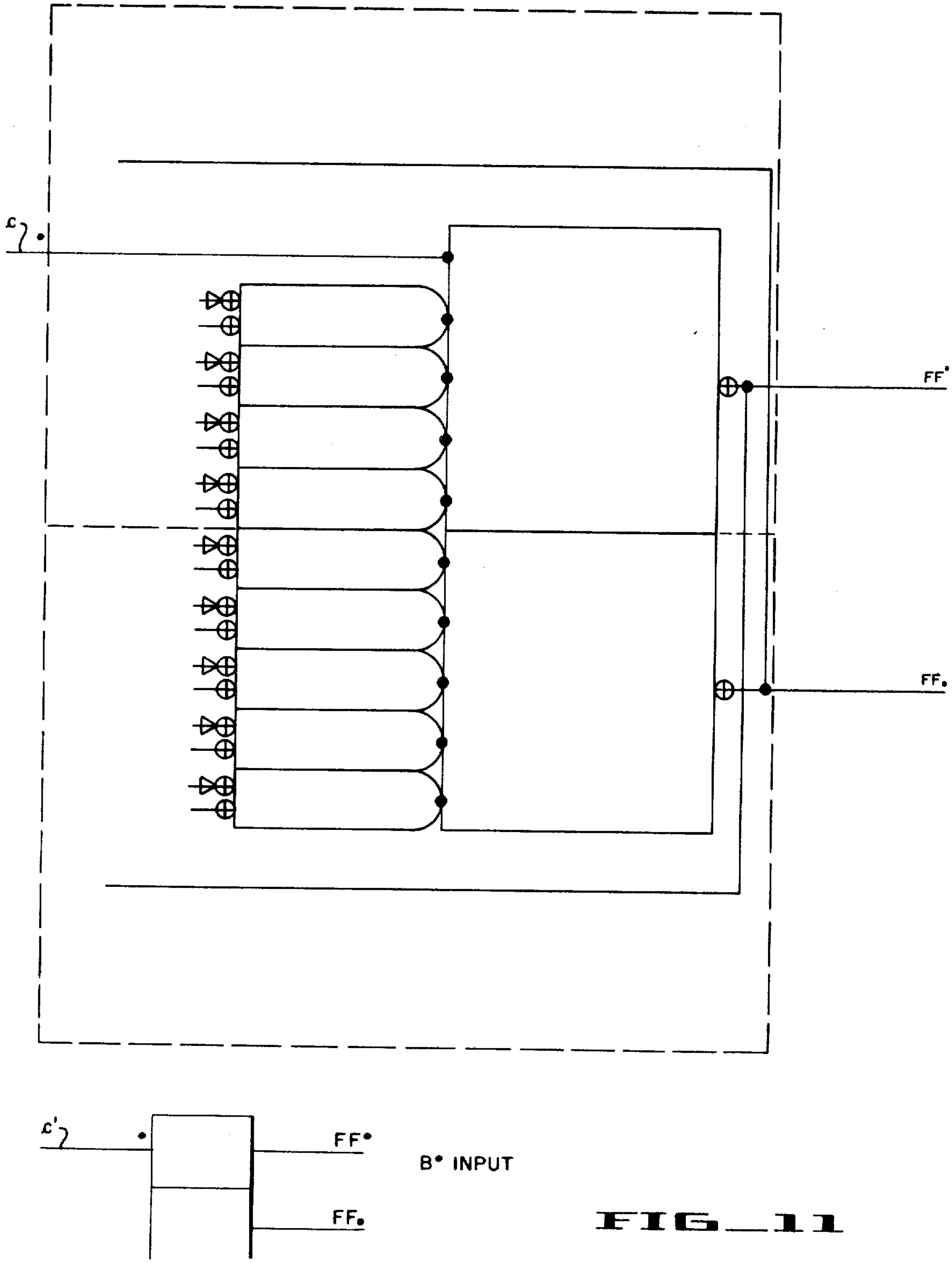

11.1.3. B· Input: The sheet containing FIGS. 11 and 12 defines the type of input hereinafter called a "B· input." FIG. 11 shows a basic flip-flop block symbol (either I or II) and a plurality of dynamic gate block symbols, both contained within a dash-lined rectangle. This dash-lined rectangle, hereinafter called a "phantom outline," corresponds to the solid-line rectangle of the block symbol of FIG. 12. The dash-line extending across the "waist" of the phantom outline corresponds to the solid line extending across the "waist" of the block symbol of FIG. 12. By this means, the leads extending from the edges of the block symbol of FIG. 12 may be identified with leads extending through the edges of the phantom outline and connected with the schematic circuit diagram inside the phantom outline in FIG. 11. Thus, it may be seen that the output lead extending from the block symbol of FIG. 12 and labelled FF· is a lead extending from the FF· terminal of the basic flip-flop shown in the schematic circuit diagram of FIG. 11. Similarly, it may be seen by comparison of FIGS. 11 and 12, that the lead extending from the block symbol of FIG. 12 and labelled "FF." is a lead extending from the FF. terminal of FIG. 11.

Extending from the upper half of the left, or input, edge of the block symbol of FIG. 12, there is shown a lead having a dot placed immediately thereabove and adjacent the block symbol. Going, then, to the upper half of the left edge of the phantom outline of FIG. 11, there is shown extending therefrom a lead having a dot placed immediately thereabove and adjacent to the phantom outline, which lead corresponds directly to the similar lead shown extending from the block symbol of FIG. 12. Having identified this lead extending from the phantom outline with its corresponding lead in FIG. 12, the input connection to the circuit schematized in FIG. 11 which the corresponding lead in FIG. 12 represents may be deduced. Going to FIG. 11, it is seen that this lead extends within the phantom outline to the uppermost B· terminal of the basic flip-flop contained therein. Thus, the single input lead shown in FIG. 12 is identified as representing a lead connected directly to a B· input of the basic flip-flop.

It should also be noted in connection with FIG. 11 that none of the dynamic gate block symbols connected therein has leads extending out through the phantom outline. Thus, these nine dynamic gate block symbols should be ignored, and should not be interpreted as a necessary part of the circuit shown schematically in FIG. 11. Similar groups of dynamic gate block symbols, having no connections outside the phantom outline, will be found throughout the definition sheets, and should be ignored, and not considered to be a necessary part of the circuit schematized in the odd-numbered figures of those sheets.

Similarly, two leads are shown extending from the FF terminals of the basic flip-flop and parallel to the end of the basic flip-flop remote from the FF terminal to which they are connected. The lead running upward from the FF. terminal of the basic flip-flop, and across the top of the basic flip-flop, is hereinafter called the "FF. bus." The lead running downward from the FF· terminal of the basic flip-flop, and across the bottom of the basic flip-flop, is hereinafter called the "FF· bus." When nothing is connected to these leads, or either one of them, except its corresponding FF terminal, the bus should be ignored, and should not be considered to be a necessary part of of the circuit schematic.

11.1.4 B. Input: The second flip-flop input definition sheet, viz., the sheet containing FIGS. 13 and 14, defines the B. input. The only input to the block symbol of FIG. 14 is a lead extending from the lower half of the left edge of that block symbol and having a dot placed directly therebelow and adjacent the outline. Correspondingly, the only input lead shown passing through the left edge of the phantom outline of FIG. 13 passes through the lower half thereof, and has a dot located below it and adjacent the phantom outline. Thus, it is apparent that the input lead shown in FIG. 14 corresponds to the input lead shown in FIG. 13, and that, wherever a composite flip-flop block symbol is found having a lead with a dot placed therebelow as in FIG. 14, this lead may be interpreted as having attached thereto the connection to a basic flip-flop shown within the phantom outline of FIG. 13. A lead with a dot placed therebelow, as shown in FIG. 14, may be interpreted, then, to be connected to one of the B. terminals of the basic flip-flop of the composite flip-flop denoted by the block symbol.

As noted hereinabove, the nine dynamic gate block symbols, and the FF· and FF. busses may be ignored, since they are not interconnected with anything outside the phantom outline shown in FIG. 13.

Figure 15:
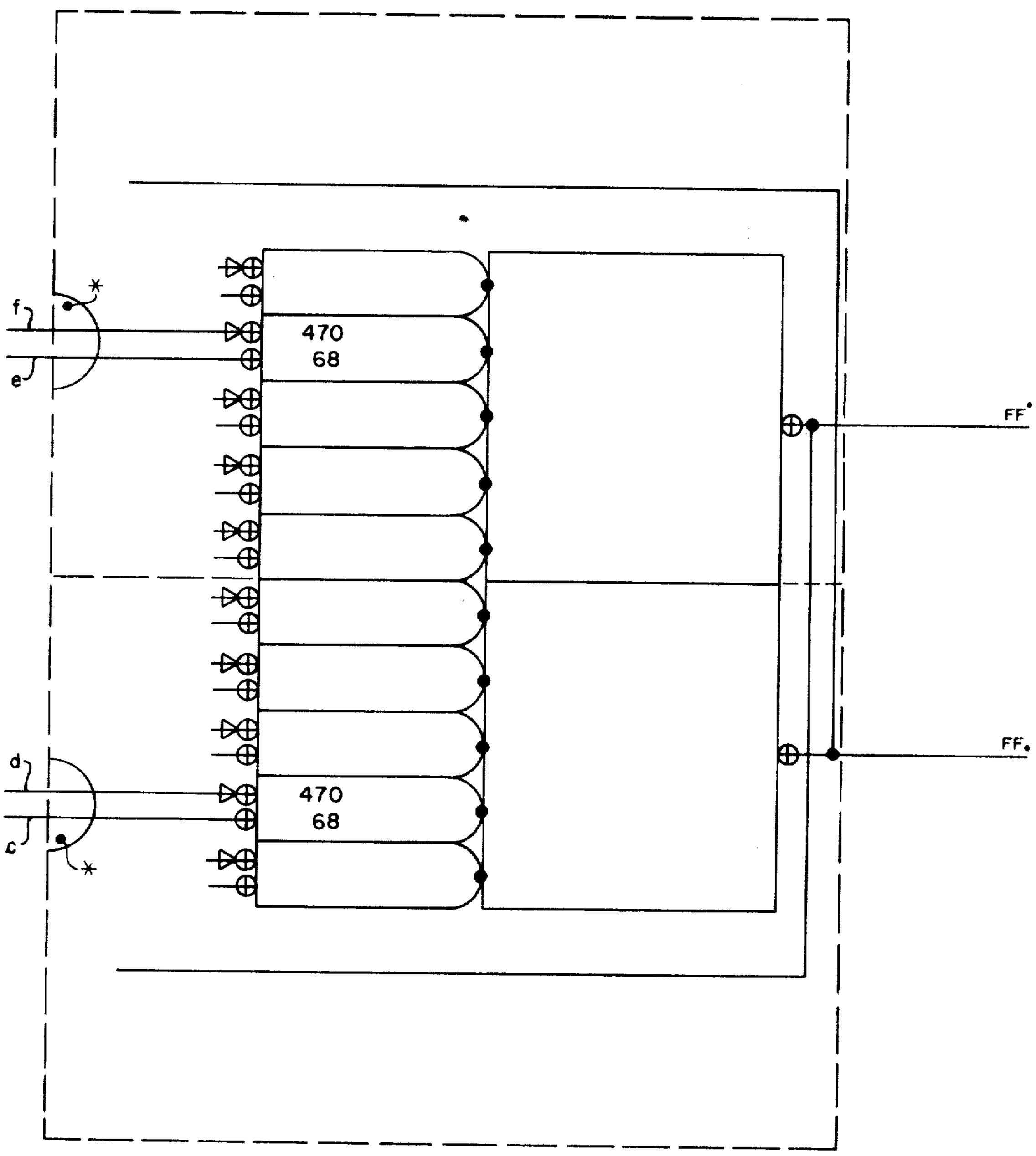
Figure 16:
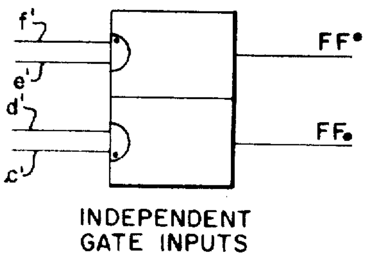

11.1.5. Independent Gate Inputs: The third flip-flop input definition sheet, viz., the sheet containing FIGS. 15 and 16, defines the type of composite flip-flop inputs known hereinafter as "independent gate inputs." Comparison of FIGS. 15 and 16 shows that a pair of leads *e*, *f* enters the true input segment (see FIG. 332) of the phantom outline of FIG. 15, and that a corresponding pair *e'*, *f'* extends from the true input segment of the symbol outline of FIG. 16. In both FIGS. 15 and 16 these pairs of leads are identified by a semicircle lying within the outline and having as its diameter that portion of the true input segment contacted by the pair of leads. This semicircle will hereinafter be called the "gate," or "gate semicircle." Further comparison of FIGS. 15 and 16 shows that a pair of input leads *c*, *d* enters the inverse input segment (see FIG. 332) of the phantom outline of FIG. 15, while a corresponding pair of input leads *c'*, *d'* extends from the inverse input segment of the symbol outline of FIG. 16. Corresponding gate semicircles identify the *c* and *d* input leads as an associated pair, and identify the *c'* and *d'* input leads as an associated pair.

Having thus identified the leads *e*, *f*, *d*, and *c* as corresponding to the leads *e'*, *f'*, *d'*, and *c'*, respectively, the meaning of the input lead pairs, and associated gate semicircles, as shown in FIG. 16, becomes apparent. That is, a pair of input leads extending from a gate semicircle in the true input segment of a flip-flop block symbol should always be understood to signify that these two leads are connected to the two input terminals of a dynamic gate which has its output connected to one of the B· terminals of the basic flip-flop constituting part of the composite flip-flop definition sheet corresponding to that block symbol will disclose the values of the gate capacitor and gate resistor of the particular dynamic gate associated with a given pair of independent gate leads. Thus, as shown by way of example only in FIG. 15, the *f* lead may be seen to be connected to the one terminal of a 470 picofarad gate capacitor, while the *e* lead may be seen to be connected to one terminal of a 68 kilohm gate resistor. Comparison of the block symbol of FIG. 16 with the schematic circuit diagram of FIG. 15 will, then, show by implication that the *f'* terminal is directly connected to one terminal of a 470 picofarad gate capacitor, and that the *e'* terminal is directly connected to one terminal of a 68 kilohm gate resistor; the output of the gate comprising these resistors being directly connected to the B· terminal of the corresponding basic flip-flop.

Similarly, input terminal *d'* may be found by comparison of FIGS. 16 and 15 to be directly connected to one terminal of a 470 picofarad gate capacitor, and input terminal *c'* may be thus seen to be directly connected to one terminal of a 68 kilohm gate resistor. The dynamic gate deriving its inputs from the *c'* and *d'* terminals may be seen from FIG. 15 to have its output directly connected to a B. terminal of the corresponding basic flip-flop.

The circuit values given in FIG. 15 are exemplary only, and independent gate circuits will be found herein having other component values.

The additional convention is defined in FIGS. 15 and 16 of placing a dot in the uppermost portion of a gate semicircle when it is desired to show that the output of the corresponding dynamic gate is directly connected to a B· terminal of the corresponding basic flip-flop, and placing a dot in the lower end of a gate semicircle when it is desired to imply that the corresponding dynamic gate has its output directly connected to a B. terminal of the corresponding basic flip-flop. As indicated by the note placed below the phantom outline of FIG. 15, however, this dot notation convention is employed only where ambiguity would otherwise result, e.g., when it is necessary by reason of space limitations to place an independent gate input symbol implying a dynamic gate connected to a B· terminal, i.e., a "superdot independent gate input symbol," in the inverse input segment of the corresponding flip-flop block symbol, or vice versa. This dot notation is not employed herein when a superdot independent gate input symbol can conveniently be placed in the true input segment of the corresponding flip-flop block symbol, nor when a subdot independent gate input symbol can conveniently be placed in the inverse input segment of the flip-flop block symbol.

11.1.6. Left Set Input: The flip-flop input definition sheet containing FIGS. 17 and 18 defines that type of composite flip-flop input which will hereinafter be designated a "left set input." Interpreting this sheet in the manner in which the previous flip-flop input definition sheets have been interpreted hereinabove, it will be understood that any lead and triangular symbol of the type shown at *c'* should hereinafter be taken to imply the circuitry, but not the specific component values, shown within the phantom outline of FIG. 17 and connected to lead *c*. Such a small, triangular symbol as is shown on leads *c* and *c'*, i.e., having its base on an input lead, and one of its vertices on the outline, or "box," of the flip-flop block symbol, will hereinafter be designated a "ground arrow" for reasons which will become apparent hereinafter. The ground arrows shown on inputs leads *c* and *c'* may be thought of as "upwardly pointing" or "upwardly directed," because their uppermost vertices are located above the input leads in which their bases are located. Correspondingly, similar ground arrows found hereinafter having their lowermost vertices located below their bases will be referred to as "downwardly pointing," or "downwardly directed."

Figure 18:
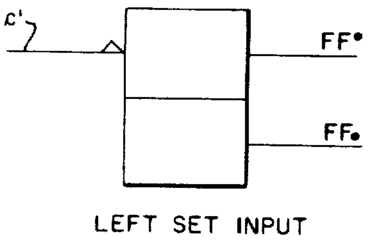

From the above, it may be seen that any flip-flop input lead having an upwardly pointing ground arrow, as shown in FIG. 18, is impliedly directly connected to the A.C. input terminal of a dynamic gate, the D.C. input terminal of that gate being directly connected to the FF. terminal of the corresponding basic flip-flop, and the output of that gate being directly connected to a B· terminal of the corresponding basic flip-flop.

The name "ground arrow" is given to the symbol appearing upon leads *c* and *c'* because this symbol may be thought of as an arrowhead indicating the direction, i.e., from the FF. terminal to the FF· terminal in which nominal ground will move in response to a suitable PT-signal applied to the *c* or *c'* lead, i.e., if nominal ground is not already on the FF· terminal. Similarly, downwardly directed ground arrows (see FIGS. 19 and 20) may be thought of as indicating the direction in which nominal ground will move in response to a suitable PT-signal upon the lead bearing the downwardly directed ground arrow.

11.1.7. Left Reset Input: The sheet containing FIGS. 19 and 20 defines that type of input hereinafter designated "left reset input." Comparison of FIGS. 19 and 20 shows that the input terminal labeled "*c*" in FIG. 20 corresponds to the input terminal labeled "*c*" in FIG. 19. From this correspondence it may be seen that any flip-flip input lead having a downwardly pointing ground arrow, as shown in FIG. 20, implies the circuit configuration, but not the specific component values, shown within the phantom outline of FIG. 19 and connected to the *c* input terminal. Thus, any left reset input terminal, as shown in FIG. 20, associated with a flip-flop block symbol herein implies that the circuit to which that block symbol corresponds includes a dynamic gate having its A.C. input directly connected to that input terminal, having its D.C. input directly connected to the FF· terminal of the corresponding basic flip-flop, and having its output terminal directly connected to a B. terminal of the corresponding basic flip-flop.

Figure 23:
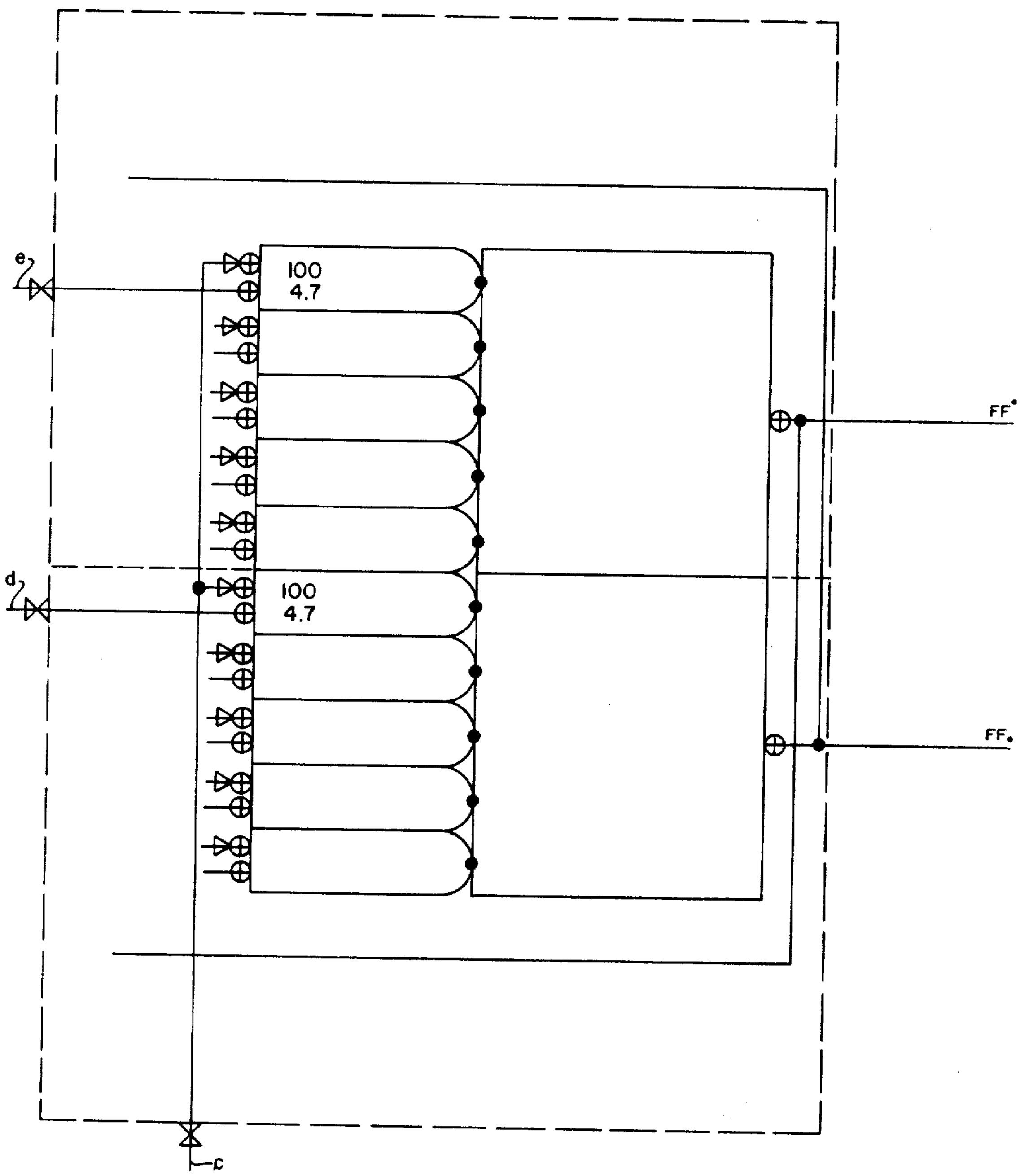
Figure 24:
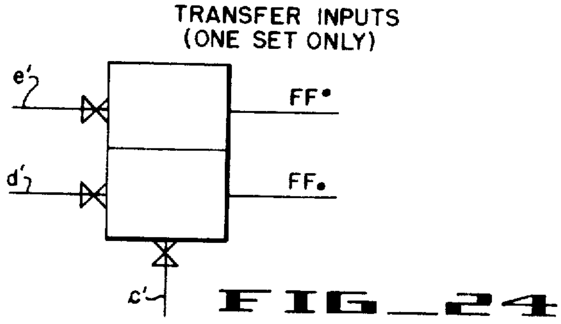
Figure 37:
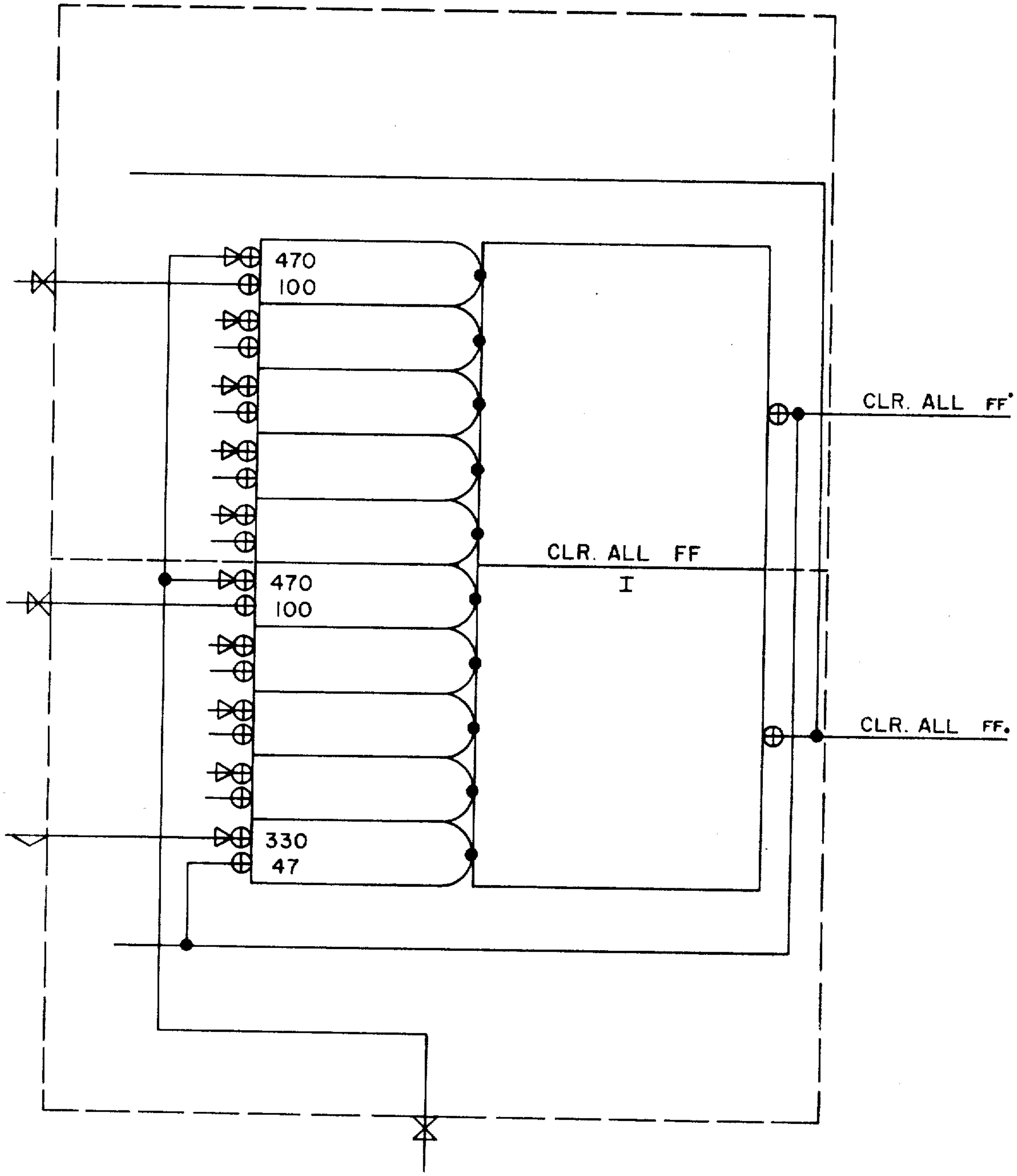
Figure 38:
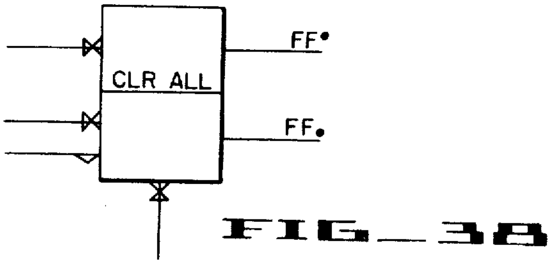
Figure 41:
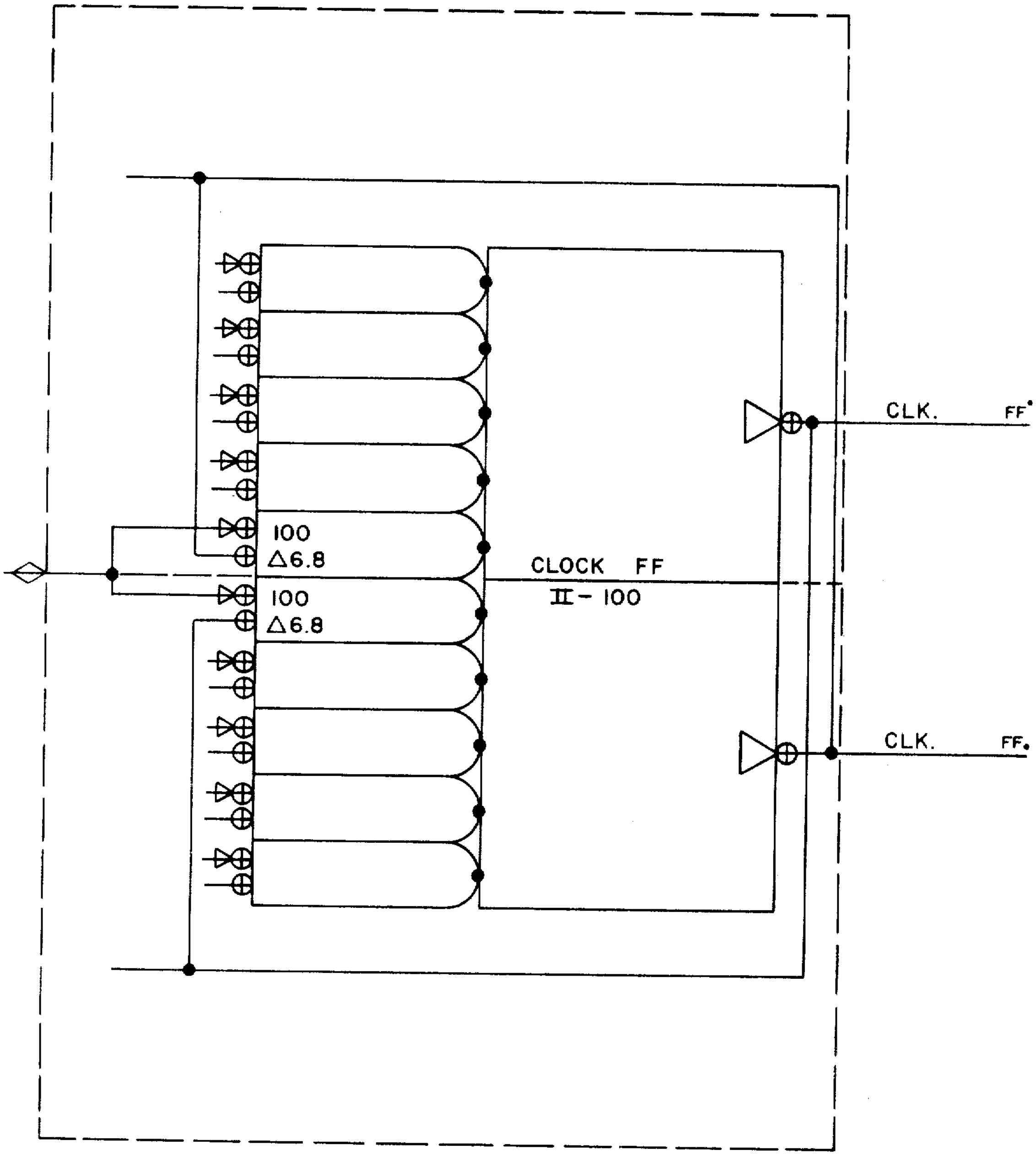
Figure 42:
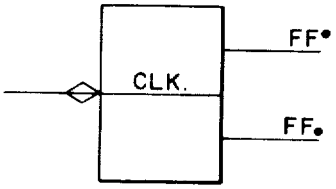
Figure 43:
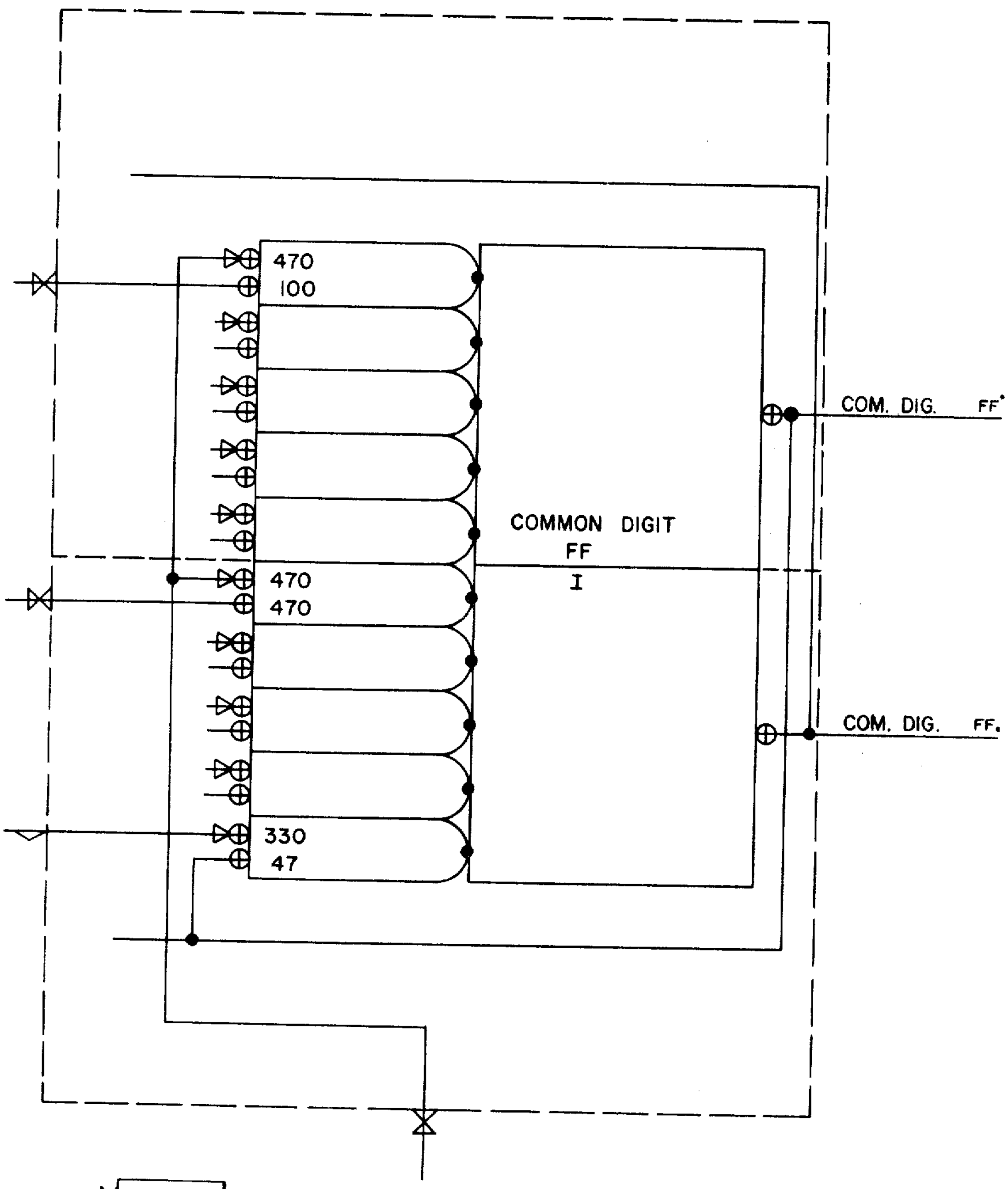
Figure 44:
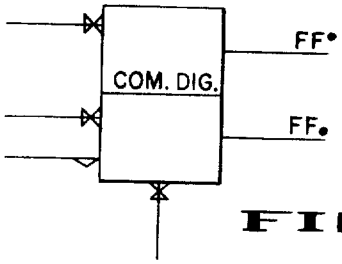
Figure 45:
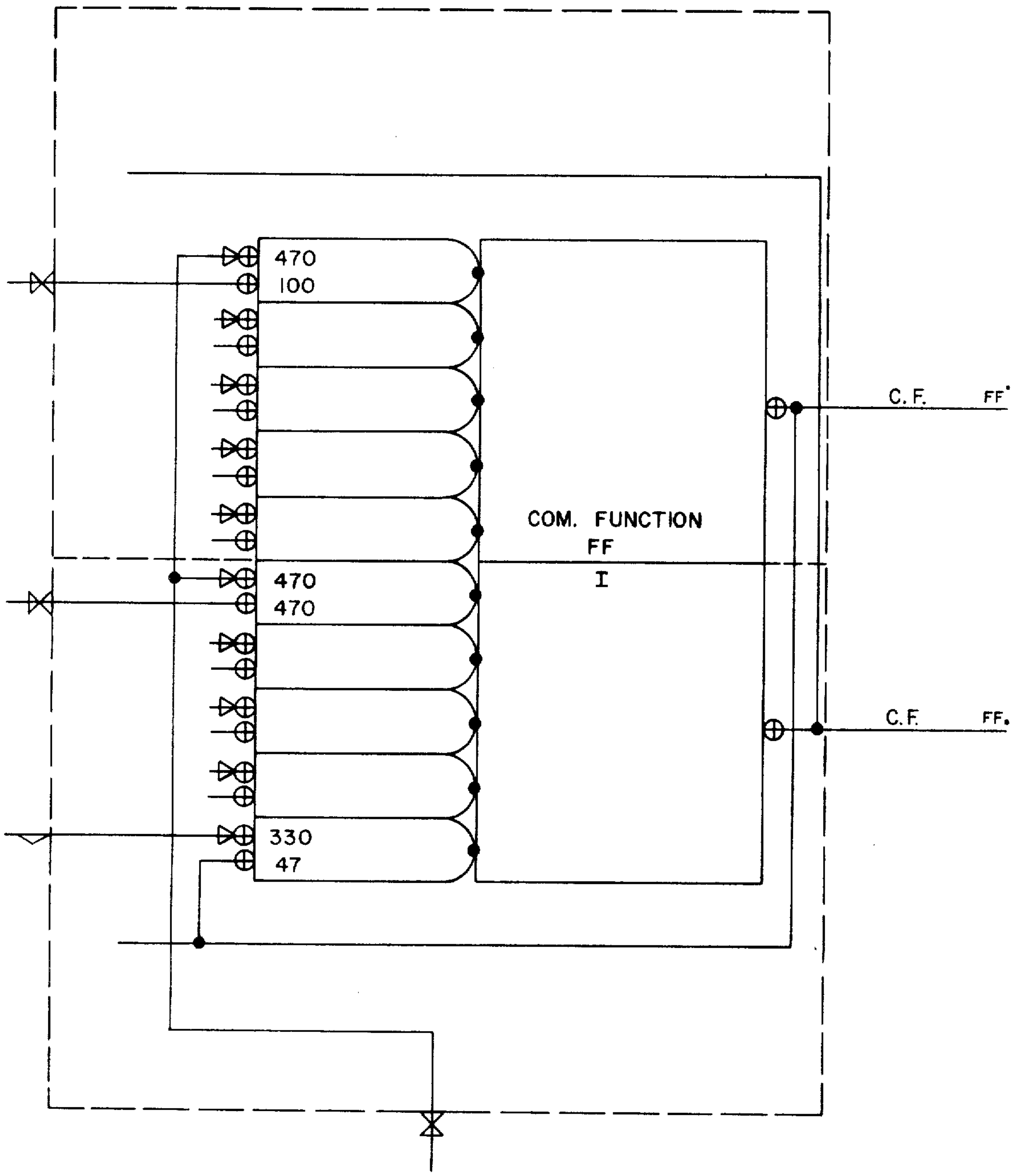
Figure 46:
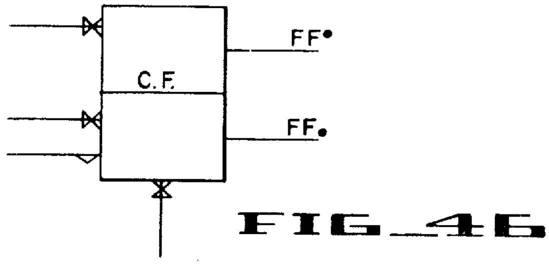
Figure 47:
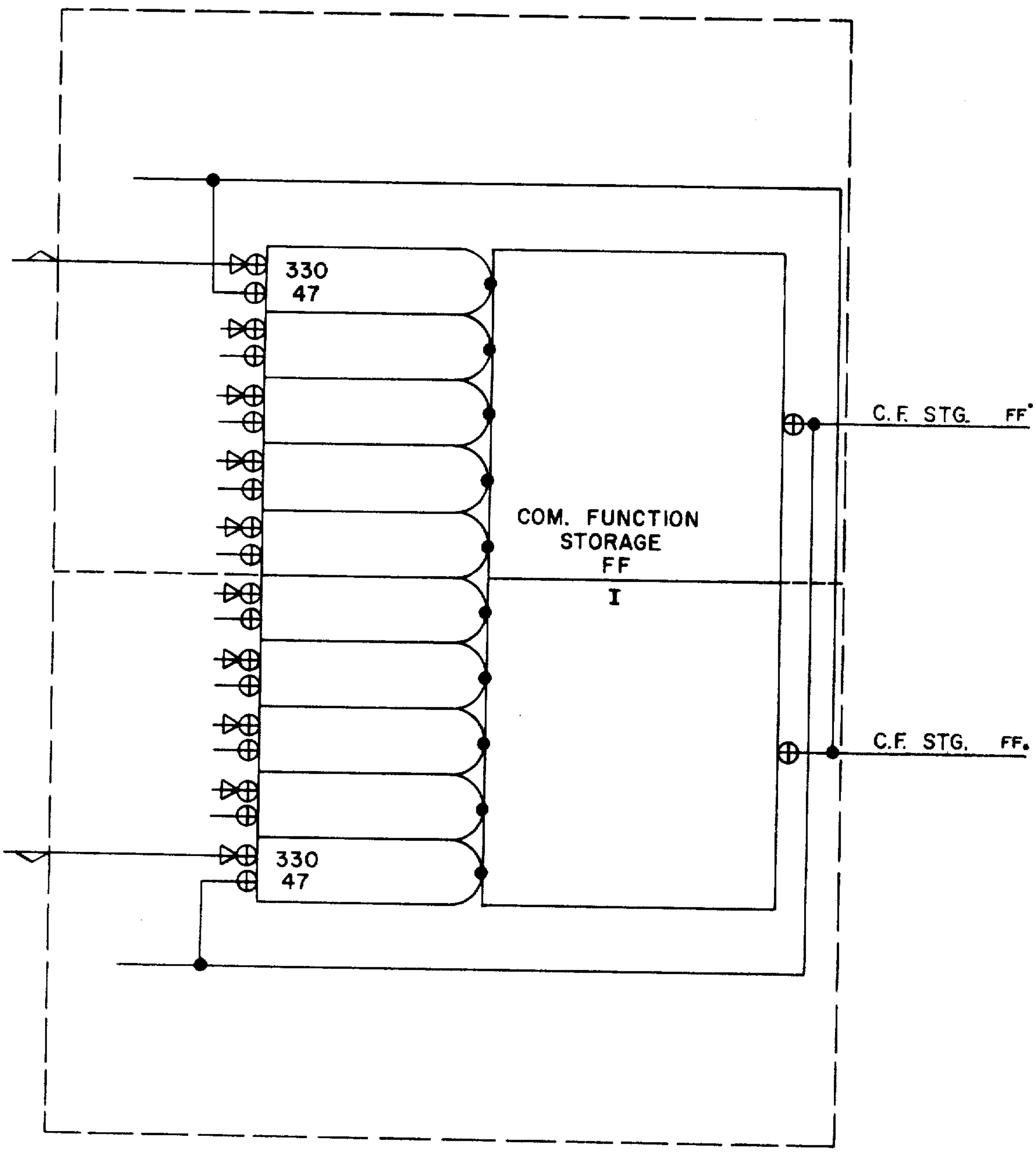
Figure 48:
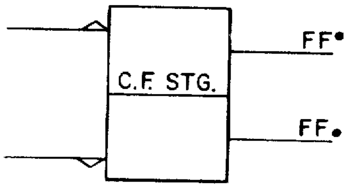
Figure 49:
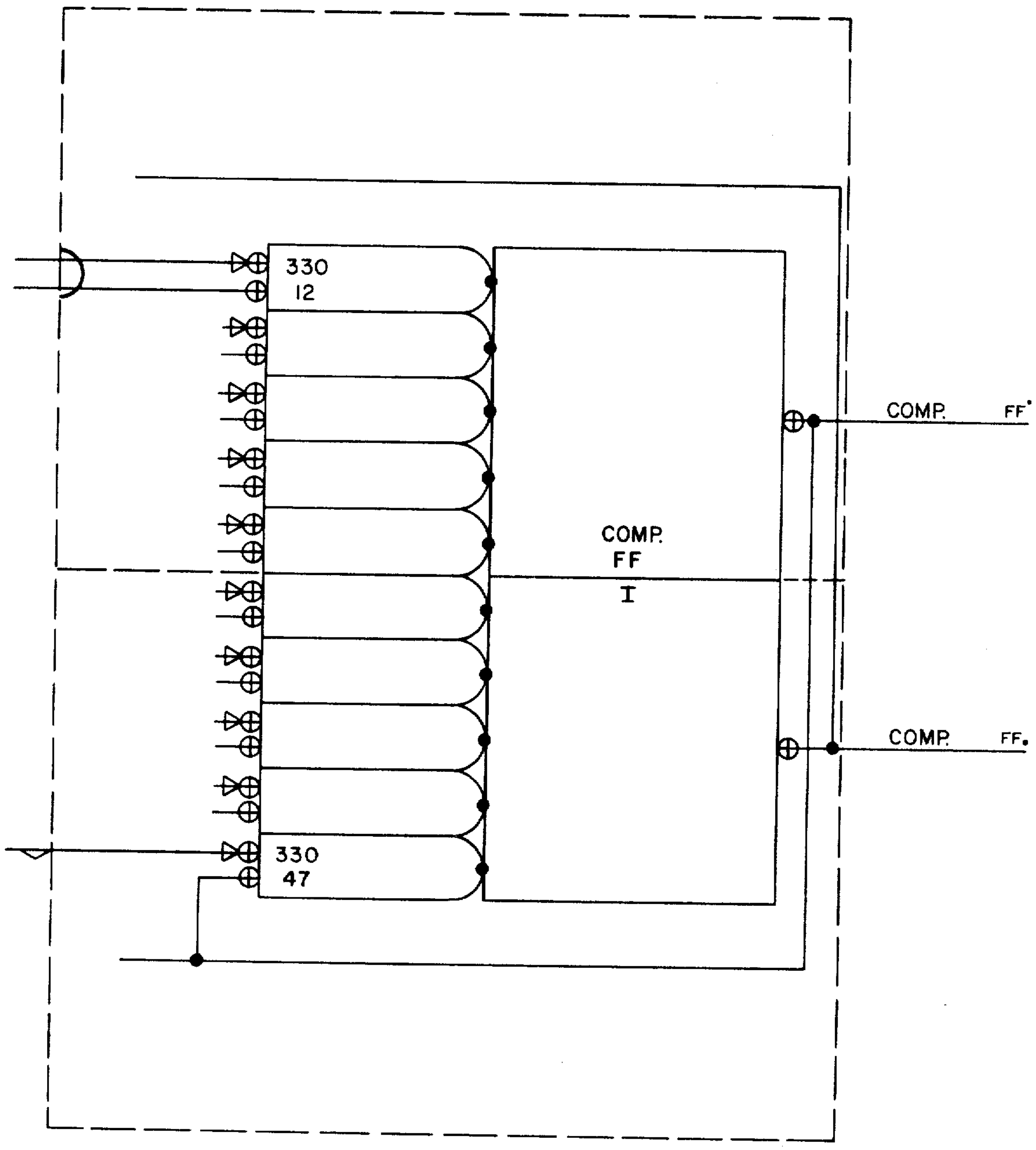
Figure 50:
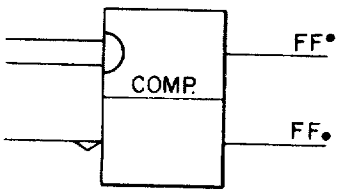

By way of illustration, only the numbers "100" and "12" are included within the block symbol of the dynamic gate shown in FIG. 19 as connected to the *c* terminal. As explained hereinabove, the number "100" implies that the A.C. terminal of this dynamic gate is directly connected to one terminal of a 100 picofarad gate capacitor, while the lower number "12" implies that the D.C. terminal of this dynamic gate is directly connected to one terminal of a 12 kilohm gate resistor. It should be understood that the numbers "100" and "12" are included in this dynamic gate block symbol in FIG. 19 merely as examples of typical gate capacitor and gate resistor values used in dynamic gates associated with reset inputs. An example of a left reset input may be found in FIGS. 37 and 38 having different gate capacitor and gate resistor values. Similarly, the gate resistor and gate capacitor values given by way of example throughout the flip-flop input definition sheets are not to be construed as the only gate capacitor and gate resistor values which may be found in dynamic gates associated with the flip-flop input types defined by those sheets. Thus, for example, the numbers "100" and "4.7" found within certain dynamic gate block symbols in FIG. 23 are not to be understood as implying that sets of flip-flop inputs defined as transfer sets must necessarily have a pair of dynamic gates associated therewith having these gate capacitor and gate resistor values, and no other. This merely exemplary status of the gate capacitor and gate resistor values indicated in the flip-flop input definition sheets must be carefully distinguished from the status of the gate capacitor and gate resistor values indicated in the flip-flop definition sheets, wherein these indicated values are definitive, and not merely exemplary.

The flip-flop input defined in the sheet containing FIGS. 19 and 20 is designated the left reset input because, first, it contacts the flip-flop symbol outline at its left, or input, edge, and, second, the proper input signal applied to it tends to "reset" the flip-flop.

In this connection, attention is again directed to the PL-signal symbols on the output terminals of the basic flip-flop, which symbols indicate that the electrical value of "1," or logical one, at both output terminals of all of flip-flops herein is the more positive of the two electrical signal levels appearing thereat.

Figure 17:
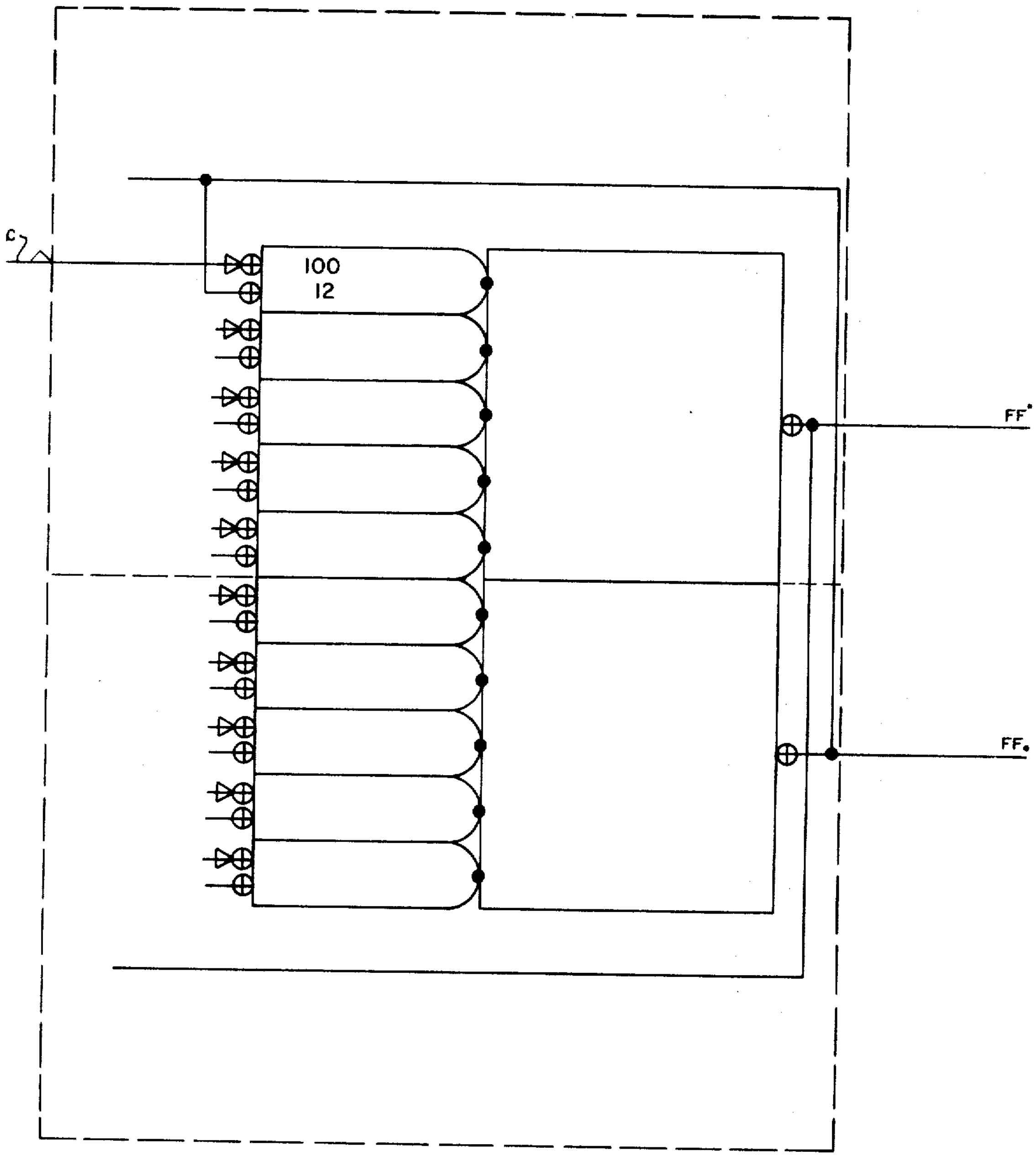

By similar reasoning, it may be seen that the left set input, as defined in the sheet containing FIGS. 17 and 18, is so designated because, first, it contacts the left edge of the flip-flop block symbol outline, and, second, the proper signal applied thereto will cause the flip-flop to assume its "set" state.

Figure 21:
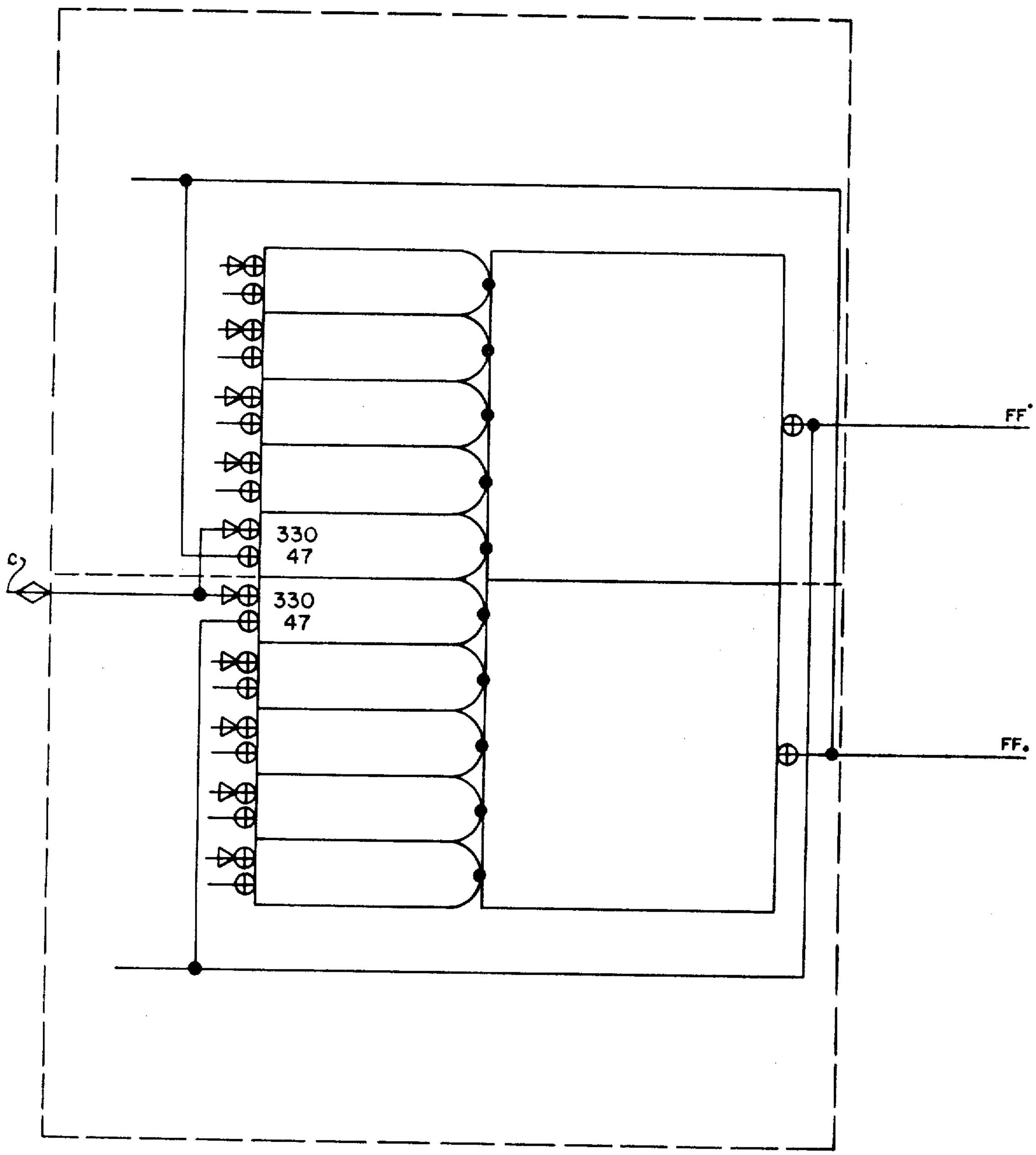
Figure 22:
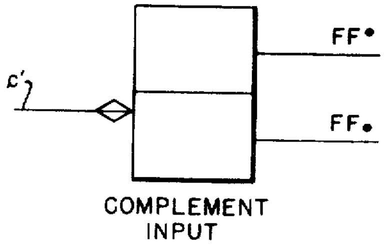

11.1.8. Complement Input: The flip-flop input definition sheet containing FIGS. 21 and 22 defines that type of flip-flop input designated a "complement input." For easy reference, the symbol found on input leads *c* and *c'* in this sheet will hereinafter be styled a "diamond," or "diamond symbol." From the correspondence between input leads *c* and *c'* derivable from the juxtaposition of FIGS. 21 and 22, it may be seen that a complement input, as shown in FIG. 22, appearing at the input edge of any flip-flop block symbol herein carries the implication that the circuit symbolized by that flip-flop block symbol includes a pair of dynamic gates, such as shown in FIG. 21, connected to the *c* input terminal, their D.C. input terminals being connected to the FF terminals of the basic flip-flop in the manner shown in FIG. 21, and their output being connected to B inputs of the basic flip-flop as shown in FIG. 21. The exemplary gate capacitor and gate resistor values given in FIG. 21 are to be interpreted as merely typical, and not in any sense limiting.

11.1.9. Transfer Inputs: The flip-flop definition sheet containing FIGS. 23 and 24 defines the set of three coacting inputs hereafter designated a "transfer set." The individual inputs constituting this set are hereinafter designated "transfer inputs." For ease of reference, the symbol found on the *c*, *d*, *e*, *c'*, *d'*, and *e'* inputs of FIGS. 23 and 24 will hereinafter be styled an "X-symbol." Also, the transfer input located on the true input segment of the flip-flop outline will be called the "X· input," the transfer input located on the inverse segment of the flip-flop outline will be called the "X. input," and the transfer input located on the lower edge of the flip-flop symbol outline will be called the "$X_c$," or "transfer command," input.

Three distinct input conditions, or L-signal pairs, will be found applied to the X· and X. inputs of flip-flops herein. The first of these is the "S-pair," or "set-pair," consisting of a PL-signal applied to the X· terminal and an NL-signal applied to the X. terminal. The second of these is the "R-pair," or "reset-pair," consisting of an NL-signal applied to the X· terminal and a PL-signal applied to the X. terminal. The third of these input conditions is the "N-pair," or "negative-pair," consisting of an NL-signal applied to both the X· terminal and the X. terminal.

The application of a PT-signal to the $X_c$ input of a flip-flop, when the S-pair is applied to the X· and X. inputs, will set the flip-flop, if it is not already in the "set" state.

Similarly, the application of a PT-signal to the $X_c$ input of a flip-flop, when the R-pair is present on the X· and X. inputs, will reset the flip-flop, if the flip-flop is not already in the reset state.

Also, the application of a PT-signal to the $X_c$ input of a flip-flop, when the N-pair is applied to its X· and X. inputs, will not change the state of the flip-flop.

The other theoretically possible combination of X· and X. inputs, viz., a PL-signal upon both, is not used herein because the result of applying the $X_c$ transition signal when this input combination is upon the X· and X. terminals is indeterminate, i.e., the $X_c$ signal may, or may not, change the state of the flip-flop.

Figure 25:
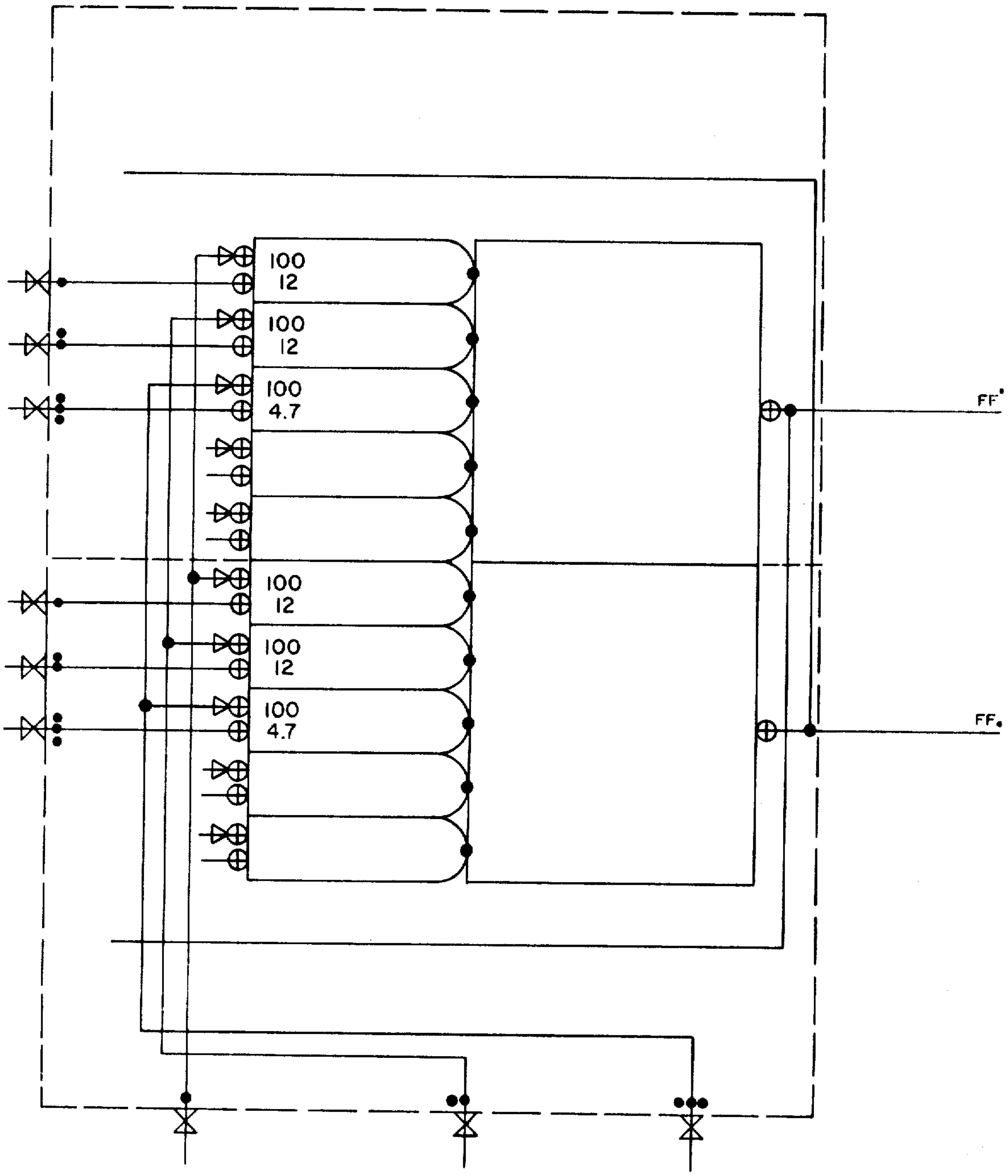
Figure 26:
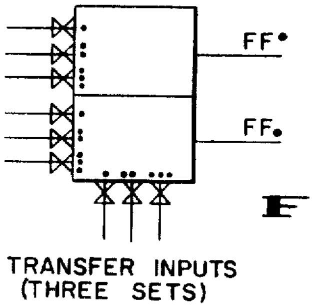
Figure 29:
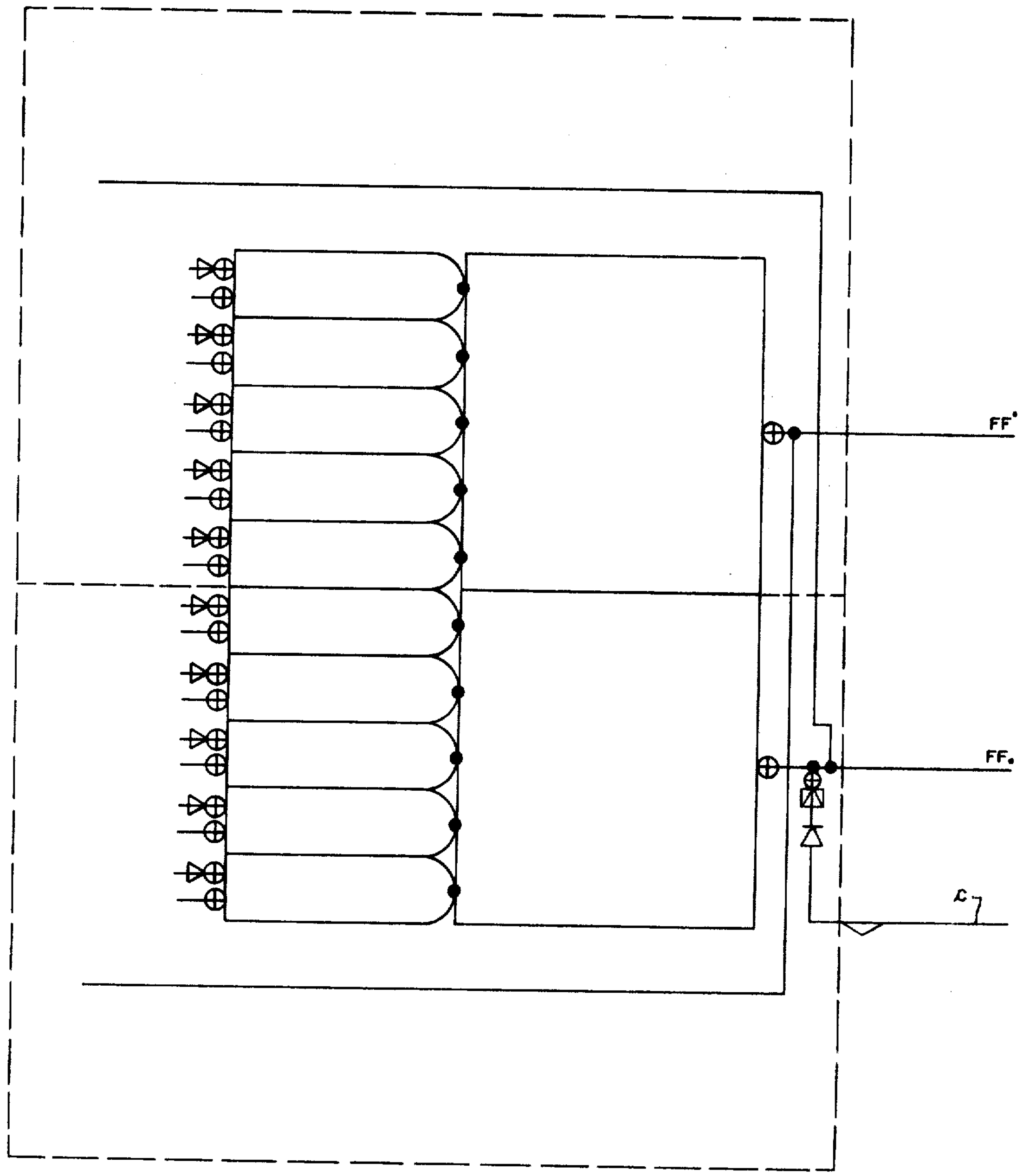
Figure 30:
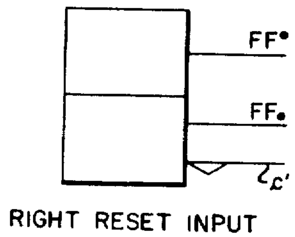

FIGS. 25 and 26 show the method employed herein to distinguish between the transfer inputs comprising a plurality of transfer sets found in a single composite flip-flop. The schematic circuit diagram of FIG. 25 shows a composite flip-flop having three transfer sets, and FIG. 26 shows the block symbol used to indicate the circuit shown schematically in FIG. 25.

As may be seen within the phantom outline, FIG. 25 comprises a first transfer set, the individual inputs of which are identified by a single dot placed within the outline and immediately adjacent their X-symbols. Similarly, the transfer inputs constituting the second transfer set of FIG. 25 are identified by two dots placed inside the outline and immediately adjacent the X-symbols located on these inputs.

Following the same convention, the three transfer input terminals of the "number three" transfer set can be identified by the three dots placed within the outline and immediately adjacent the X-symbols located on these input terminals.

11.1.10. Right Set Input: The flip-flop input definition sheet containing FIGS. 27 and 28 defines that type of flip-flop input hereinafter called a "right set input."

Figure 27:
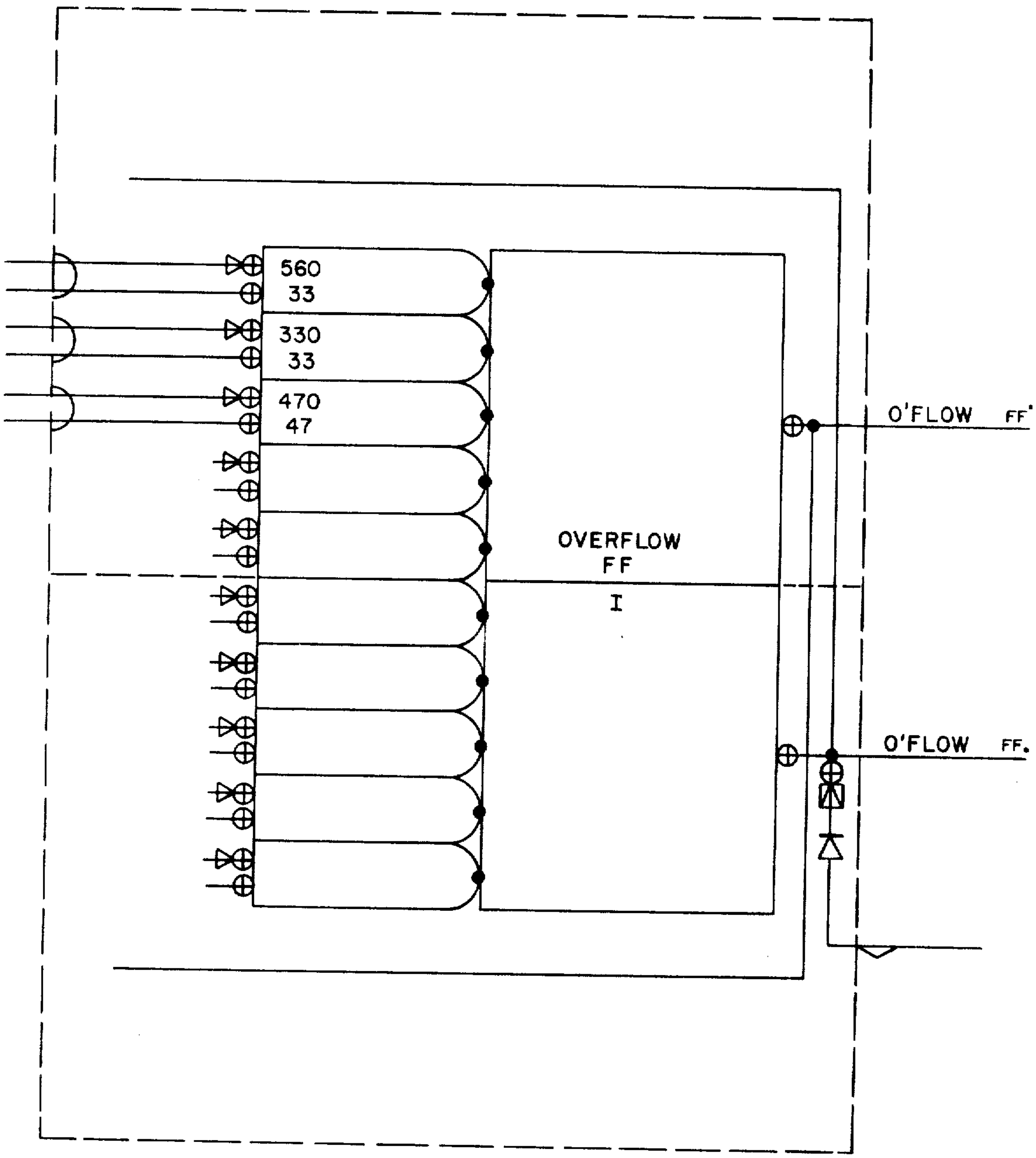
Figure 28:
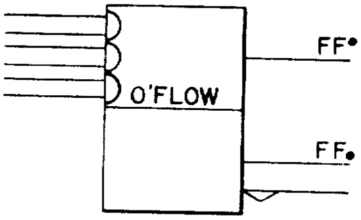
Figure 79:
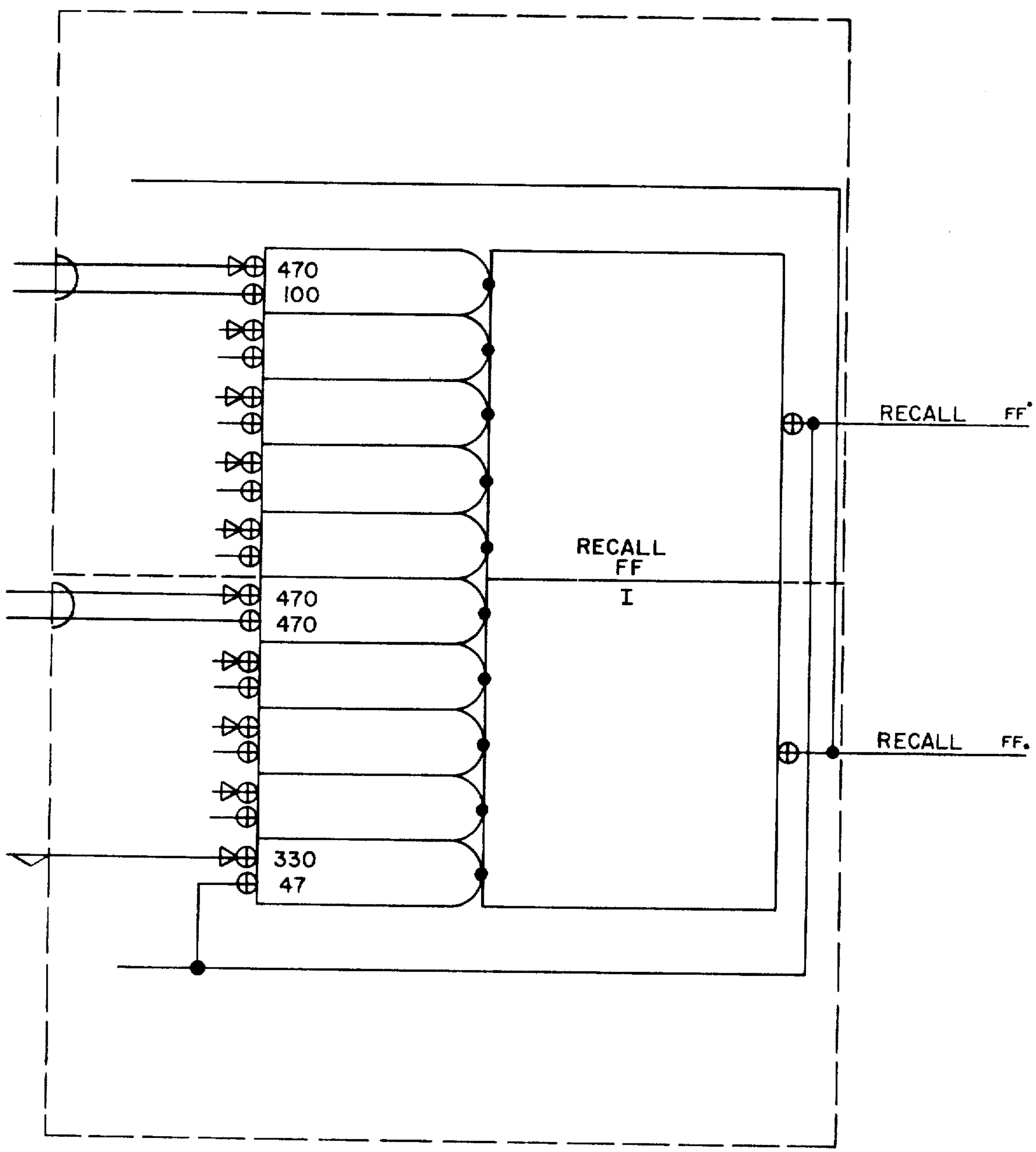
Figure 80:
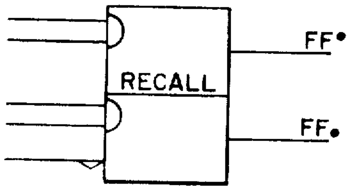
Figure 81:
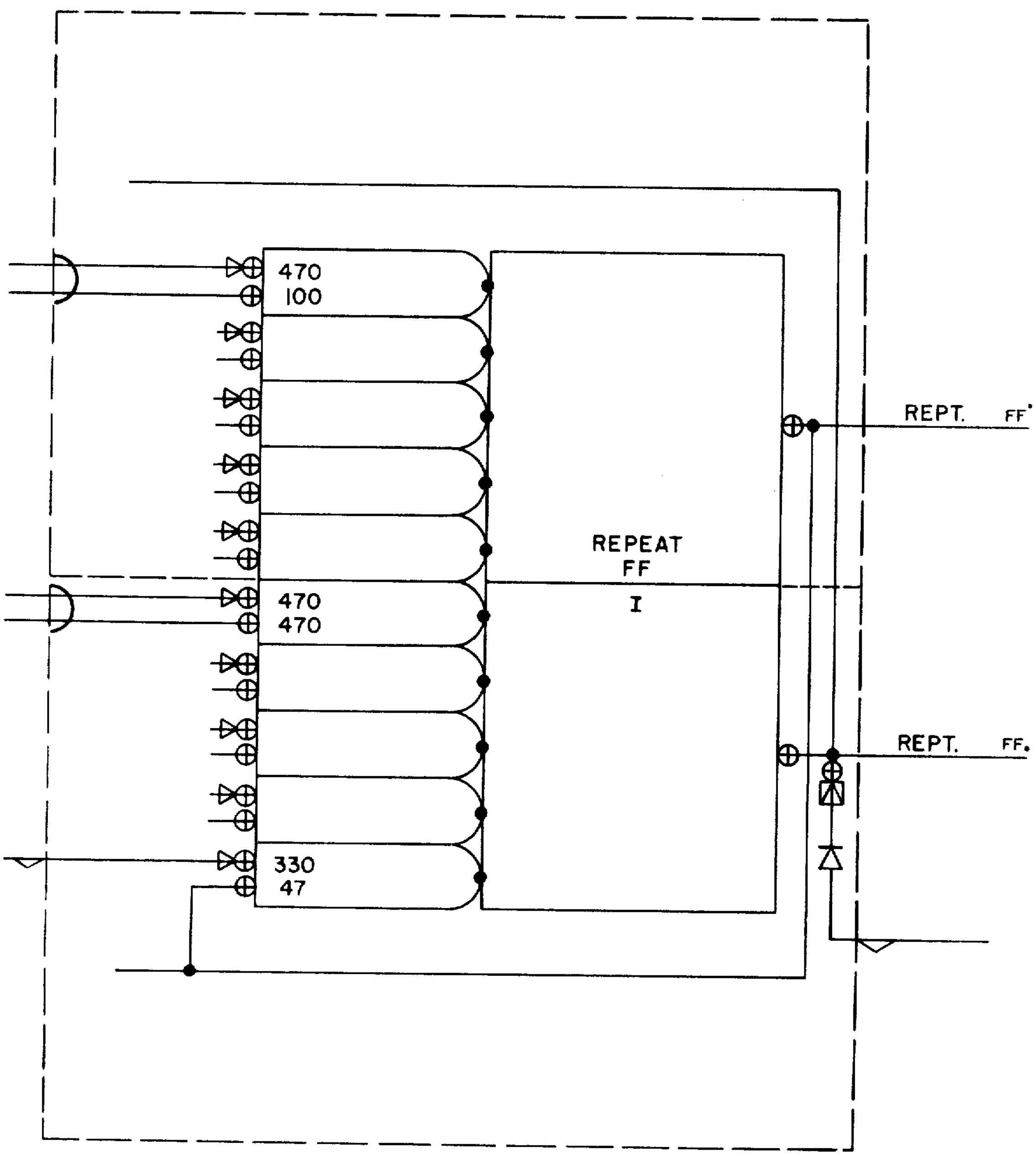
Figure 82:
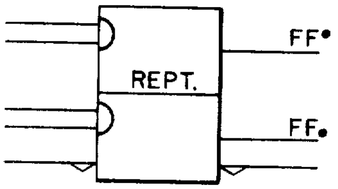
Figure 83:
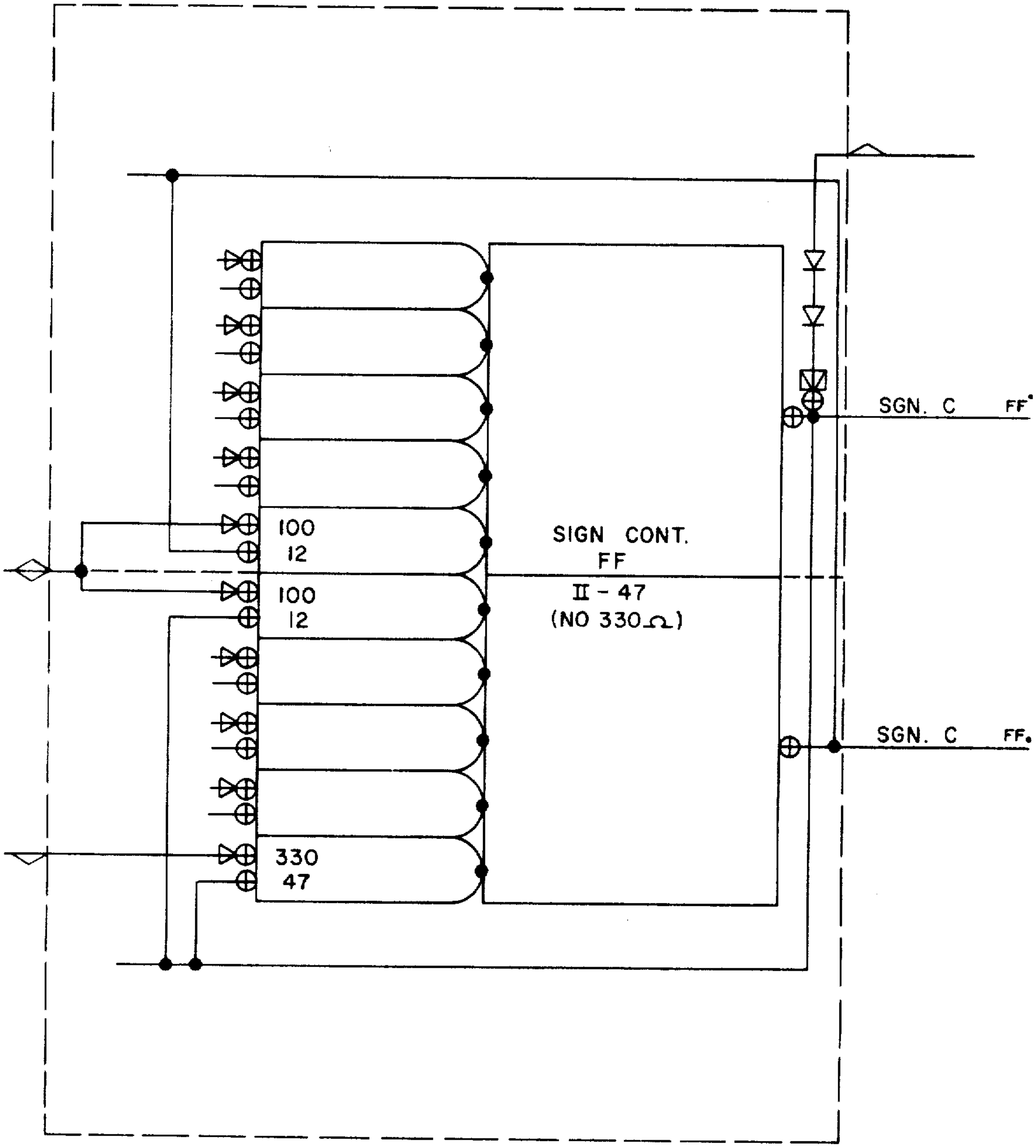
Figure 84:
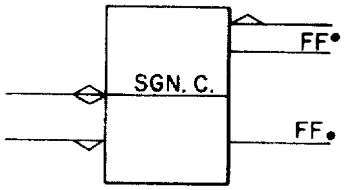
Figure 85:
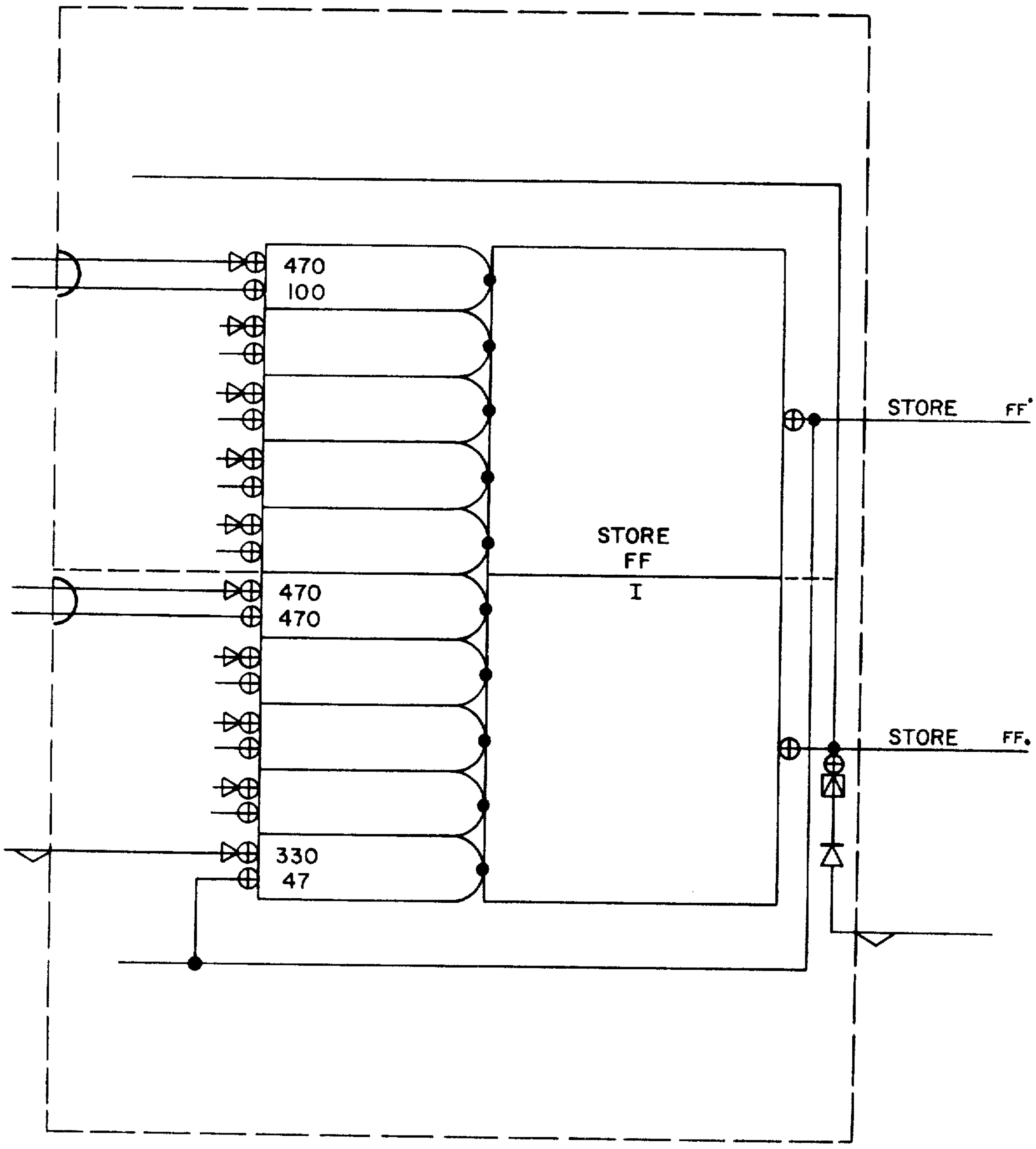
Figure 86:
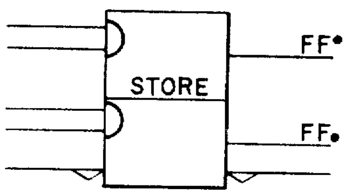
Figure 87:
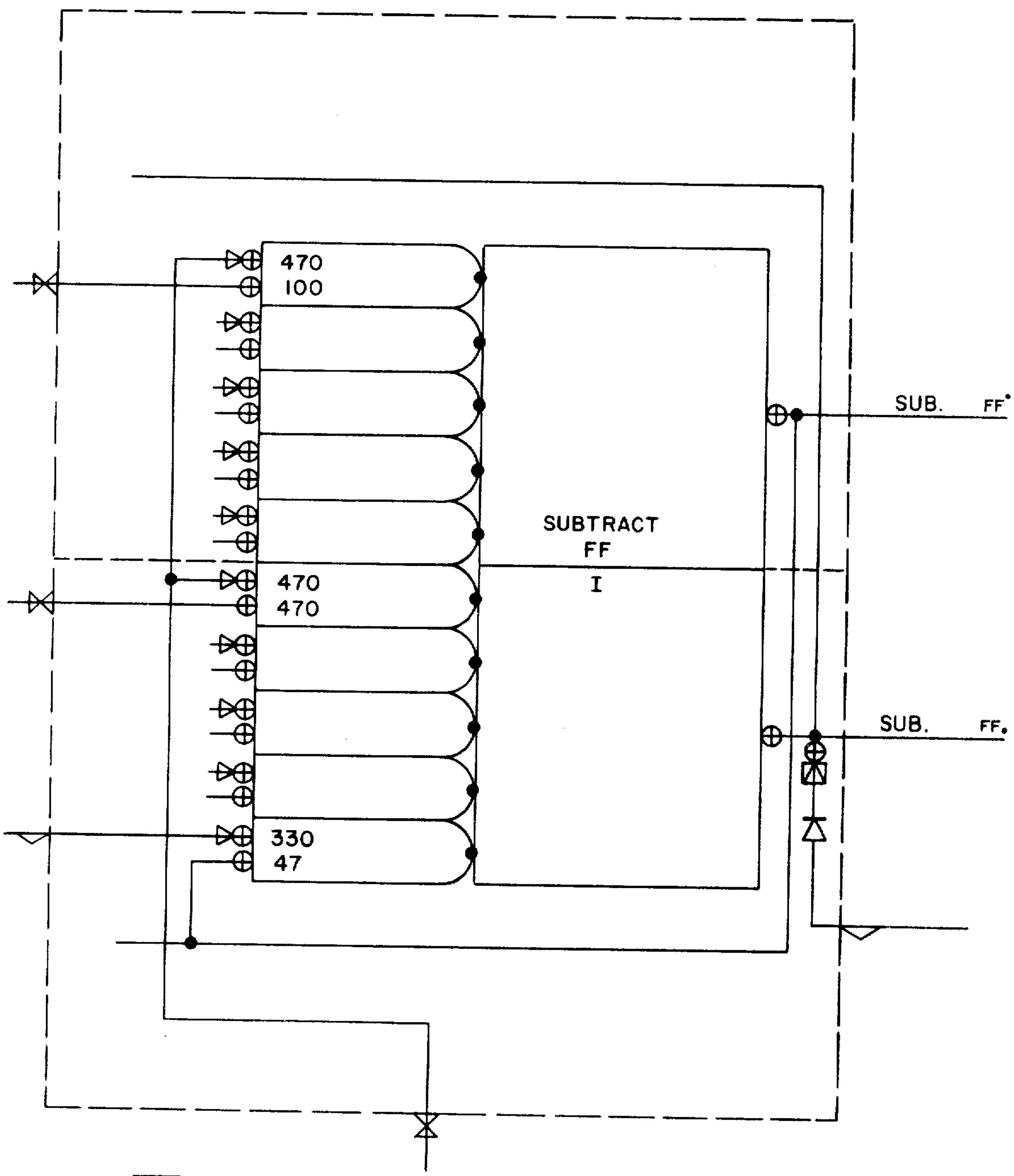
Figure 88:
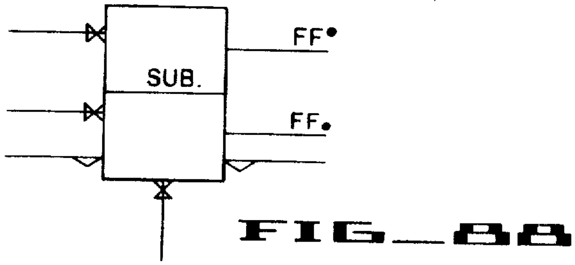

As may be seen by comparison of FIGS. 27 and 28, the input designated "*a'*" in FIG. 28 implies the circuitry found within the phantom outline of FIG. 27 and connected to a terminal thereof. Thus, it may be seen that the input of the block symbol of FIG. 28 designated "*a'*" includes, by implication, a diode having its cathode directly connected to the FF· terminal of its corresponding basic flip-flop, and having its anode connected directly to the *a'* terminal thereof. In FIG. 27 a PP-signal is placed at the FF· terminal to indicate that the basic flip-flop is not completely set, i.e., conditioned to react to other inputs in the hereinbefore defined manner, until a full positive-going pulse has been received thereat.

This input is designated a "right" input because it is located at the right edge of the flip-flop outline, to symbolize the fact that it is connected to a collector, rather than a base of one of the transistors of the basic flip-flop.

This input is also called a "set" input because, as indicated by the upward pointing ground arrow thereon, it tends to set its associated flip-flop when a positive pulse is applied to it.

11.1.11. Right Reset Input: The flip-flop input definition sheet containing FIGS. 29 and 30 defines that type of flip-flop input hereinafter called a "right reset input."

The right reset input differs from the right set input in that it is connected to the subdot, or right-hand, transistor of the basic flip-flop, rather than to the superdot, or left-hand, transisor of the basic flip-flop. Therefore, the implications to be derived from the presence of an input terminal such as *c'* of FIG. 30 at the outline of any flip-flop block symbol herein may be simply deduced by analogy from the explanation of the right set input hereabove.

Figure 31:
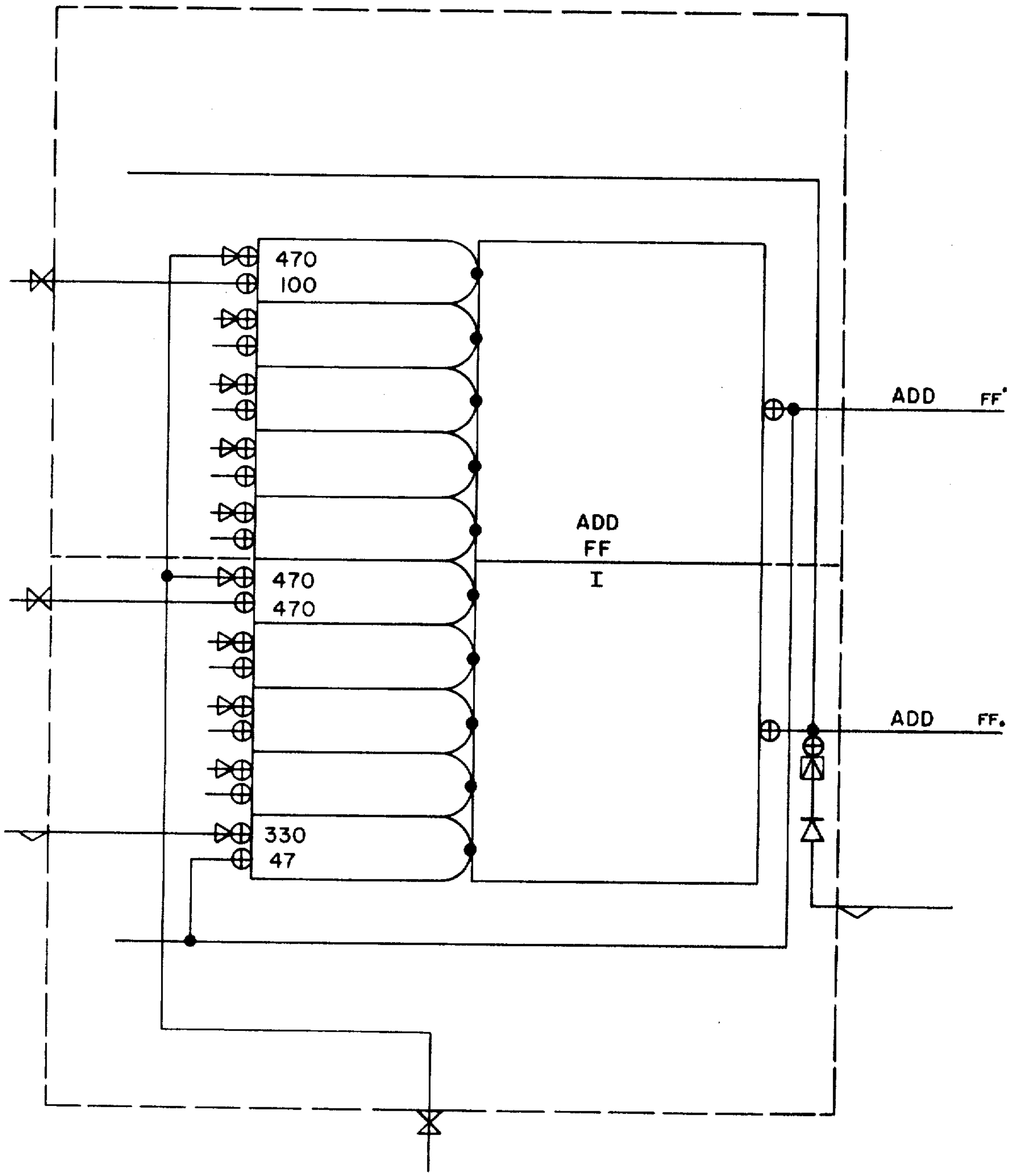
FIGS. 31 through 154 show by way of schematic circuit diagrams and corresponding block symbols the nature of the composite flip-flops.
Figure 32:
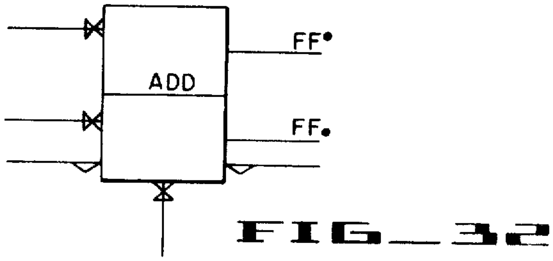
Figure 154:
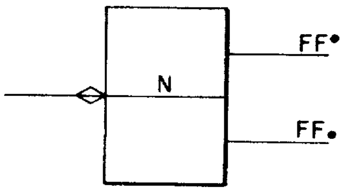

11.1.12. Flip-flop Definition Sheets: The sheets of the drawings containing FIGS. 31 through 154 are called "flip-flop definition sheets," each of which defines by way of a schematic circuit diagram, and a corresponding block symbol, one of the sixty-two composite flip-flops listed in Table FF (Appendix L). These flip-flop definition sheets correspond in arrangement to the flip-flop input definition sheets described hereinabove in that each flip-flop definition sheet contains two figures, viz., a larger, odd-numbered figure which is a schematic circuit diagram of the flip-flop defined by that sheet, and a smaller, even-numbered figure which shows a block symbol representing the composite flip-flop circuit defined in the larger, odd-numbered figure on the same sheet.

All of the symbols and conventions employed in the odd-numbered figures on the flip-flop definition sheets are found in FIGS. 3 through 30, and are explained in the corresponding portion of the specification.

The method of combining the basic block symbols shown in FIGS. 3 through 10 to define a composite flip-flop circuit has been explained and illustrated hereinabove in connection with FIGS. 11 through 30 (i.e., the flip-flop input definition sheets), and the method of interpreting the schematic circuit diagrams shown in the odd-numbered figures on the flip-flop definition sheets may largely be understood therefrom.

However, the odd-numbered figures on the flip-flop input definition sheets differ from the odd-numbered figures on the flip-flop definition sheets in that the gate capacitor and gate resistor values given in the former are merely typical, as explained hereinabove, while the gate capacitor and gate resistor values given in the latter are specific to the particular flip-flop being defined in a given flip-flop definition sheet.

Figure 89:
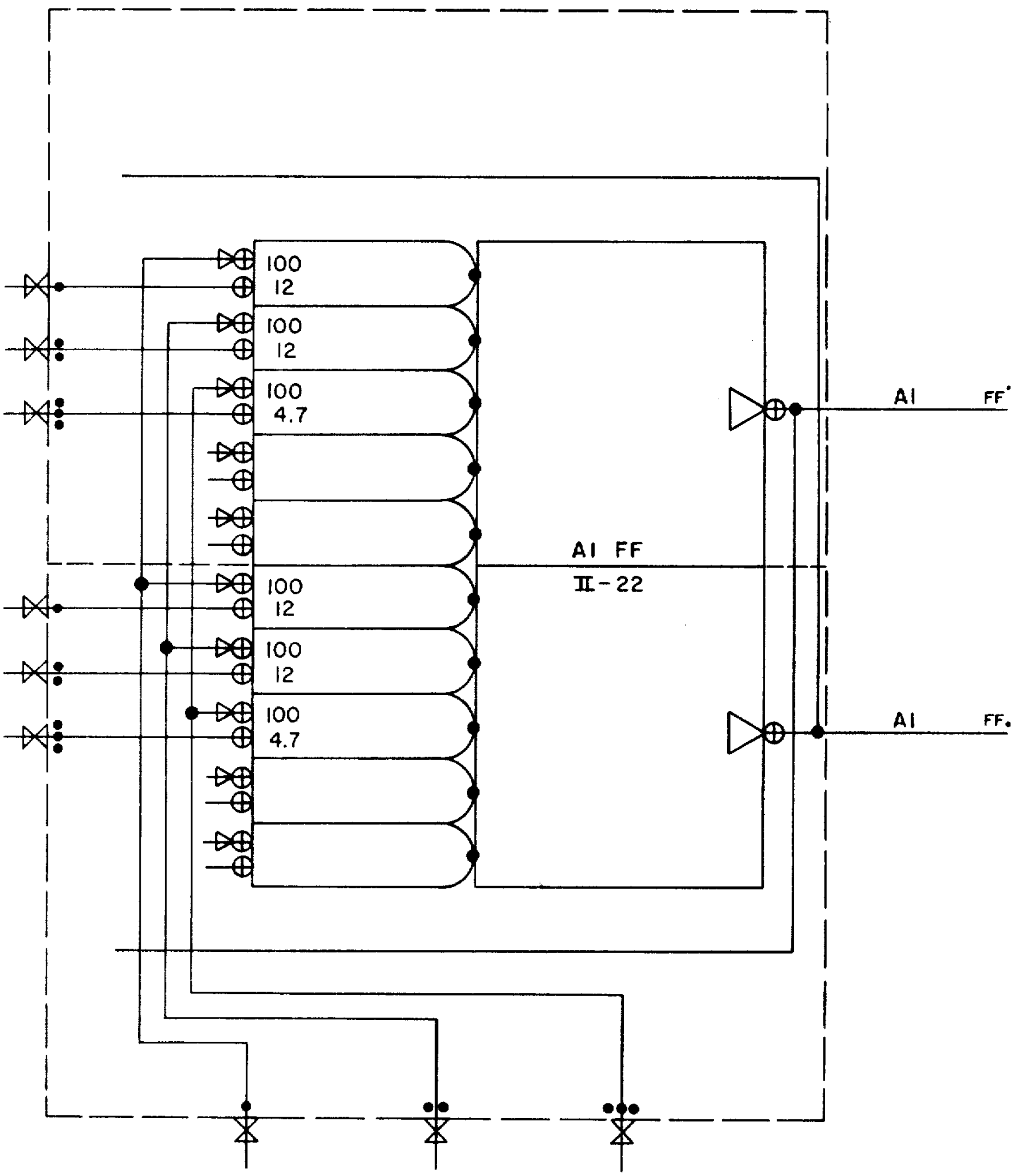
Figure 90:
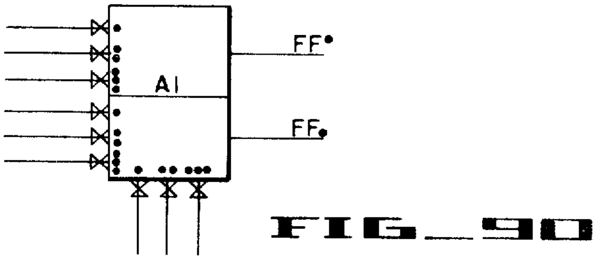
Figure 91:
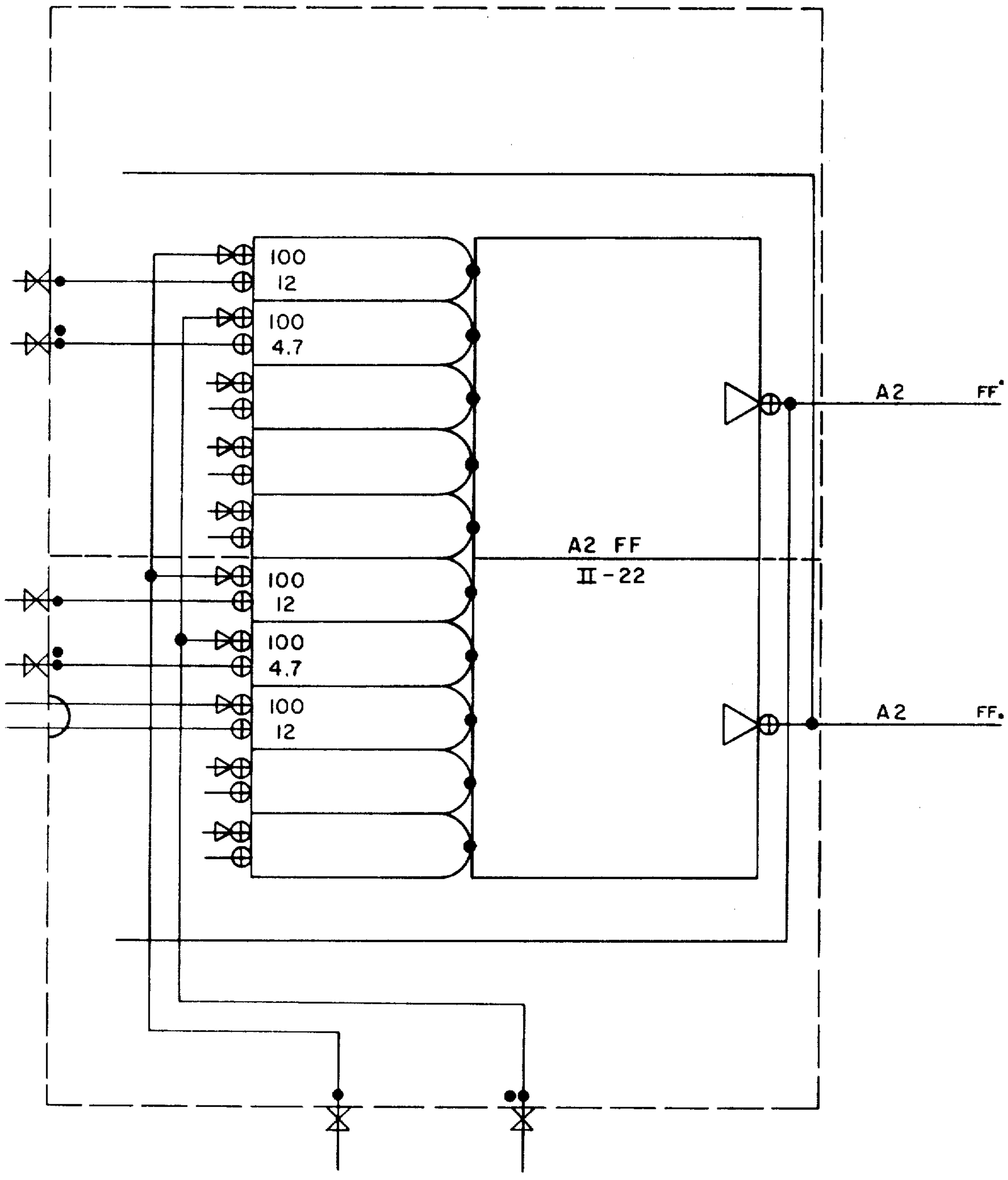
Figure 92:
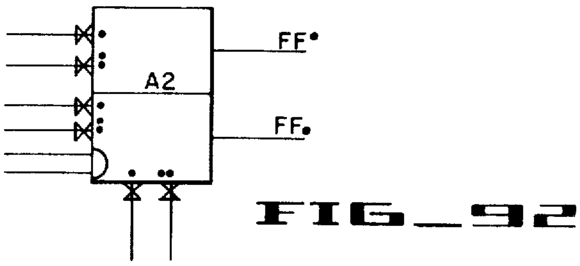
Figure 93:
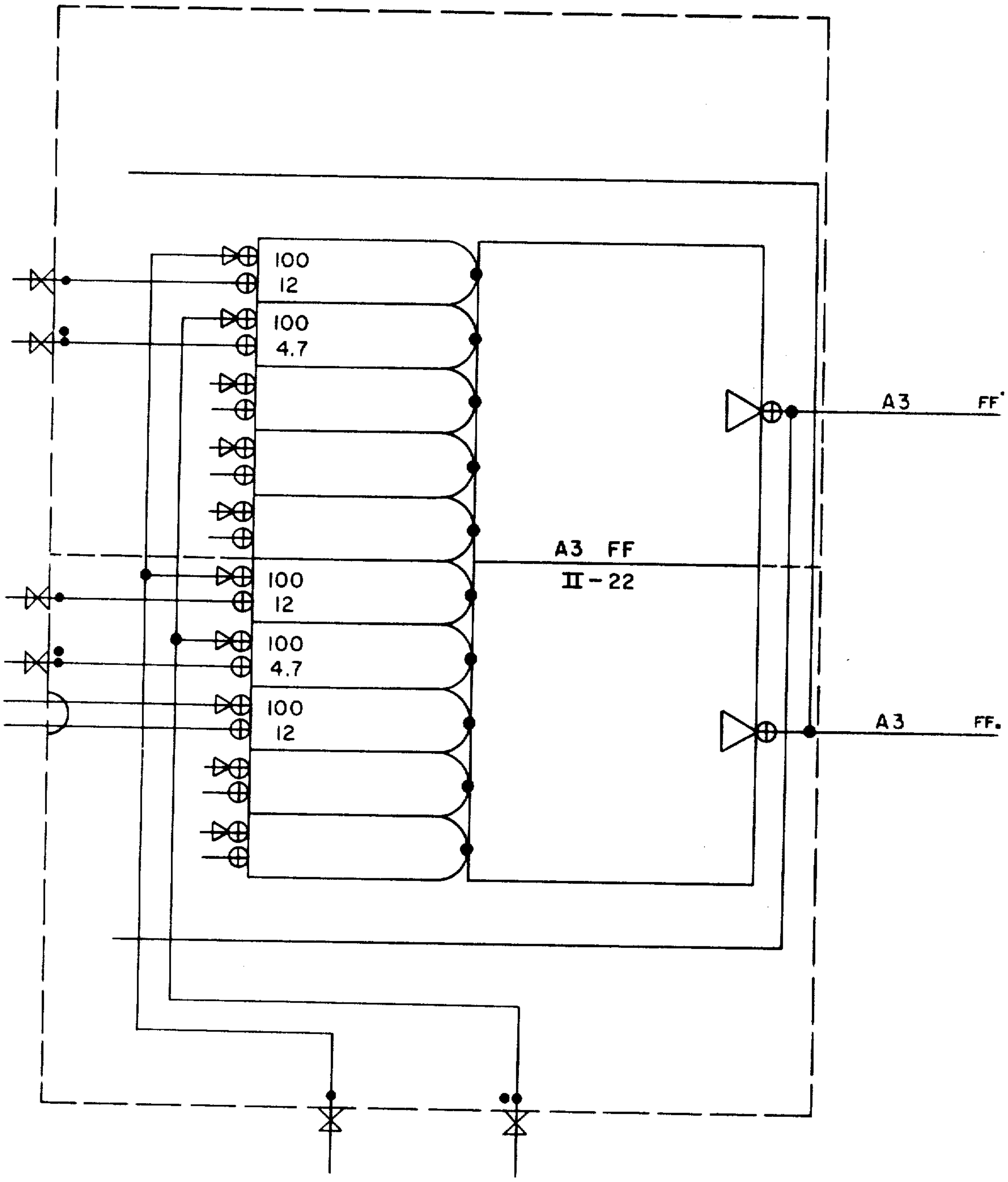
Figure 94:
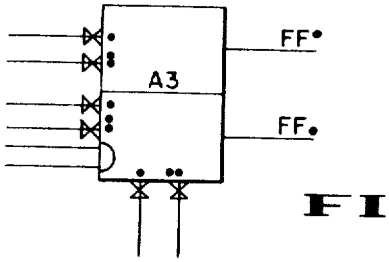
Figure 95:
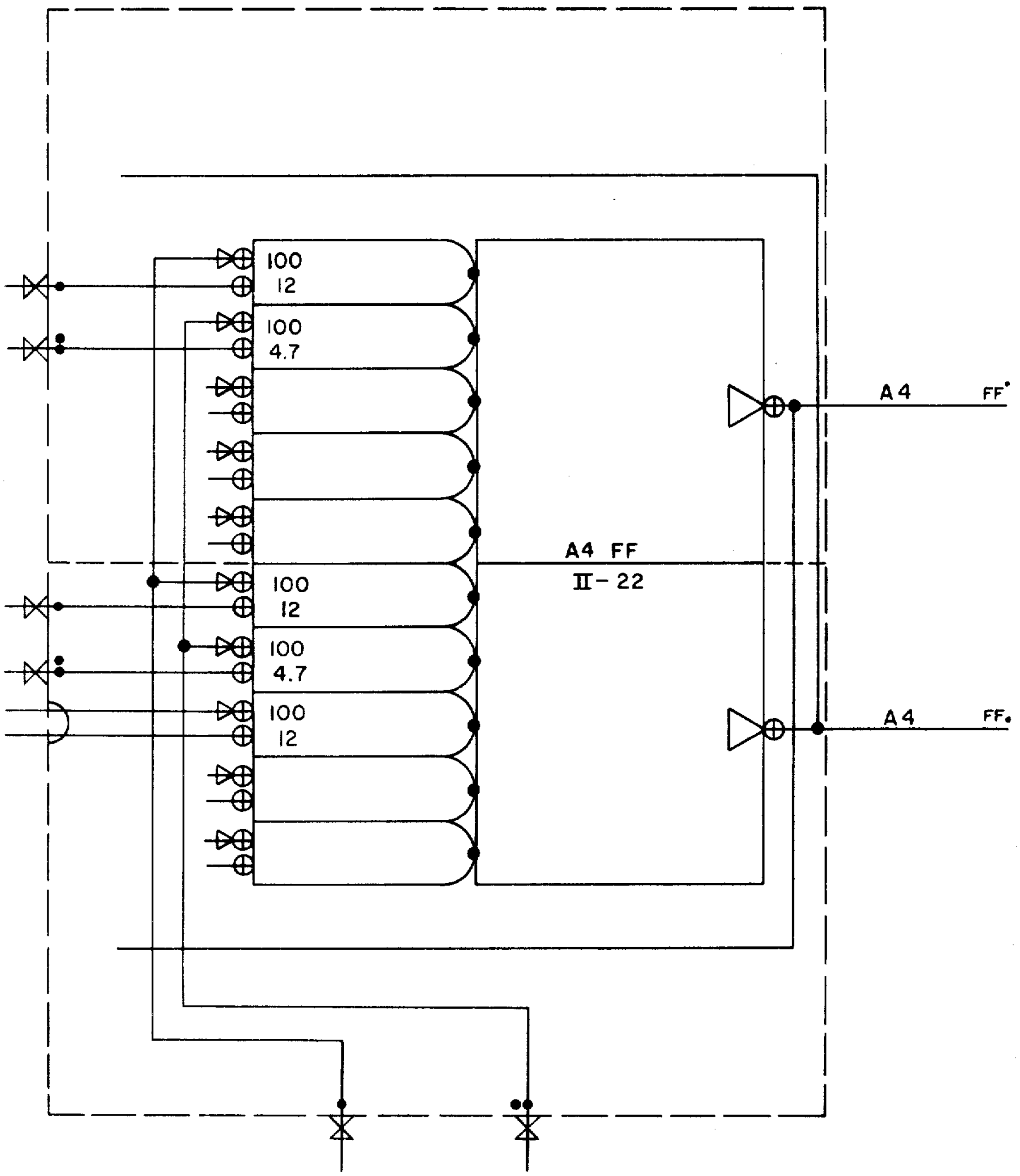
Figure 96:
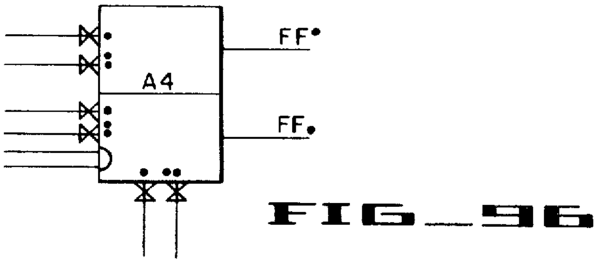
Figure 97:
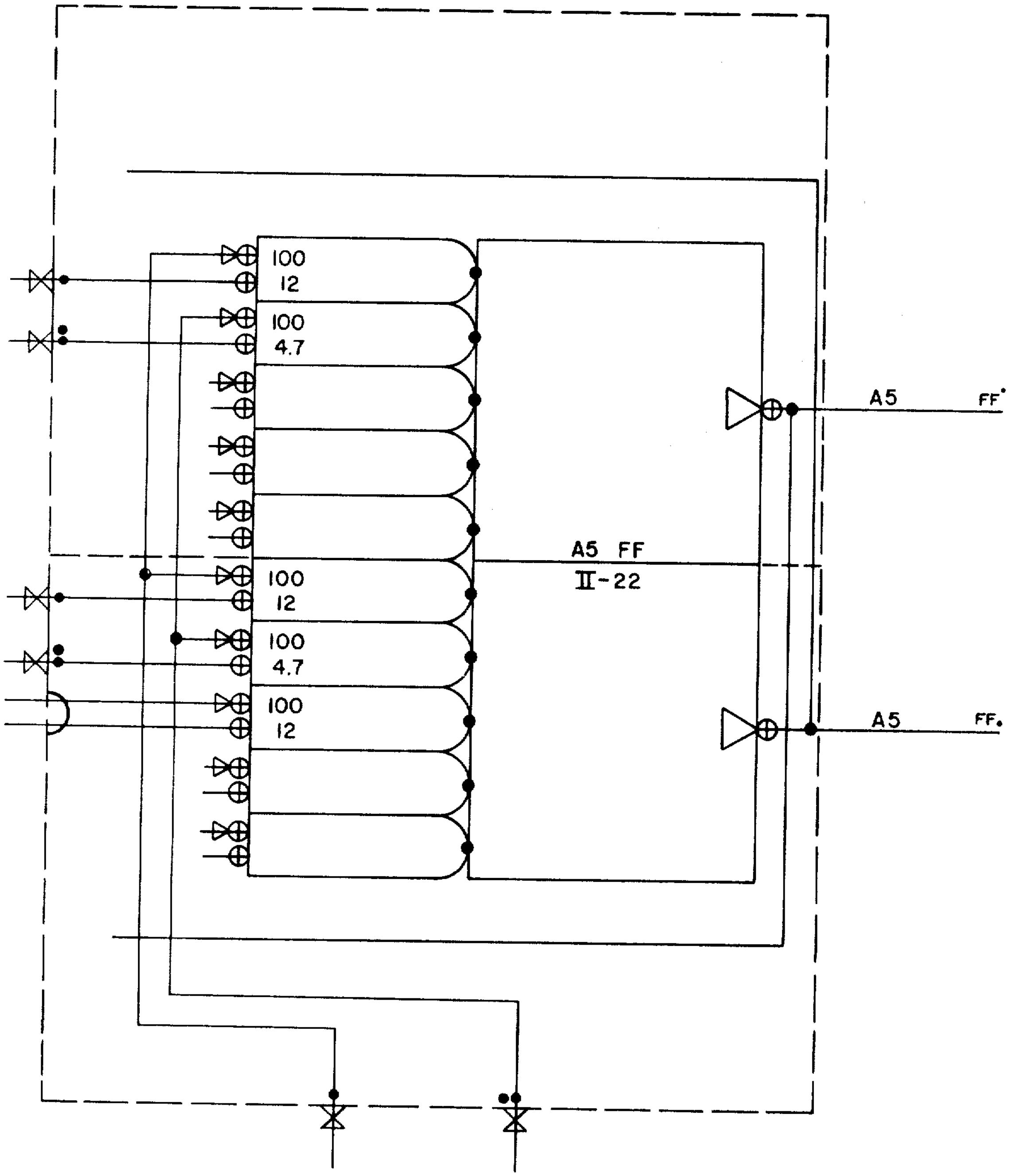
Figure 98:
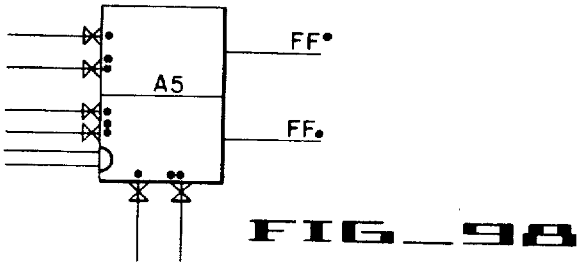
Figure 99:
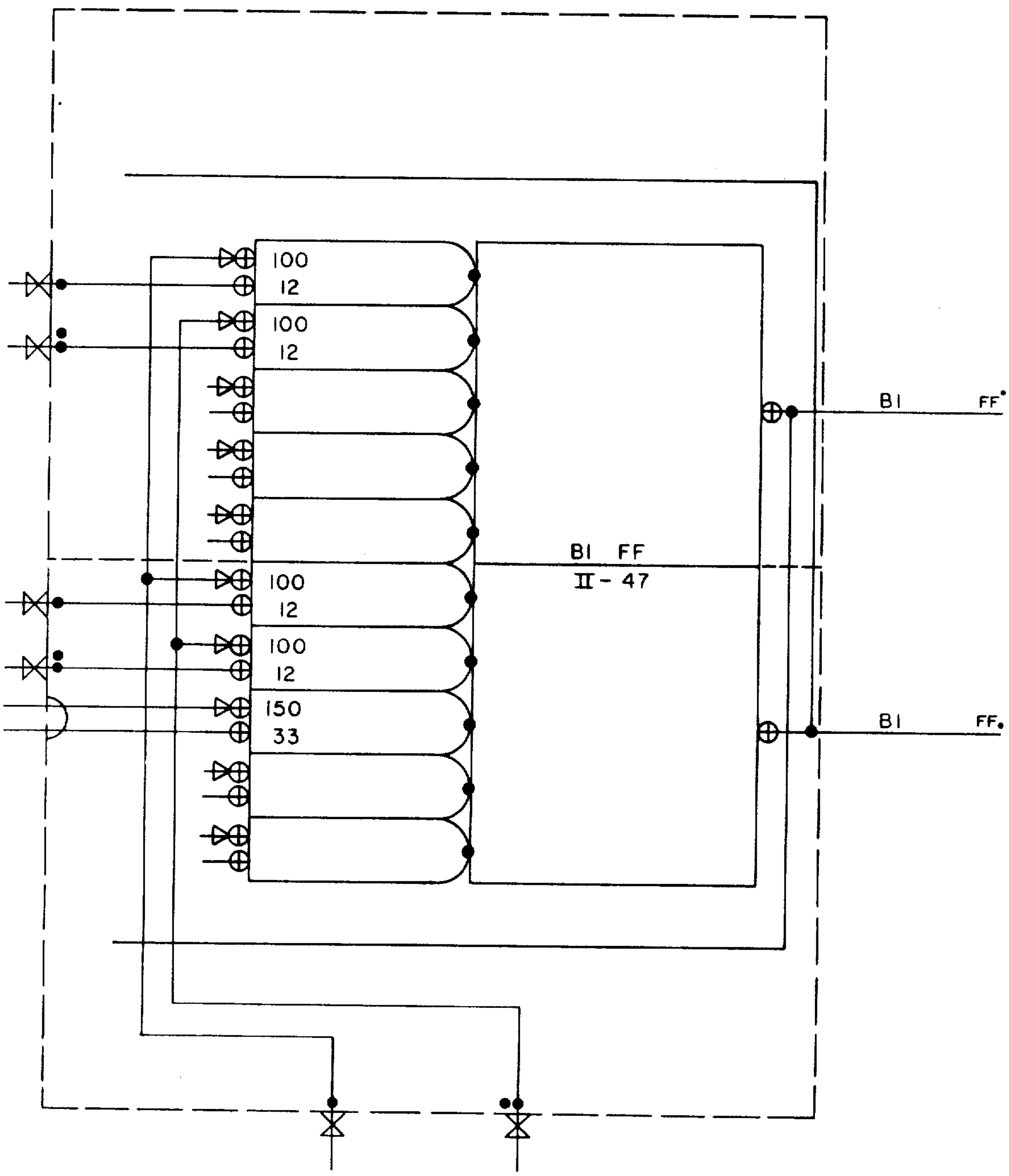
Figure 100:
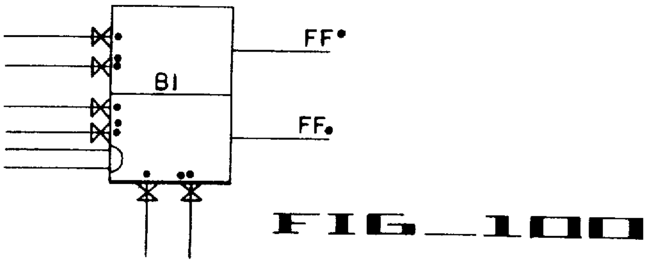
Figure 101:
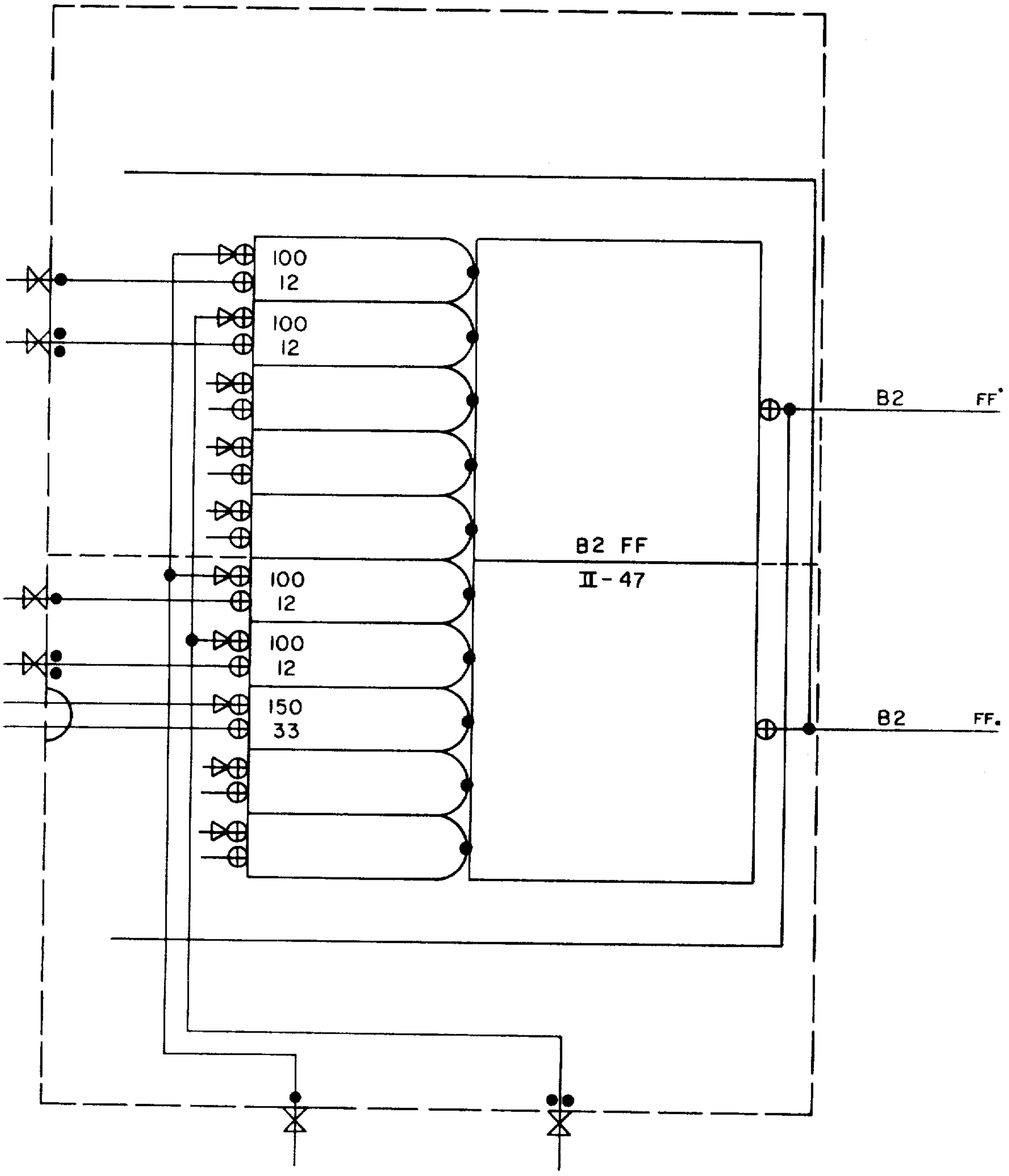
Figure 102:
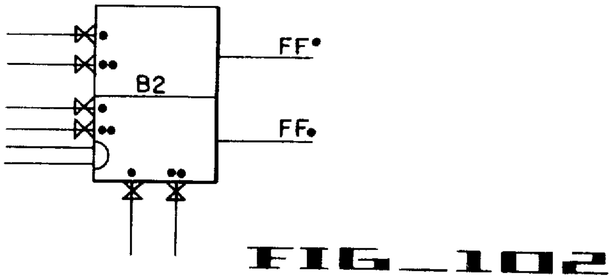

Thus, the numbers "100" and "4.7" given in the upper dynamic gate block symbol of FIG. 23 are merely illustrative of typical gate capacitor and gate resistor values which may be found in the embodiment of the instant invention shown and described herein. On the other hand, the numbers "100" and "12" found in the upper dynamic gate block symbol of FIG. 89 indicate the specific gate capacitor and gate resistor values which are used in that particular dynamic gate, i.e., the dynamic gate having its output directly connected to a B· terminal of the basic flip-flop, and having its D.C. input directly connected to the X· terminal identified by a single dot located adjacent it inside the phantom outline (sometimes identified as the "X·1" terminal).

As in the flip-flop input definition sheets; gates, and the like, which are not connected externally through the phantom outline are to be ignored as not constituting a part of the circuit defined by the schematic circuit diagram.

The practice is also maintained herein of distinguishing between like inputs located upon the same input segment by means of their relative position along that segment. For example, two left reset inputs are shown upon the inverse input segment of the block symbol shown in FIG. 34. It is clear from FIG. 33, however, that a distinction must be made between these two left reset input terminals, because the dynamic gate connected to one of these input terminals has a gate capacitor and a gate resistor, the values of which are different from the values of the gate capacitor and gate resistor comprised in the dynamic gate connected to the other of these left reset input terminals. It is to maintain this distinction, and similar necessary distinctions between terminals of other composite flip-flops herein, that a separate definition sheet is provided for each of the composite flip-flops listed in Table FF. In each of the flip-flop definition sheets, as may be determined by inspection, the order of inputs along the left edge of the phantom outline in the odd-numbered figure is the same as the order of inputs along the left-hand edge of the block symbol, i.e., the even-numbered figure.

Figure 33:
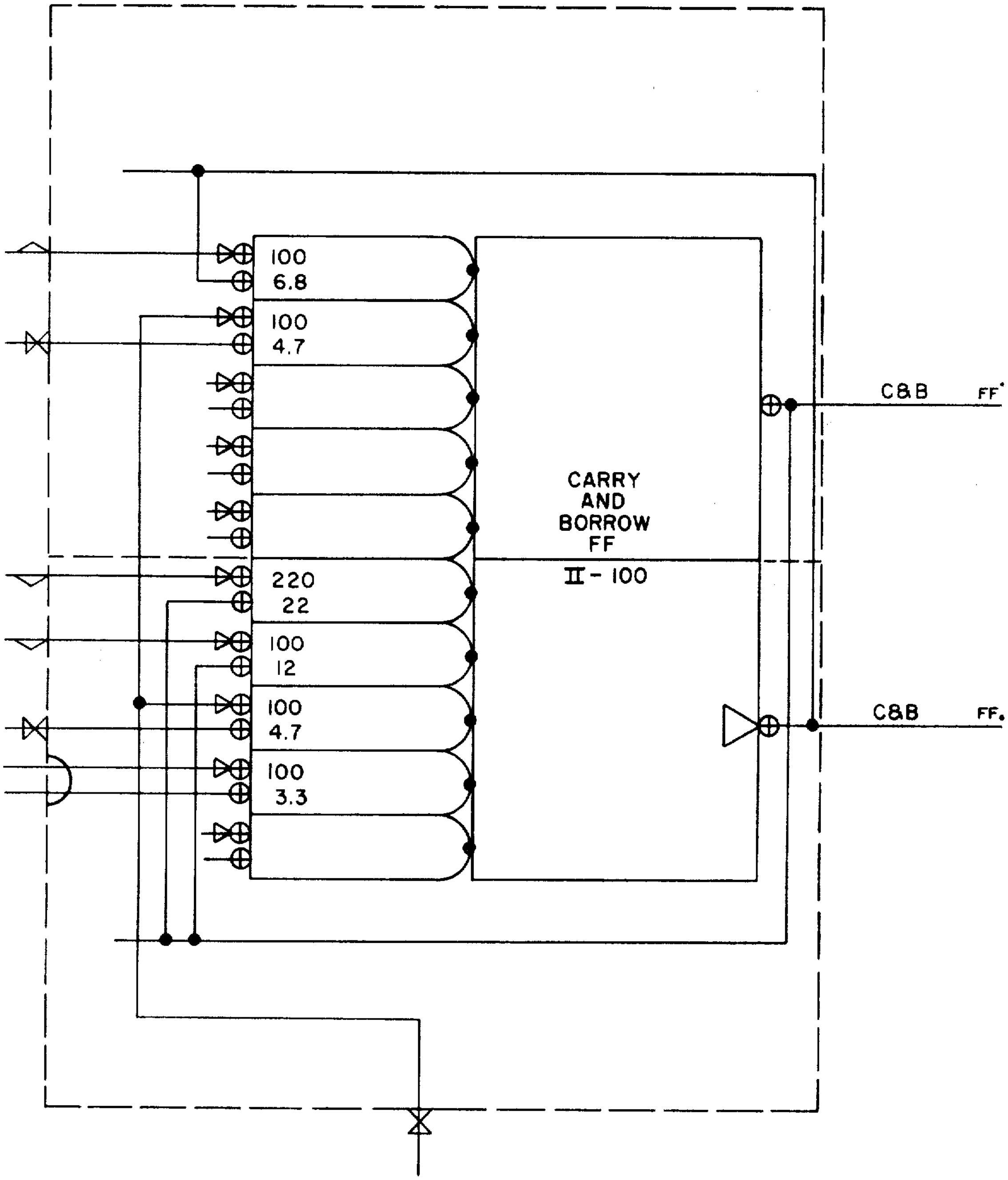
Figure 34:
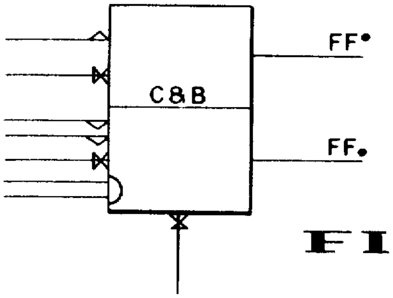
Figure 35:
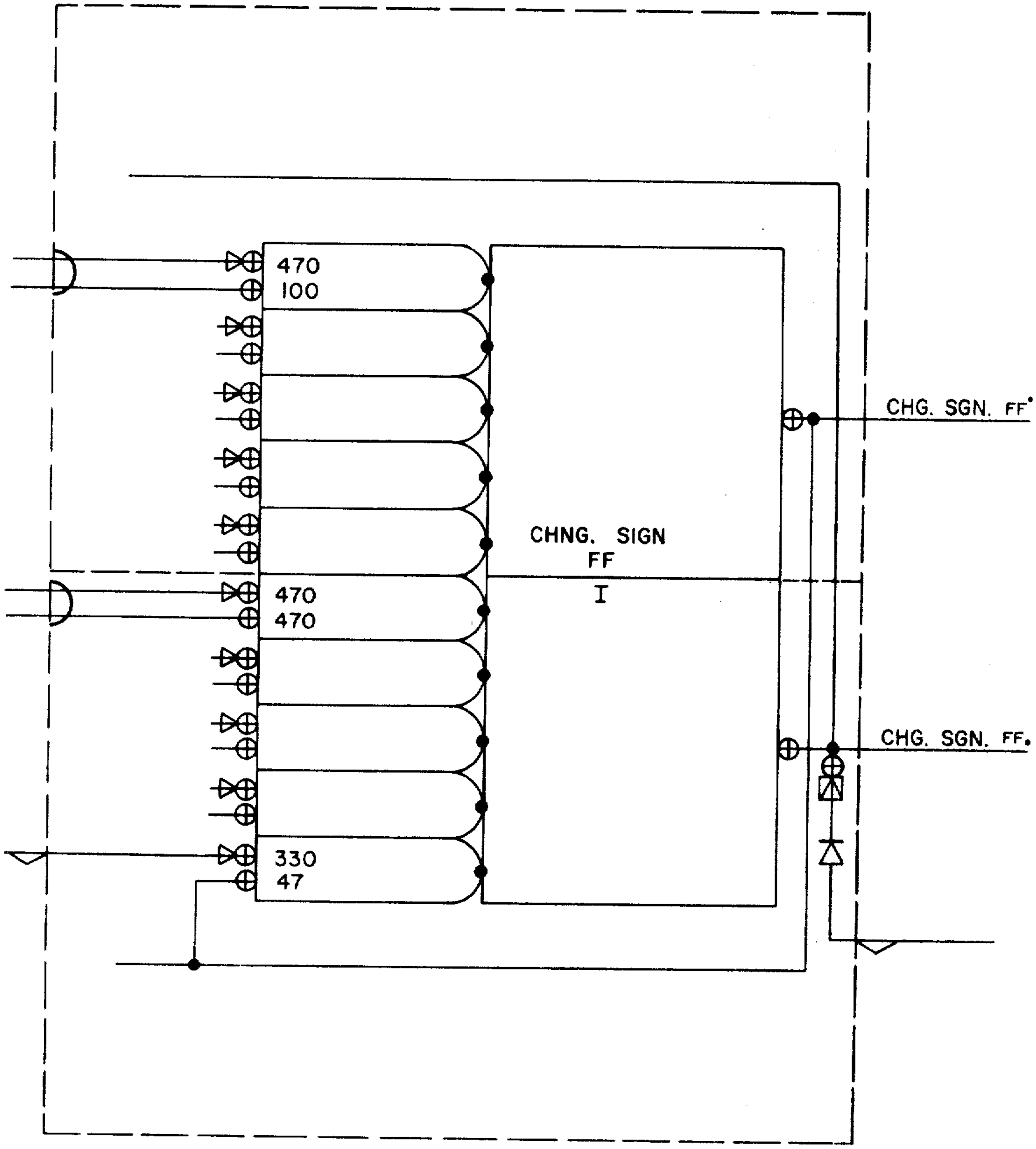
Figure 36:
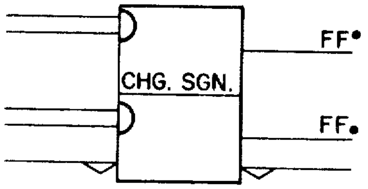

For instance, the inputs at the left edge of the phantom outline of FIG. 33 may be said to have the following order (from the top): Left Set: X·, Left Reset; Left Reset; X.; and Independent Gate. Where desired, a similar order list may, of course, be determined for the bottom edge of the block symbol outline. Such an order list for FIG. 33 would read, say, from left to right, simply: $X_c$. Comparison of these order lists with the order of the terminals along the corresponding edges of the block symbol of FIG. 34, then, will show that the order of input terminals along the edges of the phantom outline of FIG. 33 is identical with the order of the input terminals along the edges of the block symbol of FIG. 34. This identity of terminal order between the schematic circuit diagram of a particular flip-flop and its corresponding block symbol has been maintained throughout the drawings. Thus, for example, wherever the C & B flip-flop block symbol of FIG. 34 appears in the drawings, the point of the corresponding composite flip-flop circuit to which, say, the upper of its two left reset inputs is directly connected may be determined by locating the upper of the two left reset input terminals of FIG. 33 and determining what internal circuitry is directly connected thereto.

More specifically, if it is desired to know what internal circuitry is connected to the upper one of the left reset inputs of the C & B flip-flop block symbol, then one must find the upper one of the left reset input terminals of the schematic circuit diagram entitled "CARRY AND BORROW" (FIG. 33) and, from the circuitry within the phantom outline, it may be seen that this upper left reset input terminal is directly connected to the A.C. (i.e., capacitive) terminal of a dynamic gate comprising a 220 picofarad gate capacitor and a 22 kilohm gate resistor, the output of which is directly connected to one of the B. terminals of the associated basic flip-flop.

Figure 51:
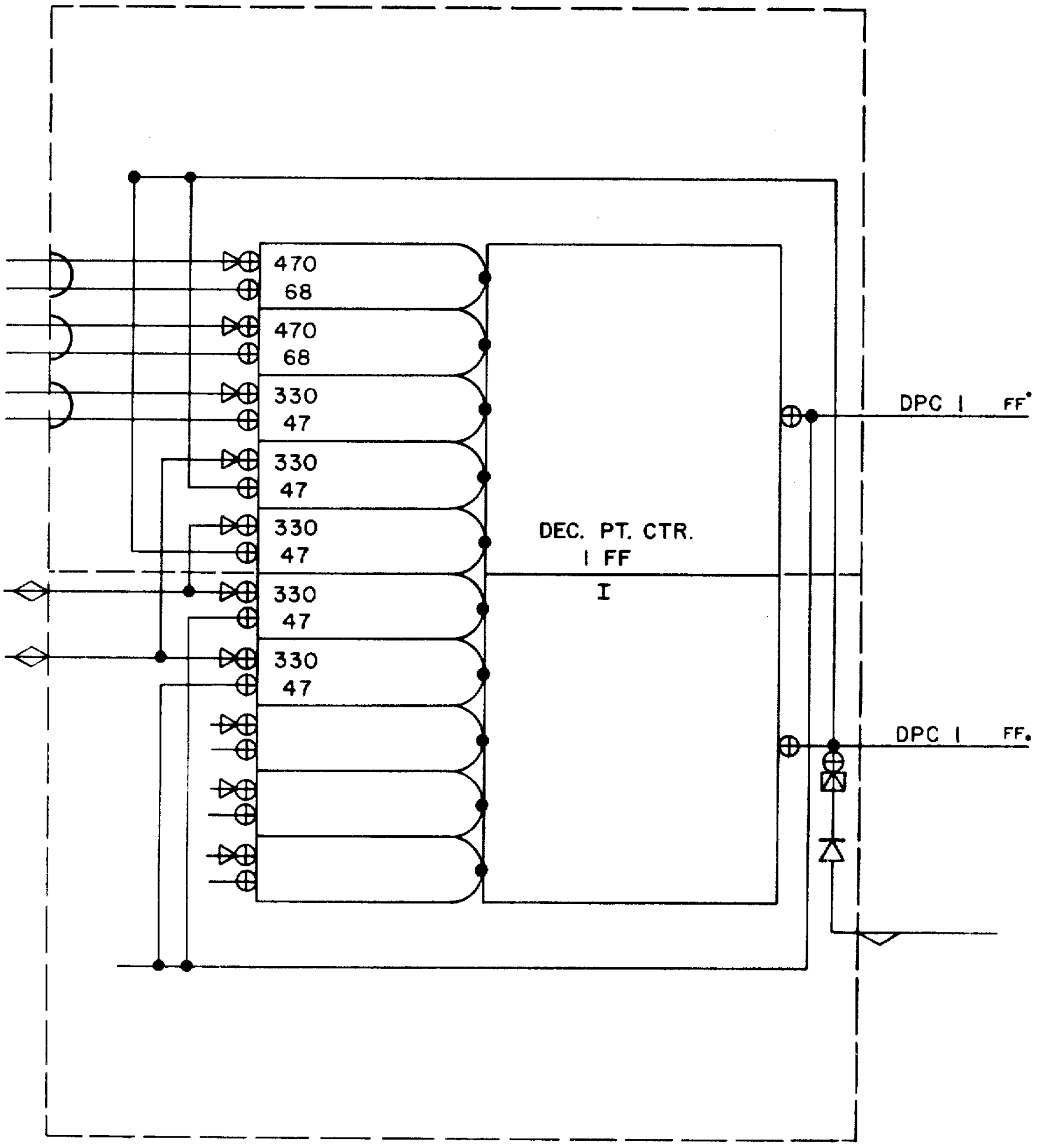
Figure 52:
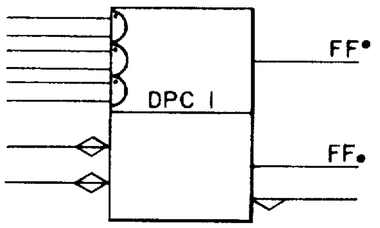
Figure 53:
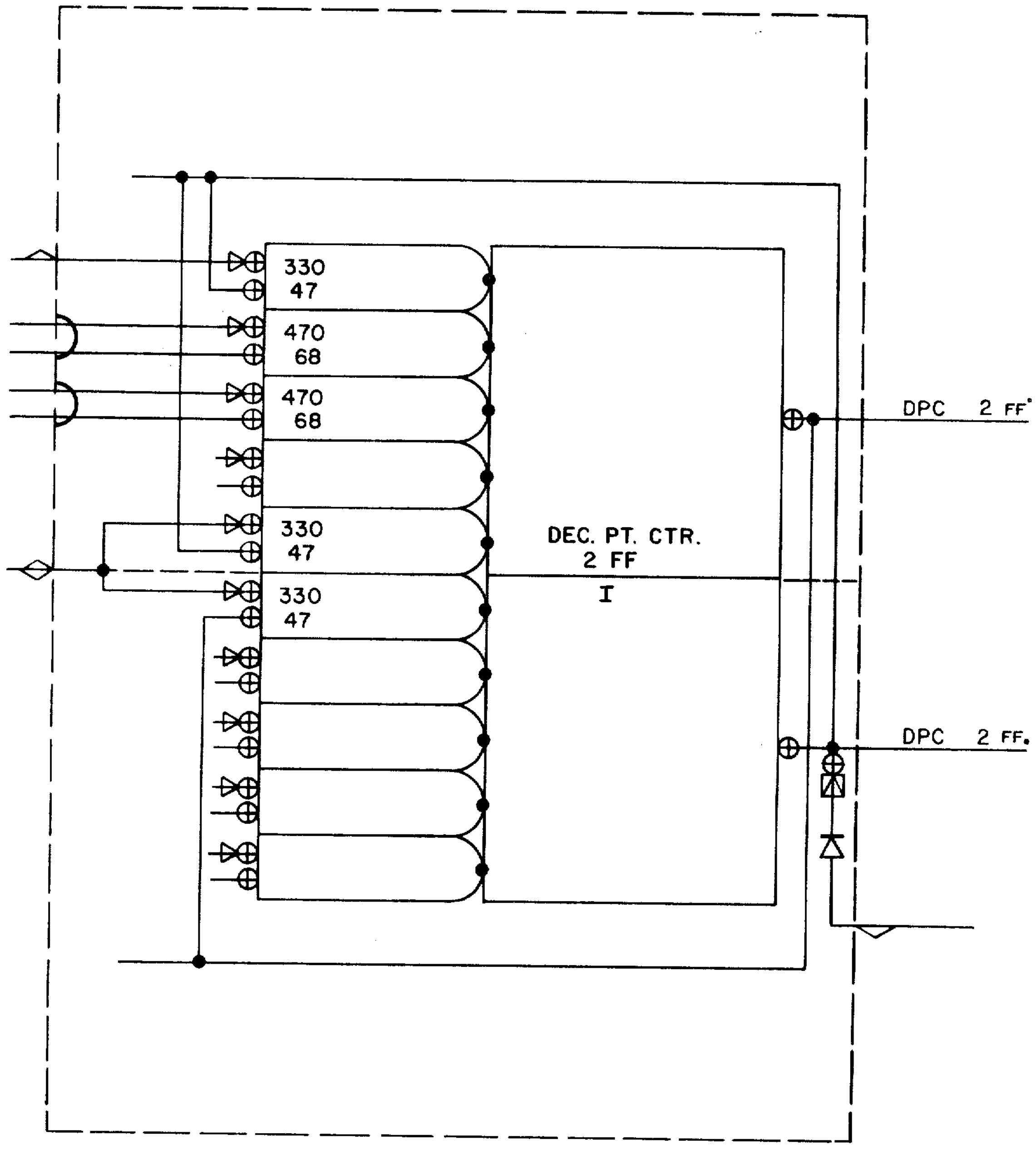
Figure 54:
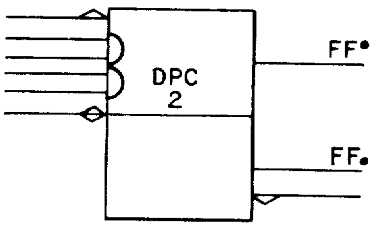
Figure 55:
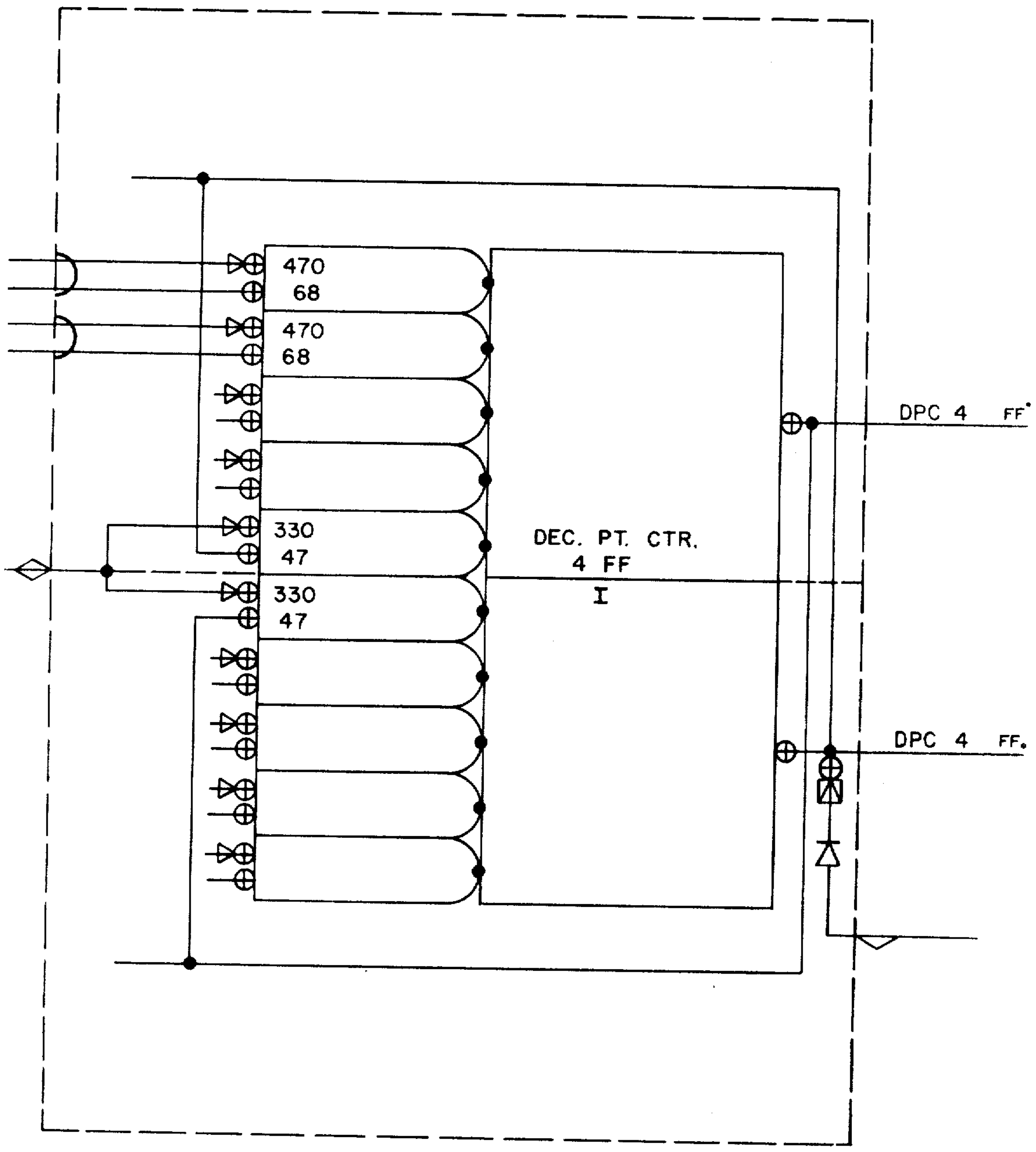
Figure 56:
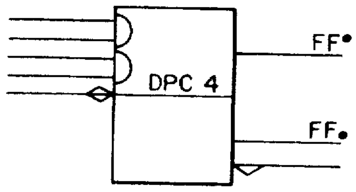
Figure 57:
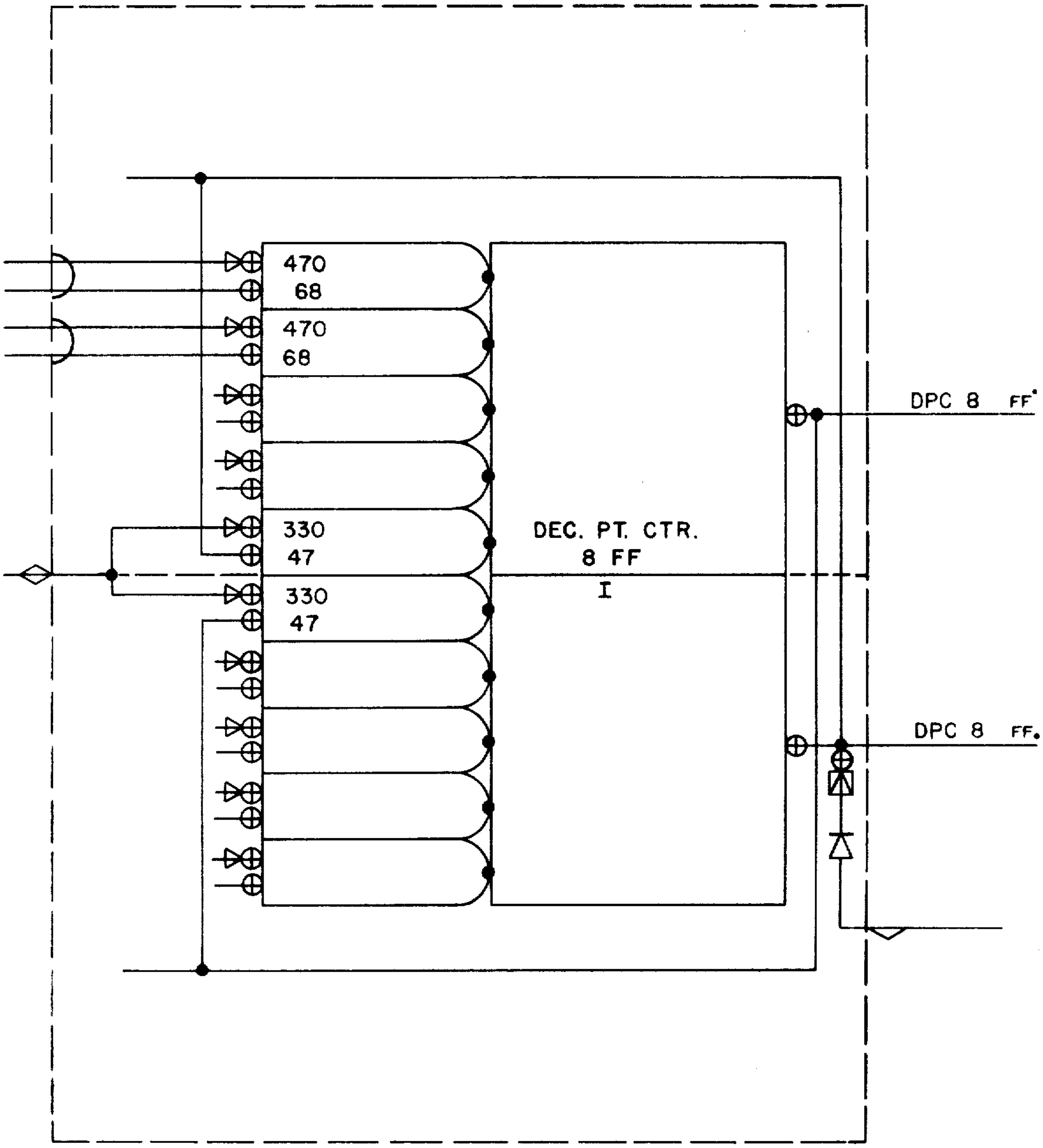
Figure 58:
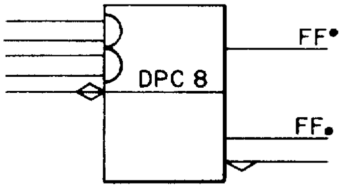
Figure 59:
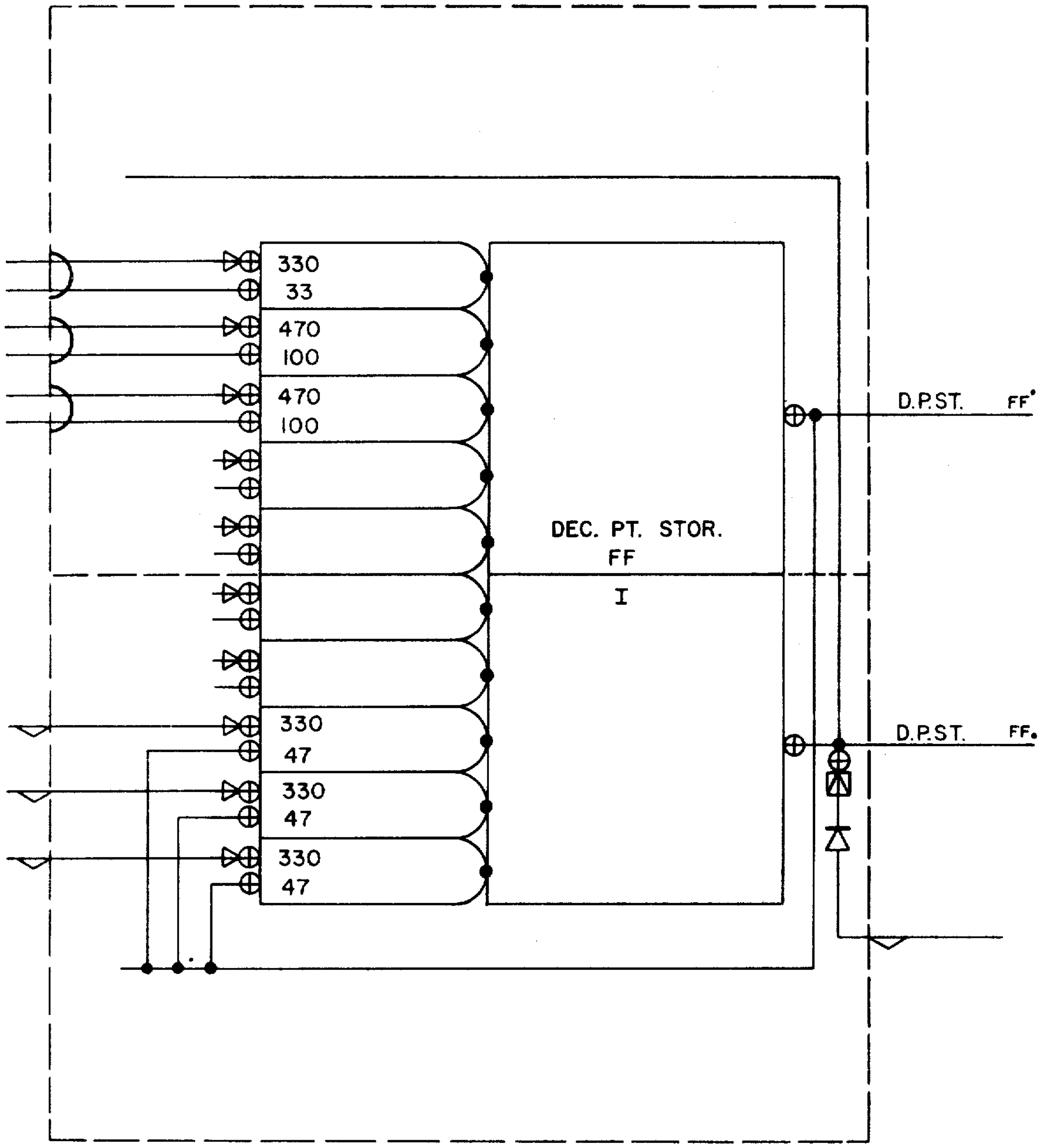
Figure 60:
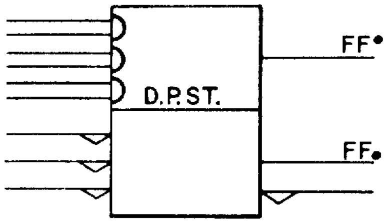
Figure 61:
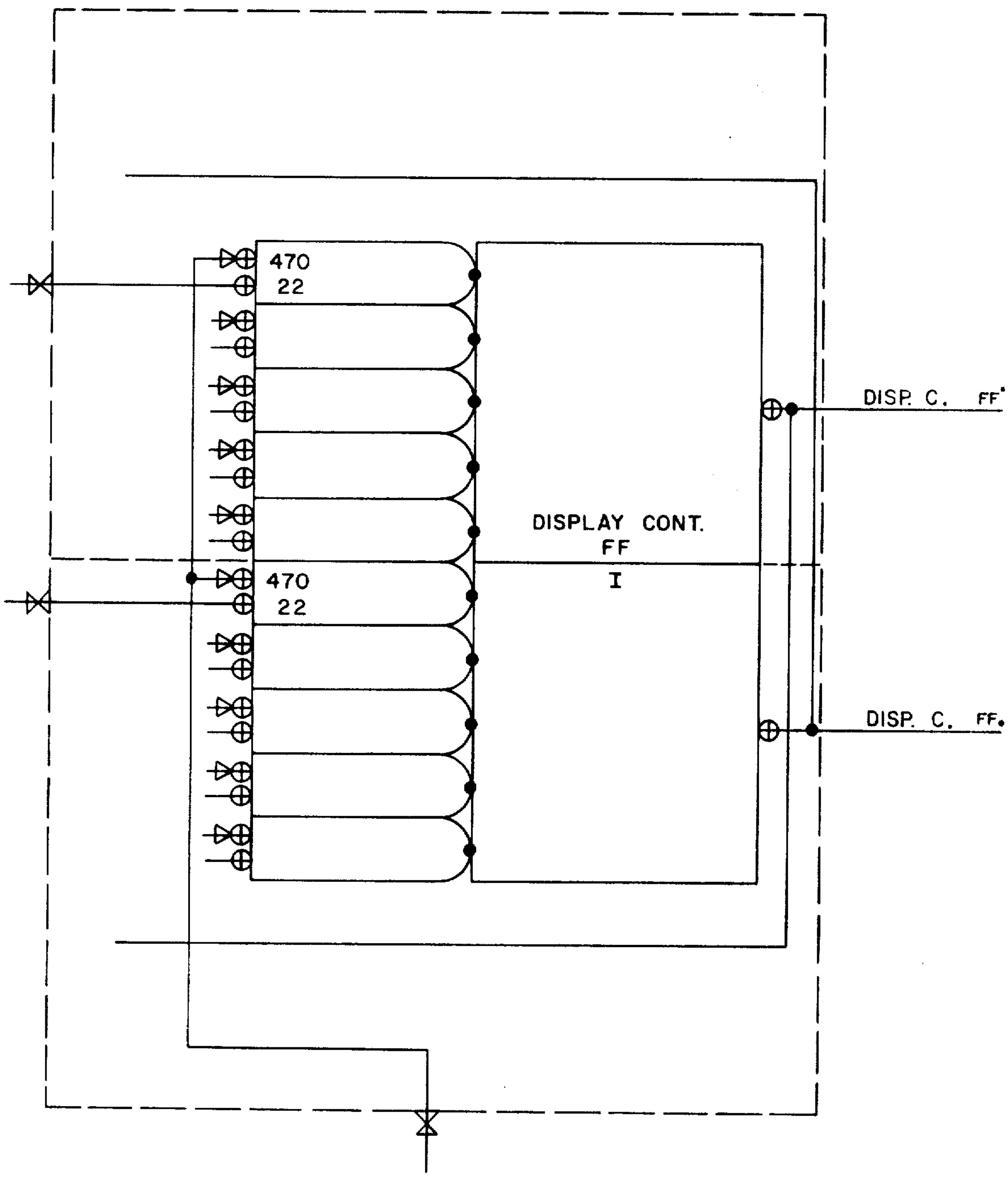
Figure 62:
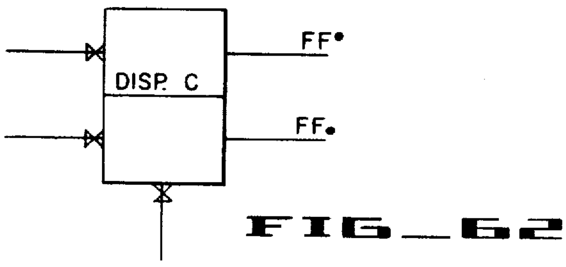
Figure 63:
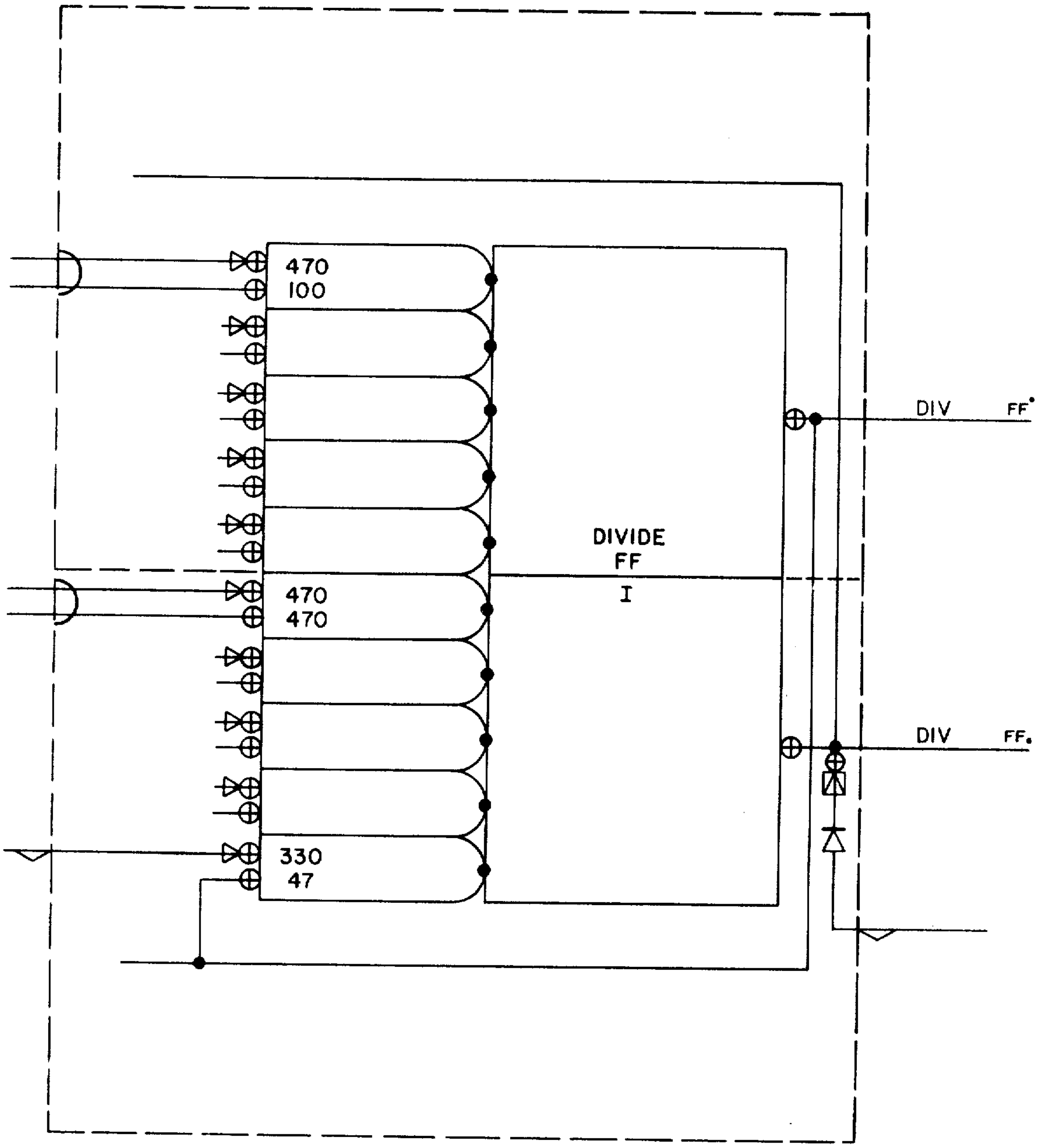
Figure 64:
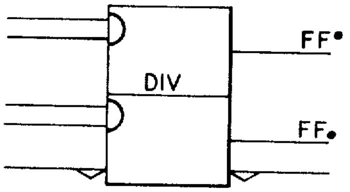
Figure 65:
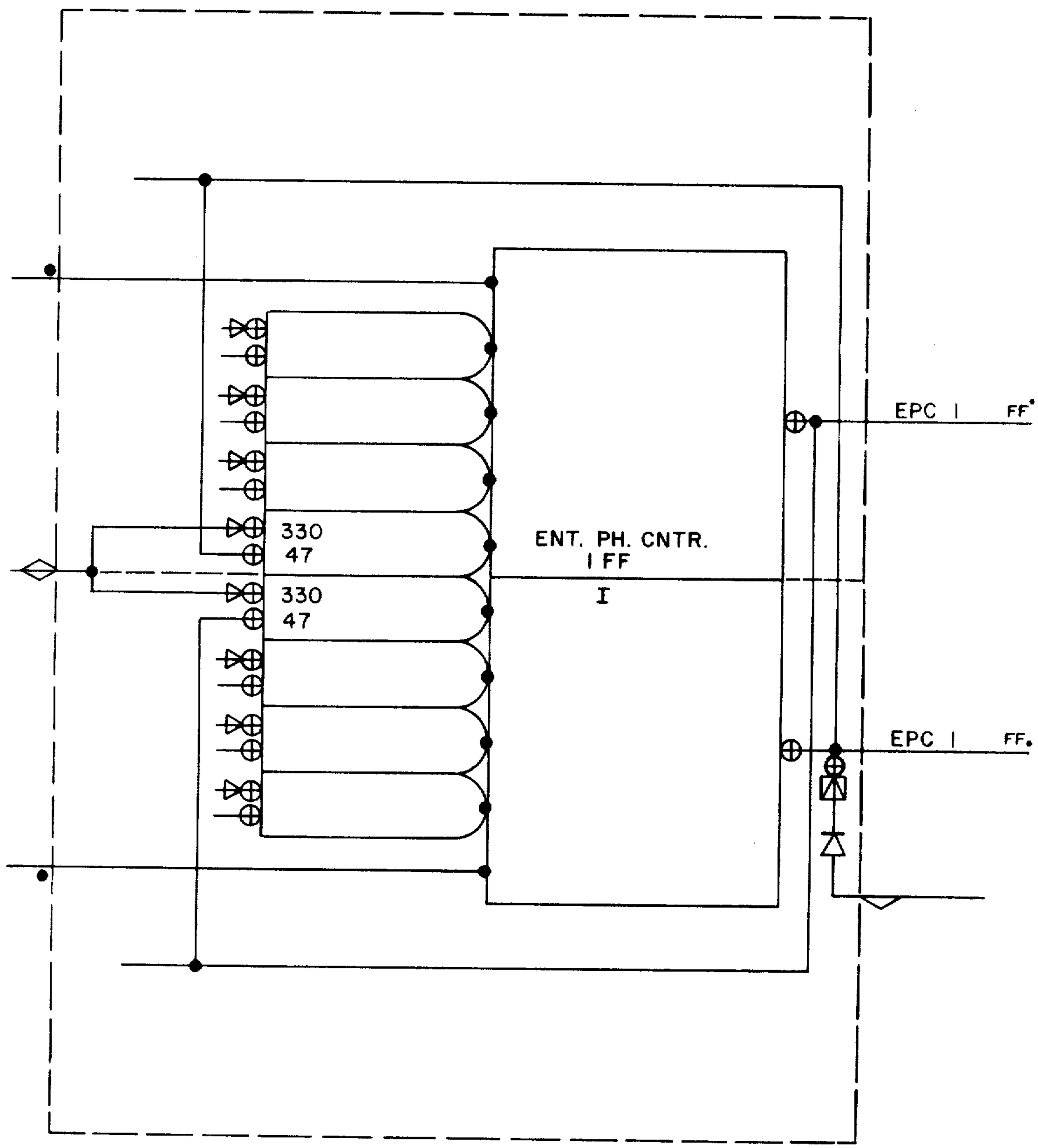
Figure 66:
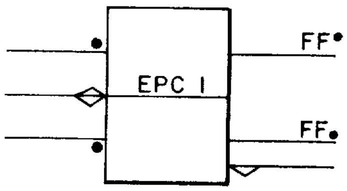
Figure 67:
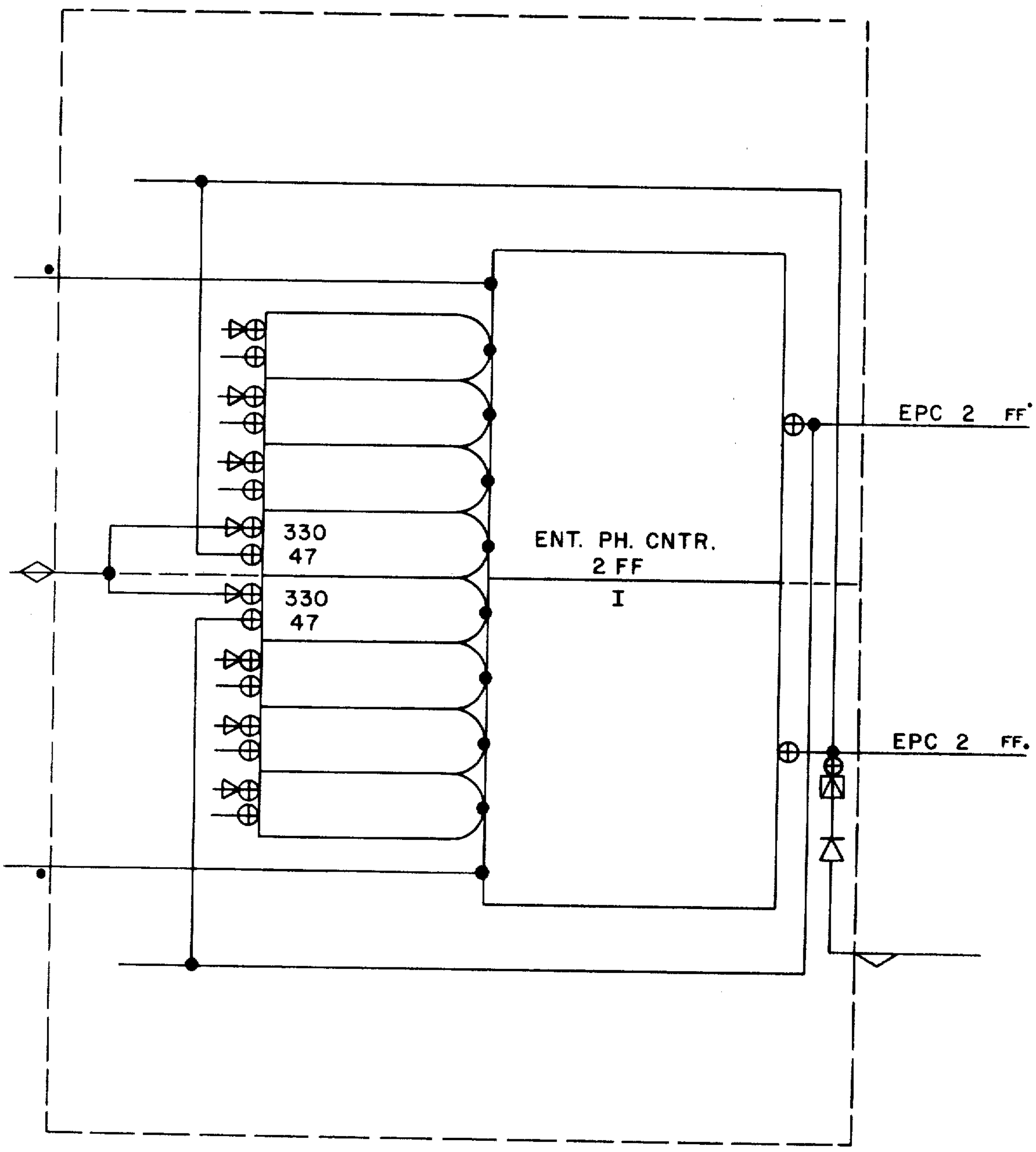
Figure 68:
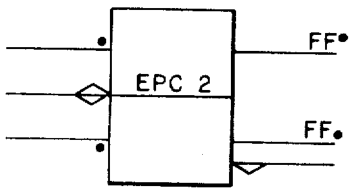
Figure 69:
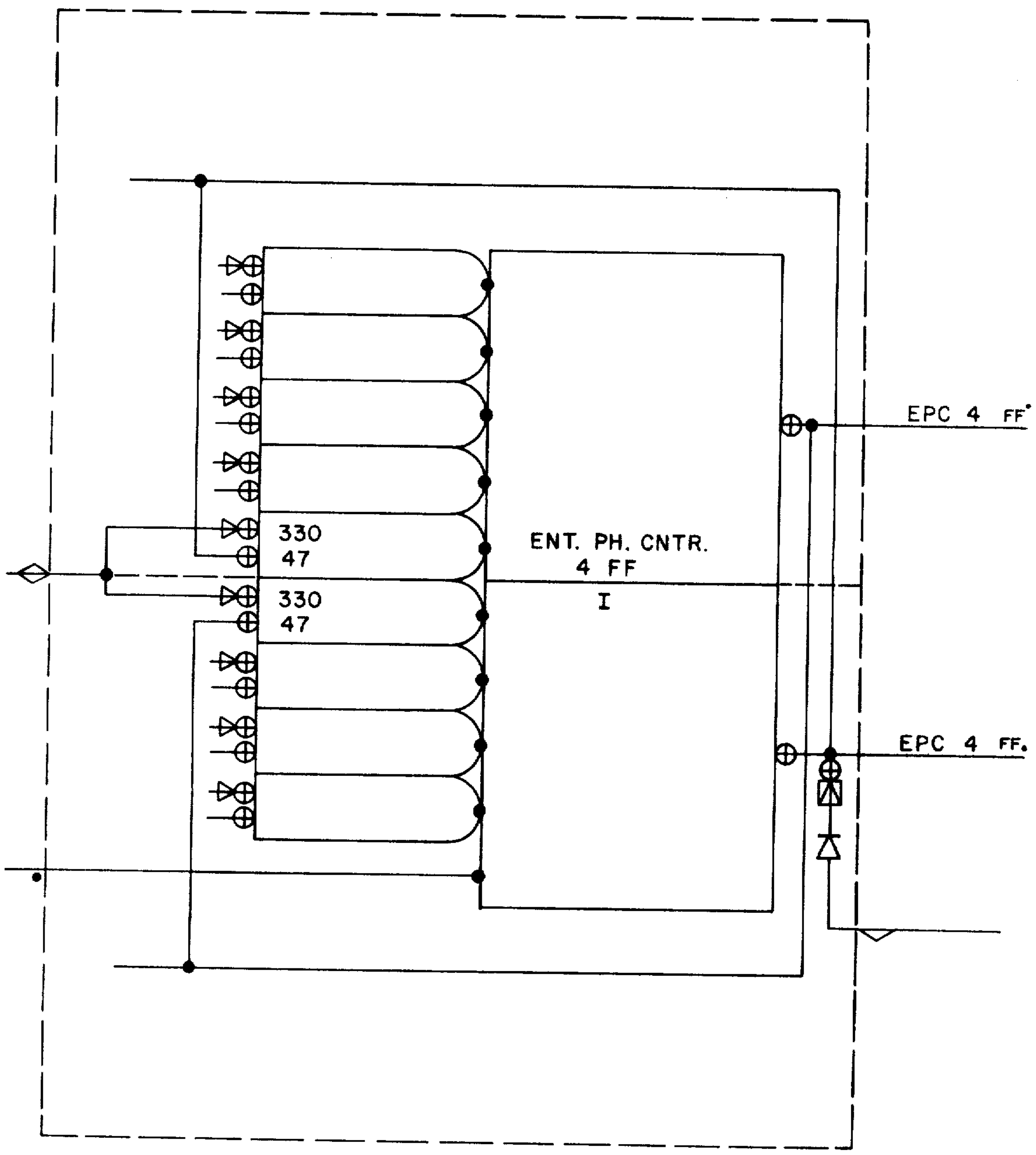
Figure 70:
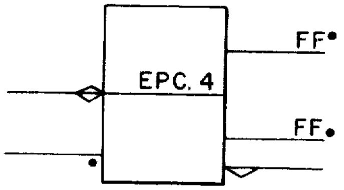
Figure 21:
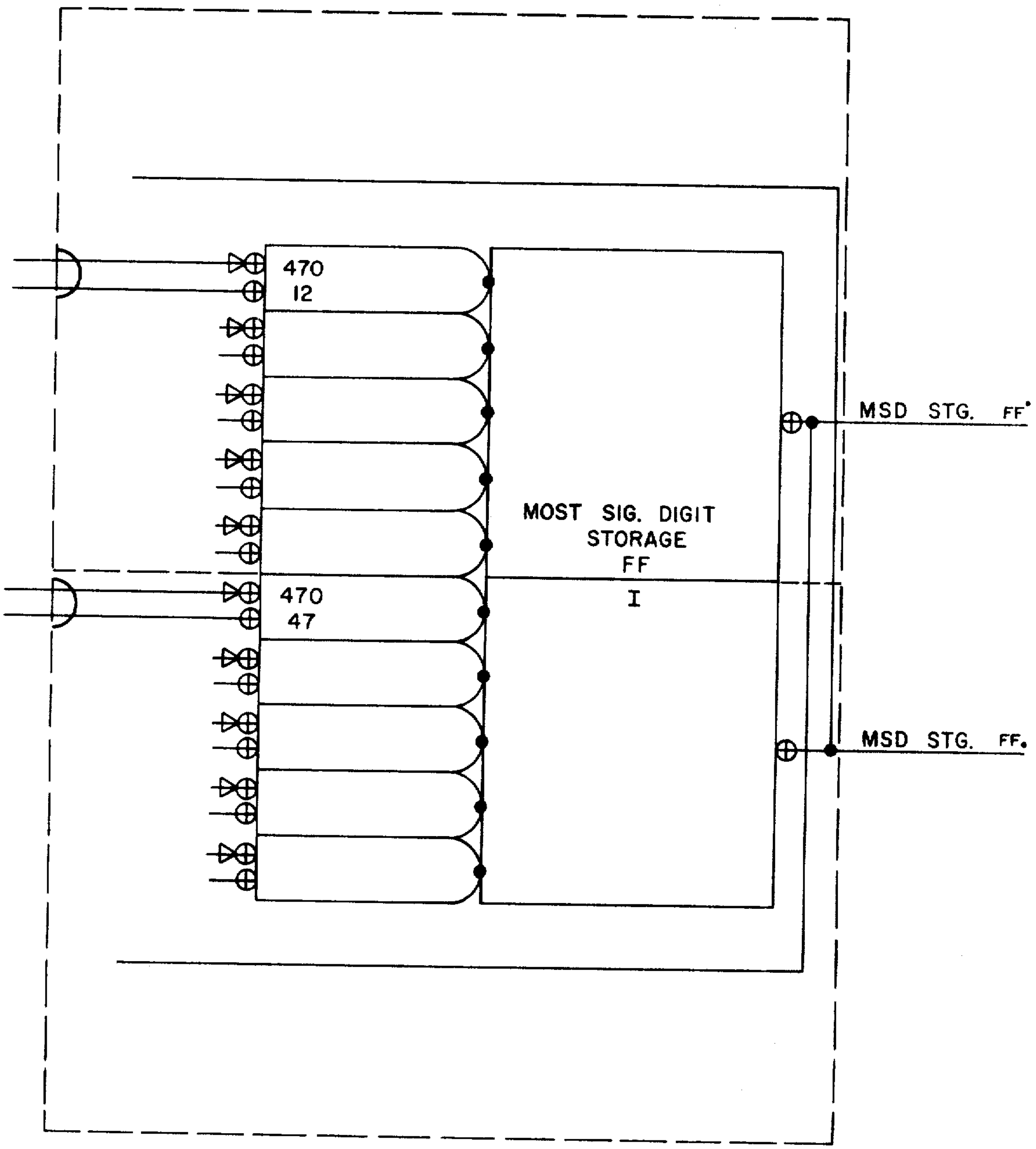
Figure 22:
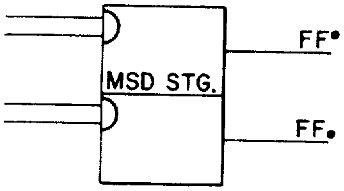
Figure 25:
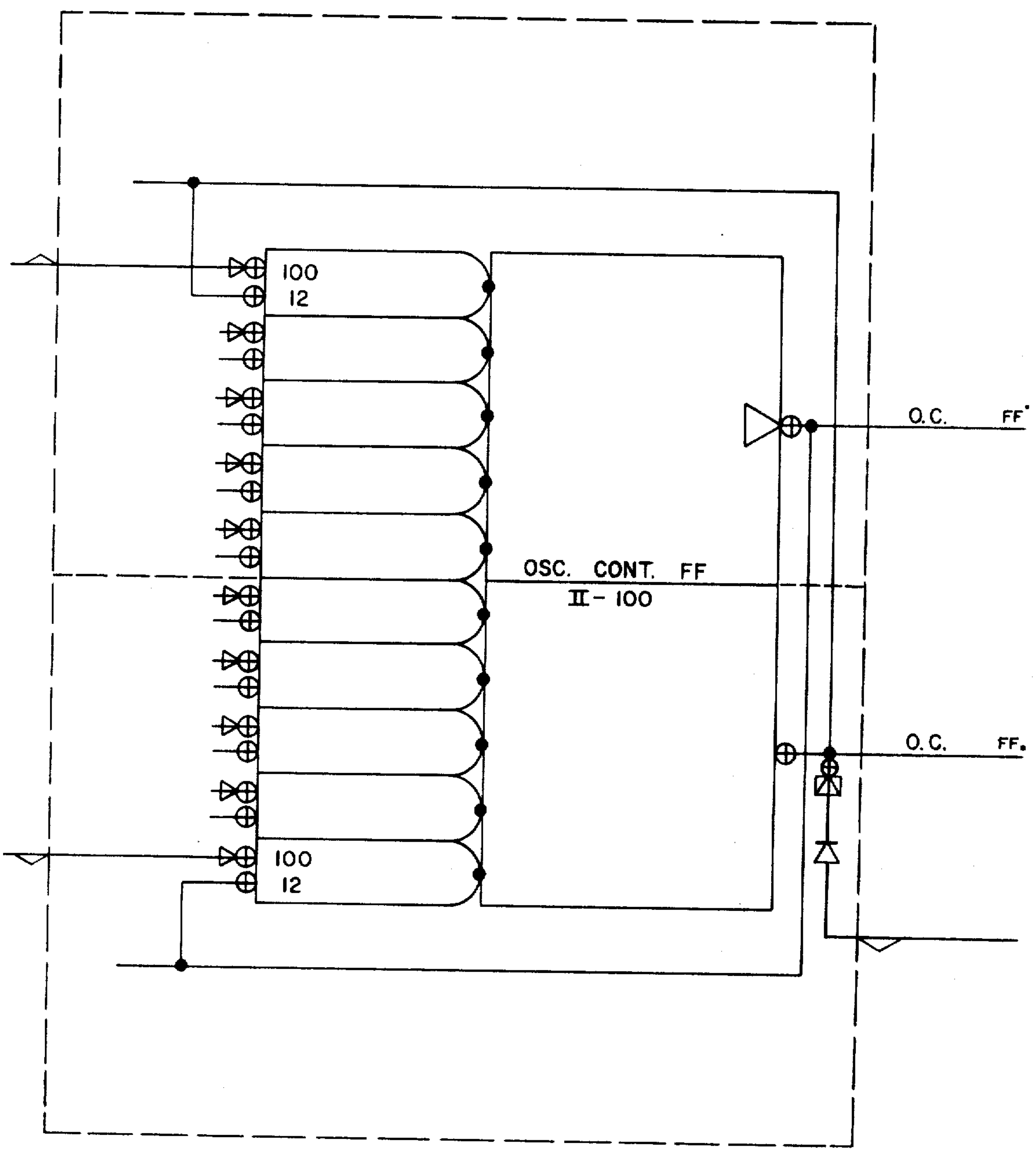
Figure 26:
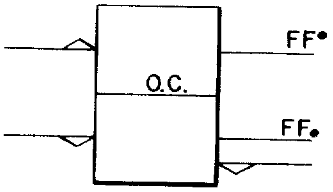

Similarly, in the case of the Decimal Point Counter (DPC) 1 flip-flop (see FIGS. 51 and 52), which has three independent gates on its true input segment, it may be seen that the upper terminal of the middle independent gate is directly connected to the A.C., or capacitive input of the second dynamic gate from the top, while the lower input of the middle independent gate is directly connected to the D.C., or resistive, input of this second dynamic gate from the top. This second dynamic gate may be seen to have a 470 picofarad gate capacitor, and a 68 kilohm gate resistor, and to have its output directly connected to a B· terminal of the basic flip-flop.

The sixty-two composite flip-flops of the system of the invention will hereinafter be represented by the block symbols given in the even-numbered figures of the flip-flop definition sheets.

11.2. Gates, Inverters, and Emitter Followers

Figure 160:
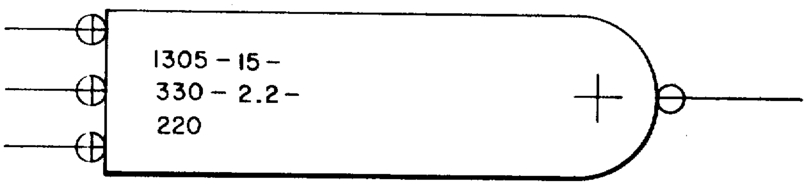

To facilitate study of the circuit diagram (FIGS. 225 through 294), the gates, inverters, and emitter followers found therein are represented by a group of block symbols of which the symbols shown in FIG. 160 are typical.

Considering FIG. 160 as typical, it may be seen to comprise the following elements, most of which are found in the same or slightly altered form in the majority of the gate, inverter, and emitter follower block symbols found in the circuit diagram.

The outline of the gate symbol shown in FIG. 160, i.e., an oblong having a straight input end and a curved output end, is employed herein as the outline of the block symbols representing several different gates and inverters. For instance, this outline is also used in the dynamic gate symbol discussed at length hereinabove.

Figure 175:
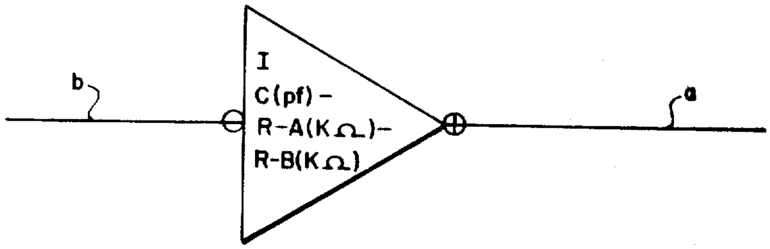
Figure 181:
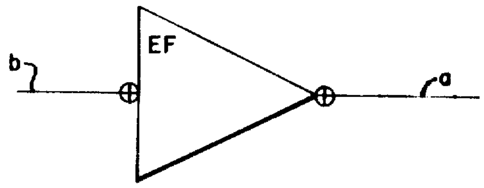

The particular outline shown in FIG. 160, however, is not used exclusively to represent subcircuits of this class, an alternative triangular form of outline being employed, e.g., to represent an inverter in FIG. 175, and an emitter follower in FIG. 181.

The group of numbers separated by hyphens found within the outline of FIG. 160 is called the "component value legend." Each of the numbers in the component value legend indicates the value, or type, of a component of the circuit represented by the symbol. For instance, the first number of the component value legend of FIG. 160, viz., "1305," is the four rightmost digits in the type designation of the transistor used in the gate circuit represented by the symbol of FIG. 160, i.e., the circuit of FIG. 159. As another example, the second number in the component value legend of FIG. 160, viz., "15," is the value in kilohms of the leftmost resistor in the circuit of FIG. 159. The relationship between the component value legend found in a given gate, inverter, or emitter follower block symbol and the circuit symbolized thereby is discussed in detail hereinbelow.

An additional element of the gate symbol shown in FIG. 160 is the set of signal symbols located on the input and output lines of the gate symbol and tangent to its outline. Such signal symbols, i.e., signal symbols which are located on a lead of and tangent to, a block symbol anywhere in the drawings, are generally called "conjoint signal symbols." For instance, the PL-signal symbols often found herein on the output leads of the basic flip-flop, and tangent to its outline, are said to be "conjoint with" the basic flip-flop, and, thus, are called "conjoint signal symbols." The conjoint signal symbols viewed in conjunction with gate symbols herein, are also called "1," or "logical one" symbols, because they indicate the electrical value associated with logical one at the terminals of the gate.

Figure 162:
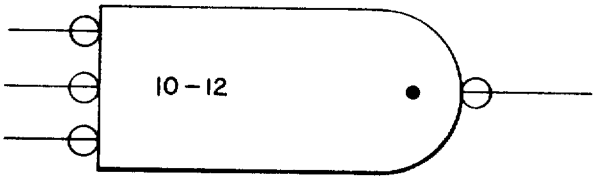

Another element of the typical gate symbol of FIG. 160 which should be given consideration is the "logical function symbol," located adjacent the curved output end thereof. In the gate symbol of FIG. 160, this logical function is, of course, a "+," or "logical inclusive OR" symbol. In FIG. 162, on the other hand, the logical function symbol can be seen to be an "·" or "logical AND" symbol. Another symbol sometimes used as the logical function symbol of a gate herein is found adjacent the curved output end of the two gate symbols shown in FIG. 171, and is designated herein an "ANDOR" symbol.

The logical function symbol found within a given gate symbol indicates the logical function which the corresponding gate circuit will perform when the electrical value of "1" at each terminal of that gate is taken to be the binary level indicated by the conjoint, or "1" signal symbol located thereat.

Figure 155:
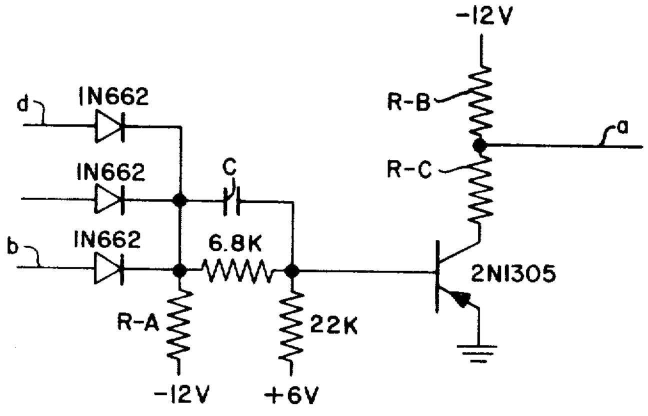
FIGS. 155 and 156 illustrate the circuit and symbol respectively, of a 1305 gate.

11.2.1. 1305 Gate: FIG. 155 illustrates a circuit of the type generally known hereinafter as a "1305 gate." It will be seen in FIG. 155 that some of the components of the circuit shown therein have specific type-numbers, or values, e.g., "1N662," "6.8K." Other components of the circuit of FIG. 155, on the other hand, are not indicated as having specific type-numbers, or values, but are denoted by a letter, or letter group, e.g., "C," "R–A." The components of FIG. 155 indicated as having specific values, or specific type-numbers, are hereinafter designated "common components," since these particular components are found to have the same value in every 1305 gate in the circuit diagram, and thus, may be considered to be common to all of the 1305 gates in the circuit diagram. The components in the circuit diagram of FIG. 155, which are designated by letters, or letter groups, on the other hand, do not have the same value, or type-number, in all of the 1305 gates in the circuit diagram. Thus, since the value, or type-numbers of these components are unique to one, or a group, of the 1305 gates in the circuit diagram, they are hereinafter called "unique," or "special" components.

Turning now to the gate symbol shown in FIG. 156, which represents the 1305 gate circuit shown in FIG. 155, it may be seen that the component value legend within that gate symbol is composed of five parts, or "terms," separated by hyphens. The first term of the component value legend of the symbol of FIG. 156 is "1305," which is the gate type number and also the last four digits in the type-number of the transistor used in this gate, as shown in FIG. 155. The other four terms of the component value legend found in the gate symbol of FIG. 156 are the values of the unique components shown in the circuit of FIG. 155, taken in the order in which they would be perceived by an eye scanning FIG. 155 from top to bottom, starting at the left end of the figure and proceeding to the right end thereof. In the block symbol representing a specific 1305 gate, the "term definitions," e.g., "R–A (KILOHMS)," "C(pf.)", as found in the general gate diagram of FIG. 156, are replaced by the numerical values of the corresponding unique components found in the circuit diagram of the specific gate.

Figure 159:
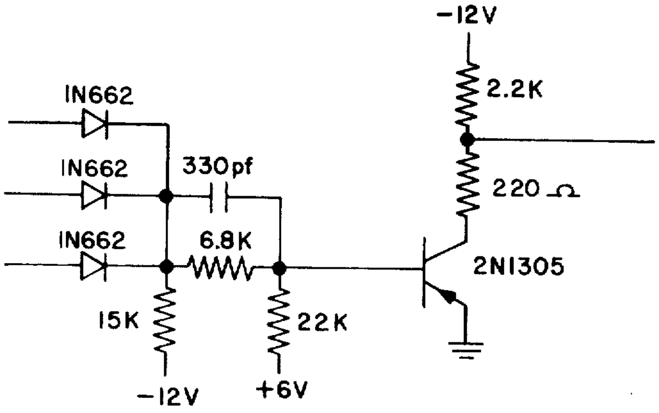
FIGS. 159 and 160 illustrate a typical 1305 gate used in the circuit of the instant embodiment.

An example of this is found in FIG. 160, which shows the specific gate symbol corresponding to the gate circuit of FIG. 159. The first term of the component value legend in this gate symbol is "1305," just as in the gate symbol of FIG. 156. The second term in the component value legend of FIG. 156, however, is the term definition "R–A (KILOHMS)." Going to FIG. 155, then, it can be seen that R–A is the leftmost resistor (vertical) in the gate circuit. In the specific gate circuit of FIG. 159, this leftmost vertical resistor is labelled "15K," i.e., 15 kilohms. Thus, the numerical value of the second term of the component value legend in the block symbol corresponding to the specific gate circuit of FIG. 159, should be "15," and this is the number found in the second term position of the component value legend of FIG. 160. Similarly, the third term of the component value legend of FIG. 156 is the definition "C(PICOFARADS)." Going to the generalized 1305 gate circuit diagram of FIG. 156, it is seen that C is the sole capacitor in this circuit. In FIG. 159, this single capacitor is labelled "330 pf.," i.e., 330 picofarads. Thus, the third term of the component value legend of FIG. 160 should be "330," which is the value found in FIG. 160 at that place. From the definitions found in the fourth and fifth term positions of the component value legend of FIG. 156, and inspection of FIG. 155, it can be seen that the values of the two resistors comprising the collector voltage divider in the generalized 1305 gate circuit, first, the upper in kilohms, and then, the lower in ohms, are the numerical values of the last two terms of the component value legend corresponding to such a circuit. As can be seen by inspection of the specific 1305 gate circuit of FIG. 159, "2.2" and "220" are the last two terms in the correct component value legend corresponding to this circuit. These terms are found in the last two term positions in the component value legend of FIG. 160.

As may also be seen in FIG. 156, the last two terms of the component value legend in that figure are enclosed in square brackets. This convention is employed to indicate that a specific 1305 gate, and at least one other, share a common collector circuit. In some instances, the gate number of the other gate, or gates, so sharing, will be set out to the right of these square brackets. Such a collector-circuit-sharing group of gates will hereinafter be called an "ANDOR" gate. The subject of ANDOR gates is further treated hereinbelow in connection with FIGS. 170 and 171.

Attention is directed to the practice (see * in FIG. 156) of indicating an open circuit between terminals normally spanned by a unique component by means of an "N" in the place corresponding to that component in the component value legend. Thus, were the 330 pf. capacitor entirely missing in FIG. 159, then the third term in the component value legend in FIG. 160 would be "N."

A short circuit across any pair of points in a 1305 gate circuit usually occupied by a unique component will, of course, be shown by a "0" in the corresponding position of the component value legend. Thus, were the 220 ohm resistor in FIG. 159 replaced by a direct wire connection, then the fifth term of the component value legend in FIG. 159 would be "0." As indicated by ** in FIG. 156, there are certain specific 1305 gate circuits herein having at least one input lead without a diode therein, i.e., a short, direct wire connection substituted for the gate diode at the input. To indicate this situation, the corresponding lead in the block symbol representing such a specific 1305 gate circuit, will have an "N" placed thereabove.

Figure 166:
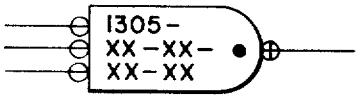
FIGS. 166 through 169 illustrate the method of employing conjoint signal symbols for indicating the "logical one" levels at the AND and OR gate terminals.

It is important to note in connection with FIG. 155, that the "+" logic function symbol shown adjacent the curved end of the gate symbol of FIG. 156, is merely exemplary, and is not intended to imply that the only logical function which can be performed by a 1305 gate is the logical inclusive OR function. Rather, as is well-known to those skilled in the art (see, for instance, "Switching Circuits for Engineers," M. P. Marcus, chap. 3, "Logical Circuits," pp. 33–45, Prentice-Hall, 1962), the logical function of a gate circuit, such as the circuit herein called the "1305 gate," is dependent upon the binary level designated as "1" at the input and output terminals thereof. If, for instance, "1" on the input terminals of a 1305 gate is designated as the NL-signal, as shown by the left-hand conjoint signal symbols in FIG. 166, and "1" is designated as the PL-signal at the output, as shown by the output conjoint signal symbol in FIG. 166, then the logical function performed by that gate is the AND function, as shown by the dot adjacent the curved output end of the gate symbol of FIG. 166. That this is so, may easily be deduced from the generalized 1305 gate circuit of FIG. 155. Supposing, for the moment, that any one of the input terminals of this circuit is receiving the PL-signal, i.e., "0," then its associated diode will conduct, and the resulting drop across R–A will put a relatively positive signal upon the base of the 2N1305 transistor, thereby bringing the conduction of this transistor to a relatively low level, or cutting it off completely. Then, since the current flow through R–B is relatively small, the drop thereacross will also be relatively small, and the potential at its lower end will be more negative than would be the case with a higher collector current. Thus, it can be seen that the presence of a PL-signal upon any input of a 1305 gate will produce an NL-signal upon its output. It follows then, that the only combination of inputs which will produce a PL-signal at the output of a 1305 gate, is the combination consisting of NL-signals upon all of its inputs. To say this, however, is merely to say that a 1305 gate acts as an "AND" gate when "1" is considered to be the NL-signal at its inputs, and "1" is considered to be the PL-signal at its outputs. This same statement is, of course, more simply made graphically as shown in FIG. 166, and, for convenience of reference, at the terminals of all of the 1305 gates serving as "AND" gates throughout the circuit drawing.

Figure 167:
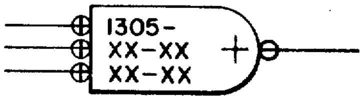

By similar reasoning, it can be seen that the conjoint signal symbols shown in FIG. 167 correctly indicate the values of "1" at the terminals of the 1305 gate when it functions as an "OR" gate.

Figure 157:
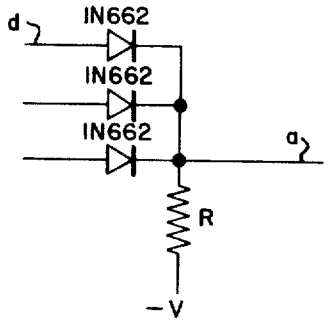
FIGS. 157 and 158 show the circuit and symbol respectively, of a non-inverting (diode) gate.

11.2.2. Diode Gate: The generalized circuit diagram of the form of diode gate called "normal," "standard," or "ordinary" herein is shown in FIG. 157. The symbol used in the circuit diagram to represent the "ordinary" diode gate circuit of FIG. 157 is shown in FIG. 158. As shown in FIG. 158, the component value legend found in this diode gate symbol consists of two terms. The first of these terms in FIG. 158 is the numerical value of the load resistor R in kilohms. The second of these terms in FIG. 158 is the numerical value of the supply voltage V, without regard to the sign, the "ordinary" diode gate, as defined herein having a "—" supply. An example of a specific ordinary diode gate circuit is found in FIG. 161. The specific gate symbol which represents the diode gate circuit of FIG. 161, when it functions as an AND gate, is shown in FIG. 162.

Figure 168:
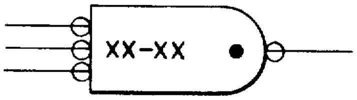
Figure 169:
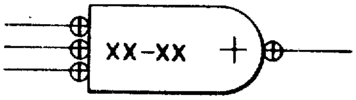
Figure 120:
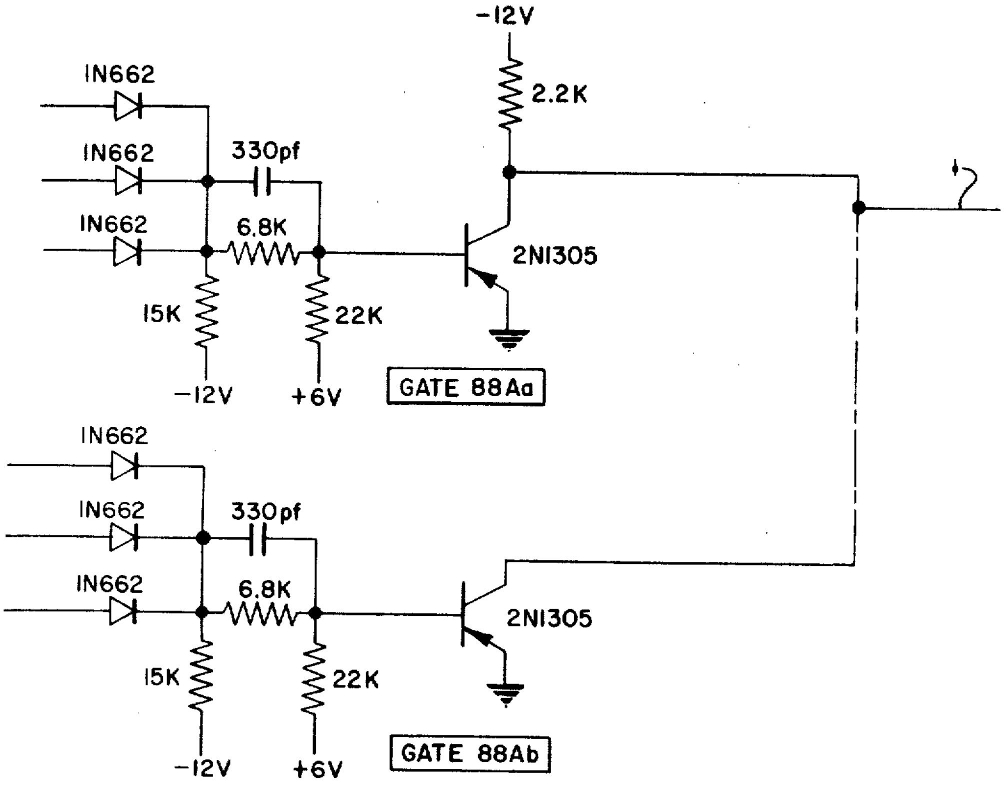
Figure 121:
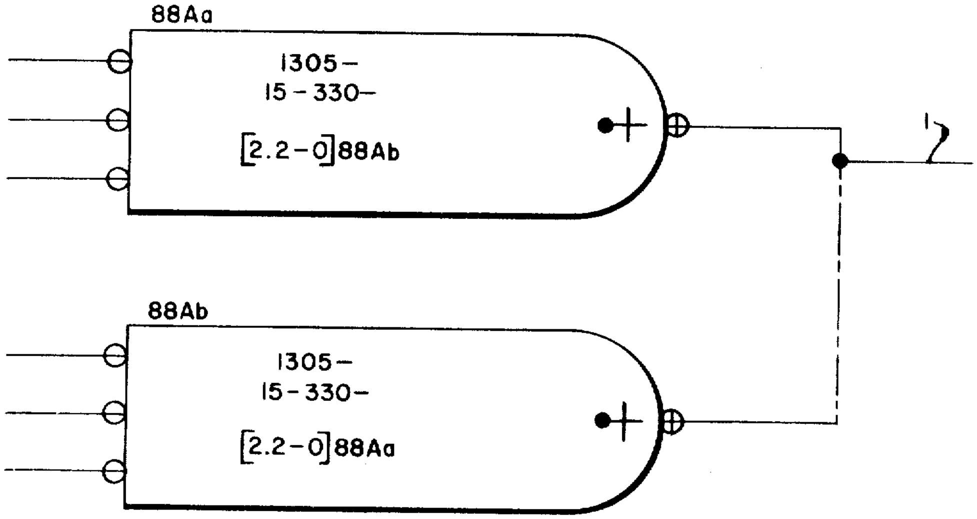

It should be particularly noted with respect to FIG. 158, that the logical function symbol shown therein, viz., "·," does not imply that this function is the only function which may be performed by the gate circuit of FIG. 157. Rather, as is well-known to those skilled in the art (see Marcus, cited above), the logical function performed by this gate is dependent upon the binary level assigned to "1" at its terminals. The conjoint signal symbols shown in FIG. 168 indicate the signal levels at the terminals of the ordinary diode gate which correspond to "1" when the gate functions as an AND gate. The conjoint signal symbols shown in FIG. 169 indicate the binary levels corresponding to "1" when the diode gate circuit of FIG. 157 functions as an OR gate.

11.2.3. Andor Gate: FIG. 170 shows a pair of 1305 gates interconnected so as to form an "ANDOR" gate. The 1305 gate block symbols corresponding to the circuit of FIG. 170 are shown in FIG. 171. The upper gate circuit in FIG. 170 is designated "88A*a*," and the lower gate "88A*b*." These identifying numerals assigned to the two gate circuits of FIG. 170 are unlike the gate numbers found in the circuit diagram, i.e., numerals with no alphabetic component, to indicate that these gates are not representative of any specific gates anywhere in the circuit diagram, but are merely given to explain the nature of the ANDOR gates, and their corresponding symbols. As seen in FIG. 170, gate 88A*a* constitutes a complete 1305 gate circuit, which, standing along, could be described by the component value legend "1305–15–330–2.2–0."

As shown by the vertical "phantom" line at the right-hand side of FIG. 170, however, the output terminal of gate 88A*a* is connected to the collector of the transistor found in the lower gate circuit, 88A*b*. Thus, it may be seen that the output circuit of gate 88A*a*, i.e., a 2.2K resistor tied to −12 v., is "shared" with gate 88A*b*, in the sense that conduction in the transistor of either gate 88A*a* or 88A*b* will produce a drop across the 2.2K resistor, thus altering the potential of the common output 1 toward a more positive level. For this reason, this "shared" output circuit is included in the component value legend of both gates, 88A*a* and 88A*b*, but is enclosed in square brackets.

As shown in FIG. 171, the gate designation number of the other gate "sharing" this output circuit is set to the right of the square bracket in each of the gate symbols comprised in the ANDOR symbol. As shown by the conjoint signal symbols and the ANDOR (+) logical function symbols of FIG. 171, these gates, acting together, may be thought of as individual AND gates whose outputs are directly connected to the terminals of an OR gate, the output of the OR gate corresponding to output terminal 1 as shown in FIGS. 170 and 171. It may be also convenient, of course, to regard this group of gates taken together as logically constituting a single AND gate having the single output 1.

Figure 176:
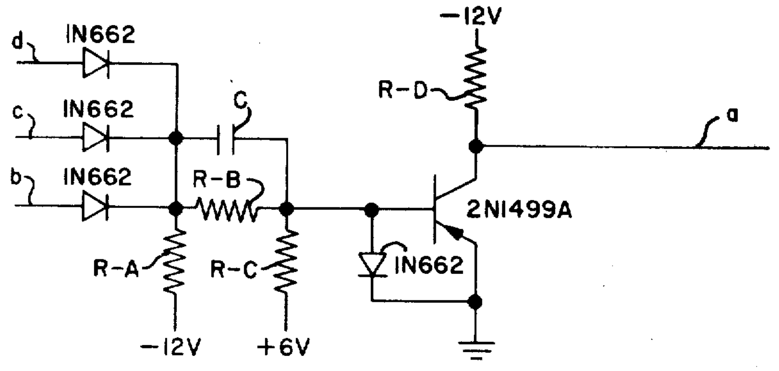
FIGS. 176 and 177 illustrate the circuit and the block symbol, respectively, of a second type of inverting gate.

11.2.4. 1499 Gate: As shown in FIG. 176, an inverting gate circuit frequently used herein employs the 2N1499A transistor. This 1499 gate, while it generally resembles the 1305 gate in circuit configuration, employs, in addition to a transistor of different type, a 1N662 diode having its anode connected to the base of the transistor and its cathode grounded, and has unique components which were common in the 1305 gate circuit. Thus, as may be seen in FIG. 177, the component value legend in the 1499 gate block symbols varies from the component value legend in the 1305 gate block symbols. For instance, the first term of the 1499 gate component value legend is "1499." Also, the 1499 gate component value legend has five unique component terms, rather than four, as is the case with the 1305 gate symbol. The numerical values of these unique component terms are deduced from the corresponding circuit diagram by the "scanning" method described hereinabove in connection with the 1305 gate.

Figure 177:
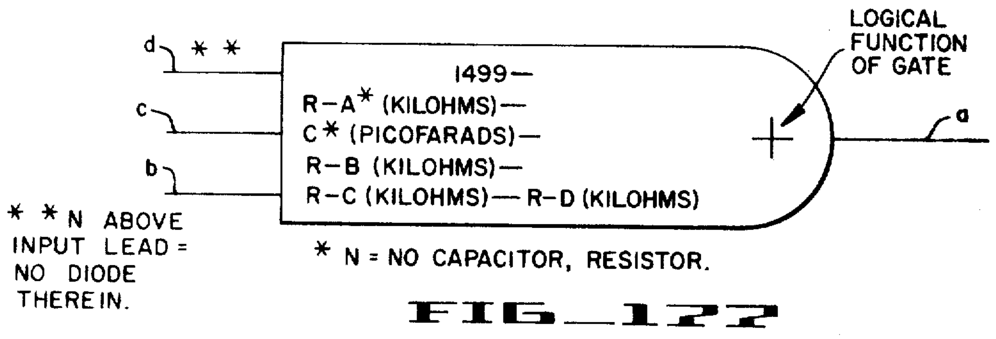

Again, as in the case of the 1305 gate, the logical function symbol shown in FIG. 177 does not imply that the sole function which can be performed by a 1499 gate is the inclusive OR function. Rather, as explained hereinabove, in connection with the 1305 gate, the 1499 gate circuit, like most other gate circuits, can be said to perform any one of a number of logical functions, depending upon the nature of the electrical signals identified with "1" at its terminals.

Figure 178:
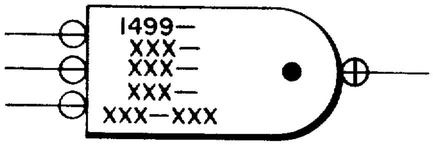
FIGS. 178 and 179 illustrate the method of using conjoint signal symbols for indicating the "logical one" levels of the terminals of the second type of inverting gate shown in FIGS. 176 and 177.
Figure 179:
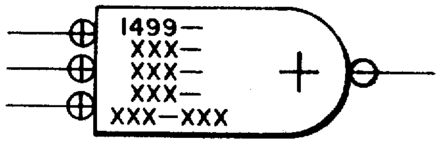

The conjoint signal symbols in FIGS. 178 and 179 show the binary levels corresponding to "1" for which the 1499 gate functions as an AND and an OR gate, respectively.

Figure 172:
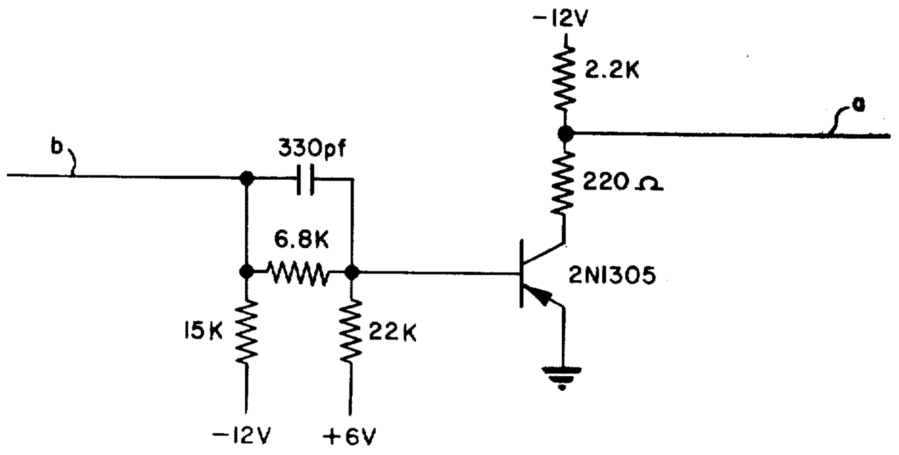
FIGS. 172 and 173 illustrate the circuit and block symbol, respectively, of a gate having a single input and a single output, which type of gate is employed in the present embodiment as an inverter.
Figure 173:
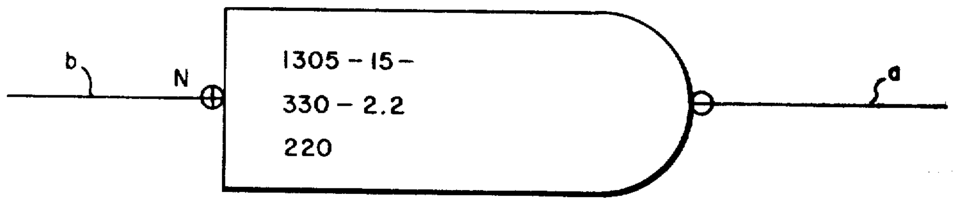

11.2.5. Inverters: At several places in the circuit diagram, a 1305 gate, having a single input, is employed as an inverter. A circuit showing the use of a 1305 gate circuit as an inverter is found in FIG. 172, and the corresponding specific block symbol is shown in FIG. 173. When this single input lead contains no diode, as shown by input lead *b* in FIG. 172, then the single input lead in the corresponding block symbol has an "N" placed directly thereabove, as shown in FIG. 173. The component value legend for such an inverter is derived from its circuit in the same manner in which the component value legend corresponding to a given 1305 gate circuit is derived therefrom.

When a symbol resembling the 1305 gate symbol is used to represent an inverter, however, it can be identified as an inverter symbol by (a) the absence of a logical function symbol, and (b) the absence of more inputs than one. The conjoint signal symbols associated with any inverter block symbol can be used to distinguish it from an emitter follower by the fact that the inverter block symbol has an output conjoint signal symbol differing from its input conjoint signal symbol.

Figure 174:
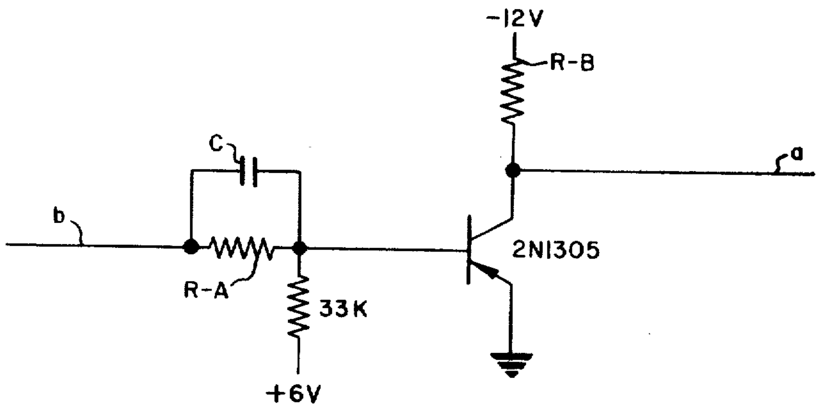
FIGS. 174 and 175 illustrate the circuit and block symbol, respectively, of a second type of an inverter employed herein.

Another and slightly different type of inverter employed herein is shown in FIG. 174, the block symbol chosen to represent the same being shown in FIG. 175. As may be seen in FIG. 175, the outline of the symbol chosen to represent the second type of inverter is triangular, rather than oblong, as is the 1305 gate symbol used to show an inverter. Because of this different outline, one attempting to reproduce the circuit of the instant invention from the circuit diagram need merely have resort to FIG. 174 to deduce the circuit corresponding to the inverter represented by a triangular outline, and to FIG. 155 to deduce the nature of the circuit of any inverter represented by an oblong of the type used to represent inter alia the 1305 gates. The component value legend found within any specific triangular inverter block symbol is deduced from its corresponding circuit in the same manner used in deducing the component value legend of a 1305 gate from its corresponding circuit, that is to say, by the same process of "scaning" described hereinabove in connection with the 1305 gate. Finally, an "I" is added in the upper corner of each triangular inverter symbol to aid in distinguishing from triangular emitter follower symbols of the type described hereinbelow.

Figure 180:
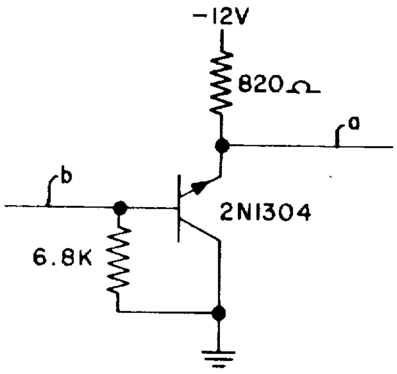
FIGS. 180 and 181 illustrate the circuit and the block symbol, respectively, of a particular emitter follower.

11.2.6. Emitter Follower: A particular emitter follower circuit which is used in the instant invention is shown in FIG. 180. The block symbol used to represent the emitter follower of FIG. 180 is shown in FIG. 181. The emitter follower of FIG. 180 differs from the emitter follower shown in FIG. 7 which is used in some of the composite flip-flop circuits herein. Generally, this distinction may be kept in mind by the fact that the small triangular symbols used for the FIG. 7 emitter follower are always found, where they are found, within the outline of a basic flip-flop, while on the other hand, the triangle representing the emitter follower of FIG. 180 is never found within the outline of a basic flip-flop. To further distinguish, however, the legend "EF" has been placed at the upper corner of each triangular symbol representing the emitter follower of FIG. 180. Also, the triangular symbol representing the emitter follower circuit of FIG. 180, as shown in FIG. 181, can be distinguished from the similar triangular symbol representing an inverter by the fact that the conjoint signal symbols associated with the emitter follower are alike.

11.3. Miscellaneous

Figure 163:
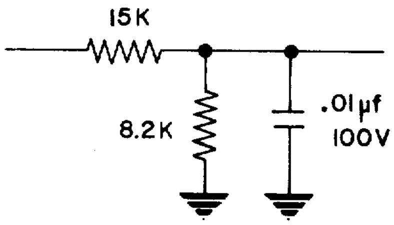
FIGS. 163 and 164 illustrate the circuit and block symbol, respectively, of a key filter KF for eliminating contact, or key, noise in the entry unit of the present embodiment.
Figure 184:
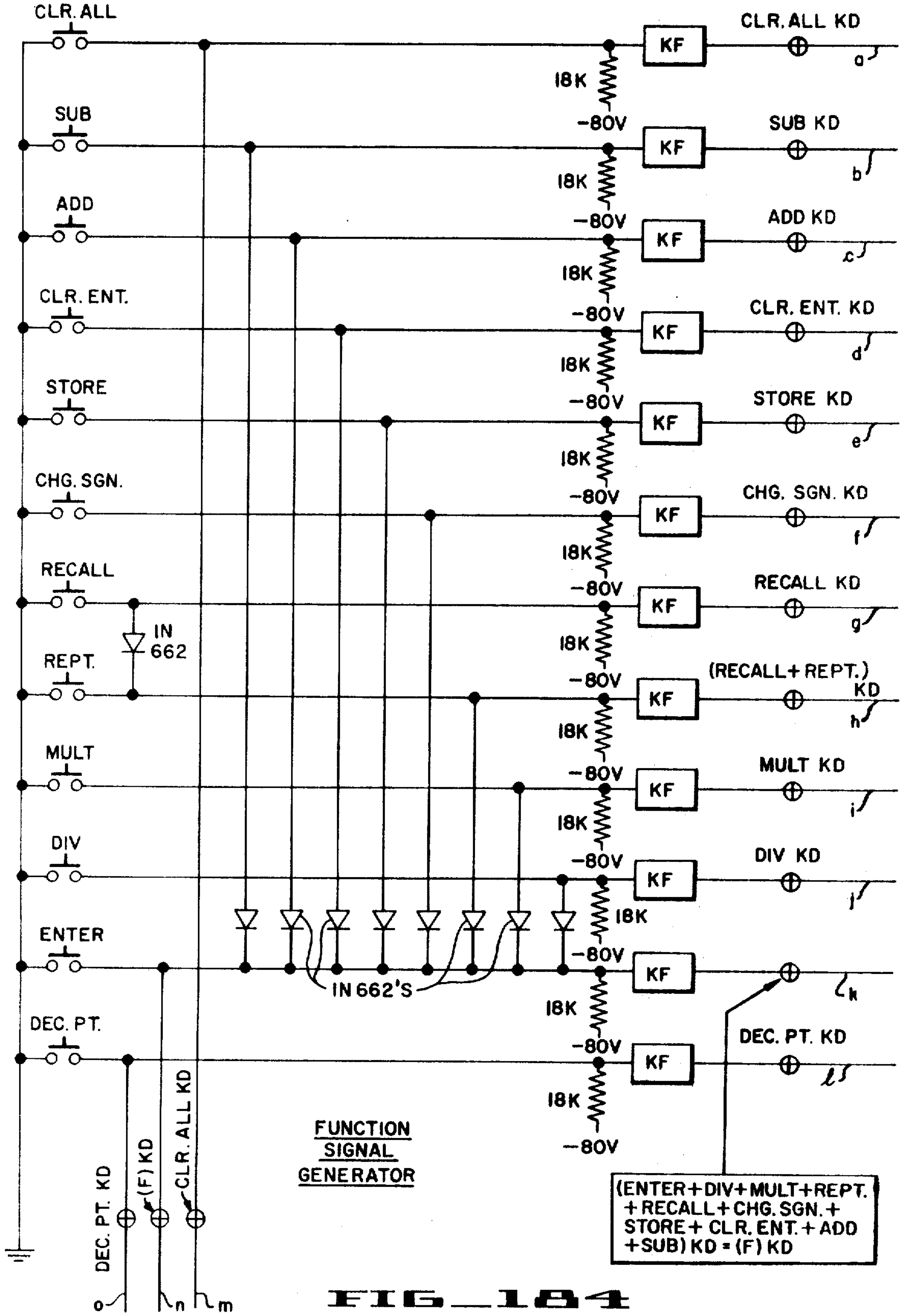
FIG. 184 illustrates the circuit of the function signal generator, used for controlling the operating functions of the calculating device of the embodiment.

In FIG. 163 is shown a key filter circuit employed at several places in the Digit Signal Generator and Function Signal Generator of FIGS. 182 and 184, for eliminating "noise" from appearing on the output lines of these generators.

Figure 165:
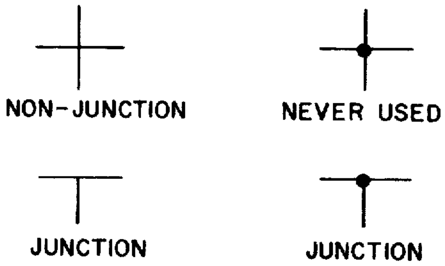
FIG. 165 shows the several symbols for interconnections between electrical leads.

The method preferred herein for denoting interconnections between electrical leads, or the absence of the same, is shown in FIG. 165. As noted in that figure, T-junctions between leads are indicated either with or without a dot. On the other hand, a complete crossing of one lead over another without a dot will always be used herein to indicate leads which cross, but do not join. The junction symbol shown in the upper right-hand corner of FIG. 165, and often used in wiring diagrams, is avoided herein in favor of the preferred practice of representing the same junction by means of two T-junctions with or without a dot. In FIGS. 31 through 154 the junction symbol shown in the upper right-hand corner of FIG. 165 is used on right-hand input connections, because of space limitations, though this practice is not preferred.

11.4 Major Subcircuit Block Symbols 11.4.1. Digit Signal Generator: FIG. 182 shows a circuit which may be used with particular effectiveness for making numerical entries into the calculating device. Each number, sometimes called "factor," is entered by successively depressing the numerical keys shown in FIG. 1 in order of the digits of that number, taken from left to right. The entry of each multi-digit number, or factor, is terminated by the depression of the "ENTER" key, or any one of certain other operation keys.

Figure 1:
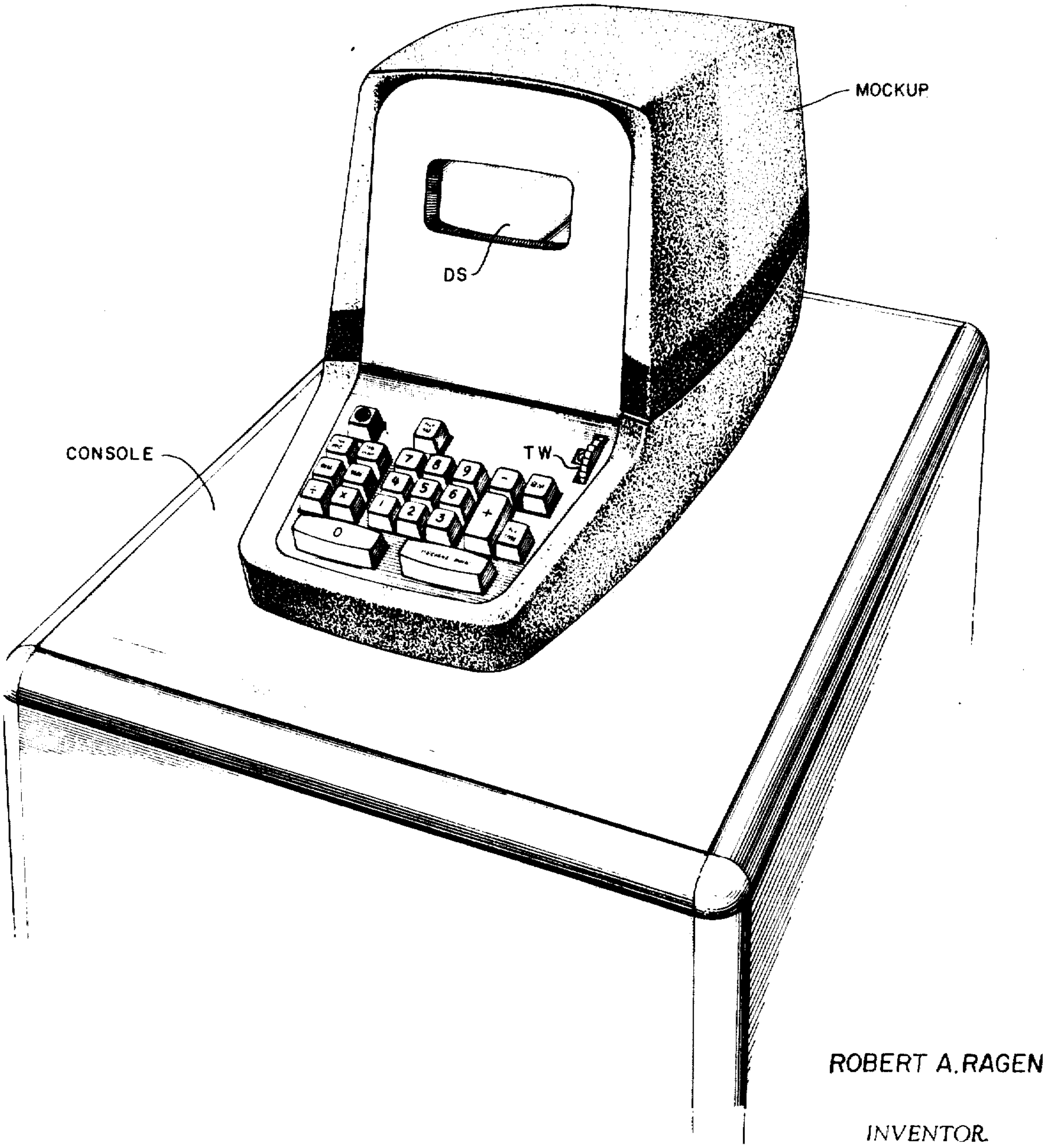
FIG. 1 is a pictorial view of a machine embodying a preferred form of the invention.

As may be seen by comparison of FIG. 1 with FIGS. 182 and 183, each number key of FIG. 1 is arranged in the embodiment described herein to close one of the normally open switches shown at the left-hand edge of FIG. 182, schematic representation of the number keys of FIG. 1 being found in the block symbol of FIG. 183. The depression of the "1" key, of course, results in the closing of the "1" switch, etc.

The Digit Signal Generator of FIG. 182 may be seen, by way of example, to operate as follows:

Depression of the "4" key, and consequent closing of the "4" switch, grounds the "4′" terminal of the "4" switch.

Figure 164:

Thus, since the "4′" terminal is directly connected to one input of each of the upper five "18–80" diode gates shown in FIG. 182, the outputs of these five gates will go to nominal ground, and, thus, a nominal ground signal will appear upon the "*a*" to "*e*" terminals of the Digit Signal Generator, the signal appearing at these terminals being rendered free to some degree from "contact noise" by the "KF" (key filter) circuits (see FIGS. 163 and 164) interposed between these terminals and the outputs of the diode gates. The output signal taken directly from the uppermost diode gate will, of course, appear upon the "*g*" terminal of the Digit Signal Generator.

Each output lead of the Digit Signal Generator has indicated thereon, by means of a signal symbol and an associated assertion legend, those number keys which, when depressed, will produce a nominal ground, or PL, signal thereupon. Thus, the assertion legend "(2+3+4+5+6)KD," or the brief equivalent "(2→6)KD," both found upon the "*c*" terminal, taken in conjunction with the PL-symbol also found thereupon, indicates that the depression of any one of the number keys from "2" to "6," will result in a nominal ground signal upon the "*c*" output of the Digit Signal Generator.

The block symbol used hereinafter to represent the Digit Signal Generator circuit of FIG. 182 is shown in FIG. 183.

Figure 185:
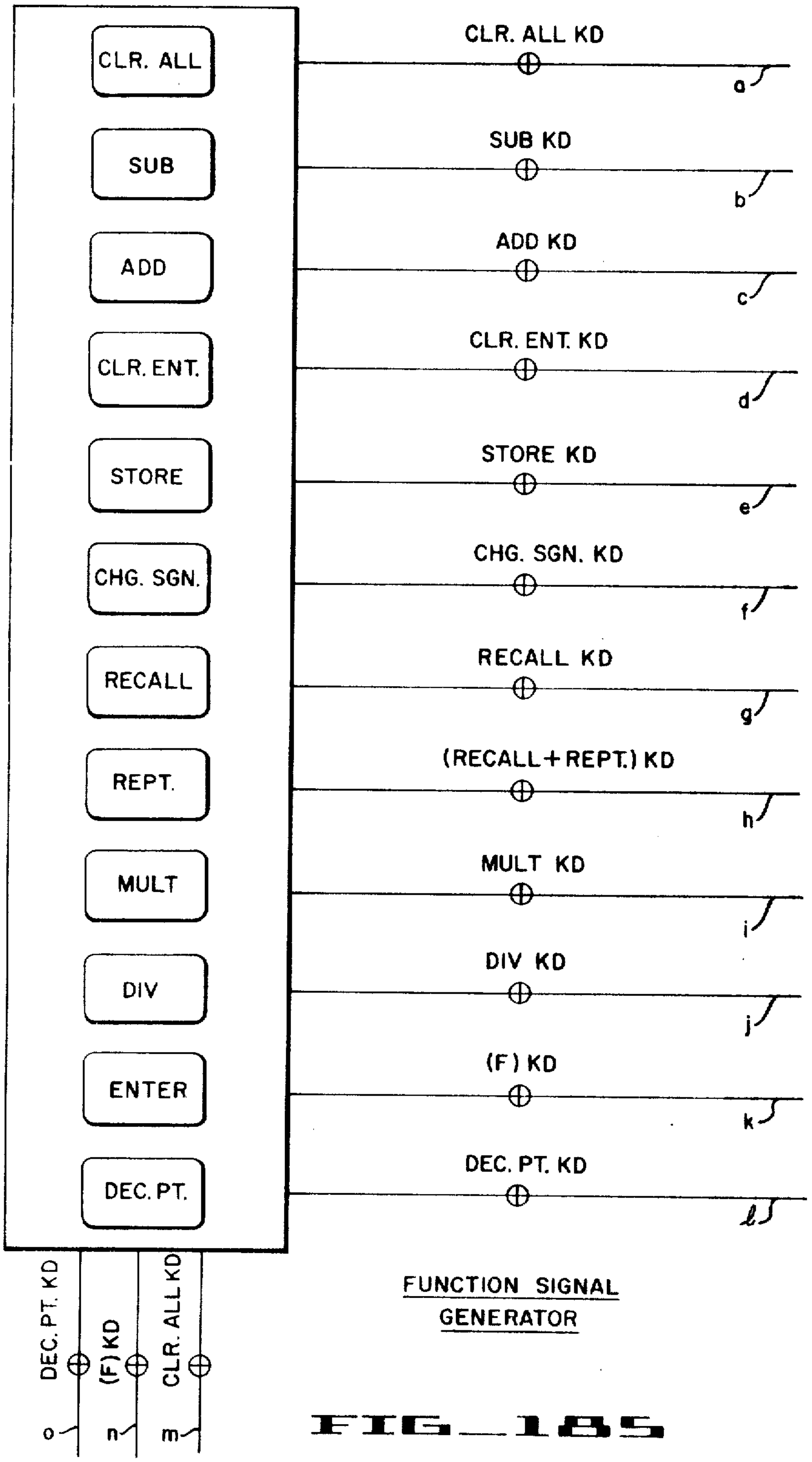
FIG. 185 shows the block symbol for the function signal generator of FIG. 184.

11.4.2. Function Signal Generator: FIG. 184 shows a major subcircuit hereinafter called the "Function Signal Generator," and FIG. 185 shows the block signal hereinafter used to represent the Function Signal Generator circuit of FIG. 184. Each of the normally open switches shown along the left-hand edge of FIG. 184 is labelled with the name of the key found upon the keyboard which, when depressed, will close it. These same keys are represented within the block symbol FIG. 185.

The blocks labelled "KF" found in FIG. 184 represent the key filter circuit shown in FIG. 163.

In the manner described in connection with FIGS. 182 and 183, each of the output terminals of the Function Signal Generator is supplied with an assertion legend and an associated signal symbol, indicating the keys which, when depressed, will produce a PL-signal thereon. Thus, the legend "ADD KD," and PL-symbol appearing on the *c* output terminal of the Function Signal Generator indicate that a nominal ground, or PL-signal will appear at this terminal when the "ADD" key is depressed. The assertion legends and signal symbols appearing upon the other terminals of the Function Signal Generator may be similarly interpreted.

The legend "(RECALL+REPT.)KD," found upon terminal *h*, indicates that nominal ground will appear thereupon when either the "RECALL" or the "REPT." key is depressed.

As shown in the "box" in the lower, right-hand portion of FIG. 184, the nominal ground signal appears upon the *k* output lead of the Function Signal Generator in response to the depression of any one of the keys named in the first parentheses found within this "box." For brevity, "F" is used elsewhere herein to indicate these keys. Thus, the legend "(F)KD" found upon the *n* terminal indicates that nominal ground will appear upon this terminal in response to the depression of any of the keys which are capable of producing a nominal ground upon the *k* lead, i.e., the "F" keys as defined in the "box."

The block symbol shown in FIG. 185 is used hereinafter to represent the circuit shown in FIG. 184.

Figure 186:
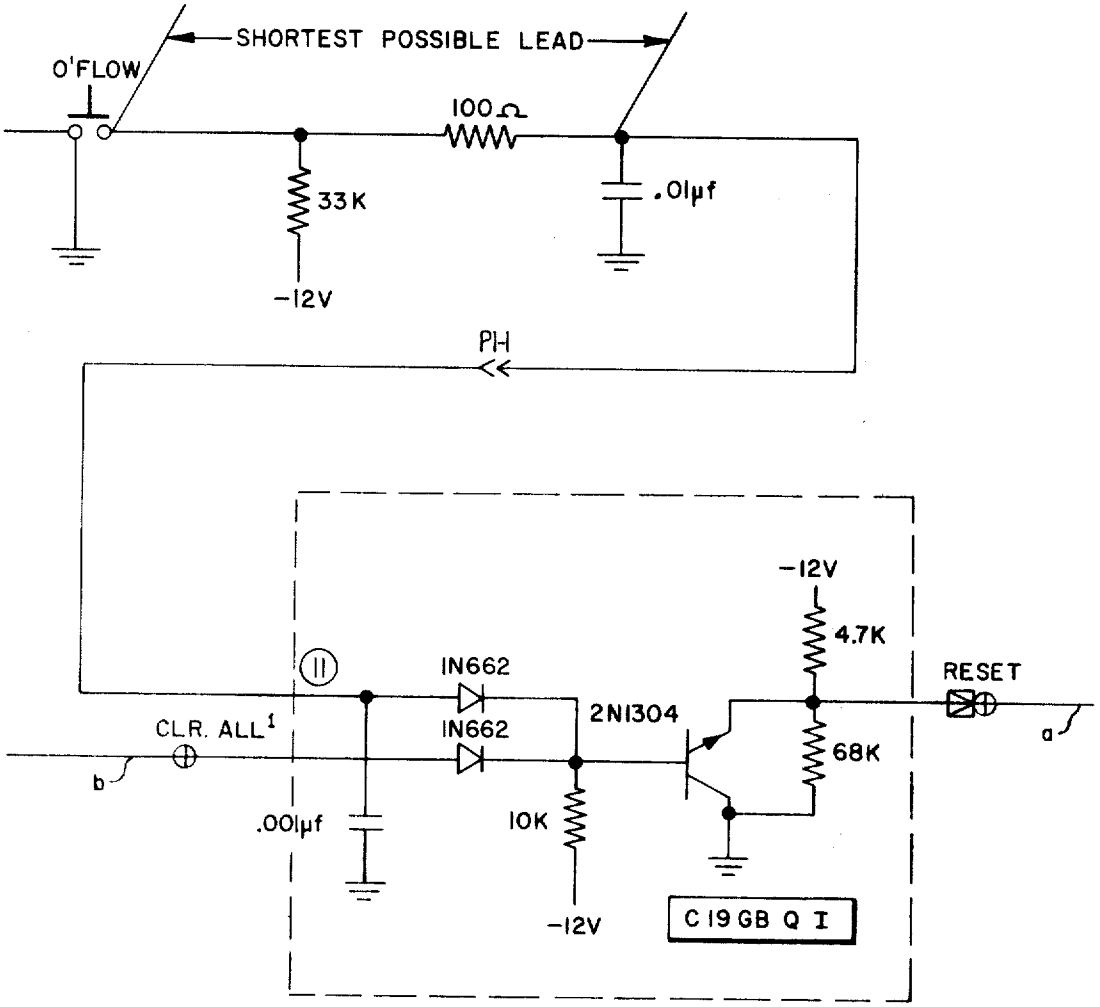
FIGS. 186 and 187 illustrate the circuit and block symbol, respectively, of the reset signal generator.

11.4.3. Reset Signal Generator: The circuit hereinafter called the "Reset Signal Generator" is shown in FIG. 186, and a block symbol which represents the Reset Signal Generator circuit of FIG. 186 is shown in FIG. 187.

The dashed rectangle in FIG. 186 indicates that portion of this circuit which is found upon the printed circuit card hereinafter designated "C19GBQI." That portion of FIG. 186 which is found outside of the dashed rectangle is included within the mockup (see FIG. 317). As indicated in FIG. 186, the portion of this circuit found in the mockup must have its components as closely spaced adjacent each other as is possible, and interconnected by the shortest possible leads, to assure a sufficiently "clean" signal to the circuit located upon the printed circuit card. As shown by the symbol found in the central portion of FIG. 186, the portion of this circuit found in the mockup is connected with the portion of this circuit upon the printed circuit card via the No. 1 contacts of Plug 1 (i.e., Pl–1).

The *b* input of the Reset Signal Generator will have a PL-signal applied thereto when the CLR. ALL flip-flop is set. The depression of the O'FLOW key will also produce an input signal to the diode gate of the Reset Signal Generator. The PP-signal produced upon the *a* terminal of the Reset Signal Generator is employed to reset a plurality of flip-flops herein.

Figure 187:
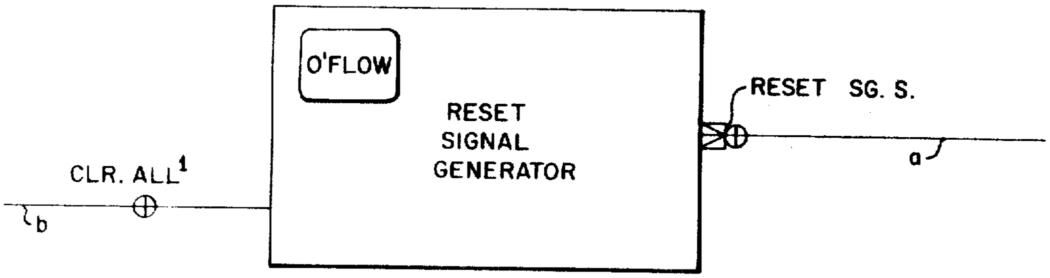

Going to the *a* output terminal of FIG. 187, this output is labelled "RESET SG. S." and a PP-signal symbol is also located at this terminal. Thus, this terminal is regarded as the source (S.) of RESET signals for the entire device as shown and described herein. Also, as may be seen from the PP-signal symbol, the event which constitutes a RESET signal is the appearance of a full positive-going pulse at this point.

Figure 188:
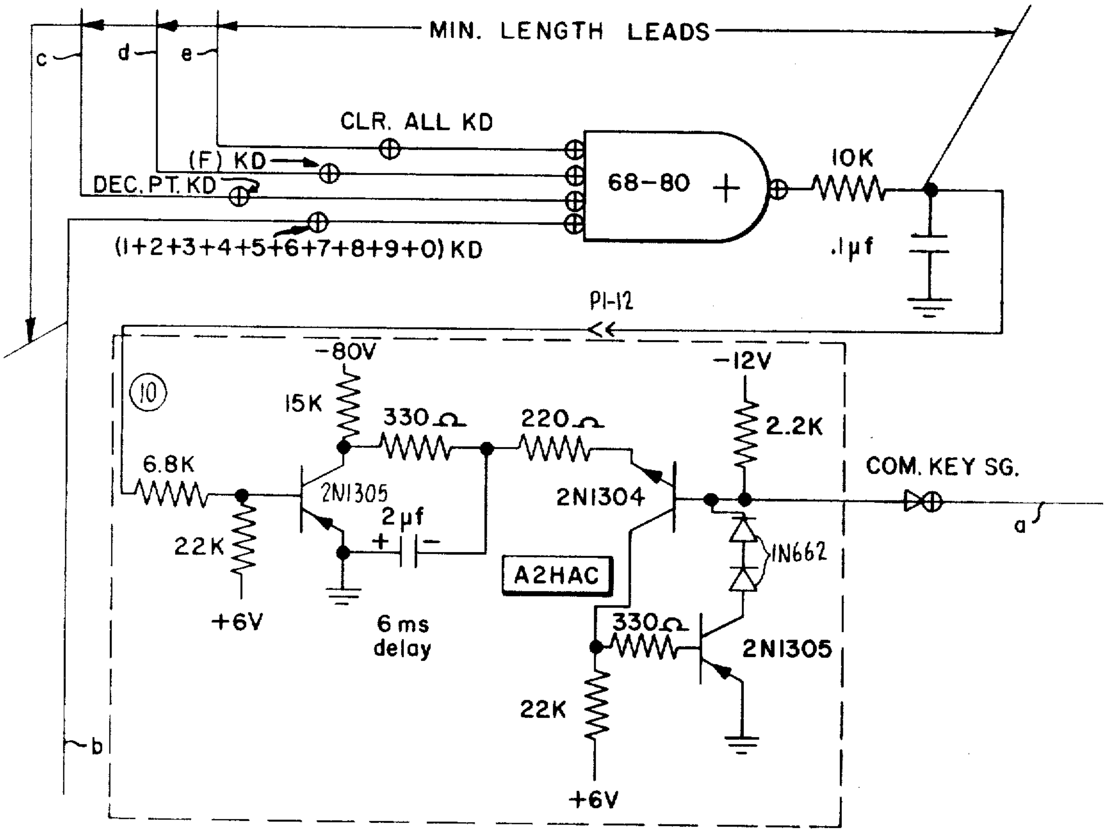
FIGS. 188 and 189 illustrate the circuit and the block symbol of the common key signal generator employed herein.
Figure 189:
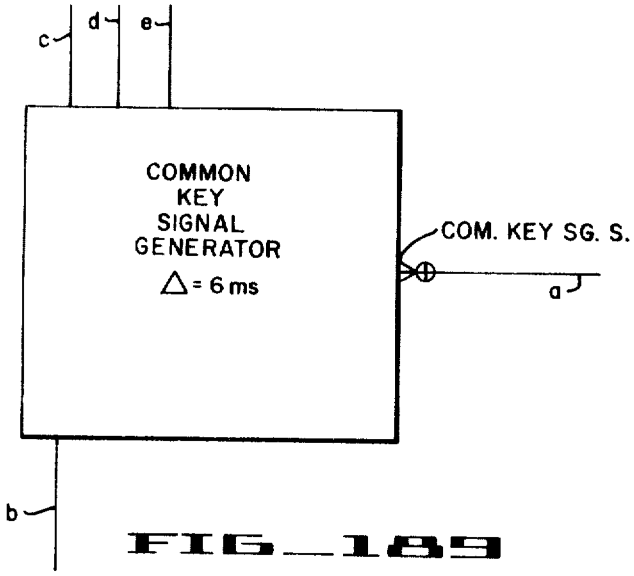

11.4.4. Common Key Signal Generator: FIG. 188 shows the circuit for a "Common Key Signal Generator." FIG. 189 shows the block symbol for the Common Key Signal Generator circuit of FIG. 188. The circuitry of FIG. 188 which is enclosed within the dashed line is located upon printed circuit card "A2HAC," while the circuitry shown outside the dashed rectangle is found within the mockup. As with the circuit shown in FIG. 186, that portion of the circuit of FIG. 188 located within the mockup must have its components located as closely adjacent each other as possible, and interconnected by as short leads as possible, in order to provide a "clean" signal via contacts No. 12 of Plug 1 (PL–12) to the No. 10 terminal (hereinafter called "pin," of printed circuit card A2HAC).

The function of the circuit found on this card, as shown in FIG. 188 is to provide an actuating signal to each of the key signal storage flip-flops, which actuating signal is delayed by approximately six milliseconds after the depression of the key, thereby assuring that the key signal provided to one of the key storage flip-flops will have "settled down" before the flip-flop is set, and, thus, that the key storage flip-flop set in response to the depression of one of the keys will not produce spurious signals which would be "misinterpreted" by subsequent portions of the device shown herein.

As shown upon output line *a*, the Common Key Signal Generator is the source of that signal known hereinafter as the "COM. KEY SG.".

As indicated at the *a* output line of the block symbol of FIG. 189, the COM. Key SG. is the occurrence of a positive-going transition thereat.

Figure 190:
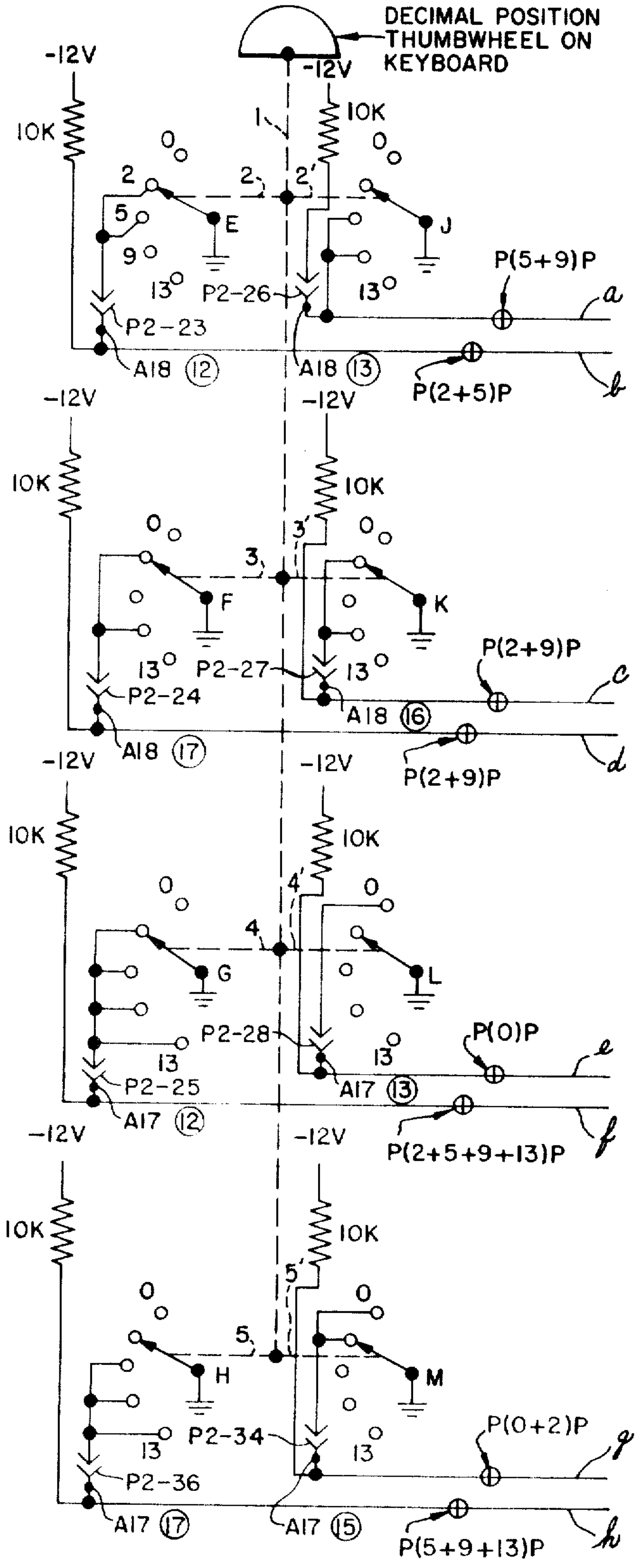
FIGS. 190 and 191 show the circuit and block symbol of the decimal position signal generator (I)
Figure 191:
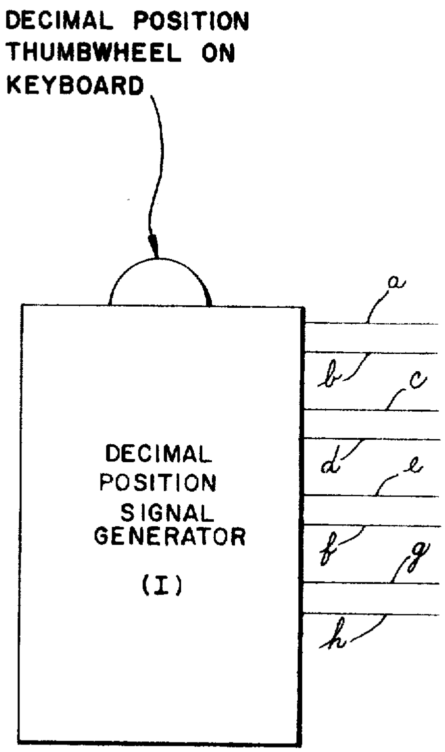

11.4.5. Decimal Position Signal Generator (I): FIG. 190 shows the circuit for the "Decimal Position Signal Generator (I)" circuit, and FIG. 191 shows the block symbol for that circuit.

The semicircle shown at the top of these figures represents the decimal position setting thumbwheel (TW) shown in the upper right-hand corner of the keyboard in FIG. 1. This thumbwheel, in an actual embodiment of the invention which is described herein, is connected to the shaft of a multi-deck rotary switch, this shaft being represented by the dashed lines and indicated by reference number 1 in FIG. 190. Several of the decks of that switch are indicated by the switch symbols E, F, G, H, J, K, L and M in FIG. 190. As may also be seen in FIG. 190, certain of the fixed contacts of these alphabetically-lettered decks are connected to contacts of Plug 2, Thus, the "2" and "5" contacts of deck E may be seen in FIG. 190 to be connected to contacts No. 23 of Plug 2, and, thus, to pin No. 12 of card A18, upon which the 10K resistor shown in the upper, left-hand portion of FIG. 190 is located. Similarly, the lower, left-hand 10K resistor shown in FIG. 190 is located upon card A17, and is directly connected to pin No. 17 thereof, the "5," "9," and "13" contacts of deck H being connected to pin No. 17 of card A17 by means of contacts No. 36 of Plug 2. As will be apparent from consideration of FIG. 190, each setting of the decimal position thumbwheel upon the keyboard will produce a different combination of L-signals upon the output leads of Decimal Position Signal Generator (I). This combination of L-signals may be deduced for any position of the decimal position setting thumbwheel by means of the assertion legends found upon the output leads of Decimal Position Signal Generator (I) as shown in FIG. 190, the particular form of assertion legend employed thereon being explained by the note in the lower right-hand corner of the sheet containing FIGS. 190 and 191.

As also noted in the lower, right-hand corner of this sheet, the terminals of Decimal Position Signal Generator (I) as found in other portions of the drawings, may be designated by an expression comprising the usual block symbol lead lower case letter code, and the term "DPI."

Figure 192:
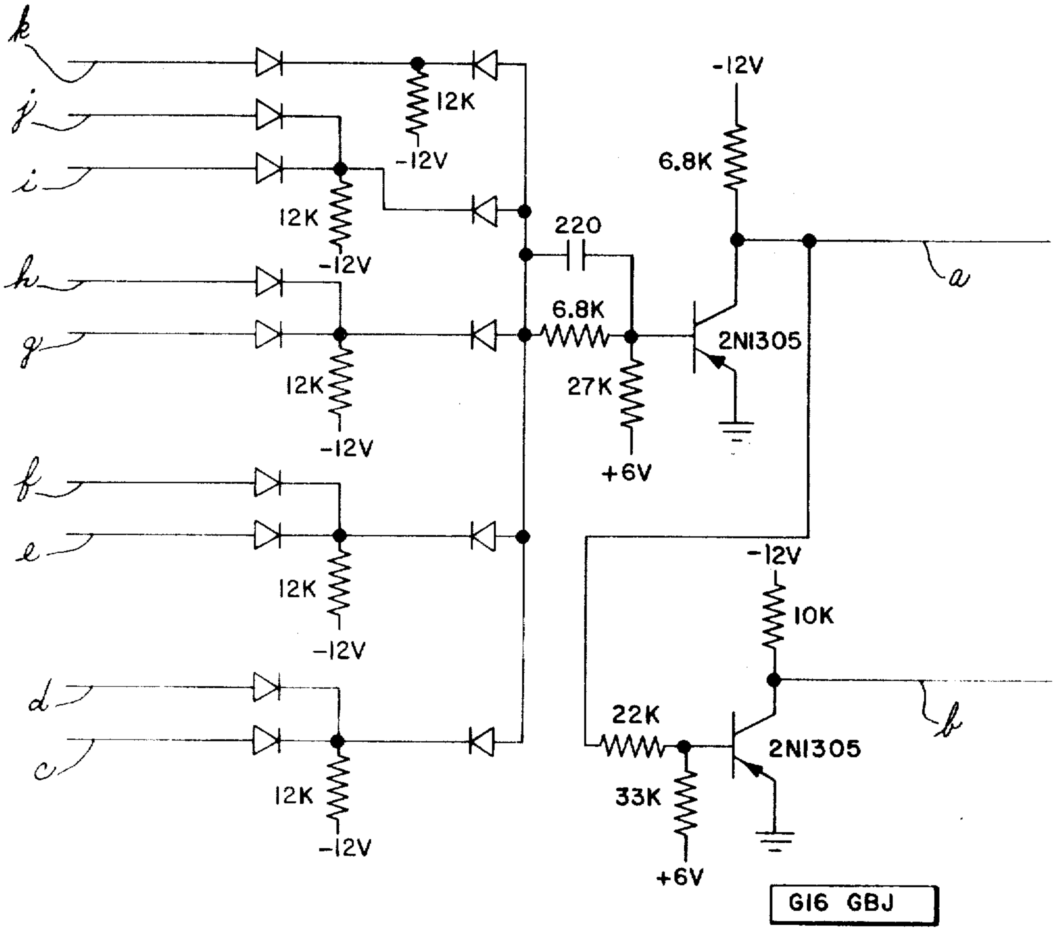
FIGS. 192 and 193 illustrate the circuit and block symbol, respectively, of the compare signal generator.

11.4.6. Compare Signal Generator: FIG. 192 shows the circuit for the "Compare Signal Generator," and FIG. 193 shows the block symbol for the Compare Signal Generator.

The Compare Signal Generator may be thought of as comprising an inverted AND gate, having as its inputs four OR gates and a single, ungated, input, *k*. In addition, the Compare Signal Generator circuit also comprises an inverter, which inverts the output of the AND gate. As denoted in FIG. 193, the output of this inverter is considered to be the COMPARE SG. S. The output of this inverter is the *b* terminal of the Compare Signal Generator, and as shown by the conjoint signal symbol upon that terminal, the portion of the wavetrain, or signal train, appearing upon that terminal which is defined as the "COMPARE SG." is the PL-portion thereof.

As noted upon the *a* terminal of the Compare Signal Generator, the occurrenceof the COMPARE signal may also be determined from the signal train occurring upon that terminal. Upon that terminal, however, as denoted by the NL-signal symbol associated with the legend "COMPARE SG.," the NL-portion of the wavetrain will denote the occurrence of the "COMPARE" signal.

Figure 193:
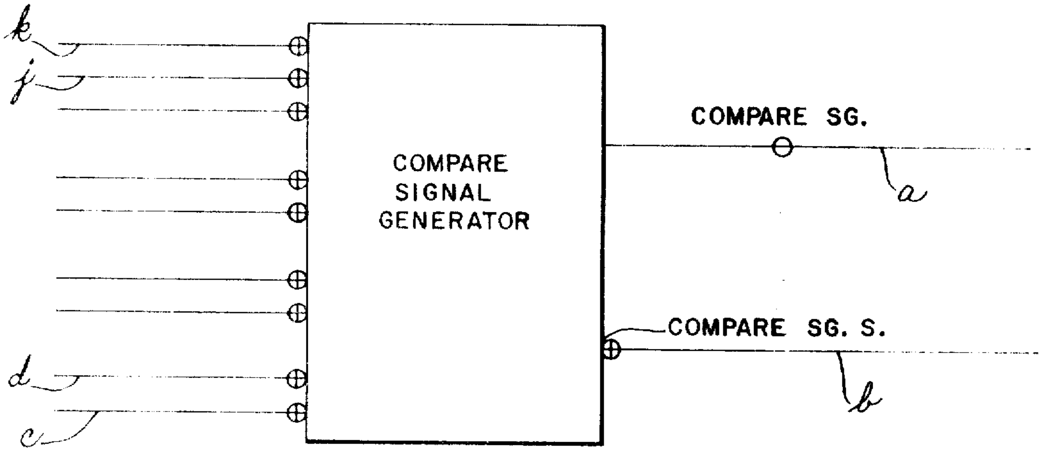

The reason for the PL conjoint signal symbols at the left edge of the Compare Signal Generator block symbol of FIG. 193 will be evident upon consideration of the logic diagram shown in FIG. 333.

As indicated in FIG. 192, the Compare Signal Generator circuit is located upon printed circuit card G16GBJ.

Figure 194:
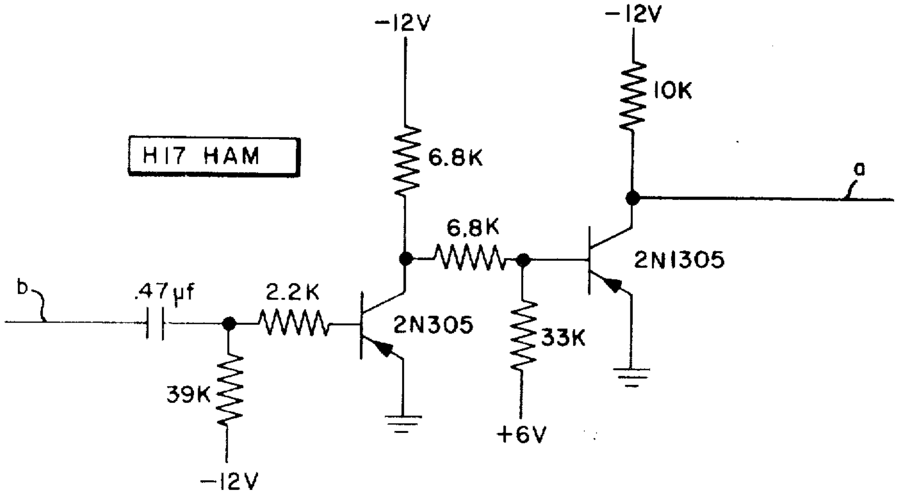
FIGS. 194 and 195 illustrate the circuit and block symbol of the row I intensifier.
Figure 195:
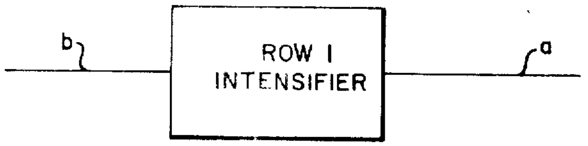

11.4.7. Row 1 Intensifier: FIG. 194 shows a circuit hereinafter designated the "Row 1 Intensifier," and FIG. 195 shows the block symbol for the circuit of FIG. 194. The Row 1 Intensifier circuit of FIG. 194 may be broadly considered to comprise two parts, viz., a "one-shot" and an inverter. The one-shot operation is provided by the left-hand transistor and its associated circuitry, while the inverting operation is provided by the right-hand transistor and its associated circuitry. Generally speaking, the function of this circuit may be thought of as the production of a PP-signal at terminal *a* in response to a PT-signal at the *b* terminal. The duration of the PP-signal at terminal *a* is determined by the parameters of the one-shot portion of the intensifier circuit, the input at terminal *b* remaining at the P-level after the PT-signal for a longer period than the duration of the PP output signal when the Row 1 Intensifier circuit is used as hereinafter described. As indicated in FIG. 194, the Row 1 Intensifier circuit is located on printed circuit card H17 HAM.

Figure 196:
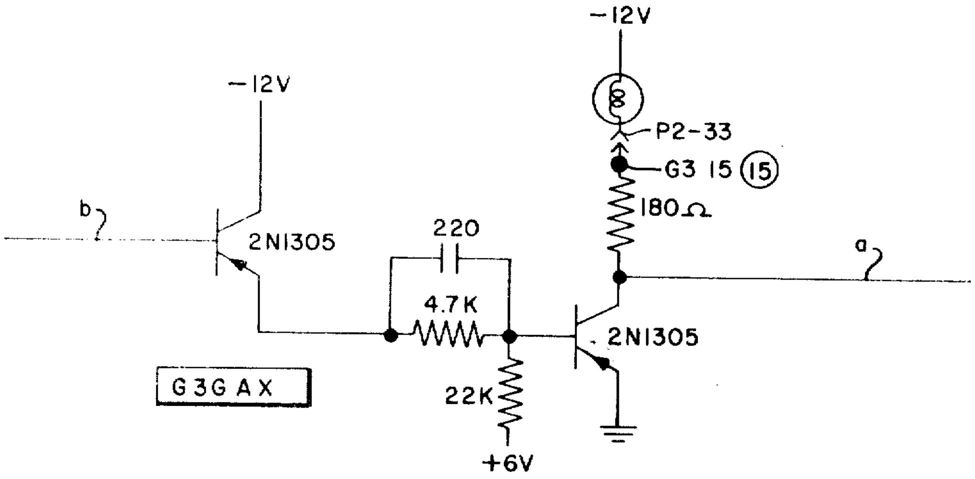
FIGS. 196 and 197 illustrate the circuit and block symbol of the overflow signal generator.
Figure 197:
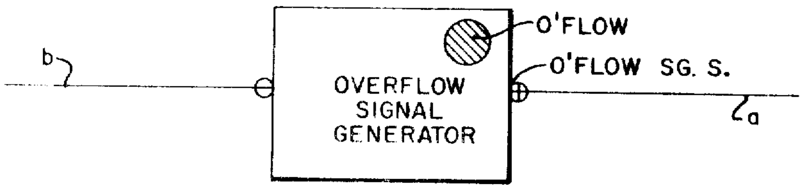

11.4.8. Overflow Signal Generator: FIG. 196 shows a circuit designated the "Overflow Signal Generator" circuit, and FIG. 197 shows the block symbol for the Overflow Signal Generator circuit of FIG. 196. As indicated in FIG. 196, all of the Overflow Signal Generator circuit but the incandescent indicator lamp is located upon the G3GAX card. The incandescent indicator lamp, however, is located within the overflow reset key, which is the upper, left-hand key of the keyboard shown in FIG. 1. The upper flat portion of this key is comprised of translucent red material, for example whereby the illumination of this incandescent lamp warns the operator of overflow condition, and also indicates the key which must be depressed in order to reset the machine when an overflow has occurred. As indicated immediately below the incandescent lamp shown in FIG. 196, this lamp is interconnected with the remaining portion of the circuit upon the printed circuit card via the contacts No. 33 of Plug 2.

As indicated by the conjoint signal symbol on the *b* terminal (FIG. 197), the receipt of an NL-signal at this terminal illuminates the incandescent lamp, and produces a PL-signal upon output terminal *a*. The legend "O'FLOW SG. S." associated with the *a* output terminal indicates that the *a* output terminal is the source of the "O'FLOW" signal. The PL-signals which occur upon terminal *a* of the Overflow Signal Generator are called "O'FLOW" signals.

Figures 198, 199:
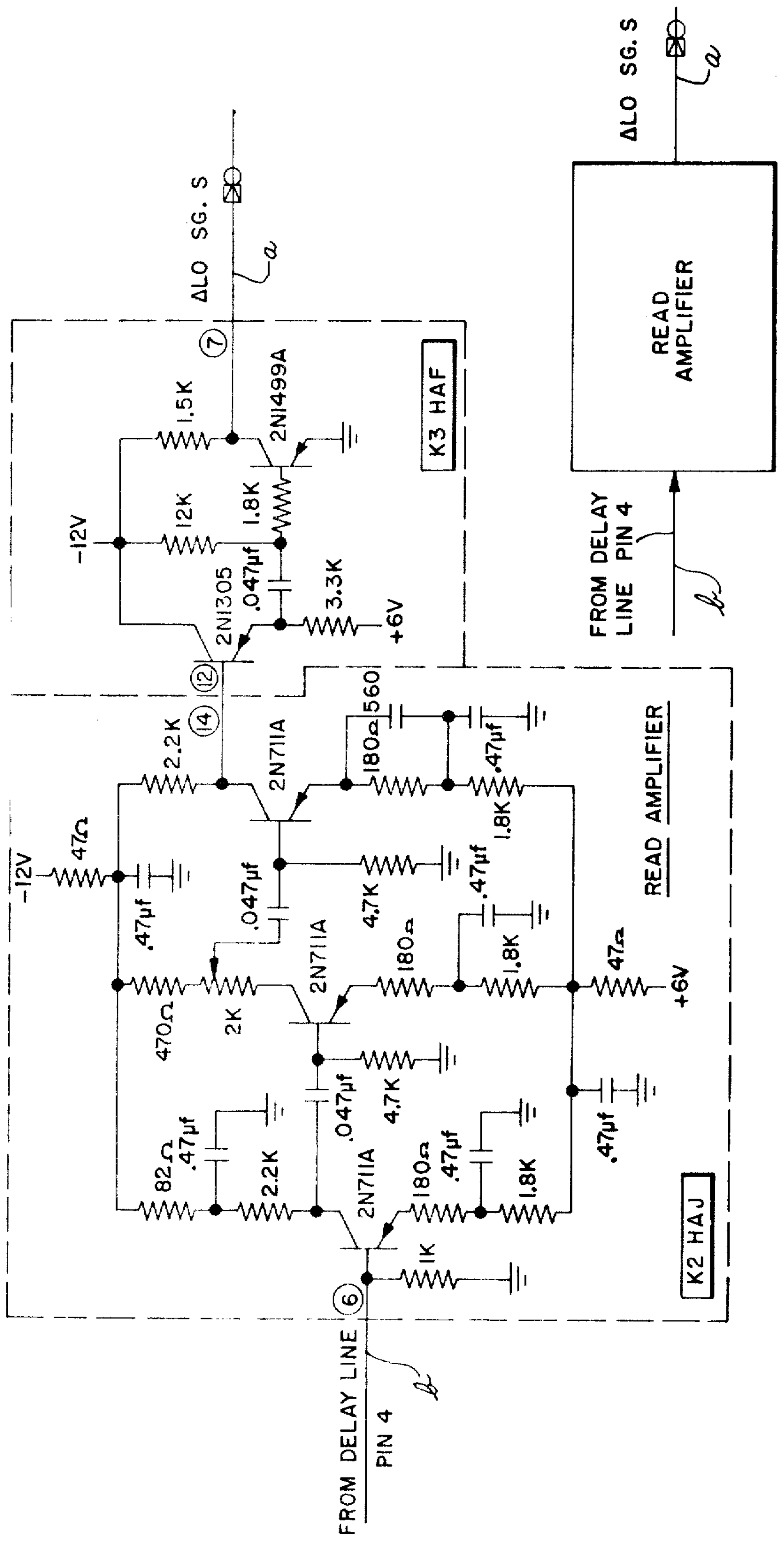
FIGS. 198 and 199 illustrate the amplifier and shaper circuits as well as the block symbol for the read amplifier.

11.4.9. Read Amplifier: FIG. 198 shows a circuit for the "Read Amplifier" circuit, while FIG. 199 shows the block symbol for the Read Amplifier circuit of FIG. 198.

As shown in FIG. 198, a first portion of the Read Amplifier circuit is located upon the K2HAJ card, the output of this portion being found at pin No. 14 of that card. The second portion of the Read Amplifier circuit is located upon card K3HAF, receiving its input from the first portion upon card K2HAJ via its pin 12, which is directly connected to pin 14 of card K2HAJ.

As indicated in FIG. 198, the input to the Read Amplifier, applied to terminal *b*, i.e., pin 6 of card K2HAJ, is derived from pin 4 of the acoustic delay line which is employed as the memory, or storage, structure herein. As may be seen in FIG. 317, the structure of the printed circuit card mounting racks in the embodiment of the instant invention described and shown herein, and the mounting and relative placement of the delay line, are so arranged that this connection from pin 4 of the delay line to the input of the Read Amplifier (pin 6, card K2HAJ) is as short as possible. Referring to Table CC (Appendix K), and, more particularly, to the section of that table headed "CARD NO. K2," it may be seen that pin 6 of that card, i.e., the *b* terminal of the Read Amplifier circuit shown in FIG. 198, is connected to pin 4 of the delay line by means of shielded wiring. It should be noted at this point that card K2HAJ of FIG. 198 is referred to in Table CC as card K2. This practice, i.e., the practice of showing the three-letter type-code designation of the cards only in the drawings, is followed throughout the instant specification.

As indicated by the legend "ΔLO SG. S." associated therewith, the *a* terminal of the Read Amplifier is defined as the "ΔLO" signal source herein. The conjoint signal symbol appearing upon this terminal indicates the segment of the wavetrain appearing thereupon, the occurrence of which constitutes the "ΔLO" signal is the NP-segment.

Figure 200:
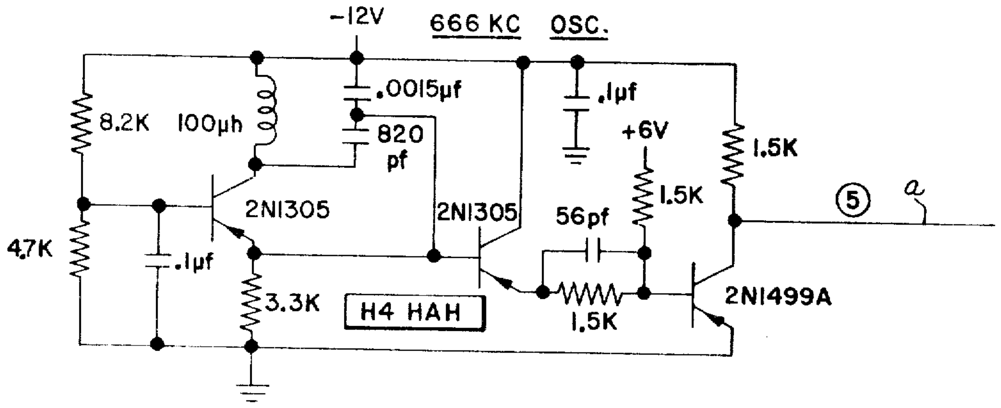
FIGS. 200 and 201 illustrate the circuit and block symbol of the oscillator.
Figure 201:
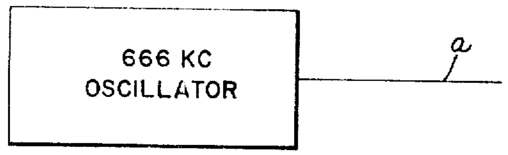

11.4.10. 666 KC Oscillator: FIG. 200 shows an oscillator circuit particularly suitable for driving the flip-flop chain employed herein to provide the timing signals for synchronizing the operation of the various parts of the device of the invention, which circuit will hereinafter be designated the "666 KC Oscillator," or "Oscillator." FIG. 201 shows the block symbol for the Oscillator circuit of FIG. 200. It is to be particularly noted that the stated frequency of this Oscillator, viz., "666 KC," is not critical, or closely-maintained, as may be seen from the circuit of FIG. 200, which includes no crystal, or other close-tolerance frequency maintaining means. In fact, experience indicates that the circuit embodiment of the instant invention may reasonably be expected to tolerate deviations of the frequency of this Oscillator amounting to 5–6 percent. As indicated in FIG. 200, the Oscillator is located upon printed circuit card H4HAH.

Figure 202:
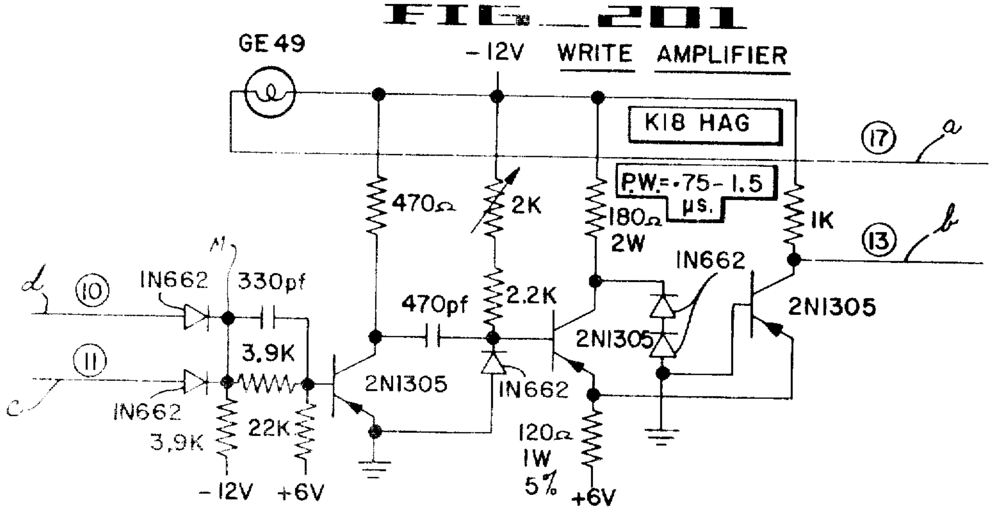
FIGS. 202 and 203 show the write amplifier circuit and block symbol therefor.
Figure 203:

11.4.11. Write Amplifier: FIG. 202 shows a current pulse generator circuit designated the "Write Amplifier." FIG. 203 shows a block symbol for the circuit of FIG. 202. With the exception of the subcircuit connected to the base terminal of the left-hand transistor, the circuit of FIG. 202 is shown and described in copending U.S. patent application Ser. No. 277,867, filed May 3, 1963, now Pat. No. 3,265,908, issued Aug. 9, 1966.

Figures 205, 206:
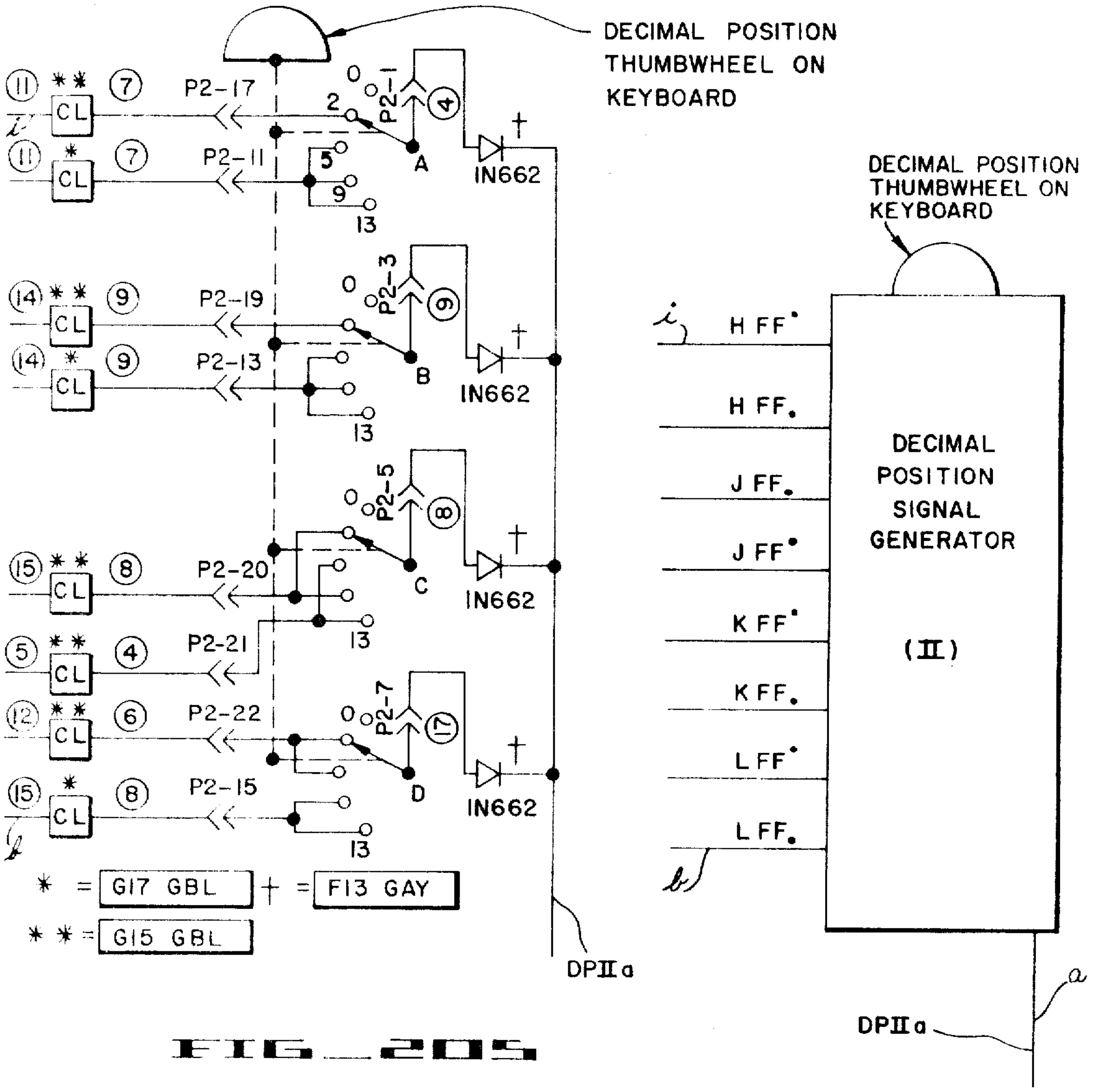
FIGS. 205 and 206 illustrate the circuits and block symbol of the decimal position signal generator (II)
Figure 202:
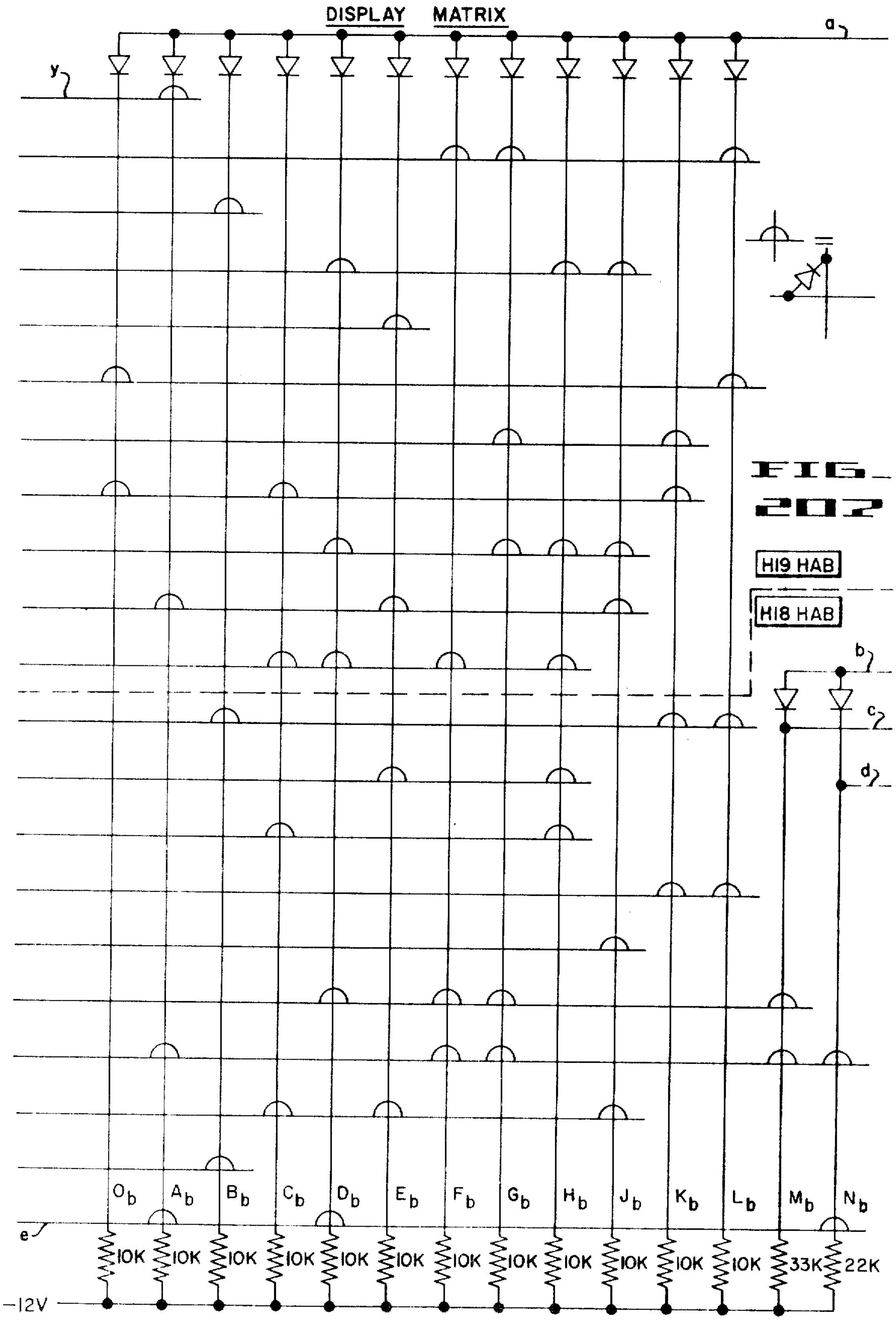

11.4.12. Decimal Position Signal Generator (II): FIG. 205 shows a circuit called "Decimal Position Signal Generator (II)." FIG. 206 shows the block symbol for the circuit of FIG. 205.

Figure 204:
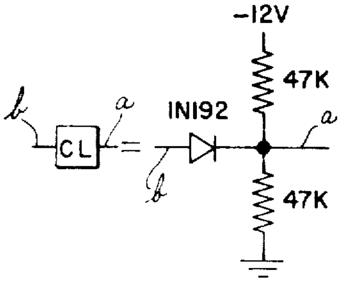
FIG. 204 illustrates the circuit and block symbol of a noise clamp employed in the circuit of FIG. 205.

FIG. 204 shows a subcircuit found at several places in the circuit of FIG. 205, and a block symbol which is substituted for said subcircuit in the wiring diagram of FIG. 205 to promote ease of study and understanding thereof.

As in FIGS. 190 and 191 above, the semicircle at the top of FIGS. 205 and 206 represents the thumbwheel TW found in the upper, right-hand corner of the keyboard shown in FIG. 1. As may be seen from FIG. 1, the device of the embodiment of the invention described herein has only one decimal point setting thumbwheel, the semicircles in FIGS. 190, 191, 205, and 206 all representing the same thumbwheel, i.e., TW of FIG. 1. Thus, it may be seen that the dashed lines shown in FIGS. 190 and 205 both represent the common mechanical shaft of the same rotary "deck" switch, the A, B, C, and D "decks" of this switch being shown in FIG. 205 for convenience, while "decks" E, F, G, H, J, K, L, and M are separately shown in FIG. 190 for reasons of convenience. The expression "decks" is used herein to mean a single cooperating group comprising a plurality of fixed contacts and a single moving contact, the manner of maintaining said groups properly positioned with respect to said mechanical shaft and in mutually insulated relation being a matter of choice, and not a critical feature of the instant invention, except in that the leads from this switch to the other portions of the device located upon the printed circuit cards should be maintained as short as possible. These interconnections between the "deck" switch and the associated pins of the printed circuit cards are made via the contacts of Plug 2 indicated to the left of the dashed mechanical-shaft-indicating line of FIG. 205.

The "CL" noise-bucking circuits of FIG. 205 are located upon two printed circuit cards, viz., G17GBL and G15GBL, the card upon which a particular "CL" circuit is located being indicated in FIG. 205. The pins of these cards to which each "CL" noise-bucking circuit is connected are indicated by encircled numerals upon the leads thereof. Thus, the fourth "CL" circuit from the top in FIG. 205 has one terminal connected to pin 9 of card G17GBL and its other terminal connected to pin 14 of card G17GBL. As may further be seen from FIG. 205, pin 9 of card G17GBL is connected to contact 13 or Plug 2.

As indicated by the "dagger" note in FIG. 205, the diodes having their cathodes connected together and to terminal lead DPIIa are located upon card F13GAY, and have their anodes connected to contacts of Plug 2, and then to the hubs of "decks" A, B, C, and D.

11.4.13. Display Matrix: FIG. 207 shows a circuit called the "Display Matrix." FIG. 208 shows a block symbol for the circuit of FIG. 207.

This Display Matrix circuit is disposed upon two separate printed circuit cards, viz., H19HAB and H18HAB, as indicated by the dashed line crossing FIG. 207. The portion of the electrical interconnection lines crossing over, and immediately adjacent to, said dashed line are wire interconnections between appropriate terminals of said two printed circuit boards.

The small, semicircular symbols shown in FIG. 207 each represent a diode interconnected between the two lines upon which the semicircular is superposed in the manner indicated in the small "detail" in the upper, right-hand corner of FIG. 207.

Figure 208:
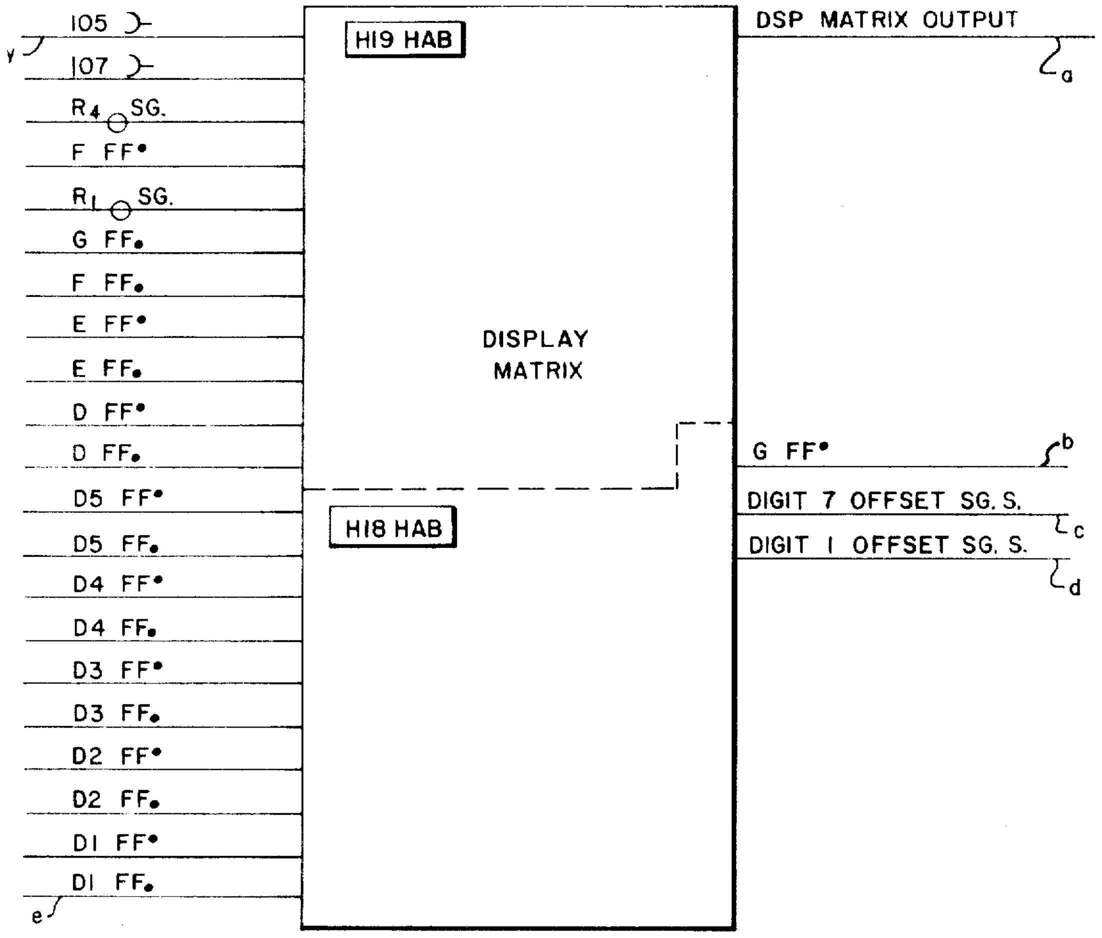
FIG. 208 shows the block symbol for the display matrix shown in FIG. 207.

As shown in FIG. 208, the block symbol representing the Display Matrix circuit of FIG. 207 is approximately bisected by a dashed line, and has a printed circuit card number located at its top edge, and another adjacent the lower side of the dashed line. Thus, attention is directed to the separation of this matrix between two cards wherever the block symbol is found.

Figure 209:
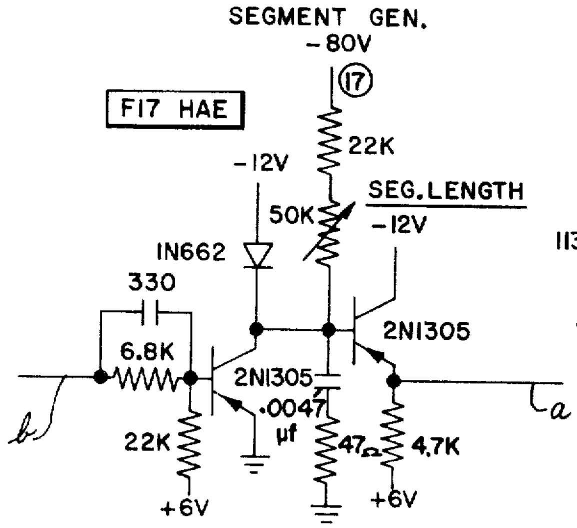
FIGS. 209 and 210 illustrate the circuit and block symbol for the segment generator.
Figure 210:
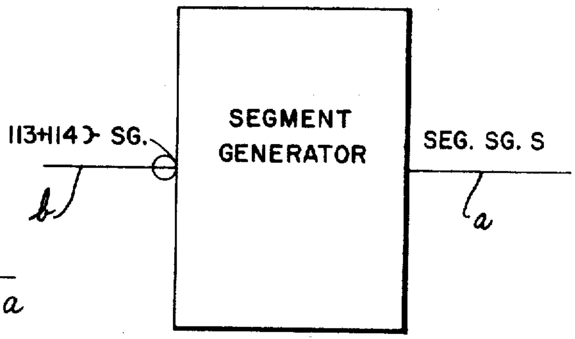

11.4.14. Segment Generator: FIG. 209 shows a circuit called the "Segment Generator." FIG. 210 shows the block symbol for the Segment Generator circuit of FIG. 209.

This circuit might be more specifically described as the deflection signal generator for producing short traces, which form the strokes of the numerical characters displayed upon display screen DS. The stroke trace sweep signal is produced at terminal *a* in response to the charging, and discharging, of the .0047 microfarad capacitor. The generation of each "sawtooth" pulse at terminal *a* is commenced by a signal at terminal *b*, which discharges this .0047 microfarad capacitor. Thereafter, the sloped portion of the next subsequent "sawtooth" is produced by the charging of this capacitor, after the cessation of a signal at terminal *b* has effectively "opened" the discharge path through the left-hand transistor. The commencement of the next "sawtooth" is, of course, brought about by the discharging of this capacitor through the left-hand transistor, brought about by a signal on terminal *b*.

Regulation of the extreme output signal level, if not otherwise regulated by recurrence of a signal on terminal *b*, will be limited by the "clamping" 1N662 diode.

Figure 211:
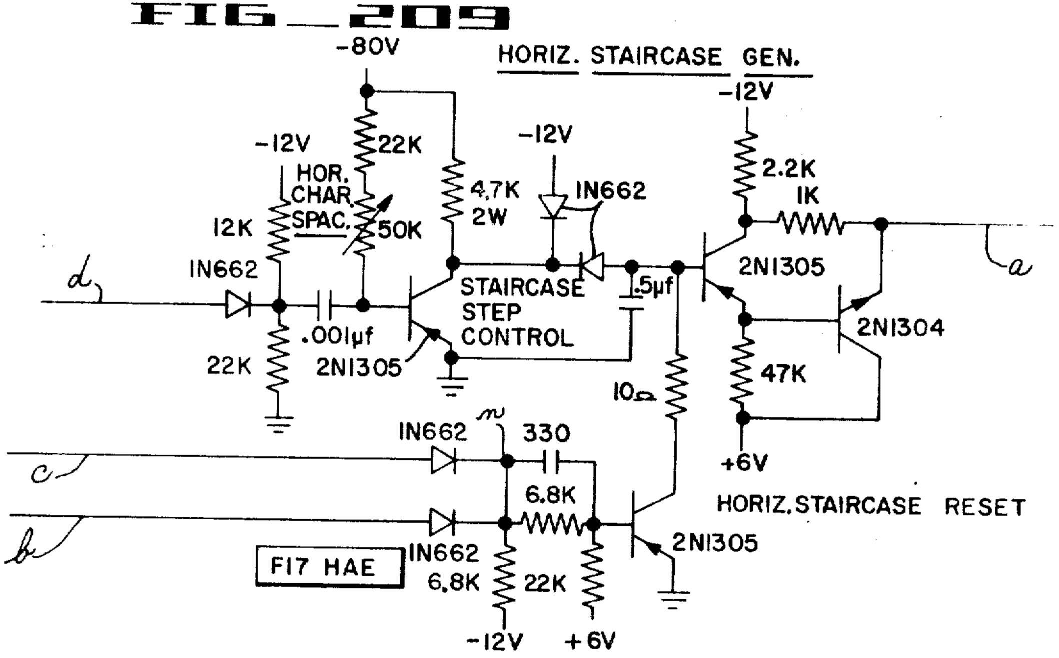
FIGS. 211 and 212 illustrate the circuit and block symbol of the horizontal staircase generator.

11.4.15. Horizontal Staircase Generator: FIG. 211 shows a circuit which is particularly suitable for the generation of the major horizontal deflection signal called the "Horizontal Staircase Generator." FIG. 212 shows a block symbol for the circuit of FIG. 211.

Figure 212:
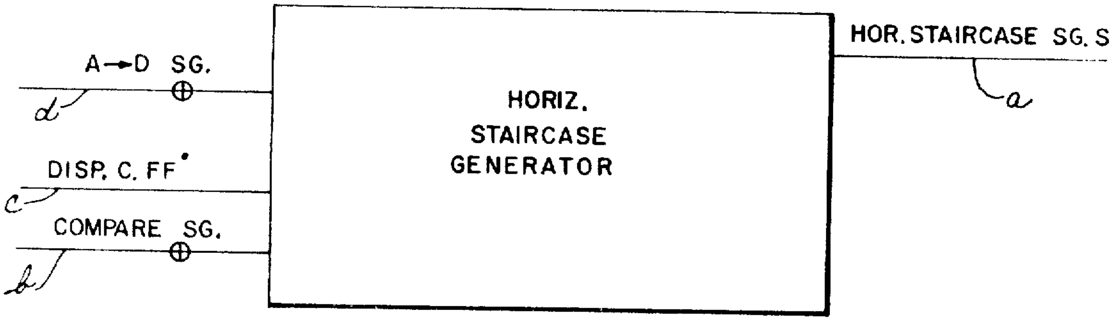
Figure 313:
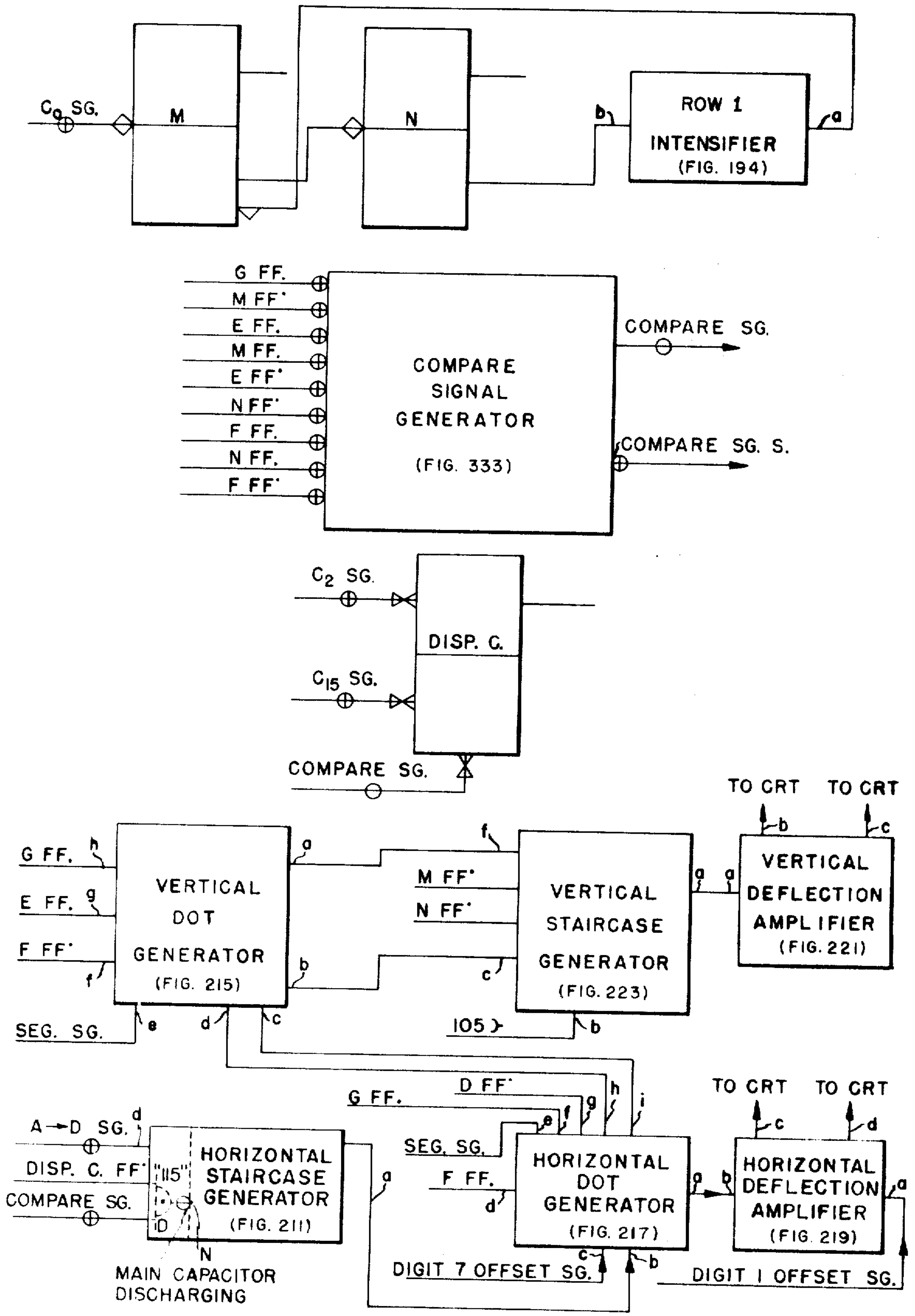

In this connection, it is noted that the block symbol in the lower, left-hand corner of FIG. 313 denotes the circuit of FIG. 211, even though "phantom" matter not found in the block symbol of FIG. 212 is added thereto, to facilitate explanation of the device of the invention.

The Horizontal Staircase Generator of FIG. 211 operates to produce a "staircase" signal train at its output by incrementally charging the .5 microfarad capacitor to produce the "steps" at output terminal *a*, the generator being reset after generating each full "flight" of "stairs" by relatively rapidly discharging the .5 microfarad capacitor.

This discharging of the .5 microfarad capacitor is brought about by turning the lower, right-hand transistor of FIG. 211 "on." This transistor is "turned on" by means of the network shown connected to its base, the diode gate portion of this network being indicated in "phantom" in FIG. 313.

The incremental charging of the .5 microfarad "main" capacitor is carried out by the "one-shot" current switching circuit shown in the upper, left-hand portion of FIG. 211 (lead *d*). This novel "one-shot" current switching circuit is particularly suitable for use in the Horizontal Staircase Generator circuit.

Figures 213, 214:
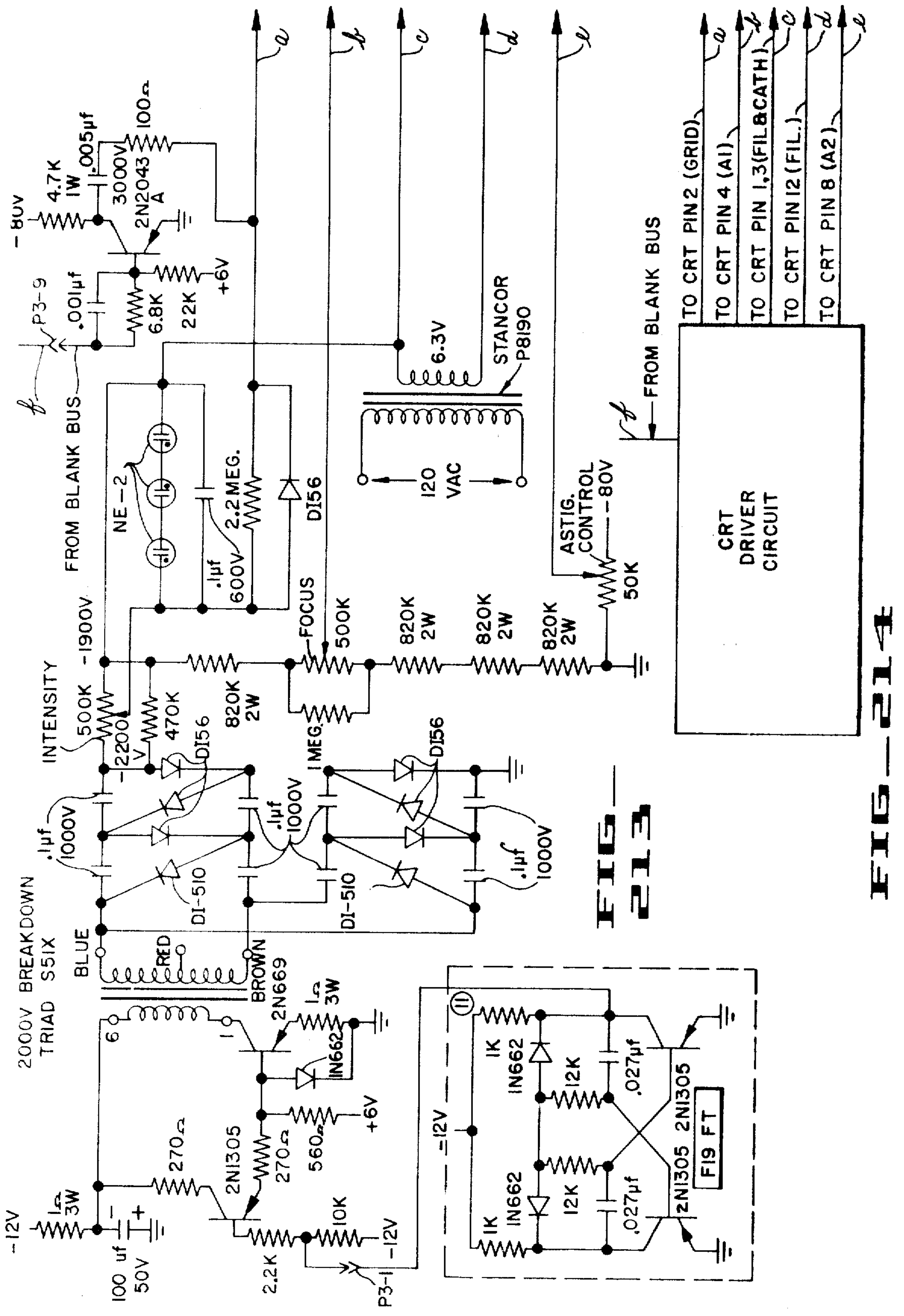
FIGS. 213 and 214 illustrate the circuit and block symbol, respectively, of the CRT driver circuit to provide suitable signals to drive beam control of the cathode-ray display.

11.4.16 CRT Driver Circuit: FIG. 213 shows a circuit particularly suitable for providing signals adapted to "drive" the cathode-ray display of the calculator. FIG. 214 shows a block symbol for the circuit of FIG. 213.

A portion of this circuit is located upon printed circuit card F19FT. The remainder of this circuit is located in the mockup portion of the device (see FIG. 317). The interconnection between the portion of this circuit within the mockup and the portion on card F19FT is made by way of contacts "1" of Plug 3, as shown in the left-hand portion of FIG. 213.

The blanking signal, which indicates when the cathode-ray is to be modified as to suppress, or "blank," the trace upon display screen DS, is supplied to the portion of the circuit found within the mockup by means of contacts "9" of Plug 3.

Figure 215:
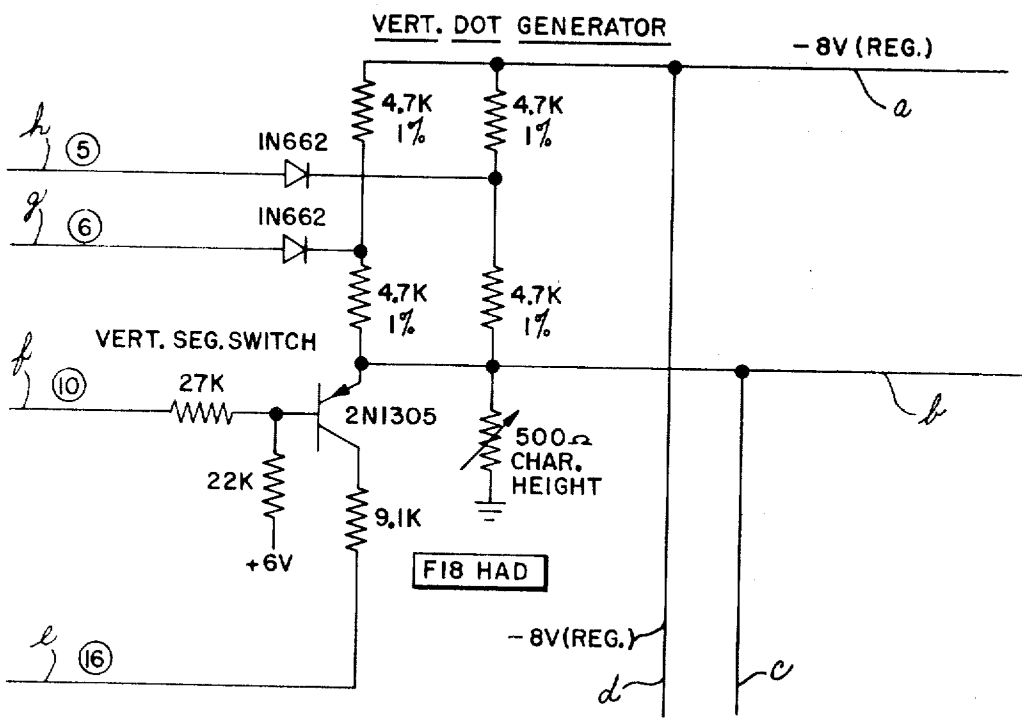
FIGS. 215 and 216 illustrate the circuit and block symbol for the vertical dot generator.
Figure 216:
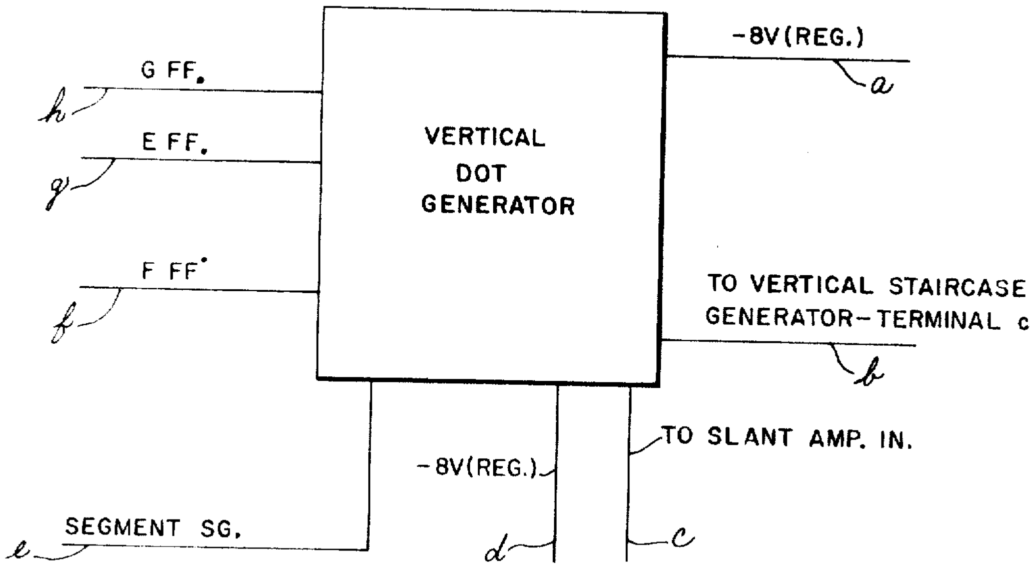

11.4.17. Vertical Dot Generator: FIG. 215 shows a circuit called the "Vertical Dot Generator". FIG. 216 shows the block symbol for the Vertical Dot Generator circuit of FIG. 215.

The word "dot" may be thought of as referring to the "home" position of the several stroke traces of an individual digit as displayed upon display screen DS. The Vertical Dot Generator may be seen to provide (at output terminal *b*) the incremental vertical deflection signal used to set the intra-digit vertical positioning of the trace-generating cathode ray beam, and, thus, to determine the height of the displayed digit, and the spacing between its horizontal strokes. These intra-digit vertical deflection signals are generated by current summing in the 500 ohm character height potentiometer shown in FIG. 215. The currents to be summed therein in order to set the three vertical "dot levels" are derived from signals applied to the two 1%-precision-resistor voltage dividers via input terminals *g* and *h*.

Finally, the Vertical Dot Generator circuit of FIG. 215 also serves to "steer" the stroke sweep signal from the Segment Generator of FIG. 209 to the vertical deflection system whenever a vertical stroke is to be traced, and also "sums" this sweep signal with the vertical "dot level" signals by current summing in the 500 ohm character height potentiometer. This "steering" function is carried out by employing the transistor shown in FIG. 215, as a gate the F FF signal on input terminal *f* permitting summing of the current due to the stroke sweep signal on input terminal *e* with the "dot" current in the character height potentiometer only when a vertical stroke is to be produced as part of a digit upon display screen DS. As shown in FIG. 215, this Vertical Dot Generator circuit is found upon printed circuit card F18HAD.

Figure 217:
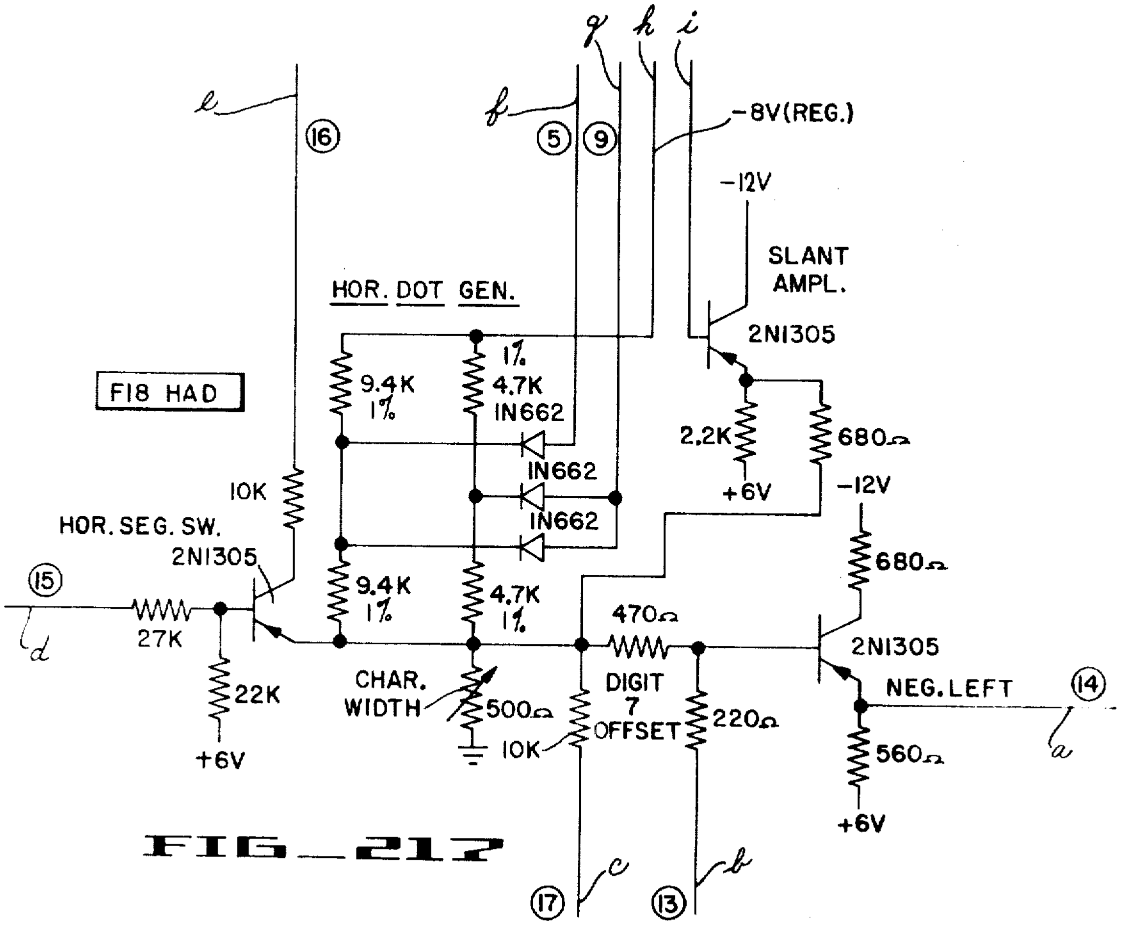
FIGS. 217 and 218 illustrate the circuit and block symbol for the horizontal dot generator.
Figure 218:
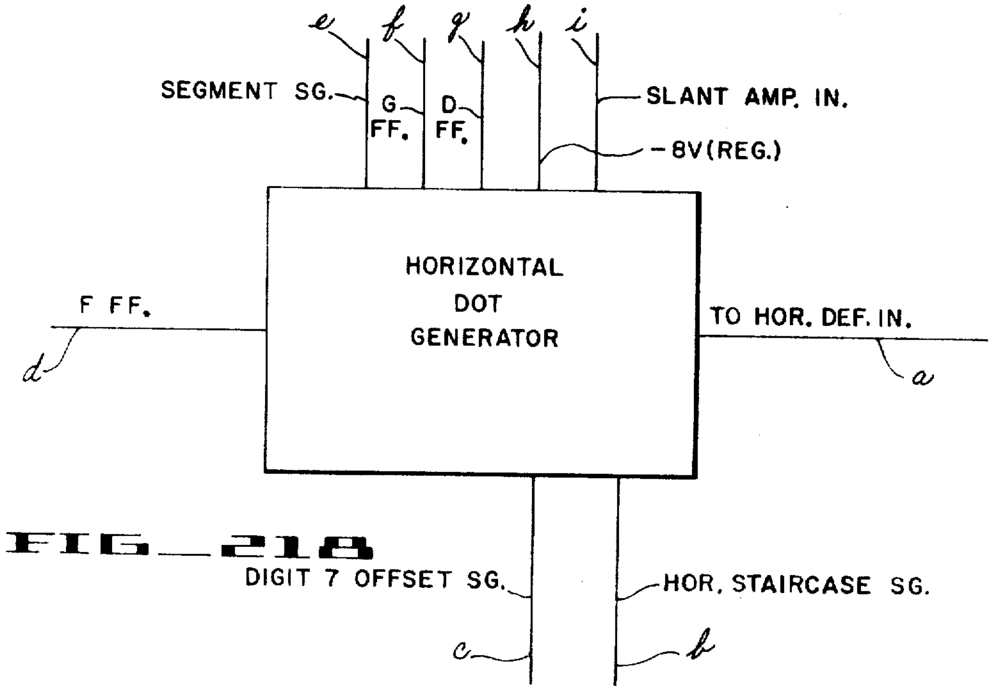

11.4.18. Horizontal Dot Generator: FIG. 217 shows a circuit called the "Horizontal Dot Generator". FIG. 218 shows the block symbol for the Horizontal Dot Generator circuit of FIG. 217. The horizontal "dot level" setting and horizontal segment sweep signal "steering" functions are performed similarly to the corresponding vertical functions in the Vertical Dot Generator Circuit.

The words "segment" and "stroke" are employed synonymously herein, the meaning of these terms being clear from consideration of the sheet containing FIGS. 339 to 342.

The word "trace" as used herein refers to the luminous, fugitive line produced upon the display screen of a cathode-ray tube by the impingement of the cathode-ray beam moving therealong.

Thus, the expression "stroke trace," or "segment trace," refers to the luminous lines upon display screen DS which delineate the displayed digits (see FIG. 339).

It may also be seen in FIG. 339 that each of the dots shown therein represents one of the "dots," or "home positions," generated by the circuits of FIGS. 215 and 217, acting together.

In addition to the "dot level" and "segment steering" components, the circuit of FIG. 217 also includes a slant amplifier, shown in its upper, right-hand portion. This slant amplifier functions to "inject" a signal provided from the Vertical Dot Generator (terminal *c* thereof), whereby to deflect the segments of each displayed character by a small horizontal amount, which small amount is directly proportional to the vertical displacement, thereby slanting the displayed characters slightly to the right as shown, for instance, in FIG. 339.

An additional input (terminal *c*) is provided to the summing point of the circuit of FIG. 217 whereby a signal from the Dipslay Matrix, "weighted" by the 10 kilohm resistor directly connected to this terminal *c*, is enabled to produce a leftward displacement of the digit 7, as displayed on the screen DS. See FIG. 341.

Also, the 1%-percision-resistor summing and weighting network of FIG. 217 is so arranged, and interconnected with the signals provided on terminals *f*, *g* and *h*, as to suitably offset the "dot" which serves to represent the decimal point on screen DS. See FIG. 339.

Figure 219:
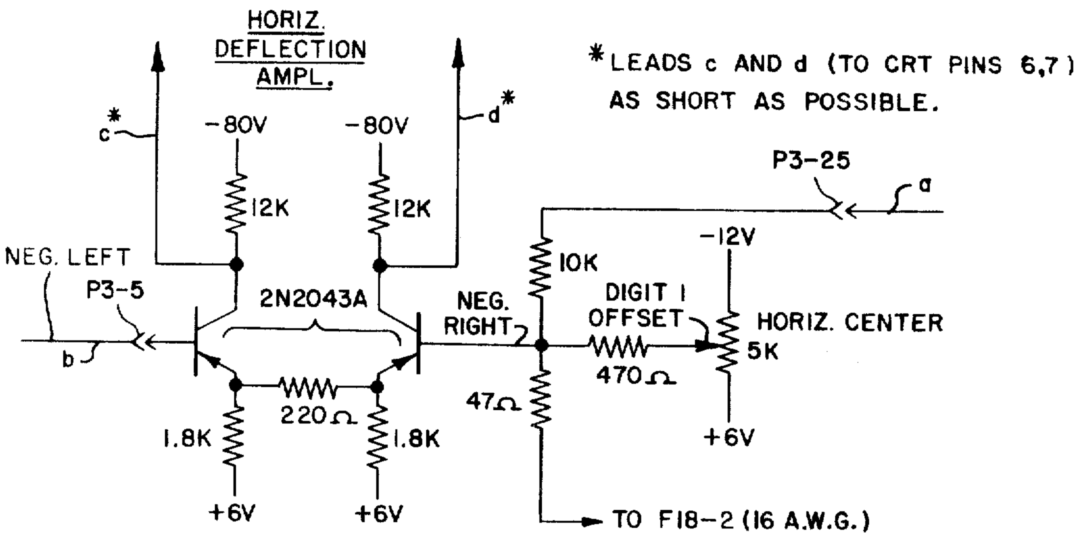
FIGS. 219 and 220 show the circuit and block symbol for the horizontal deflection amplifier.
Figure 220:
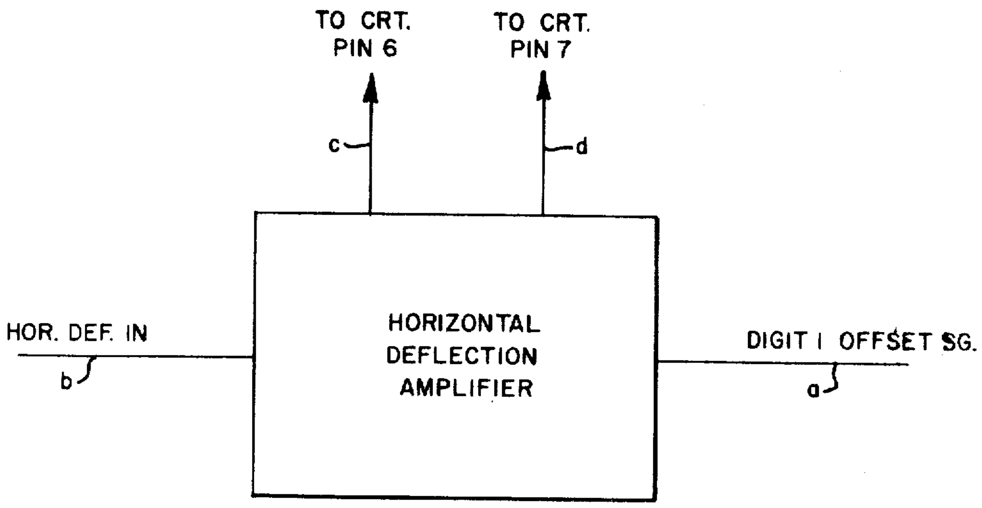

11.4.19. Horizontal Deflection Amplifier: FIG. 219 shows a circuit called the "Horizontal Deflection Amplifier." FIG. 220 shows the block symbol for the Horizontal Deflection Amplifier circuit of FIG. 219.

The output signals provided at terminals *c* and *d* of the circuit of FIG. 219 are directly connected to the deflection plates of the cathode-ray display tube which produce horizontal deflection of the display-tracing cathode-ray beam. The leads from the collectors of the two transistors in the circuit of FIG. 219 to the corresponding deflection plate terminals of the cathode-ray display tube must be kept as short as possible to avoid, inter alia, the coupling of "stray" signals radiated therefrom into other, relatively low voltage, portions of the device described herein. It is to this end, that the deflection amplifiers are located adjacent the cathode-ray display tube.

The lower end of the 47 ohm resistor having its upper end directly connected to the base of the right-hand transistor of FIG. 219 is grounded by means of a special connection running to pin 2 (ground bus) of printed circuit card F18, this connection being made to No. 16 A.W.G. wire, or heavier, in order to avoid display dirft which might be occasioned were a lighter ground wire used, due to the relatively heavy currents carried by this interconnection.

The absence of a printed circuit card number from the wiring diagram of FIG. 219 indicates that the Horizontal Deflection Amplifier circuit (along with the Vertical Deflection Amplifier circuit, and that portion of the CRT Driver Circuit not found on card F19) is located upon a printed circuit board not included along those, called "cards," or "printed circuit cards," which are disposed in the generaly V-shaped "card rack" shown in FIG. 317. Rather, the printed circuit board including the Horizontal and Vertical Deflection Amplifiers, and the major portion of the CRT Driver Circuit, is disposed within the mock-up (see FIG. 317) and closely adjacent the cathode-ray display tube, for reasons stated hereinabove.

An additional input, *a*, is provided whereby a signal from the Display Matrix, "weighted" by the 10 kilohm resistor directly connected thereto, is enabled to produce a displacement of the "1" as shown in FIG. 342.

Figure 221:
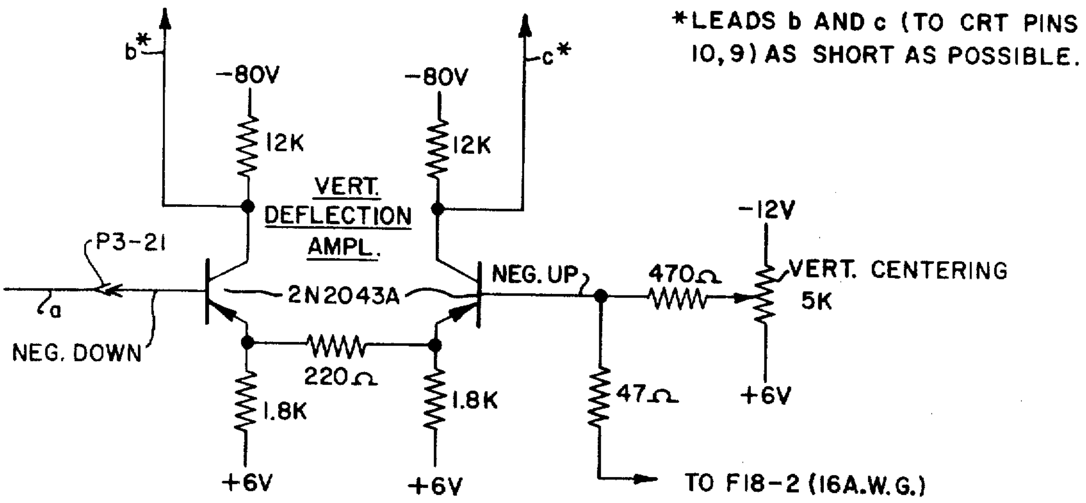
FIGS. 221 and 222 show the circuit and block symbol for the vertical deflection amplifier.
Figure 222:
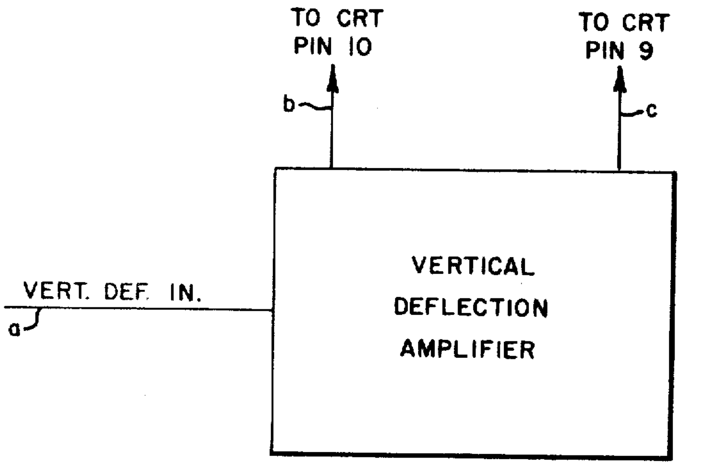

11.4.20.Vertical Deflection Amplifier: FIG. 221 shows the circuit called the "Vertical Deflection Amplifier." FIG. 222 shows a block symbol for the Vertical Deflection Amplifier circuit shown in FIG. 221.

The output terminals *b* and *c* of the circuit of FIG. 221 are directly connected to the vertical deflection plate terminals of the cathode-ray display tube. The leads from terminals *b* and *c* of the Vertical Deflection Amplifier to the vertical deflection plate terminals of the cathode-ray display device should be as short as possible. To this end, the Vertical Deflection Amplifier is located upon a printed circuit board disposed adjacent the cathode-ray display device.

The lower end of the 47 ohm resistor, the upper end of which is directly connected to the base of the right-hand transistor of FIG. 221, is grounded to a ground bus connection on card F18 by means of a special, relatively heavy gauge lead.

Figure 223:
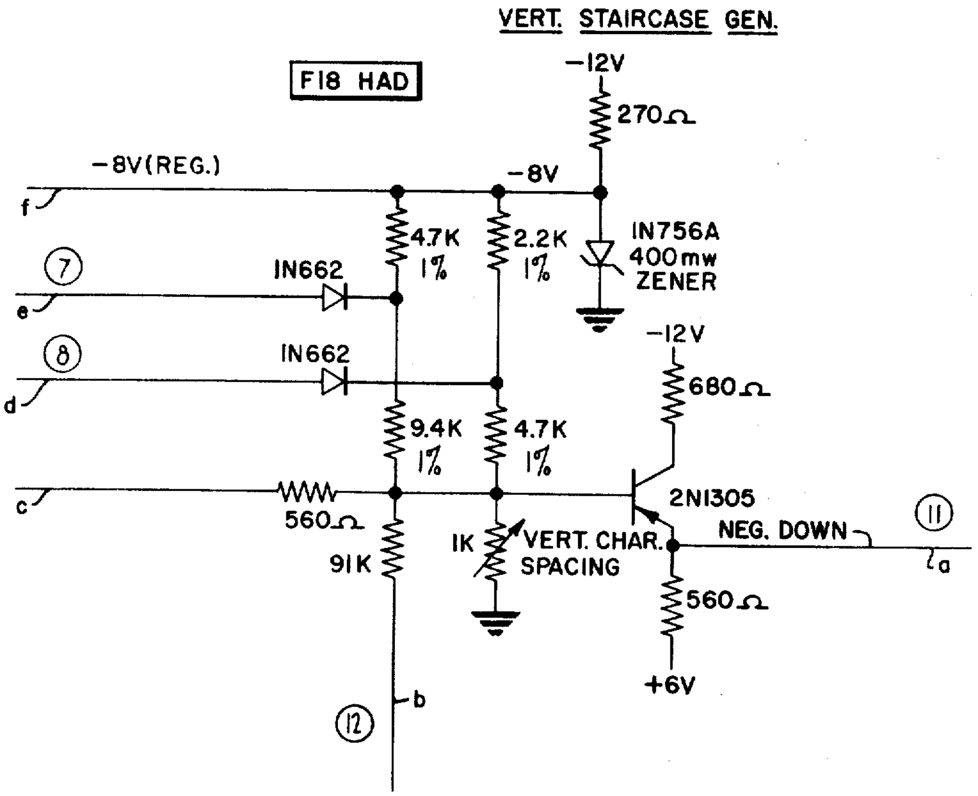
FIGS. 223 and 224 illustrate the circuit and block symbol of the vertical staircase generator.
Figure 224:
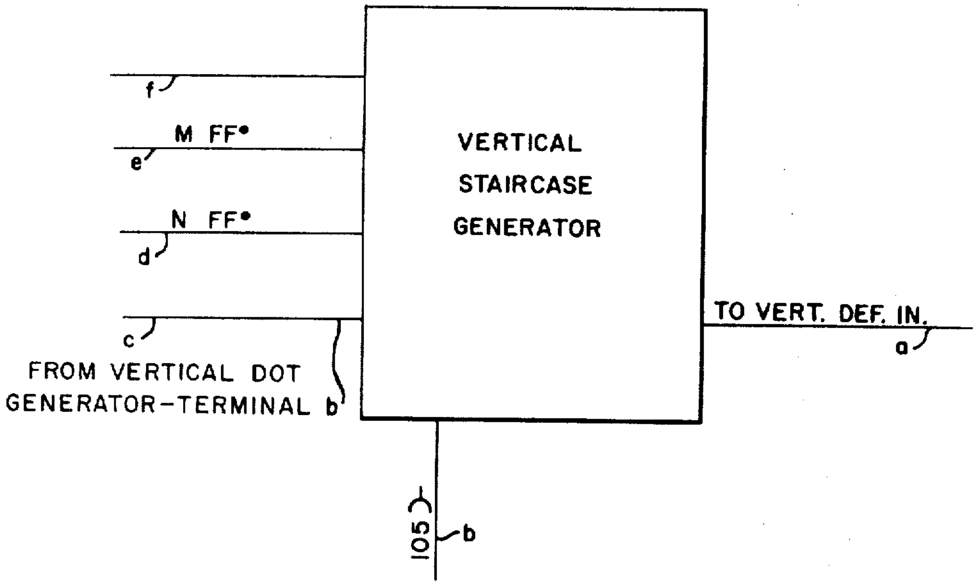

11.4.21. Vertical Staircase Generator: FIG. 223 shows a circuit designated the "Vertical Staircase Generator." FIG. 224 shows the block symbol for the Vertical Staircase Generator circuit shown in FIG. 223.

In the upper right-hand portion of FIG. 223 is shown a regulating network including a 270 ohm resistor and a Zener diode. The regulated potential of approximately 8 volts negative produced at the junction of said resistor and said Zener diode is employed as the supply potential for the current summing network of the Vertical Staircase Generator, and is also supplied, via terminal *f* of the Vertical Staircase Generator to two other major subcircuits, viz., the Vertical Dot Generator and the Horizontal Dot Generator, in both of which it is employed as the current summing network bias supply.

The current summing network of the Vertical Staircase Generator is employed to weight and sum the inputs on terminals *b*, *c*, *d*, and *e*; the voltage drop produced in the 1K potentiometer by the sum current serving as a vertical character positioning signal. This vertical character positioning signal is applied, via the transistor shown in FIG. 223 (i.e., terminal *a*) to the Vertical Deflection Amplifier, and serves to set the level upon the display screen DS at which the various rows of numerals in the display appear. As noted in FIG. 223, the Vertical Staircase Generator circuit shown therein is disposed upon card F18HAD, which is one of the printed circuit cards located in the generally V-shaped card rack of FIG. 317.

12. EXPLANATION OF MISCELLANEOUS DETAIL SHEETS

12.1. Abbreviated Gate Symbols

The abbreviated gate symbols employed in the logic diagram may best be understood in connection with FIGS. 324 through 331. The symbols shown in FIGS. 324, 326, 328, and 330 are those generally used in the logic diagram, while the corresponding symbols shown in FIGS. 325, 327, 329, 331 show the "logical one" signal symbols which may be implied in the symbols of FIGS. 324, 326, 328, and 330 with the aid of the type-letter found therein. As indicated in the notes at the bottom of the sheet containing FIGS. 324 through 331, there are four "type-letters," viz., "D," "N," "X," and "C."

Figure 161:
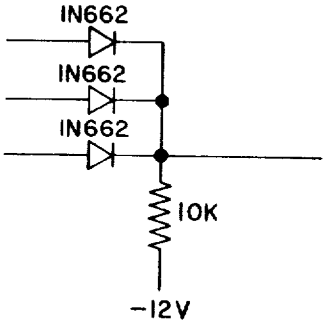
FIGS. 161 and 162 illustrate a typical noninverting gate.

It is assumed in the application of this symbology that the static gates herein are of two kinds, viz., "ordinary" and "extraordinary." An "ordinary" static gate is one which, wether including an inverter or not, has the cathodes of its diodes directly connected to a common point, and the opposite end of its load resistor from the one connected to said common point directly connected to a negative supply. Two examples of ordinary gates are shown in FIGS. 159 and 161.

The type-letters "N" and "D" are applied to inverted, and uninverted, ordinary gates, respectively. Thus, the gate of FIG. 159 would be an "N" gate, while the gate of FIG. 161 would be a "D" gate.

An "X," or "extraordinary," gate is one not complying with the above definition of ordinary gate, e.g., a gate having the anodes of its diodes tied to a common point.

The type-letter "C" is applied to groups of gates having their collector terminals tied together or sharing a single collector circuit (see FIG. 170).

Figure 324:
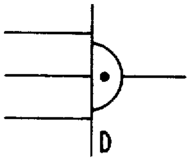
Figure 326:
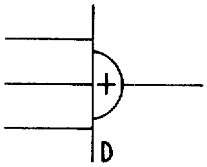
Figure 327:
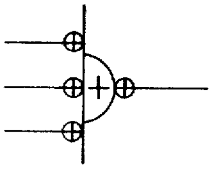
Figure 328:
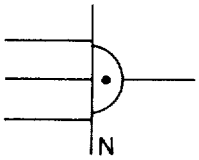
Figure 329:
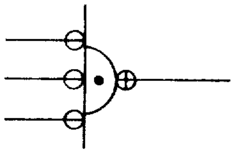
Figure 330:
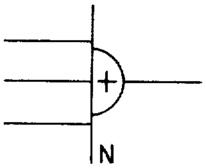
Figure 331:
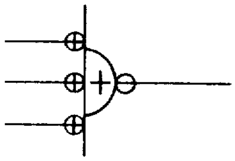

Given the above definitions of the type-letters, it may be seen that FIG. 324 shows a non-inverting AND gate; that FIG. 326 shows a non-inverting OR gate; that FIG, 328 shows an inverting AND gate; and that FIG. 330 shows an inverting OR gate.

As may be seen by comparison of FIGS. 166 through 169, the symbology of which was explained hereinabove, an ordinary gate functions as an AND gate when the NL-signal at its inputs is considered to be "logical one," whether it is an inverting or noninverting gate, the level at its output corresponding to "logical one" being P or N according to whether the gate is inverting or non-inverting. Similarly, it may be seen from FIGS. 167 and 169 that an ordinary gate functions as an OR gate when PL-signals at its inputs are defined as "logical one," the signal level at its output corresponding to "logical one" being the same as that at its inputs, or not, according to whether the gate is of the non-inverting or inverting type.

Figure 325:
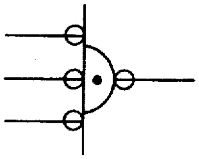

From these considerations it may be seen that each gate in the left-hand column of the sheet containing FIGS. 324 through 331, taken in conjunction with its associated type-letter, may be interpreted as having "logical one" symbols upon its terminals as found in the gate symbol to its right at the same horizontal level. Thus, the gate symbol of FIG. 324 may be interpreted as an ordinary, non-inverting gate; and from that it may be deduced that the NL-signal corresponds to "logical one" at all of its terminals, as shown in FIG. 325. Similar conclusions apply, of course, to the other horizontally-disposed pairs of gate symbols shown on this sheet.

12.2. Field Word Format

FIG. 345 is a schematic showing of the configuration of pulse groups, or time-space pulse group locations, which circulate around the "loop" consisting of the Arithmetic Unit, the Memory Unit, and gate 90. As indicated in the center of the figure, each small rectangle along the border of the larger rectangle, indicates a particular compartment in time-space, called hereinafter a "cell," which, when it is on the delay line, contains a "count," or "digit word," of zero to nine acoustic pulses, or "tally" pulses. Any one of these time-space compartments, or "cells," would occupy a definite physical length upon the delay line if the passage of time were halted, or "frozen." Since this cannot be, however, a cell, as it exists upon the delay line, must be thought of as a physical length of the delay line which remains the same in extent, but continuously alters its position down the delay line, starting at the launch coil, at a velocity equal to the acoustic propagation velocity in the material of the delay line corresponding to the mode of exciting the delay line employed in the particclar delay line used in the device of the invention, e.g., the mode of propagation used in the delay line employed in the embodiment shown and described herein is the torsional mode.

For further description of delay lines which may be effectively employed in the device described herein, see copending U.S. patent applications Nos. 312,674 and 312,675, both filed and assigned to the same assignee Sept. 30, 1963, now Pats. Nos. 3,265,996 issued Aug. 9, 1966 and 3,260,970 issued July 12, 1966, respectively.

The arrow labelled R may be thought of as a point at which information present in the form of acoustic disturbances upon the delay line is electrically manifested in the circuit of the invention (e.g., the output terminal of the M/U labelled ΔLO SG. S shown in FIGS. 198, 199 and 308.). The cells shown by small rectangles in this figure may be thought of as circulating around the periphery of the large rectangle, or storage continuum and being produced electrically, or "read out," each time they pass the R arrow. If, then, the circulation of these cells were halted just prior to the arrival of the 0//S cell at the R arrow, the entire field word would be "stored" upon the delay line. At that time, if the disturbances circulating upon the delay line were instantaneously "frozen" thereupon, then groups of disturbances, or acoustic pulses, could be found to correspond to nearly all of the cells shown in the figure, the only exception being those cells the contents of which is the digit zero. These digit-zero-containing cells would be "empty," since the "pulse-count" or "unitary" notation used to represent digits upon the delay line employs, to represent any given digit, a number of disturbances, or acoustic pulses, equal to the number represented. Thus, in the "unitary," or "pulse-count," notation used herein, the digit "0" is represented by the absence of any pulses in a cell of the delay line. In this same notation, the digit "5" is represented by five acoustic disturbances in a given space-time compartment, or cell. Similarly, the digit "9" is represented by nine disturbances, or acoustic pulses, in a given cell of the delay line. Put differently, the digit word representing the digit "9" is a group of nine acoustic disturbances upon the delay line. When a cell having the digit word 9 as its contents reaches the end of the delay line, then a series of nine pulses will be produced at the output of the M/U, and this serial group of nine pulses produced at the output of the M/U can be considered to be the same digit word represented in alternative form. When the field word is not entirely within the delay line, then part of it will be stored in the digisters of the Arithmetic Unit.

As will be described in detail in connection with FIG. 346, the cells of the field word are identified as belonging to groups, called "columns" for reasons which will become apparent hereinafter. Each "column" is assigned a number, this number appearing to the left of the "//" within the rectangle representing the cell in FIG. 345. The cells in the loop are also grouped into groups called "registers." Each of these groups or registers, is assigned a number. In FIG. 345, each cell-representing rectangle has located therewithin a number corresponding to the register to which that cell belongs. This register number is located to the right of the "//" found within the cell-representing rectangle. Inspection of the register numbers found within the cell-representing rectangles of FIG. 345 will show that the cells comprising a given register are not adjacent, as was the case with the cells constituting a column, but are interspersed or interlaced, each register having one of its cells in each column. For instance, as may be seen in FIG. 345, the display row 1 register cells are the third cell in each column. Similarly, the register S cells are the first cell in each column.

Thus, it may be seen that, according to the field word format of the invention, the cells of a column are adjacent while the cells of each register are interlaced, column-by-column. Put differently, a field word, according to the invention, as manifested serially at the output of the Memory Unit, for instance, comprises a plurality of digit words, each of these digit words belonging to two groupings. The first of these groupings is that of adjacent pluralities of digit words into groups called "columns." The second of these groupings is that of interlaced pluralities of digit words into groups called "registers." A digit words of each register is found in each column, and, thus, the registers are not only said to be interlaced, but are also said to be "interlaced, column-by-column." When all of the information circulating in the loop is found within the delay line, then the contents of the delay line is called the "field word."

Every digit-defining group of acoustic pulses on the delay line (i.e., the group of pulses within a cell) is called a "digit word." It should be noted that the digit words of the first two columns do not represent the digits of numbers operated upon during calculations with the device of the invention. To the contrary, the first digit word of column 0 always contains a single tally pulse, or acoustic disturbance, used for synchronizing the operation of the machine, rather than as a number involved in calculations. Since, however, this digit word is indistinguishable from the digit word representing a numeral 1, it is conveniently called a "digit word," as is another digit word, say, in column 5, which does represent a numeral to be operated upon in calculation. This first digit word of the field word will also sometimes be called the "synchronization word" hereinafter. Similarly, the digit words in column 1 do not represent numbers, but rather arithmetical signs, a "0" representing arithmetical positive, and a "1" representing arithmetical negative. These digit words in column 1 will sometimes hereinafter be called "sign words."

The word "disturbance" refers to that pattern of acoustic disturbance put on the delay line by the launch coil which is interpreted by the read amplifier as a single count, pulse, or tally pulse. Some of the best quality acoustic delay lines available provide a waveshape as the result of reading a single acoustic disturbance which is not a single deviation from the base line, but a larger "upward" deviation preceded and followed by smaller "downward" deviations. However, read amplifier means may be provided which will interpret this three-part disturbance, and emit a single pulse from its output in response to this three-part signal. Thus, the word "disturbance," as used herein, should be taken to mean that combination of traveling local strains upon the delay line which is occasioned by a single input pulse to the launch coil, and which will be interpreted by the read amplifier as resulting from single input pulse to the launch coil (irrespective of the wave shape which this disturbance might take if displayed upon a high-quality, high-speed oscilloscope directly tied to the output coil of the delay line).

Each group of adjacent digit words arbitrarily identified as belonging to a single column, taken together, is called a "column word."

Each group of digit words, interspersed column-by-column and arbitrarily identified as belonging to a given register, taken together, is called a "register word."

12.3. The Display Cells

To assist in understanding the relationship between the information circulating in the loop and the information displayed upon display screen DS, which relationship is one of the principal features of the instant invention, each location upon the display screen at which a digit, or negative sign, may be displayed is called a "cell," or "display cell," and is assigned a "cell number," or "display cell number," which somewhat resembles a fraction, as do the "loop cell numbers" which identify the "cells" of the loop. Thus, as may be seen in FIG. 344, the display screen DS may be thought of as having fifty-six "cells," or "display cells," located thereupon. Each of these display cells is represented in FIG. 344 by its corresponding cell number. Thus, the cell at the lower, right-hand corner of FIG. 344 will hereinafter be referred to as the "S/1 cell."

(The form of fraction representation employing the horizontal bar as its divider is considered, in representing cell numbers, to be the complete equivalent of the form of fraction representation using diagonal strokes as a substitute for horizontal bars.)

The display cell in the upper left-hand corner of FIG. 344 will hereinafter be called the "13/4" cell.

As will be obvious from FIG. 344, the "numerator" of each cell number designates the column upon the display screen in which that cell appears, the right-hand column being designated the "S" column because negative signs appear therein during the display of certain mathematical operations. All columns but the right-hand column of the display are used for representing the numbers involved in calculations by the device of the invention, and are numbered from numeral 1 through numeral 13, from right to left. Thus, the "numerators" of the cell numbers of the cells in these columns are the column numbers.

Similarly, it may be seen from FIG. 344 that the display cells are arranged in four horizontal rows, numbered 1 through 4, from bottom to top. As may be seen in FIG. 344, the "denominator" of each display cell number is the number of the row in which that display cell is located. It will be appreciated, of course, that the "common fractions" shown upon display screen DS in FIG. 344 are not displayed upon the display screen of the device of the invention, since the device of the invention is not designed to display common fractions. Rather, each of the fifty-six, common fraction-like display cell numbers shown in the display screen representation of FIG. 344 merely indicates a location, by column and row, at which a single digit, or sign, will be found in the display part of the device of the invention.

12.4. The Cell Number Nomenclature

FIG. 347 defines the manner in which the display cell numbers and loop cell numbers are identified and used herein. It should be kept in mind that, in some uses of the cell numbers herein, a horizontal bar may be substituted for a diagonal bar used in this figure, the meaning of the cell number remaining the same.

The table headed "CELL NUMBERS" found at the top of FIG. 347 indicates that a cell number having a single diagonal, "/", or horizontal bar, represents a cell upon the display screen DS, while a cell number having a double diagonal "//", or double horizontal bar, represents a cell found upon the loop. This table also indicates that the "numerator" of any cell number is its column number, while the "denominator" of any cell number is its register, or row, number. Comparison of the two columns of this table shows that a cell number alone should be taken to represent the name of a given cell, while a cell number in parentheses should be taken to mean the contents of the designated cell.

It is also noted in FIG. 347 that when a cell number is enclosed in parentheses a superscript appended thereto, which superscript is the name of a suboperation, indicates that what is represented is the contents of the designated cell before that suboperation, while a cell number enclosed in parentheses and having a similar subscript indicates the contents of the designated cell after the suboperation indicated by the subscript.

This practice is also defined in FIG. 347 of indicating the particular digit found at a given time in a given cell by including this digit in quotes within the parentheses indicating the contents of the cell, and to the right of the cell number.

12.5. The Field Word-Display Raster Relationship

The diagram of FIG. 346 is provided to show, in compact form, the relationship between the field word of information circulating in the loop and the information displayed upon the display screen of the device of the invention, which relationship is a particular feature of the invention.

The diagram of FIG. 346 is divided into 96 rectangles, or cell representations. Within this group of 96 cell representations, a more limited group of 56 cell representations is surrounded by a heavy line. Each one of the major group of 96 cell representations represents one cell of the field word, as defined in connection with FIG. 345. Each one of the cell-representing rectangles within the heavy-outlined minor group of 56 rectangles represents a cell of the display.

Each one of the 96 cell-representing rectangles has within it a cell number, or "loop cell number," designating the loop cell, or line cell, to which that rectangle corresponds.

In addition to containing a loop cell number, each of the 56 rectangles within the minor, heavy-bordered rectangle contains a display cell number which indicates the display cell in which the contents of the loop cell designated in the same rectangle is displayed. Thus, inter alia, this diagram represents the one-to-one relationship between certain loop cells, or line cells, and the display cells in which their contents are displayed.

As indicated by the upper diagram at the right-hand edge of FIG. 346, the order in which the digit words of a field word appear at the output of the Memory Unit may be determined by scanning, in succession, each of the sixteen columns of the main diagram, from bottom to top, starting with the right-hand column and progressing to the left-hand column. Because the nature of a field word is defined by one such scanning of the main diagram in FIG. 346, this main diagram will hereinafter be called the "field word diagram."

As indicated by the lower diagram at the right-hand edge of FIG. 346, the order in which the digits, and negative signs, displayed upon the display screen are generated may be determined by scanning the horizontal rows within the heavy-bordered rectangle of the field word diagram horizontally from right to left, starting with the lowest row within the heavy border lines, and proceeding to the top row within the heavy border lines.

By comparing these two modes of scanning the field word diagram, the time-phase relationship between the field word and the display scan may be seen.

An additional function of the field word diagram is to illustrate the interrelationship between certain timing signal trains and the display cells and loop cells.

For instance, the leg-end "$B_{15}$" which is appended, by means of an arrow, to each of the horizontal lines of the field word diagram indicates that the brief pulses herein designated $B_{15}$ are used to delineate the limits of the cells. That is, if one scans upwardly in the right-hand column of the field word diagram, one passes through the 0//0 cell-representing rectangle, and then through a horizontal line labelled (by arrow) $B_{15}$, before going on to cell 0//1. Thus, the fact is represented that, in the device of the invention, a $B_{15}$ pulse occurs at the time of transit from one cell to an adjacent cell. More specifically, as can be seen by comparison of the $R_1$ SG. waveform in FIG. 320 with the $WFB_{15}$ waveform in Appendix C, the PT-segment of the $B_{15}$ signal train occurs approximately three microseconds before each transition of the R signal trains.

Figure 319:
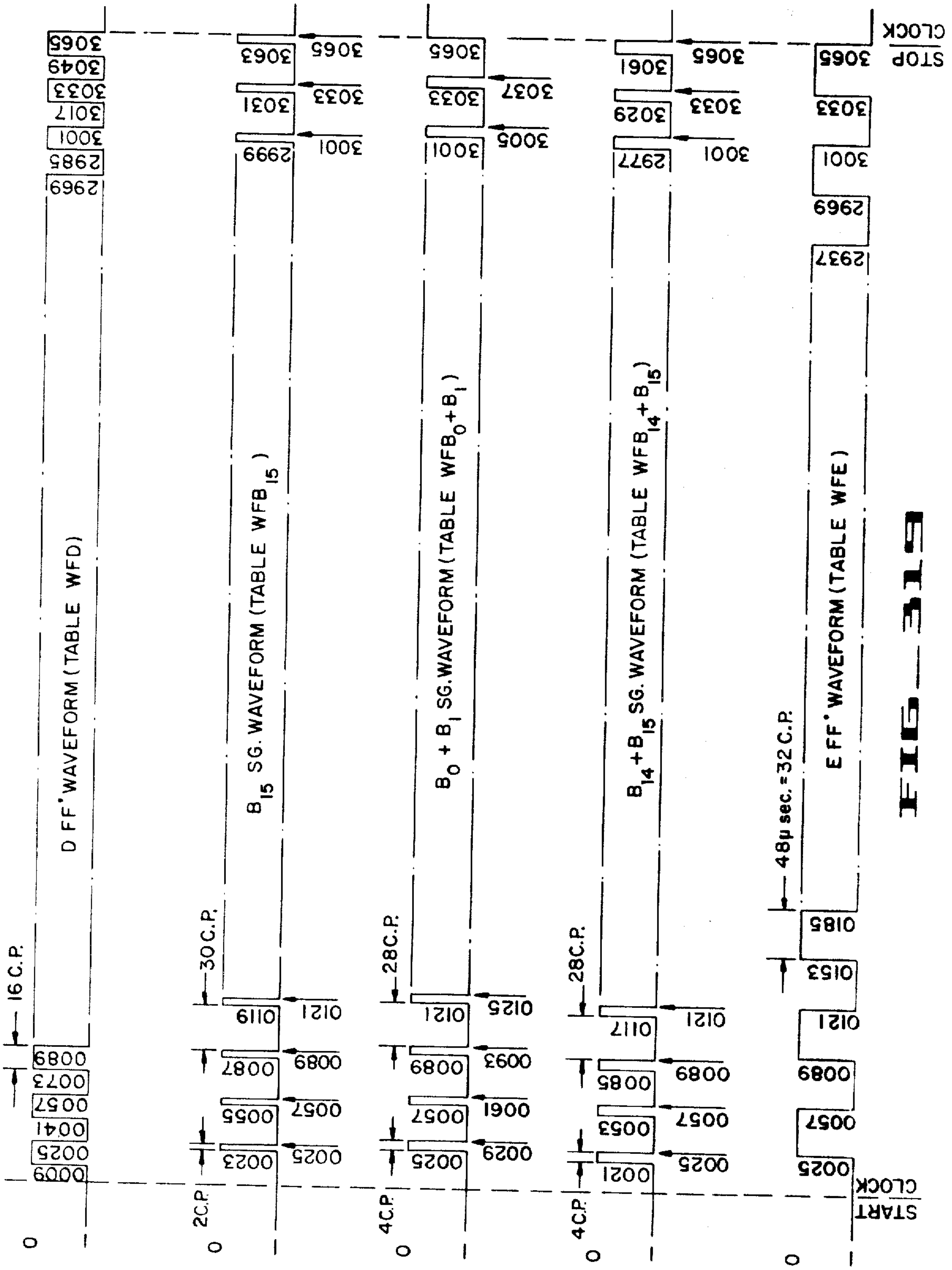
Figure 320:
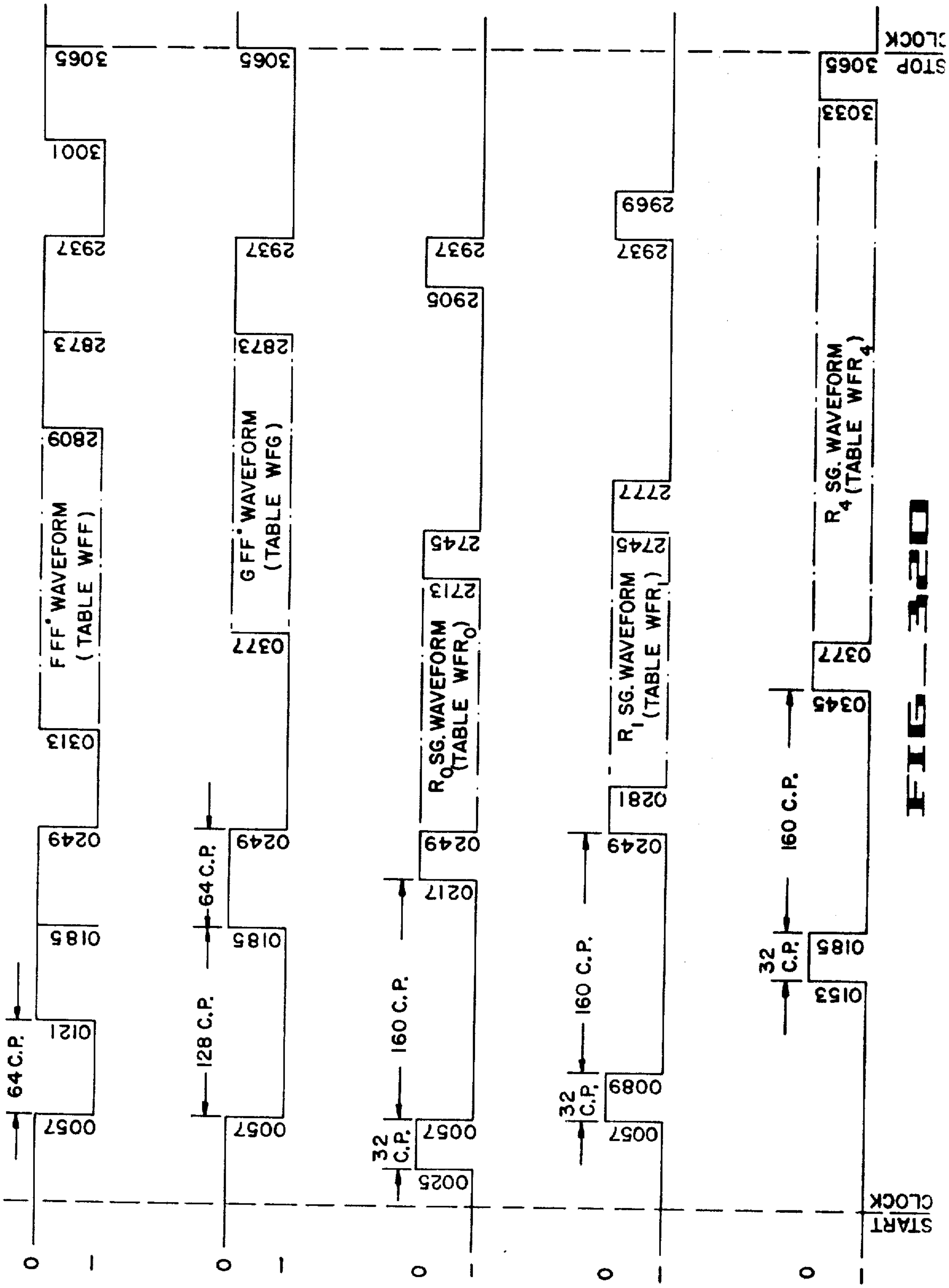
Figure 321:
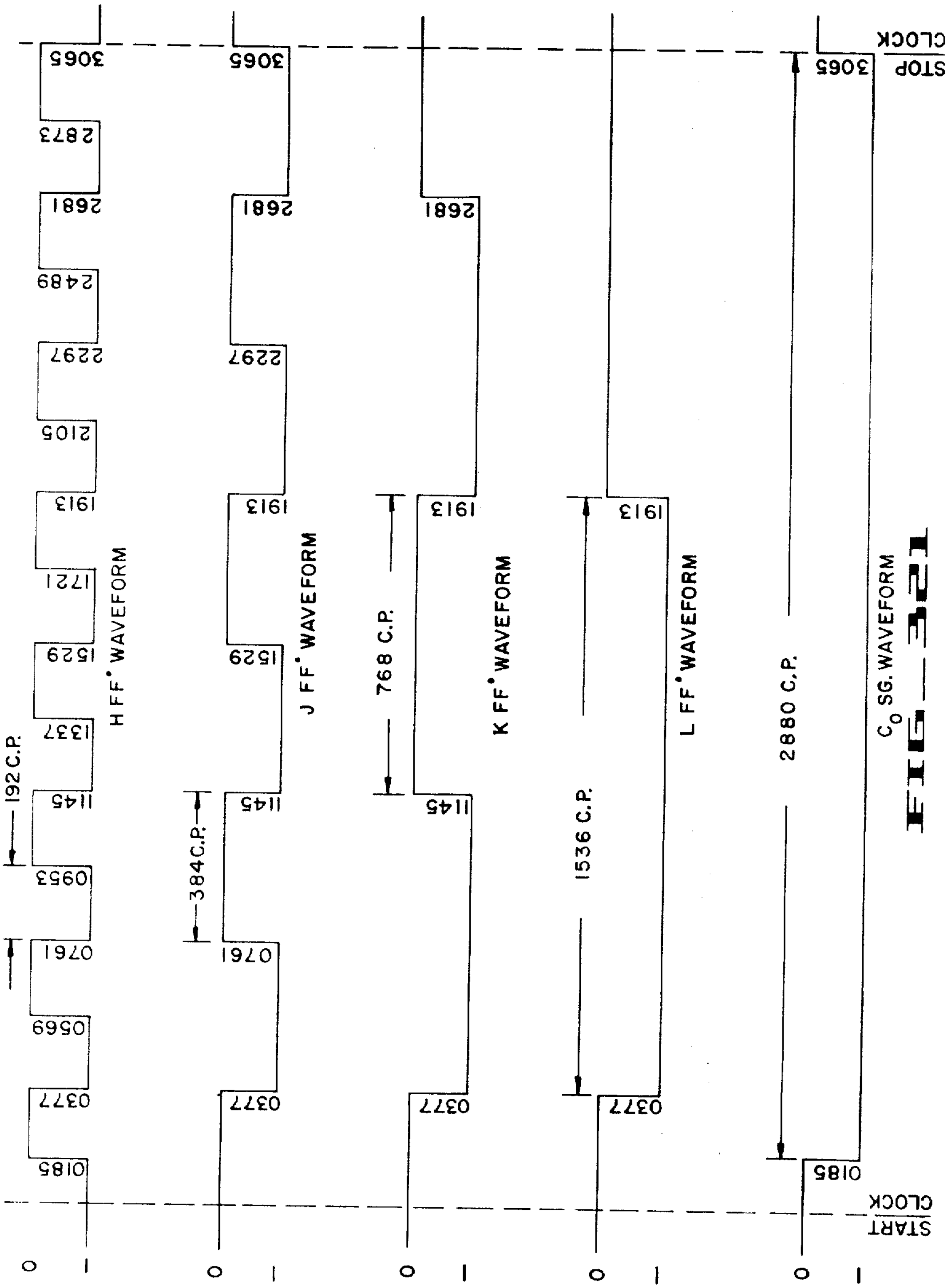

At this point it should be noted that the rectangles representing the cells in the field word diagram of FIG. 345 are used merely schematically, and do not imply that there is a considerable time lapse between cells. Rather, as shown in the field word diagram by passing over a horizontal line while scanning, the cells in the device of the invention are delineated by $B_{15}$ pulses, all of the time between an adjacent pair of these pulses constituting a cell. The waveform of the $B_{15}$ pulses is shown in FIG. 319.

The expressions "$R_S$," "$R_0$," "$R_1$," "$C_0$," "$C_1$," "$C_2$," etc., as shown along the left and bottom edges, respectively, of the field word diagram, indicate timing signals (see Timing Signal Generator, FIG. 311) which occur in synchronism with the cells indicated at their intersections. For instance, cell 15//3 is located at the intersection of the column identified with the $C_{15}$ signal and the row identified with the $R_3$ signal. No implication should be derived from these signal names placed adjacent the left and bottom edges of the field word diagram that all of these signals are generated, or led out to specific terminals associated therewith. Rather, the designations placed adjacent the left and bottom edges of the field word diagram indicate those signals which, absent other synchronizing expedients, would be necessary to fully synchronize the device of the invention. Some of these signals are represented by waveforms in FIGS. 320, 321, and 322.

Figures 322, 323:
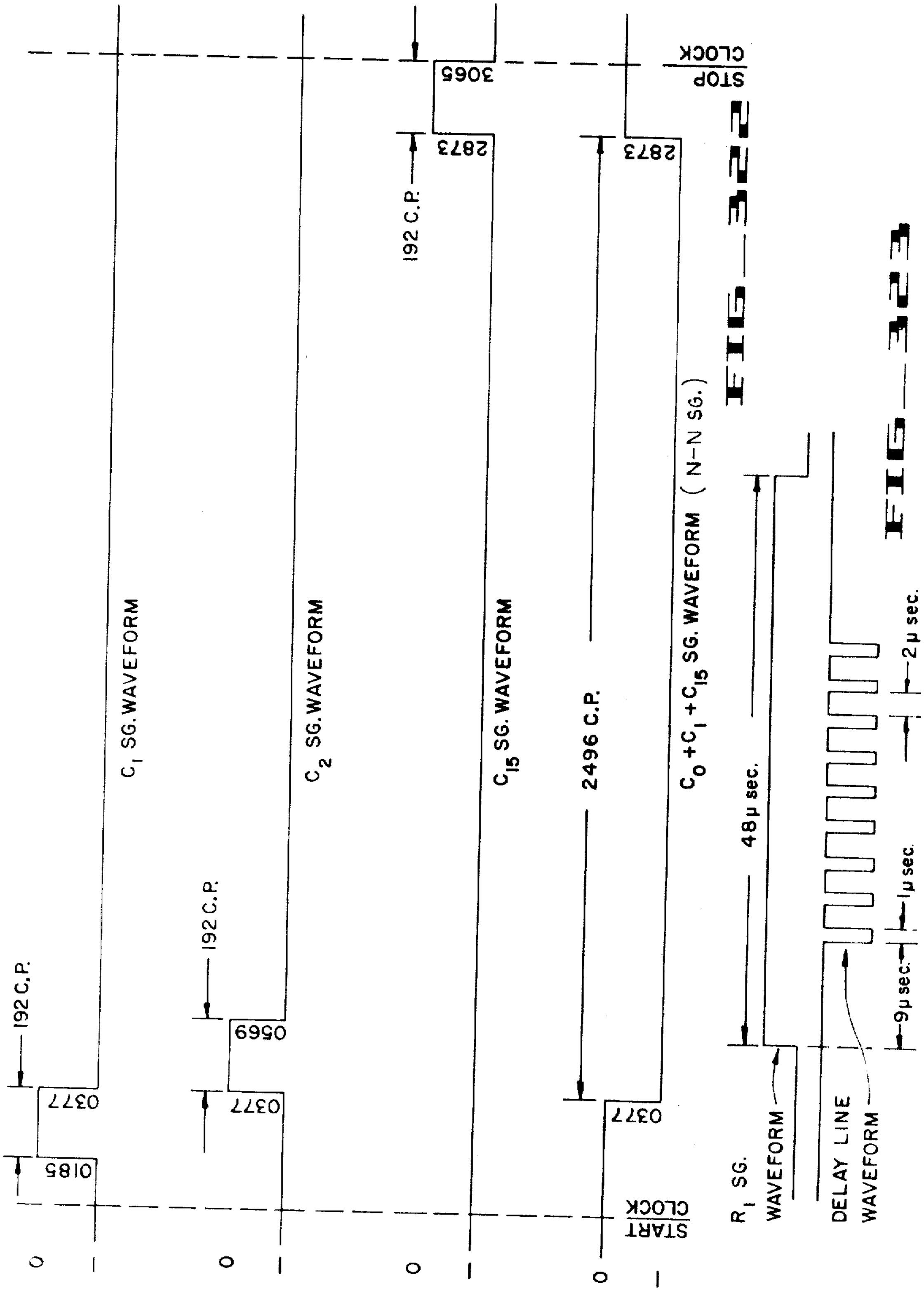

A small portion of the $R_1$ waveform, and a digit word corresponding to its momentary contents, is shown in FIG. 323.

A detailed representation of the $B_{15}$ waveform, i.e., the waveform of the pulses which delineate the cells, is found in table $WFB_{15}$ (Appendix C).

A detailed representation of certain of the R and C waveforms referred to in the field word diagram is given in Appendices H, I, and J.

13. VOCABULARY

| | |
|---|---|
| Active State | Sec. 16.3 |
| Advanceable | Sec. 16.2 |
| Automatic Sequential Access Storage (ASA Storage) | Sec. 16.6 |
| Automatic Sequential Entry | Sec. 16.6 |
| Automatic Sequential Retrieval | Sec. 16.6 |
| Bisequenceable | Sec. 16.2 |
| Cell | Sec. 12.2 |
| Cell Number | FIG. 347 |
| Cleared State | Sec. 16.3 |
| Column Word | Sec. 16.2 |
| Common Component | Sec. 11.2.1 |
| Component Value Legend | Sec. 11.2.1 |
| Conjoint Signal Symbol | Sec. 11.6 |
| Digister | Sec. 16.1 |
| Digit Word | Sec. 12.2 |
| Direct Access Storage (DA Storage) | Sec. 16.6 |
| Display Cell | FIG. 344, Sec. 12.3 |
| Endigiting | Sec. 16.2 |
| Field Word | Sec. 12.2 |
| Field Word Diagram | FIG. 346 |
| Field Word Format | FIG. 345 |
| Idling Pulse Trains | Sec. 16.7 |
| Idling State | Sec. 16.3 |
| Interspersed or interlaced | Sec. 12.2 |
| "Inverse" Input Segment | FIG. 332 |
| "Inverse" Output Segment | FIG. 332 |
| Memory Loop | FIG. 345 |
| Monosequenceable | Sec. 16.2 |
| Pulse-Count Notation | Sec. 12.2 |
| Recedable | Sec. 16.2 |
| Register Word | Sec. 12.2 |
| Row | Sec. 12.3 |
| Sequencing Sequenceable | Sec. 16.2 |
| Sequential Access Storage (SA Storage) | Sec. 16.6 |
| Signal Symbol | Sec. 10.1 |
| "True" Input Segment | FIG. 332 |
| "True" Output Segment | FIG. 332 |
| Unique Component | Sec. 16.5 |
| Unitary Notation | Sec. 12.2 |
| Wavetrain | Sec. 10.1 |

14. CONSTRUCTION

FIGS. 225 through 294, taken together, constitute a schematic circuit diagram of the particular embodiment of the instant invention shown and described herein.

To best understand the manner in which the interconnections between the various subcircuits shown in these figures are indicated therein, attention should first be directed to the arrangement of printed circuit boards upon which these subcircuits, or most of them, are disposed, and the manner in which these printed circuit boards are housed, supported, and interconnected.

14.1. The Cabinet

The upper portion of the cabinet is shown in FIG. 1.

As can be seen in FIG. 1, this upper portion of the cabinet generally comprises two parts.

The first of these two parts, which somewhat resembles a calculator, and, for that reason, is called the "mockup," is disposed upon the second, and larger, of these parts.

The second, and larger, of these two parts (better seen in FIG. 317), is called the "console."

As may be seen in FIG. 317, the console comprises a box-like structure, the side-panels of this structure being removable for inspection. The console is equipped with casters for convenience in transit, and has the mockup mounted upon its top surface, with a communicating aperture between the interior of the mockup and the interior of the console.

As may further be seen in FIG. 317, the console contains a power supply (delivering −12 volts, ground potential, and +6 volts) which is disposed in the lower, left-hand corner thereof.

The console also contains a spiral acoustic delay line located in the bottom portion thereof. This delay line may, for instance, be a Ferranti, Style L–40, Type 62–097 which has a delay time of about 5.2 milliseconds.

Further, the console contains a generally V-shaped card rack, which card rack contains the printed circuit cards upon which substantial parts of the circuit of the embodiment described herein are located.

Additionally, a number of cables interconnecting the portions of the circuit found within the mockup with the portions of the circuit found within the console are found, in part, within the console. The interconnecting plugs which make it possible to detach portions of these cables from one another may be located within the console, or within the mockup.

The mockup, as described hereinabove, contains, generally, the cathode-ray display tube, the CRT Driver Circuit, the Horizontal Amplifier, the Vertical Amplifier, and the keyboard switches and associated circuitry.

14.2. The Printed Circuit Boards

A large number of the printed circuit boards employed in the embodiment described and shown herein are of a standardized size, and have standardized terminals, or "pins," and are called hereinafter "printed circuit cards," or "cards."

14.2.1. Cards: FIG. 314 shows one end of a typical printed circuit board of the standardized type hereinafter called a "card." These cards are fabricated from conventional, "one-sided," conductor-clad insulating material of the type commonly used as the stock material in the production of printed circuit boards, and are approximately 3½ inches wide, and 4½ inches long. Disposed along one of the shorter edges of each printed circuit card is a group of seventeen flat interlocking terminals, which are generally referred to herein as "pins." These "pins" constitute the terminals of the various subcircuits found upon a particular printed circuit card. On each card, these seventeen terminals are assigned arbitrary numerical designations, the pin No. 1 terminal being at one end of the card-edge upon which the terminals are located, and the pin No. 17 terminal being at the other.

14.2.2. Mother Boards: FIGS. 315 and 316 show a partial view of the structure hereinafter called a "mother board." A mother board is a sheet of insulating material, similar to the insulating material used in the production of conventional printed circuit boards, and it is approximately 4¾ inches high, and 15 inches long. Each mother board has a plurality of metallic conducting members, which will hereinafter be called "contacts," to distinguish from the "pins" of the "cards," passing through it from one side to the other.

A typical "contact" is shown in FIG. 316. In FIG. 316 a mother board is shown "on edge," and eight transverse rows of "contacts" are seen "on end." The second row of contacts from the top in FIG. 316 appears different from the rest, however, because, for purposes of illustration, the contacts of this row have been turned through ninety degrees. Of course, no actual mother board exists in the device of the invention wherein such a row of contacts is turned through ninety degrees. The expedient adopted, however, illustrates the nature of a terminal which may be employed in carrying out the instant invention. It may be seen from the rotated contacts that the end of the contact on one side of the mother board, i.e., *b*, has a simple cross-section, by reason of which it presents the same silhouette when the contact is rotated through ninety degrees. This terminal portion *b* of the contact will hereinafter be called a "solder terminal," since it is adapted to have a plurality of interconnecting lead ends soldered to it. The other end *a* of each contact is developed in the form of two "tines," and is adapted to inter-engage with similar "tines" of a card terminal. The "pins" of the printed circuit cards, *c* (FIG. 314), are slotted to provide such tines to engage the tines at ends *a* of the contacts on the mother boards.

The *a* and *b* ends of the contacts on the mother boards are, of course, electrically interconnected.

As shown in FIG. 315, each mother board has mounted upon it a plurality of rows of contacts, each row extending across the narrow dimension of the mother board, and consisting of seventeen contacts. As may be seen from FIG. 314, each standard printed circuit card has seventeen pins along one of its edges, these pins being adapted, as noted hereinabove, to inter-engage with ends *a* of contacts upon the mother boards. Thus, it may be seen that each card may be removably mounted upon a row of contacts in a mother board by mating its terminals therewith. When so mounted, of course, the plane of the mounted card will be perpendicular to the plane of the mother board, the plane of the mounted card intersecting the plane of the mother board in a line perpendicular to the long edges of the mother board.

Each mother board, however, has nineteen transverse, substantially equally spaced rows of contacts. Thus, each mother board is capable of maintaining up to nineteen cards in fixed, parallel relation, the minimum spacing between such boards being approximately ¾ of an inch.

It will also be clear that, once a card is engaged with the contacts of a definite row on a mother board, then the ends *b* of the contacts in this row may be used as solder points to which leads may be brought, thereby interconnecting the corresponding pins of the so-engaged card with pins of other cards, and with points other than card pins. Since the components constituting the subcircuits mounted on the cards are interconnected, directly, or through other components, with the pins of the cards by means of well known "printed" foil interconnections, such as *d* of FIG. 314, and since the pins of these cards are engaged with rows of contacts on the mother boards, then it may be seen that wire leads interconnecting mother board contacts, and connecting mother board contacts to other points in the circuit, serve as effective means of completing the circuit of the embodiment described herein.

Going to FIG. 317, it may be seen that, though not completely illustrated for reasons of clarity, ten mother boards are located upon the V-shaped card rack. Five mother boards are located upon the left side of the card rack, as shown in FIG. 317, and five mother boards are disposed upon the right side of the card rack, as shown in FIG. 317. The left-hand half of the card rack, as seen in FIG. 317, will hereinafter be called the "left rack," and the right-hand portion thereof, as seen in FIG. 317, will hereinafter be called the "right rack." As shown in FIG. 317, all ten mother boards are mounted upon the card rack in such manner that the *b* ends of their contacts are disposed toward the reader. Thus, the cards which are mounted upon these mother boards will all be located to the rear of the mother boards as shown in FIG. 317, the interconnecting wiring between the contacts of the mother boards, and to other points, appears upon the side of the mother boards visible in FIG. 317 in the actual embodiment of the invention shown and described herein, but is deleted in FIG. 317, except for supply busses, for clarity of illustration.

The mother boards are maintained in the relative position in which they are shown in FIG. 317, and an identifying code is assigned to each mother board, each row of each mother board (and, thus, to each card, since each card will be associated with one row of one mother board only), and to each contact in each row (and, thus, to each pin of each card). Each mother board is assigned a single-letter alphabetic designation. The five mother boards in the left rack are designated "A," "B," "C," "D," and "E," the top mother board being the "A" board, and the bottom mother board being the "E" board. Similarly, the five mother boards in the right rack are designated "F," "G," "H," "J," and "K," the top mother board in this rack being the "F" board, and the bottom mother board being the "K" board. It should be noted that the "I" is suppressed in this series in accordance with the usual practice.

As noted hereinabove, each mother board has nineteen transverse rows of contacts, these rows hereinafter being called "columns," since they are vertically-disposed as shown in FIG. 317. On a given mother board, the columns of contacts are arbitrarily assigned the numbers from 1 through 19, the number 1 column being on the left of any given mother board as shown in FIG. 317, and the number 19 column being on the right of the mother board. Thus, for example, the fifth column of contacts from the left-hand end of the A mother board will be designated the A5 column. Also, since one and only one printed circuit card is associated with each column of contacts on the mother boards, the card which is engaged with a given column of contacts on a given mother board will have the same code designation as that column. Thus, in the example given above, the card which is engaged with the contacts of row A5 when the embodiment is fully assembled will be designated the A5 card.

Finally, the seventeen contacts in each column are arbitrarily assigned identifying numbers, from 1 to 17, starting at the top of the column with number 1 and terminating at the bottom of the column with number 17. To carry the above example further, the third contact from the top in column A5 will be designated the A5–3 contact. Also, since there is a one-to-one correspondence between contacts in a column and card pins at the edge of the card which is engaged with this column, the pins of any given card are assigned the same code designation as the contacts which they engage when the embodiment is fully assembled. Thus, pin 3 of card A5 will be the pin third from the top of that card when that card is held in the position it occupies while engaged with mother board A.

As noted hereinabove, all of the interconnection wiring terminating at mother board contacts has been eliminated in FIG. 317, except for supply busses running from the power supply in the bottom of the console. These supply busses are shown as groups of three relatively heavy lines running upwardly between the two racks at the center of FIG. 317, and also across the top of each mother board. These relatively heavy wire busses carry supply potentials as follows: First, the topmost of these busses as seen on each mother board carries 12 volts negative (nominal), and is connected to the No. 1 contact in each row which will have a card engaged with it in the completed machine. Similarly, the second supply bus from the top as shown on the mother boards is a ground bus, and will be connected to the No. 2 contacts of all the rows having cards engaged with them in the completed machine. The third supply bus from the top on every mother board carries 6 volts positive (nominal), and is connected to the No. 3 contact in every row which will have a card associated with it in the completed machine.

14.3. THE MOTHER BOARD CONNECTIONS

As noted above, the *b* ends, or "solder pins," of certain contacts on the mother boards are connected with the solder pins of other contacts on the mother board, or with circuit points other than mother board contacts, by means of wired connections. Such a wired connection, having at least one of its ends soldered to a solder pin on one of the mother boards, is most usually called a "mother board connection" herein.

The mother board connections which were deleted from FIG. 317 for clarity of illustration are tabulated in Table CC (Appendix K).

Considering Table CC, it will be noted that the mother board connections are tabulated as between card pins, and not as between mother board contacts, or solder pins. However, as explained above, each mother board solder pin used corresponds to a card pin, i.e., the card pin with which its corresponding end *a* is engaged when all of the cards are properly emplaced. Thus, where convenient, each mother board solder pin having a mother board connection attached thereto may be designated by the same term as that used to designate the corresponding card pin. This expedient is adopted throughout Appendix K. It is not to be understood from the adoption of this expedient, however, that the wired mother board connections are made directly to the card pins. Rather, the connections indicated in Table CC are made between the mother board solder pins corresponding to the card pins tabulated therein.

An example of the most frequently occurring type of mother board connections tabulated in Table CC is found on the first page of Table CC in the section headed "CARD NO. A4". In the left-hand column of that section, under the heading "PIN", is found the number "16," and opposite the entry "16," under "TO," is found the entry "P1–5". The term "16" may be called the "entry term," and the term "P1–5" may be called the "tabulated term," or "body term". The entry term "16", taken together with the term "A4" in the section-heading, designates a solder pin at one end of a mother board connection, while the tabulated term "P1–5" designates the other end of that same mother board connection. Thus, it may be seen that a horizontal line of Table CC having one tabulated term specifies one mother board connection. A line of the table having two tabulated terms specifies two mother board connections (see, for example, the line of the "CARL NO. A3" section having "5" as its entry term). Lines of the table designating larger numbers of mother board connections will have correspondingly larger numbers of tabulated terms.

Unless otherwise indicated in Table CC, the mother board connections tabulated therein are formed of unshielded, well-dressed insulated hookup wire taking a minimum-length path between the interconnected points along lines parallel to the edges of the mother boards.

However, some of the mother board connections are shielded, rather than formed of unshielded hookup wire. These shielded mother board connections are indicated in Table CC by overscoring the tabulated term corresponding to one end of the shielded connection (see, for instance, card B5, pin 12). The shield of each shielded mother board connection is grounded at one end only. As indicated in Note A of Table CC, the end of the shield which is grounded is specified in that Table by designating the card pin closest to the grounded end of the shield. The end of the shield is grounded by a direct connection therefrom to the nearest No. 2 (ground bus) mother board contact. As an example of this, see card K16, pin 10 in Table CC. The overscoring of the tabulated term "H6–11" indicates that the single mother board connection specified in this line of the table is a shielded one. The reference to Note A found to the right of the tabulated term indicates that pin 10 is the pin closest to the grounded end of the shield. This end of the shield is grounded to the nearest No. 2 solder pin of a mother board.

Figure 276:
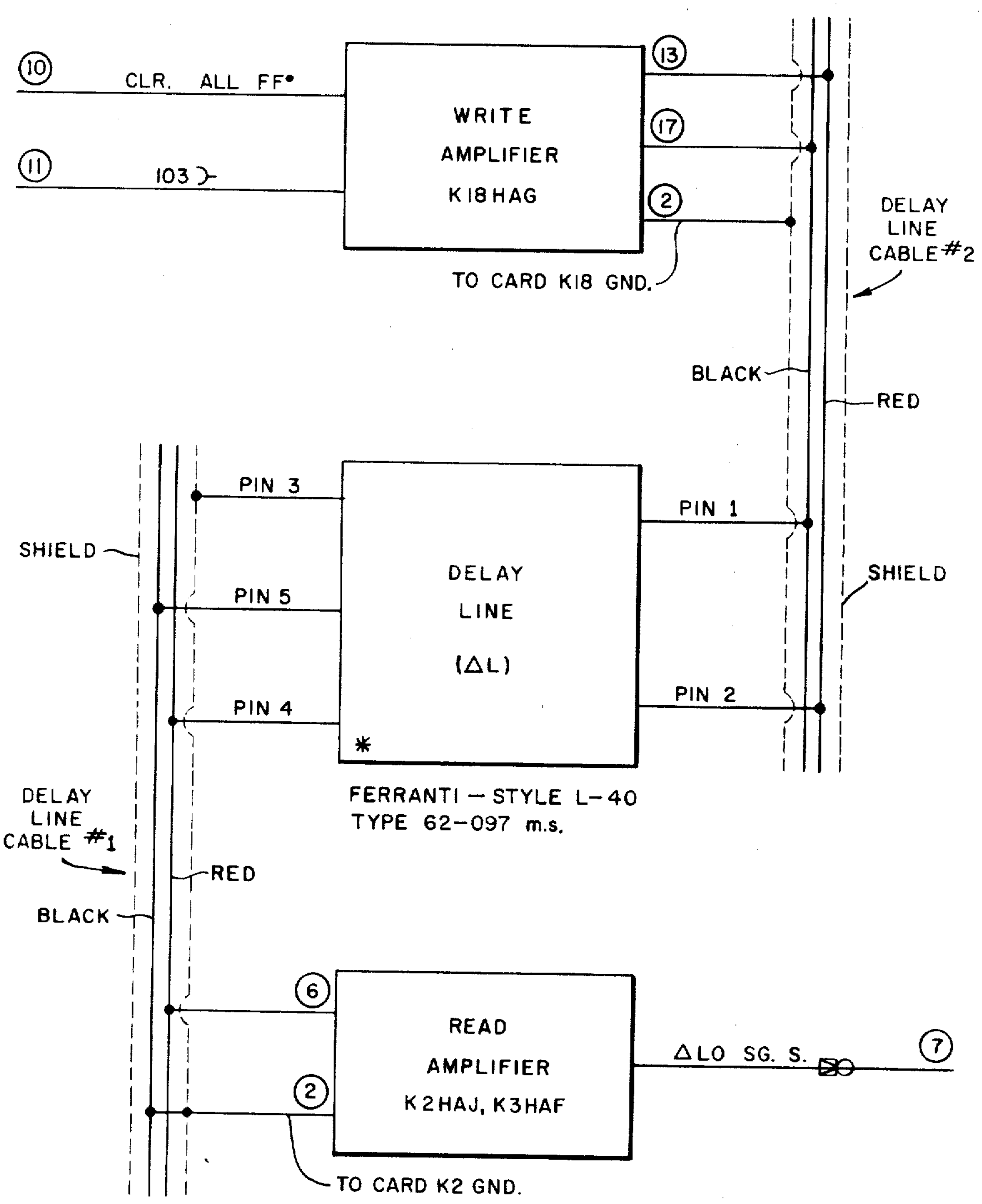
Figure 277:
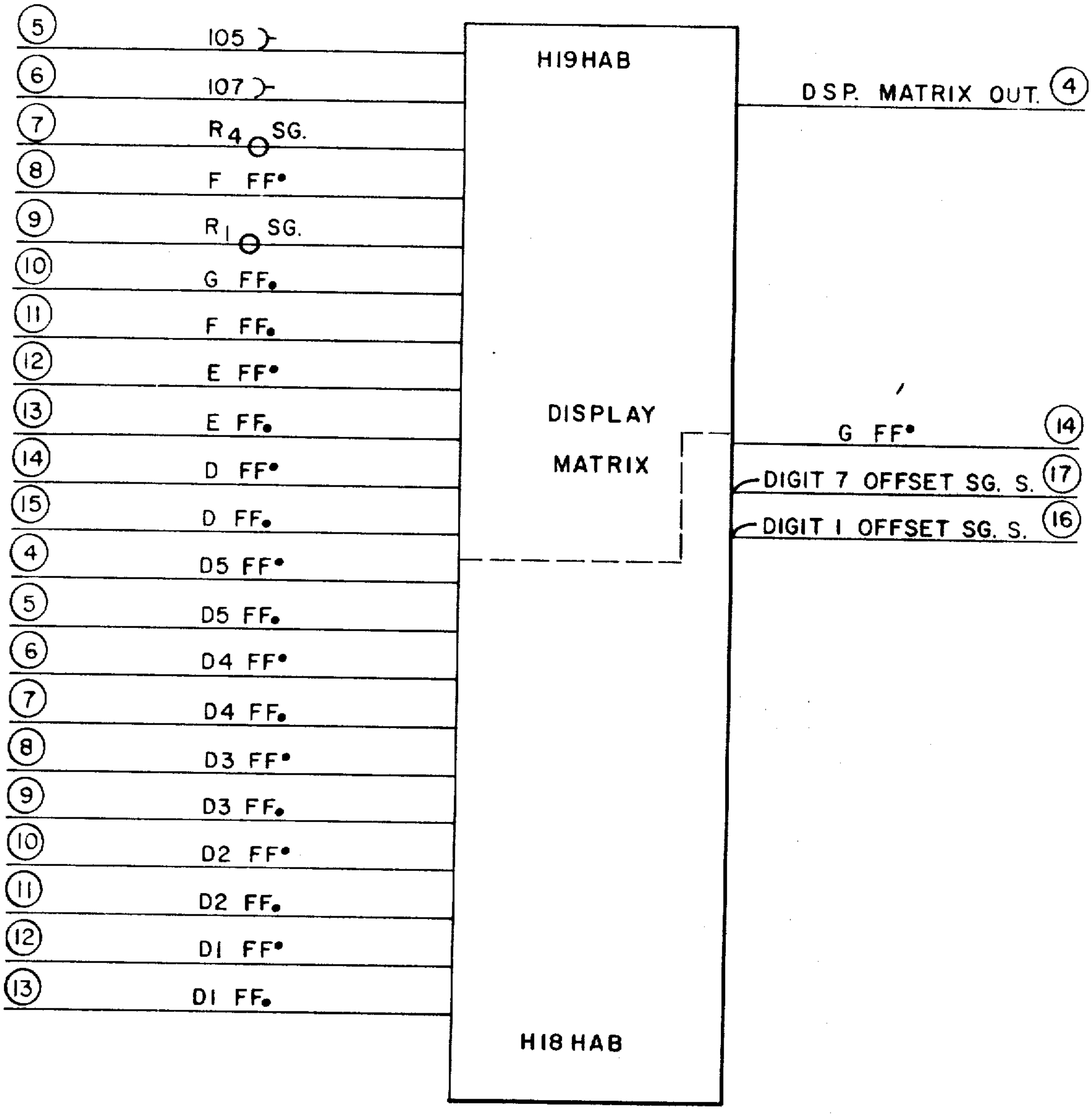

It should be noted that the mother board-delay line connections tabulated in Table CC are not referred to Note A for their grounding arrangement. Rather, the specific shield grounding arrangement for the mother board-delay line connections is illustrated in FIG. 276.

For convenience in circuit tracing, certain of the mother board connections shown in Table CC are doubly designated, i.e., the same connection is designated as running from a first pin to a second pin, and back. This double designation, or double inclusion, of an interconnection in Table CC is done as a matter of convenience, and does not imply that a double connection between these same points is structurally necessary.

14.4. The Circuit Diagram

FIGS. 225 through 294 constitute a schematic diagram of the circuit of the embodiment of the instant invention shown and described herein. The greater part of the circuit shown in FIGS. 225 through 294 is represented by block symbols defined and described hereinabove.

In order to describe completely a specific embodiment of the instant invention, as required, the interconnections between the block symbols, and specific subcircuit diagrams, of FIGS. 225 through 294 are specified by indicating the terminal (e.g., card pin, plug contact) to which the terminals of the block symbols and specific subcircuit diagrams shown therein are connected.

In addition, the card location of every block symbol, or specific subcircuit, which is located upon one of the cards in the card rack is indicated by placing the corresponding card number within, or adjacent, each block symbol, or specific subcircuit diagram.

The diagram of FIGS. 225 through 294 may be thought of, then, as a wiring diagram, by means of which one having ordinary skill in the art may reproduce the circuit of the embodiment of the instant invention shown and described herein with facility.

14.4.1 Card Numbers: Generally, the card locations of the major subcircuits are designated within their corresponding block symbols as found in the circuit diagram. Thus, the block symbol representing the Reset Signal Generator (FIG. 227) has located within it the number "C19GBQ," which is the number of the card upon which the Reset Signal Generator is located. However, some major subcircuits are located upon a plurality of cards, or only partially upon cards, while other major subcircuits are not located upon a card or cards (See Decimal Position Signal Generators I and II, FIG. 227). Thus, to determine the locations of the several parts of the major i.e., named, subcircuits whose block symbols are found in FIGS. 225 through 294, reference should be had to that portion of the text and drawings found hereinabove which serves to define these major subcircuits and their corresponding block symbols.

Figure 251:
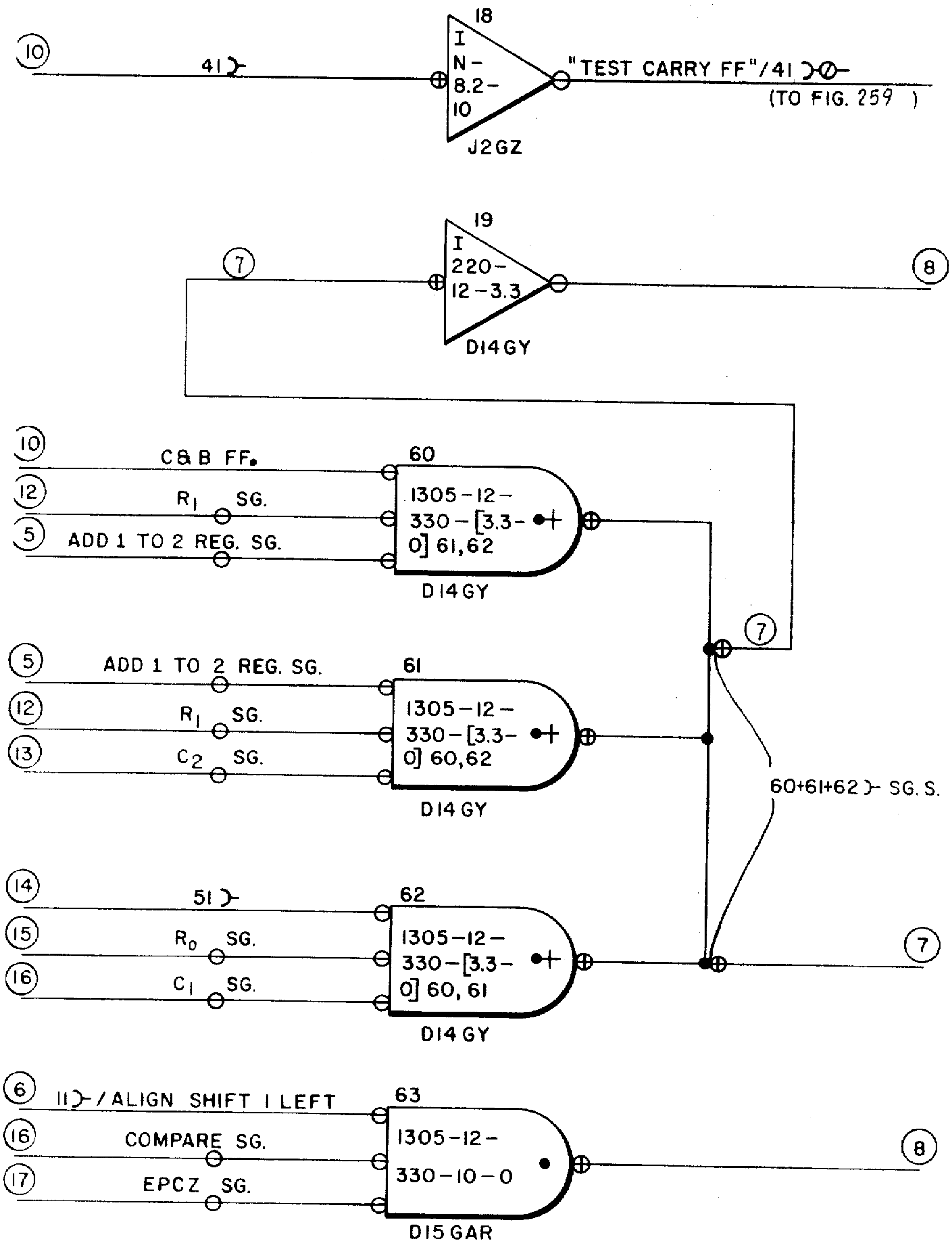
Figure 252:
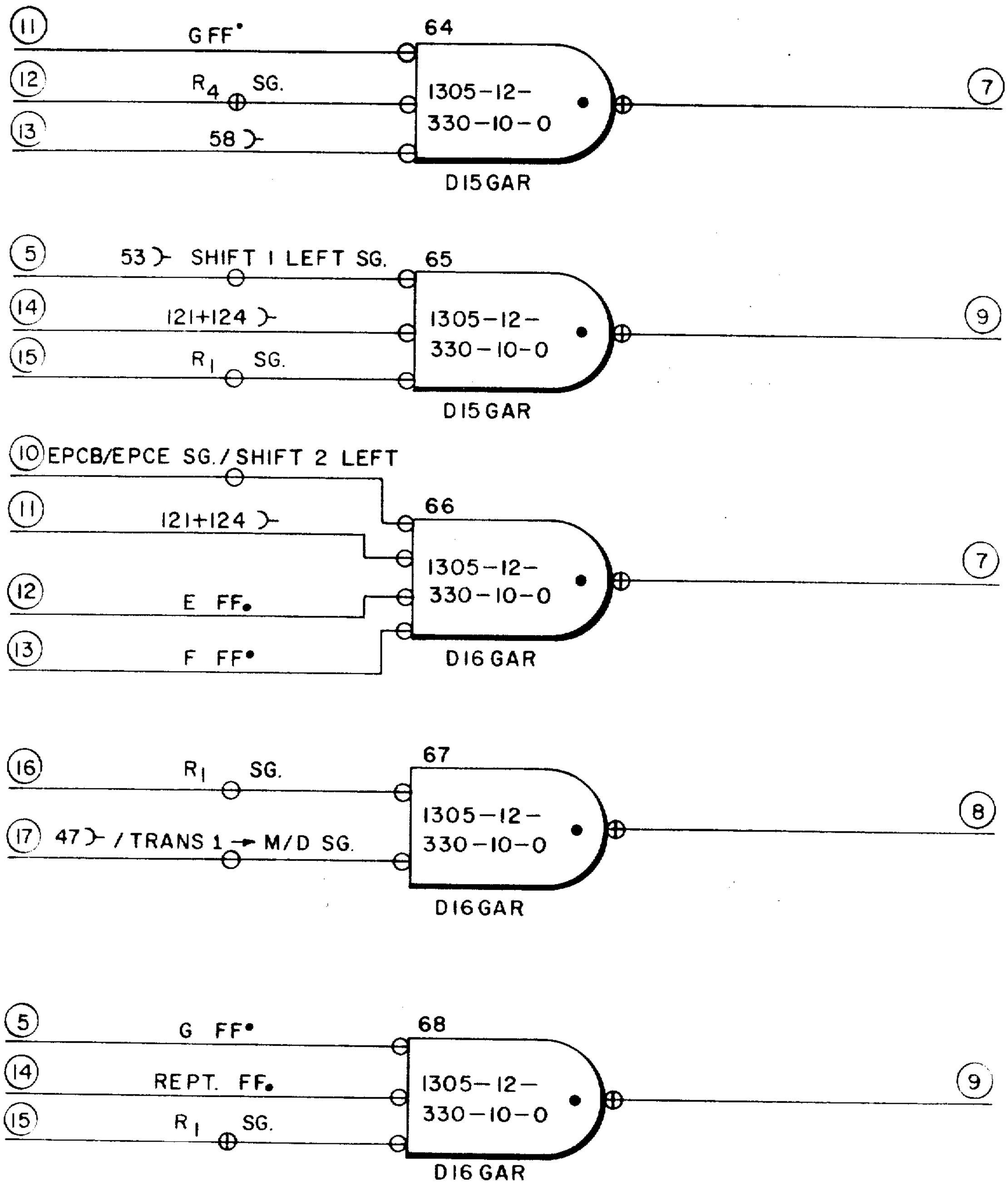
Figure 253:
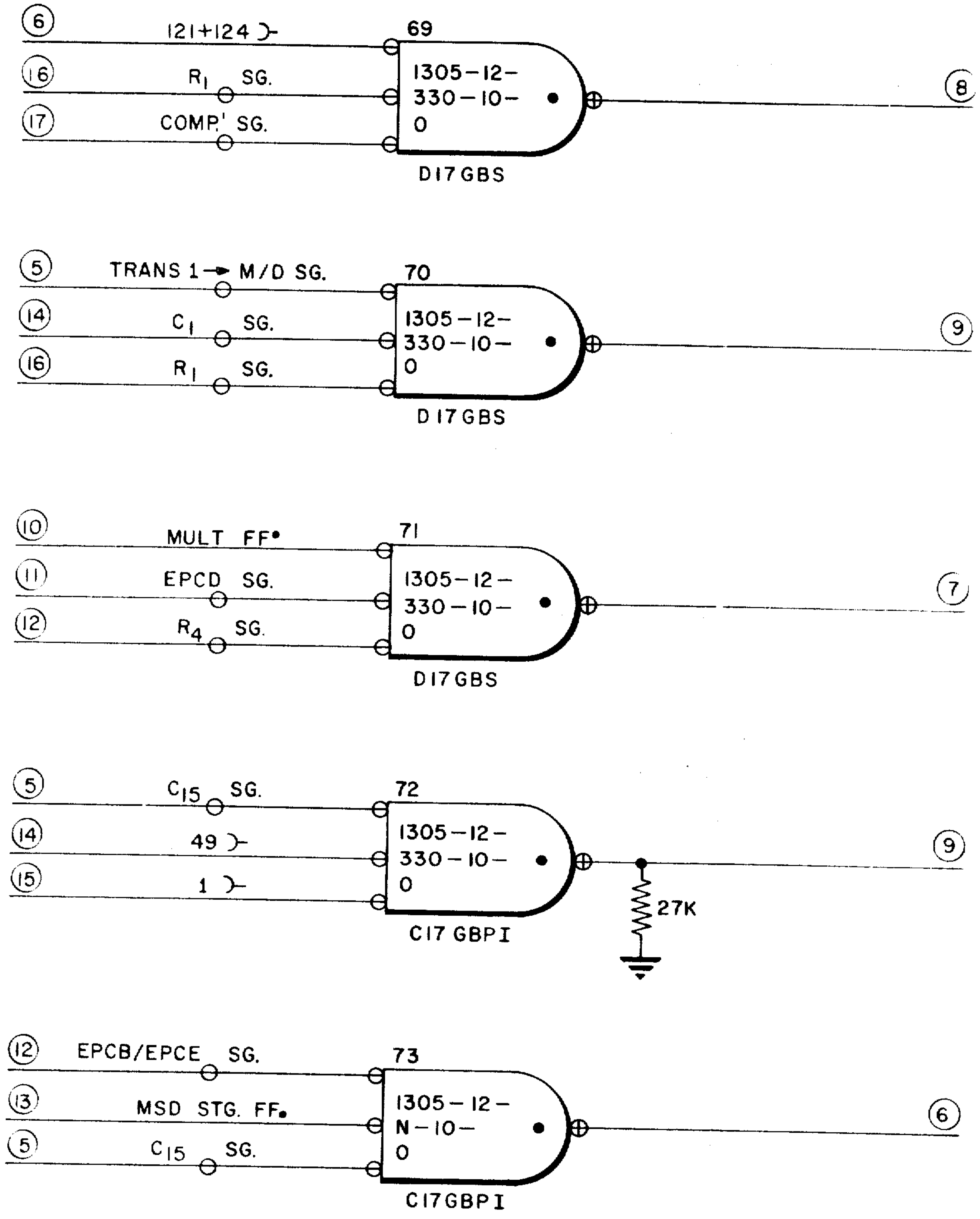

The card locations of the gates and inverters are shown in FIGS. 225 through 294 by placing the card number directly below the corresponding block symbol. For example, the legend "B4GAG" is found directly below the gate block symbol at the top of FIG. 228. This legend may be thought of as comprising two terms, viz., the card number "B4", and the card type number "GAG". The card type designation is a group of letters assigned to each basic card type having substantially the same circuit structure located thereupon. To identify the card in a particular card rack location, however, only the first term, or "card number," is needed, and the card type designation may be ignored for this purpose. Thus, it is sufficient for the present purpose to deduce from the legend "B4GAG" located beneath the outline of the inverter block symbol at the top of FIG. 228 that the inverter represented by that block symbol is located upon card B4. Similarly, the gate circuit corresponding to the block symbol found at the bottom of FIG. 244 may be seen to be located upon card B11. Also, the inverter circuit represented by the block symbol at the top of FIG. 251, may, in the same way, be seen to be located upon card J2.

Figure 246:
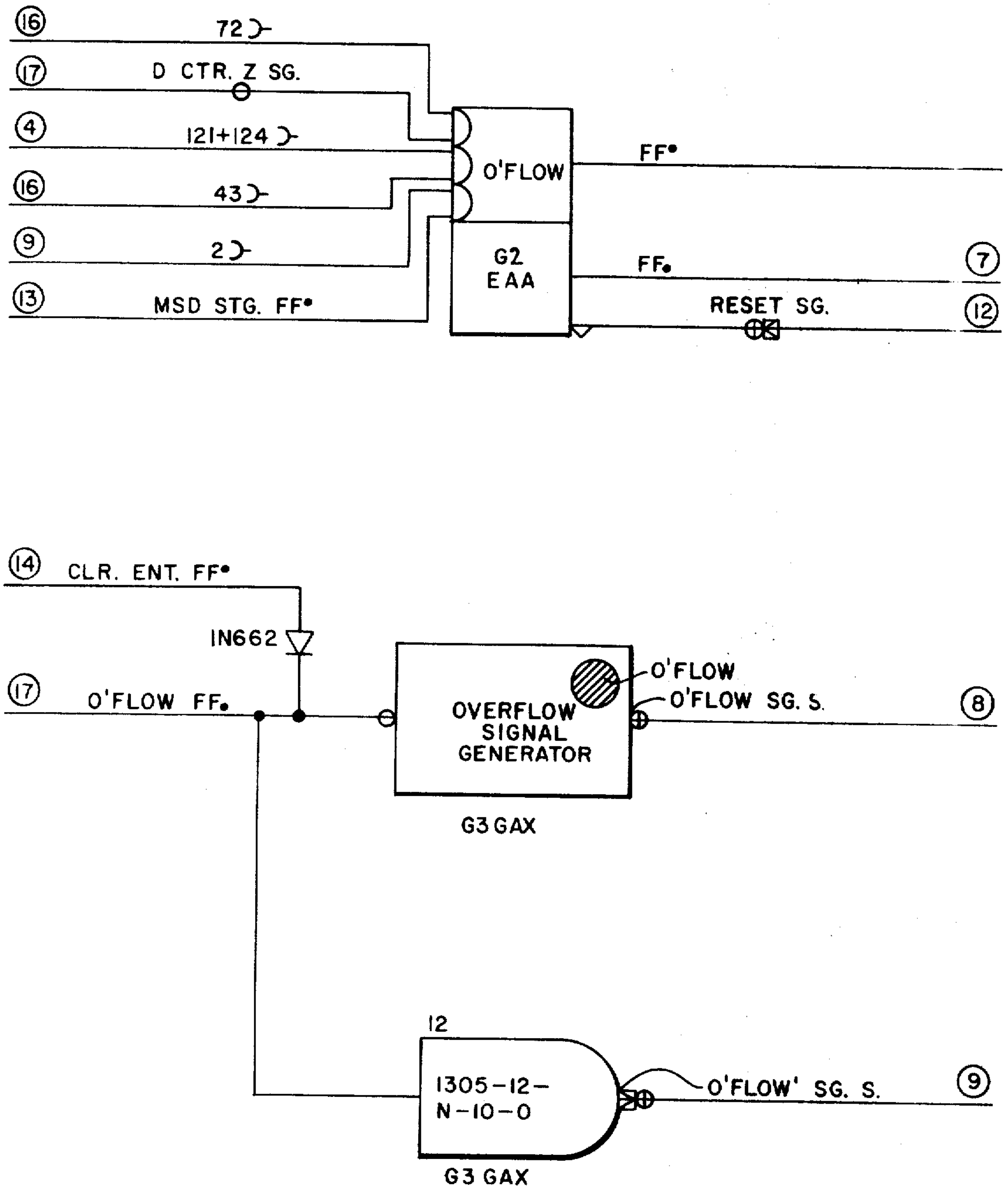
Figure 247:
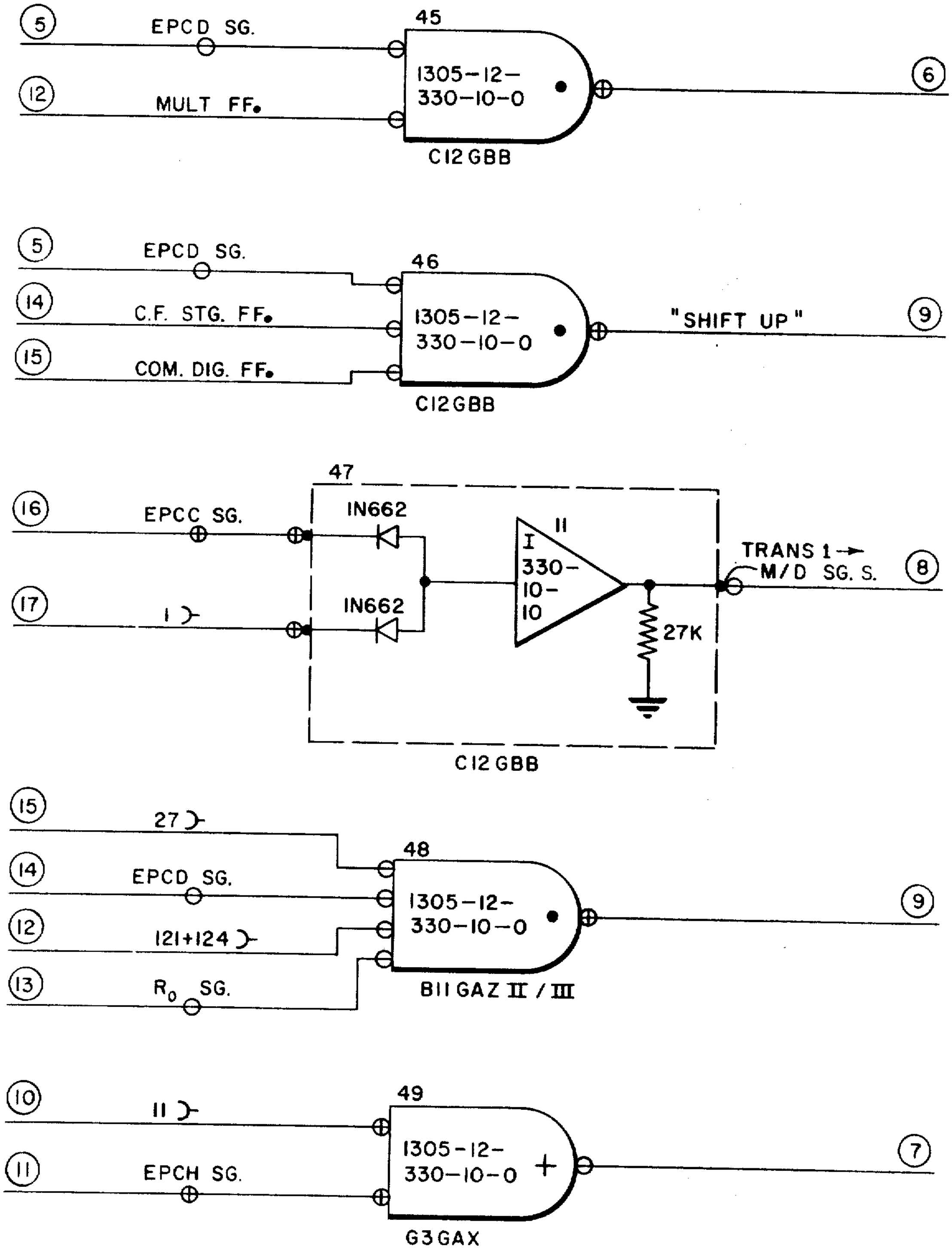
Figure 248:
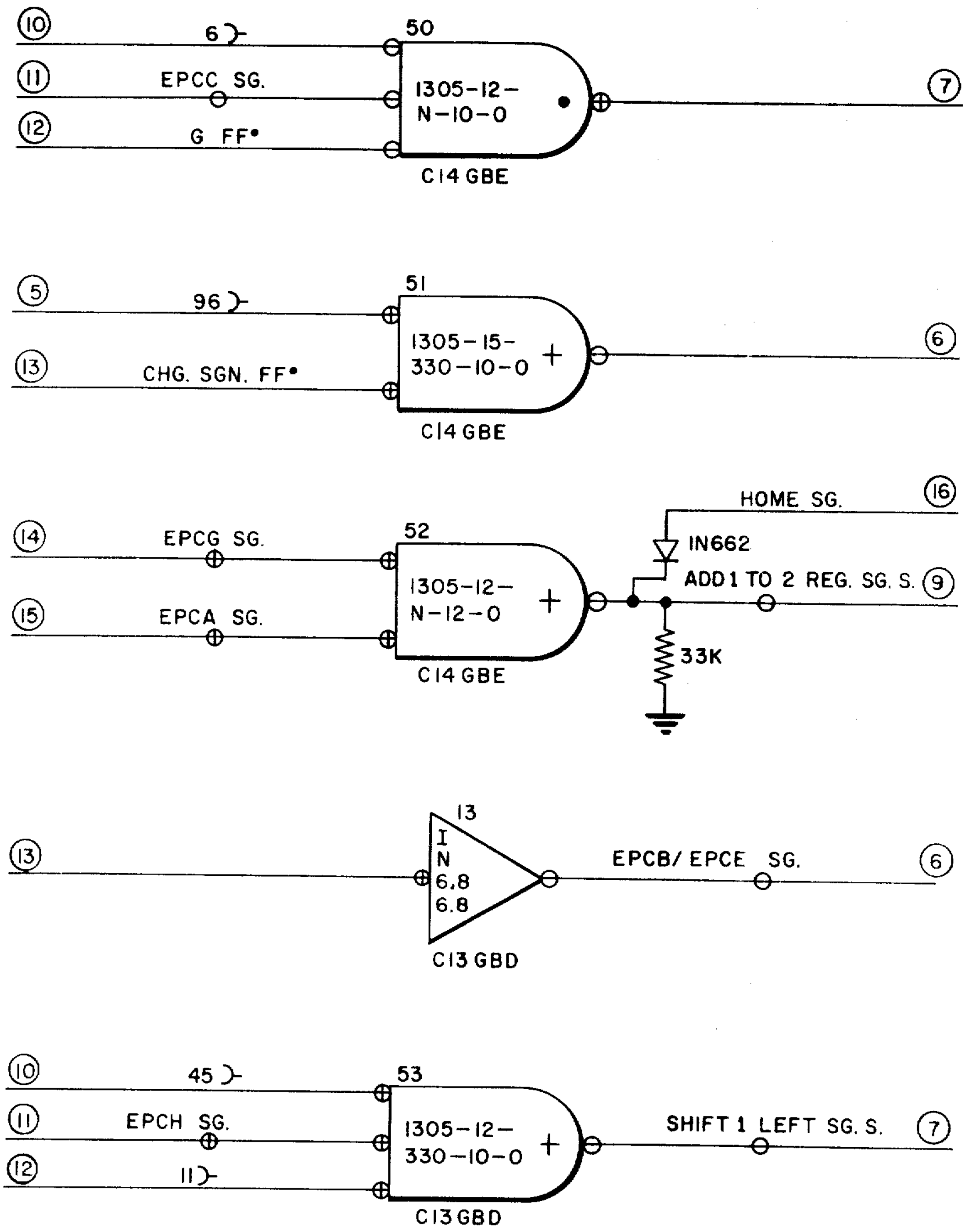
Figure 249:
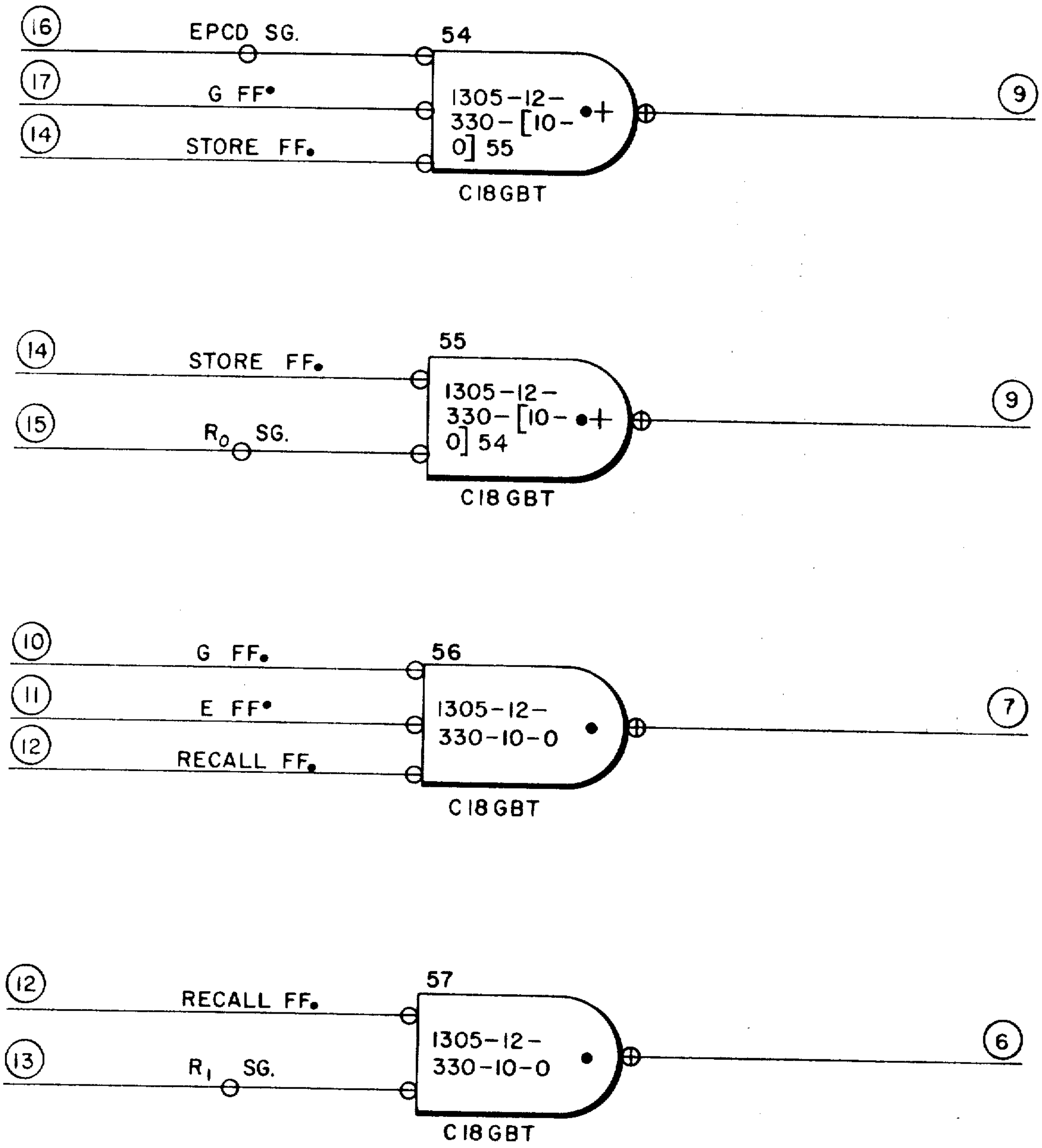
Figure 250:
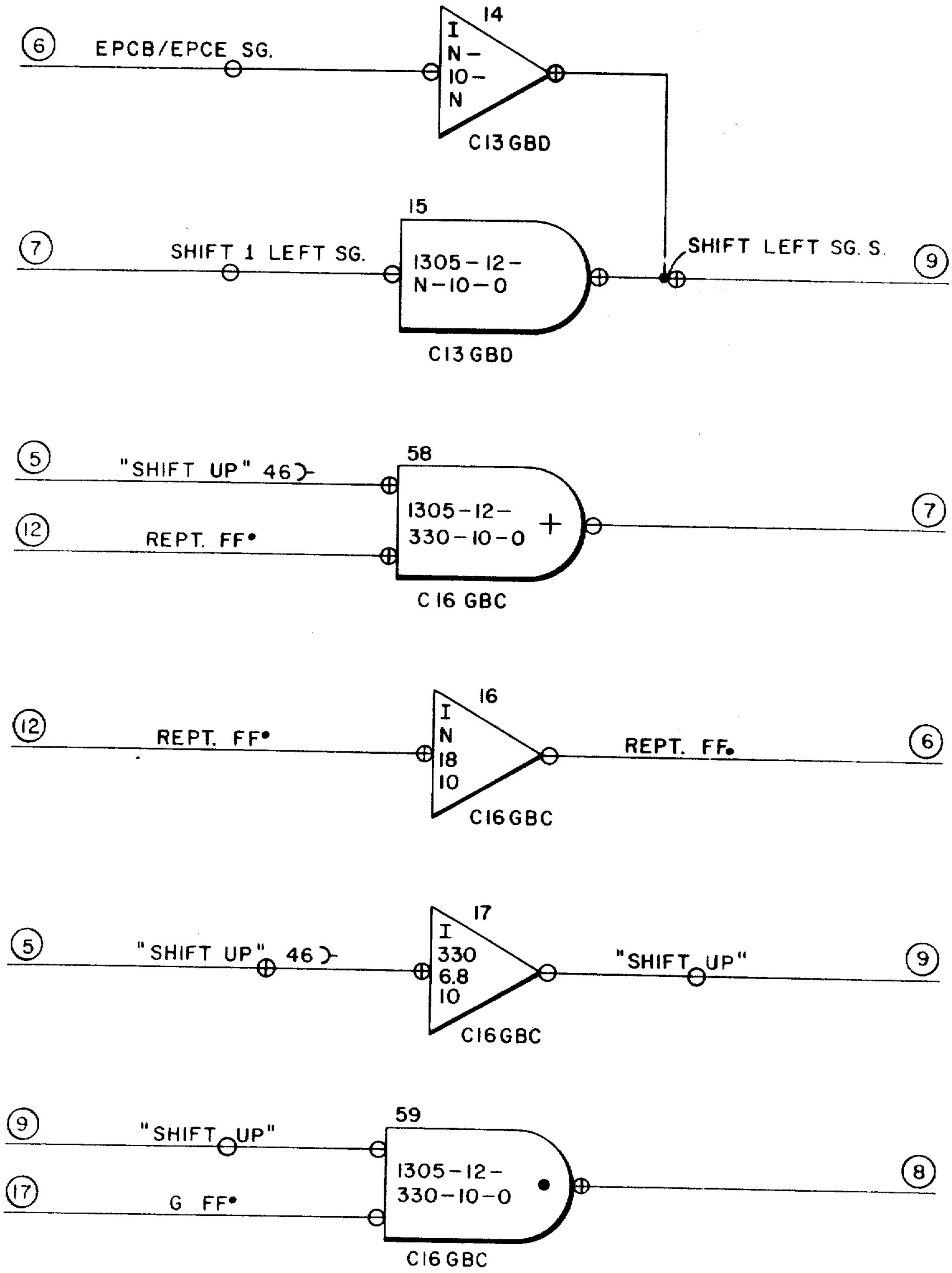

The card location of each flip-flop circuit is specified in the lower half of its corresponding block symbol as found in FIGS. 225 through 294. Thus, the legend "A3EAD" found in the bottom half of the CLR. ALL flip-flop block symbol (FIG. 228) indicates that the CLR. ALL flip-flop circuit is located upon card A3, the card type designation "EAD" being disregarded for this purpose. Similarly, the legend "G2EAA" found in the lower half of the O'FLOW flip-flop block symbol in FIG. 246 indicates that the O'FLOW flip-flop circuit is located upon card G2.

Figure 235:
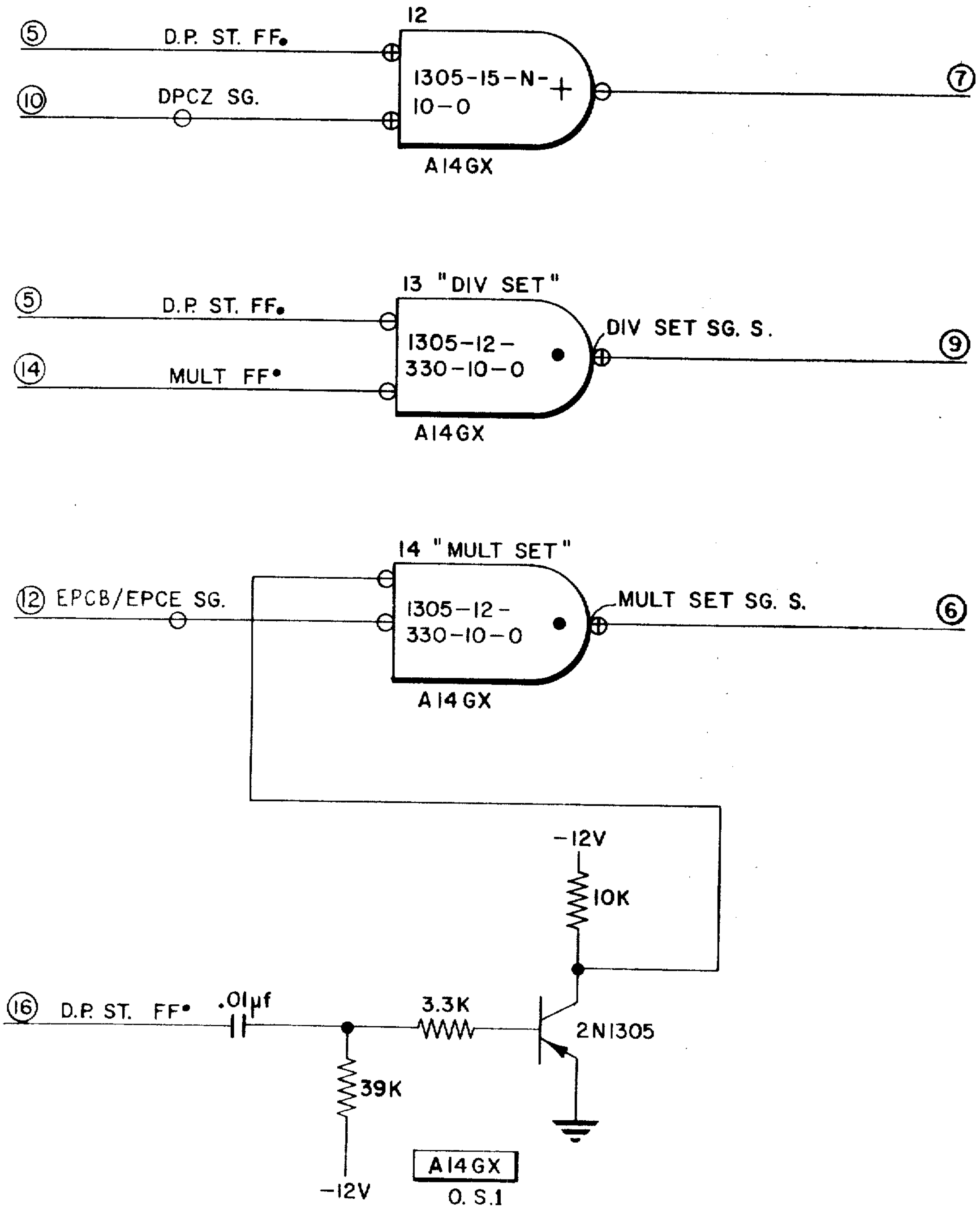

Specific subcircuits shown as wiring diagrams in FIGS. 225 through 294 have their card locations indicated within rectangles set within, or immediately adjacent, the diagram (see, for instance, the lower portion of FIG. 235). However, where confusion will not result, or location is not critical, minor specific subcircuits are located adjacent the block symbols representing the subcircuits with which they are immediately associated, and these minor subcircuits may be assumed to be located upon the same cards as the circuit represented by the block symbol to which they are directly connected (see, for instance, FIG. 239, wherein an emitter follower EF1 is seen directly connected to the output of a gate on card B15, and an additional specific network is seen directly connected to the lowest input terminal of that gate). In this example, wherein the emitter follower and the specific network are directly connected to terminals of said gate, and are not identified as being located upon specific cards, the emitter follower and the specific network may be assumed to be located upon card B15, along with said gate.

Figure 242:
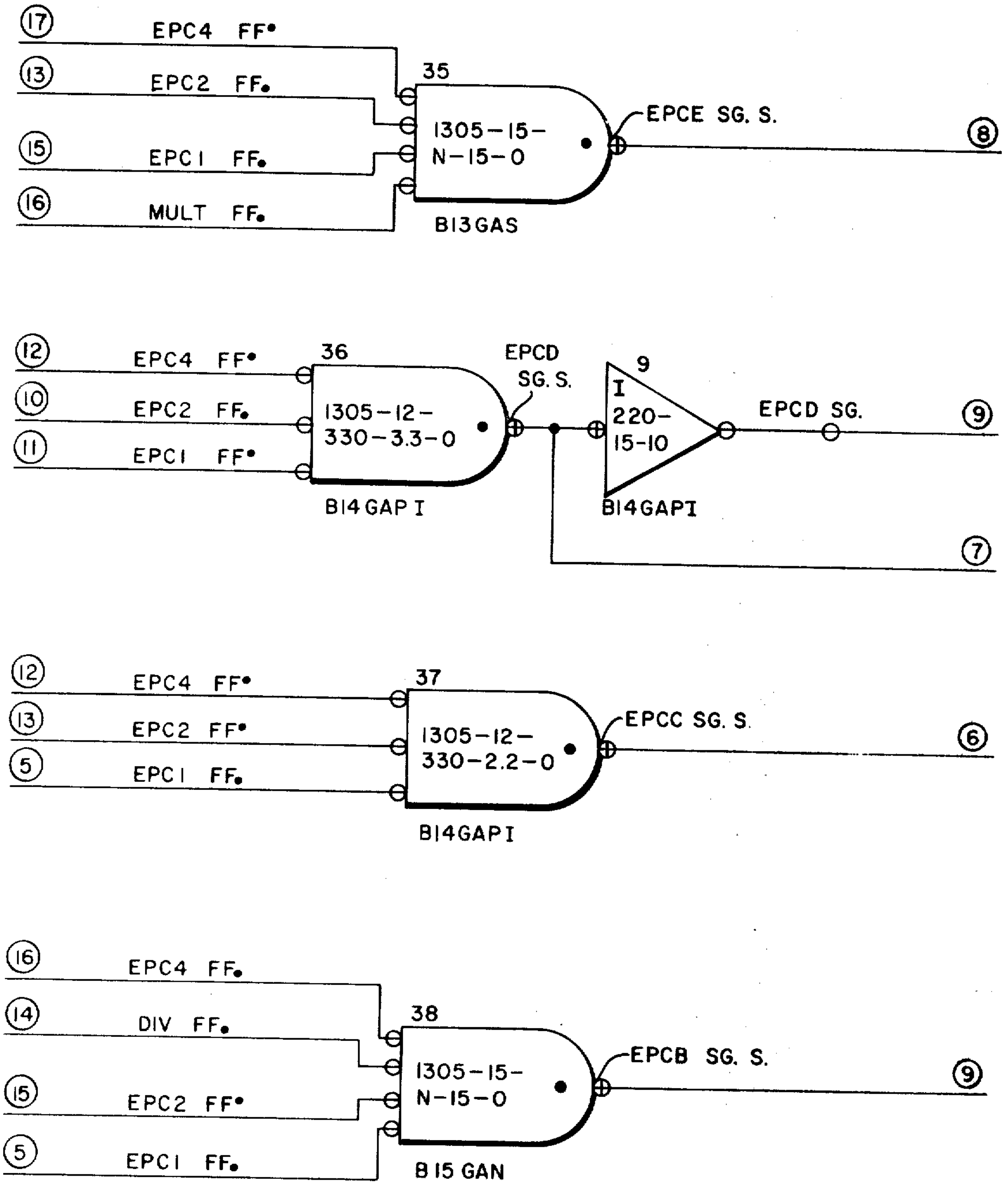

14.4.2. Gate Numbers: For convenience of reference, the gate circuits shown in the circuit diagram of FIGS. 225 through 294 have been assigned reference numbers. Generally, these reference numerals follow a series of integral numbers in order. However, at some places, a gate number may be found having, say, an "*a*" following it. This number may be assumed to follow in series immediately after the similar number not having an "*a*" appended thereto. Generally, these gate numbers run in ascending series as they appear in FIGS. having ascending numbers. The block symbol representing each of the gates in the circuit diagram has the gate reference number, or gate number, located immediately thereabove, and to the left. For example, the number "35" is found on the top edge, and at the left-hand end, of the outline of the gate symbol at the top of FIG. 242. Thus, this gate will hereinafter be called "gate 35." Similarly, the bottom gate shown in FIG. 242 will hereinafter be called "gate 38."

Figure 241:
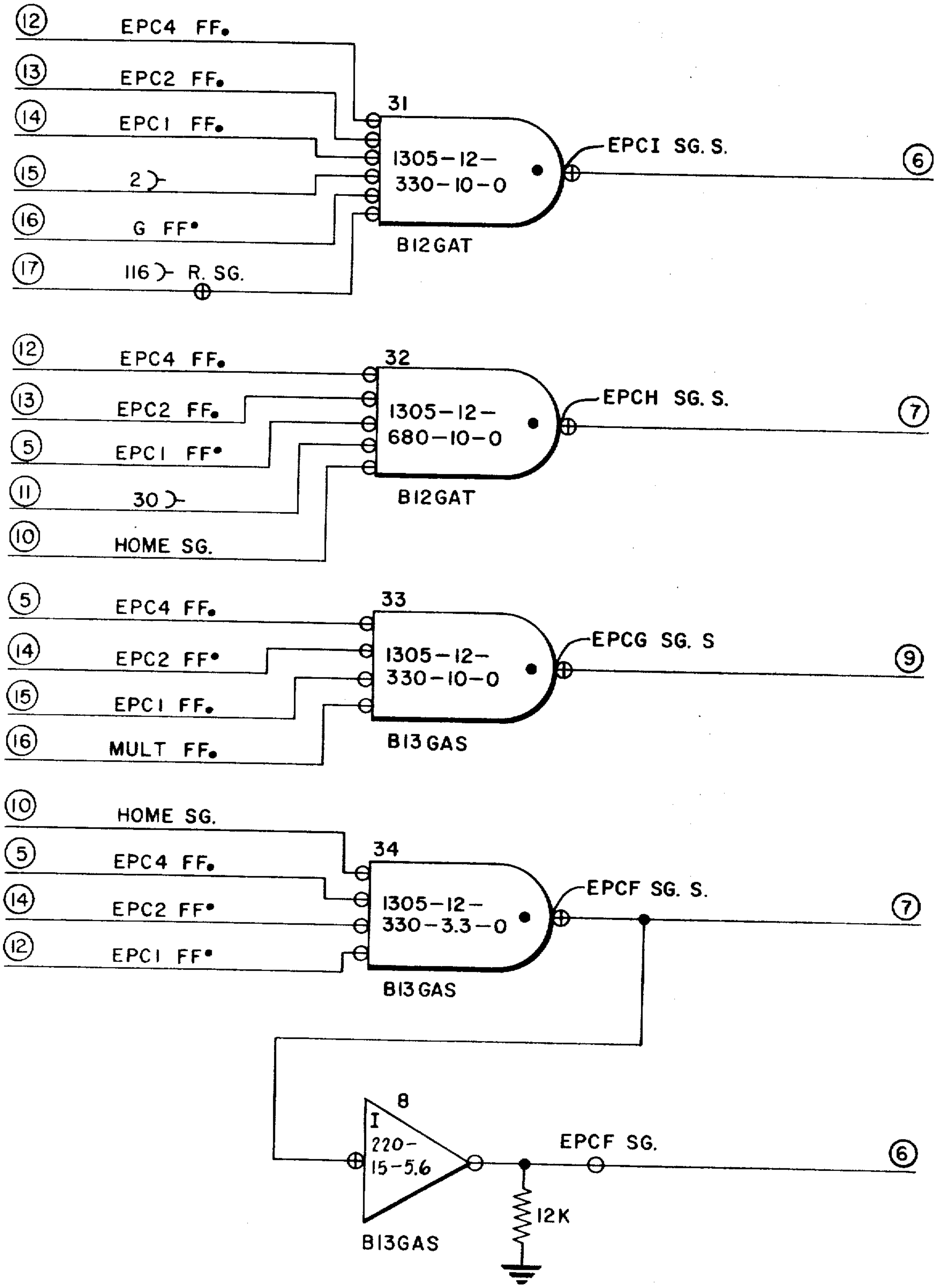

14.4.3. Inverter Numbers: A series of reference numerals similar to the reference numerals identifying the gates has been assigned to the various inverters in the circuit diagram. Thus, for example, the inverter shown at the bottom of FIG. 241 will hereinafter be called "inverter 8."

14.4.4. Pin Numbers: The terminals of the block symbols, and specific subcircuits, shown in the circuit diagram which are directly connected to pins of the cards upon which they are located are marked with the number of the corresponding card pin, this corresponding pin number being encircled. It will, of course, be understood that the encircled numbers found upon the terminals of a block symbol are the pin numbers of the card upon which the circuit corresponding to that block symbol is found. For example, the encircled "8" found upon the right-hand terminal of the gate 1 block symbol (FIG. 228) should be understood to represent pin 8 of card B4, since, as may be seen in FIG. 228, gate 1 is located upon card B4. Similarly, the left-hand terminal of gate 1 (FIG. 228) can be seen to be directly connected to pin 17 of card B4.

It will be noted that pin numbers 1, 2, and 3 are not found encircled in the circuit diagram. Reference to these pins is eliminated because, as described in connection with FIG. 317, these pins are connected to supply busses, and act as supply terminals for each card, and all points on a given card which must be supplied with one of the potentials brought out at a specific one of these busses will be connected to the corresponding pin of the groups 1, 2, and 3. Supplies may, however, be indicated, if desirable for clarity, as in the specific subcircuit at the bottom of FIG. 235.

14.4.5. Plug Numbers: Terminals of the block symbols, and specific subcircuits, shown herein which are interconnected in the actual embodiment by means of certain plug contacts will have plug contact symbols set thereupon, and the particular plug number, and contact number, employed at that point indicated adjacent the plug contact symbol.

In rare instances throughout the circuit diagram, certain terminals of block symbols, or specific subcircuits, will have neither pin numbers nor plug numbers located thereat. These special cases represent direct, foil interconnections between subcircuits upon the same circuit board. Generally, such terminals will be accompanied by a legend indicating the figure to which the lead attached to that terminal runs.

Figure 226:
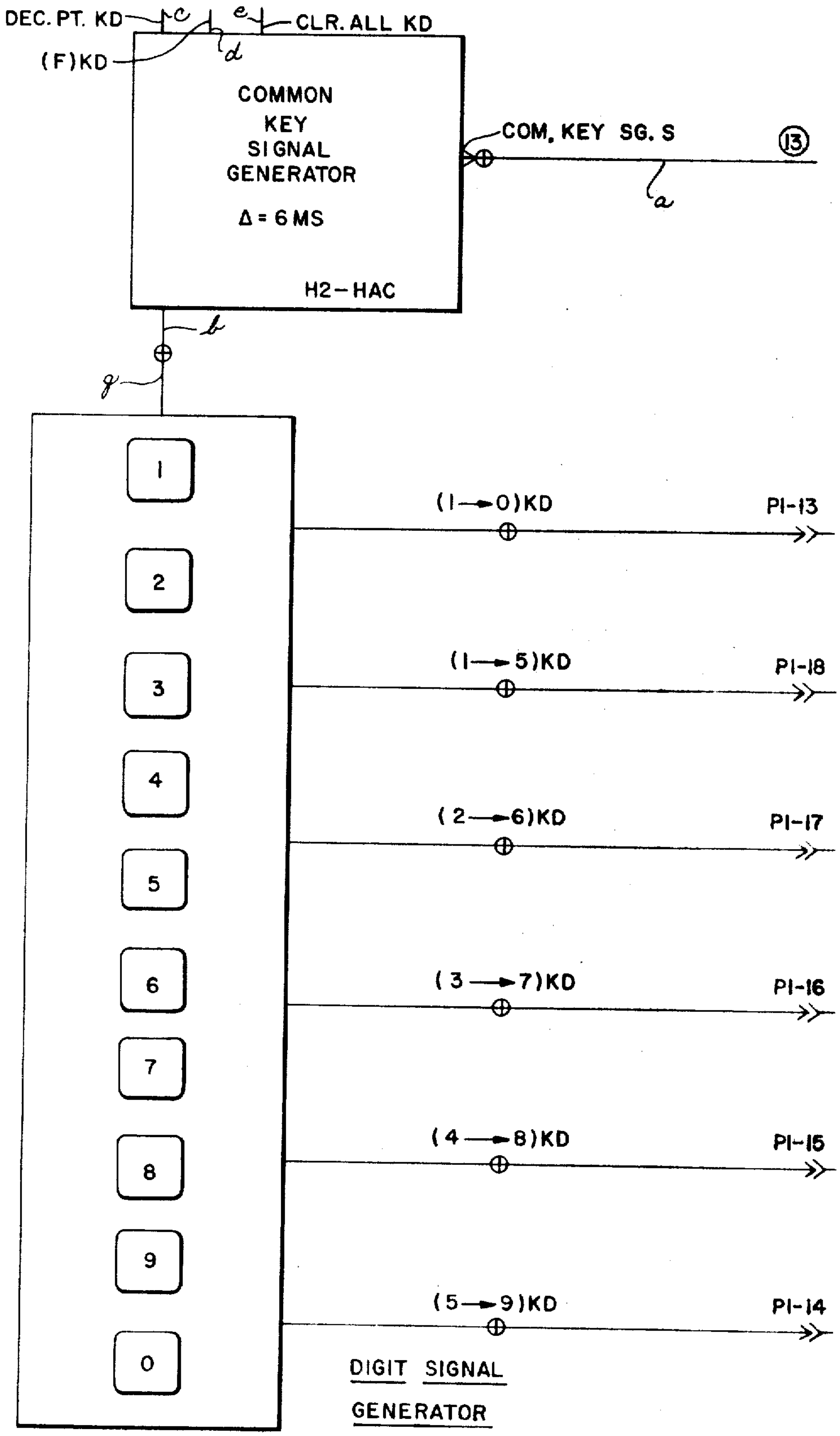
Figure 222:
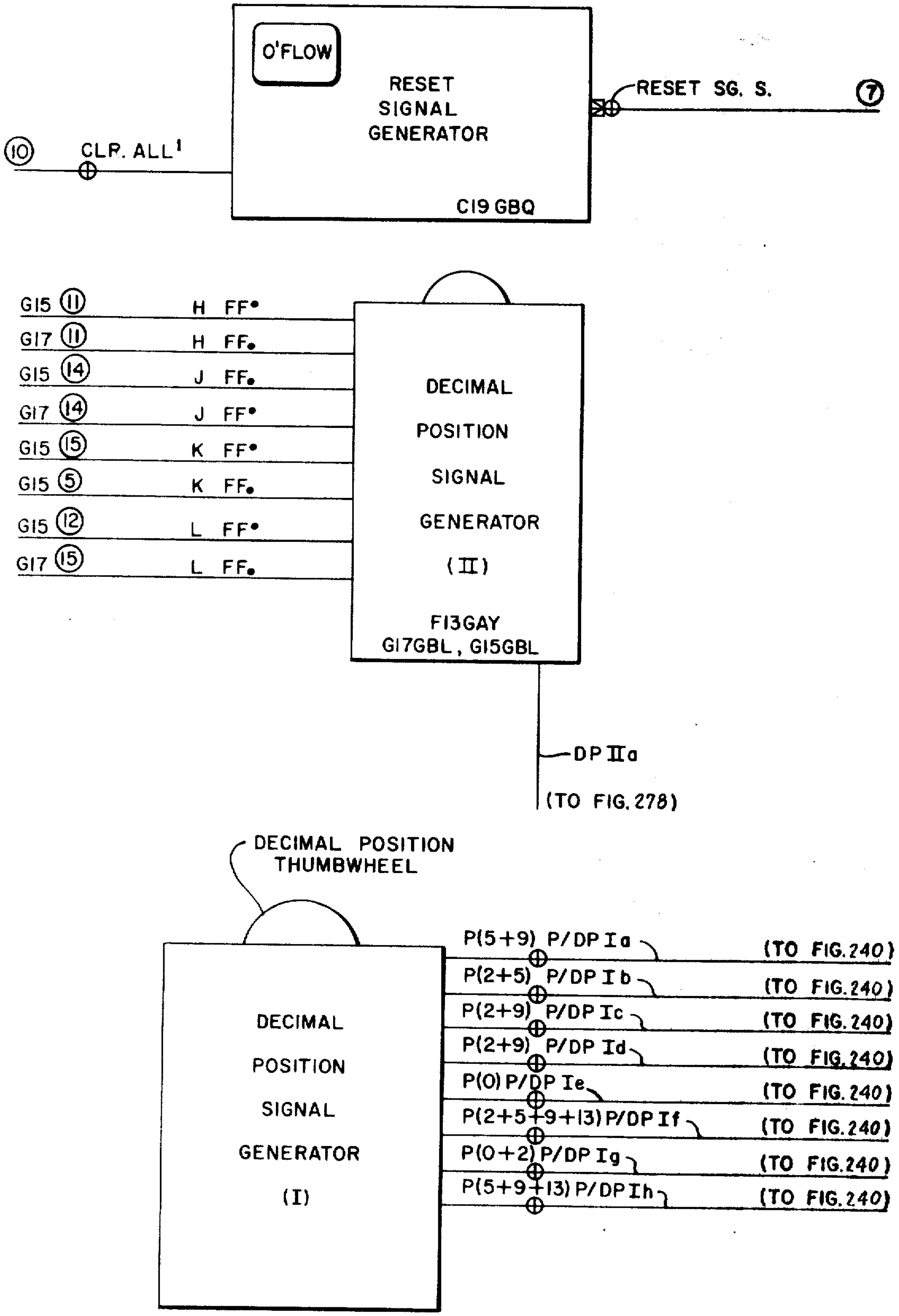
Figure 22B:
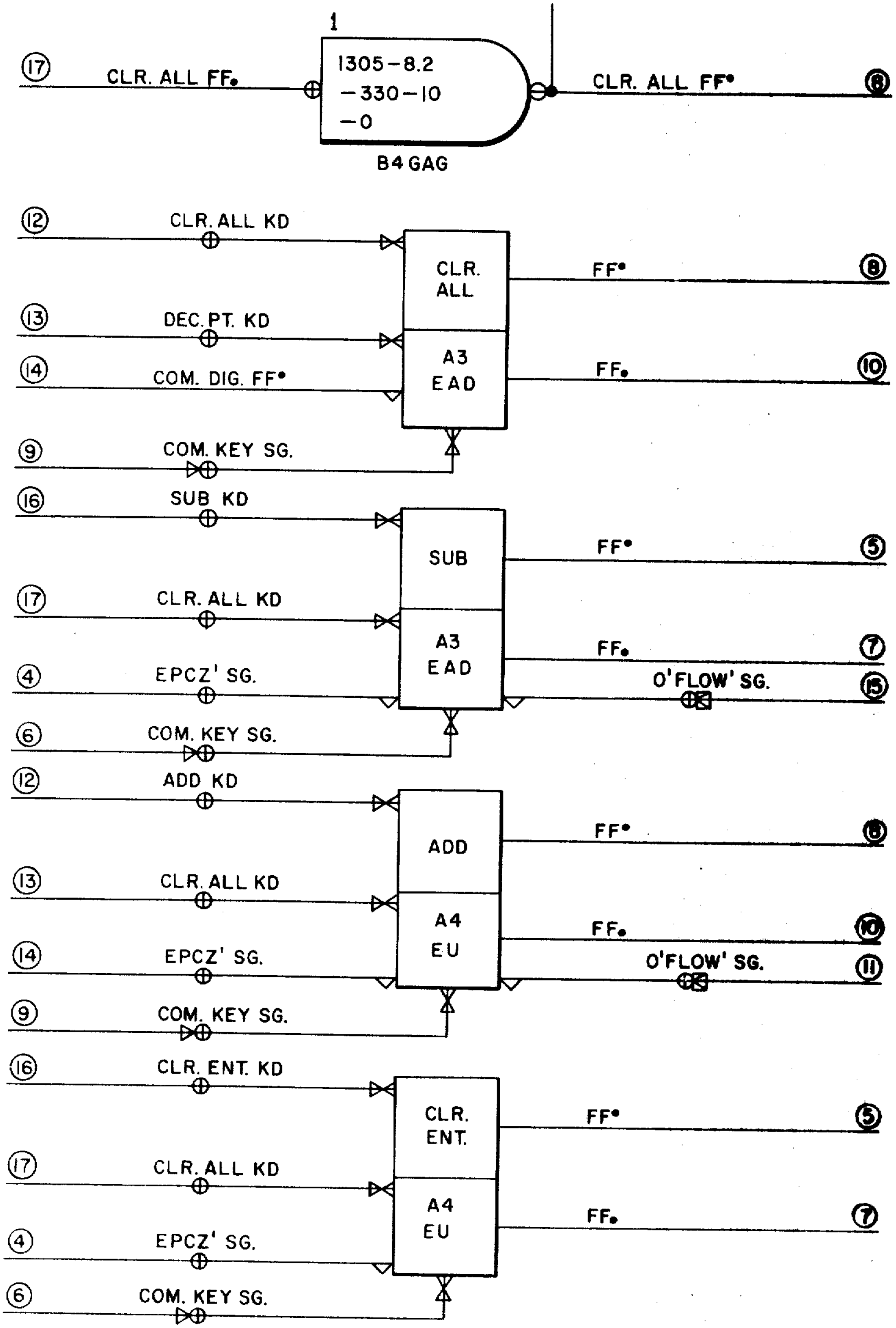
Figure 229:
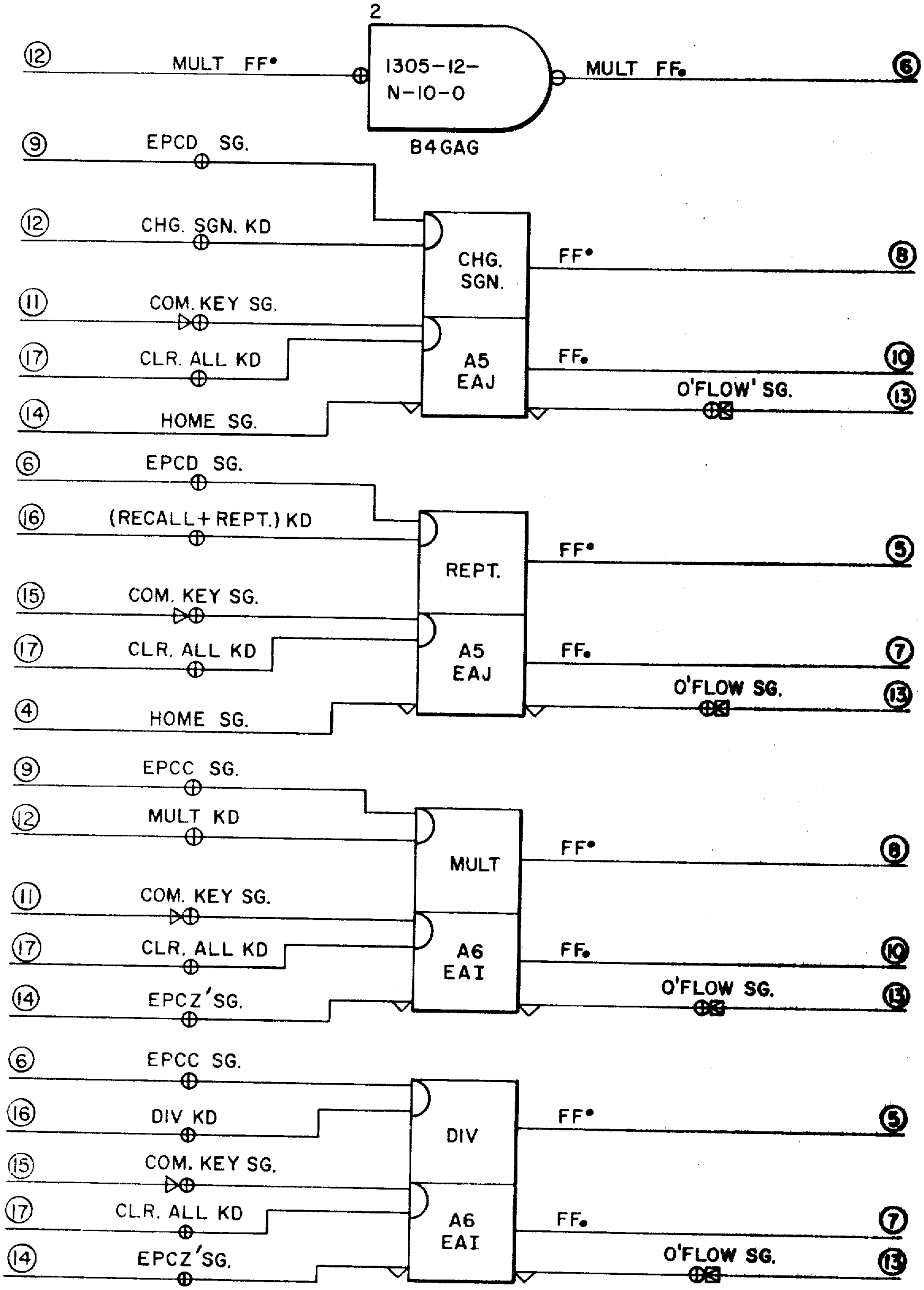
Figure 230:
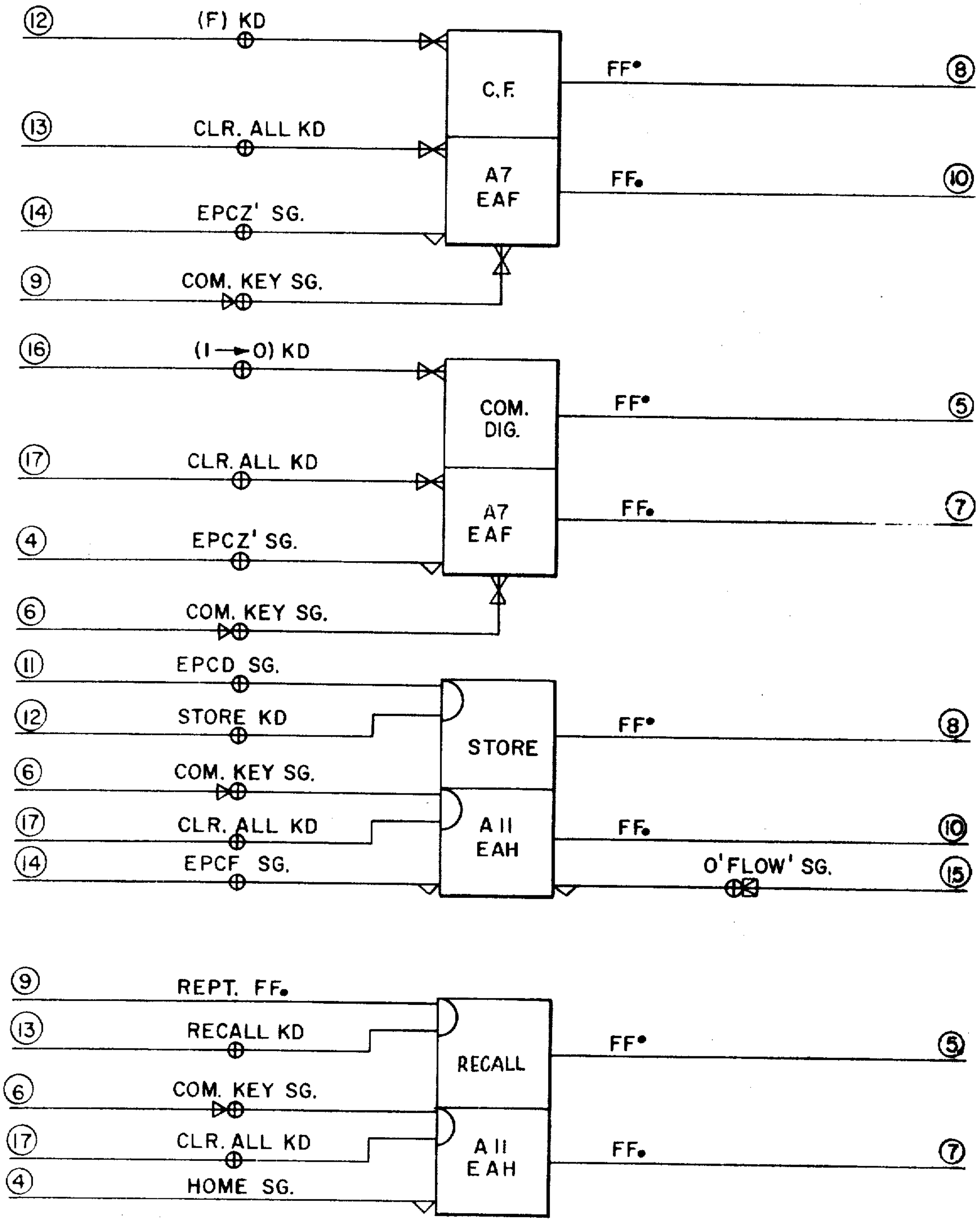
Figure 231:
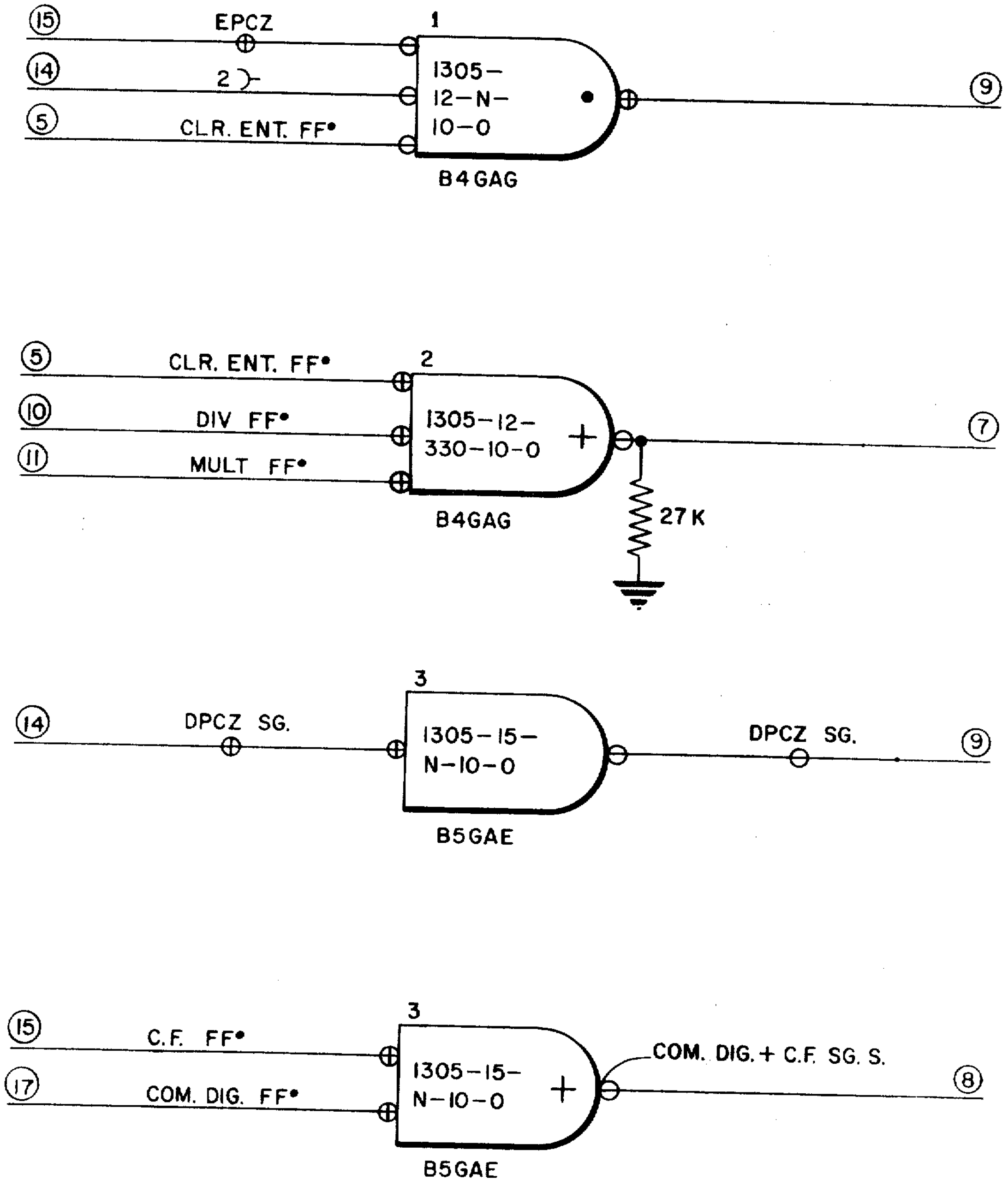
Figure 232:
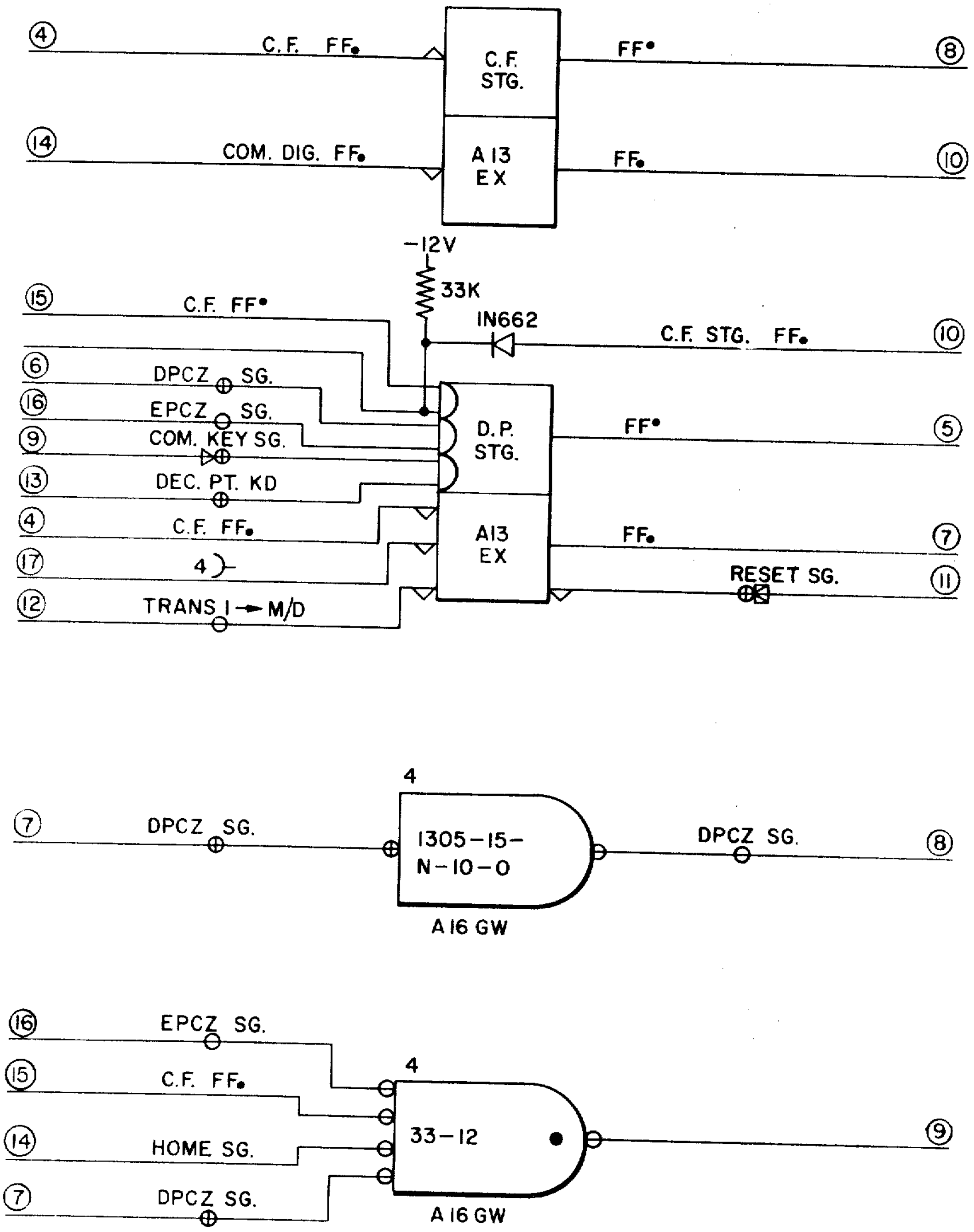

For example, the three leads *m, n, o* of the Function Signal Generator shown in FIG. 225 have associated therewith a legend directing the reader to FIG. 226. On FIG. 226 it will be found that the *c, d*, and *e* terminals of the Common Key Signal Generator correspond to the *m, n*, and *o* terminals of the Function Signal Generator, since corresponding ones of these sets of leads carry like assertion legends. Thus, it may be seen from FIGS. 225 and 226 that the *o* terminal of the Function Signal Generator is directly connected to the *c* terminal of the Common Key Signal Generator, the *n* terminal of the Function Signal Generator is directly connected to the *d* terminal of the Common Key Signal Generator, and the *m* terminal of the Function Signal Generator is directly connected to the *e* terminal of the Common Key Signal Generator.

The direct connection between the *b* terminal of the Common Key Signal Generator and the *g* terminal of the Digit Signal Generator is, of course, obvious since the two major subcircuits are contained in the same figure. Similarly, the DPII*a* terminal of the Decimal Position Signal Generator (II) (FIG. 227) may be seen to be directly connected to the upper input terminal of gate 107 (FIG. 278) since a legend adjacent each terminal refers to the sheet containing the other, and the same legend "DPII*a*" is found upon a terminal in FIG. 227, and also upon terminal *a* in FIG. 278.

Similarly, the DPI*a* terminal of the Decimal Position Signal Generator (I) of FIG. 227 may be seen to be directly connected to the D.C. input of the lower independent gate of the DPC8 flip-flop.

Figure 236:
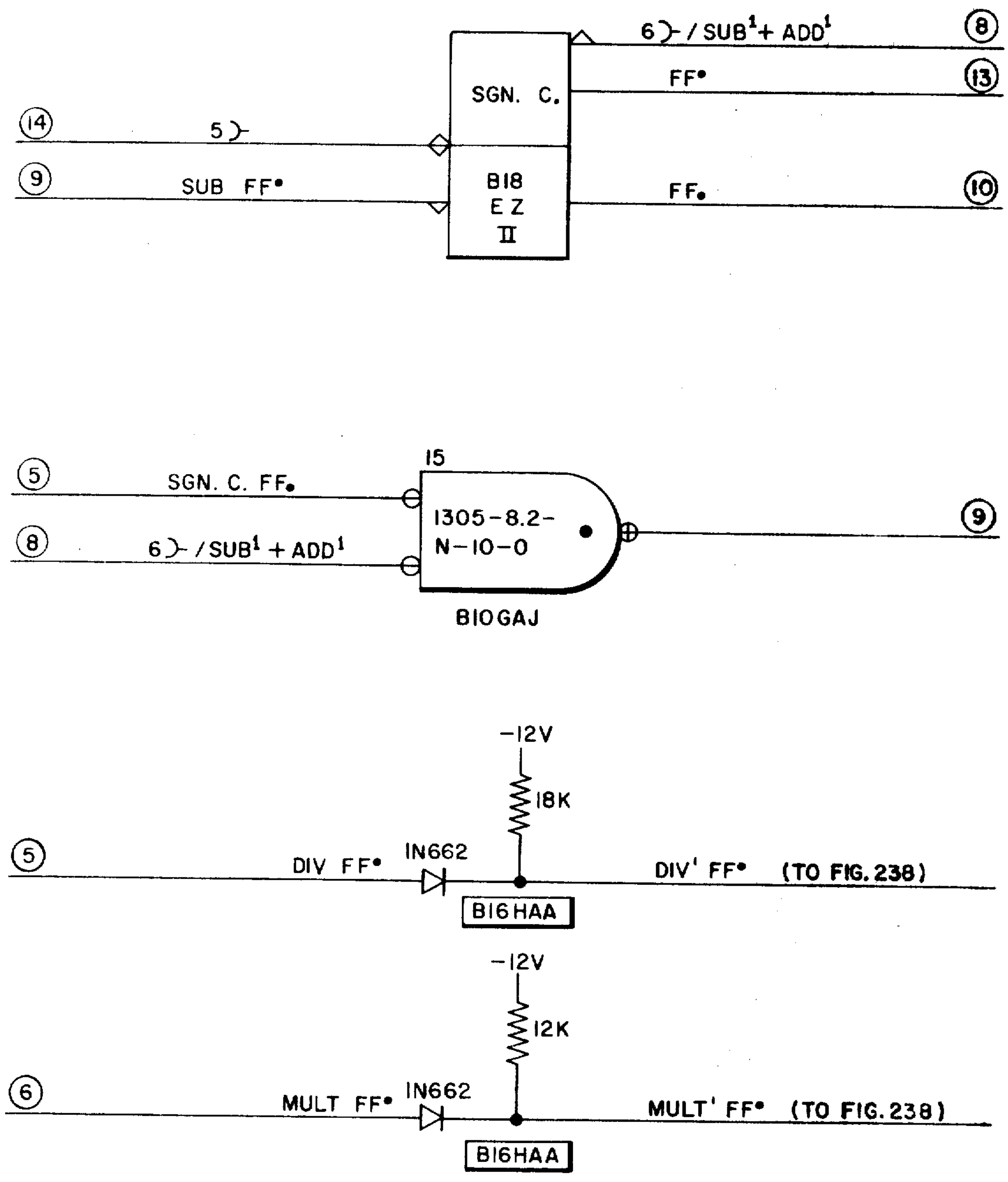
Figure 238:
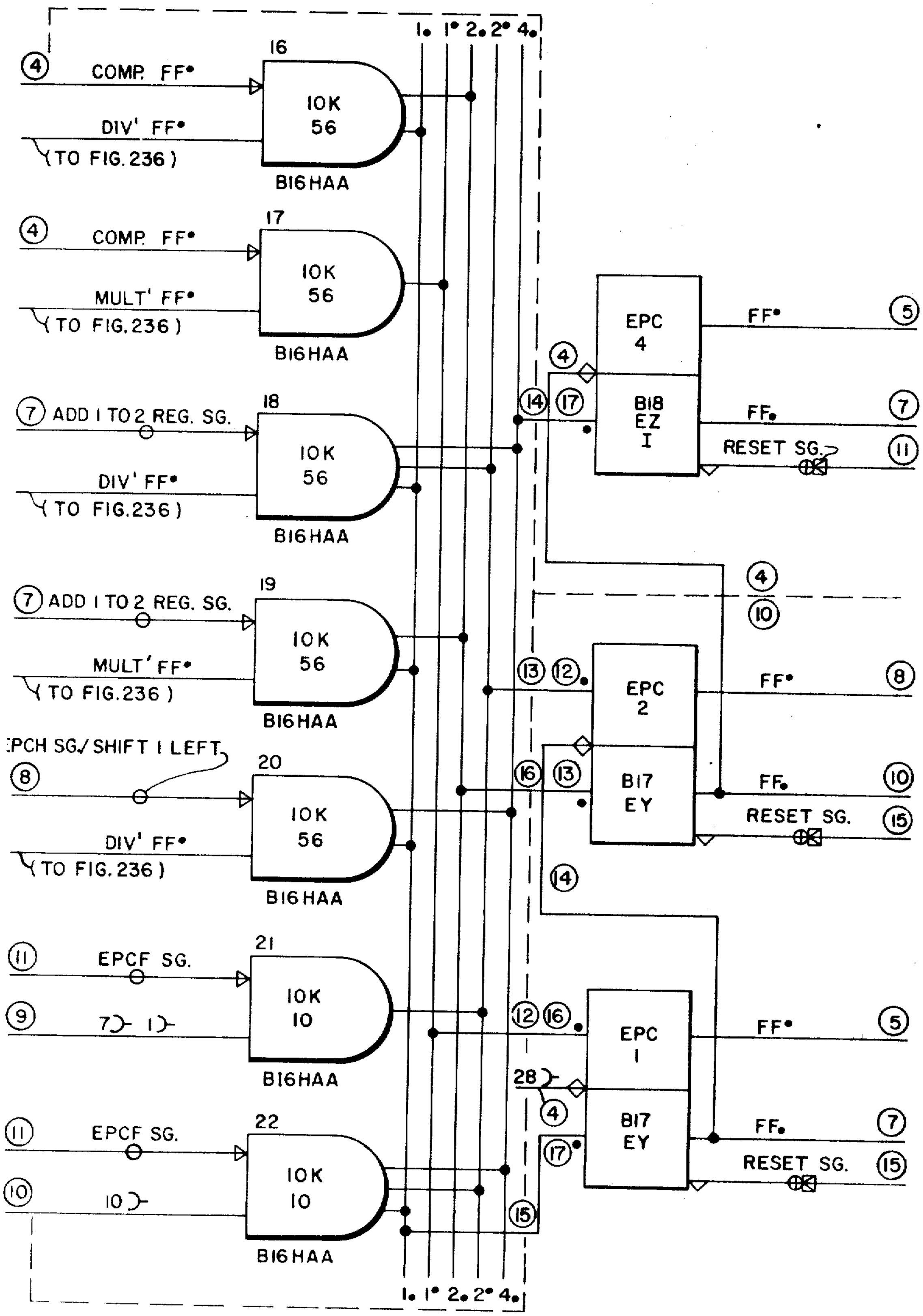

The interconnection of the outputs of the noise-bucking network shown in the lower half of FIG. 236 with the dynamic gates of FIG. 238 may be understood by similar construction.

FIG. 238 shows an example of the expedient employed when subcircuits from a plurality of cards are found in the same drawing. In that case, a dashed line is substantially perpendicularly intersected with the lead passing from one card to the other, and, where convenient the pin numbers through which this interconnection passes are written, encircled, on the corresponding sides of the dashed line. Thus, the EPC2 and EPC4 flip-flops are shown in FIG. 238 to be interconnected by a complementing line which is connected through pin 10 of card B17 and pin 4 of card B18. A further example of this practice may be found in FIG. 245, wherein gate 42 is located on card G1 and the MSD STG. flip-flop is located upon card G2. The connection between the output of gate 42 and the A.C. input of the upper independent gate of the MSD STG. flip-flop is shown, by the horizontal dashed line in the right-hand portion of FIG. 245 and its associated encircled numerals, to pass through pin 7 of card G1 and also through pin 11 of card G2.

Figure 292:
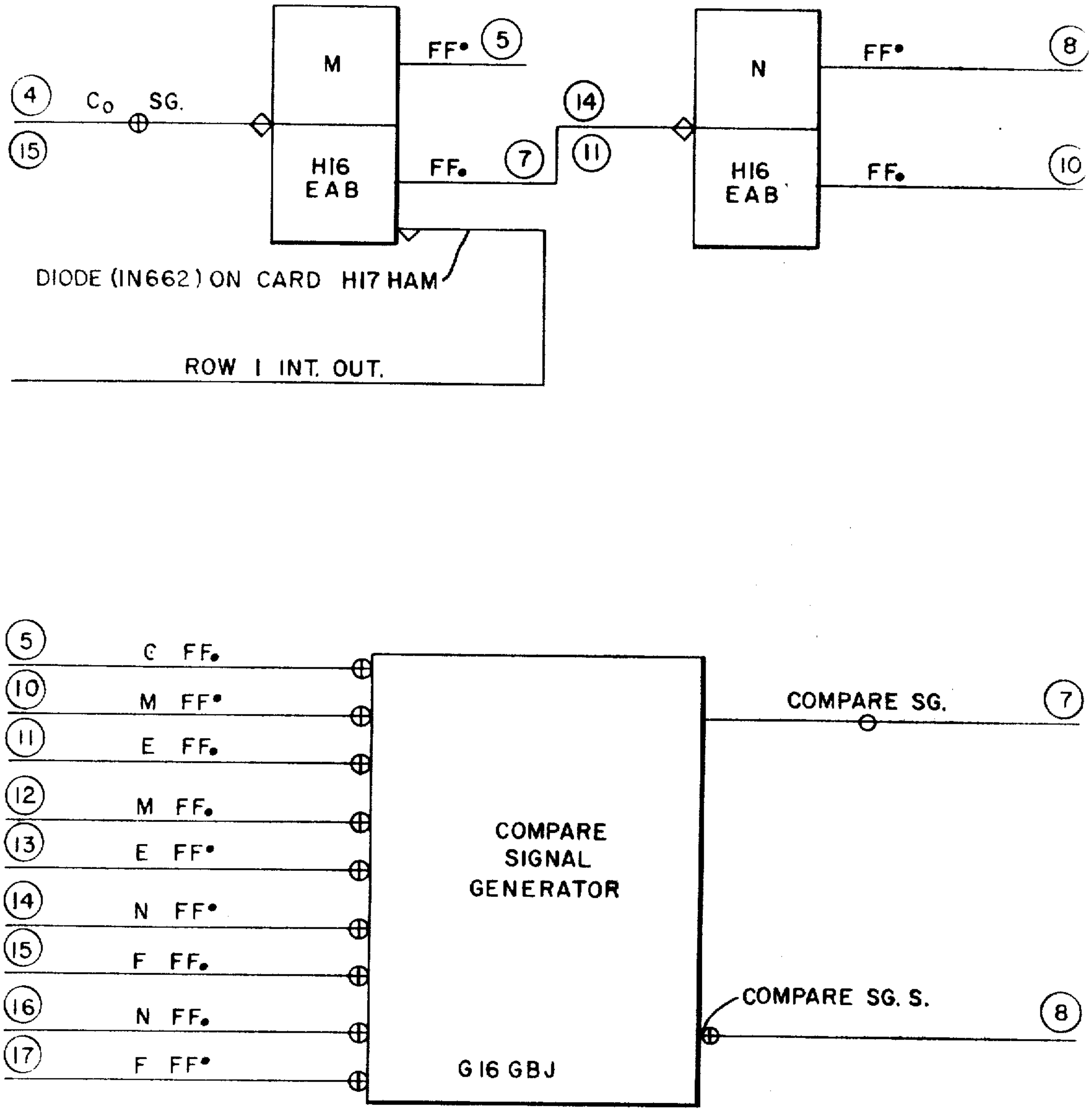

As indicated by the note in FIG. 292, the diode comprised in the right reset input of the M flip-flop is located on card H17, rather than card H16 with the M flip-flop.

15. SIMPLIFIED BLOCK DIAGRAM

FIG. 372 is a block diagram of the preferred embodiment which shows the basic units of FIG. 343, described above, in more detailed form. In FIG. 372, the six basic units are indicated by broken rectangles, while the major components included in each basic unit are indicated by solid rectangles. Interconnections between the various components and units are generally indicated in FIG. 372 by solid arrowed lines. The actual structure and specific interconnections of the components can be ascertained by reference to the sections and figures indicated below. In the ensuing description, those referenced figures which comprise portions of the logic diagram (Section 16.1) are enclosed in parentheses, while those figures which comprise portions of the more detailed circuit diagram (Section 15.4) are not.

Figure 297:
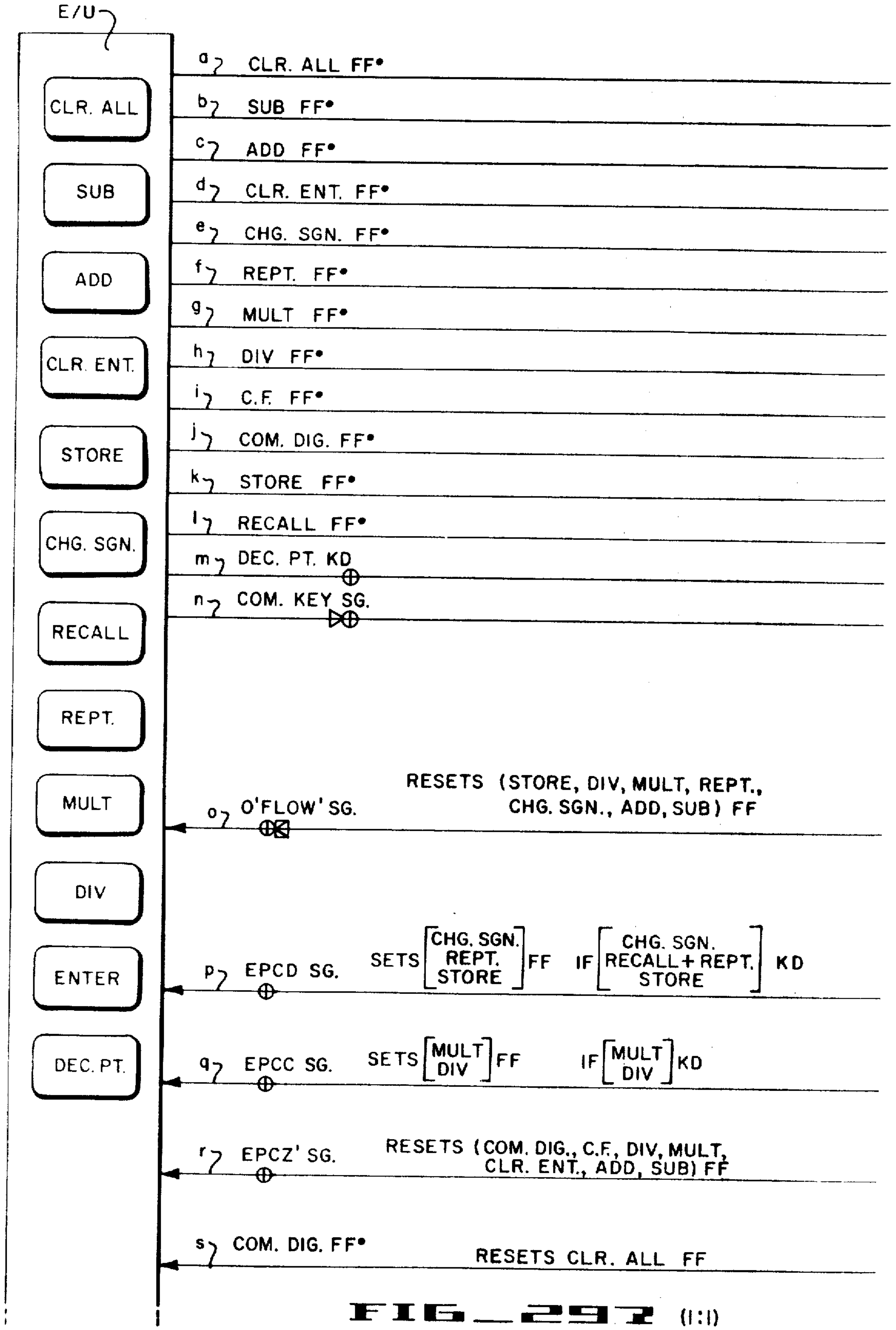
Figure 298:
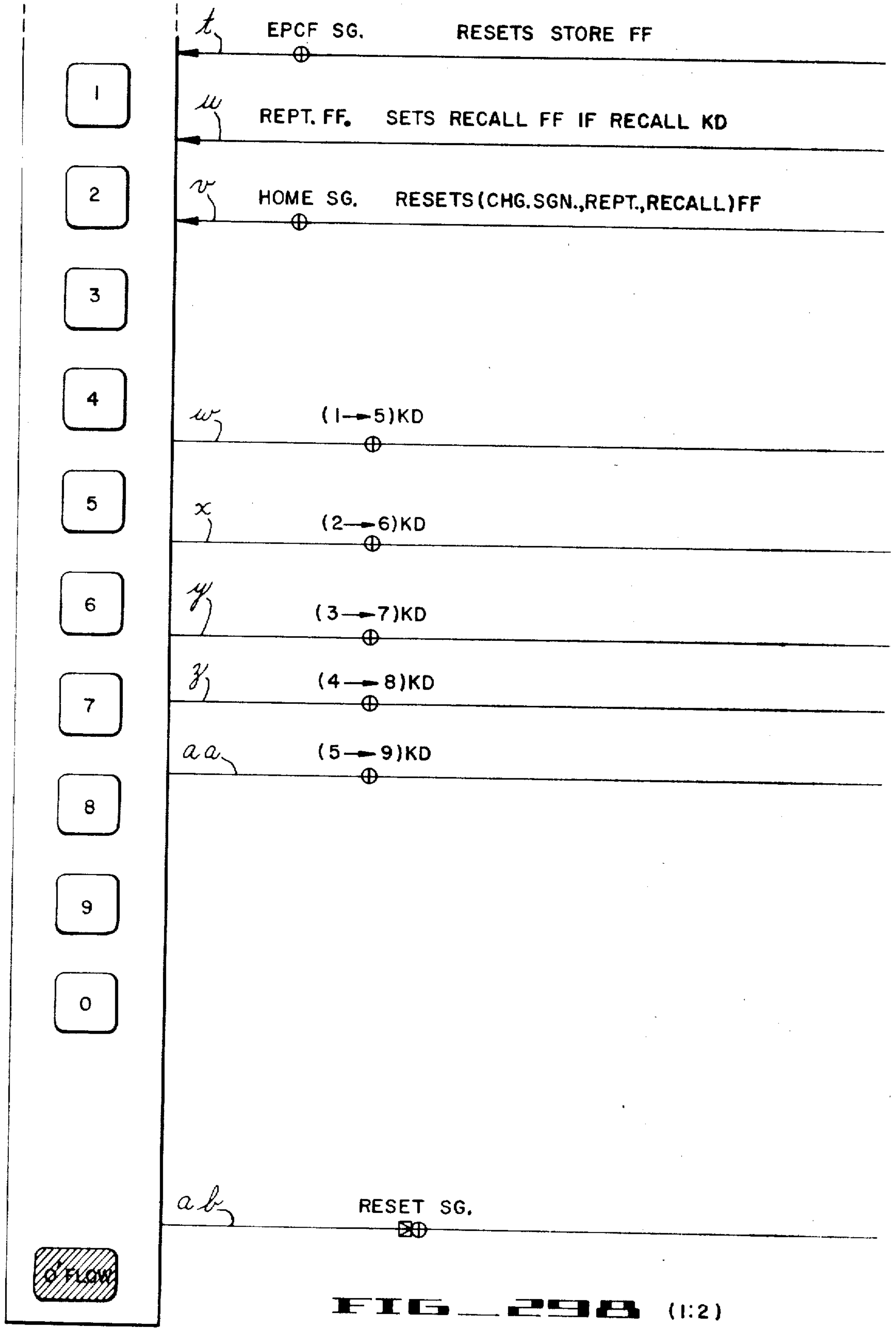
Figure 299:
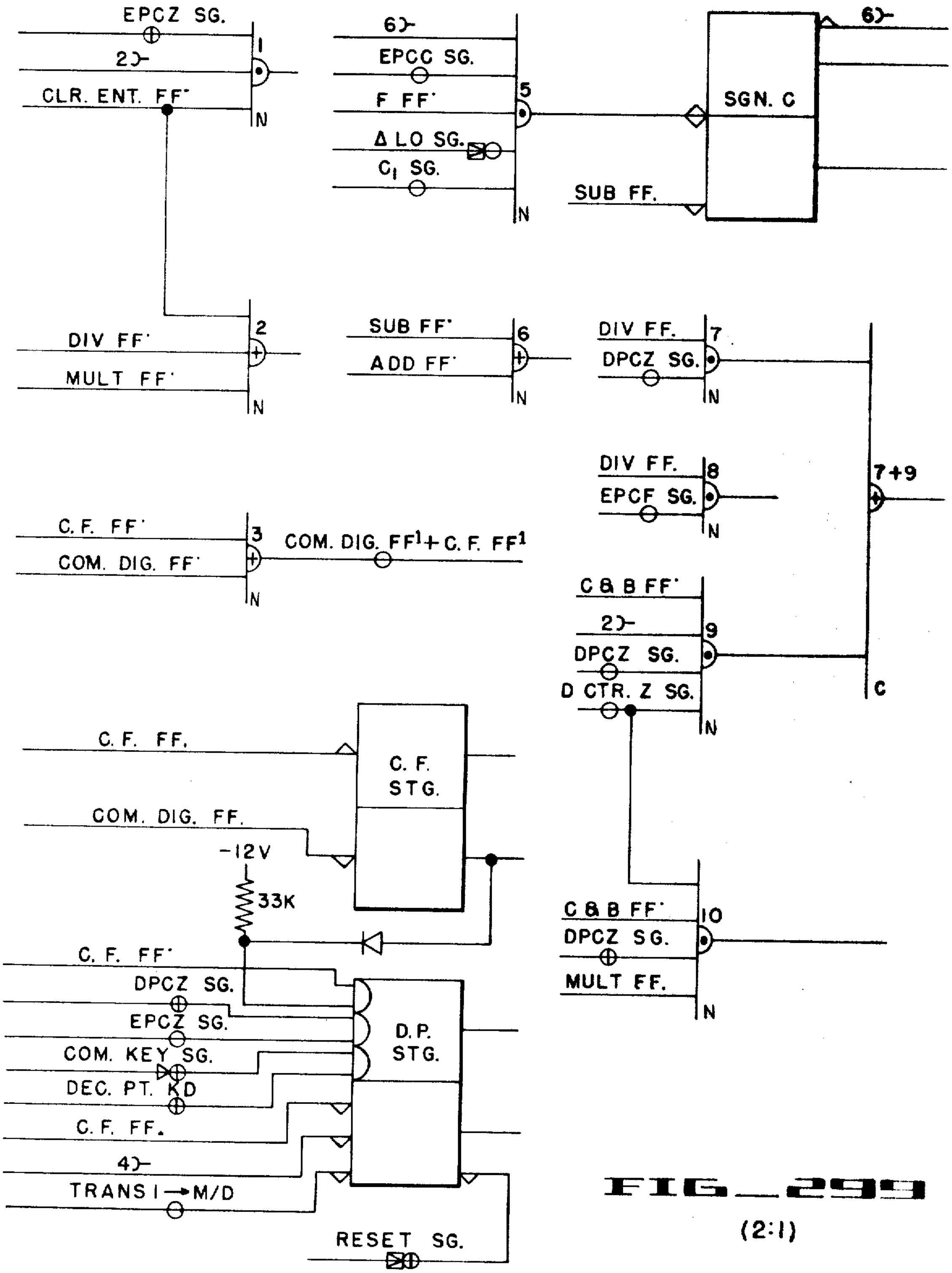
Figure 300:
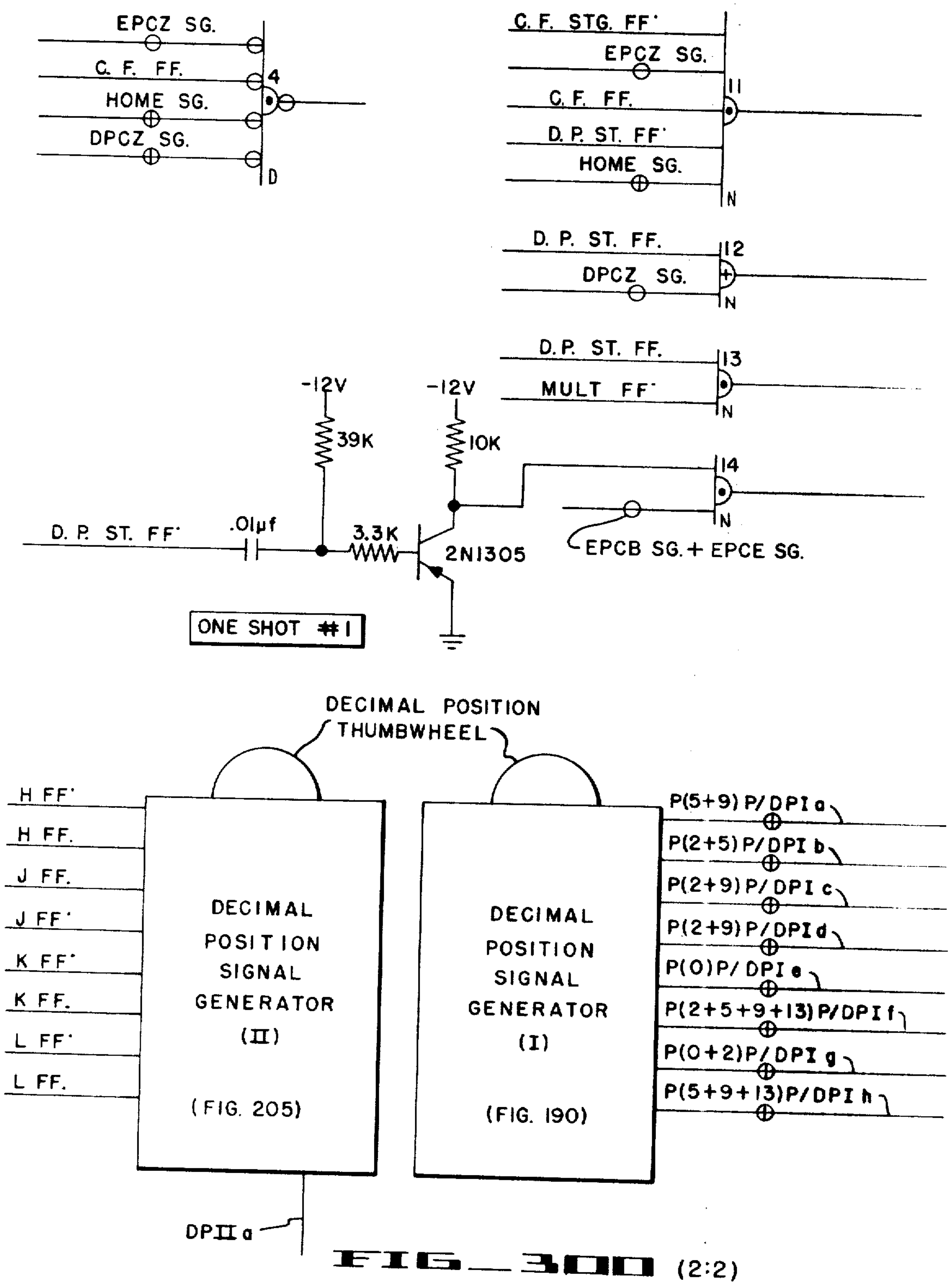

As shown in FIG. 372, an entry unit 10 is coupled to a control unit 20, an arithmetic unit 30, and a display unit 40. Entry unit 10 comprises a keyboard 12, which is portrayed in FIG. 1, and an encoder 14. As shown in FIGS. 1 and 182–185 (FIGS. 297, 298), keyboard 12, which enables operator entry of numeric data and control of functions to be performed by the calculator, comprises a plurality of digit keys 0, 1, . . . 9, a plurality of function keys, e.g., ADD, SUBTRACT, CLEAR, etc., and their associated switches. Encoder 14, which serves to translate the actuation of various keys into signals which enable selected components of control unit 20, arithmetic unit 30, and display unit 40, comprises the components specified in Section 16.1.5 and shown in detail in FIGS. 182–189, 196, 197, 225–234, and 246 (FIGS. 297, 298).

Control unit 20, which generally produces control signals which direct the flow of data through arithmetic unit 30 comprises a decimal point counter 22, a subtract logic circuit 24, an entry phase counter 26, an add logic circuit 28, and a shift control logic circuit 29. The inputs of the first four of these components are each coupled to encoder 14, while their outputs are each coupled to shift control logic 29. Shift control logic 29 is coupled to arithmetic unit 30, to display unit 40, and to the input side of decimal point counter 22. The output of entry phase counter 26 is additionally coupled to intensity control circuit 42 of display unit 40.

Figure 240:
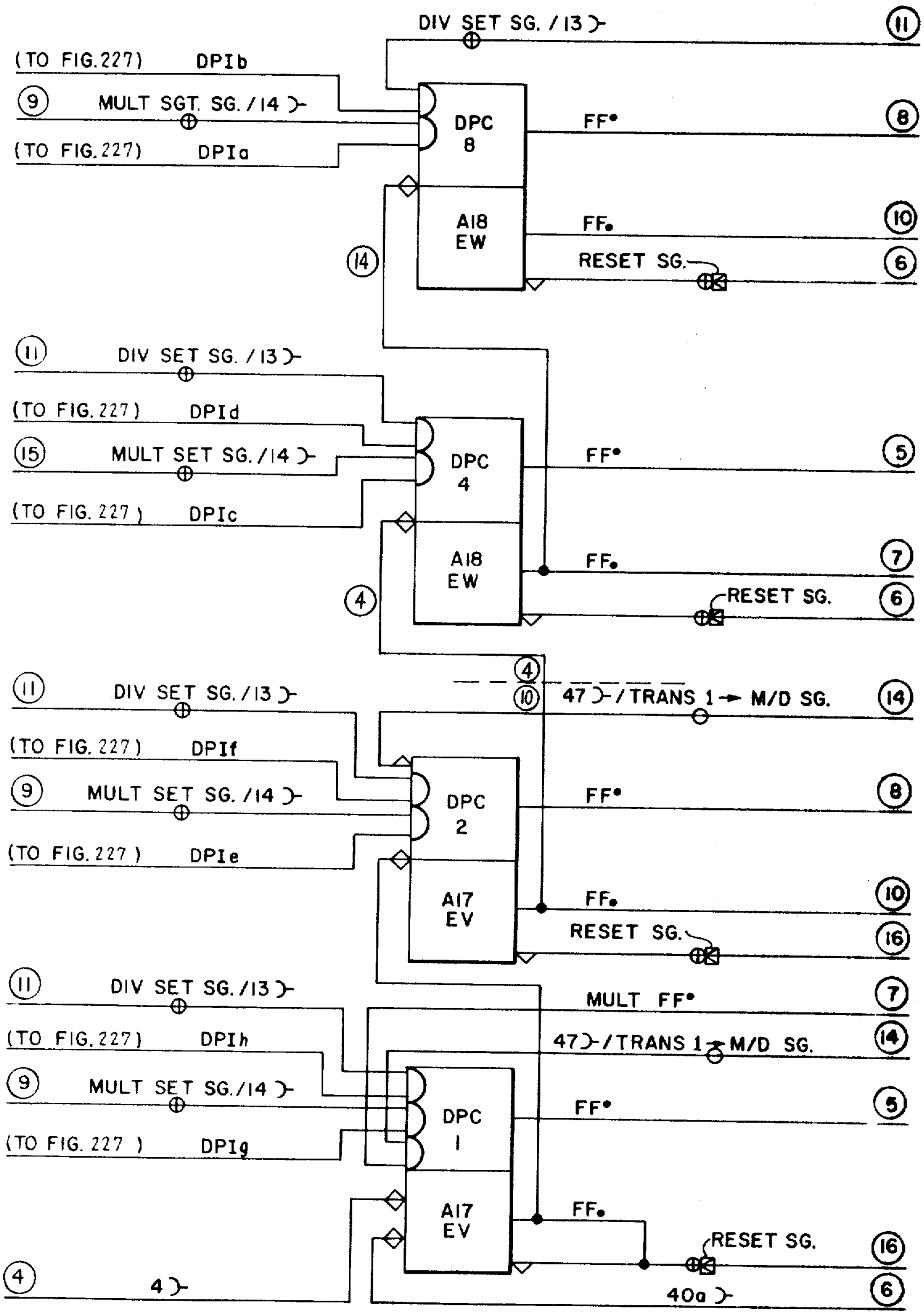
Figure 243:
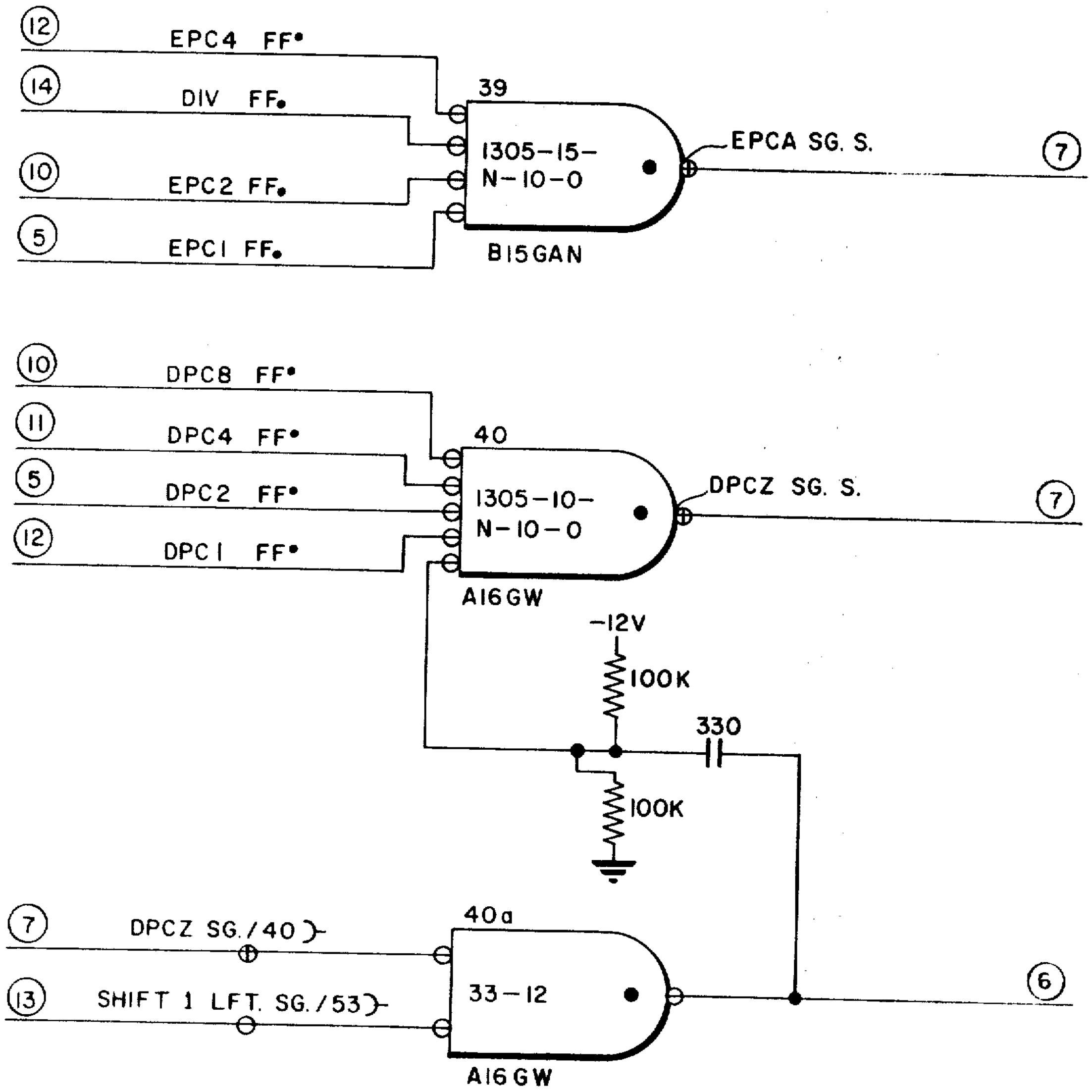
Figure 302:
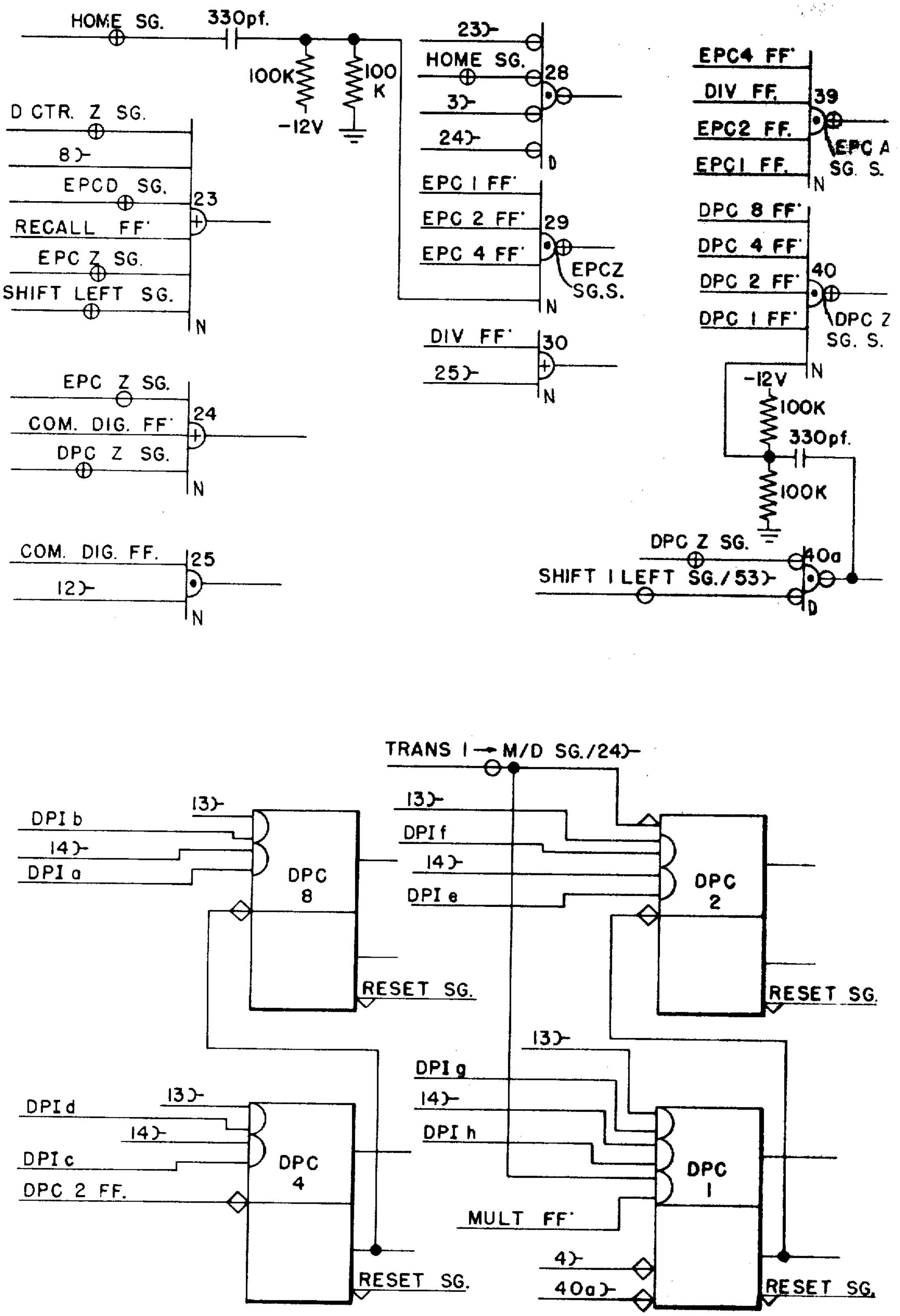

Decimal point counter 22, which provides control signals to shift control logic 29 during decimal align, multiply, and divide, comprises four flip-flops interconnected as shown in FIG. 240 (FIG. 302) and having inputs as specified in these figures. The outputs of the decimal point counter flip-flops are connected to various portions of shift control logic 29, e.g., to the inputs of gate 40 as shown in FIG. 243 (FIG. 302).

Figure 254:
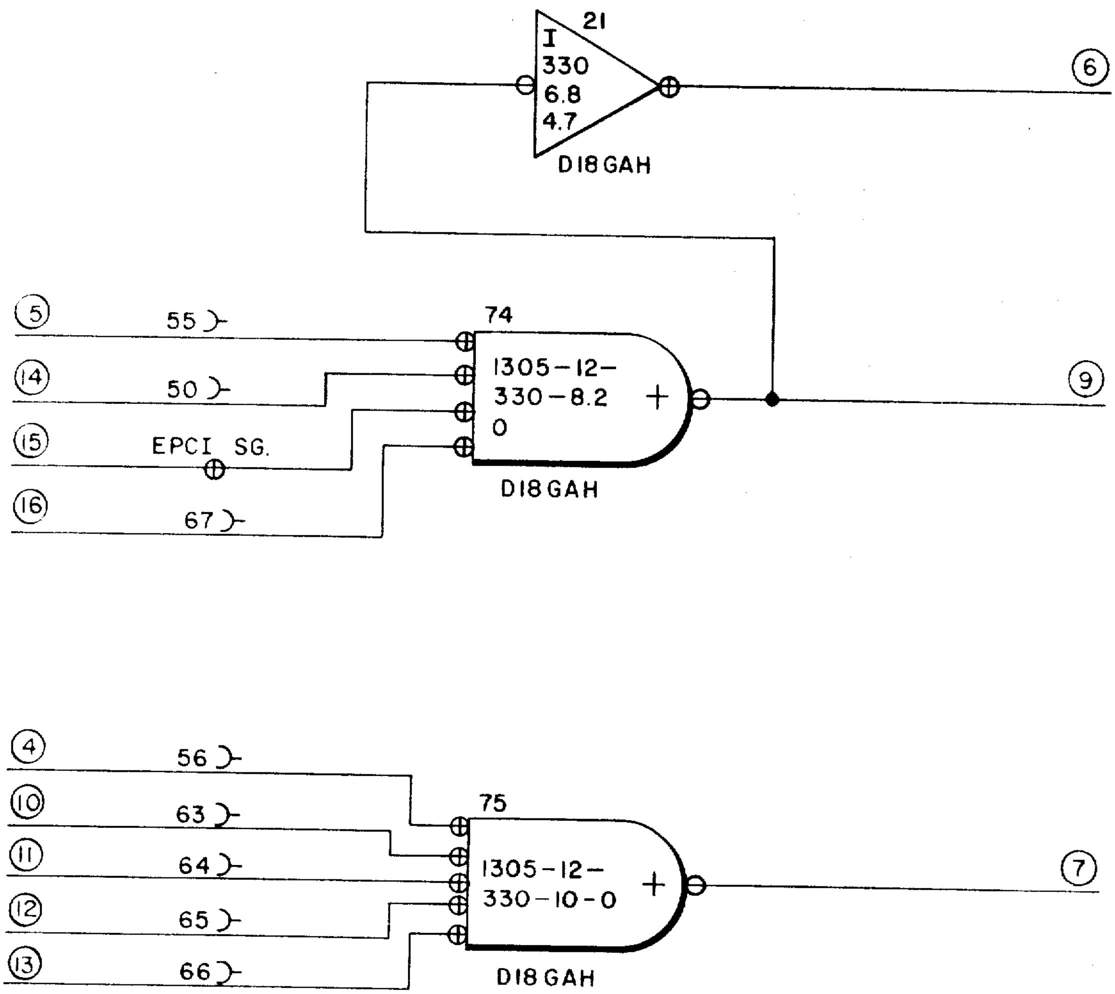
Figure 255:
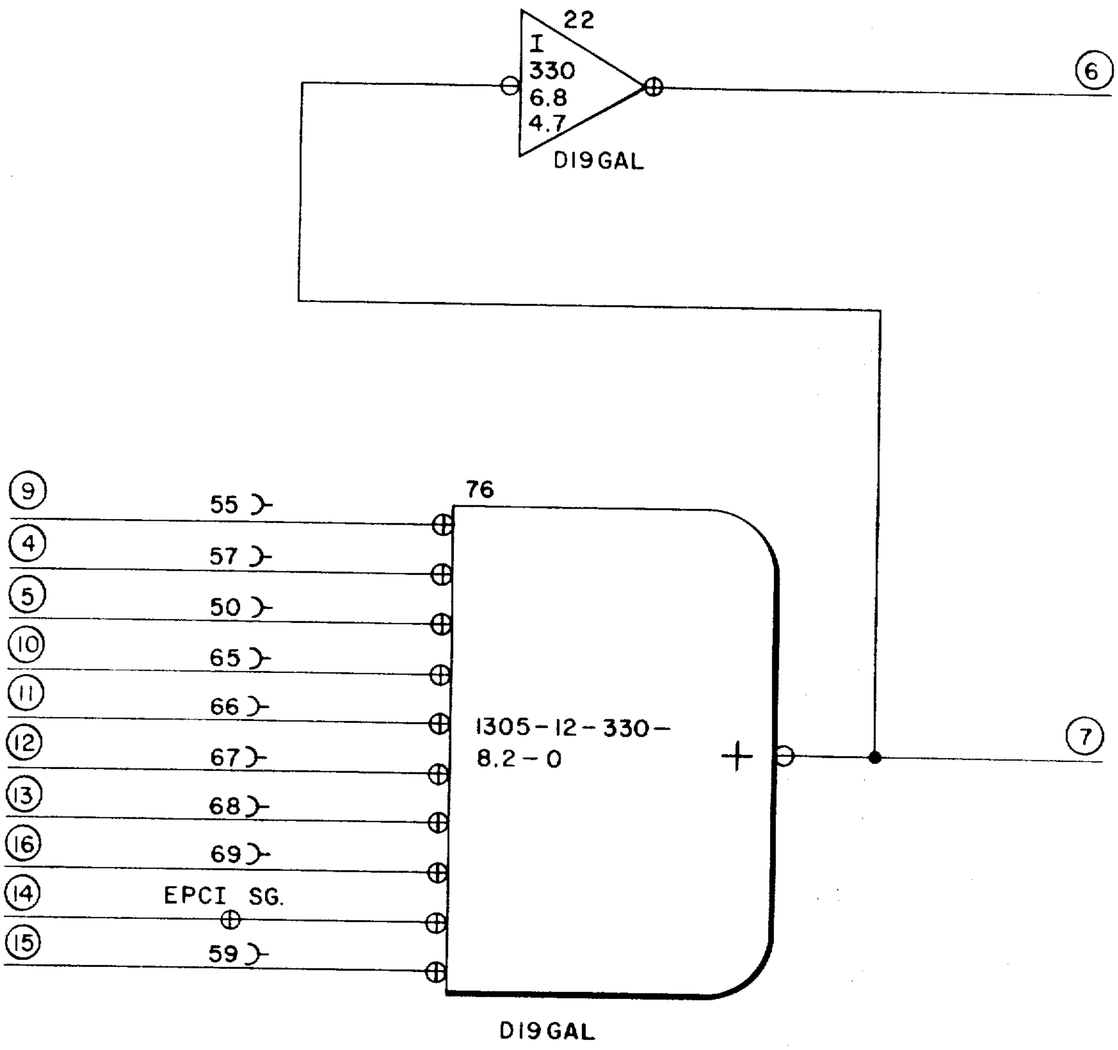
Figure 256:
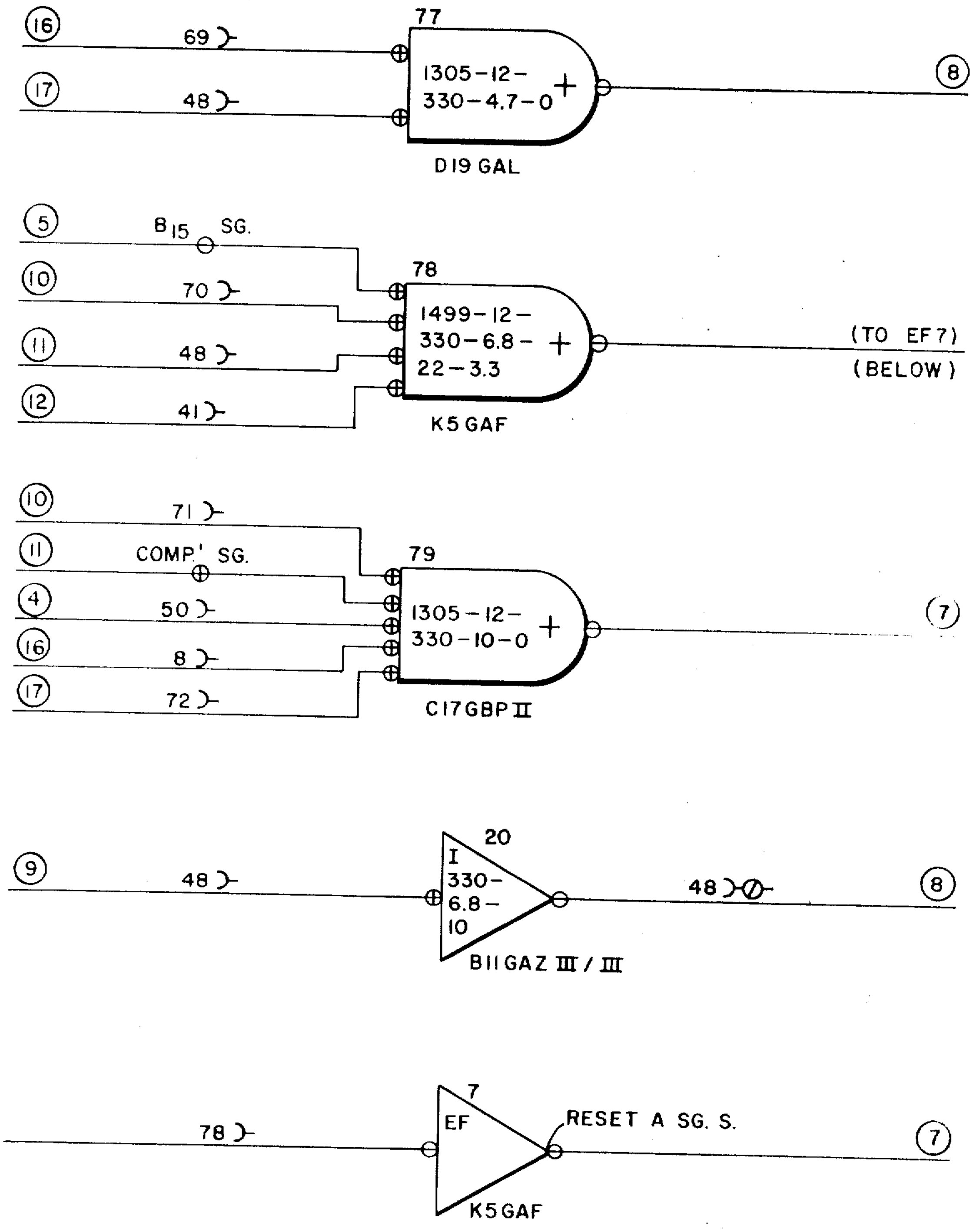
Figure 257:
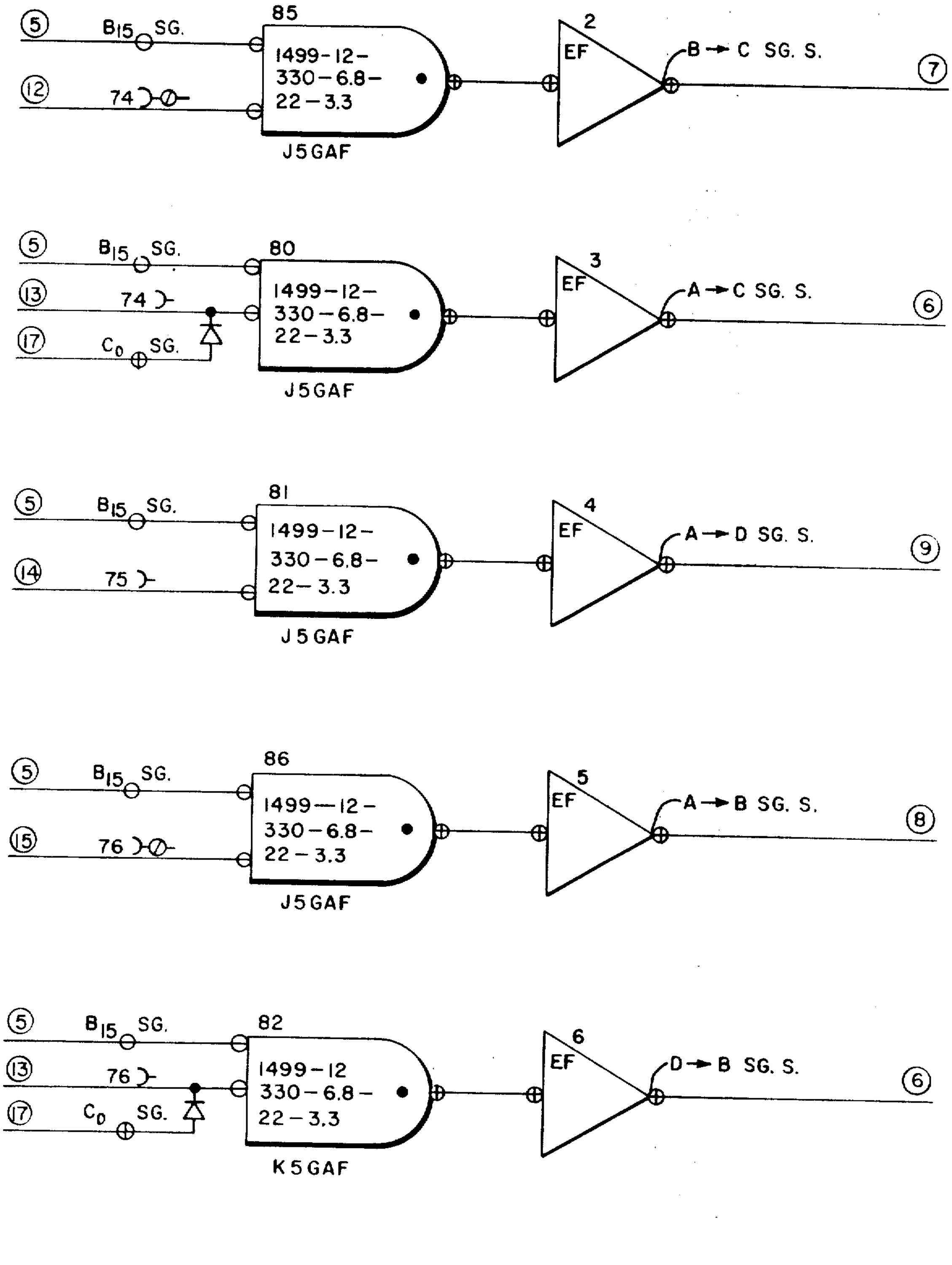
Figure 25A:
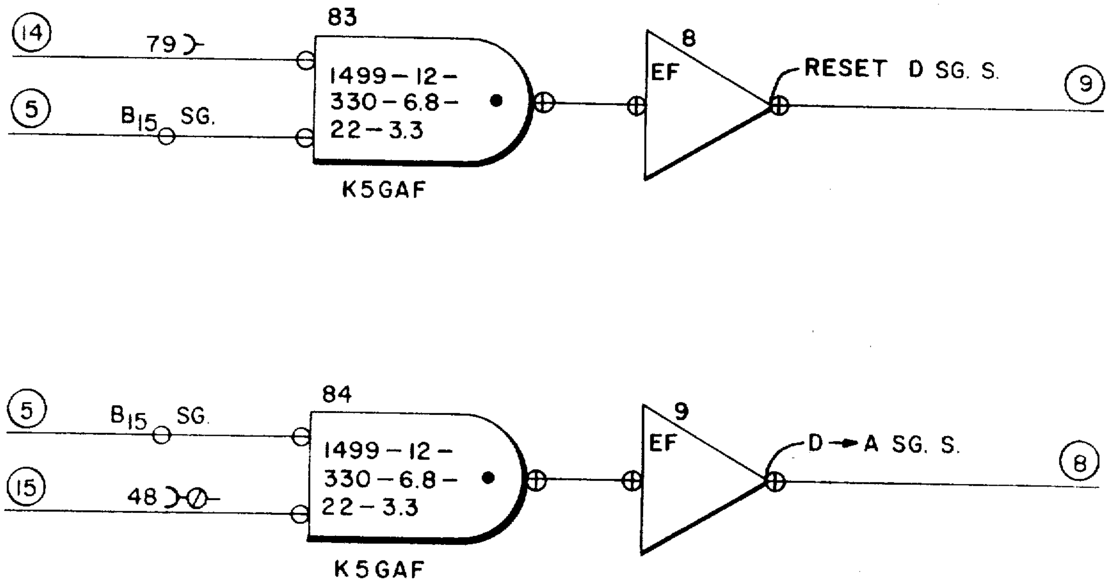

Entry phase counter 26, which provides control signals to add logic 28, subtract logic 24, shift control 29, and intensity control 42, comprises three flip-flops interconnected as shown in FIG. 238 (FIG. 301) and having inputs as specified in these figures. The outputs of the entry phase counter flip-flops are connected to portions of add logic 28 and subtract logic 24 as shown in FIG. 228, and to various portions of shift control logic 29, e.g., to gates 74 and 76 which are coupled to gates 80 and 82, respectively, as shown in FIGS. 254, 255, and 257 (FIGS. 304, 306).

Figure 233:
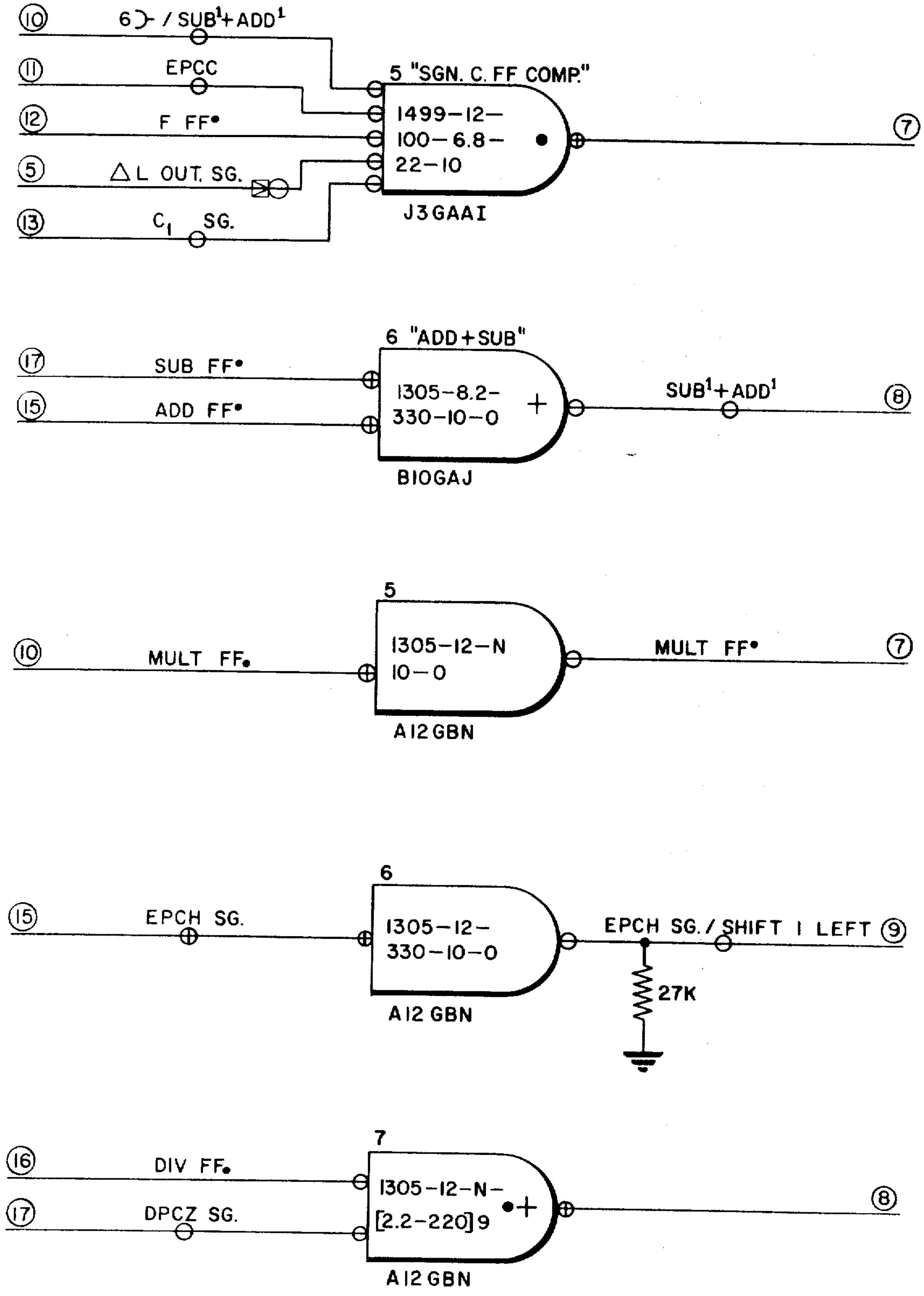
Figure 234:
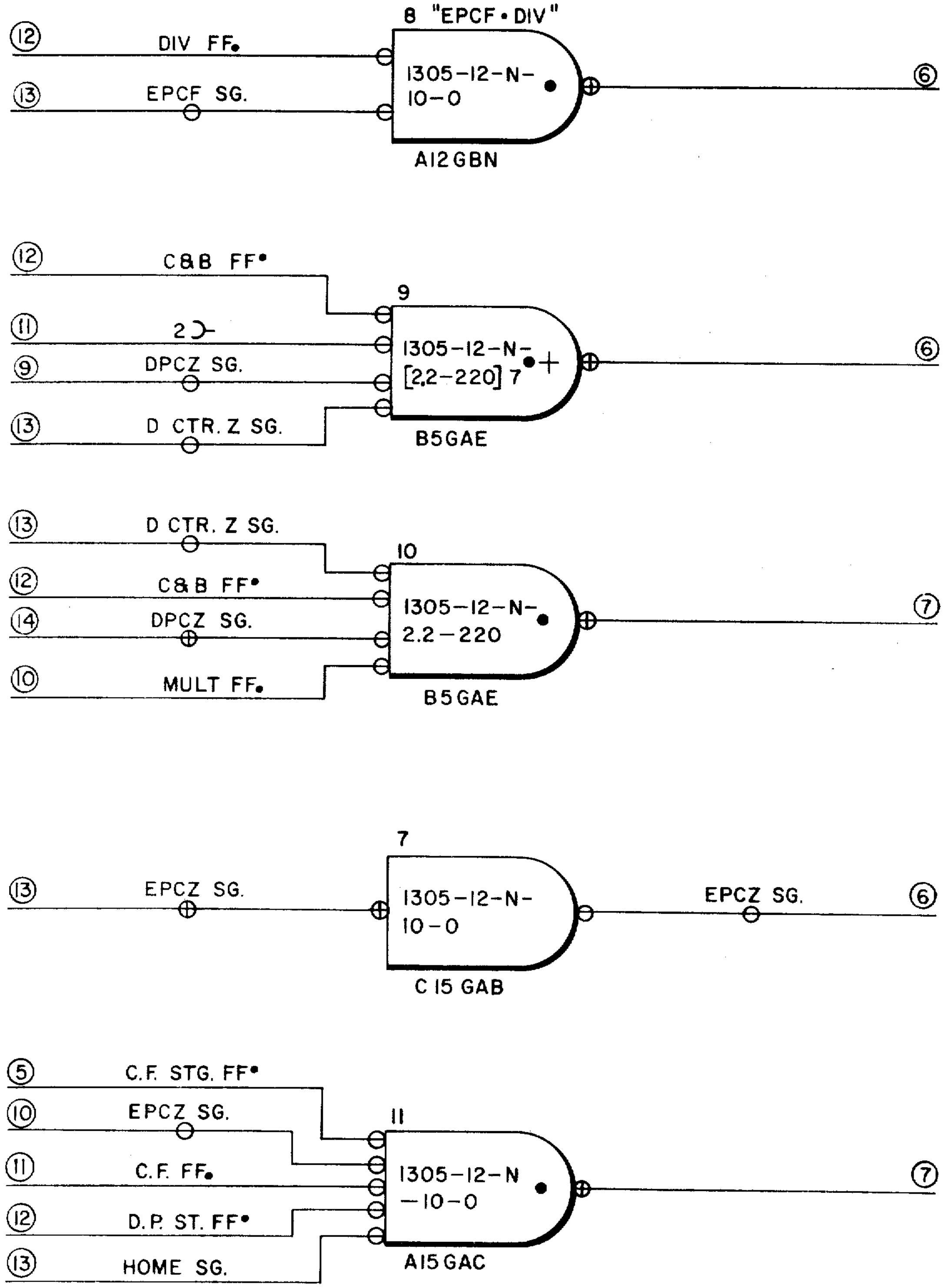
Figure 228:
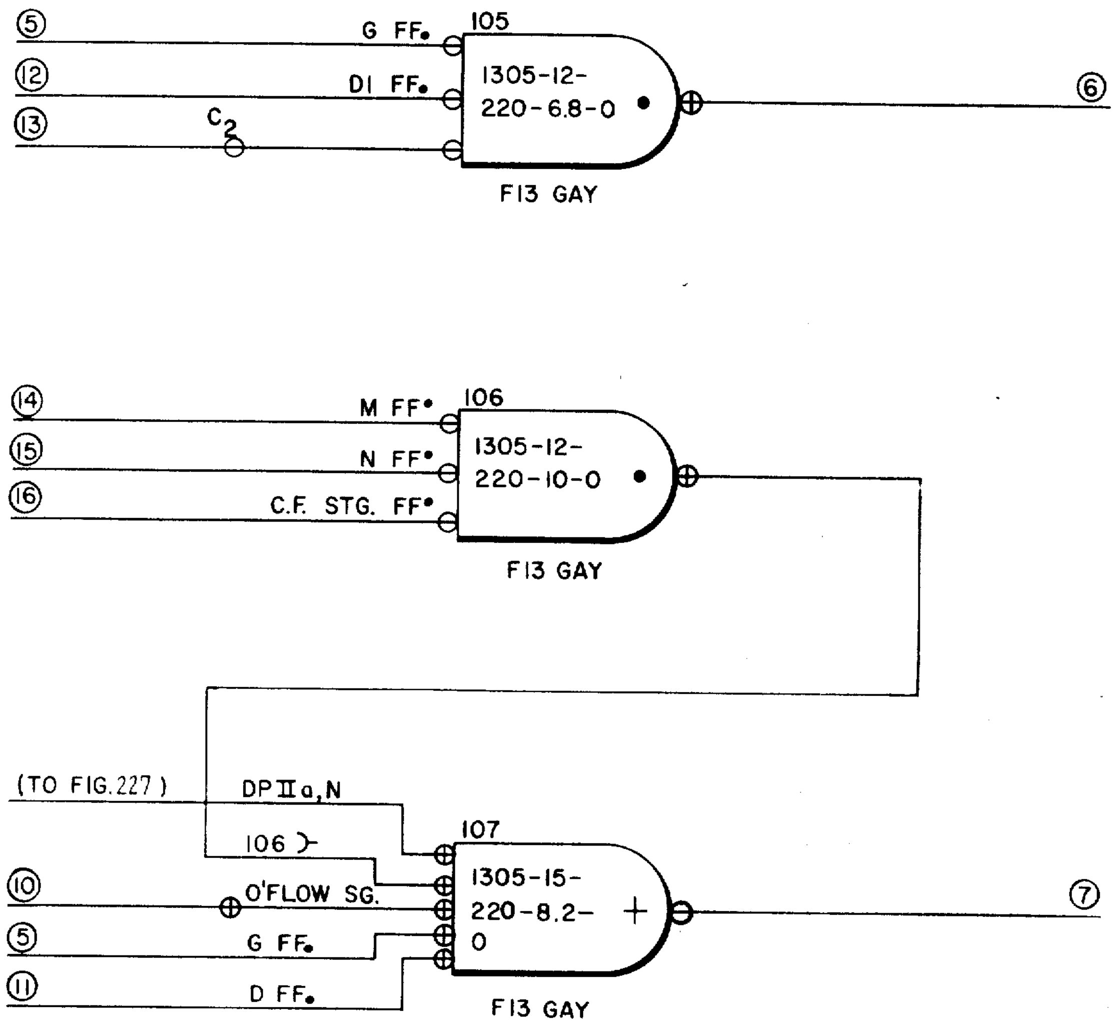
Figure 279:
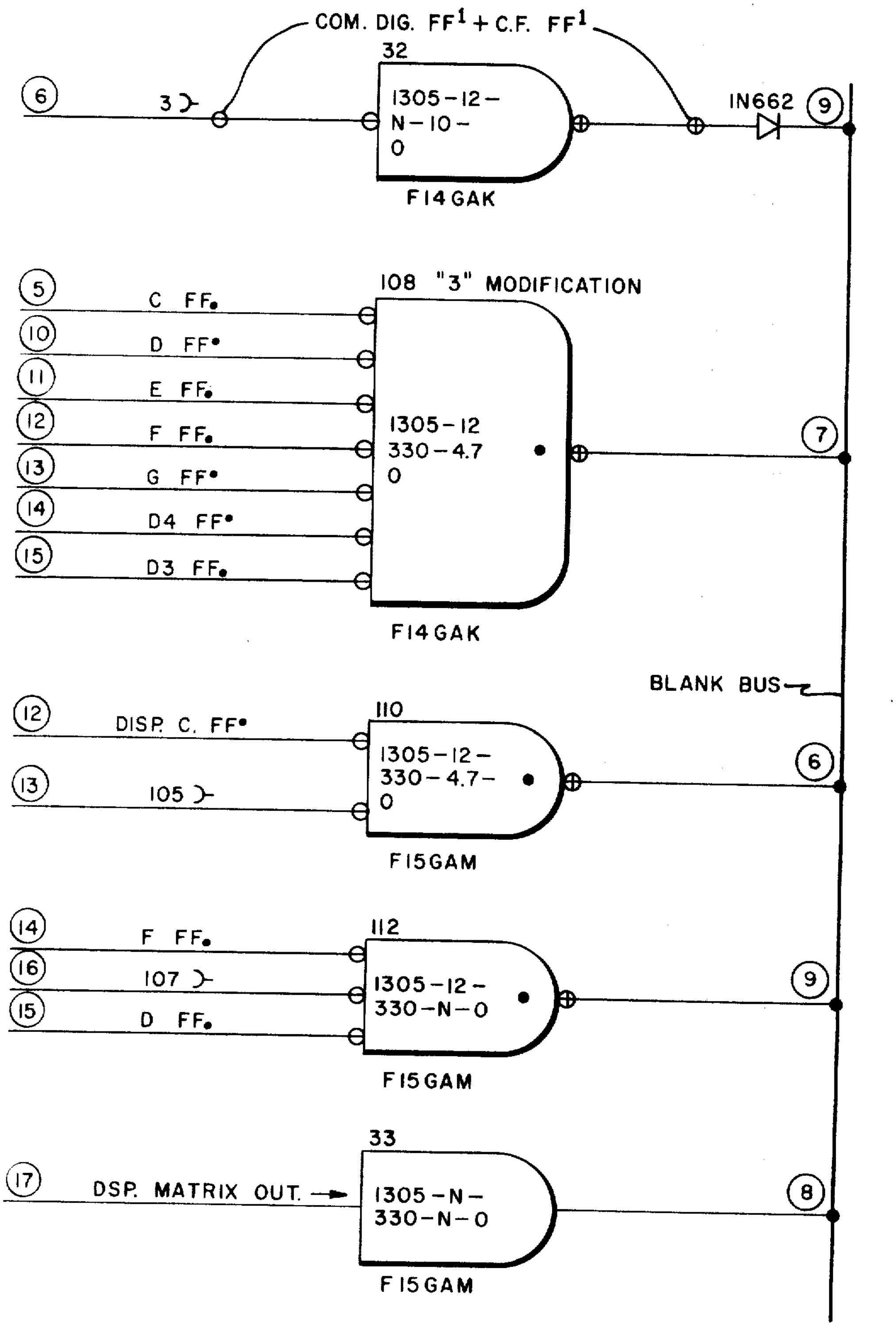
Figure 280:
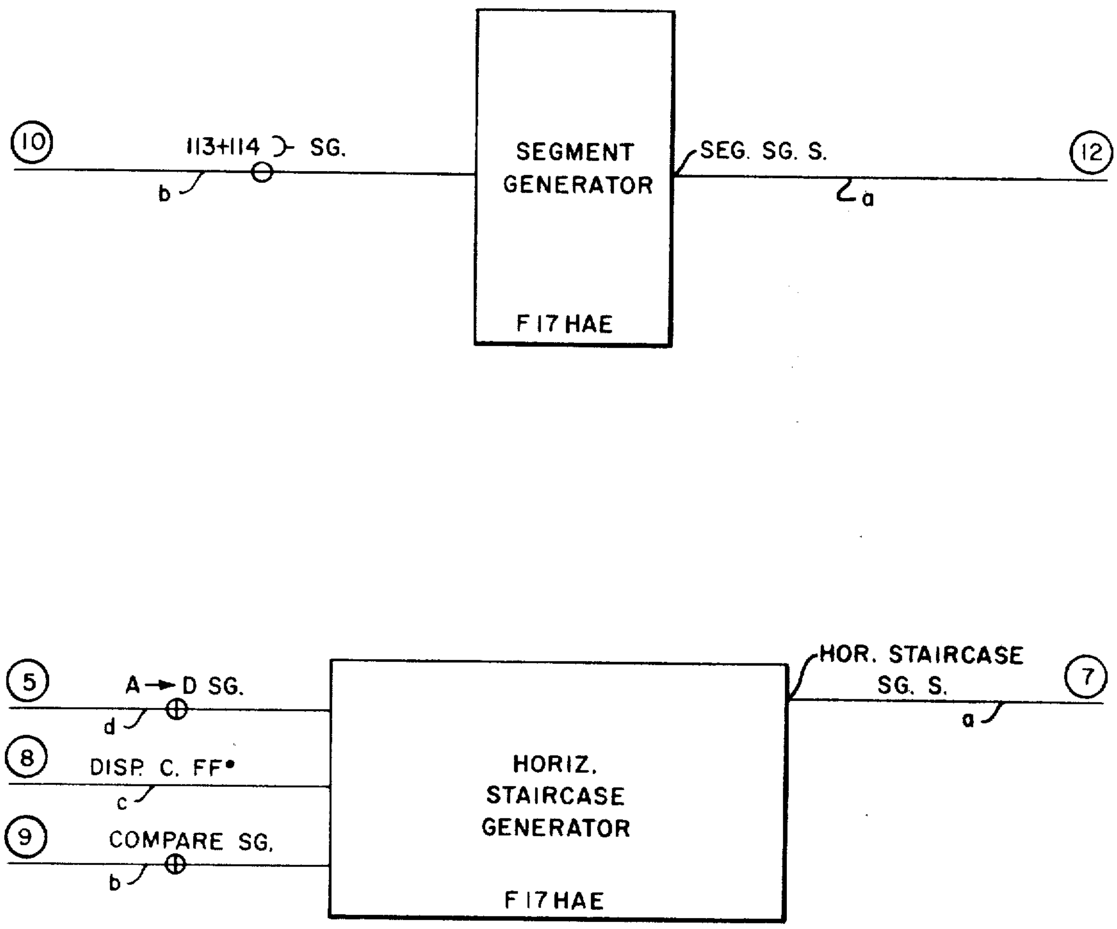
Figure 281:
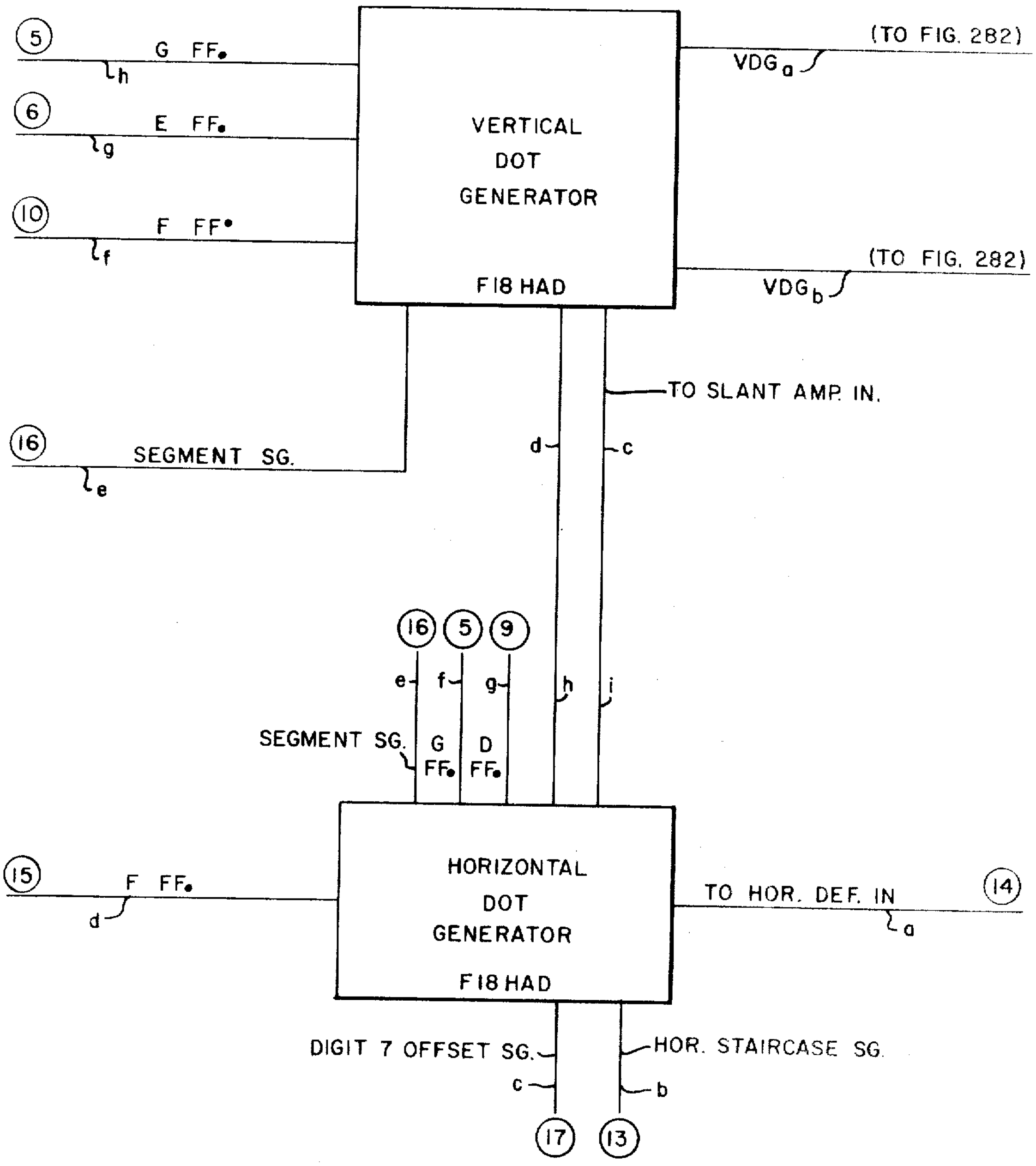
Figure 282:
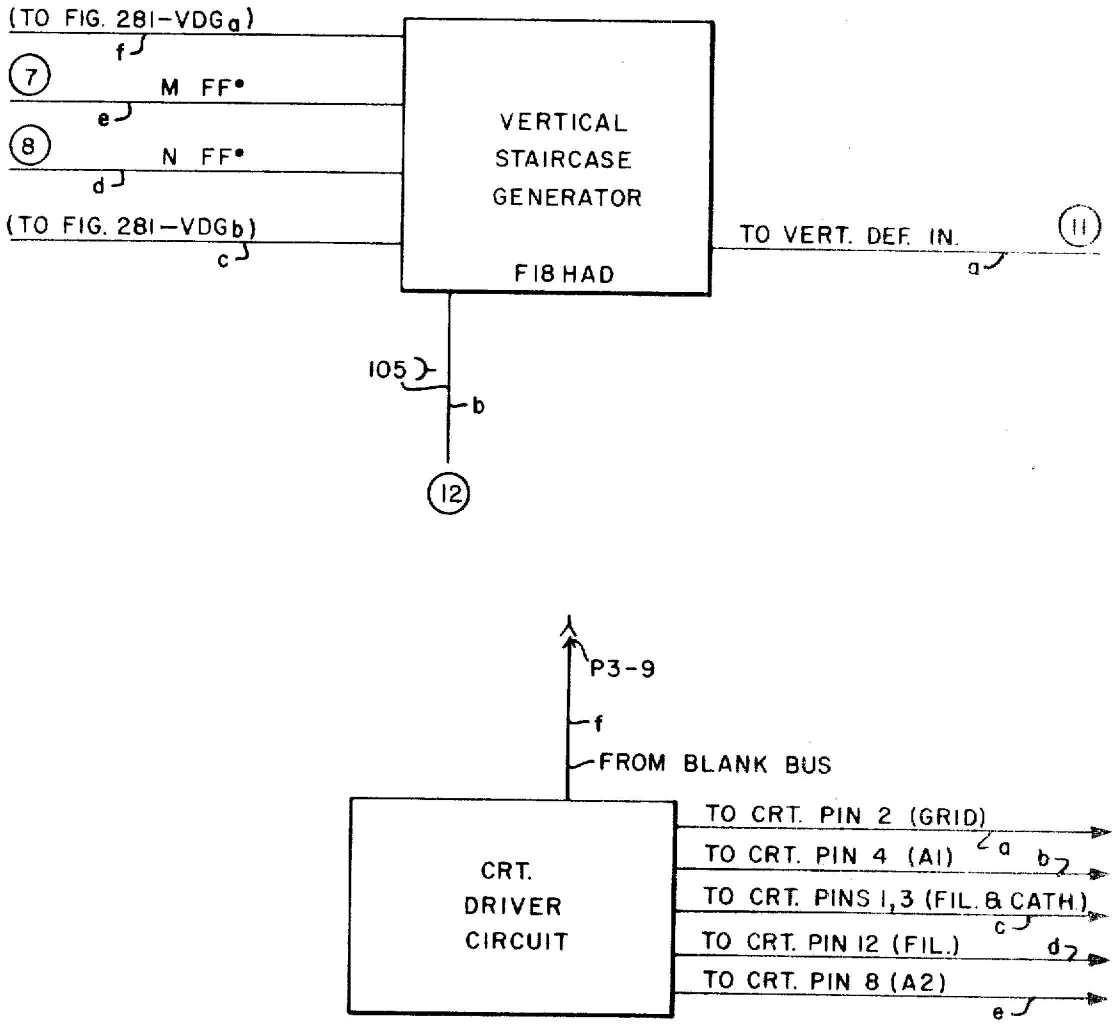
Figure 301:
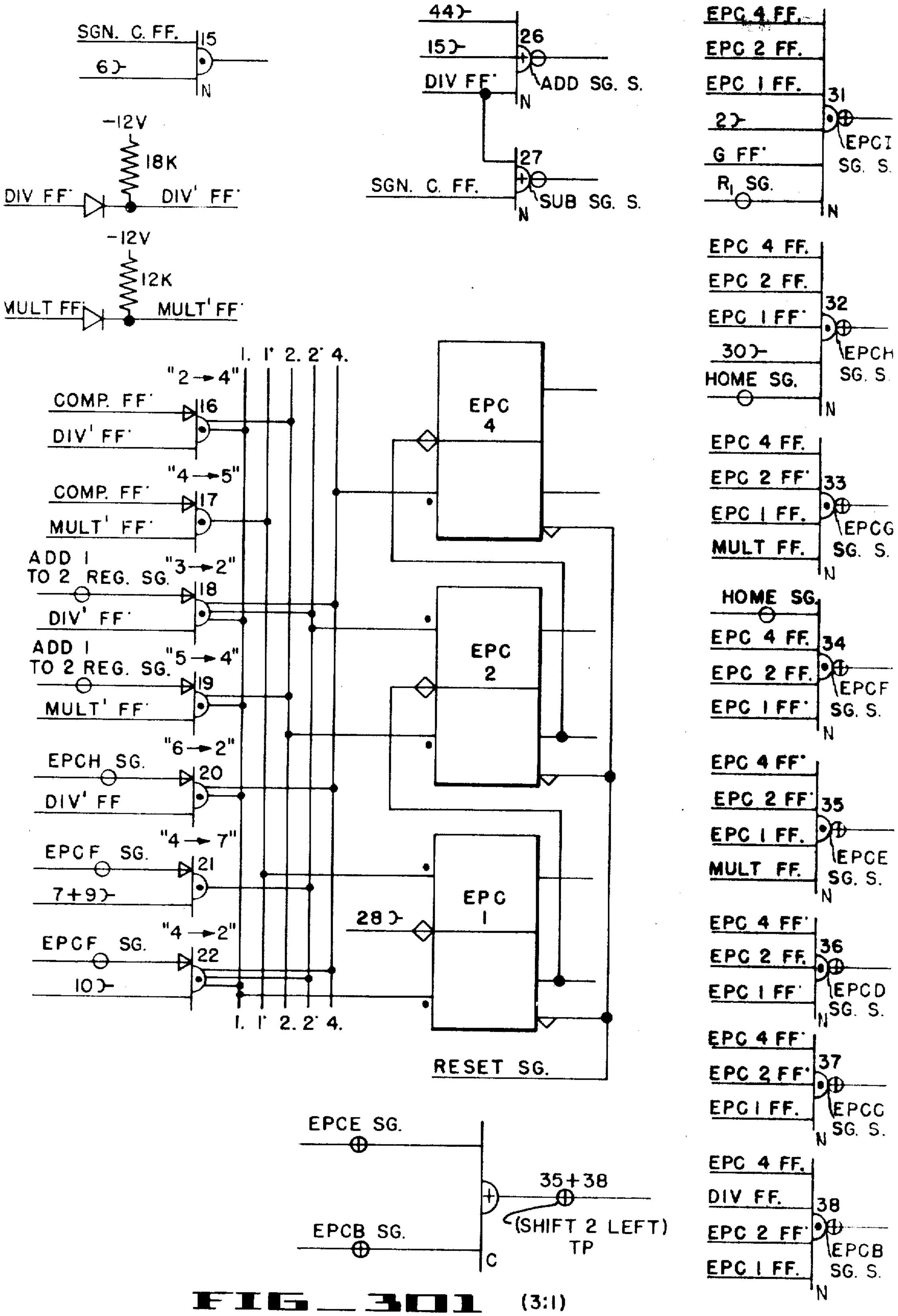
Figure 303:
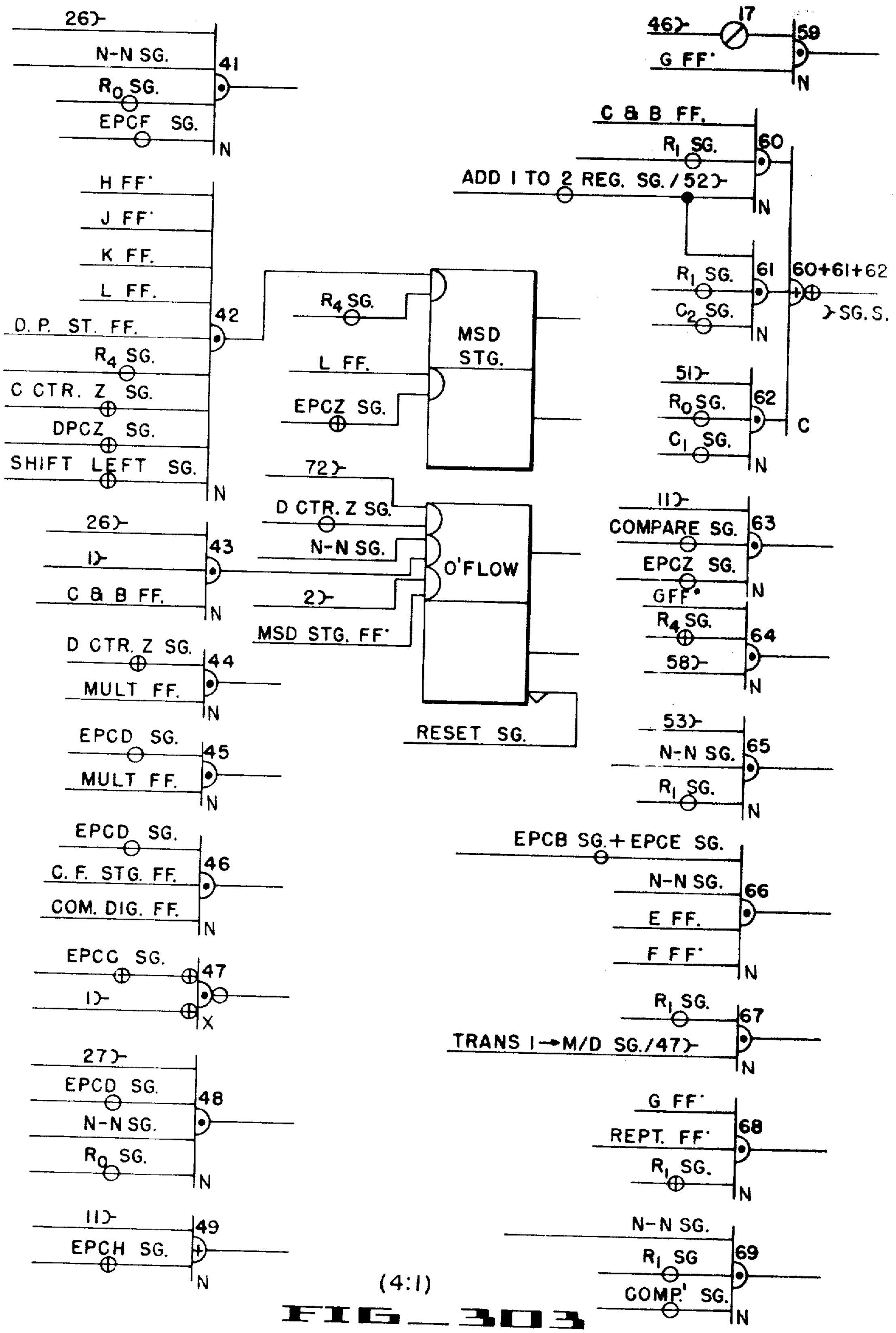

Add logic 28 and subtract logic 24, which provide enabling signals to shift control logic 29 during ADD and SUBTRACT operations, comprises an add flip-flop and a subtract flip-flop whose inputs are connected as shown in FIG. 228 to the specified outputs of encoder 12 and entry phase counter 26, and gate 6, the inputs to which are the set outpts of the add and subtract flip-flops as shown in FIG. 233. The outputs of add logic 28 and subtract logic 24 are coupled to shift control logic 29, e.g., via gates 15, 26, and 48 to gate 78 as shown in FIGS. 236, 239, 247, and 256 (FIGS. 301, 303, 306).

Shift control logic 29, which provides several shift control signals which control the path of data through arithmetic unit 30 during the various states of the calculator as described below, comprises numerous logic elements which are interconnected as shown in FIGS. 225–294 of the above-mentioned circuit diagram (FIGS. 297–313 of the logic diagram). For example, gates 84, 86, 85, and 81 of shift control logic 29 are coupled to A counter 32, B counter 34, C counter 36, and D counter 38, respectively, as shown in FIGS. 257, 258, and 263–275 (FIGS. 305–309). Also, gate 81 of shift control logic 29 is coupled to the horizontal staircase generator portion of deflection control circuit 44, as shown in FIGS. 211, 212, and 257 (FIGS. 306, 313).

Arithmetic unit 30, which is coupled to the other basic units as noted above, comprises four digesters 32, 34, 36, and 38 which in the preferred embodiment are counters. Each counter comprises five flip-flops interconnected in a special way and associated gates. Alternate interconnections are provided between the various counters so that a digit may be transferred between interconnected counters. The flip-flop interconnections for A counter 32, B counter 34, C counter 36, D counter 38, as well as the between counter interconnections, are shown in FIGS. 261–265, 266–268, 272–274, and 269–271, respectively. As discussed more fully below, the output of read amplifier 56 of memory unit 50 is coupled to the input of A counter 32 and D counter 38. Further, the output of C counter 36 is coupled to write amplifier 52 of memory unit 50 via gates 101 and 102 as shown in FIGS. 275 and 276 (FIGS. 308, 309).

Figure 283:
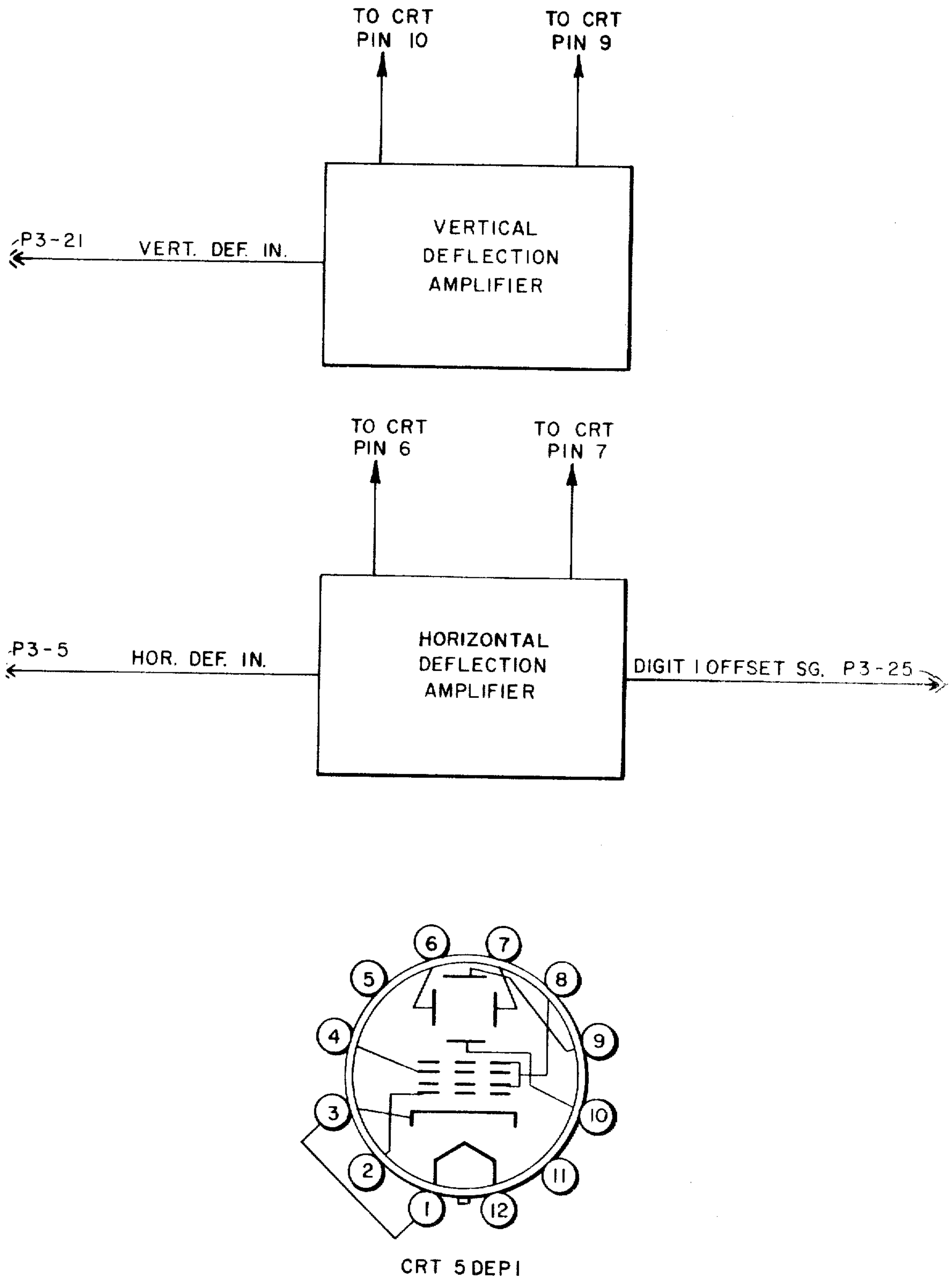

Display unit 40 comprises intensity control circuit 42 which is coupled to deflection control circuit 44 and visual readout device 46. Intensity control circuit 42 and deflection control circuit 44 comprise the components shown in detail in FIGS. 194, 195, 207–224, and 277–283 (FIGS. 310, 313), while visual readout device 46 comprises a cathode ray tube, the schematic for which is shown in FIG. 283.

Figure 260:
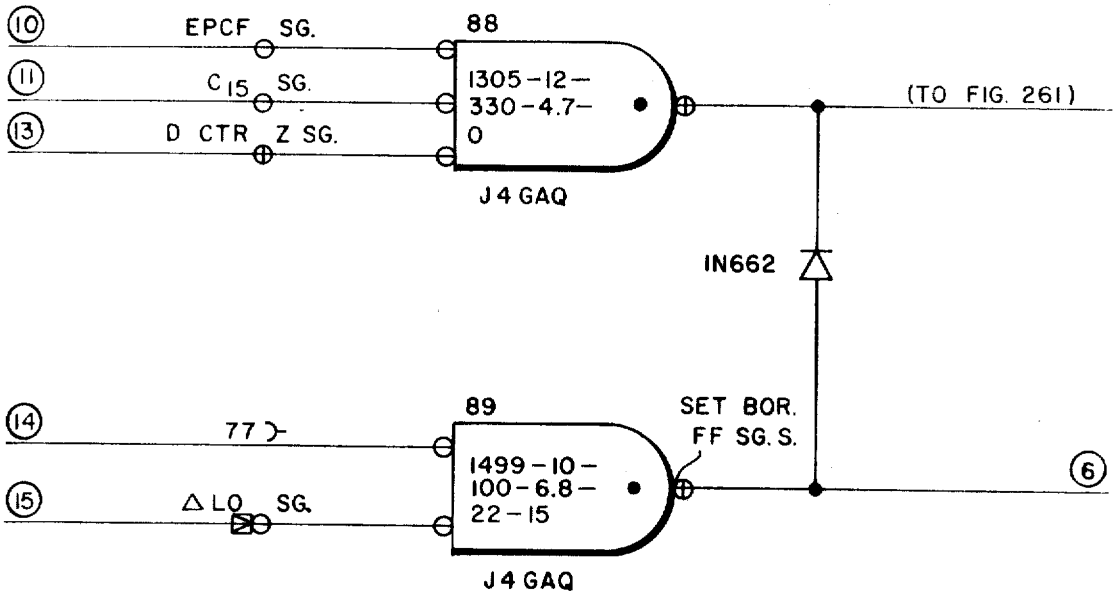
Figure 261:
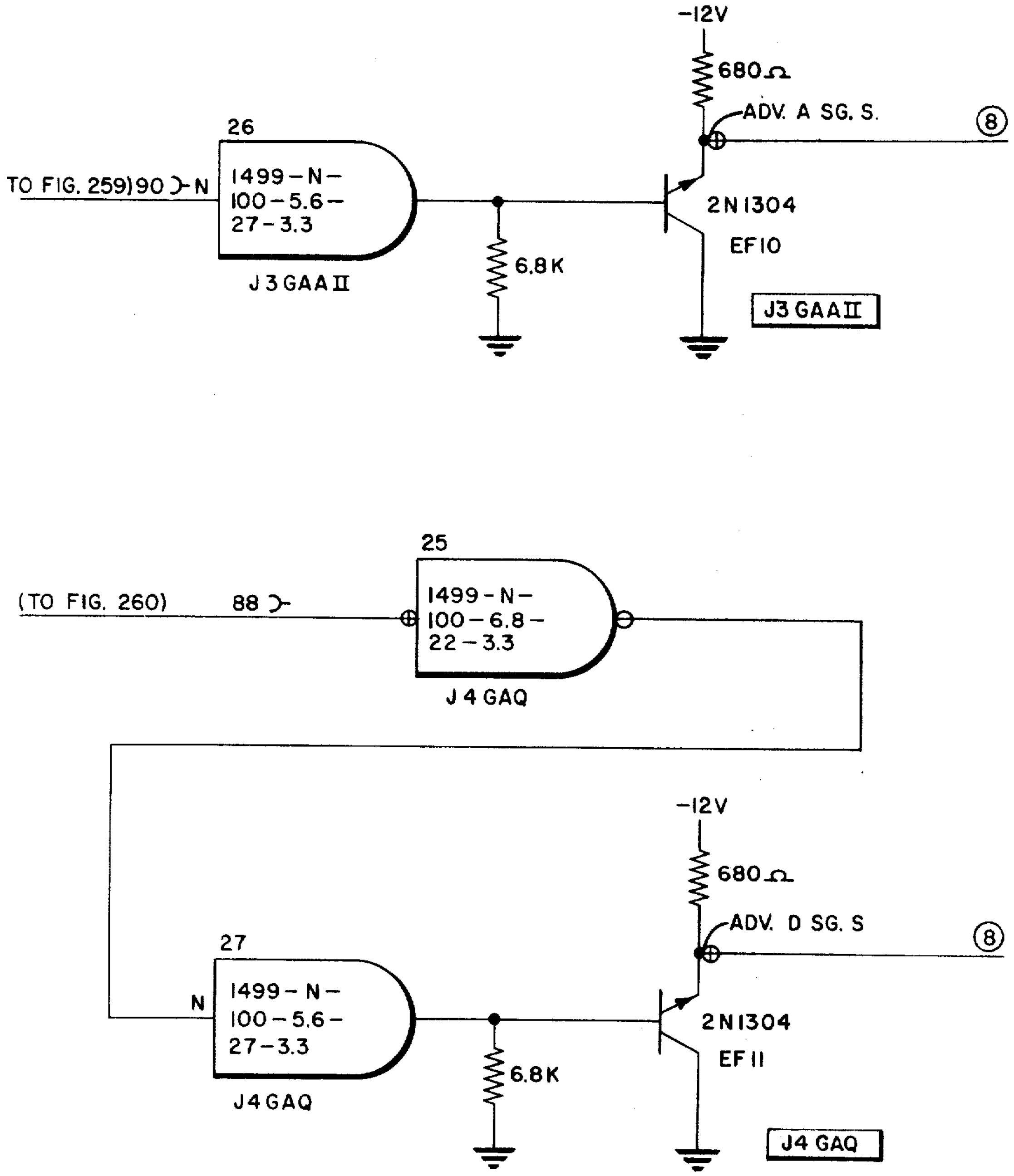
Figure 262:
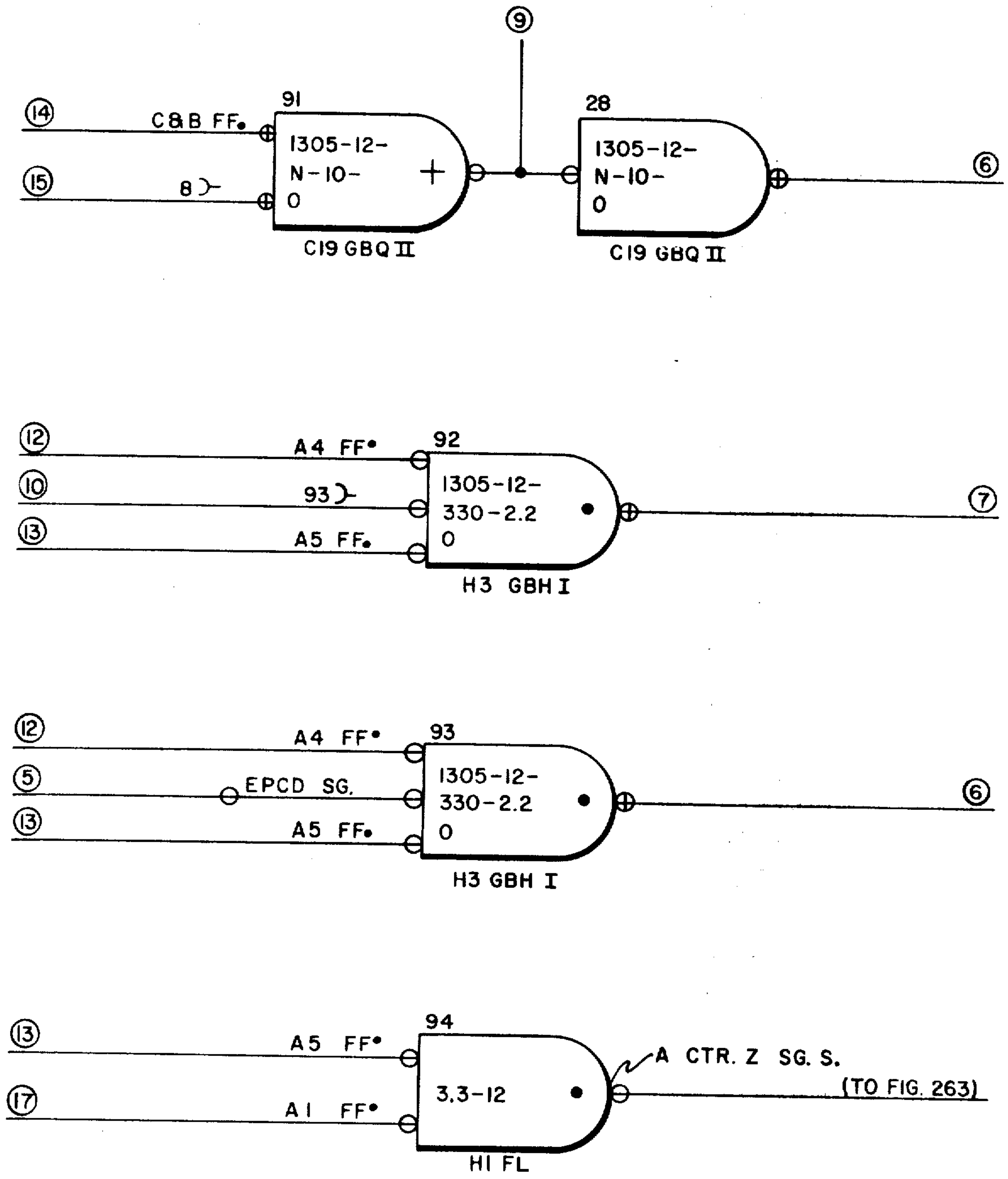
Figure 263:
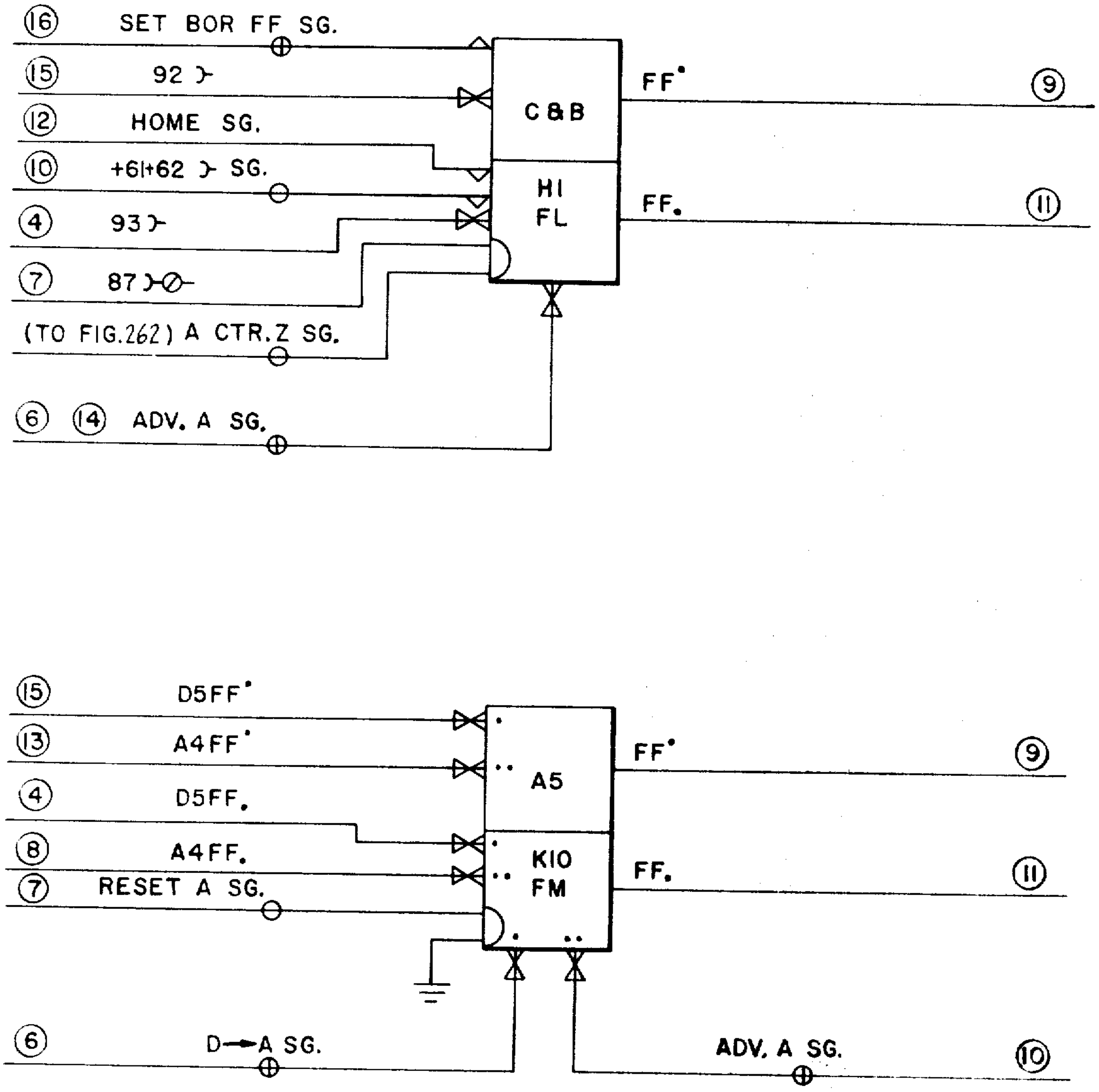
Figure 264:
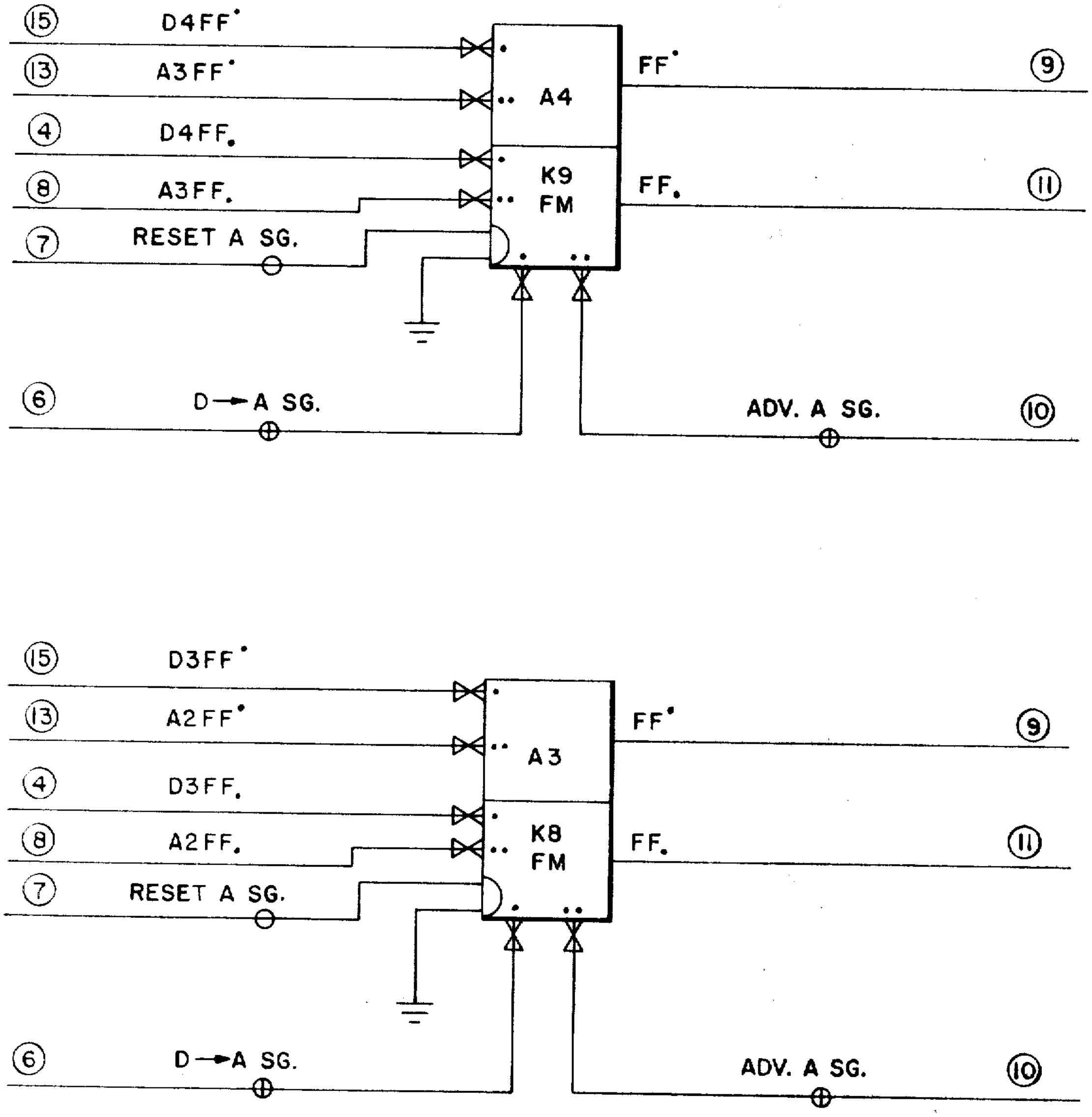
Figure 265:
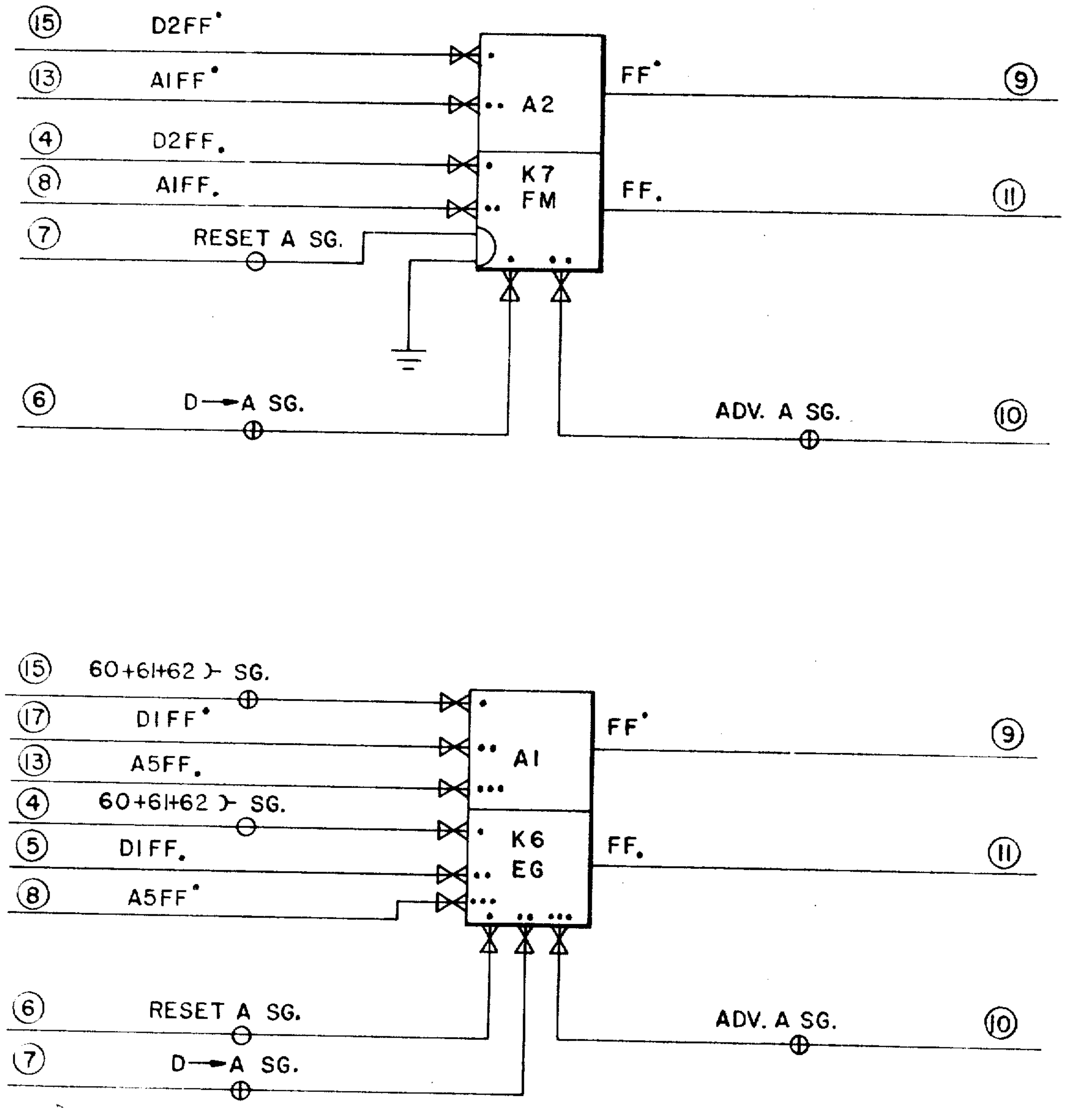
Figure 266:
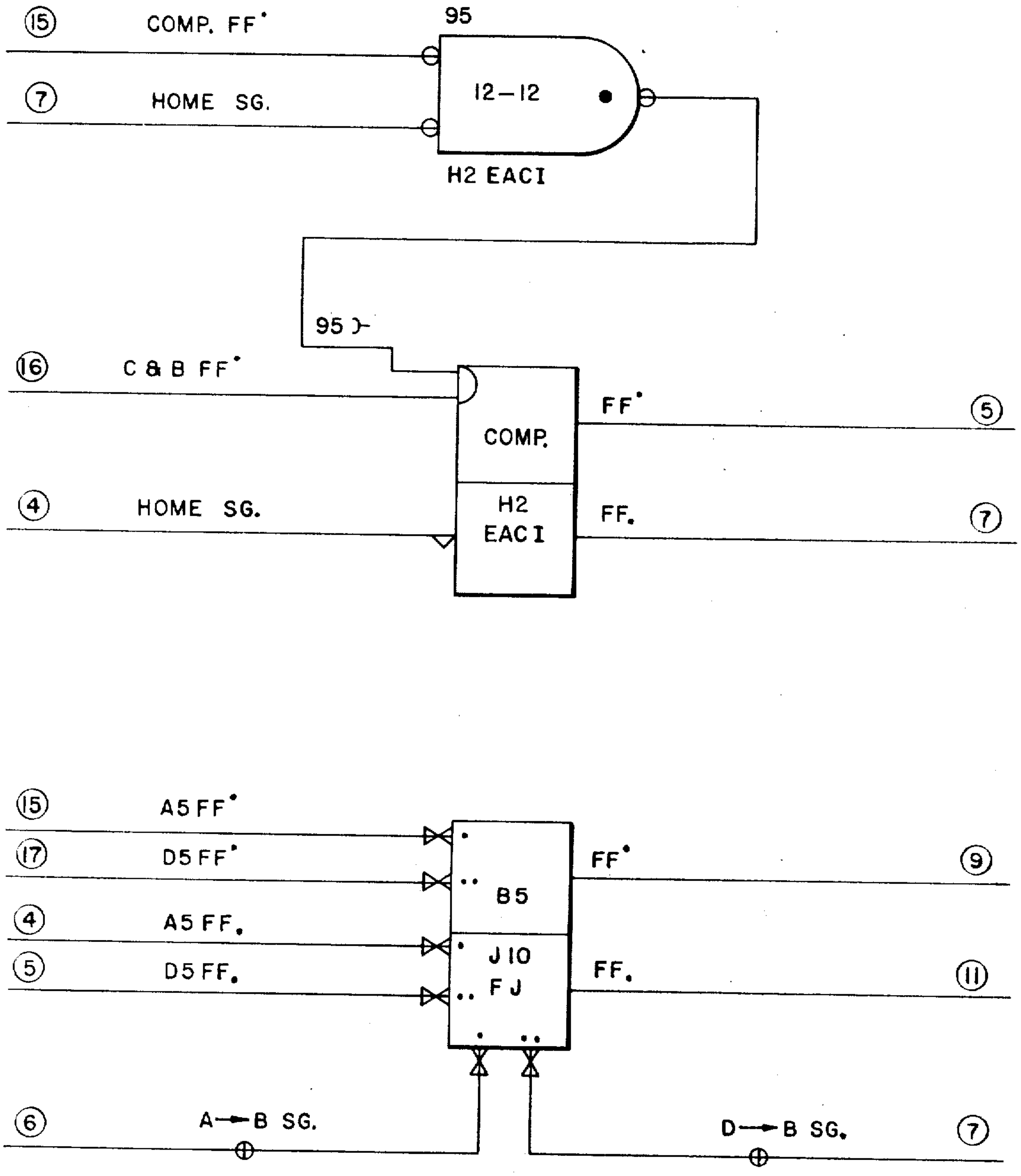
Figure 262:
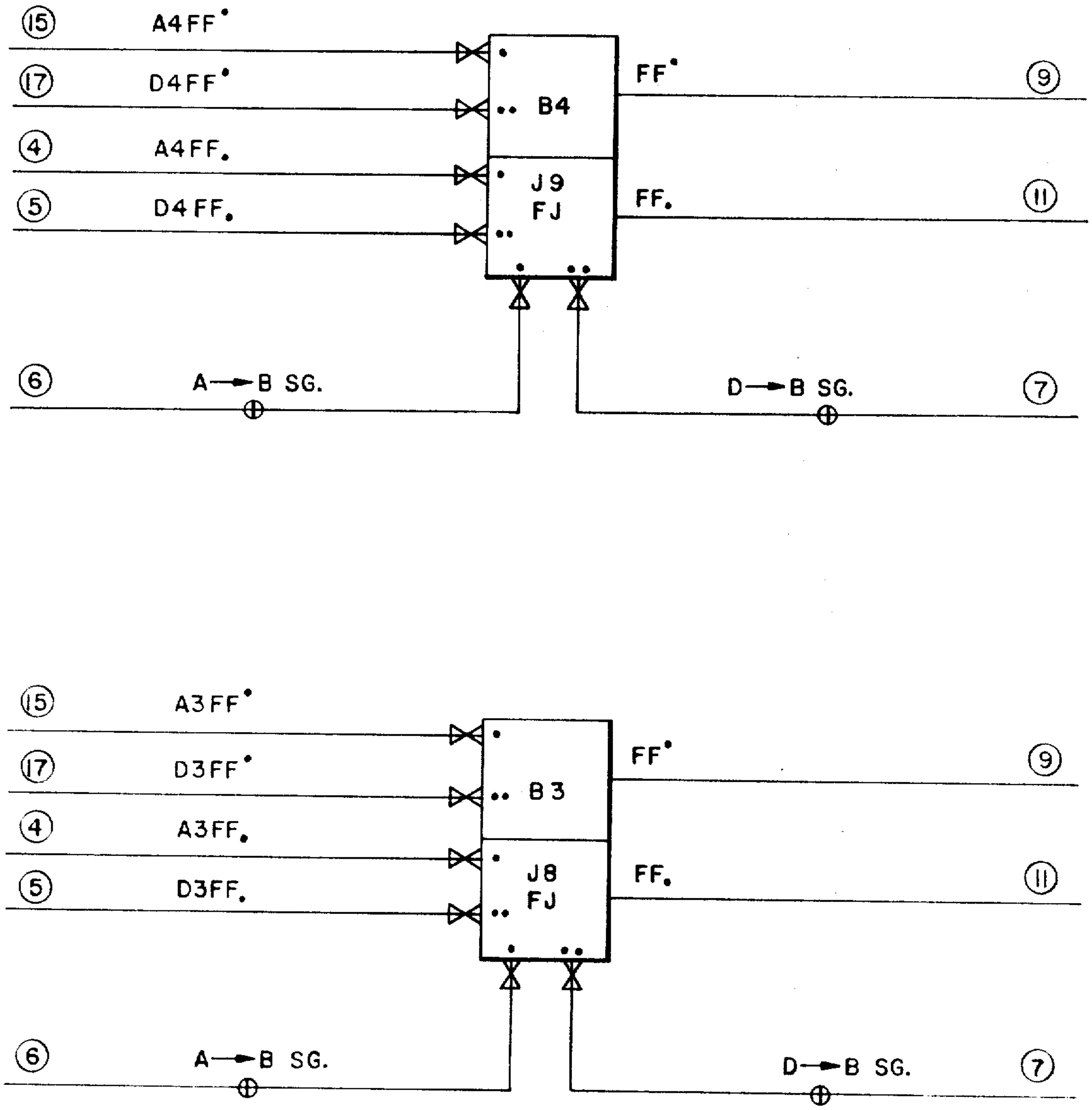
Figure 268:
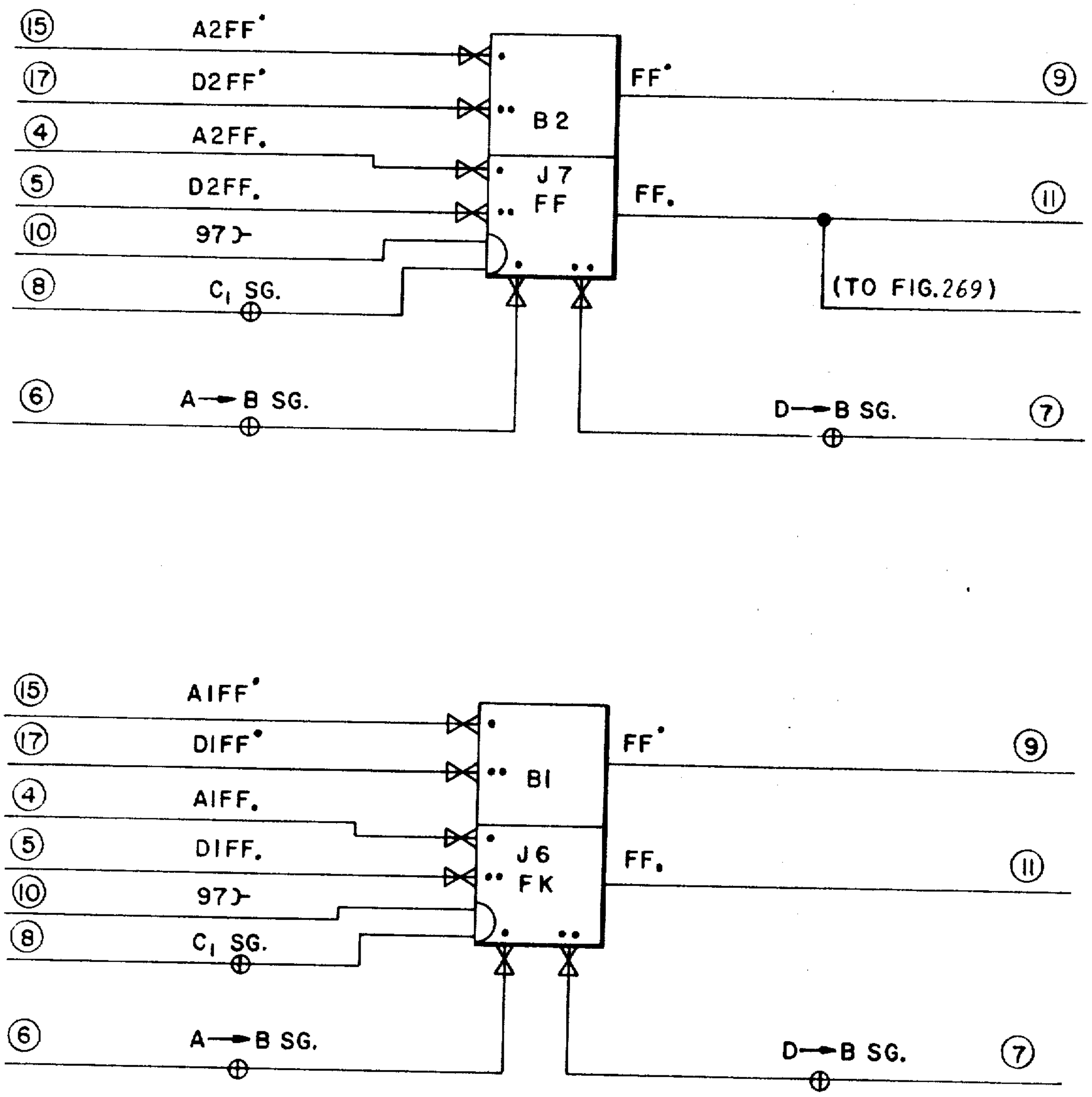
Figure 269:
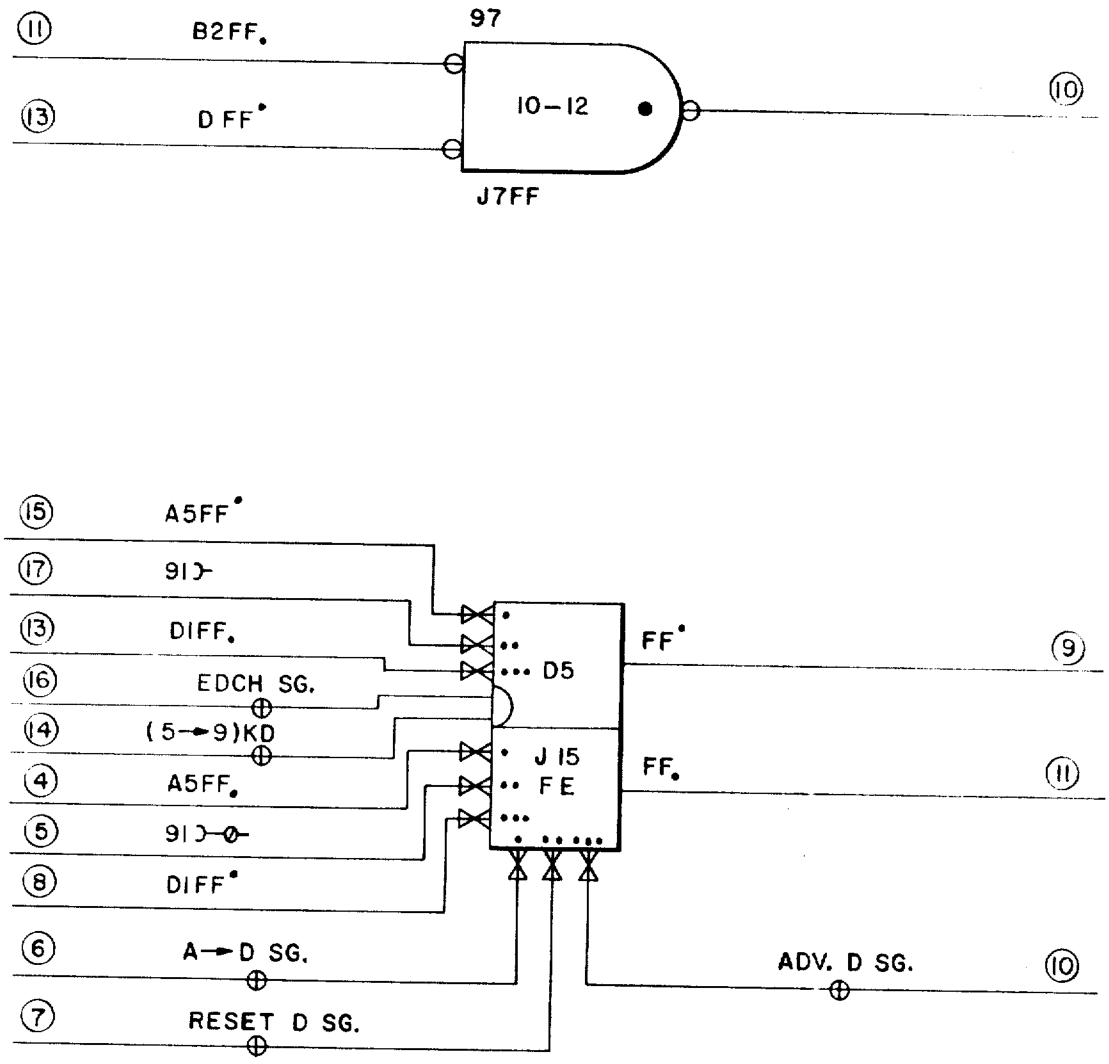
Figure 220:
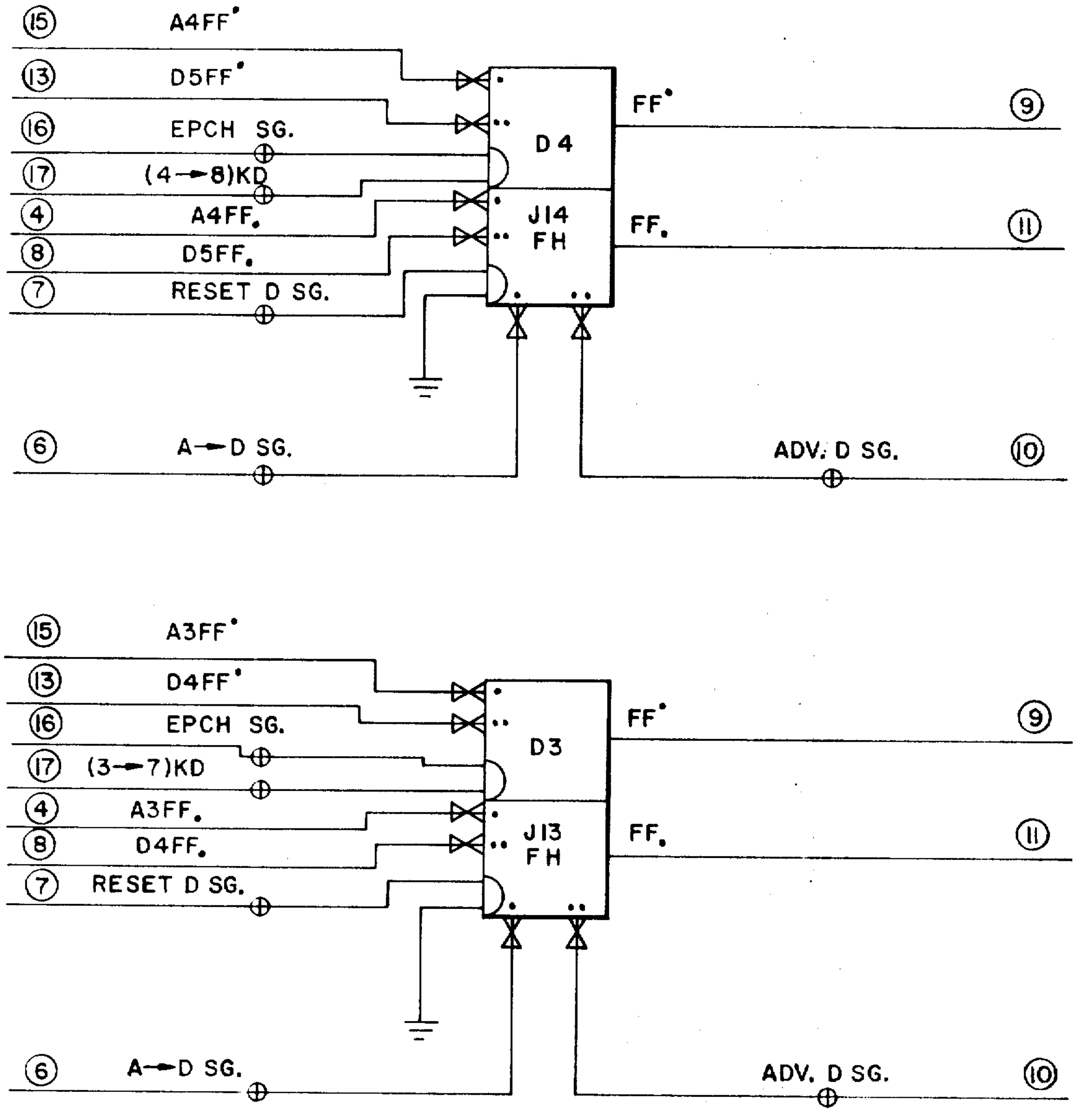
Figure 271:
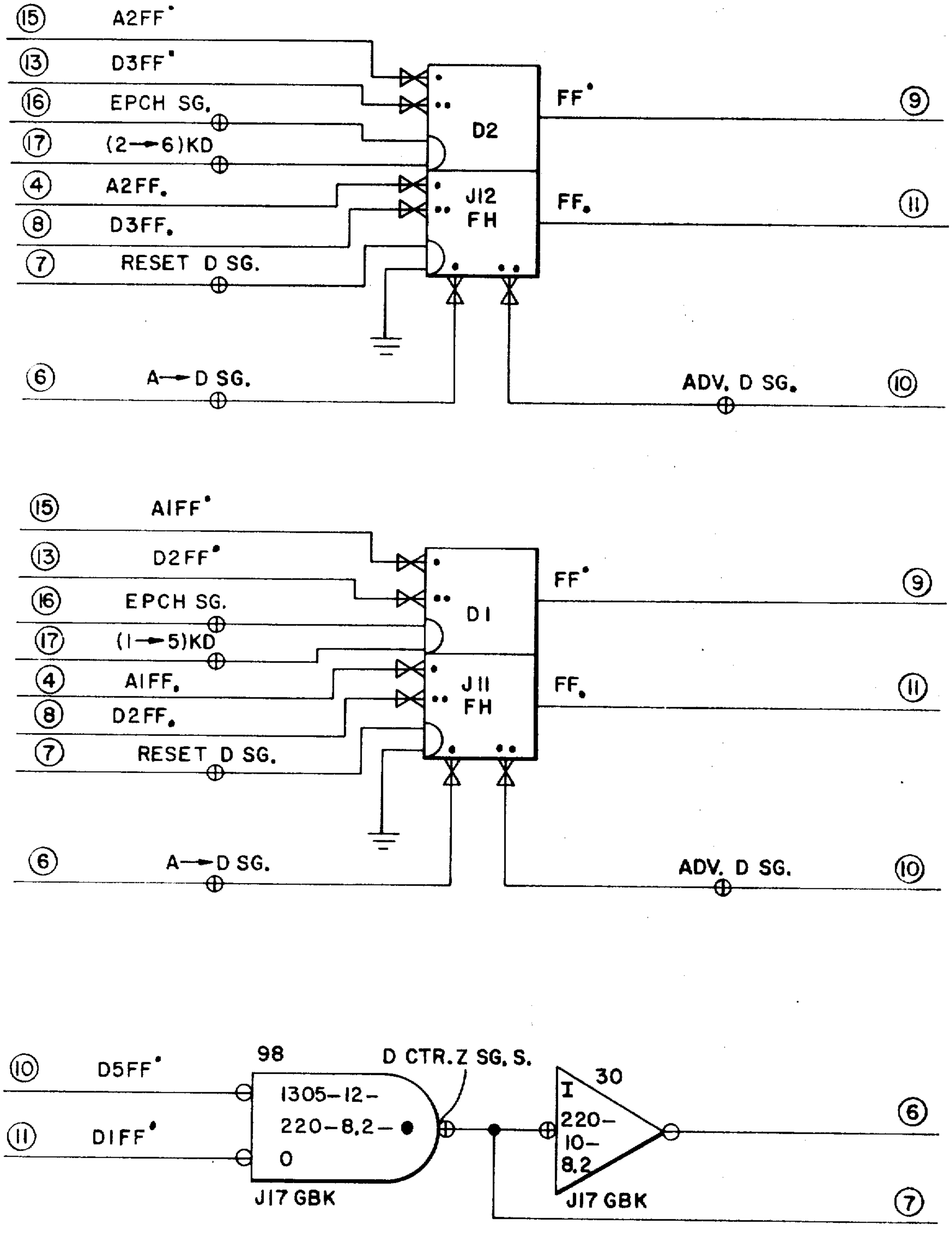
Figure 222:
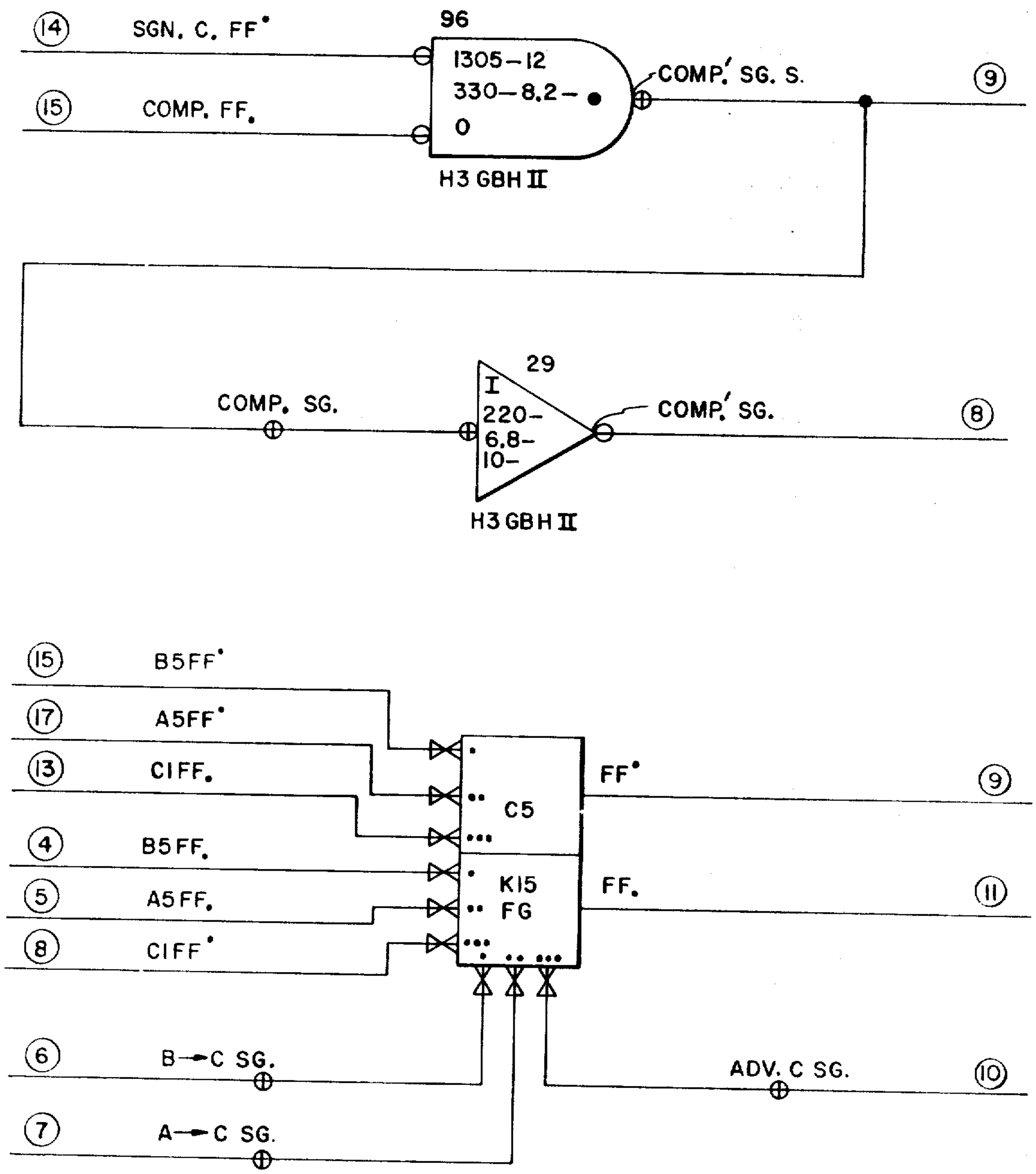
Figure 223:
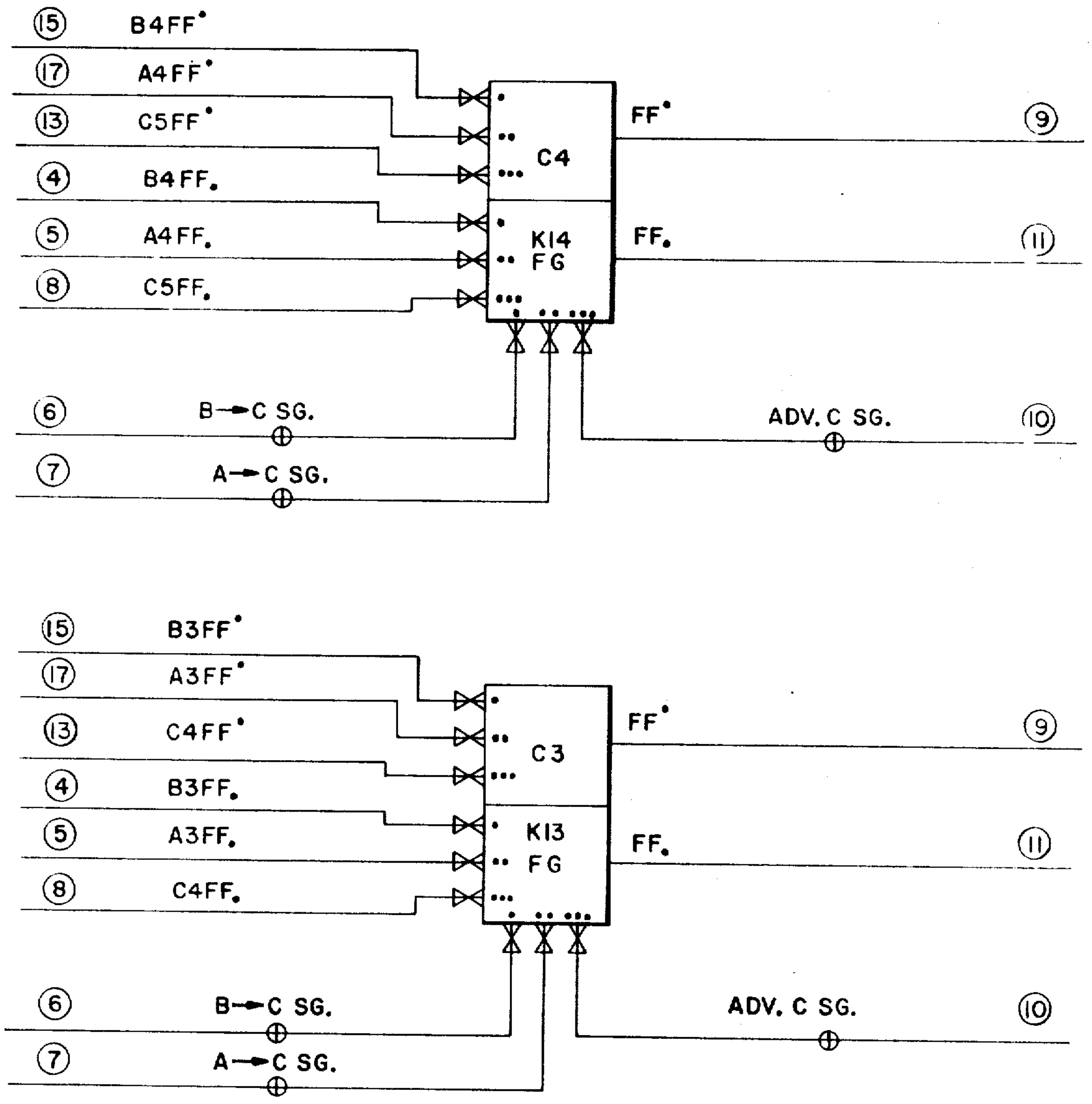

Memory unit 50 comprises a write amplifier 52, a delay line 54, and a rear amplifier 56. Write amplifier 52, which is shown in detail in FIG. 201, is coupled to delay line 54 as shown in FIG. 276. Delay line 54 is coupled to read amplifier 56 in the manner illustrated in FIG. 276. Read amplifier 56, which is shown in detail in FIG. 198, is coupled to A counter 32 of arithmetic unit 30 via gate 90 as shown in FIGS. 260 and 261 (FIG. 306). Read amplifier 56 is also coupled to D counter 38 of arithmetic unit 30 via gate 89 as shown in FIGS. 260 and 261 (FIG. 306).

Figure 284:
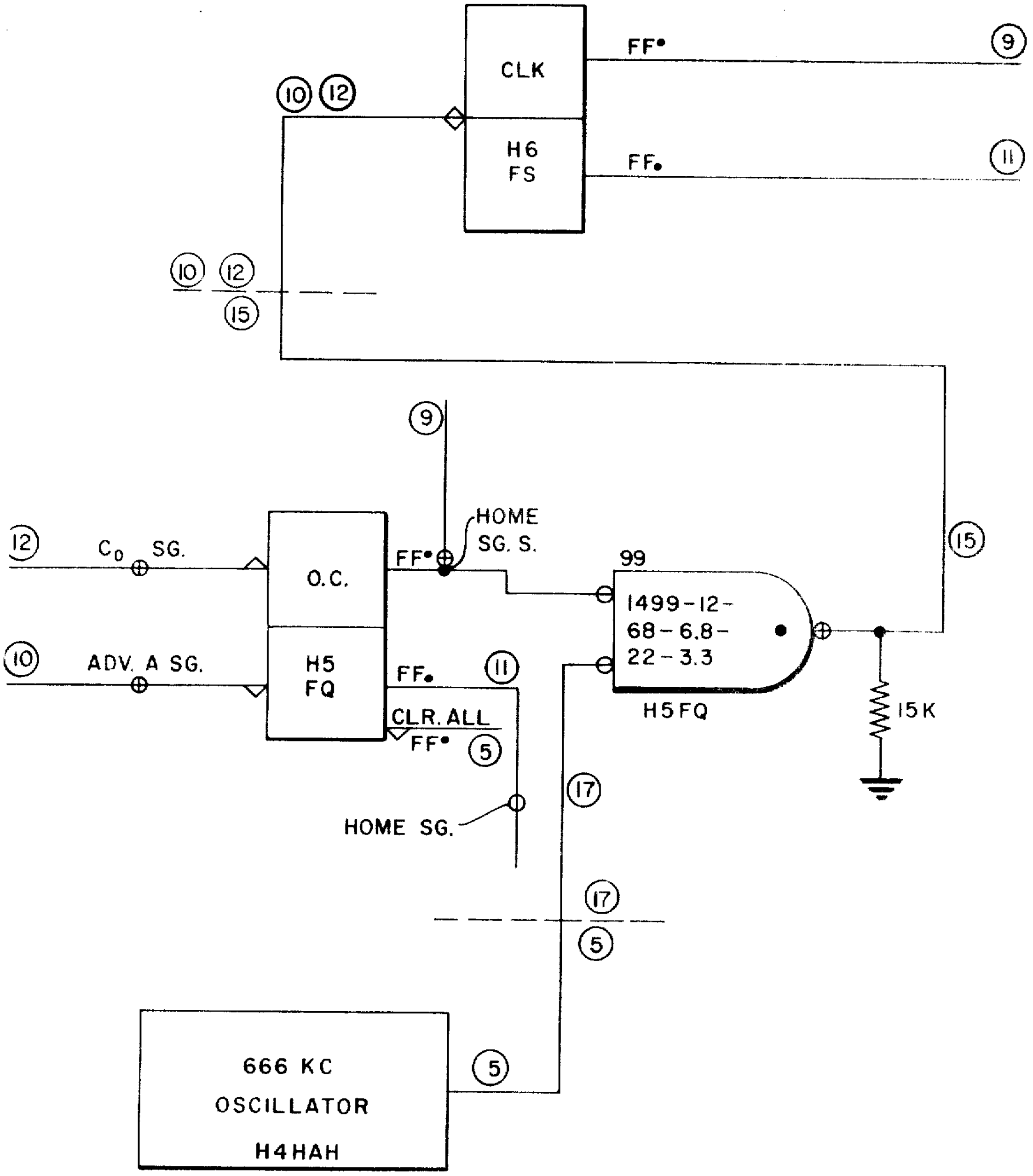
Figure 285:
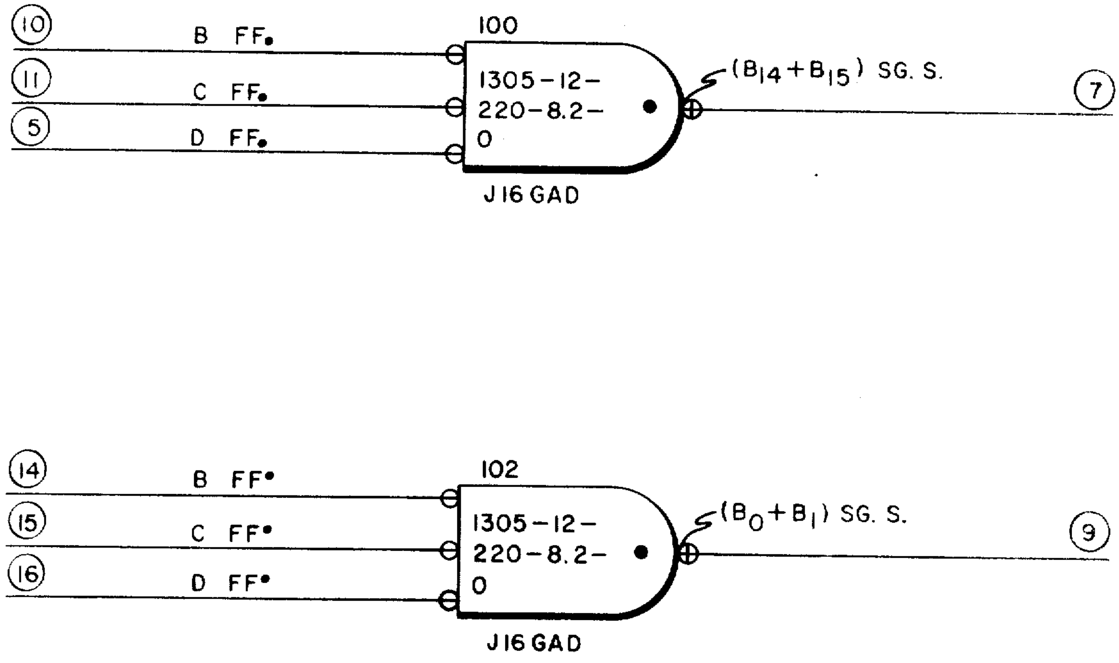
Figure 286:
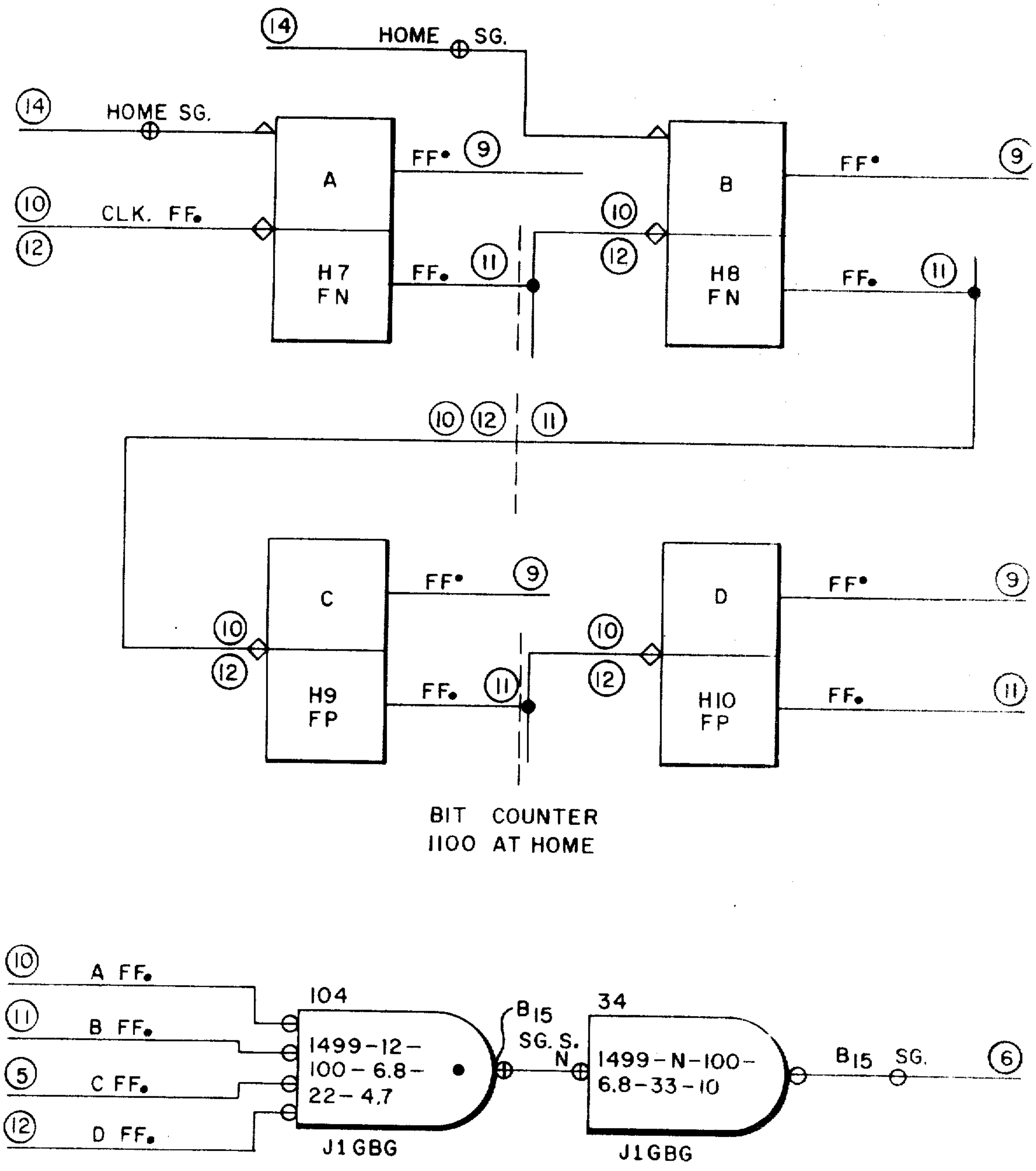
Figure 28B:
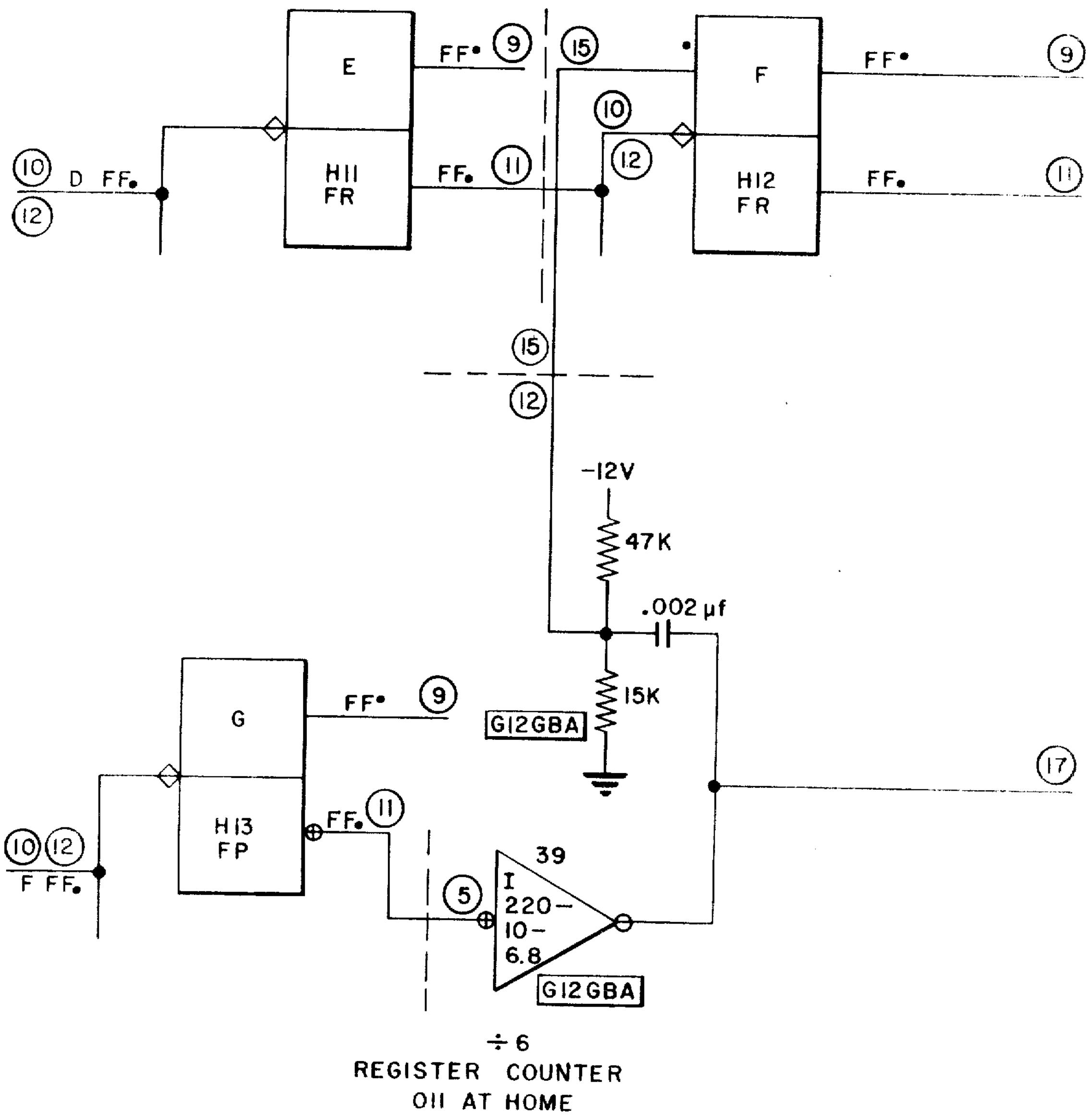
Figure 289:
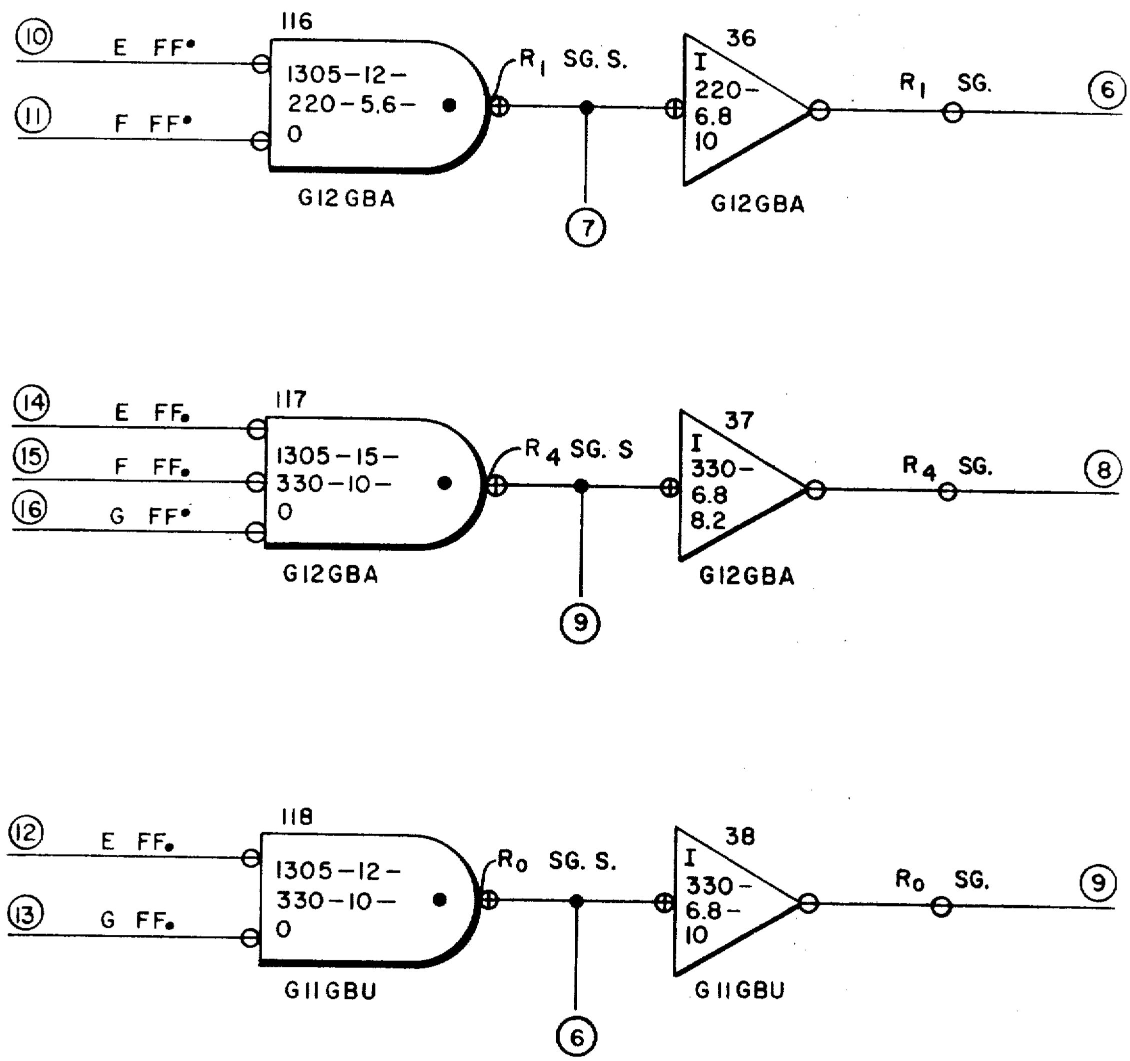
Figure 290:
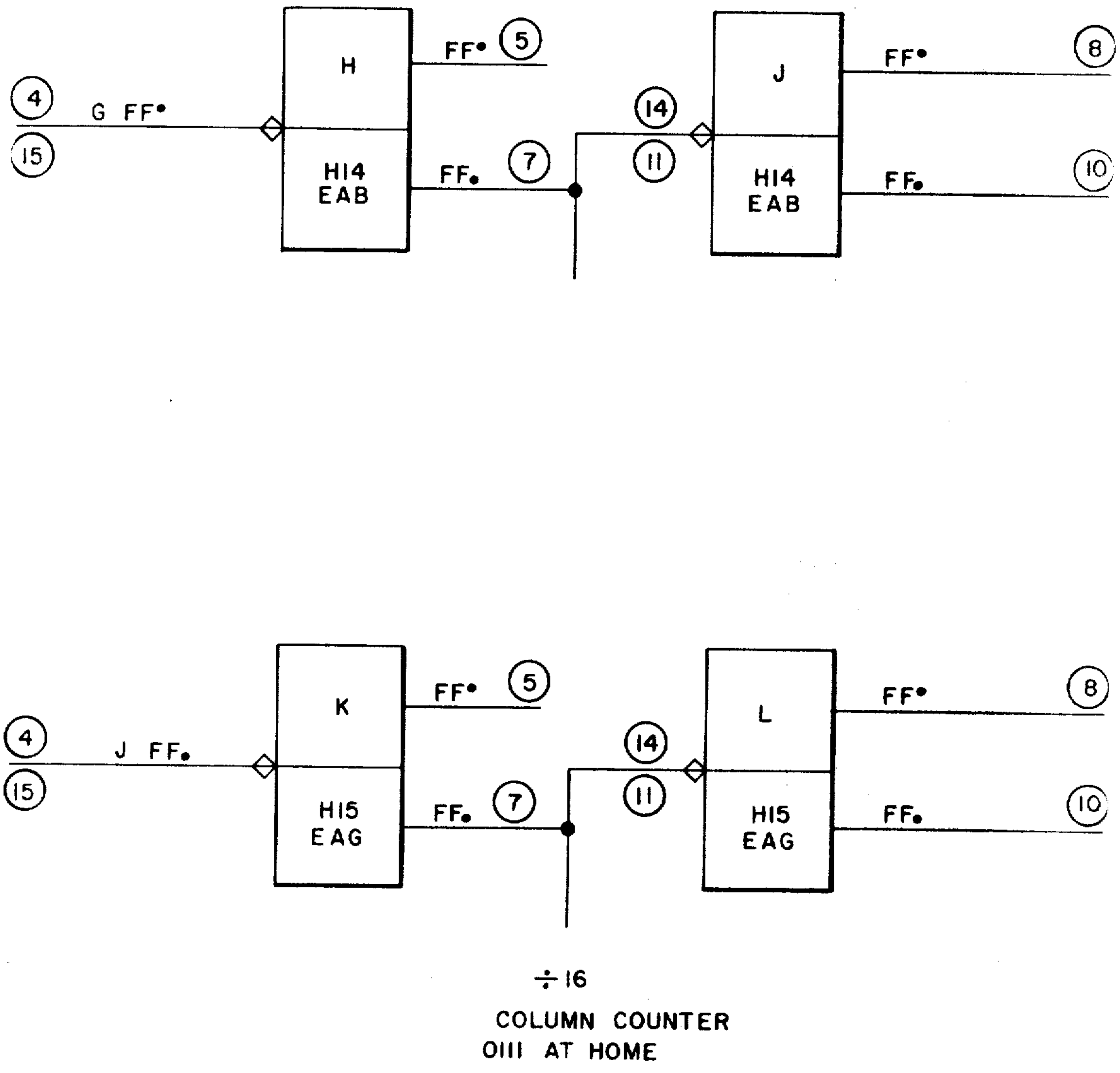
Figure 291:
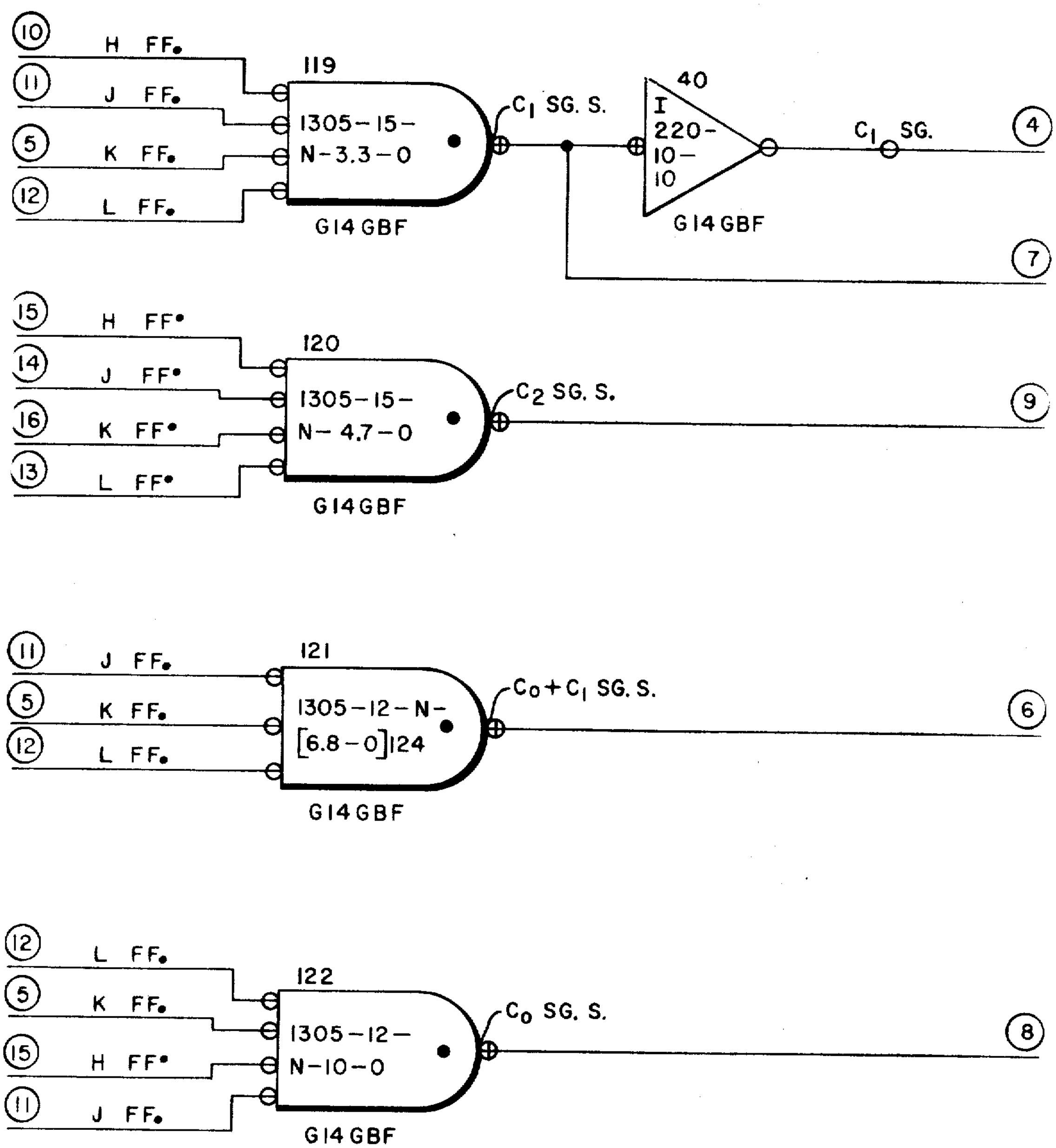
Figure 293:
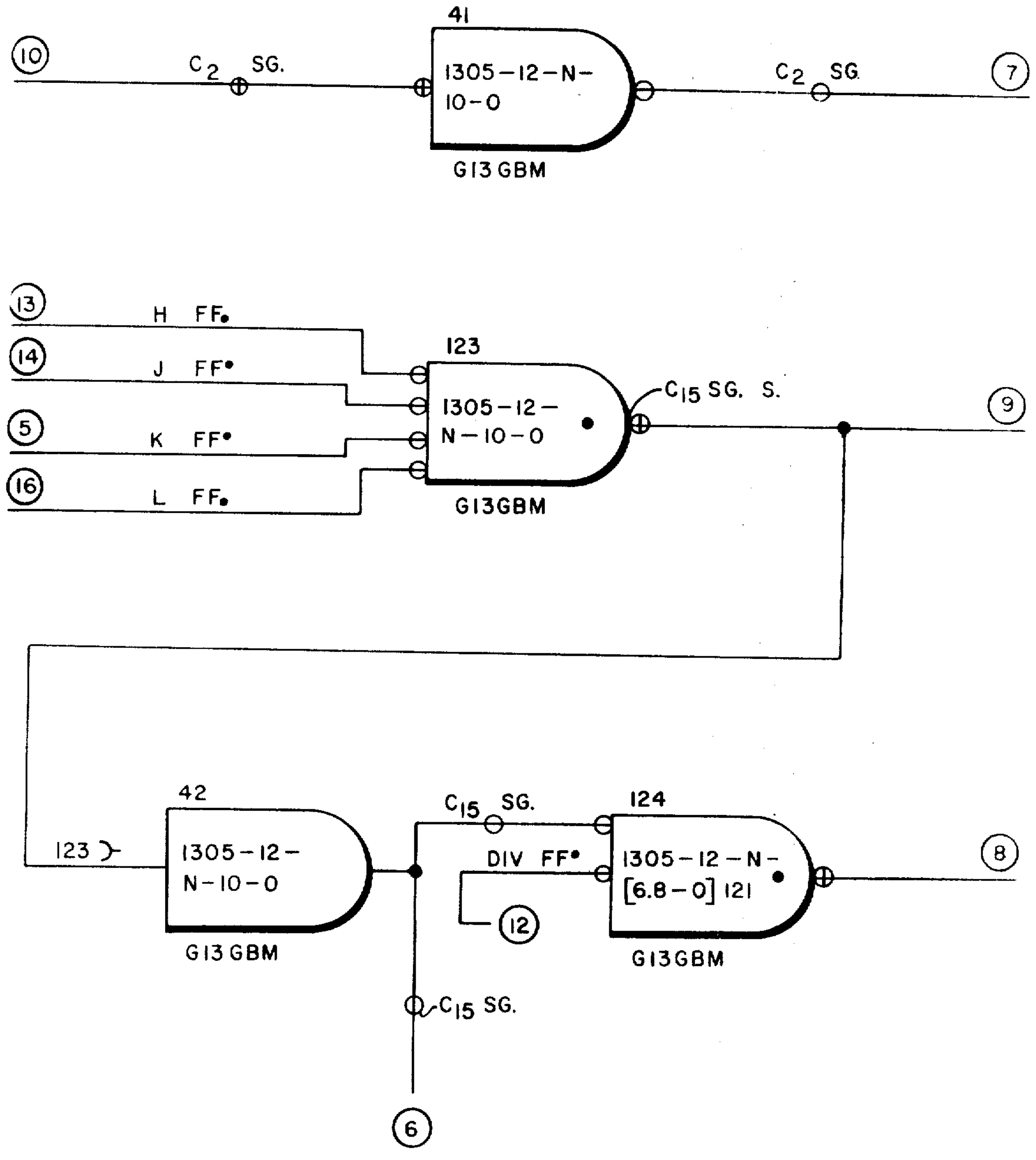

Timing unit 60, which provides timing signals to the other five basic units, comprises six major components—an oscillator 62, a clock 64, a bit counter 66, a register counter 67, a column counter 68, and a display counter 69. Oscillator 62, shown in detail in FIG. 200, is coupled to clock 64 via gate 99 as shown in FIG. 284. Clock 64, in turn, is coupled to the first of a series of interconnected flip-flops, the first three of which comprise bit counter 66, as shown in FIG. 286. Bit counter 66 is coupled to register counter 67, which comprises the next four interconnected flip-flops as shown in FIGS. 286 and 288. Register counter 67 is coupled to column counter 68, which comprises the succeeding four interconnected flip-flops as shown in FIG. 290. Column counter 68 is coupled to display counter 69 via gates 120 and 122 as seen in FIG. 291 and gate 123 as shown by FIG. 293. The interconnections between the various components of timing unit 60 and the other basic units are schematically portrayed in the logic diagram (FIGS. 297–313) and specifically shown in the circuit diagram, FIGS. 225–294.

General operation

The general operation of the preferred embodiment of FIG. 372 can be best understood by assuming a problem, for example addition of the digits "2" and "7." To begin, the operator actuates the digit "2" key of keyboard 12. This keyboard information is translated into machine instruction signals by encoder circuit 14 and presented to the input circuit of D counter 38 but does not enter the D counter at this time. Encoder circuit 14 also presents decimal alignment information to decimal point counter 22 and causes entry phase counter 26 to begin cycling through a predetermined program.

If the digit "2" is the first digit of a number to be entered (which is true in this case), entry phase counter 26 initiates a SHIFT UP, by actuating shift control logic circuit 29, whereby the contents of the recirculating registers R1, R2, R3 and R4 of the delay line memory are shifted up. This step requires a single pass of the field word through arithmetic unit 30 and, as discussed in detail, in Section 16.7.5, results in all zeros in register R1.

The SHIFT UP is accomplished by transfer of the data from A counter 32 to D counter 38, and simultaneously from the D counter to B counter 34 during every R1, R2, R3, and R4 register time. It is noted that during SHIFT UP, their is no direct transfer from A counter 32 to B counter 34 during any of these register times. Also, during RS and RO register times, data follows the normal path from A counter 32 to B counter 34 to C counter 36.

Entry phase counter 26 next initiates a SHIFT LEFT R1 by actuating shift control logic 29, whereby the contents of register R1 are shifted one column to the left. As discussed more fully in Section 16.4, this SHIFT LEFT R1 first causes the data (the digit "2") that was initially present to the input circuit of D counter 38 to be entered into the D counter, and then causes this data to be inserted into the memory loop at the C2R1 position, i.e., during Column 2, Register-1 time. SHIFT LEFT R1 is accomplished by initiating a transfer from A counter 32 to D counter 38 and simultaneously from the D counter to B counter 34 during each R1 register time. At such time, there is no direct transfer from A counter 32 to B counter 34. During the remaining register times (RS, R0, R2, R3, and R4) data follows the normal path. As with the SHIFT UP step, SHIFT LEFT R1 takes place during one pass or cycle through arithmetic unit 30.

After the SHIFT LEFT R1 step, the calculator returns to the IDLE condition. Digit "2" now appears in the C2R1 position of the recirculating information.

During the SHIFT UP and SHIFT LEFT procedures and during any rearrangement or modification of the data contained in the respective register positions, visual readout device 46 is blanked. Blanking is achieved by applying a blanking signal from entry phase counter 26 to display intensity control circuit 42. It should be noted that, as discussed more fully in Sections 16.3 and 16.11, the register contents are displayed by visual readout device 46 during the cleared and the IDLE conditions only. At other times, entry phase counter 26 serves to blank readout device 46.

The operation of the calculator during DISPLAY mode is as follows. When data which is to be displayed appears in A counter 32, the data is shifted by parallel transfer or broadsiding into D counter 38. While in the D counter, this data controls display intensity control circuit 42, so that the proper segments that are necessary to trace out the digit on the screen of the cathode ray tube display are selected and intensified for visual readout.

Display deflection control circuit 44 deflects the electron beam of the cathode ray tube display so that the beam traverses the configuration of a figure eight and a decimal point for each column position of each register to be displayed. However, only those segments that correspond to the digit in the D counter will be intensified, while the other segments or strokes of the electron beam will be blanked. Display intensity control circuit 42 acts to energize the cathode ray tube, whereas display deflection control circuit 44 serves to deflect the electron beam generated by the cathode ray tube. For a more detailed discussion of machine operation during the DISPLAY mode, see Section 16.11.

As noted above, during the IDLE condition, the flow of data in memory unit 50 and arithmetic unit 30 is from delay line 54 to read amplifier 56, serially to A counter 32, then parallel or broadside from the A counter to B counter 34, parallel from the B counter to C counter 36, serially from the C counter to write amplifier 52 and then back to delay line 54. In this manner, a closed memory loop is formed in which information may be cycled repeatedly.

After entry of the digit "2," the ENTER key of the keyboard is depressed. Actuation of this key establishes that the last digit of a number has been entered into the memory unit. In this example, "2" is the first and last digit of the number. Entry phase counter 26 then causes shift control logic 29 to decimal align the number now entered in register R1.

The operator next inserts the next digit word, which in this example is the digit "7," and the calculator follows the same format as set forth above. In this case, during the SHIFT UP step, the digit word "2" is shifted up from register R1 to the next register R2, and then the digit word "7" is entered into register R1.

The operator then actuates the ADD function key in order to effectuate a summation of the digits "2" and "7." When the ADD key is actuated, encoder circuit 14 translates this action into machine commands. One output signal from encoder circuit 14 triggers entry phase counter 26 to cycle through a predetermined program, which is built into the machine.

The first step of the ADD program is decimal alignment, if necessary. This alignment is controlled by shift control logic 29 and decimal point counter 22. Shift control logic 29 shifts information in the R1 register to the left, until decimal point counter 22 determines that the number in register R1 is decimally aligned. For a more detailed discussion of machine operation during decimal alignment, see Section 16.6.

Entry phase counter 26 next causes the information in Registers R1, R2, R3, and R4 to be shifted down by one register. The SHIFT DOWN action is controlled by shift control logic 29, which causes a direct transfer from A counter 32 to C counter 36 during R1, R2, R3, and R4 register times. As a result, the two digit words or numbers "2" and "7" which are to be added are placed in the R1 and R0 (M/D) registers, respectively. For a more detailed discussion of machine operation during this SHIFT DOWN action, see Section 16.7.3. Entry phase counter 26 then activates add logic circuit 28 so that addition can be performed by arithmetic unit 30.

Addition is performed by adding like-order digits to the data contained in registers R0 and R1 after the above-described SHIFT DOWN action. For each order, this is accomplished by transferring the R0 digit into A counter 32, inhibiting reset of the A counter, and then transferring the R1 digit into A counter 32 on top of the R0 digit. To illustrate, using the above example the R0 digit "7" is first sequenced into A counter 32 from read amplifier 56. Next, the normal between-transfer resetting of the A counter to zero is inhibited by shift control logic 29 in response to an enabling signal from add logic 28. Then, the R1 digit "2" is sequenced into A counter 32. Since A counter 32 still contains the count of seven at the beginning of this latter step, the result of this latter sequencing is a conut of nine ($7+2=9$) in the A counter. This resulting digit, the sum of the two digits, is then transferred in the normal way to B counter 34, then to C counter 36, etc. The above *sequence A—inhibit reset A—sequence A* action is followed for all orders C2–C14 of the R0 and R1 register digits, and is accomplished in one pass of the field word through the arithmetic unit 30. Upon conclusion of the ADD operation, the calculator returns automatically to IDLE condition and DISPLAY mode. For a more detailed discussion of machine operation during ADD, see Section 16.7.9.

To simplify illustration of the SUBTRACT operation, assume that digit words representing a minuend and a subtrahend have already been entered in registers R2 and R1, respectively, and decimal aligned, in the manner described above. The operator then actuates the SUBTRACT function key, which action is translated by encoder circuit 14 into machine commands. One output signal from encoder circuit 14 triggers entry phase counter 26, which causes the decimally aligned contents of registers R1, R2, R3, and R4 to be shifted down by one register in the same manner as has been described above in the discussion of the ADD operation so that the minuend and subtrahend are shifted into the R1 and R0 (M/D) registers, respectively. Next, entry phase counter 26 actuates subtract logic circuit 24 so that subtraction can be performed by arithmetic unit 30.

Subtraction is performed by complementary addition of like-order R0 and R1 digits, that is, each R1 digit is added to the complement of each like-order R0 digit. This is accomplished as follows. In response to an enabling signal from subtract logic 24, shift control logic 29 causes the R0 digit from read amp 56 to sequence D counter 38. Since, as described in Section 16.2.6, D counter 38 is a recedable digister, this sequencing of the D counter results in the complement of the R0 digit being developed in D counter 38. The complemented R0 digit is then parallel transferred or broadsided into A counter 32. The R1 digit is next sequenced into the A counter on top of the complemented R0 digit. The resulting digit, representing the remainder or difference between the original, like-order R1 and R0 digits, is then transferred in the normal way to B counter 34, then to C counter 36, etc. This action is followed for all orders C2–C14 of the R0 and R1 register digits and is accomplished in one pass of the field word through arithmetic unit 30.

At the end of this pass, if originally the subtrahend was larger than the minuend, the contents of the R1 register will represent the complement of the desired answer. In such a case, shift control logic 29, in response to an enabling signal from subtract logic 24, causes R1 data to be complemented and the arithmetic sign to be changed during a second pass of the field word through arithmetic unit 30. The arithmetic sign of the R1 data is changed by adding one to the C1R1 digit position (the sign digit position). The R1 data is complemented by sequencing D counter 38 directly from read amplifier 56 for each R1 digit. As noted above, sequencing the D counter causes the complement of the sequencing digit to be developed in D counter 38. This complemented digit is then parallel transferred to B counter 34, while the normal A counter to B counter transfer is simultaneously inhibited by shift logic 29. From B counter 34, the complemented R1 digit is transferred to C counter 36 in the normal way. After the R1 data has been complemented, the calculator returns automatically to IDLE condition and DISPLAY mode. For a more detailed discussion of machine operation during SUBTRACT, see Sections 16.7.10 and 16.7.11.

To simplify illustration of the MULTIPLY operation, assume that digit words representing a multiplier and a multiplicand have already been entered in registers R2 and R1, respectively, and decimal aligned. The operator then actuates the MULTIPLY function key, which action is transulated by encoder 14 into machine commands. One output signal from encoder circuit 14 triggers entry phase counter 26, which directs shift control logic 29 to shift the decimally aligned contents of register R1 down into the R0 register, and clear the R1 register. This is achieved by transferring data from A counter 32 to C counter 36 during each R1 register time and is discussed in detail in Section 16.7.12.

Multiplication is performed by repeated addition of the multiplicand in register R0 to the contents of register R1 a number of times which is controlled by the multiplier in register R2. This is accomplished by shifting R2 data left, leaving the highest order or most significant R2 digit (MSDR2) in D counter 38, and using this digit to control the number of ADD cycles. During each ADD cycle, the contents of register R0 (the multiplicand) are added to the contents of register R1 (initially zero). D counter 38 is sequenced after each ADD cycle is completed. When the digit in the D counter has been receded or counted down to zero, shift logic 29 causes the contents of register R1 to be shifted one column to the left during one pass of the field word through arithmetic unit 30, leaving the highest order or most signinficant R1 digit (MSDR1) in D counter 38 at the end of the pass. Shift logic 29 then causes the contents of register R2 to be shifted left during the next pass of the field word through arithmetic unit 30. At the beginning of this data pass, the digit in D counter 38 (MSDR1) is placed in the least significant digit (LSD) position of register R2 (the C2R2 position), while the most significant R2 digit (MSDR2) is left in the D counter at the end of this pass. This digit is then used to control the number of ADD cycles as described above.

Successive series of repetitive ADD cycles and SHIFT LEFT R1 and SHIFT LEFT R2 steps are performed until each digit of the original multiplier in register R2 has been used to control the repetitive ADD cycles. Since MSDR1 is relocated in LSDR2 once for each series of ADD cycles by the combined action of SHIFT LEFT R1 and SHIFT LEFT R2, after the original LSDR2 has been placed in D counter 38 and the D counter has been receded to zero, the product of the original multiplier and multiplicand will be located in register R2.

Entry phase counter 26 then causes shift logic 29 to shift down the contents of registers R2, R3, and R4 by one register. With the product now located in register R1, and the MULTIPLY operation completed, the calculator returns automatically to IDLE condition and DISPLAY mode. For a more detailed discussion of machine operation during MULTIPLY, see Sections 16.7.4 and 16.8.

To simplify illustration of the DIVIDE operation, assume that digit words representing a dividend and a divisor have already been entered in registers R2 and R1, respectively, and decimal aligned. The operator then actuates the DIVIDE function key, which action is translated by encoder circuit 14 into machine commands. One output signal from encoder circuit 14 triggers entry phase counter 26, which directs shift control logic 29 to shift the decimally aligned contents of register R1 down into the R0 register, and clear the R1 register. This is achieved in the same manner as discussed above in the description of the MULTIPLY operation.

Division is performed by repeated subtraction of the divisor in register R0 from the dividend which is progressively shifted from register R2 into register R1 and counting the number of successful subtractions. Subtraction is performed by complementary addition as described above in the discussion of the SUBTRACT operation. During the DIVIDE operation, the contents of register R0 are subtracted from the contents of register R1 and "1" is added to register R2 whenever the remainder in register R1 is positive. When the remainder is negative, entry phase counter 26 causes add logic circuit 28 to restore the former contents of register R1 by adding R0 to R1. Next, entry phase counter 26 causes shift logic 29 to shift the contents of register R2 one column to the left during one pass of the field word through arithmetic unit 30, leaving MSDR2 in D counter 38 at the end of the pass. Shift logic 29 then causes the contents of register R1 to be shifted left during the next pass of the field word through arithmetic unit 30. At the beginning of this data pass, the digit in D counter 38 (MSDR2) is placed in the least significant digit position of register R1 (C2R1 position). After this SHIFT LEFT R1 step, repetitive subtraction of R0 from R1 is again performed, "1" is added to register R2 for each successful subtraction until the remainder in register R1 again is negative, after which the contents of register R1 are restored and the above shifting operations are again performed.

Successive series of repetitive SUBTRACT cycles and SHIFT LEFT R2 and SHIFT LEFT R1 steps are performed until the least significant digit of register R2 has been shifted into the least significant digit position of register R1, successive subtract cycles have been performed, a negative remainder in register R1 has been obtained, and the contents of register R1 have been stored. Since "1" has been added to register R2 for each successful SUBTRACT cycle and since this sum has been shifted left once during each SHIFT LEFT R2 step, after the final restoration of the contents of register R1, the quotient of the original dividend and divisor will be located in register R2.

Entry phase counter 26 next causes shift logical 29 to SHIFT DOWN the contents of register R2, R3, and R4 by one register. With the quotient now located in register R1, and the DIVIDE operation completed, the calculator returns automatically to IDLE condition and DISPLAY mode. For a more detailed discussion of machine operation during DIVIDE, see Sections 16.7.4 and 16.9.

In addition to the above-described data handling operations and suboperations, which set forth calculator operation during the four basic arithmetic operations of ADD, SUBTRACT, MULTIPLY, and DIVIDE, the calculator is also capable of performing other operations and suboperations such as CLEAR ALL and STORE which are not vital to an understanding of the simplified FIG. 372 block diagram. The action of the calculator components during these various operations and suboperations are set forth below in detail, e.g. in Sections 16.3 and 16.7.7.

Timing unit 60 provides the timing signals that determine the time relations between the various operations described herein. Clock circuit 64, which is driven by the output of oscillator 62, produces one pulse for each bit time. These pulses are applied in turn to bit counter 66, register counter 67, column counter 68 and display counter 69, the outputs of each of which define a discreet time interval related to the presentation of the data.

Although oscillator 62 runs continuously, the output of clock 64 is stopped by the leading portion of the first column time, i.e., CORS register time. Clock 64 is started by the appearance of the leading synchronization pulse each time the data is first made available at the output end of delay line 54. In this manner, the data is synchronized so that portions thereof may be properly identified relative to their respective register positions as the data is read off delay line 54 and also while the data is in the various portions of arithmetic unit 30. For a more detailed discussion of this start-stop feature of timing system 60. see Section 16.5.

16. OPERATION

16.1. The Logic Diagram

The detailed operation of the embodiment of the instant invention shown and described herein may best be understood in connection with the Logic Diagram which consists of FIGS. 297 through 313. Generally, the Logic Diagram is an abbreviated recapitulation of the circuit diagram of the instant invention as found in FIGS. 225 through 294, nearly all of the showings of specific circuit structure and parameters as found in the circuit diagram having been eliminated, and only that information retained which is essential to understanding the operation of the embodiment of the invention.

Many of the block symbols employed in the circuit diagram are also employed in the Logic Diagram. For instance, the flip-flop block symbols used in the circuit diagram, and defined in the flip-flop definition sheets, are used in the Logis Diagram substantially unchanged, except for the elimination of the printed circuit card location legend found in the lower half of each flip-flop block symbol in the circuit diagram.

Similarly, certain major subcircuit block symbols are employed herein in the same form in which they are used in the circuit diagram, for instance, the Decimal Position Signal Generator block symbols, the Display Matrix block symbol, etc. Some other major subcircuit block symbols, however, have been newly created for use in the logic diagram, viz., the Entry Unit (E/U) block symbol and the Memory Unit (M/U) and the timing Signal Generator (T/U) block symbols, each of which is described in detail hereinbelow. Additionally, the Horizontal Staircase Generator symbol as used hereinabove has been supplemented by the addition hereto of a phantom representation of a gate comprising part of the circuit represented thereby. This phantom addition is merely added for ease of understanding of the operation of the embodiment, and in no way represents any addition to the circuit represented by the Horizontal Staircase Generator block symbol.

For further simplification of the logic diagram, certain inverters are not represented herein by block symbols. Instead, the inversions of signals produced thereby are indicated by means of signal symbols. Thus, the fact that a PL-symbol is found on the output of gate 35, while an NL-symbol is found on the input of gate 8 and labelled "EPCE," indicates that inverting means is interposed therebetween. Where inverters are represented in the logic diagram, the widely used circular symbol having a cross-stroke at approximately 45° to the leads is employed. Cf., upper input of gate 59 at (4:1)*e*, FIG. 303, which includes inverter 17.

16.1.1. Coordinate Index Numbers: In order to facilitate the grouping of FIGS. 297 through 313 together into a single composite figure, called the "logic diagram," and to facilitate reference to specific portions of the logic diagram, a pair of numbers separated by a colon, and enclosed in parenthesis, is appended to the figure number found in each of these figures. These pairs of numbers are called hereinafter "coordinate index numbers." For instance, the figure designation "FIG. 297 (1:1)" is found in FIG. 297. The term "(1:1)" is the coordinate index number of FIG. 297.

Figures constituting part of the logic diagram will at some places hereinafter be referred to by their coordinate index numbers, rather than their figure numbers, when confusion will not result. Thus, FIG. 297 may also be referred to as "FIG. (1:1)." Similarly, FIG. 298 may hereinafter be referred to as "FIG. (1:2)."

The term of the coordinate index number to the left of the colon is called the "column number," and the term of the coordinate index number to the right of the colon is callel the "row number."

Employing the coordinate index numbers, FIGS. 297 through 313 may be assembled with facility to form the logic diagram. To do this, the first column of the logic diagram is assembled by placing FIG. (1:1) above FIG. (1:2), i.e., by assembling together the two figures having the column number 1, the single figure of this column having row number 1 being placed above the single figure of this column having row number 2. Similarly, the second column of the logic diagram is assembled by placing FIG. (2:1) above FIG. (2:2), and placing these two figures immediately to the right of the two figures making up column one, viz., FIGS. (1:1) and (1:2). This process is repeated until the entire logic diagram of sixteen figures is assembled, the two figures constituting the right-hand column of the completed logic diagram being FIGS. (8:1) and (8:2).

Once the coordinate index numbers have been employed to assemble FIGS. 297 through 313 into the logic diagram, they can then be employed as an easy means of reference to specific portions of the logic diagram. For instance, FIG. (5:2) may easily be located within the logic diagram by counting, from the left, to the fifth column of the logic diagram, and then dropping down to the second row (lower figure) of that column.

The FIG. (5:2) section of the logic diagram will hereinafter be referred to at some places merely as "section (5:2)," or "(5:2)," and the same abbreviation practice will be adopted hereinafter with respect to the other figures of the logic diagram.

In addition, to further facilitate reference to particular sections of the logic diagram, each figure area of the logic diagram is considered to be subdivided into six equal sections numbered as shown in FIG. 312. According to this practice, for example, the Horizontal Deflection Amplifier would be referred to as "found in section (8:2)*f*," or "at (8:2)*f*."

16.1.2. Abbreviated Gate Symbols: In order to promote compactness of the logic diagram, the gate symbols employed therein are considerably abbreviated as compared with the gate symbols employed in the circuit diagram.

Since, however, the same series of gate numbers is applied to the abbreviated gate symbols found in the logic diagram as is applied to the more detailed gate symbols found in the circuit diagram, the specific details of any gate found in the logic diagram may be determined by finding the correspondingly numbered gate in the circuit diagram.

To avoid continual reference to the circuit diagram while studying the logic diagram, the abbreviated gate symbols employed in the logic diagram have been devised so that, when considered in connection with the type-letter juxtaposed thereto, each abbreviated gate symbol may easily be interpreted to disclose its electrical and logical operation. For a full explanation of this brief method of interpreting the abbreviated gate symbols, reference should be had to the sheet containing FIGS. 324 through 331, described in Section 13 of this specification.

Due to the availability of this easily interpreted symbology, conjoint signal symbols will be employed with the abbreviated gate symbols in the logic diagram only where the nature of a named signal is specified thereby, or some other special reason for so doing obtains.

The abbreviated symbols for the dynamic gates comprising the parallel input to the Entry Phase Counter (see FIG. 301) may be easily understood by reference to FIGS. 8 and 10, and the accompanying text.

16.1.3. Abbreviated ANDOR Gate Symbol: The method of representing an ANDOR gate in the logic diagram is shown at (4:1)*e*. As noted hereinabove, this ANDOR gate "60+61+62" consists of gates 60, 61, and 62, the output terminals of which are directly connected to a common point, which point serves as the common output of these gates. The ANDOR gate symbol shown at (4:1)*e*, on the other hand, shows a fourth, semicircular gate symbol at the common point. It should be clearly understood that this fourth gate symbol is included merely to indicate, for easier reference, the logical function of the ANDOR gate structure, and does not imply that this ANDOR gate group includes an additional gate circuit not found in the 60+61+62 ANDOR gate as shown in the circuit diagram in FIG. 251.

16.1.4. Location of Gates: In order to facilitate location of any specific gate in the course of studying the logic diagram, the gates shown in the logic diagram have been arranged in vertical columns, with few exceptions largely found in the Arithmetic Unit. Thus, if it is desired, for instance, to find gate number 36, having the assembled logic diagram available, it is merely necessary to determine the number of some gate on the logic diagram and proceed in numerical order to find the desired gate, proceeding through the columns of gates in descending order of gate numbers if the number of the gate so determined has a higher number than the number of the desired gate, or vice versa.

As will be explained in detail hereinbelow, a plurality of the gates found in the circuit diagram are incorporated in block symbols found in the logic diagram, e.g., the Timing Signal Generator (T/U) and thus, the series of gate numbers found in the logic diagram appended to the abbreviated gate symbols will not be complete.

For expository reasons, the numbers assigned to the gates found on sheets 5:1, 6:1, 7:1, and 6:2 do not follow the columnar series found in the other figures.

16.1.5. Abbreviated Entry Unit Symbol: For compactness, the portion of the device of the invention which provides signals indicating the depression of keys, called the "Entry Unit" or "E/U," is represented in the logic diagram by means of a single block symbol, a part of which appears in FIG. 297 1:1, and a part of which appears in FIG. 298 1:2, and which is labelled "E/U." All of the keys of the embodiment are shown upon this block symbol, and the terminals of this block symbol are designated by distinguishing lower-case letters in the manner set forth in Section 11.3.

This Entry Unit block symbol (FIGS. 297 and 298) represents that portion of the circuit of the embodiment which consists of the following flip-flops and major subcircuits:

The CLR. ALL, SUB., ADD, CLR. ENT., CHG. SGN., REPT., MULT., DIV., C. F., COM. DIG., STORE, and RECALL flip-flops.
Inverter 1
Function Signal Generator
Common Key Signal Generator
Digit Signal Generator The output terminals *a* through *l* of the E/U may be seen to be logically connected to the super dot terminals of the flip-flops named thereupon. It should be noted at this point that, in the logic diagram, it is the general practice to carry forward only one of a pair of signals which are merely the inverse of each other, since the provision of an inverter is well known and within the skill of workers in the art, and would tend to obfuscate, rather than clarify, the logic diagram. If it is desired, for instance, to indicate the presence of the signal which is the inverse of that found upon the *h* terminal in some other part of the logic diagram, then the lead in the remote part of the logic diagram upon which this inverse signal appears will have the legend "DIV FF." thereupon.

The *m* terminal of the E/U block symbol is a terminal directly connected to terminal 1 of the Function Signal Generator.

The *n* terminal of the E/U block symbol is a terminal directly connected to the output terminal *a* of the common Key Signal Generator.

The *w* through *aa* output terminals of the E/U block symbol are terminals directly connected to the *b* through *f* terminals of the Digit Signal Generator, respectively. That is to say, the *w* terminal of the E/U block symbol corresponds to the *b* terminal of the Digit Signal Generator, the *x* terminal of the E/U block symbol corresponds to the *c* terminal of the Digit Signal Generator, etc.

The *ab* output terminal of the E/U block symbol is a terminal directly connected to the *a* output terminal of the Reset Signal Generator.

The *o* input terminal of the Entry Unit block symbol is directly connected to reset inputs of the flip-flops named in the legend appearing thereupon.

The *p* input terminal of the E/U block symbol is directly connected to the dynamic input of superdot independent gates found in the flip-flops named in the left-hand square brackets appearing thereupon.

The *q* input terminal of the E/U block symbol is directly connected to the dynamic inputs of two superdot independent gates, one contained in the MULT. flip-flop and one contained in the DIV. flip-flop.

The *r* terminal of the E/U block symbol is directly connected to reset inputs of the flip-flops named in the legend appearing thereupon.

The *s* input terminal of the E/U block symbol is directly connected to the left reset terminal of the CLR. ALL flip-flop.

The *t* input terminal of the E/U block symbol is directly connected to the left reset terminal of the STORE flip-flop.

The *u* input terminal of the E/U block symbol is directly connected to the A.C. input of the upper independent gate of the RECALL flip-flop.

The *v* input terminal of the E/U block symbol is directly connected to the left reset inputs of the flip-flops named in the legend appearing thereupon.

Further interconnections between the elements of the Entry Unit listed above may be found in the circuit diagram.

16.1.6. Abbreviated Digit Register Symbols: To facilitate study of the logic diagram, single-digit registers, or "digisters," A, B, C and D have been shown in FIGS. 305, 307, 309 and 308 by means of certain arbitrarily adopted abbreviating conventions.

These abbreviating conventions may be simply stated as follows:

(1) Each one-digit register, or "digister," is represented by a heavy-line rectangle (labelled "OUTLINE" in FIG. 307). This heavy-line rectangle will hereinafter be called the "heavy outline," or "digister outline."

(2) Within the digister outline representing a given digister are located flip-flop outlines representing the five flip-flops of that digister. These flip-flop outlines include no output terminal symbols, and symbols for only such input terminals as are not common to all of the flip-flops of the digister.

(3) The inputs to a given digister may be thought of as divided into two classes;

(a) "common inputs," which are found in each flip-flop of the digister, and
(b) "unique inputs," which are found in less than all of the flip-flops of the digister.

(4) The lines representing the common inputs of a given digister are brought to, and terminate at, the digister outline, it being understood that such a lead, by implication, represents the interconnections to the corresponding inputs of all of the flip-flops of the digister, as shown in detail in the circuit diagram.

(5) The unique inputs of each digister are shown in detail by lead lines extending through the digister outline and interconnected with the unique input symbols shown on the flip-flop outlines therewithin to represent the full circuitry of the unique inputs.

(6) One example of these conventions is found in FIG. 309 wherein a digister is shown (the "C-digister") which has no unique inputs. The inter-digister transfer inputs of the flip-flops of this digister (viz, the D.C. transfer inputs of flip-flops C1, C2, C3, C4, and C5) are not unique because they affect each flip-flop in the same way, that is, each inter-digister input transfers to its flip-flop the state of the corresponding flip-flop in another digister. Thus, since the inter-digister inputs of the flip-flops of the C digister are not unique, they are not represented in FIG. 309 by leads passing through the digister outline. In fact, the convention is adopted in the logic diagram of not showing the inter-digister transfer means at all, since the function of these means is essentially passive, and need not be considered in detail in describing the operation of the device of the invention. The omission of any showing of the inter-digister transfer means from the logic diagram does not, of course, imply that they are missing from the device represented by the logic diagram, since, as stated hereinabove, the logic diagram is an abbreviated representation of the circuit diagram containing only so much of what is shown in the circuit diagram as is essential to describing the operation of the device of the invention.

Figure 274:
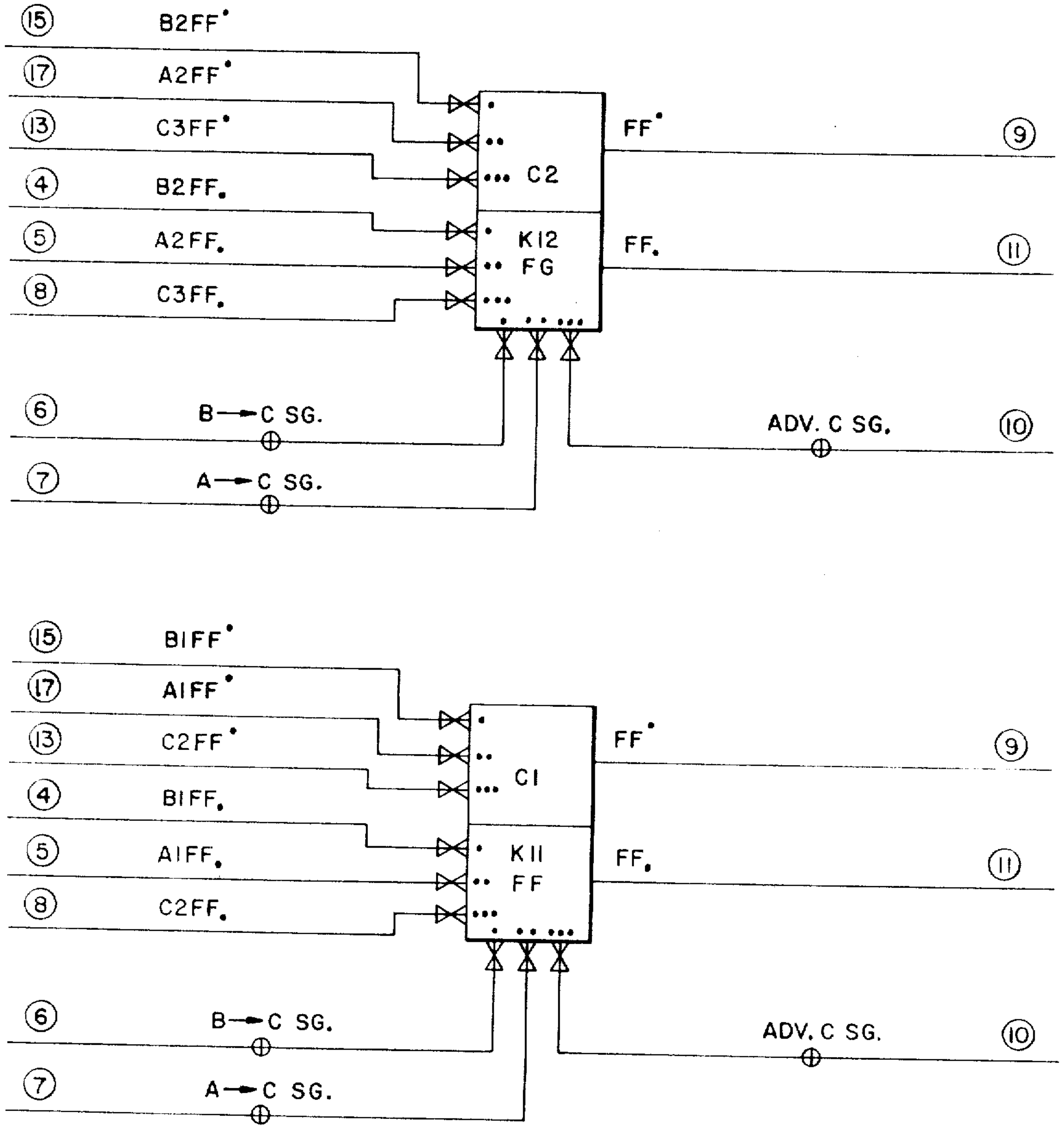
Figure 225:
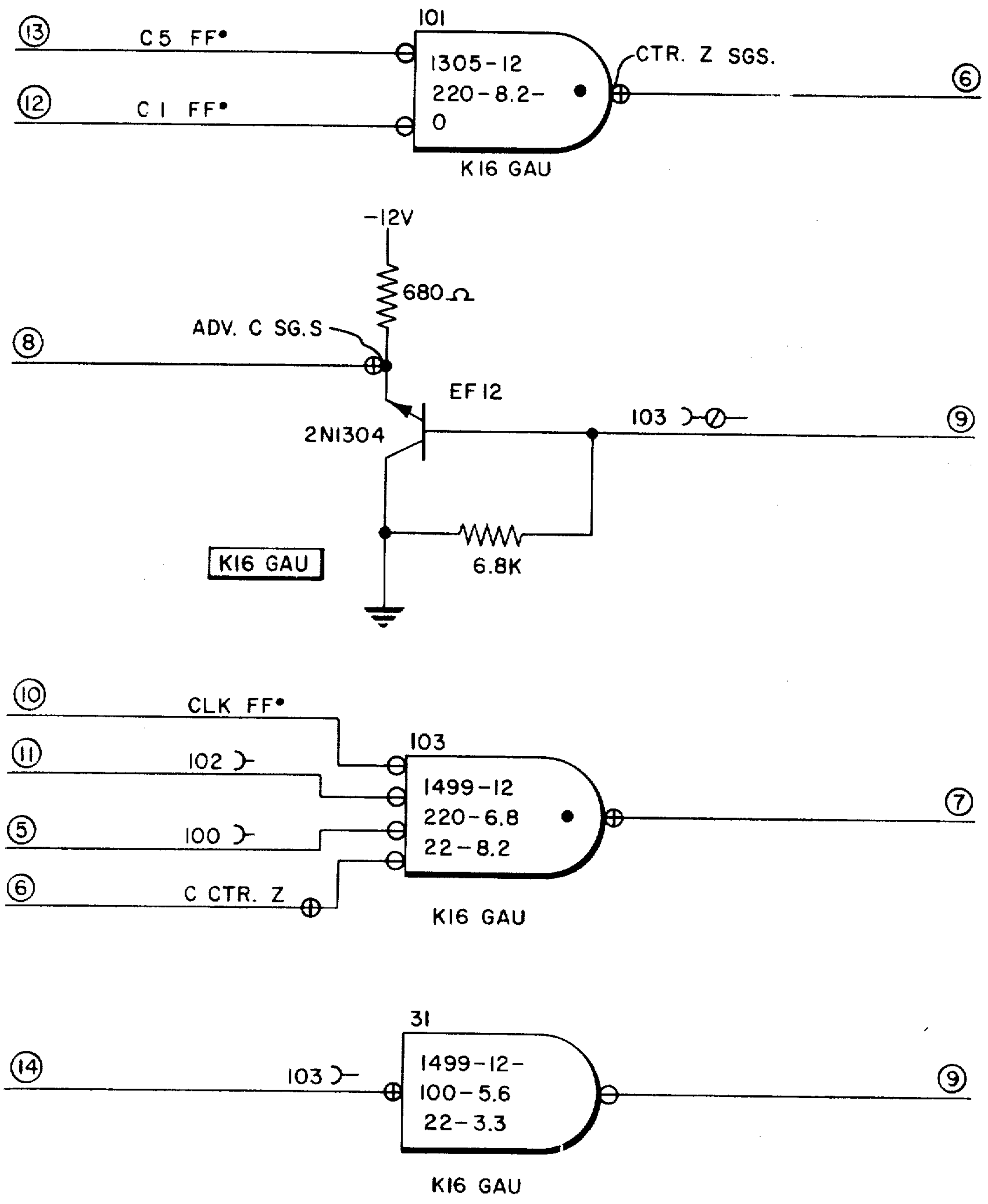

As may be seen in FIGS. 272, 273, and 274, the $X_c$ inputs of the flip-flops of digister C are not unique. Taking the $X_c$–1 inputs of the flip-flops of the C-digister as an example, it may be seen that the same signal train is supplied to all of them. The same conclusion applies to the $X_c$–2 and $X_c$–3 input of the flip-flops of the C-digister. Thus, the $X_c$ inputs of the flip-flops of the C-digister are not unique, and, as shown in FIG. 309, these inputs are represented by three leads terminating at the bottom edge of the digister outline.

An example of the treatment of unique inputs is shown in FIG. 307 in connection with the B-digister. As may be seen from FIGS. 266, 267, and 268, the B1 and B2 flip-flops of digister B each have an independent gate input, independent gate inputs not being found in the other flip-flops of this digister. Thus, these independent gate inputs are clearly unique, in the sense in which the term is defined hereinabove. Since these independent gate inputs are unique, they are shown upon the B1 and B2 flip-flop outlines of FIG. 307, and their interconnections with the corresponding lead lines passing through the digister outline, viz, terminals *c* and *d* of digister B, are shown within the digister outline in FIG. 307.

All showing of the inter-digister transfer lines is omitted from the B-digister symbol of FIG. 307 in accordance with the practice described hereinabove, and the common inputs of the B-digister flip-flops (viz, the $X_c$–1 and $X_c$–2 inputs thereof) are represented by leads tangent to the digister outline.

The somewhat more complex systems of inputs of the A-digister and the D-digister are represented by the same conventions as described immediately above in connection with the input systems of the C-digister and the B-digister.

16.1.7. Abbreviated Timing Unit Symbol: The abbreviated Timing Unit symbol found in FIG. 311 and labelled "TIMING SIGNAL GENERATOR (T/U)" presents the timing wave generating portion of the device of the invention as shown in FIGS. 284, 285, 286, 288, 289, 290, 291, and 293. The signals produced by the various subcircuits of this unit shown in the figures listed directly above, are considered, in the logic diagram, to have their source upon the leads *c* through *z* located upon the left-hand edge of the T/U block symbol. The two-signals supplied to this unit by other portions of the device of the invention, for synchronizing the timing chain therewith, and desynchronizing it to leave the display free running when the machine is in the cleared state, are supplied to this unit via the terminals *b* and *a* at the bottom edge of the T/U symbol. The "cutaway" inset in the T/U block symbol is included for the purpose of clearly illustrating the manner in which the timing chain is synchronized, and desynchronized, during the operation of the device of the invention. It is to be noted that the counters of the timing chain are largely shown in very schematic manner in the inset, and the gates, as shown in the above-mentioned figures, which produce many of the timing signals listed on output terminals *c* through *z* are not shown in the inset at all. Therefore, for specific details of the circuitry included as part of the T/U circuit reference should be had to those portions of the circuit diagram listed directly above.

Since the operation of the flip-flops of the timing chain, and of the gates which provide those signals found on terminals *c* to *z* which do not come directly from flip-flop output terminals, or therefrom by way of simple inversion, will be apparent to those skilled in the art upon study of FIGS. 284, 285, 286, 288, 289, 290, 291, and 293, no further discussion will be given here of the operation of that portion of the timing chain. For the waveforms of the signals listed on terminals *c* through *z* of the Timing Signal Generator, reference may be had to FIGS. 318 through 322 and appendices A, B, C, D, E, F, G, H, I, and J.

The meaning of the various "WF," or waveform, tables found in the appendices listed directly above is believed to be apparent upon inspection. It should be noted, however, that the numerical values in these tables represent lapsed times from the starting of the timing chain expressed in clock periods (C.P.) of approximately 1.5 microseconds (see CLOCK PULSE WAVEFORM, FIG. 318). The nature of these tables can be understood by comparing any one of them with its corresponding waveform, which waveform represents graphically, but in part only, the waveform completely represented in the table. Taking Table WFE (Appendix E), and the corresponding waveform at the bottom of FIG. 319, as an example, it may be seen that the first numerical entry in the table is "0025." The first transition in the corresponding waveform takes place at time 0025, as may be seen from the legend "0025" placed upon the leftmost vertical line in the E FF· waveform, which represents that transition. As also may be seen in this waveform, the 0025 transition is preceded by an NL-Signal Period, and followed by a PL-Signal Period. Correspondingly, the entry in the table preceding the entry "0025" is "N," while the following entry is "P." From this example it may be seen how the tables indicated as corresponding to each of certain waveforms represent the same waveform in the drawings, but in more detail.

As indicated in FIG. 311, the signal having its source at output terminal *c* of the Timing Signal Generator may be designated the "N–N" signal, rather than employing the formal designation indicating the gating from which this signal is derived, which formal designation is also indicated at that output terminal. The reason for employing the term "N–N" may be seen when the more formal term designating the same signal is compared with FIG. 346. As seen in that figure, i.e., the field word diagram, the three colmun times during which the signal occurs, viz., $C_0$, $C_1$, and $C_{15}$, corresond to columns containing non-numerical data, except for the fifteenth column, which does contain numerical data during part of the division operation, and which gives rise to the need for the qualification of this signal by the DIV $FF_1$ signal. Thus, generally, this signal may alternatively be called the "N–N" signal because it indicates the occurrence of columns containing non-numerical data.

16.2 The Operation of the Digisters

Each of the digisters employed in the embodiment of the invention described herein comprises five flip-flops, each one of which has sets of transfer inputs, as defined hereinabove. The specific interconnections of these sets of transfer inputs, both within digisters and between digisters is shown in the circuit diagram. For easily understanding the operation of the Arithmetic Unit, however, it is well to review the function of the specific interconnections within each digister, and between digisters, at this point. First, however, it is well to note FIG. 295, wherein the states of the five flip-flops of a digister of the type used herein representative of each decimal digit which may be stored therein are stated. Disregarding the "KEY DEPRESSED" heading, and the flip-flop letter designation, "D," in FIG. 295, it may be seen that FIG. 295 constitutes a table of flip-flop settings corresponding to each digit which may be stored in a digister of the type used herein. Thus, when the decimal digit "0" is stored in one of the digisters, all of the flip-flops of that digister are in their "0" state, i.e., are reset. Going to the next column to the right in FIG. 295, it may be seen that when the decimal digit "1" is stored in a digister, the No. 1 flip-flop is set, and the other four flip-flops are reset. Taking the decimal digit "5" column of the table of FIG. 295 as an example it will be apparent that all of the flip-flops will be set when the decimal digit "5" is registered, or stored, in a digister.

16.2.1. Parallel Entry of Decimal Digits: In the embodiment of the invention shown and described herein digits are transferred between digisters, and into the Digister from the Entry Unit in the parallel, or simultaneous, mode. However, as will be evident to those skilled in the art upon reading the instant disclosure and consulting the drawings, inter-digister transfers could be made in the serial, or sequential, mode, though at some expense in speed of operation. Thus, though the means employed in the embodiment shown herein for transferring digits between digisters, and from the Entry Unit to the Digister, operate in the parallel, or simultaneous, mode, the scope of the instant invention is not limited to devices employing the parallel mode of transferring digits between the digisters, or one-digit registers, of its Arithmetic Unit.

It should be noted at this point that, where confusion might result, the expression "transfer" is applied herein to the subopertaion of carrying digits between digisters, or into the D-digister from the Entry Unit. Further, the practice is adapted herein, wherever confusion might result, of reserving the term "shift" to describe the operation of carrying a digit word from one cell of the field word on the loop to another cell of the field word on the loop. Some of such shifts will, of course, result in moving digits, or complete numbers, from place to place on the display screen DS, and such movements on the display screen, corresponding to digit word shifts in the field word, will also be called "shifts."

Other types of digesters may be employed in the device of the invention. For instance, binary, or ring, counters may be adapted to receive digit transfers, either serially or parallelly, whether magnetic core, conventional, cryotronic, thin film, or semiconductor integrated construction is employed in fabricating them. Devices known in the art as "shift registers" may also be arranged to be employed as digisters in the instant invention. In fact, the particular digisters employed in the embodiment of the instant invention shown and described herein are among the class of devices which are sometimes called "shift registers." In addition to the transistorized-flip-flop type of shift register employed in the embodiment described herein, it will be recognized that alternative shift registers, like counters, can be implemented by way of cryotronic, thin-film, magnetic core, integrated semiconductor and photoconductive electroluminescent structures. Even further, digisters may be implemented by way of Williams-type memory, wherein each "dot" thereof corresponds to one of the flip-flops of one of the digisters shown herein.

Thus, it may be seen that a digister, or single-digit register, can be realized in a considerable number of forms. The term "digister," as used herein, however, is not limited to any one of these forms, but should be broadly understood to mean any device capable of registering, or storing, a representation of a digit, and, necessarily, capable of accepting a transfer of information representing a digit, and manifesting an indication of the digit the representation of which is stored therein. The term "digister," as used in this broad sense, does not indicate the nature, or number, of inputs and outputs which a given digister may have. The qualifying adjectives which are used therein to specify the nature of particular classes of inputs and outputs of certain digisters are discussed in the next section.

16.2.2. Sequential Transfers: As noted in the previous section, it is a necessary characteristic of functionally useful digisters that they be capable of accepting transfers of digit representations, and that they be capable of manifesting the digit representation stored in them for "transfer out" purposes. As also noted in the previous section, the term "transfer" is used broadly herein to denote both parallel, or simultaneous, and serial, or sequential, transfers.

For convenience, the process of transferring a digit into a digister will sometimes be referred to as "endigiting," and the process of transferring out of a digister will be referred to as "reading."

Taking the term "transfer" as thus broadly defined, a particular subclass thereof which should be further considered is the "sequential transfer," or transfer by "sequencing."

By "sequencing" is meant adding the digit "1" to, or subtracting the digit "1" from, the digit representation stored in a digister. For example, if a digister contains a representation of the digit "3" and, in response to an externally imposed signal, the digit representation stored therein is advanced to "4," then the digister is said to have been "sequenced" by said signal. As an additional example, if a digister contains a representation of the digit "6," and, by means of an externally imposed signal, the digit representation stored in the digit is receded to "5," the digister is said to have been "sequenced" by said signal. As yet another example, if the representation contained in a digister is that of the digit "2," and, in response to a sequence of three externally imposed signals, the digit representation stored in the digister is successively advanced from "2" to "3," to "4," and then to "5," then it is said that "three has been sequenced into the digister."

A digister which is capable of being sequenced, as that term is defined above, is said to be "sequenceable."

A digister which is fully sequenceable, i.e., which is capable of being either advanced or receded by having the digit "1" added to its contents, or subtracted therefrom, is said to be "bisequenceable."

A digister which is sequenceable in only one direction, i.e., which is capable either of having its contents advanced by successive additions of the digit "1" thereto, or of having its contents receded by successive subtractions of the digit "1" therefrom, but not both, is said to be "monosequenceable."

A monosequenceable digister which is capable of being sequenced by advancement only, i.e., which is capable of having its contents advanced one digit at a time, but not capable of having its contents receded one digit at a time, is said to be "advanceable."

A monosequenceable digister which is capable of being sequenced by recession only, i.e., which is capable of having its contents receded one digit at a time, but is not capable of having its contents advanced one digit at a time, is said to be "recedable."

The term "bisequenceable" finds close parallel in the term "bidirectional," as applied to counters in the prior art. Also, the terms "advanceable" and "recedable" are parallel to the terms "up-counting" and "down-counting" sometimes found in the prior art.

16.2.3. The A-digister: Going to FIG. 305, the A-digister may be seen to have an input terminal *a*, which carries a signal designated "ADV. A SG.". From this it can be seen that the A-digister is an advanceable digister. However, since no signal appears upon any terminal of the A-digister designated "REC. A," it can be seen that the A-digister is not a recedable digister and is a monosequenceable digester.

Considering input terminal *b* of this digister, and the legend "DA-to-A SG." located thereupon, it may be stated, in the nomenclature used herein, that "digister A is endigitable from digister D."

16.2.4. The B-digister: Examination of input terminals of the B-digister (see FIG. 307) shows that the B-digister has neither a terminal labelled "ADV.", nor a terminal labelled "REC.". From this it can be seen that the B-digister is nonsequenceable.

From the legends upon the *a* and *b* terminals of the B-digister, however, it may be seen that the B-digister is endigitable from either the A-digister or the D-digister.

16.2.5. The C-digister: Inspection of the legends upon the *b* and *c* leads of the C-digister shows that the C-digister (see FIG. 309) is endigitable from either the B-digister or the A-digister.

The legend upon lead *a* of the C-digister, i.e., "REC. C SG.", indicates that the C-digister is recedable. Since no lead of the C-digister carries an advancing signal, however, it can be seen that the C-digister is not advanceable. Thus, the C-digister is not bisequenceable, but is monosequenceable.

16.2.6. The D-digister: The legend found upon lead *b* of the D-digister indicates that the D-digister is endigitable from the A-digister.

The legend upon lead *a* of the D-digister indicates that the D-digister is recedable.

Consideration of the unique input terminals *c, d, e, f, g,* and *j* of the D-digister, and their associated circuitry shown within the digister outline, indicates that the D-digister, unlike the other three digisters, is adapted to be endigited from the keyboard. Five of these input terminals have symbol signals thereupon associated with assertion legends which indicate that a PL-signal appears upon certain combinations of these terminals when corresponding digit entry keys are depressed. The occurence of a PT-signal upon lead *d* of the D-digister will cause all of the flip-flops to be set which have a PL-signal from the keyboard upon the lower inputs of their superdot independent gates.

By this means, the digits entered into the keyboard of the device of the invention are inserted into the D-register, whereafter they are inserted into the memory loop at the proper time, as will be explained hereinafter. A chart showing the endigiting of the D-digister from the Entry Unit will be found in FIG. 295.

16.2.7. Sequential Readout of a Digister by Sequencing: Generally speaking, the contents of a sequenceable digister can be read out sequentially, or "sequenced out," if the digister is equipped with zero sensing means, and means for terminating the entry of the sequencing signals when the digister reaches its zero state. When a digister is so equipped, the number of these sequencing signals arriving at the sequencing input terminal serves as an indication of the digit representation which was stored in the digister. It is by this method that digit representations stored in the C-digister are read out of that digister, and ono the delay line via the terminal *c* of the Memory Unit, shown by (6:2)*c*.

16.2.8. Addition and Subtraction by Sequencing: Two digits may be added in a digister by transferring the first of said digits into the digister, and then advancing the digister a number of times equal to the second digit. This method presumes, of course, that the digister was set to its zero-representing state just prior to transferring the first digit into it. The carry, if any, can be detected by a zero-sensing means associated with the digister.

Subtraction may be accomplished by a similar method, except that the digister is receded, rather than advanced.

Subtraction may also be advantageously accomplished by addition of the complement of the minuend in the manner taught herein.

16.3 The Clearing Operation

The embodiment of the invention described in this specification, when operating, exists in one of three major states of operation, viz., (1) The Cleared State: In this state of operation the input signals from the Arithmetic Unit to the Memory Unit are blocked, and no information-carrying acoustic disturbances are found upon the delay line. Put differently, the memory loop is broken, and the delay line may be said to be "erased" after the elapse of one field time from the depression of the CLR. ALL key. It is also characteristic of this state of operation that the timing chain comprising the CLK. flip-flop, the A through L flip-flops, and their associated gates is in a "free running" state.

While the machine is in this cleared state of operation the display screen, after the first frame time, will display zeros in all of the number display cells. Further characteristics of this cleared state of operation will be discussed in detail in this Section (16.3).

(2) The Idling State: In this state of operation at least one digit key has been depressed subsequent to the most recent depression of the CLR. ALL key. The gate at the input of the Write Amplifier is open and, thus, the memory loop is closed, and a field word of information is circulating therein. The contents of this field word of information circulating upon the memory loop are being the displayed upon display screen in the idling state. It is also characteristic of this state of operation that the timing chain is synchronized with each reappearance of the synchronizing pulse at the beginning of the field word in a manner which will be described in detail hereinafter. This idling state of operation is distinguishable from the third state of operation in that no circulation is currently being carried out.

(3) The Active State: In this state of operation a calculation is being carried out. It is also characteristic of this state of operation that the beginning of each cycle of the timing chain is synchronized with the reappearance of the above mentioned synchronizing pulse at the output of the Memory Unit. In this state of operation the display screen is blanked, i.e., displays nothing, neither a field of zeros as in the cleared state, nor a field of numbers representing the contents of the memory loop as in the idling state.

The first aspect of the operation of the device of the invention to be considered herein will be the clearing operation, whereby the machine is put into the cleared state.

The clearing operation is commenced by depressing the CLR. ALL key.

Depression of the CLR. ALL key produces a PL-signal upon the *a* output terminal of the Functional Signal Generator (FIG. 225), and also produces a PT-signal, after a delay of approximately 6 milliseconds, upon output terminal *a* of the Common Key Signal Generator (FIG. 226). Going to the CLR. ALL flip-flop, as shown in FIG. 228, it may be seen that the PL-signal on terminal *a* of the Function Signal Generator resulting from depression of the CLR. ALL key is applied to the X· terminal thereof substantially immediatey upon depression of the CLR. ALL key. However, as explained above, the COM. KEY SG. is not produced, and thus is not received (a PT-signal) upon the $X_c$ input of the CLR. ALL flip-flop, until after a delay of approximately 6 milliseconds. This delay expedient is employed to prevent false operation of the function key storage flip-flops by noise produced at switching contacts, as explained hereinabove. At the time when the COM. KEY SG. is received at the $X_c$ terminal of the CLR. ALL flip-flop, then, the signals at the X. and X· terminals have "settled down" and, relatively speaking, there is a PL-signal upon the X· terminal, and an NL-signal upon the X. terminal. Then, by the transfer terminal operation described in detail hereinabove, the receipt of the PT-COM. KEY SG. at the $X_c$ input will cause the levels at the X terminals to be transferred to the corresponding FF terminals. Thus, it may be seen that depression of the CLR. ALL key sets the CLR. ALL flip-flop, after a delay of approximately 6 milliseconds.

One result of the setting of the CLR. ALL flip-flop is to "close" gate "99*a*" which is found in the input of the Write Amplifier (see phantom gate illustration in the Memory Unit block symbol at (6:2)*c,e*). The "closing" of gate "99*a*" blocks the admission of further signals to the Write Amplifier and, thus, no digit words remain upon the delay line at the end of one field time after the depression of the CLR. ALL key. Thus, it may be said that the depression of the CLR. ALL key, and the resulting operation of the device of the invention, "erases" the contents of the delay line.

Another result of depressing the CLR. ALL key and, thus, setting the CLR. ALL flip-flop is the desynchronizing of the timing chain, which then goes into a free running mode of operation. This desynchronization of the timing chain may be seen to take place by consulting the partial view of the Timing Signal Generator shown in the "cutaway" in the T/U block symbol of FIG. 311. As seen in this "cutaway" the signal from the superdot output of the CLR. ALL flip-flop is applied to the right reset input of the O.C. flip-flop. When the CLR. ALL flip-flop is set, then, a PT-signal is applied to the right reset input of the O.C. flip-flop, locking this flp-flop in its reset state. When this flip-flop is in its reset state, however, its FF· terminal carries an NL-signal, which signal is directly applied to one input of gate 99, as shown in said "cutaway." This NL-signal applied to gate 99 effectively opens this gate for the continuous passage of signals from the nominal 666 kilocycle Oscillator to the complement input of the CLK. flip-flop. These signals from the Oscillator, as will be apparent to those skilled in the art, drive the CLK. flip-flop, which in turn drives the timing chain comprising the A through L flip-flops. Thus, the character rasters and the display raster continue to be swept out, since the timing chain is free running, and, as will be explained hereinafter, the clearing of the D-digester which also results from the depression of the CLR. ALL key causes a complete field of zeros to be displayed in the number display cells of the display screen.

Yet another result of the depression of the CLR. ALL key may be seen from consideration of the Reset Signal Generator circuit as shown in FIG. 186. As shown on input terminal *b* of that circuit, the setting of the CLR. ALL flip-flop results in a PL-signal thereupon. The appearance of this PL-signal upon terminal *b* of this circuit causes the potential at the base of the NPN transistor therein to move in a positive direction, thus increasing the current passed by the transistor, and producing a PL-signal at output *a* of the Reset Signal Generator, thereof. This signal at the ouput of the Reset Generator, a PT-signal, followed by a PL-signal, is applied to several of the major subunits of the embodiment, resetting the same and locking them in the reset state. For instance, the D. P. STG. flip-flop (2:1)*d* is reset by this signal and locked into its reset state. Entry Phase Counter (3:1)*c,d* is also reset, i.e., actuated to its 000 state, and locked therein. The Decimal Point Counter (3:2)*b,d,f* is also reset, and locked in its reset state by the signal from the Reset Signal Generator. The O'FLOW flip-flop (4:1)*c* is also locked in its reset state.

In addition to this resetting brought about by the signal from the Reset Signal Generator, the depression of the CLR. ALL key and the resulting Function Signal Generator PL-signal, followed by the delayed appearance of the PT COM. KEY SG., forces the SUB., ADD, CLR. ENT., CHG. SGN., REPT., MULT., DIV., C. F., COM. DIG., STORE, and RECALL flip-flops into their reset state.

Another result of depressing the CLR. ALL key is the clearing of all four digisters, so that the content of each one is a representation of the digit "0."

The clearing, or "zeroizing," of the A-digister (sometimes hereinafter designated "$A_d$") is brought about by the action of gate 78, as follows. The four upper flip-flops of $A_d$ have independent resetting gates, the D.C. terminals of which are grounded. The A.C. terminals of these four independent gates are tied to the "RESET A SG." terminal of $A_d$. Thus, a PT-signal upon the RESET A SG. terminal will reset these four flip-flops. The A1 flip-flop, on the other hand, is not equipped with an independent resetting gate, but is equipped with a set of transfer terminals. The A.C. transfer terminal of this flip-flop is directly connected to the RESET A SG. terminal thereof. The X· and X. terminals of the A1 flip-flop are connected to the 60+61+62 gate output, the X· terminal being tied directly to the 60+61+62 gate output, while the X. terminal is tied thereto through inverting means. Thus, it may be seen that when the 60+61+62 gate output carries an NL-signal the A1 flip-flop will be conditioned for resetting upon receipt of a PT-signal upon the "RESET A SG." terminal of $A_d$.

That an NL-signal does exist upon the output of gate 60+61+62 during the cleared state may be seen as follows. As pointed out above, the ADD and SUB flip-flops are both reset by the depression of the CLR. ALL key. Thus, the FF· terminal of each is at NL. Gate 6, however ((2:1)*c*), has its two inputs connected directly to these two FF· terminals. Thus, it may be seen that the output of gate 6 is at PL during the cleared state. This PL-signal on the output of gate 6 is applied to the right set input of the SGN. C. flip-flop at (2:1)*e* and thus the SGN. C. flip-flop is locked in its set state. Thus, the FF· terminal of the SGN. C. flip-flop carries a PL-signal. This PL-signal upon the FF· terminal of the SGN. C. flip-flop is applied to the upper terminal of gate 96 ((6:1)*e*), resulting in an NL-signal upon its output. This NL-signal at the output of gate 96 is applied to the upper input terminal of gate 51 as shown at (4:2)*a*. The lower input terminal of gate 51 derives its signal from the FF· terminal of the CHG. SGN. flip-flop in the E/U which is reset during the cleared state of the machine. The signal at the FF· terminal of a reset flip-flop of the type used herein is a NL-signal, however. Thus, since gate 51 has an NL-signal upon both of its input terminals, and since it is an inverting OR gate, its output will be a PL-signal. The output signal of gate 51, however, is applied to the upper input terminal of gate 62 (see FIG. 303). Since this signal upon the upper input terminal of gate 62 is a PL-signal, the output signal of gate 62 will be an NL-signal.

Before considering the effect of the output signal of gate 62, the outputs of gates 60 and 61 must be determined. Gates 60 and 61 have a common input signal viz, the output signal of gate 52. In the cleared state of the machine both inputs to gate 52 are NL-signals, since they are derived from command outputs A and G of the Entry Phase Counter, and the Entry Phase Counter is reset during the cleared state of the device. This pair of input signals causes the output signal of gate 52 to be a PL-signal. This PL-signal, as applied to an input of each of gates 60 and 61, causes the output terminals of both of these gates to carry NL-signals. Thus, it has been shown that the output terminal of each one of the gates 60, 61, and 62 carries an NL-signal during the cleared state of the device of the invention. The output terminals of the gates 60, 61, and 62, however, are directly connected to the input terminals of the C-type gate 60+61+62, in reality a shared collector arrangement involving the gates 60, 61, and 62. The NL-signals upon the three input terminals of the 60+61+62 gate result in an NL-signal upon its output terminal. As pointed out hereinabove, however, the presence of an NL-signal upon the output terminal of C-type gate 60+61+62 causes the A1 flip-flop of the A-digester to be conditioned for resetting. From this it can be seen that, upon receipt of a PT-signal upon the *c* input of the A-digester all of the flip-flops of the A-digester will be reset, i.e., the A-digester will be forced into its zero-representing condition.

The reset signal upon the *c* terminal of $A_d$ necessary to reset $A_d$ must come, however, from gate 78. Going, then, to (5:2)*a*, it will be seen that the inputs of gate 78 include the $B_{15}$ signal from the Timing Signal Generator, inverted, and the output signals from three other gates, viz, 70, 48, and 41. Since gate 78 is an ordinary inverting AND gate, the $B_{15}$ signal will appear at its output if each of the lower three of its inputs carries an NL-signal. That this happens may be seen from the following considerations. Gates 70, 48, and 41 are all ordinary inverting AND gates, the output of which will carry an NL-signal if any one of its input terminals carries a PL-signal. Gate 41 ((4:1)*a*) has as an input signal the EPCF signal, inverted, and gate 48 ((4:1)*b*) has as one of its inputs the EPCD signal inverted. Both of these inverted signals are PL-signals during the cleared state of the machine, however, since, at this time, the Entry Phase Counter is locked in its reset condition. Thus, the output terminals of gates 41 and 48, and the two lower input terminals of gate 78, carry NL-signals during the cleared state of the machine.

The signal upon the upper input terminal of gate 70 is provided by the output terminal of gate 47. Gate 47 is an extraordinary AND gate, and has one of its input signals the EPCC signal. The EPCC signal, however, is an NL-signal during the cleared state of the machine and, for this this reason, the output signal of gate 47 is a PL-signal during this time. The PL-output signal of gate 47 is, as noted above, applied to the upper input terminal of gate 70, causing the output signal of gate 70 to be an NL-signal. As noted above, the output signal of gate 70 is applied to one of the lower three input terminals of gate 78.

From the above, it may be seen that the lower three input terminals of gate 78 all carry NL-signals during the cleared state of the machine, thus enabling the inverted $B_{15}$ signals upon the upper input terminal of gate 78 to produce true, or noninverted, $B_{15}$ signals upon the output of gate 78. The output of gate 78 is, as noted thereat, the source of the "RESET A" signals applied to the *c* terminal of the A-digister.

To recapitulate, it has been shown above that, during the cleared state of the machine, all of the flip-flops of the A-digister are conditioned for resetting, and that, during the cleared state of the machine, the C terminal of $A_d$ is supplied with $B_{15}$ signals, each of which is capable of resetting the flip-flops so conditioned.

It will be evident, then, that soon after the machine assumes its cleared state in response to the depression of the CLR. ALL key, the A-digister is cleared, i.e., reset to its zero-representing condition.

The D-digister is also reset to its zero-representing condition while the machine is in its cleared state. That this is so can be seen from the following considerations. Gate 81 ((5:2)*a*), the output of which is the "A-to-D" signal source, provides these signals in response to $B_{15}$, inverted, signals upon its upper input lead when its lower input lead carries an NL-signal. The signal upon the lower input lead of gate 81 is provided from the output terminal of gate 75 ((4:2)*f*), which will carry an NL-signal whenever one of its input terminals carries a PL-signal. The input terminals of gate 75 receive their signals from the output terminals of gates 56, 63, 64, 65, and 66. Gate 56 has as one of its input signals the FF. terminal signal from the RECALL flip-flop. Since the RECALL flip-flop is reset during the cleared state of the machine, this input signal of gate 56 will be a PL-signal, and, consequently, the output signal of gate 56 will be an NL-signal. Thus, gate 56 cannot provide the necessary PL-signal to gate 75 whereby to enable gate 81 to pass the $B_{15}$ pulses received upon its upper input terminal.

The same conclusion may be drawn in respect of the output signals from gate 64, 65, and 66 during the cleared state of the machine. Gate 63, however, produces PL-output signals which enable the A-to-D transfer which results in the display of correctly selected register contents during the idling state of the device. Tracing the signals upon the upper and lower input terminals of gate 63 will show that these same A-to-D enabling PL-signals are produced at the output of gate 63 during cleared time. These PL-signals from gate 63, as applied to the gate 63 input of gate 75, result in corresponding NL-signals to the lower input terminal of gate 81. However, as may be seen by comparing the $B_{15}$ signal waveform with the E FF waveform ("fastest" input to the Compare Signal Generator), both in FIG. 319, a PT-segment of the $B_{15}$ waveform occurs during each level of the E FF waveform. Thus, the $B_{15}$ signals received upon the upper input terminal of gate 81, taken together with the A-to-D enabling signals received upon the lower input terminal of gate 81, will cause a considerable number of signals to be produced at the output of gate 81 which, applied to terminal *b* of $D_d$ will cause a transfer of the contents of $A_d$ (now "0") to $D_d$. Thus, it is made apparent that the D-digister is reset to its zero-representing condition, or "zeroized" in each cleared time.

The B-digister (hereinafter called "$B_d$") is also reset to its zero-representing condition during the cleared state of the machine. That this is so may be seen from the following considerations. An A-to-B signal train, corresponding to the $B_{15}$ signal, will be supplied to the terminal *b* of $B_d$ if the A-to-B gate, i.e., gate 86, is "opened" by an NL-signal applied to its lower input terminal. The signal applied to this lower input terminal, however, is an inversion of the output signal of gate 76. Therefore, a PL-signal must be present on the output of gate 76 in order to "open" the A-to-B gate, gate 86. That a PL-signal does, in fact, appear upon the output terminal of gate 76 may be shown as follows. In order for a PL-signal to appear upon the output terminal of gate 76, all of the inputs of gate 76 must carry NL-signals. This can be shown as follows. The STORE flip-flop is reset during the cleared time of the machine. Thus, gate 55 has a PL-signal present upon one of its input terminals, and, thus, an NL-signal upon its output terminal. The RECALL flip-flop is also reset during cleared time. Thus, a PL-signal is applied to one of the inputs of gate 57, and an NL-signal appears upon the output of gate 57. The inverted EPCC SG., as applied to an input terminal of gate 50, is at PL during the cleared time. Therefore, an NL-signal is present upon the output of gate 50 during the cleared time. The EPCH SG. is at its NL during cleared time and, therefore, the middle input of gate 53 carries an NL-signal. The C. F. flip-flop is reset during cleared time and, therefore, the output of gate 11 carries an NL-signal during cleared time. Thus, the lower input terminal of gate 53 carries an NL-signal during cleared time. The inverted EPCD SG. is at PL during cleared time and, therefore, the output of gate 45, which is applied to the upper input of gate 53, is at NL during cleared time. Thus, all of the inputs of gate 53 carry NL-signals at cleared time, and the output of gate 53 carries a PL-signal at cleared time. Since, however, this PL-signal from the output of gate 53 is applied to one of the input terminals of gate 65, the output terminal of gate 65 carries an NL-signal during cleared time. The true EPCE and EPCB SG. are both NL-signals during cleared time. Therefore, both inputs of gate 35+38 are at NL during cleared time, and the output thereof is at NL. This output signal from gate 35+38, after inversion, is applied to the upper input terminal of gate 66, bringing the output terminal of gate 66 to NL during cleared time. The true EPCC SG. is at NL during cleared time. Therefore, the output of extraordinary gate 47 is at PL during cleared time. Since the output of gate 47 is applied to the lower input terminal of gate 67, it follows that the output of gate 67 is at NL during cleared time. The REPT. flip-flop is reset during cleared time and, thus, the output of gate 68 is at NL during cleared time. The ADD and SUB flip-flops are both reset during cleared time and, therefore, the output of gate 6 is at PL during cleared time. Since the output of gate 6 is applied to the right set terminal of the SGN. C. flip-flop, it follows that the SGN. C. flip-flop is locked in its set condition throughout cleared time. Thus, the SGN. C. FF· SG. applied to the upper input terminal of gate 96 is at PL during cleared time, and the output terminal of gate 96 is at NL during cleared time. Since, however, the inverted output of gate 96 is applied to the lower input terminal of gate 69, it follows that the output signal of gate 69 will be an NL-signal during cleared time. The true EPCI SG., as applied to one of the inputs of gate 76, is an NL-signal at cleared time. The inverted EPCD SG. is at PL during cleared time. Therefore, the output of gate 46 is an NL-signal during cleared time. The inverted output of gate 46, however, is at PL during cleared time. This inverted gate 46 output as applied to the upper input terminal of gate 59 causes the output terminal of gate 59 to carry an NL-signal during cleared time. Thus, it may be seen that all of the input signals supplied to gate 76 during cleared time are NL-signals. Thus, the inverted output signal of gate 76 as applied to the lower input terminal of gate 86 is an NL-signal throughout cleared time. This NL-signal upon the lower input terminal of gate 86 "opens" gate 86, therefore passing a chain of A-to-B signals ($B_{15}$ signals) to the A-to-B (or *b*) input terminal of $B_d$ throughout the cleared time. Since, however, as explained above, $A_d$ is reset to its zero-representing condition during cleared time, it follows that the A-to-B transfer occasioned by these signals from the output of gate 86 will reset $B_d$ to its zero-representing condition during the cleared time.

Finally, the C-digister (hereinafter sometimes called "$C_d$") is also reset to its zero-representing condition during cleared time. This may be seen from the following considerations. Since $B_d$ is cleared to its zero-representing condition during cleared time, it is but necessary to transfer the zero therein to $C_d$ in order to reset $C_d$ to its zero-representing condition. To do this, a B-to-C signal, upon the *c* terminal of $C_d$, is necessary. This B-to-C signal is produced at the output of gate 85. Gate 85 is supplied with $B_{15}$ inverted signals at its upper input terminal, and must have an NL-signal upon its lower input terminal to produce $B_{15}$ signals (i.e., B-to-C signals) upon its output terminal. That the correct NL-signal is supplied to the lower input of gate 85 during cleared time may be seen as follows. The signal applied to the lower input terminal of gate 85 is an inversion of the output signal of gate 74. Therefore, the output signal of gate 74 must be a PL-signal in order to apply an enabling signal to the lower input terminal of gate 85. Going, then, to gate 74, it may be seen that all of its input terminal signals must be NL-signals in order to produce a PL-signal upon its output terminal. The state of the input signals to gate 74 during cleared time may be deduced as follows. The STORE flip-flop is reset during the cleared time, and, therefore, the output of gate 55 is an NL-signal. The inverted EPCC SG. is a PL-signal during cleared time. And, since this signal is applied to the middle input of gate 50, the output of gate 50 is an NL-signal during cleared time. The true EPCI SG. is an NL-signal during cleared time. The true EPCC SG. is an NL-signal during the cleared time of the machine. Since, however, this signal is applied to the upper input of gate 47, it follows that the output signal of gate 47 is a PL-signal during cleared time. This output signal of gate 47 is applied to the lower input terminal of gate 67, causing the output terminal of gate 67 to carry an NL-signal during cleared time. Thus, since all of the input signals to gate 74 are NL-signals during cleared time, it follows that the output signal of gate 74 is a PL-signal during cleared time, and that the inverted output of gate 74 applied to the lower input terminal of gate 85 is an NL-signal during cleared time. From this, it follows that, during cleared time, $B_{15}$ signals (B-to-C signals) are supplied to the B-to-C signal input of $C_d$ (the *c* input). Since, as noted above, $B_d$ is in its zero-representing condition, however, $C_d$ will be reset to its own zero-representing condition during cleared time.

From the above, it may be seen that depression of the clear all key (a) "erases" the contents of the delay line, (b) desynchronizes the timing chain to allow it, and the display, to "free run," (c) resets the major subcircuits, and flip-flops, or the Entry Unit and the Control Unit, and (d) resets all four digisters to their zero-representing condition.

16.4. Shift Left Register 1 (SL1)

Before proceeding from the above discussion of clearing the device of the embodiment by means of the clear all key to a discussion of digit entry, it will be necessary to discuss in detail the operation of shifting the contents of register 1 "to the left," i.e., shifting the digit word representing each digit of register 1 into the next highest-numbered column word on the loop. It should be noted at this point that the signals for carrying out this operation are provided even though there is nothing on the loop, i.e., even though nothing has yet been entered into the loop after "erasing" its contents by clearing the machine. This will happen when the first digit is entered after clearing the machine. Considering, for a moment, the csae in which there is a field word circulating in the loop, the result of this shift left register 1 operation will be to cause the digits displayed in row 1 of the display screen to shift to the left as viewed thereupon. As a partial, specific illustration of this operation reference should be had to FIG. 346. Considering, then, the rightmost digit displayed in row 1 of the display screen, i.e., (1/1), this digit will be shifted to the next column to the left of the display screen as a result of the shift left register 1 operation. In equational form, $$(1/1)SL1=(2/1)SL1$$

Similarly, the shift left register 1 operation will be seen to operate upon the field word on the loop according to the following equation, $$(2//1)SL1=(3//1)SL1$$

Of course, each numerical entry in register 1 upon the loop will be shifted to the next-highest numbered column, not merely the $C_2$ column digit as described above. Similarly, every digit in the bottom row displayed upon the display screen, i.e., the digit words in register 1, will be shifted to the left, and not simply the digit in the rightmost numerical column as described above. It should be pointed out here that these left shifts are not obtainable by key entry in the device of the invention, but constitute suboperations of major operations and, therefore, will not be seen upon the display screen, since the display screen in the device of the invention is blanked during its "active" time when mathematical operations are taking place. The shift left row 1 operation will be designated at several places hereinafter as "SL1."

As a preliminary to considering the SL1 operation, however, the production of the two major transfer signals, viz, A-to-B and B-to-C must be considered. These signals are produced at the outputs of gates 86 and 85, respectively. Going, then, to (5:2)*b*, it may be seen that both of these gates are two-input ordinary inverting AND gates, and that each has as the input upon its upper input terminal the inverted $B_{15}$ signal. This signal is an inverted version of the $B_{15}$ signal found upon the *t* output of the Timing Signal Generator. Since the Timing Signal Generator is free running during the cleared condition of the machine, as described hereinabove, it will be apparent that the signals to the upper inputs of gates 86 and 85 will continue during the cleared state. Also, as described hereinbelow, the Timing Signal Generator will continue to function during the idling and active states of the machine operation and, thus, the $B_{15}$ inverted signal will be supplied to the upper inputs of gates 86 and 85 during the active and idling states of operation of the machine. As will also be seen at (5:2)*b*, the lower inputs of these gates both require an NL-signal in order to "open" the gate, and bring about the production of $B_{15}$ noninverted signals at their outputs, i.e., the A-to-B and B-to-C signals. The signal upon the lower input terminal of the A-to-B signal gate 86 is supplied by the output of gate 76, inverted. Similarly, the signal upon the lower input terminal of the B-to-C signal gate 85 is supplied by the output signal of gate 74, inverted. Thus, when the output signal of gate 76 is a PL-signal, the A-to-B SG. gate will be "open." Also, when the output of gate 74 is a PL-signal, the B-to-C SG. gate will be "open." Considering gates 74 and 76, then, it will be seen that the nature of each of these gates is such that NL-signals must be present upon all of its input terminals to produce a PL-signal upon its output terminal. Summarizing, the presence of a PL-signal upon any input terminal of gate 74 will "close" the B-to-C signal gate, and no B-to-C signals will be applied to the *c* input terminal of $C_d$. Similarly, the presence of a PL-signal upon one or more of the input terminals of gate 76 will result in "closing" the A-to-B signal gate 86, thus preventing A-to-B signal from being fed to the *b* input terminal of $B_d$. The condition of machine operation wherein all of the input terminals of gate 74 and all of the input terminals of gate 76 carry NL-signals may be called the "normal" state of operation, and other operations, such as the SL1 operation now being considered, may be thought of as produced by deviations from this "normal" state of operation. If, for instance, a field word of information were entirely upon the delay line, this field word of information would be lost, rather than making a loop, were not each digit word thereof read into $A_d$, and thence routed by some path through the digisters, returning to $C_d$, whence it is "read" back onto the delay line, i.e., back into the Memory Unit. The "path" between digisters which is used, inter alia, in the idling state of the machine, sometimes called the "normal path," is the path of transfer running from the Memory Unit, to $A_d$, to $B_d$, to $C_d$, and thence back to the Memory Unit. The expression "loop" is used herein to refere to the path of flow of the field word of information both in the Memory Unit (including the delay line) and in the Arithmetic Unit, from digister to digister. Thus, when the loop is completed through the digisters by following the "normal path," it may be said that, as a whole, the field word of information is following the "normal loop." Since, however, the speed of travel of the field word of information along the delay line is fixed by the physical parameters of the delay line, and since each digister is capable of storing a representation of but one digit word, it follows that the A-to-B and B-to-C signal must be properly timed, and synchronized, to effect the transfer of the digit word stored in each digister to the next succeeding digister before the arrival of the succeeding digit word. More specifically, the A-to-B signal must be timed to transfer the contents of $A_d$ to $B_d$ immediately after a complete digit word is sequenced into $A_d$, and before the commencement of sequencing the next succeeding digit word into $A_d$. Once a digit word is stored in $B_d$, however, it must be transferred forward to $C_d$ at substantially the same time at which the next succeeding digit word is transferred forward from $A_d$. Using the terminology developed hereinabove in connection with FIGS. 345 and 346, it may be stated that each digit word is read into $A_d$ within a specified cell time, e.g., cell 2//1 time. The digit word sequenced into $A_d$, then, must be substantially instantaneously transferred to $B_d$ before the commencement of cell 2//2 time. As may be seen from the horizontal line separating the 2//1 and 2//2 cells of the field word diagram of FIG. 347, however, the Timing Signal Generator provides a $B_{15}$ pulse separating these two cells, in time. Thus, the transfer from $A_d$ to $B_d$, avoiding destruction of the digit word in $A_d$ by the premature insequencing of the subsequent digit word, may be timely made by employing the $B_{15}$ signal between the two cells to synchronize this transfer. Similarly, the transfer of a digit word from $B_d$ to $C_d$, avoiding destruction of this digit word by the transfer of the subsequent digit word from $A_d$, may be timely made by employing a $B_{15}$ signal to time the transfer from $B_d$ to $C_d$. As will be explained hereinbelow, each digit word inserted into $C_d$ will be sequenced therefrom to the Memory Unit during one cell time.

Returning, then, to consideration of the A-to-B and B-to-C signal gates, viz, gates 86 and 85 at (5:2)*b*, it will be realized that if both of these gates are enabled by NL-signals upon their lower input terminals, then the continuous chain of A-to-B and B-to-C signals emitted thereby, and applied to the *b* terminal of $B_d$ and to the *c* terminal of $C_d$, respectively, will cause the inter-digister transfer in the normal loop to take place in such manner as to avoid destruction of digit words passing through the Arithmetic Unit, provided, that is, that the occurrence of the inverted $B_{15}$ signals supplied to the upper inputs of these gates are properly synchronized with the field word of information. The synchronization of the Timing Signal Generator, which provides these inverted $B_{15}$ signals, with the traveling field word of information, will be described hereinafter in connection with the problem of digit entry.

Before returning to the shift left register 1 (SL1) operation, it should be generally understood that when it is desired to suppress the appearance of the A-to-B signal or the B-to-C signal, gates 76 and 74, respectively, are employed for this purpose. That is, the appearance of a PL-signal upon any one of the input leads of gate 76 will suppress the A-to-B transfer signal. Similarly, the appearance of a PL-signal upon any one of the input terminals of gate 74 will suppress the B-to-C transfer signal.

In addition to the A-to-B and B-to-C Arithmetic Unit cycling signal gates, described hereinabove, several other Arithmetic Unit cycling signal gates are located at (5:2)*a,b* and which are somewhat similar in function and operation to the A-to-B and B-to-C gates mentioned. These additional Arithmetic Unit cycling signal control gates are: gate 78, the "RESET A SG. S." gate; gates 79 and 83 which, taken together, constitute the "RESET D SG. S." gate; gate 80, the "A-to-C SG. S." gate; gate 91, the "A-to-D SG. S." gate; gate 82, the "D-to-B SG. S." gate; and gate 84, the "D-to-A SG. S." gate. Since these additional gates are all similar in function and operation to the above-discussed gates 86 and 85, each one serving to gate $B_{15}$, inverted, signals to control inputs of the digisters of the Arithmetic Unit, the detailed operation of these gates will not be discussed herein, reference being had to the detailed discussion of the operation of similar gates 86 and 85 found hereinabove.

Briefly, the overall function and operation of these additional gates is as follows.

Gate 78 will supply $B_{15}$ signals to terminal *c* of $A_d$ whenever a PL-signal is present upon at least one input lead of gate 70, a PL-signal is present upon at least one input lead of gate 48, and a PL-signal is present upon at least one input lead of gate 41.

Gate 83, which is under the control of gate 79, will supply $B_{15}$ pulses to the *h* terminal of $D_d$ whenever a PL-signal appears upon at least one of the input terminals of gate 79.

Gate 80 will supply $B_{15}$ signals to the *b* terminal of $C_d$ whenever a PL-signal is present upon at least one of the input terminals of gate 74, except during column $C_0$ time.

Gate 81 will supply $B_{15}$ signal pulses to the *b* terminal of $D_d$ whenever a PL-signal is present upon at least one of the input terminals of gate 75.

Gate 82 will supply $B_{15}$ signal pulses to input terminal *a* of $B_d$ whenever a PL-signal is present upon at least one of the input leads of gate 76, except during column $C_0$ time.

Gate 84 will supply $B_{15}$ signal pulses to the *b* terminal of $A_d$ except when a PL-signal is present upon one or more of the input terminals of gate 48.

Returning, now, to consideration of the Shift Left Register 1 (SL1) operation, and considering the digisters shown in the logic diagram in conjunction with the field word diagram (FIG. 346), it may be seen that, to accomplish this operation, (2//1)SL1 through (14//1)SL1 must be shifted to 3//1 through 15//1, respectively. Considering just one of these transfers, i.e., (2//1)SL1 to 3//1, in terms of the digisters of the Arithmetic Unit as shown in the logic diagram, the following interdigister transfers will be seen to take place. These transfers, of course, take place as variations upon the "normal loop" transfers A-to-B and B-to-C, $A_d$ also being reset at the time of each $B_{15}$ signal as part of "normal loop" operation. Let is consider, then, that (2//1)SL1 has just been completely sequenced into $A_d$. Since the progression of the field word, as shown in FIG. 346, will next pass (2//2) into $A_d$ and since 3//1, into which (2//1)SL1 is to be "deposited" will not be reached until a full column time has elapsed, it follows that (2//1)SL1 must be "held" for a full column time. This is done by transferring (2//1)SL1 from $A_d$ into $D_d$, and holding it there for one column time, i.e., until the $B_{15}$ signal terminating 3//1. It follows, of course, that, at the end of 3//1, (3//1)SL1 will be standing in $A_d$, and, at that time, will be transferred to $D_d$. At that time, i.e., at the 3//1–3//2 transition, (2//1)SL1 must be transferred into $B_d$. Thus, since the "normal loop" operation continues with the exception of the variations in the various signal trains necessary to effect these sideshifts, such as the shift from $A_d$-to-$D_d$, etc., it follows that, at the next B-to-C transfer, and the subsequent out-sequencing of the contents of $C_d$ to the Memory Unit, (2//1)SL1 will not be back on the line, but will now be in 3//1. That is, (2//1)SL1 will have become (3//1)SL1. Though not mentioned above, for reasons of simplicity, it will be clear that one additional transfer control signal is needed. Or, rather, one normally-occurring transition signal must be suppressed in order to "protect" (2//1)SL1 while it is in $B_d$. More specifically, the A-to-B signal, which would otherwise transfer the contents of $A_d$-to-$B_d$, "on top of" (2//1)SL1, must be suppressed. Summarizing, then, the leftward shift of each digit requires (a) an A-to-D signal, (b) a D-to-B signal, and (c) the suppression of an A-to-B signal at the end (approximately three micro-seconds before the end) of the cell time corresponding to each digit to be shifted. The above assumes, of course, that, with the exception of the suppression of one A-to-B signal, the "normal loop" signals proceed unaltered. The appearance of the necessary A-to-D and D-to-B signals, and the suppression of the A-to-B signal, are brought about by the action of gate 65 (4:1)*f*, which imposes the necessary input signals upon gates 75 and 76 (4:2)*f* to cause the outputs of these gates to so control the action of gates 81, 82, and 86 (5:2)*f* as to bring about the necessary signal appearances and suppressions.

By repetition of the shifting operation described in connection with (2//1)SL1, (3//1) through (14//1) will also be left-shifted.

No mention was made above of (0//1), (1//1), or (15//1) as taking part in this left-shift. In fact, these digit words do not take part in the left-shift. The fact that these three digit words do not take part in the left-shift is due to the N—N signal upon the middle input terminal of gate 65, which signal is positive, i.e., 65 gate disenabling, during 0//1, 1//1, and 15//1 of a simple SL1 operation. With respect to (14//1)SL1, it may be seen that this digit word is not transferred from $D_d$-to-$B_d$ at the 15//1–15//2 transition, since, due to the reappearance on the middle input of gate 65 of the N—N signal, no D-to-B signal occurs at that time. In fact, due to the reappearance of the N—N signal, none of the special variants "normal loop" signals appear at the 15//1–15//2 transition.

As just discussed, the three variant signals, A-to-D, D-to-B, and the absence of A-to-B, occur substantially simultaneously. It might appear, then, upon first consideration, that the simultaneous arrival of these signals at their respective digisters might cause obliteration of some information stored therein, rather than a successful transfer to the next digister. That is, it might be suspected that the receipt of the A-to-D signal at $D_d$ when, at the same time, the contents of $D_d$ are being transferred to $B_d$, would cause the loss of the inter-digster transfer signals upon the D.C. transfer input of $B_d$ before $B_d$ could be forced into the state formerly held in $D_d$. Reflection will show, however, that this is not the case. Let us assume (referring to FIG. 268) that prior to the transfer of a particular digit from $D_d$ to $B_d$, the D1 flip-flop is in the set condition. Therefore, the X–2 input of the B1 flip-flop will carry a PL-signal, while the X.–2 input terminal of flip-flop B1 will carry an NL-signal. Assuming, however, that a D-to-B signal has not yet appeared, the $X_c$–2 input terminal of the B1 flip-flop will be at NL. Considering, first, the gate capacitor in the gate associated with the X–2 terminal, this capacitor will carry a charge of approximately 12 volts, the terminal of this capacitor nearest the gate resistor being positive with respect to the more remote terminal. The gate capacitor associated with terminal X.–2, on the other hand, will have very little charge thereon. Thus, it may be seen that the condition of the D1 flip-flop is in reality "stored" in the X–2 gates of the B1 flip-flop during the cell time. Thus, at the arrival of the B-to-B signal upon terminal *a* of $B_d$, it is immaterial that the states of the flip-flops of $D_d$ are changing at the same time, since this signal transfers into the flip-flops of $B_d$, not the information taken directly from the flip-flop outputs of $D_d$, but the information stored upon the X–2 gates of the flip-flops of $B_d$ itself. The same reasoning applies to all of the simultaneous transfers between digsters, and other simultaneous digister-controlling signals herein, and, thus, it will be assumed hereinafter that such interdigister transfers, and digster-controlling signals, are non-mutually-interfering, without further explanation of the storage action of these dynamic gates.

16.5. Digit Entry

Assuming, now, that the machine of the embodiment described herein is in its cleared state, we proceed to described the entry of a digit, say "3," by depression of the corresponding digit key.

Depression of the digit "3" key causes the appearance of a PL-signal upon output lines *w*, *x*, and *y* of the Entry Unit, as can be seen from consideration of the Digit Signal Generator circuit shown in FIG. 182. Depression of the digit "3" key also causes a PT-signal upon output line *n* of the Entry Unit after a delay of approximately 6 milliseconds, as can be seen from inspection of FIGS. 182 and 188, taken together. Going, now, to the COM. DIG. flip-flop (FIG. 230) it can ge seen that the depression of the digit "3" key, or, for that matter, any one of the digit keys, causes a PL-signal upon the X· terminal thereof. This PL-signal, accompanied by an NL-signal upon the X. terminal of the COM. DIG. flip-flop, due to the fact that the CLR. ALL key is not depressed at the same time, conditions this flip-flop to be set upon arrival of the COM. KEY SG. at the $X_c$ terminal approximately 6 milliseconds later.

Going to FIG. 228, it can be seen that a signal from the FF· terminal of the COM. DIG. flip-flop is tied to the left reset input of the CLR. ALL flip-flop. Thus, the CLR. ALL flip-flop will be reset when the COM. DIG. flip-flop is set.

The remainder of the flip-flops in the Entry Unit will remain in their reset condition, even though a COM. KEY SG. is received upon their $X_c$ inputs, due to the fact that both of the D.C. transfer inputs of these flip-flops carry NL-signals.

The resetting of the CLR. ALL flip-flop causes an NL-signal to appear upon the upper input terminal of gate "99*a*" (shown in phantom within the Memory Unit block symbol at (6:2)*c*,*e*). This upper input terminal of gate "99*a*" is the *d* terminal of the Write Amplifier, the circuit of which is shown in FIG. 202. It is also apparent that the lower input terminal of gate "99*a*" will be at negative level at this time, since this input is directly connected to the output of gate 103, one input of which is directly connected to the output of gate 101, the "C CTR Z SG. S.," or C-digister zero sensing gate. The C-digister remains in its cleared, or zero-representing condition, since it was in this condition when the machine was in its cleared state, and nothing has occurred to change its condition. Since the C-digister is in its zero-representing condition, the output of gate 101 is a PL-signal, and, thus, the output of gate 103 is an NL-signal. Thus, the lower input terminal of gate "99*a*" is at NL at this time. The arrival of the NL-signal from the FF terminal of the CLR. ALL flip-flop, then, results in turning the left-hand transistor in FIG. 202 "on," initiating a one-shot action in the Write Amplifier circuit, and, thus, impressing a pulse upon the launch coil of the delay line, which causes a corresponding disturbance traveling down the delay line. This initial disturbance upon the delay line, also called the "synchronizing pulse" herein, will be found at the beginning of every field word of information circulating in the memory loop. This disturbance, or synchronizing pulse, along with the CLR. ALL FF· SG. (NL) now appearing at the right reset input of the O. C. flip-flop, causes the timing chain to be taken out of its "free running" state, and to be synchronized with each appearance of this synchronizing pulse at the output of the Memory Unit, as follows.

Going to the "cutaway" within the block symbol of the Timing Signal Generator in FIG. 311, it will be seen that the advent of the NL-signal upon the right reset input terminal of the O. C. flip-flop, in response to the resetting of the CLR. ALL flip-flop, "unlocks" the O. C. flip-flop, but leaves it in its reset state. Since the O. C. flip-flop is left in its reset state; through "unlocked," an NL-signal remains upon the FF terminal of the O. C. flip-flop, and, consequently, upon the right-hand input of gate 99. Thus, even though the O. C. flip-flop is "unlocked," the timing chain continues to be driven by the nominal 666 KC Oscillator via gate 99. Since the timing chain continues to run, however, the $C_0$ signal train upon the left set input of the O. C. flip-flop must produce a PT-signal upon the left set input of the O. C. flip-flop within approximately 5 milliseconds, since this is the approximate period of the $C_0$ signal. This PT-signal upon the left set input terminal of the O. C. flip-flop will set the oscillator control flip-flop, thereby producing a PL-signal upon the right-hand input terminal of gate 99, "closing" that gate, and cutting off the chain of impulses from the nominal 666 KC Oscillator to the complement input of the CLK. flip-flop, thus halting the progress of the timing chain in its HOME state. Thus, the timing chain is "locked out," and will not be energized again until receipt of a resetting signal for the O. C. flipflop, from some point outside the Timing Signal Generator. Since the CLR. ALL flipflop is reset, and will remain so until some subsequent depression of the CLR. ALL key, the signal necessary to restart the timing chain must, as can be seen in the "cutaway" in the Timing Signal Generator block symbol, be entered by way of the left reset input of the O. C. flip-flop which is connected to the "ADV. A SG. S." terminal (gate 90) see (5.2)e, i.e., the same terminal which supplies the signals for sequencing digit words from the delay line (Memory Unit) into the A-digister. As discussed above, however, the only pulse now circulating in the delay line is the synchronizing pulse which was produced by the appearance of an NL-signal upon the upper input terminal of gate "99*a*" at the time of resetting of the CLR. ALL flip-flop. To recapitulate, the timing chain is now "locked out," and must await a pulse from the "ADV. A" SG. S. before it will be restarted. Since the maximum time-length of the delay line used, however, is approximately 5.2 milliseconds, this pulse must occur within that time. When the acoustic disturbance representing the synchronizing pulse arrives at the output coil of the delay line, energizing the Read Amplifier, gate 90, and inverter 26 almost immediately, then, a pulse signal will be applied to the advancing input of the A-digister, and also to the left reset input of the O. C. flip-flop, thereby restarting the timing chain substantially simultaneously with the receipt of the acoustic disturbance representing the synchronizing pulse at the output coil of the delay line. Then by the term "substantially simultaneously," as used in this discussion, what is meant is that any delays in the Read Amplifier, gate 90 etc., are of such small duration as compared with the delay time as to be operatively insignificant. From the above, it may be seen that within approximately 10 milliseconds, at most, from the depression of the digit "3" keys the operation of the timing chain is synchronized with the circulation of the synchronizing pulse in the primary loop.

However, in this active state of operation the timing chain is no longer "free running," because the O. C. flip-flop is no longer "locked" in its reset state by a signal from the CLR. ALL flip-flop. To the contrary, in this active state of operation of the machine, and also in the idling state, each successive occurrence of the PT-segment of the $C_0$ signal train will set the O. C. flip-flop, thereby "locking out" the timing chain. After each such "locking out" of the timing chain by the PT-segment of the $C_0$ signal train, an "ADV. A" signal on the left reset input of the O. C. flip-flop will be necessary to restart the timing chain. Since, however, according to a principal feature of the instant invention, the delay line has a delay time longer than the period of the timing chain, the timing chain must remain "locked out" until the arrival of the synchronizing pulse at the output coil of the delay line. Thus, the instant invention arranges, in an effective and inexpensive manner, to synchronize the timing chain of the entire device with each reappearance of the leading, synchronizing pulse on the delay line at the end thereof, thereby rendering the operation of the device of the invention free from the problem of variations in delay line delay time due to thermal effects.

The timing chain now being synchronized with each reappearance of the field word synchronizing pulse, the operation of digit entry now proceeds.

As shown in FIG. 308, entry of the digit "3"-representing signals from the Entry Unit into the D-digister cannot be made until the occurrence of the EPCH ("Entry Phase Command H," or "H Command") signal. The Entry Phase Counter, which, through a group of gates at (3:1)*ef* and (3:2)*e*, produces the Entry Phase Command signals, was locked in its zero condition, i.e., all three flip flops reset, during the prior cleared state of machine operation. Thus, the Entry Phase Counter must be advanced to the condition indicated upon the upper three input terminals of the EPCH signal source gate, gate 32. In this condition, called herein the "decimal equivalent 6" condition, flip-flop EPC1 will be reset, flip-flop EPC2 will be reset, and flip-flop EPC4 will be set. The Entry Phase Counter must be advanced to this condition by means of PT-signals upon its EPC1 flip-flop complement input, which receives signals from the output of gate 28 (3:2)*c*. The HOME SG., which is applied to one of the input terminals of gate 28, can produce transition signals on the output of gate 28 only if the other three input terminals of gate 28 are at NL. Going to (3:2)*a*, we see that gate 23 has an NL-signal as its output, because the "DCTR. Z" SG., upon its upper input terminal, is a PL-signal, which follows from the fact that the D-counter, or D-digister, remains in its zero-representing condition, since the previous cleared state of operation. Thus, the signal upon the upper input terminal of gate 28 is an NL-signal. Going to (2:1)*a,b*, it can be seen that the output of gate 3 is currently an NL-signal, since the COM. DIG. flip-flop is set. Thus, the second input lead from the bottom in gate 28 is at NL. Finally, going to (3:2)*a*, it may be seen that the output signal of gate 24 is an NL-signal, since the COM. DIG. flip-flop is set. This NL-signal at the output of gate 24 is applied to the lowest input terminal of gate 28, as indicated thereat. Thus, since all of the input terminals of gate 28 except the one which has the HOME signal applied to it, have NL-signals upon them, the HOME signal will be passed by gate 28 to the complement input of flip-flop EPC1 (3:1)*c,d*. The count in the Entry Phase Counter will now be advanced by each succeeding PT-segment of the HOME signal train. Before the arrival of the Entry Phase Counter at its decimal equivalent "6" condition can produce the H Command signal at the output of gate 32, however, qualifying NL-signals must be present upon the two lower input terminals of gate 32. Going to gate 12, it can be seen that its output is an NL-signal, since both the D. P. STG. flip-flop and the Decimal Point Counter were reset during the cleared state of operation of the machine. This NL-signal applied to the lower terminal of gates 25, along with the NL-signal from the FF. terminal of the currently set COM. DIG. flip-flop which is applied to the upper input of gate 25, causes a PL-signal upon the output terminal of gate 25. This PL-signal upon the output terminal of gate 25 is applied to the lower input terminal of gate 30, causing the output of gate 30 to go to NL. Thus, gate 32 has a qualifying NL-signal upon its input terminal identified with the output of gate 30. The HOME signal train upon the lowest input terminal of gate 32 will be in its NL-segment during the entire operating period of the timing chain, i.e., during each field word time.

From the above, it may be seen that the H Command signal will be produced (at the output terminal of gate 32) when the Entry Phase Counter reaches its decimal equivalent "6" condition during initial digit entry. Since the inertia of key motion, the normal key depression speed of the human operator, and the storage capabilities of the capacitors in the Digit Signal Generator key filter circuits, and in the dynamic input gates of the flip-flops of the D-digister cause the digit "3" signal to remain stored in the keyboard number input gates of the D-digister for longer than the period necessary to produce the H Command signal, the PT-segment of the H Command signal will now cause the digit corresponding to the key just depressed, i.e., the digit "3," to be transferred into the D-digister.

Keeping in mind that the embodiment described herein has a 10-key keyboard, it would be necessary to shift all of the digits in the keyboard entry display (Row 1 in the present embodiment) one order to the left if any digits had previously been entered subsequent to the depression of the CLR. ALL key. In the present embodiment, this automatic left-shift of the keyboard entry display is done for the first digit entered after clearing, as well as for subsequently entered digits, as in many other calculating devices. This automatic left-shift is performed in the manner described at length hereinabove in Section 16.4. As may be seen by review of that section, the Shift Left Register 1, or SL1 operation is automatically performed whenever an NL-signal is present upon the upper input terminal of gate 65, throughout a field word time. Tracing the signal upon the upper input terminal of gate 65 to its source at the output terminal of gate 53, and examining the input terminals of gate 53 it is found that just such an NL-signal is present upon the upper input of gate 65 during the field word time at the beginning of which a representation of the digit just entered is transferred into the D-digister, that is, the EPCH SG. is applied to an input of gate 53, in addition to the keyboard digit entry input terminals of the D-digister. The application of the EPCH SG. to an input of gate 53 causes the output terminal of gate 53, and the upper input terminal of gate 65 to carry an NL-signal, and thus, causes the SL1 operation to take place during the field word time to which the EPCH SG. corresponds. In this H-field word time SL1 operation, however, unlike the SL1 operation described in Section 16.4 above, a representation of the digit "3," as just entered into the digit keyboard, is present in the D-digister at the time of the first set of A-to-D, D-to-B, and missing A-to-B variant signals. Thus, the just-entered digit "3" will be transferred from the D-digister to the B-digister at the time when the B-digister would, in "normal loop" operation, contain (2//1) and, thus, the just entered digit "3" will be inserted into cell 2//1 in the field word. Thereafter, the SL1 operation will go on as described in Section 16.4. At the end of the H-field word time, since no digit keys had been depressed in this example, prior to the depression of the digit "3" key and subsequent to the depression of the CLR. ALL key, Row 1 of the display screen will have the digit "3" in its rightmost numerical cell, 1/1, at the end of the H-field word time.

In the present example of the entry of an initial digit, however, the only information carried in the field word circulating in the memory loop will be the synchronizing pulse. In other words, all of the cells of the field word will contain zeros prior to the depression of the digit "3" key. Thus, when the digit "3" key is depressed and, as described above, a representation of this numeral is transferred into the D-digister, then the digit representation transferred into the D-digister from the A-digister at the same time that the digit "3" representation is transferred into the B-digister will be a "0" representation. Thus, the contents of the D-digister will again be "0," and gate 98, the "D CTR. Z SG. S." gate, will supply an enabling PL-signal to the upper input terminal of gate 23. Since the remaining information in the field word is all representative of zeros, then the PL-signal at the output of gate 98, the D-digister zero sensing gate, will be present throughout the H Command time, the output of gate 23 will remain at NL, and gate 28 will remain "open," thus permitting the continued transmission of the HOME signal train to the complementing input of the Entry Phase Counter. At the PT-segment of this signal train, which marks the end of the timing chain period, the Entry Phase Counter will be advanced to its decimal equivalent "7," or all three flip-flops set, state. At this transition the "SHIFT LEFT SG." on the lower input terminal of gate 23 will go to its NL. However, the D-digister zero sensing gate 98 will continue to provide an enabling signal upon the upper input lead of gate 23, due to the fact that the contents of the D-digister will be a digit "0" representation at this time. Thus, the occurrence of the next succeeding PT-segment of the HOME signal train will advance the Entry Phase Counter to its decimal equivalent "0," or all three flip-flops reset, state. At this time, as may be seen from FIGS. 228, 229, and 230, the SUB, ADD, CLR. ENT., MULT, DIV, C. F., and COM. DIG. flip-flops will be reset by the "EPCZ'" SG. produced at the output of gate 29 and applied to reset terminals thereof.

It should be noted at this point that the expression "EPCZ'" is used to indicate that the EPCZ signal has been passed through an emitter follower before being applied to the reset terminals of these flip-flops. Therefore, the primed expression may be considered, for purposes of the logic diagram, to be the full equivalent of the unprimed expression.

It will be clear, that, had the field word contained the representation of a number of several digits, say "5566," in its 2//1, 3//1, 4//1, and 5//1 cells, the same result would have been reached, i.e., the D-digister would ultimately have come to contain a digit "0" representation, and continued to do so until the PT-segment of the HOME signal train at the endof the H command time, or H-field word time. The entry of a digit other than an initial digit, then, would be terminated at the decimal equivalent "0" state of the Entry Phase Counter, just as was the case with the initial entry of a digit.

If, however, the cells 2//1–14//1 of the field word are already occupied by digits, then the final D-to-B transfer, i.e., (14//1) to (15//1), will result in actuation of the O'FLOW flip-flop, lighting the overflow warning lamp in the O'FLOW key, and requiring the depression of that key, clearing the machine.

An additional aspect of the digit entry program, not considered hereinabove, takes place during the decimal equivalent "2," or D Command, state of Entry Phase Counter operation. This additional aspect of the digit entry program comes into play, however, only upon entry of a first digit after the depression of an appropriate function key, i.e., CHANGE SIGN, REPEAT, DIVIDE, CLEAR ENTRY, ENTER MULT, SUBTRACT, ADD, RECALL, or STORE. That is to say, the depression of an initial digit key subsequent to the depression of one of these function keys will cause, at the decimal equivalent "2" state of Entry Phase Counter operation, an upward shift of the entire contents of display Row 1 into display Row 2, before the entry into display Row 1 of the digit indicated by the key depressed. This is accomplished by actuation of the circuitry carrying out the Shift Up (SU) operation, which is described hereinafter in connection with FIG. 353.

This feature of the device of the invention, which is called "automatic sequential access storage," may best be understood by first considering its external manifestations as shown in FIGS. 364 through 371.

Figure 364:
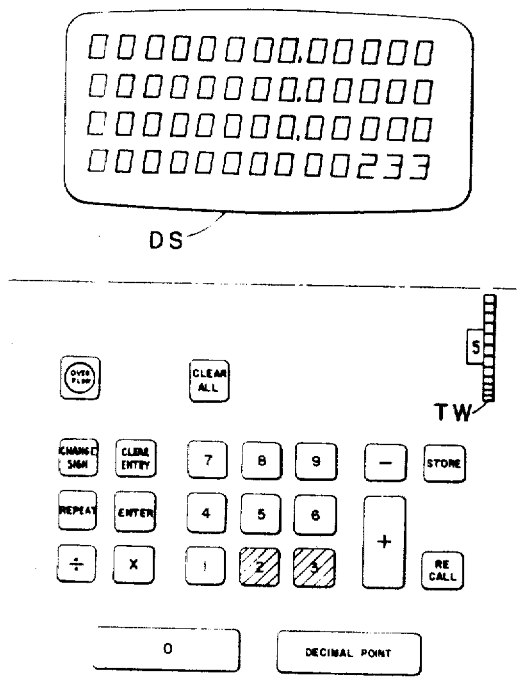
Figure 365:
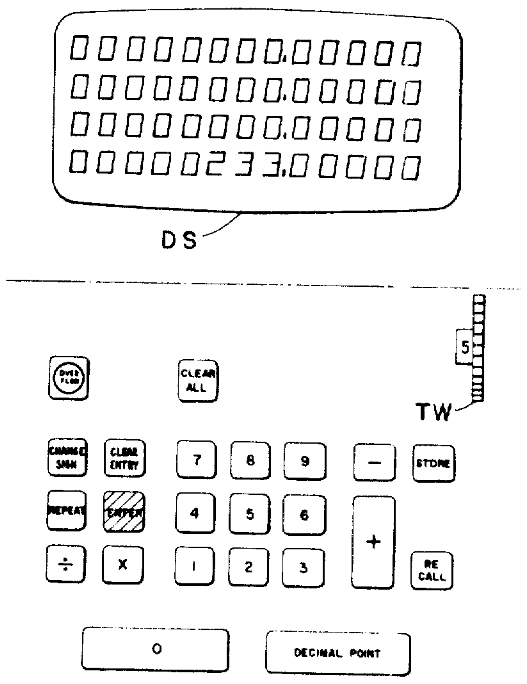

16.6 Automatic Decimal Alignment and Automatic Sequential Access Storage Operation FIG 364 is a schematic showing of the device of the invention as it would appear after depression of the CLEAR ALL, "2," and "3," keys, and a second depression of the "3" key, in that order. It should be noted that the vertical row of decimal point representations is located in the fifth decimal place position, as described hereinabove in connection with FIGS 334 and 335 Given the device of the invention in the condition shown in FIG. 364, the ENTER key is then depressed, with the result shown in FIG. 365. That is to say, the depression of the ENTER key has resulted in aligning the decimal point location in the number "233" just entered (assumed to be at the right-hand edge of the digit group entered if the decimal point key is not depressed) with the decimal points displayed upon the screen. Since the ENTER key is one of the function keys which sets up the program for shifting the Row 1 contents upward at the decimal equivalent "2" state of the Entry Phase Counter upon entry of the next subsequent digit, the depression of the "1," "Decimal Point," and "7" keys, in that order, after the depression of the ENTER key, results in shifting the previously entered number "233" up to Row 2, and entry of the number "17" in Row 1 as shown in FIG. 366.

Figure 366:
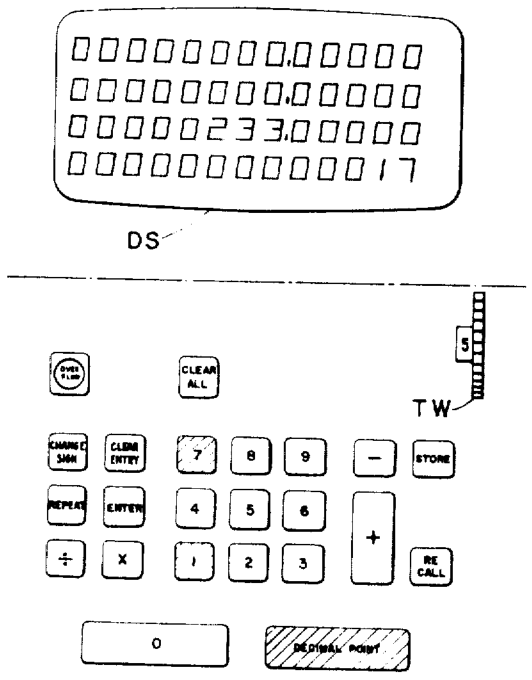
Figure 367:
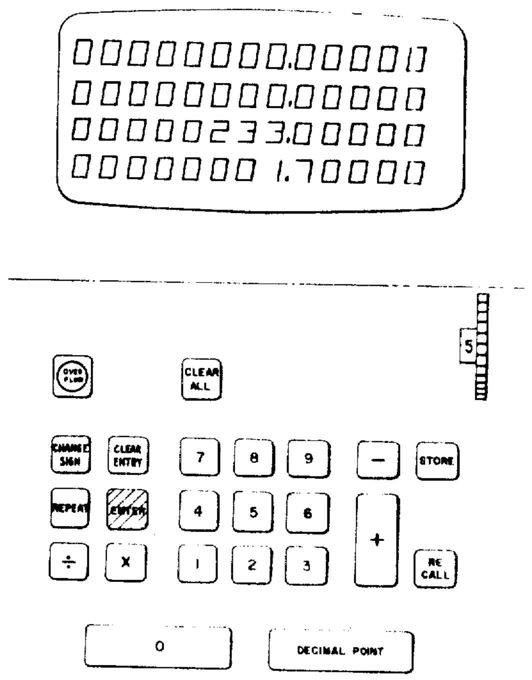

The depression of the DECIMAL POINT key after the "1" key, and before the "7" key has no effect apparent on the display screen during entry of the digits of a number, as can be seen in FIG. 366. However, depression of the ENTER key after depression of the "7" key results (see FIG. 367) in alignment of the digits "1" and "7" with the decimal point upon the screen, in accordance with the previously "keyed in" decimal point, i.e., "keyed in" between the digits "1" and "7." Thus, comparison of the four FIGS. 364, 365, 366, and 367, shows the manner of operation of the automatic decimal alignment system, and the effect of the stored "presumption" that, with no depression of the DECIMAL POINT key, the intended decimal point is located to the right of the last digit entered. FIGS. 364, 365, 366, and 367 also show the automatic sequential entry aspect of the automatic sequential access feature of the invention.

Figure 368:
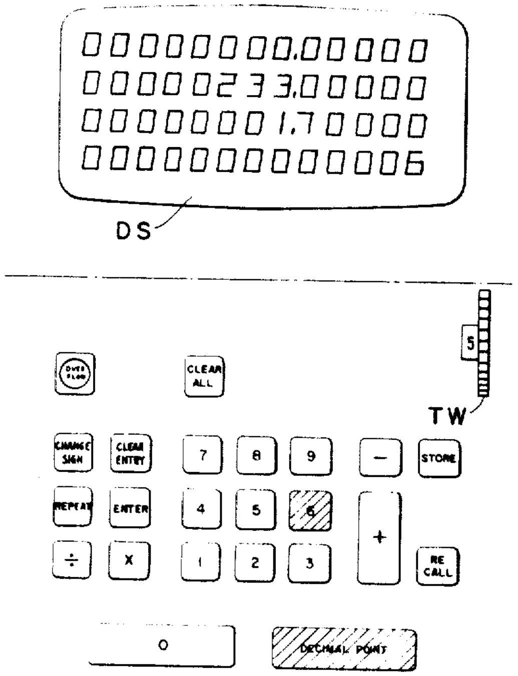

As shown in FIG. 368, the next number entered into the device in this demonstration is entered by depressing the DECIMAL POINT key, and then the digit "6" key, resulting in the appearance of the digit "6" in Row 1 of the display screen, but no decimal point representation. The subsequent depression of the ENTER key, as shown in FIG. 369, results in alignment of the decimal point "keyed in" before the digit "6" with the decimal point upon the display screen.

Figure 369:
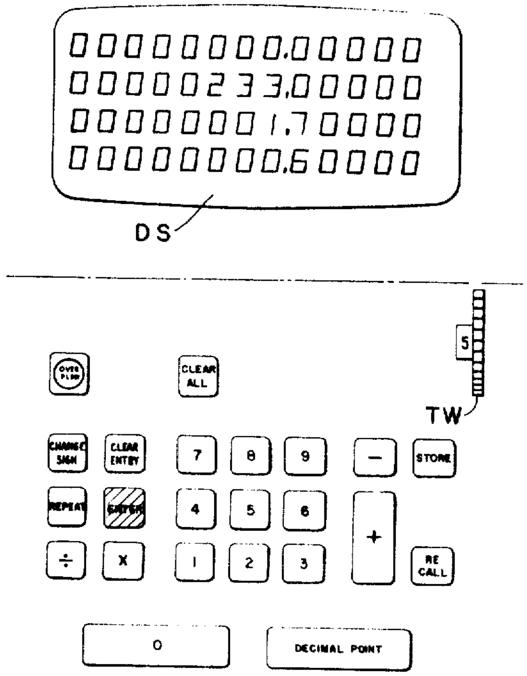

After this depression of the ENTER key, there are three numbers located one above the other, decimal-aligned, in Row 1, Row 2, and Row 3 of the display screen, as shown in FIG. 369.

FIGS. 370 and 371 are now used to show the external manifestations of the automatic sequential retrieval aspect of the automatic sequential access storage feature of the instant invention. The expression "automatic sequential access storage" refers to the automatic up-shifting, or entry, action described in connection with FIGS. 364 through 368, above, and to the automatic down-shifting, or retrieval, action described in connection with FIGS. 369 through 371, below.

The expression "automatic sequential access storage" is employed herein to distinguish this automatic storage action from the operation of the other storage means of the device of the invention, called the "direct access storage."

The direct access storage register, cells 1//S to 14//S of the field word circulating in the memory loop, is not displayed. Information stored in this "blind" register must be stored, from Row 1 of the display screen, by depression of the STORE key; and must be retrieved therefrom, into Row 1 of the display screen, by depression of the RECALL key. Depression of the RECALL key also up-shifts the numbers displayed upon the display screen. This direct access storage is so-called, then, because it is a storage register the contents of which may, by key depression (STORE), be directly entered into storage from Row 1 of the display screen. And may be recalled from storage to Row 1 by depression of another (RECALL) key.

By contrast with the operation of the direct access storage, or DA storage, then, the source of the name "automatic sequential access storage," or "SA storage," may be seen. That is, the SA storage is "sequential" in that, as shown in FIGS. 364 through 368, it automatically introduces sequentially-entered factors into storage Rows 2, 3, and 4; and, as described below in connection with FIGS. 369 through 371, it automatically emits said factors to Row 1 in opposite sequence. The "automatic" nature of the SA storage will also be evident from the discussion given above in connection with FIGS. 364 through 368.

Returning to the discussion of FIGS. 369 through 371, and considering the device of the invention to contain the numbers shown upon the display screen in FIG. 369, the ADD key is now depressed. The result of depressing the ADD key is shown in FIG. 370. As may be seen in Row 1 of the display screen (FIG. 370) the former content of Row 2, viz, "1.7," has been "retrieved," and added to the former content of Row 1, viz., ".6". The sum of these two numbers, viz., "2.3," now appears in Row 1 of the display screen (FIG. 370). The result in Row 1, then, is brought about by two separate actions: (1) addition, and (2) retrieval. This automatic retrieval from the SA store of factors to be entered into mathematical operations constitutes the second, or "automatic sequential retrieval," aspect of the automatic sequential access storage feature of the instant invention.

Subsequent depression of the ADD key will bring about another addition and retrieval, and (FIG. 371) will leave in Row 1, the number "235.3," which is the sum of the three numbers formerly "stacked" upon the display screen (FIG. 369). A further unique aspect of the automatic sequential access storage feature of the instant invention is that, though access to, and retrieval therefrom, are automatic, manual entry may be made thereinto, if desired, by depressing the REPEAT key, and manual retrieval may be made therefrom by depression of the STORE key, though at the expense of losing the number stored in the direct access storage register. It should also be noted depression of the REPEAT key does not eliminate the content of Row 1.

Having now considered its external manifestations, and related machine operations, the reason for the initiation of the up-shift action at decimal equivalent "2" state of the Entry Phase Counter upon entry of an initial digit after the depression of an appropriate function key, may be seen. It will be apparent from the above discussion of "automatic retrieval," and REPEAT key action, that a down-shaft suboperation is also provided. This operation, which is discussed hereinafter, along with the up-shift operation, takes place, for instance, at the decimal equivalent "1" state of the Entry Phase Counter in the ADD operation.

16.7. Suboperations, Addition, and Subtraction

As pointed out hereinabove, the idling state of operation of the device of the invention is characterized inter alia, by a particular routing of the successive digit words through the Arithmetic Unit. In the course of this particular routing, through the Arithmetic Unit, sometimes called the "normal path," or "idling path," each digit word is: (1) sequenced into the A-digister, (2) transferred from the A-digister to the B-digister at the time of occurrence of the $B_{15}$ pulse occurring next after it is completely contained in the A-digister, (3) transferred from the B-digister to the C-digister at the time of occurrence of the next succeeding $B_{15}$ pulse, and (4) sequenced out of the C-digister and back into the Memory Unit during the interval between the $B_{15}$ pulse which brought about its transfer into the C-digister and the next succeeding $B_{15}$ pulse.

As was also pointed out hereinabove, a pulse is supplied to the A-digister at each $B_{15}$ time during idling which "zeroizes" the A-digister.

As set out in detail in Section 16.4, three trains of pulses are necessary to enable the successive digit words constituting the field word to follow the idling path through the Arithmetic Unit: (1) the A-to-B pulse train, which is applied to terminal *b* of the B-digister, (2) the B-to-C pulse train, which is applied to terminal *c* of the C-digister, and (3) the "RESET A" pulse train, which is applied to terminal *c* of the A-digister. These three pulse trains, which are characteristic of the idling state of operation of the device of the invention, are alike in that each of them corresponds fully in number and time to the $B_{15}$ pulse train, the difference between them lying in the terminals of the digisters to which they are supplied.

As pointed out in detail in the discussion of the Shift Left Register 1 (SL1) suboperation, the particular sets of pulse trains supplied to certain terminals of the digisters to carry out the suboperations which make up the key functions of the device, and to carry out the operations of addition and subtraction, may most conveniently be thought of as variants of the basic set of pulse trains which bring about the circulation of the digit words through the "idling path." Thus, for convenience in discussion herebelow, the basic set of pulses which bring about circulation of the digit words through the idling path will be called the "idling pulse trains," or "idling pulses," while the sets of pulse trains necessary to carry out certain named suboperations will be called by the name of the particular suboperation. For instance, the set of pulse trains necessary to bring about SL1 operation will be called the "SL1 pulse trains," or "SL1 pulses." Further, these sets of pulse trains related to specific suboperations, or addition or subtraction, will be referred to with respect to the manner in which they differ from the idling pulse trains, rather than described independently. Thus, the Shift Register 1 Left pulses (FIG. 349) are variants of the idling pulses in that: (1) they include two additional trains, viz., A-to-D and D-to-B, and (2) the A-to-B pulse train varies from the idling version of the same pulse train by the deletion of the fifteenth $B_{15}$ pulse ($B_{15-15}$)

The manner in which the set of pulse trains necessary to produce the SL1 suboperation is generated by the system of gates found in the Control Unit is described in detail in Section 16.4. A reading of that section in conjunction with FIG. 349 will generally indicate the manner in which the sets of pulse trains corresponding to the suboperations, and addition and subtraction, are represented by FIGS. 350 to 361 and it is deemed unnecessary to describe in detail the generation of the other sets of suboperation pulse trains, or the sets of pulse trains employed to bring about addition or subtraction. In the following description of the suboperations, and addition and subtraction, therefore, reference will be had to the corresponding waveforms as shown in FIGS. 349 through 361 to indicate how the various transfers, etc., which comprise a given suboperation, come about, and a description of each suboperation, and addition and subtraction, will be given in terms of those transfers, etc., rather than in terms of the pulse trains necessary to bring them about.

16.7.1. Shift Left Register 1 (SL1—FIG. 349): This suboperation is discussed in detail in Section 16.4, above. It should be particularly noted, however, that fully carrying out this suboperation causes the most significant digit to be stored in the D-digister at the end of the suboperation. It should also be noted that no resetting of the D-digister, nor any out-sequencing thereof, is provided for at the end of this function, because in multiplication a Shift Left Register 2 suboperation follows SL1, and the most significant digit in Row 1 must be inserted into the least significant digit position of Row 2. Consequently, any digit remaining in the D-digister at the commencement of the SL1 suboperation will be inserted into the least significant digit position of Row 2. Also, as may be seen in FIG. 349, the variant aspect of SL1 suboperation does not commence until $B_{15-15}$ is reached in order to avoid shifting the sign information stored in column $C_1$. Similarly, the variant-type of operation is terminated before the end of the suboperation in order to avoid entering an overflow into cell 15//1.

16.7.2. Shift Left Register 2 (SL2—FIG. 350): As will be noted by comparison of FIGS. 349 and 350, the set of SL2 pulse trains differs from the set of SL1 pulse trains only in that the variant pulses are timed with $B_{15-16}$, $B_{15-22}$, etc., rather than with $B_{15-15}$, $B_{15-21}$, etc. Therefore, the SL2 suboperation shifts the digits in Row 2, rather than Row 1, one order to the left.

The path through the Arithmetic Unit, then, will be the same path as that taken by the digit words in the SL1 suboperation, but in SL2 suboperation the digit words in cells 2//2–14//2 will be inserted into cells 3//2–14//2, rather than the digit words in cells 2//1–14//1, being inserted into cells 3//1–14//1, as in the SL1 suboperation. As in the SL1 operation, no resetting or our-sequencing of the D-digister is provided for at the end of the suboperation. In SL2 this retention of the contents of the D-digister at the end of the suboperation is provided to accommodate the division operation.

16.7.3. Shift Down in Addition and Subtraction (SD(A+S)—FIG. 351): In this suboperation the content of each one of the top three rows on the display screen is shifted down into the row immediately below it, and the content of the bottom row of the display screen is shifted into the $R_0$ register (not visible; sometimes called the "M/D register"). This is accomplished (FIG. 351) by transferring the digit words of registers $R_1$, $R_2$, $R_3$, and $R_4$ along the path A-to-C instead of the idling path. To avoid shifting the contents of the $R_S$ register into Row 4 of the display screen, the $R_S$ and $R_0$ register digit words are transferred along the idling path, i.e., the contents of the $R_S$ register is unchanged, and the contents of the $R_1$ register is "written over" the contents of the $R_0$ registers. Also, in this SD(A+S) suboperation, the D-to-B transfer is made each time a digit word of any one of the registers $R_1$, $R_2$, $R_3$, or $R_4$ is transferred from the A-digister to the C-digister, thereby assuring that the B-digister is zeroized whenever the transfer of register $R_S$ and register $R_0$ digit words takes place along the idling path.

16.7.4. Shift Down in Multiplication and Division (SD(M+D)—FIG. 352): In the SD(M+D) suboperation the contents of each one of the top three rows on the display screen are shifted down into the row immediately below, thereby leaving the top row of the display screen "empty," i.e., displaying all zeros. In terms of the field word, this means that the contents of the //4 cells are inserted in the //3 cells, etc. As in the other suboperations, and operations (0//S)–(0//4) are not affected, to preserve the relationship of the synchronizing pulse to the remainder of the field word.

This down-shift of the contents of the display is accomplished, as may be seen in FIG. 352, by "steering" the digit words of registers $R_2$, $R_3$, and $R_4$ directly from the A-digister to the C-digister.

Further, in the SD(M+D) suboperation, the contents of the register word $R_S$ and register word $R_0$ cells remain unchanged. That is, the contents of the M/D and S registers remain unchanged. This is accomplished by "steering" the digit words of these registers over the idling path.

Also a D-to-B transfer is made each time a digit word is steered over the variant path corresponding to the shifting down of the contents of the display, thereby assuring that the B-digister is zeroized in order to zeroize the //4 cells.

16.7.5. Shift Up (SU—FIG. 353): In this suboperation the number appearing in each row of the display screen is shifted to the row immediately above, leaving Row 1 zeroized, i.e., displaying all zeros.

This is accomplished, as shown in FIG. 353, by steering the digit words of the //4, //3, //2, and //1 registers along the direct path from the D-digister to the B-digister after steering the digit words of the //1, //2, and //3 registers along the direct A-to-B path. As shown in FIG. 353, the D-digister is reset at the time of the $B_{15}$ pulse immediately following the complete entry of each digit word in the //4 register into the A-digister, thereby assuring that Row 1 will be zeroized. As an example of this, the D-digister is reset, or zeroized, at $B_{15-30}$, at which time $(4//4)^{SU}$ is in the A-digister.

16.7.6. Shift Up in Repeat (SU(R)—FIG. 354): This operation, which is carried out in response to depression of the REPEAT key, causes the contents of each row of the display to be shifted up to the row next above, but, unlike the SU suboperation, the contents of Row 1 remain unchanged. Thus, as noted in Section 16.6, depression of the REPEAT key enters the content of Row 1 into the first (Row 2) register of the automatic sequential access store. When the REPEAT key is depressed, however, the content of Row 1 remains therein. That is to say, three successive depressions of the REPEAT key will cause the content of Row 1 prior to the first depression of the REPEAT key to appear in all four rows of the display screen. It should be noted that the REPEAT key action differs from the STORE key action in that the STORE key action results in replacing the contents of Row 1 with the contents of Row 2, while the REPEAT key action results in entering the contents of Row 1 into Row 2, without disturbing the contents of Row 1.

As can be seen by comparing FIG. 354 with FIG. 353, the variant paths into which the digit words are steered during the SU(R) operation are the same as those employed during the SU suboperation, with the exception that the Row 1 information is transferred from the A-digister to the B-digister at the $B_{15}$ pulse immediately succeeding its full entry into the A-digister, thereby causing the information in Row 1 to be retained therein, while the D-to-B transfer taking place at those same $B_{15}$ times in the SU suboperation does not take place (since it is not desired to "erase" Row 1, as is the case in the SU suboperation), and the entire pulse train used to zeroize the D-digister in the SU suboperation is eliminated, since it is no longer needed, because it is not desired to zeroize Row 1.

16.7.7. Store (STORE—FIG. 355): The STORE operation is a two-part operation, exclusive of decimal point alignment, which takes place during the decimal equivalent "2" and decimal equivalent "3" states of the Entry Phase Counter.

The effect of this operation, as displayed upon the display screen, is to shift the contents of each of the upper three rows on the display screen down into the row immediately below. The other major effect of the STORE operation, through not visible upon the face of the display screen, is the entry of the contents of Row 1 into the $R_S$ register. However, as may be seen in FIG. 346, the information from Row 1 (//1) must be transferred into register $R_0$ (//0), and then into register $R_S$ (//S). It is the necessity for this dual shift, which causes the STORE operation to be a two-part operation.

Considering the "mechanics" of this operation, then, the first suboperation of the two-part operation, excepting decimal alignment, takes place during the decimal equivalent "2" state of the Entry Phase Counter, and is a shift down operation analogous to the SD operations described hereinabove. For understanding, then of the left-hand portion of the waveforms shown in FIG. 355, reference should be had to the SD suboperations described hereinabove.

The second part of this two-part operation, excepting, of course, decimal alignment, takes place during the decimal equivalent "3" state of Entry Phase Counter operation, and is a suboperation analogous to the SD suboperations described hereinabove, the difference between this shift down operation and the previous shift down operation being found in that the contents of the M/D register (i.e., the $R_0$ register) are shifted into the $R_S$ register, whereas, in the previous phase, the contents of the $R_1$ register were downshifted into the $R_0$ register.

16.7.8. Recall (RECALL—FIG. 356): The RECALL operation, like the STORE operation, is a two-part operation, exclusive of decimal alignment. The first of these two parts is an up-shifting operation analogous to the SU(R) operation described hereinabove, which takes place during the decimal equivalent "2" state of Entry Phase Counter operation.

The second of these two parts is also a shift-up suboperation in which the content of the $R_S$ register is upshifted into the $R_I$ register. The specific variant paths set up to perform the first part of this operation may be determined from consideration of the SU(R) operation waveform diagram, FIG. 354, while the specific mode of variant path steering employed in carrying out the second part of this operation may be determined from the right-hand portion of FIG. 356, bearing in mind that, in addition to the signal trains shown therein, B-to-C and RESET A signals are supplied to terminal *c* of the C-register, and to terminal *c* of the A-register, respectively, at every $B_{15}$ pulse time throughout both parts of the RECALL operation.

16.7.9. Addition (ADD—FIG. 357): In the embodiment described herein the addition operation, i.e., the operation which results from depression of the ADD key, must be distinguished from the add suboperation, which is included in the ADD operation.

The ADD operation is carried out in two parts, exclusive of the decimal point alignment suboperation.

The first of these two suboperations is the SD(A+S) suboperation, described in 16.7.3, to which reference is hereby made. After the performance of this SD(A+S) suboperation, during decimal equivalent (1) state of the Entry Phase Counter, the numbers to be added in the add suboperation are located in the $R_0$ and $R_1$ registers.

At the decimal equivalent "4" state of Entry Phase Counter operation, the add suboperation takes place. The digits in the $R_0$ register are added to the digits in the $R_1$ (Row 1) register, their sum appearing in the $R_1$ register (Row 1) at the completion of the add suboperation.

As shown in FIG. 357, the digit words follow the idling path through the Arithmetic Unit in the add suboperation. However, the RESET A pulse is omitted after the content of each $R_0$ register cell is read into the A-digister. That is, the RESET A pulses corresponding to $B_{15-14}$, $B_{15-20}$, . . ., $B_{15-86}$ are omitted. By this means a representation of the digit contained in $R_0$ is left in the A-digister, the content of the same column of $R_1$ being added thereto as it is counted into the A-digister.

Before the content of the same column of the $R_1$ register is sequenced into the A-digister, however, and after the quantity derived from the same column of the $R_0$ register is transferred to the B-digister, the C&B flip-flop is tested to determine whether a carry has been propagated. If this is so, i.e., if the C&B flip-flop is set, the A-digister is advanced once, and the C&B flip-flop reset. Immediately thereafter, the content of the $R_1$ register digit in the same column is sequenced into the A-digister, leaving the sum and carry therein. Provision is also made to override the resetting action in the event that the carry advances the A-digister from its digit "9"-representing state to its digit "0"-representing state.

16.7.10. Subtract (SUB—FIG. 358): The SUB operation, i.e., the operation resulting from the depression of the SUB key, like the ADD operation, consists of two suboperations in addition to the decimal alignment suboperation.

The first of these suboperations, the SD(A+S) operation described in 16.7.3, is performed during the decimal equivalent "1" phase of operation of the Entry Phase Counter.

The second suboperation takes place during the decimal equivalent "2" state of the Entry Phase Counter. This suboperation varies from the idling state of operation in that each $R_0$ register digit is read into both the A-digister and the D-digister, advancing the A-digister and receding the D-digister. At the termination of the sequencing of an $R_0$ register digit into these digisters, the contents of the A-digister is transferred to the B-digister, and the complemented $R_0$ register digit is transferred from the D-digister to the A-digister. Provision is made to sequence the D-digister once before the $R_0$ register digit is sequenced into it if the borrow flip-flop was set as a result of the operation in a previous column. The borrow from the previous column is "deducted" by receding the D-digister before the $R_0$ register digit is sequenced thereinto, because any pulse-count entering the D-digister sets the borrow flip-flop. Provision is made to reset the C&B flip-flop whenever the A-digister content passes from "9" to "0." The D-digister is reset at the termination of each $R_4$ register digit time, as shown in FIG. 358.

16.7.11. Complement (COMP—FIG. 359): In this operation the digits in register $R_1$ are complemented. This complementing action is necessary, inter alia, when a subtraction is performed having a negative result (left in the $R_1$ register). In that event, the C&B flip-flop remains set after performance of the complete subtraction, and, when the C&B flip-flop is "tested," as indicated in FIG. 358, the action of the COMP flip-flop initiates the COMP suboperation, producing the "true" number in Row 1, and changing the sign of Row 1.

The COMP suboperation varies from idling in that $R_1$ register digits are sequenced into the D-digister. At the termination of this sequencing-in, the complement standing in the D-digister is shifted from the D-digister to the B-digister, and the A-digister to B-digister transfer suppressed, as shown in FIG. 359. Thus, it is immaterial whether the same digit, from Row 1, is sequenced into the A-digister, or not, since the suppression of the A-digister to B-digister transfer "blocks" it. Provision is made for receding the D-digister once before the $R_1$ digit word is sequenced into it. The C&B flip-flop is not reset during this suboperation. The D-digister is reset at the time of each $B_{15}$ pulse, as shown in FIG. 359. As noted above, the A-digister is advanced once before the 1//1 cell content is sequenced into it, because a change of sign must accompany each complementing operation.

16.7.12. Transfer 1→M/D (Erase 1) (1-to-M/D)—FIG. 360): In this suboperation the contents of the $R_1$ register are shifted to the $R_0$ register (M/D register), and the $R_1$ register is zeroized.

This suboperation varies from the idling state of operation in that each digit word of the $R_1$ register is transferred from the A-digister directly to the C-digister at the $B_{15}$ pulse immediately succeeding its entry into the A-digister. Also, the A-to-B and B-to-C transfers are suppressed at this $B_{15}$ time. In order to zeroize Row 1 (register $R_1$), a D-to-B transfer is also made at this $B_{15}$ time.

The "change sign" control signal employed in the multiply and divide operation is generated during this suboperation. This control signal prevents the resetting of the A-digister after (1//1) has been sequenced into it, thereby retaining this sign digit in the A-digister until (1//2) is sequenced into the A-digister, summing the sign digits in 1//2.

16.7.13. Add One to Register 2 ($R_2$+1—FIG. 361): The effect of this suboperation is to add the digit "1" to the contents of register $R_2$.

This suboperation varies from the idling state of operation in that the C&B flip-flop is checked before (2//2) is sequenced into the A-digister and, if the C&B flip-flop is set, the A-digister is advanced once before (2//2), . . ., (14//2) are sequenced into the A-digister.

16.8. Multiplication

The multiplication, or MULT, operation, as performed in the embodiment of the instant invention shown and described herein is outlined in the flow chart of FIG. 362. Reference to FIG. 362 should be had in connection with the following discussion.

Depression of the MULT (×) key causes the contents of Row 2 to be multiplied by the contents of Row 1, the product appearing in Row 1. At the completion of the multiplication operation, the contents of both Row 3 and Row 4 have been shifted down to the row immediately below.

Depression of the MULT key, inter alia, "opens" gate 28, thereby supplying HOME signals to the complementing input of EPC1, and, thereby, advancing the Entry Phase Counter at the termination of each field word time, i.e., when the timing chain is "locked out."

Generally, the suboperation of multiplication performed in every state of operation, or position, of the Entry Phase Counter will be found in the flow chart in FIG. 362, wherein the decimal equivalent of the setting of the Entry Phase Counter is indicated by numbers within parentheses.

A more detailed statement of the parts of the MULT operation performed in each state of the Entry Phase Counter, however, is found in the following paragraphs, the numbers of which are the decimal equivalents of the state of the Entry Phase Counter at which the actions indicated therein take place.

(1) In this state of the Entry Phase Counter, the contents of Row 1 are down-shifted to the $R_0$ (or M/D) register, and the $R_1$ register is cleared. Thus, the device of the embodiment is prepared to carry out the successive additions whereby multiplication is performed herein. In addition to the above shift, and clearing operation, the Decimal Point Counter is set to decimal equivalent "13," and the D. P. STG. flip-flop is reset.

(2) In this state of Entry Phase Counter operation, the numerical contents of Row 1 are shifted left by one order. This is done for decimal alignment. As a result of this SL1 operation, the most significant digit of the number previously displayed in Row 1 remains in the D-digister. At this state of Entry Phase Counter operation, the Decimal Point Counter is receded by one digit. The Decimal Point Counter is set to the 13-decimal position if the counter zero sensing device indicates the presence of a zero in the counter at this time and the D. P. STG. flip-flop is reset.

(3) At this state of Entry Phase Counter operation, the contents of Row 2 are shifted left one order. This is done for reasons of decimal alignment. The most significant digit of Row 1 is now inserted into the least significant digit position of Row 2. The most significant digit of Row 2 is left in the D-digister.

(4) In this state of Entry Phase Counter operation, the contents of register $R_0$ are added to the contents of Row 1 and the sum accumulates in the $R_1$ register until the D-digister goes to zero. Provision is made whereby the D-digister is arranged to be reduced by one digit at every repetition of the add suboperation. As shown at (3:1)*a,b*, means is provided whereby the Entry Phase Counter is arranged to jump back to the decimal equivalent "2" state if the Decimal Point Counter is not zero at the end of this function, whereupon the Entry Phase Counter passes through the previous states, the corresponding operations being performed again. The Entry Phase Counter jumps to step 7 if the Decimal Point Counter is zeroized at the end of this Entry Phase Counter state, the successive additions needed to perform the full multiplication having been made. The Entry Phase Counter is advanced to decimal equivalent "5" if the C&B flip-flop is set at the end of this present Entry Phase Counter step.

(5) At this state of the Entry Phase Counter operation, the digit "1" is added to the contents of the $R_2$ register, and the Entry Phase Counter jumps back to its decimal equivalent "4" state.

(7) In this state of Entry Phase Counter operation, the upper three numbers displayed upon the display screen are shifted down once, leaving the former top three numbers displayed in the lower three rows on the display screen.

It should be noted that the suboperation mentioned in the above paragraph are explained in detail in Section 16.7.

16.9. Division

The operation which takes place in the embodiment described and shown herein in response to depression of the DIV ( : ) key is outlined in the flow chart of FIG. 363. In this figure, as in FIG. 362, the numbers in parentheses are decimal equivalents of states of the Entry Phase Counter.

Depression of the DIV key in the embodiment results in first dividing the contents of Row 2 by the contents of Row 1, the quotient being temporarily located in Register $R_2$. When this division suboperation is complete, the contents of each one of Rows 2, 3, and 4 is down-shifted to the row immediately below, leaving the quotient of the DIV operation in Row 1.

While the sequence of suboperations making up the DIV operation is set out in detail in FIG. 363, certain aspects of the DIV operation which should be particularly noted are discussed in detail in the following numbered paragraphs.

The number of each paragraph is the decimal equivalent of the state, or setting, of the Entry Phase Counter at the time when the action indicated in the paragraph takes place.

Depression of the DIV key, inter alia, "opens" a gate which passes HOME pulses to the complementing input of the EPC1 flip-flop, thereby advancing the state of the Entry Phase Counter at the occurrence of the each PT-segment of the HOME signal train, i.e., each time the timing chain is "locked out."

(1) During this state of Entry Pase Counter operation, the contents of Row 1 are down-shifted to the $R_0$ register, and Row 1 is cleared. Thus, the device is prepared for the suboperations by which division is performed. Also, the Decimal Point Counter is set to decimal equivalent "14," and the D. P. STG. flip-flop is reset, at this state of Entry Phase Counter operation.

(2) In this state of Entry Phase Counter operation, the contents of the $R_0$ register are subtracted from the contents of the $R_1$ register (Row 1), the difference appearing in the $R_1$ register. At the termination of this state of the Entry Phase Counter, as shown in FIG. 363, a test is made to determine whether the difference stored in the $R_1$ register is positive or negative. If this difference is positive, then the Entry Phase Counter is advanced to decimal equivalent "3" state. On the other hand, if this difference in the $R_1$ register is negative, then the Entry Phase Counter is jumped to the decimal equivalent "4" state. The advance to the decimal equivalent "3" state (difference positive) is made in order to add the digit "1" into the $R_2$ register, because it is by this process that the quotient is accumulated in the $R_2$ register. The jump to the decimal equivalent "4" state of the Entry Phase Counter (difference negative) is made when subtraction is complete for a given order, so far as the content of the $R_2$ register is concerned, it being understood that the negative state of the $R_1$ register at this time indicates that an overdraft has been subtracted from the contents of the $R_1$ register, which overdraft must be restored before proceeding with subtraction in the next order.

(3) This state of operation of the Entry Phase Counter is reached, as indicated above, each time the contents of the $R_0$ register is subtracted from the contents of the $R_1$ register, leaving a positive difference in the $R_1$ register. The suboperation carried out during this state of the Entry Phase Counter is the addition of the digit "1," in the correct column, to the contents of the $R_2$ register. Successive returns to this state of Entry Phase Counter operation cause the quotient to be accumulated in the $R_2$ register.

(4) In this state of the Entry Phase Counter operation, the contents of the $R_0$ register are added to the contents of the $R_1$ register, thus restoring the overdraft. At the termination of this state of the Entry Phase Counter, as shown in FIG. 363, the Entry Phase Counter jumps to the decimal equivalent "7" state if the Decimal Point Counter is in its decimal equivalent "0" state, the successive subtractions of the DIV operation having been completed. If, on the other hand, the Decimal Point Counter is not in its decimal equivalent "0" state at this time, then the Entry Phase Counter advances to its decimal equivalent "5" state, as shown in FIG. 363.

(5) In this state of Entry Phase Counter operation, the contents of the $R_2$ register are left-shifted by one order, thus preparing this register to accept additions of digit "1" (see paragraph 3) each time the contents of register $R_0$ are successfully subtracted from the contents of register $R_1$ in the next order. At this time, the most significant digit in the $R_2$ register is left in the D-digister.

(6) In this state of the Entry Phase Counter operation, the contents of the $R_1$ register are left-shifted by one order. The most significant digit of the $R_2$ register which was just previously stored in the D-digister, as noted above, is entered into the least significant digit position of the $R_1$ register. At this state of Entry Phase Counter operation the most significant digit of the $R_2$ register is also left stored in the D-digister. The Decimal Point Counter is receded once at the termination of this state of Entry Phase Counter operation. If, by this deduction from the contents of the Decimal Point Counter, the content of the Decimal Point Counter goes to decimal equivalent "0," then the D. P. STG. flip-flop is reset, in response to which the content of the Decimal Point Counter is altered to the decimal equivalent of the number of decimal positions indicated by the setting of thumbwheel TW. The D. P. STG. flip-flop is then set, and a jump back to the decimal equivalent "2" state of Entry Phase Counter operation takes place. The above-described successive subtraction operation then continues until the content of the Decimal Point Counter is again reduced to zero, whereat a jump from the decimal equivalent "4" state of the Entry Phase Counter to the decimal equivalent "7" state of the Entry Phase Counter takes place.

(7) In this final state of the entry Phase Counter operation, the digits of the $R_2$, $R_3$, and $R_4$ registers are all shifted downward to the next lower register, thus placing the quotient in the $R_1$ register (Row 1).

16.10. Suboperating Timing

Table ST (Appendix N) shows, for each key-controlled operation, the decimal equivalent states of Entry Phase Counter operation wherein the suboperations of which these operations are comprised, take place.

The following table shows the decimal equivalent state of the Entry Phase Counter at which each of the Entry Phase Command signals, produced by gates 29, and 31 through 39, is present.

TABLE EPCS

| | Gate | Decimal equivalent of counter state |
|---|---|---|
| Entry phase command: | | |
| A | 39 | 3 |
| B | 38 | 5 |
| C | 37 | 1 |
| D | 36 | 2 |
| E | 35 | 3 |
| F | 34 | 4 |
| G | 33 | 5 |
| H | 32 | 6 |
| I | 31 | 7 |
| Z | 29 | 0 |

16.11. Display of Register Contents

A principal feature of the instant invention lies in the manner of synchronizing the display of digits upon the display screen with the circulation of the digit words corresponding to those displayed digits in the memory loop. As will be apparent to those skilled in the art, from consideration of the instant specification and drawings, the high speed at which the field word of information circulates in the memory loop (one complete traverse of the memory of the memory loop taking about five milliseconds) makes it manifestly impracticable to derive the digit display control signals directly from some access point of the memory loop. For instance, if the output of inverter 26 (3:1)*c* were taken as such an access point, then all of the information defining a single digit to be displayed would be manifested thereat within a period of forty-eight microseconds. Thus, if the display action were actually fully synchronized with the memory loop contents as manifested at this access point, the time available for positioning the cathode-ray beam and sweeping out each stroke of a display digit would be about three microseconds. From this it may be seen that the provision of cathode-ray display means capable of manifesting digits at this speed, and at a brightness sufficient for practical use in a calculator in well-lighted surroundings, would be, at best prohibitively expensive.

The feature discussed in this section, then, directs itself to the problem of "gearing down" the information circulating upon the memory loop so that a substantial part of this information, viz., the numerical and sign contents of the $R_1$, $R_2$, $R_3$, and $R_4$ registers, may be displayed.

The display means comprises: (1) the D-digister, gate 81, gate 75, and certain other gate means controlling those gate means, all of these elements including the D-digister being "shared" with the Arithmetic Unit and the Control Unit, (2) the display matrix, (3) the blanking gates of FIG. 310, (4) the character raster generating means including the segment generating means found at the bottom of FIG. 310 and the character raster sweep means found at the bottom and top portions of FIG. 313, (5) the CRT driver circuit found at the top of FIG. 310, and (6) the cathode-ray display tube, not shown in the logic diagram.

The display matrix receives sets of signals, inter alia, from the D-digister, indicating which digit, or sign, is currently stored therein, and from the Timing Signal Generator, indicating which stroke of the character raster is currently being swept out upon the display screen. In response to these, and other, signals, the display matrix produces, inter alia, a stroke blanking signal, which is supplied to one of the inputs of the main blanking gate (7:2)*e,f*. The output of this main blanking gate, a C-type gate, permits only such strokes of any character raster to be displayed as will represent the digit word then stored in the D-digister.

This novel display circuit, without more, is not capable of displaying the selected portion of the information contained in the field word circulating in the memory loop. This is so for two reasons, viz.: (1) that, in the active state of operation of the device, many of the digit words either do not pass through the D-digister at all, or are in the D-digister for a period of time shorter than that necessary to generate a digit upon the display screen, and (2) that the order of appearance of the digit word circulating in the memory loop is different from the order in which the registers of the display raster are swept out on the display screen.

For the solution of these two difficulties, resort must be had to the novel coordinating means which constitutes a principal feature of the instant invention.

This novel coordinating means comprises the Compare Signal Generator, the DISP. C. flip-flop, gate 63, and Decimal Position Signal Generator (II).

Since the operation of the Compare Signal Generator and DISP. C. flip-flop must be understood in order to most easily understand the operation of Decimal Position Signal Generator (II), the operation of Compare Signal Generator, the DISP. C. flip-flop, and gate 63 associated therewith, will first be considered.

FIG. 333 shows a schematic diagram of the Compare Signal Generator, including the designation of the flip-flop output signals applied to its various input terminals.

FIG. 348 shows the standard field word diagram of FIG. 346, used herein to explain the operation of the device of the invention, to which has been added a group of legends indicating the states, at the various column and row times, of the flip-flops having output signals applied to one or more of the inputs of the Compare Signal Generator, as shown in FIG. 333.

Also included in FIG. 348 is a diagram, derived from FIG. 333, indicating the states of the various flip-flops providing inputs to the Compare Signal Generator at which the COMPARE SG. is produced at the output of the Compare Signal Generator. Since the derivation of this diagram, given FIG. 333, will be apparent to those skilled in the art in view of the instant specification and drawings, this derivation will not be set out at length here.

Going, now, to FIG. 348, it will be shown that the Compare Signal Generator produces its significant signal level (PL) during the sequencing into the A-digister of the digit words of the $R_1$ register word, the digit words of the $R_2$ register word, the digit words of the $R_3$ register word, and the digit words of the $R_4$ register word taken in that order. That is, it will be shown that the COMPARE SG. exists during the period of entry into the A-digister of each one of the following succession of digit words: (1//1), . . ., (14//1), (1//2), . . . (14//2), (1//3) . . . (14//3), (1//4), . . . (14//4). This sequence is of course, the order of displayed digit generation shown in the diagrammatic symbol in the lower, right-hand corner of FIG. 346. As also may be seen at the right-hand corner of FIG. 346, however, the field word is "swept out," or put differently, the order of appearance of the cells of the field word at the A-digister is manifested, by "scanning" the field word diagram from the bottom to the top of each row, and from right to left.

Scanning the diagram in that order, then, we arrive at cell 1//1.

First, it is clear that 1//S and 1//0 will not be displayed since, as may be seen at the left-hand side of the diagram, the G flip-flop is set during these two register times, and, as indicated in the Compare Signal Generator conditions diagram (FIG. 348) the G flip-flop must be reset in order to produce a compare signal.

Second, if the display device is currently conditioned to display Row 1, which is determined by the M and N flip-flops both being in their reset state (see left-hand side of FIG. 348), then the compare signal will be present at the output of the Compare Signal Generator while (1//1) is being entered into the A-digister, because all of the conditions necessary for producing it exist. That is, the M and N flip-flops are reset (assumed), the G flip-flop is reset (see left-hand end of register $R_1$ in diagram), and the E and F flip-flops are reset, as they always are during register $R_1$ time (see right-hand edge of FIG. 348).

It will also be evident that, so long as the M and N flip-flops remain reset, which they will throughout an entire display Row 1 time, no COMPARE SG. can be generated, except when the contents of a cell which is in register $R_1$ is entering the A-digister.

Similiarly, it will be clear that when the M flip-flop is set and the N flip-flop is reset, COMPARE SG. will be produced only during register $R_2$ (Row 2) time.

Given COMPARE SG. occurring in this order, the operation of the coordinating means may be clearly understood.

First, the COMPARE SG., as applied to gate 63, etc., causes an A-to-D transfer of each succeeding digit word in a register word. Since there is a complete column time between the "scanning" of one digit of a register and the next, and since digit display takes place during idling time, when no other digit words are being read into the D-digister, the character to be displayed remains in the D-digister for an entire column time, making it possible to display each digit with a much slower sweeping action than would be the case were the field word used directly. Thus, digit display can be accomplished by the display means shown and described herein. The DISP. C. flip-flop, driven by the Compare Signal Generator, unblanks the character display during these column times.

A further aspect of the coordinating means operation which must be considered is that of decimal point display. As may be seen in FIG. 205, Decimal Position Signal Generator (II) has supplied to it the eight column time-defining flip-flop output waveforms, viz., the output waveforms of the H, J, K, and L flip-flops. The output of Decimal Position Signal Generator (II) is supplied to the display screen blanking means, see gate 110. Thus, Decimal Position Signal Generator (II) is adapted to unblank the display means at sweep 15 time, at which time the decimal point is displayed, or conditioned for display. Since, as pointed out in connection with FIG. 348, each digit is swept out during a complete column time, and, since, as shown in FIG. 339, the decimal point is generated during the fifteenth, or last, segment time of the character raster, it follows that the decimal point will not be displayed during the column time in which the sweeping out of a particular digit was commenced, but rather during the next succeeding column time. For this reason, the "encoding" of the input lead connection, and switch connections of Decimal Position Signal Generator (II) must be understood to unblank the decimal point segment time during the column succeeding the column in which the scanning of the character raster of a particular digit is begun.

16.12. Decimal Alignment and Display

For a description of the employment of the Decimal Point Counter, which is "fed" by Decimal Position Signal Generator (I), in bringing about decimal alignment, see the sections above relating to specific operations.

For a discussion of the operation of Decimal Position Signal Generator (II) in bringing about the display of the selected decimal point upon the display screen, see the previous section, 16.11.

17. SUMMARY OF THE INVENTION

It will be appreciated that, by the above-described constructions, a calculating device is provided which is compact, silent in operation, and at the same time capable of performing combinations of the basic arithmetic operations more expeditiously than has hitherto been possible.

It will also be appreciated that the novel and inventive mode disclosed herein of coordinating high-speed calculating and relatively low-speed display sections of electronic calculating devices makes possible the joint use of a silent, compact memory device and an economically realizable, compact, multi-register, display device, which combination, and its attendant advantages, have hitherto not been available in a single calculating device.

It will also be recognized that a unique mode of employing delay lines as storage means in electronic calculating devices is provided, wherein the timing chain of said devices is synchronized with the circulation of the information upon the delay line in a novel and advantageous manner, whereby the effects of thermally-induced variations in the delay time of the delay line are avoided.

18. ALTERNATIVE EMBODIMENTS

It is particularly noted that, although the embodiment of the invention shown and described herein includes a "blind" direct access storage register, a calculating device may be constructed within the scope of the instant invention in which the contents of the direct access storage register are visibilized upon the display screen, either in the place of one of the automatic sequential access register displays, or in a register additional to those displayed upon the display screen in the embodiment.

Additionally, while the embodiment of the invention shown and described herein comprises a novel system of automatic sequential access storage registers, the elimination of this automatic sequential access storage register feature may be accomplished when desired.

Also, if desired, one may produce a device in which the several registers of the automatic sequential access store are "blind," rather than displayed within the scope of the instant invention.

Other diminutions or augmentations of the functions, storage means, display means, or other features of the embodiment shown and described herein may be made within the scope of the invention.

TABLE $WFB_0+B_1$

| | | | |
|---|---|---|---|
| 0000 N | 0409 P | 0797 N | 1209 P |
| 0025 P | 0413 N | 0825 P | 1213 N |
| 0029 N | 0441 P | 0829 N | 1241 P |
| 0057 P | 0445 N | 0857 P | 1245 N |
| 0061 N | 0473 P | 0861 N | 1273 P |
| 0089 P | 0477 N | 0889 P | 1277 N |
| 0093 N | 0505 P | 0893 N | 1305 P |
| 0121 P | 0509 N | 0921 P | 1309 N |
| 0125 N | 0537 P | 0925 N | 1337 P |
| 0153 P | 0541 N | 0953 P | 1341 N |
| 0157 N | 0569 P | 0957 N | 1369 P |
| 0185 P | 0573 N | 0985 P | 1373 N |
| 0189 N | 0601 P | 0989 N | 1401 P |
| 0217 P | 0605 N | 1017 P | 1405 N |
| 0221 N | 0633 P | 1021 N | 1433 P |
| 0249 P | 0637 N | 1049 P | 1437 N |
| 0253 N | 0665 P | 1053 N | 1465 P |
| 0281 P | 0669 N | 1081 P | 1469 N |
| 0285 N | 0697 P | 1085 N | 1497 P |
| 0313 P | 0701 N | 1113 P | 1501 N |
| 0317 N | 0729 P | 1117 N | 1529 P |
| 0345 P | 0733 N | 1145 P | 1533 N |
| 0349 N | 0761 P | 1149 N | 1561 P |
| 0377 P | 0765 N | 1177 P | 1565 N |
| 0381 N | 0793 P | 1181 N | 1593 P |

| | | | |
|---|---|---|---|
| 1597 N | 1977 P | 2333 N | 2713 P |
| 1625 P | 1981 N | 2361 P | 2717 N |
| 1629 N | 2009 P | 2365 N | 2745 P |
| 1657 P | 2013 N | 2393 P | 2749 N |
| 1661 N | 2041 P | 2397 N | 2777 P |
| 1689 P | 2045 N | 2425 P | 2781 N |
| 1693 N | 2073 P | 2429 N | 2809 P |
| 1721 P | 2077 N | 2457 P | 2813 N |
| 1725 N | 2105 P | 2461 N | 2841 P |
| 1753 P | 2109 N | 2489 P | 2845 N |
| 1757 N | 2137 P | 2493 N | 2873 P |
| 1785 P | 2141 N | 2521 P | 2877 N |
| 1789 N | 2169 P | 2525 N | 2905 P |
| 1817 P | 2173 N | 2553 P | 2909 N |
| 1821 N | 2201 P | 2557 N | 2937 P |
| 1849 P | 2205 N | 2585 P | 2941 N |
| 1853 N | 2233 P | 2589 N | 2969 P |
| 1881 P | 2237 N | 2617 P | 2973 N |
| 1885 N | 2265 P | 2621 N | 3001 P |
| 1913 P | 2269 N | 2649 P | 3005 N |
| 1917 N | 2297 P | 2653 N | 3033 P |
| 1945 P | 2301 N | 2681 P | 3037 N |
| 1949 N | 2329 P | 2685 N | 3065 P(HOME) |
| | | | 0000 |

TABLE $WFB_{14}+B_{15}$

| | | | |
|---|---|---|---|
| 0000 N | 0405 P | 0793 N | 1205 P |
| 0021 P | 0409 N | 0821 P | 1209 N |
| 0025 N | 0437 P | 0825 N | 1237 P |
| 0053 P | 0441 N | 0853 P | 1241 N |
| 0057 N | 0469 P | 0857 N | 1269 P |
| 0085 P | 0473 N | 0885 P | 1273 N |
| 0089 N | 0501 P | 0889 N | 1301 P |
| 0117 P | 0505 N | 0917 P | 1305 N |
| 0121 N | 0533 P | 0921 N | 1333 P |
| 0149 P | 0537 N | 0949 P | 1337 N |
| 0153 N | 0565 P | 0953 N | 1365 P |
| 0181 P | 0569 N | 0981 P | 1369 N |
| 0185 N | 0597 P | 0985 N | 1397 P |
| 0213 P | 0601 N | 1013 P | 1401 N |
| 0217 N | 0629 P | 1017 N | 1429 P |
| 0245 P | 0633 N | 1045 P | 1433 N |
| 0249 N | 0661 P | 1049 N | 1461 P |
| 0277 P | 0665 N | 1077 P | 1465 N |
| 0281 N | 0693 P | 1081 N | 1493 P |
| 0309 P | 0697 N | 1109 P | 1497 N |
| 0313 N | 0725 P | 1113 N | 1525 P |
| 0341 P | 0729 N | 1141 P | 1529 N |
| 0345 N | 0757 P | 1145 N | 1557 P |
| 0373 P | 0761 N | 1173 P | 1561 N |
| 0377 N | 0789 P | 1177 N | 1589 P |

| | | | |
|---|---|---|---|
| 1593 N | 1973 P | 2329 N | 2709 P |
| 1621 P | 1977 N | 2357 P | 2713 N |
| 1625 N | 2005 P | 2361 N | 2741 P |
| 1653 P | 2009 N | 2389 P | 2745 N |
| 1657 N | 2037 P | 2393 N | 2773 P |
| 1685 P | 2041 N | 2421 P | 2777 N |
| 1689 N | 2069 P | 2425 N | 2805 P |
| 1717 P | 2073 N | 2453 P | 2809 N |
| 1721 N | 2101 P | 2457 N | 2837 P |
| 1749 P | 2105 N | 2485 P | 2841 N |
| 1753 N | 2133 P | 2489 N | 2869 P |
| 1781 P | 2137 N | 2517 P | 2873 N |
| 1785 N | 2165 P | 2521 N | 2901 P |
| 1813 P | 2169 N | 2549 P | 2905 N |
| 1817 N | 2197 P | 2553 N | 2933 P |
| 1845 P | 2201 N | 2581 P | 2937 N |
| 1849 N | 2229 P | 2585 N | 2965 P |
| 1877 P | 2233 N | 2613 P | 2969 N |
| 1881 N | 2261 P | 2617 N | 2997 P |
| 1909 P | 2265 N | 2645 P | 3001 N |
| 1913 N | 2293 P | 2649 N | 3029 P |
| 1941 P | 2297 N | 2677 P | 3033 N |
| 1945 N | 2325 P | 2681 N | 3061 P |
| | | | 3065 N(HOME) |
| | | | 0000 |

TABLE $WFB_{15}$

| | | | |
|---|---|---|---|
| 0000 N | 0375 P | 0729 N | 1111 P |
| 0023 P | 0377 N | 0759 P | 1113 N |
| 0025 N | 0407 P | 0761 N | 1143 P |
| 0055 P | 0409 N | 0791 P | 1145 N |
| 0057 N | 0439 P | 0793 N | 1175 P |
| 0087 P | 0441 N | 0823 P | 1177 N |
| 0089 N | 0471 P | 0825 N | 1207 P |
| 0119 P | 0473 N | 0855 P | 1209 N |
| 0121 N | 0503 P | 0857 N | 1239 P |
| 0151 P | 0505 N | 0887 P | 1241 N |
| 0153 N | 0535 P | 0889 N | 1271 P |
| 0183 P | 0537 N | 0919 P | 1273 N |
| 0185 N | 0567 P | 0921 N | 1303 P |
| 0215 P | 0569 N | 0951 P | 1305 N |
| 0217 N | 0599 P | 0953 N | 1335 P |
| 0247 P | 0601 N | 0983 P | 1337 N |
| 0249 N | 0631 P | 0985 N | 1367 P |
| 0279 P | 0633 N | 1015 P | 1369 N |
| 0281 N | 0663 P | 1017 N | 1399 P |
| 0311 P | 0665 N | 1047 P | 1401 N |
| 0313 N | 0695 P | 1049 N | 1431 P |
| 0343 P | 0697 N | 1079 P | 1433 N |
| 0345 N | 0727 P | 1081 N | 1463 P |

TABLE $WFB_{15}$ (Cont'd.)

| | | | |
|---|---|---|---|
| 1465 N | 1879 P | 2265 N | 2679 P |
| 1495 P | 1881 N | 2295 P | 2681 N |
| 1497 N | 1911 P | 2297 N | 2711 P |
| 1527 P | 1913 N | 2327 P | 2713 N |
| 1529 N | 1943 P | 2329 N | 2743 P |
| 1559 P | 1945 N | 2359 P | 2745 N |
| 1561 N | 1975 P | 2361 N | 2775 P |
| 1591 P | 1977 N | 2391 P | 2777 N |
| 1593 N | 2007 P | 2393 N | 2807 P |
| 1623 P | 2009 N | 2423 P | 2809 N |
| 1625 N | 2039 P | 2425 N | 2839 P |
| 1655 P | 2041 N | 2455 P | 2841 N |
| 1657 N | 2071 P | 2457 N | 2871 P |
| 1687 P | 2073 N | 2487 P | 2873 N |
| 1689 N | 2103 P | 2489 N | 2903 P |
| 1719 P | 2105 N | 2519 P | 2905 N |
| 1721 N | 2135 P | 2521 N | 2935 P |
| 1751 P | 2137 N | 2551 P | 2937 N |
| 1753 N | 2167 P | 2553 N | 2967 P |
| 1783 P | 2169 N | 2583 P | 2969 N |
| 1785 N | 2199 P | 2585 N | 2999 P |
| 1815 P | 2201 N | 2615 P | 3001 N |
| 1817 N | 2231 P | 2617 N | 3031 P |
| 1847 P | 2233 N | 2647 P | 3033 N |
| 1849 N | 2263 P | 2649 N | 3063 P |
| | | | 3065 N (HOME) |
| | | | 0000 |

TABLE WFD

| | | | |
|---|---|---|---|
| 0000 N | 0377 N | 0761 N | 1145 N |
| 0009 P | 0393 P | 0777 P | 1161 P |
| 0025 N | 0409 N | 0793 N | 1177 N |
| 0041 P | 0425 P | 0809 P | 1193 P |
| 0057 N | 0441 N | 0825 N | 1209 N |
| 0073 P | 0457 P | 0841 P | 1225 P |
| 0089 N | 0473 N | 0857 N | 1241 N |
| 0105 P | 0489 P | 0873 P | 1257 P |
| 0121 N | 0505 N | 0889 N | 1273 N |
| 0137 P | 0521 P | 0905 P | 1289 P |
| 0153 N | 0537 N | 0921 N | 1305 N |
| 0169 P | 0553 P | 0937 P | 1321 P |
| 0185 N | 0569 N | 0953 N | 1337 N |
| 0201 P | 0585 P | 0969 P | 1353 P |
| 0217 N | 0601 N | 0985 N | 1369 N |
| 0233 P | 0617 P | 1001 P | 1385 P |
| 0249 N | 0633 N | 1017 N | 1401 N |
| 0265 P | 0649 P | 1033 P | 1417 P |
| 0281 N | 0665 N | 1049 N | 1433 N |
| 0297 P | 0681 P | 1065 P | 1449 P |
| 0313 N | 0697 N | 1081 N | 1465 N |
| 0329 P | 0713 P | 1097 P | 1481 P |
| 0345 N | 0729 N | 1113 N | 1497 N |
| 0361 P | 0745 P | 1129 P | 1513 P |

TABLE WFD (Cont'd.)

| | | | |
|---|---|---|---|
| 1529 N | 1913 N | 2297 N | 2681 N |
| 1545 P | 1929 P | 2313 P | 2697 P |
| 1561 N | 1945 N | 2329 N | 2713 N |
| 1577 P | 1961 P | 2345 P | 2729 P |
| 1593 N | 1977 N | 2361 N | 2745 N |
| 1609 P | 1993 P | 2377 P | 2761 P |
| 1625 N | 2009 N | 2393 N | 2777 N |
| 1641 P | 2025 P | 2409 P | 2793 P |
| 1657 N | 2041 N | 2425 N | 2809 N |
| 1673 P | 2057 P | 2441 P | 2825 P |
| 1689 N | 2073 N | 2457 N | 2841 N |
| 1705 P | 2089 P | 2473 P | 2857 P |
| 1721 N | 2105 N | 2489 N | 2873 N |
| 1737 P | 2121 P | 2505 P | 2889 P |
| 1753 N | 2137 N | 2521 N | 2905 N |
| 1769 P | 2153 P | 2537 P | 2921 P |
| 1785 N | 2169 N | 2553 N | 2937 N |
| 1801 P | 2185 P | 2569 P | 2953 P |
| 1817 N | 2201 N | 2585 N | 2969 N |
| 1833 P | 2217 P | 2601 P | 2985 P |
| 1849 N | 2233 N | 2617 N | 3001 N |
| 1865 P | 2249 P | 2633 P | 3017 P |
| 1881 N | 2265 N | 2649 N | 3033 N |
| 1897 P | 2281 P | 2665 P | 3049 P |
| | | | 3065 N(HOME) |
| | | | 0000 |

TABLE WFE

| | | | |
|---|---|---|---|
| 0000 N | 0761 N | 1529 N | 2297 N |
| 0025 P | 0793 P | 1561 P | 2329 P |
| 0057 N | 0825 N | 1593 N | 2361 N |
| 0089 P | 0857 P | 1625 P | 2393 P |
| 0121 N | 0889 N | 1657 N | 2425 N |
| 0153 P | 0921 P | 1689 P | 2457 P |
| 0185 N | 0953 N | 1721 N | 2489 N |
| 0217 P | 0985 P | 1753 P | 2521 P |
| 0249 N | 1017 N | 1785 N | 2553 N |
| 0281 P | 1049 P | 1817 P | 2585 P |
| 0313 N | 1081 N | 1849 N | 2617 N |
| 0345 P | 1113 P | 1881 P | 2649 P |
| 0377 N | 1145 N | 1913 N | 2681 N |
| 0409 P | 1177 P | 1945 P | 2713 P |
| 0441 N | 1209 N | 1977 N | 2745 N |
| 0473 P | 1241 P | 2009 P | 2777 P |
| 0505 N | 1273 N | 2041 N | 2809 N |
| 0537 P | 1305 P | 2073 P | 2841 P |
| 0569 N | 1337 N | 2105 N | 2873 N |
| 0601 P | 1369 P | 2137 P | 2905 P |
| 0633 N | 1401 N | 2169 N | 2937 N |
| 0665 P | 1433 P | 2201 P | 2969 P |
| 0697 N | 1465 N | 2233 N | 3001 N |
| 0729 P | 1497 P | 2265 P | 3033 P |
| | | | 3065 N(HOME) |
| | | | 0000 |

TABLE $WFR_0$

| | | | |
|---|---|---|---|
| 0000 N | 0633 N | 1401 N | 2169 N |
| 0025 P | 0793 P | 1561 P | 2329 P |
| 0057 N | 0825 N | 1593 N | 2361 N |
| 0217 P | 0985 P | 1753 P | 2521 P |
| 0249 N | 1017 N | 1785 N | 2553 N |
| 0409 P | 1177 P | 1945 P | 2713 P |
| 0441 N | 1209 N | 1977 N | 2745 N |
| 0601 P | 1369 P | 2137 P | 2905 P |
| | | | 2937 N |
| | | | 3065 (HOME) |
| | | | 0000 |

TABLE $WFR_1$

| | | | |
|---|---|---|---|
| 0000 N | 0665 N | 1433 N | 2201 N |
| 0057 P | 0825 P | 1593 P | 2361 P |
| 0089 N | 0857 N | 1625 N | 2393 N |
| 0249 P | 1017 P | 1785 P | 2553 P |
| 0281 N | 1049 N | 1817 N | 2585 N |
| 0441 P | 1209 P | 1977 P | 2745 P |
| 0473 N | 1241 N | 2009 N | 2777 N |
| 0633 P | 1401 P | 2169 P | 2937 P |
| | | | 2969 N |
| | | | 3065 (HOME) |
| | | | 0000 |

TABLE WFF

| | | | |
|---|---|---|---|
| 0000 P | 0761* P | 1529* P | 2297* P |
| 0057 N | 0825 N | 1593 N | 2361 N |
| 0121 P | 0889 P | 1657 P | 2425 P |
| 0185* P | 0953* P | 1721* P | 2489* P |
| 0249 N | 1017 N | 1785 N | 2553 N |
| 0313 P | 1081 P | 1849 P | 2617 P |
| 0377* P | 1145* P | 1913* P | 2681* P |
| 0441 N | 1209 N | 1977 N | 2745 N |
| 0505 P | 1273 P | 2041 P | 2809 P |
| 0569* P | 1337* P | 2105* P | 2873* P |
| 0633 N | 1401 N | 2169 N | 2937 N |
| 0697 P | 1465 P | 2233 P | 3001 P |
| | | | 3065* P(HOME) |
| | | | 0000 |

*NEGATIVE-GOING "SPIKE"

TABLE $WFR_4$

| | | | |
|---|---|---|---|
| 0000 N | 0761 N | 1529 N | 2297 N |
| 0153 P | 0921 P | 1689 P | 2457 P |
| 0185 N | 0953 N | 1721 N | 2489 N |
| 0345 P | 1113 P | 1881 P | 2649 P |
| 0377 N | 1145 N | 1913 N | 2681 N |
| 0537 P | 1305 P | 2073 P | 2841 P |
| 0569 N | 1337 N | 2105 N | 2873 N |
| 0729 P | 1497 P | 2265 P | 3033 P |
| | | | 3065 N(HOME) |
| | | | 0000 |

TABLE WFG

| | | | |
|---|---|---|---|
| 0000 P | 0761 P | 1529 P | 2297 P |
| 0057 N | 0825 N | 1593 N | 2361 N |
| 0185 P | 0953 P | 1721 P | 2489 P |
| 0249 N | 1017 N | 1785 N | 2553 N |
| 0377 P | 1145 P | 1913 P | 2681 P |
| 0441 N | 1209 N | 1977 N | 2745 N |
| 0569 P | 1337 P | 2105 P | 2873 P |
| 0633 N | 1401 N | 2169 N | 2937 N |
| | | | 3065 P(HOME) |
| | | | 0000 |

TABLE CC[1]

Card No. A2

| Pin | To |
|---|---|
| 5 | —80 v. |

Card No. A3

| Pin | To |
|---|---|
| 4 | A4–14; A4–4; A6–14; A6–4; A7–14; A7–4; B15–17. |
| 5 | B10–17, B18–9. |
| 6 | A3–9; A4–9; A4–6; A5–11; A5–15; A6–11; A6–15; A7–9; A7–6; A11–6; A13–9; A2–13. |
| 10 | B4–17. |
| 12 | P1–11; A3–17; A4–17; A5–17; A6–17; A7–17; A11–17. |
| 13 | A13–13; P1–10. |
| 14 | A7–5; B5–17; C15–14. |
| 15 | A4–11; A5–13; A6–13; A11–15; G3–9. |
| 16 | P1–3. |

Card No. A4

| Pin | To |
|---|---|
| 5 | B4–5; G3–14. |
| 8 | B10–15. |
| 12 | P1–4. |
| 16 | P1–5. |

See footnote at end of table.

TABLE CC [1]—Continued

Card No. A5

| Pin | To |
|---|---|
| 4 | Home. |
| 5 | C16–12. |
| 6 | A5–9; A11–11; C15–5; B14–7. |
| 7 | A11–9. |
| 8 | C14–13. |
| 12 | P1–7. |
| 14 | Home. |
| 16 | P1–6. |

Card No. A6

| Pin | To |
|---|---|
| 5 | A15–17; B14–10; B10–13; B16–5; G13–12. |
| 6 | A6–9; C12–16; B14–6; B14–6. |
| 7 | B15–14; A12–12; A12–16. |
| 8 | B4–12. |
| 10 | A12–10. |
| 12 | P1–8. |
| 16 | P1–9. |

Card No. A7

| Pin | To |
|---|---|
| 7 | A13–14; A15–14; C12–15. |
| 8 | B5–15; A13–15. |
| 10 | A15–11; A13–4; A16–15. |
| 12 | P1–2. |
| 16 | P1–13. |

Card No. A11

| Pin | To |
|---|---|
| 4 | Home. |
| 5 | C15–9. |
| 7 | C18–12. |
| 10 | C18–14. |
| 12 | P1–24. |
| 13 | P1–23. |
| 14 | B13–7. |

Card No. A12

| Pin | To |
|---|---|
| 6 | C15–12; C17–16; C19–15. |
| 9 | B16–8. |
| 13 | $\overline{\text{B16–11}}$; B13–6; J4–10; B11–11. |
| 15 | B12–7; C13–11; G3–11; J11–16; J12–16; J13–16; J14–16; J15–16. |

Card No. A13

| Pin | To |
|---|---|
| 5 | A–15–12; A14–16. |
| 7 | A14–5; G1–5. |
| 8 | A15–5; F13–16. |
| 10 | C12–14. |
| 11 | C19–7; A17–16; A18–6; B17–15; B18–11; G2–12. |
| 12 | C12–8; D16–17; D17–5; A17–14. |
| 16 | A16–16; A15–10; C15–6; D15–17. |
| 17 | A16–9; A17–4. |

Card No. A14

| Pin | To |
|---|---|
| 6 | A17–9; A18–15; A18–9. |
| 7 | A15–15. |
| 9 | A17–11; A18–11. |
| 12 | C17–12; D16–10; C13–6. |

Card No. A15

| Pin | To |
|---|---|
| 7 | G3–10; C13–12; D15–6. |
| 8 | B12–11. |
| 13 | Home. |

Card No. A16

| Pin | To |
|---|---|
| 6 | A17–6. |
| 8 | A14–10. |
| 13 | C13–7; D15–5. |
| 14 | Home. |

Card No. A17

| Pin | To |
|---|---|
| 5 | A16–12. |

See footnote at end of table.

Card No. A17—Continued

| Pin | To |
|---|---|
| 8 | A16–5. |
| 10 | A18–4. |
| 12 | P2–25. |
| 13 | P2–28. |
| 15 | P2–34. |
| 17 | P2–36. |

Card No. A18

| Pin | To |
|---|---|
| 5 | A16–11. |
| 7 | A18–14. |
| 8 | A16–10. |
| 12 | P2–23. |
| 13 | P2–26. |
| 16 | P2–27. |
| 17 | P2–24. |

Card No. B4

| Pin | To |
|---|---|
| 6 | B5–10; B13–16; C12–12. |
| 8 | C19–10; H5–5; K18–10. |
| 9 | C12–17; G1–17; C17–15. |
| 11 | A12–7; B16–6; A14–14; A17–7; D17–10. |
| 14 | B12–15; G2–9; B4–7; B5–11. |
| 15 | C15–13; C15–4; B15–6; G2–15. |

Card No. B5

| Pin | To |
|---|---|
| 6 | B16–9; A12–8. |
| 7 | B16–10. |
| 8 | C15–11; F14–6. |
| 9 | A12–17. |
| 12 | $\overline{\text{H1–9}}$. See Note A. |
| 13 | $\overline{\text{G2–17}}$; $\overline{\text{J17–6}}$. |
| 14 | C15–16; A13–6; A16–7; G1–6. |

Card No. B10

| Pin | To |
|---|---|
| 6 | B11–15. |
| 7 | B11–10; G1–16. |
| 8 | J3–10; B18–8; C14–10. |
| 10 | C12–7. |

Card No. B11

| Pin | To |
|---|---|
| 7 | J2–10; K5–12. |
| 8 | K5–15. |
| 9 | K5–11; D19–17. |

Card No. B12

| Pin | To |
|---|---|
| 6 | D18–15; D19–14. |

Card No. B13

| Pin | To |
|---|---|
| 9 | C14–14. |

Card No. B14

| Pin | To |
|---|---|
| 9 | C12–5; B11–14; D17–11; C18–16; H3–5. |

Card No. B15

| Pin | To |
|---|---|
| 7 | C14–15. |
| 9 | B13–8; C13–13. |

Card No. B16

| Pin | To |
|---|---|
| 4 | H2–15; H2–5. |
| 7 | D14–5; C14–9. |
| 12 | B17–16. |
| 13 | B17–12. |
| 14 | B18–17. |
| 15 | B17–17. |
| 16 | B17–13. |

Card No. B17

| Pin | To |
|---|---|
| 5 | B13–12; B12–5; B14–11; B15–13. |
| 7 | B17–14; B13–15; B12–14; B14–5; B15–5. |
| 8 | B13–14; B14–13; B15–15. |
| 10 | B18–4; B13–13; B12–13; B14–10; B15–10. |

TABLE CC[1]—Continued

Card No. B18

| Pin | To |
|---|---|
| 5 | B13–17; B14–12; B15–12. |
| 7 | B13–5; B15–16; B12–12. |
| 10 | B10–5. |
| 13 | H3–14. |

Card No. C12

| Pin | To |
|---|---|
| 6 | C13–10. |
| 9 | C16–5. |

Card No. C14

| Pin | To |
|---|---|
| 6 | D14–14. |
| 7 | D18–14; D19–5; C17–4. |

Card No. C15

| Pin | To |
|---|---|
| 7 | B17–4. |
| 15 | G1–4; C13–9. |
| 17 | C12–10; $\overline{\text{J4–13}}$ J17–7. |

Card No. C16

| Pin | To |
|---|---|
| 6 | D16–14. |
| 7 | D15–13. |
| 8 | D19–15. |

Card No. C17

| Pin | To |
|---|---|
| 7 | K5–14. |
| 9 | C17–17; G2–6. |

Card No. C18

| Pin | To |
|---|---|
| 6 | D19–4. |
| 7 | D18–4. |
| 9 | D18–5; D19–9. |

Card No. C19

| Pin | To |
|---|---|
| 6 | J15–5. |
| 9 | J15–17. |
| 11 | P1–1. |

Card No. D13

| Pin | To |
|---|---|
| 7 | D15–11. |

Card No. D14

| Pin | To |
|---|---|
| 7 | K6–15. |
| 8 | H1–10; K6–4. |

Card No. D15

| Pin | To |
|---|---|
| 7 | D18–11. |
| 8 | D18–10. |
| 9 | D18–12; D19–10. |
| 14 | D16–11. |

Card No. D16

| Pin | To |
|---|---|
| 7 | D19–11; D18–13. |
| 8 | D19–12; D18–16. |
| 9 | D19–13. |

Card No. D17

| Pin | To |
|---|---|
| 7 | C17–6; C17–10. |
| 8 | D19–16. |
| 9 | K5–10. |

Card No. D18

| Pin | To |
|---|---|
| 6 | J5–12. |
| 7 | J5–14. |
| 9 | J5–13. |

Card No. D19

| Pin | To |
|---|---|
| 6 | J5–15. |
| 7 | K5–13. |
| 8 | J4–14. |

See footnote at end of table.

Card No. F13

| Pin | To |
|---|---|
| 4 | $\overline{\text{P2–1}}$. See Note A. |
| 6 | F15–13; F18–12; H19–5. |
| 7 | F15–16; H19–6. |
| 8 | $\overline{\text{P2–5}}$. See Note A. |
| 9 | $\overline{\text{P2–5}}$. See Note A. |
| 17 | $\overline{\text{P2–7}}$. See Note A. |

Card No. F14

| Pin | To |
|---|---|
| 9 | F14–7; F14–8; F15–6; F15–7; F15–9; F15–8; P3–9. |

Card No. F15

| Pin | To |
|---|---|
| 8 | P3–9. |

Card No. F16

| Pin | To |
|---|---|
| 9 | F17–10. |

Card No. F17

| Pin | To |
|---|---|
| 5 | $\overline{\text{J15–6}}$. See Note A. |
| 7 | F18–13. |
| 12 | F18–16. |
| 17 | —80 v. |

Card No. F18

| Pin | To |
|---|---|
| 11 | P3–21. |
| 14 | P3–5. |

Card No. F19

| Pin | To |
|---|---|
| 11 | P3–1. |

Card No. G1

| Pin | To |
|---|---|
| 7 | G2–11. |
| 8 | G2–16. |
| 15 | $\overline{\text{K16–6}}$. See Note A. |

Card No. G2

| Pin | To |
|---|---|
| 5 | C17–13. |
| 7 | G3–17. |
| 8 | G2–13. |
| 17 | $\overline{\text{B5–13}}$; $\overline{\text{J17–6}}$. See Note A. |

Card No. G3

| Pin | To |
|---|---|
| 7 | C17–14. |
| 8 | F13–10. |
| 15 | P2–33. |

Card No. G11

| Pin | To |
|---|---|
| 9 | B11–13; D14–15; C18–15. |

Card No. G12

| Pin | To |
|---|---|
| 6 | D14–12; D15–15; D16–16; D17–16; H19–9; C18–13. |
| 7 | D16–15; B12–17. |
| 8 | D17–12; G1–14; H19–7; G2–10. |
| 9 | D15–12. |
| 12 | H12–15. |
| 17 | H14–4; H14–15. |

Card No. G13

| Pin | To |
|---|---|
| 6 | J4–11; C17–5. |
| 7 | D14–13; F13–13. |
| 8 | G14–6. |
| 9 | H2–13. |

Card No. G14

| Pin | To |
|---|---|
| 4 | D14–16; D17–14; 13–3. |
| 6 | B11–12; D15–14; D16–1; D17–6; G2–4. |
| 7 | J6–8; J7–8. |
| 8 | K5–17; J5–17; H16–4; H5–12; H16–15. |
| 9 | H2–12; G13–10. |

TABLE CC [1]—Continued

Card No. G15

| Pin | To |
|---|---|
| 4 | $\overline{\text{P2–21}}$. See Note A. |
| 6 | $\overline{\text{P2–22}}$. See Note A. |
| 7 | $\overline{\text{P2–17}}$. See note A. |
| 8 | $\overline{\text{P2–20}}$. See Note A. |
| 9 | $\overline{\text{P2–19}}$. See Note A. |

Card No. G16

| Pin | To |
|---|---|
| 7 | H2–9; D15–16. |
| 8 | F17–9. |

Card No. G17

| Pin | To |
|---|---|
| 7 | $\overline{\text{2–11}}$. See Note A. |
| 8 | $\overline{\text{P2–3}}$. See Note A. |
| 9 | $\overline{\text{P2–13}}$. See Note A. |

Card No. H1

| Pin | To |
|---|---|
| 9 | H2–16. |
| 11 | D14–10; J2–13; C19–14; G1–9. |

Card No. H2

| Pin | To |
|---|---|
| 7 | H3–15. |
| 8 | F15–12; F17–8. |

Card No. H3

| Pin | To |
|---|---|
| 6 | H1–4; H3–10. |
| 7 | H1–15. |
| 8 | D17–17. |
| 9 | C17–11; C14–5. |

Card No. H4

| Pin | To |
|---|---|
| 5 | H5–17. |

Card No. H5

| Pin | To |
|---|---|
| 9 | A5–4; A5–14; A15–13; A16–14; B12–10; B13–10; C14–16; B15–8; H2–4; H2–17; H1–12; H7–14; H8–14; C15–10. |
| 15 | H6–10; H6–12. |

Card No. H6

| Pin | To |
|---|---|
| 11 | H7–10; $\overline{\text{K16–10}}$; H7–12. |

Card No. H7

| Pin | To |
|---|---|
| 9 | F15–10; F16–5. |
| 11 | H7–10; $\overline{\text{K16–10}}$; H7–12. |

Card No. H8

| Pin | To |
|---|---|
| 9 | F15–11; F16–12; J16–14. |
| 11 | F14–17; J1–11; J16–10; H9–10; H9–12. |

Card No. H9

| Pin | To |
|---|---|
| 9 | F15–5; F16–13; J16–15. |
| 11 | F14–5; J1–5; J16–11; H10–10; H10–12. |

Card No. H10

| Pin | To |
|---|---|
| 9 | F14–10; H19–14; J7–13; J16–16. |
| 11 | F13–11; F15–15; F16–11; F18–9; H19–15; J1–12; J16–5; H11–10; H11–12. |

Card No. H11

| Pin | To |
|---|---|
| 9 | G12–10; G16–13; H19–12; C18–11. |
| 11 | D16–12; F14–11; F18–6; G12–14; G16–11; H19–13; G11–12; H12–10; H12–12. |

Card No. H12

| Pin | To |
|---|---|
| 9 | D16–13; F18–10; G16–17; G12–11; H19–8; J3–12. |
| 11 | F14–12; F15–14; F16–10; F18–15; G12–15; G16–15; H19–11; H13–10; H13–12. |

[1] See footnote at end of table.

Card No. H13

| Pin | To |
|---|---|
| 9 | B12–16; C14–12; C16–17; C18–17; D16–5; F14–13; G12–16; H18–14. |
| 11 | C18–10; D13–10; F13–5; F18–5; G16–5; H19–10; G11–13; G12–5. |

Card No. H14

| Pin | To |
|---|---|
| 5 | G15–11; G14–15; G1–10. |
| 7 | G17–11; G13–13; G14–10; H14–11; H14–14. |
| 8 | G13–14; G14–14; G17–14; G1–11. |
| 10 | G14–11; G15–14; H15–4; H15–15. |

Card No. H15

| Pin | To |
|---|---|
| 5 | G14–16; G15–15. |
| 7 | G13–5; G14–5; G15–5; G1–12; H15–11; H15–14. |
| 8 | G14–13; G15–12. |
| 10 | G1–13; G2–14; G13–16; G14–12; G17–15. |

Card No. H16

| Pin | To |
|---|---|
| 5 | F13–14; F18–7; G16–10. |
| 7 | G16–12; H16–11; H17–15; H16–14. |
| 8 | F13–15; F18–8; G16–14. |
| 10 | G16–16; H17–4. |

Card No. H18

| Pin | To |
|---|---|
| 16 | P3–25. |
| 17 | F18–17. |

Card No. H19

| Pin | To |
|---|---|
| 4 | F15–17. |

Card No. J1

| Pin | To |
|---|---|
| 6 | J2–12; J5–5; K5–5. |

Card No. J2

| Pin | To |
|---|---|
| 6 | J3–15. |
| 9 | H1–7. |

Card No. J3

| Pin | To |
|---|---|
| 5 | J4–15; K3–7. |
| 7 | B18–14. |
| 8 | H1–14; H1–6; H5–10; K10–10; K9–10; K8–10; K7–10; K6–10. |
| 11 | B14–8; C14–11. |

Card No. J4

| Pin | To |
|---|---|
| 6 | H1–16. |
| 8 | J15–10; J14–10; J13–10; J12–10; $\overline{\text{J11–10}}$. |
| 10 | $\overline{\text{B16–11}}$. See Note A. |
| 13 | $\overline{\text{C15–17}}$. See Note A. |

Card No. J5

| Pin | To |
|---|---|
| 6 | K11–7; K12–7; K13–7; K14–7; K15–7. |
| 7 | K11–6; K12–6; K13–6; K14–6; K15–6. |
| 8 | J6–6; J7–6; J8–6; J9–6; J10–6. |
| 9 | J15–6; J14–6; J13–6; J12–6; $\overline{\text{J11–6}}$; F17–5. |

Card No. J6

| Pin | To |
|---|---|
| 8 | J7–8. |
| 9 | K11–15. |
| 10 | J7–10. |
| 11 | K11–4. |

Card No. J7

| Pin | To |
|---|---|
| 9 | K12–15. |
| 11 | K12–4. |

Card No. J8

| Pin | To |
|---|---|
| 9 | K13–15. |
| 11 | K13–4. |

Card No. J9

| Pin | To |
|---|---|
| 9 | K14–15. |
| 11 | K14–4. |

TABLE CC [1]—Continued

Card No. J10

| Pin | To |
|---|---|
| 9 | K15–15. |
| 11 | K15–4. |

Card No. J11

| Pin | To |
|---|---|
| 6 | $\overline{\text{J5–9}}$. See Note A. |
| 9 | J17–11; H18–12; J15–8; J6–17; K6–17. |
| 10 | $\overline{\text{J4–8}}$. See Note A. |
| 11 | H18–13; F13–12; J15–13; J6–5; K6–5. |
| 17 | P1–18. |

Card No. J12

| Pin | To |
|---|---|
| 9 | J11–13; H18–10; J7–17; K7–15. |
| 11 | J11–8; H18–11; J7–5; K7–4. |
| 17 | P1–17. |

Card No. J13

| Pin | To |
|---|---|
| 9 | J12–13; H18–8; J8–17; K8–15. |
| 11 | J12–8; H18–9; F14–15; J8–5; K8–4. |
| 17 | P1–16. |

Card No. J14

| Pin | To |
|---|---|
| 9 | J13–13; H18–6; F14–14; J9–17; K9–15. |
| 11 | J13–8; H18–7; J9–5; K9–4. |
| 17 | P1–15. |

Card No. J15

| Pin | To |
|---|---|
| 6 | F17–5. |
| 9 | J14–13; J17–10; H18–4; J10–17; K10–15. |
| 11 | J14–8; H18–5; J10–5; K10–4. |
| 14 | P1–14. |

Card No. J16

| Pin | To |
|---|---|
| 5 | $\overline{\text{J1–2}}$. See Note A. |
| 7 | K16–5. |
| 9 | K16–11. |
| 10 | $\overline{\text{J1–11}}$. See Note A. |
| 11 | $\overline{\text{J1–5}}$. See Note A. |
| 16 | $\overline{\text{J7–13}}$. See Note A. |

Card No. J17

| Pin | To |
|---|---|
| 7 | $\overline{\text{J4–13}}$. See Note A. |

Card No. K2

| Pin | To |
|---|---|
| 2 | $\overline{\text{Delay Line–Pin 3}}$; $\overline{\text{Delay Line–Pin 5}}$. |
| 6 | $\overline{\text{Delay Line–Pin 4}}$. |
| 14 | K3–12. |

Card No. K5

| Pin | To |
|---|---|
| 6 | J6–7; J7–7; J8–7; J9–7; J10–7. |
| 7 | K6–6; K7–7; K8–7; K9–7; K10–7. |
| 8 | K6–7; K7–6; K8–6; K9–6; K10–6. |
| 9 | J14–7; J15–7; J13–7; J12–7; J11–7. |

Card No. K6

| Pin | To |
|---|---|
| 9 | K7–13; J6–15; J11–15; H1–17; K11–17. |
| 11 | K7–8; J6–4; J11–4; K11–5. |

Card No. K7

| Pin | To |
|---|---|
| 9 | K8–13; J7–15; J12–15; K12–17. |
| 11 | K8–8; J7–4; J12–4; K12–5. |

Card No. K8

| Pin | To |
|---|---|
| 9 | K9–13; J8–15; J13–15; K13–17. |
| 11 | K9–8; J8–4; J13–4; K13–5. |

Card No. K9

| Pin | To |
|---|---|
| 9 | K10–13; J9–15; J14–15; H3–12; K14–17. |
| 11 | K10–8; J9–4; J14–4; K14–5. |

Card No. K10

| Pin | To |
|---|---|
| 9 | J10–15; J15–15; K6–8; H1–13; K15–17. |
| 11 | J10–4; J15–4; K6–13; H3–13; K15–5. |

Card No. K11

| Pin | To |
|---|---|
| 9 | K16–12; K15–8. |
| 11 | K15–13. |

Card No. K12

| Pin | To |
|---|---|
| 9 | K11–13. |
| 11 | K11–8. |

Card No. K13

| Pin | To |
|---|---|
| 9 | K12–13. |
| 11 | K12–8. |

Card No. K14

| Pin | To |
|---|---|
| 9 | K13–13. |
| 11 | K13–8. |

Card No. K15

| Pin | To |
|---|---|
| 9 | K14–13; K16–13. |
| 11 | K14–8. |

Card No. K16

| Pin | To |
|---|---|
| 6 | $\overline{\text{G1–15}}$. |
| 7 | K16–14; K18–11. |
| 8 | K11–10; K12–10; K13–10; K14–10; K15–10. |
| 10 | $\overline{\text{H6–11}}$. SEE NOTE A. |

Card No. K18

| Pin | To |
|---|---|
| 13 | $\overline{\text{Delay Line–Pin 1}}$. |
| 17 | $\overline{\text{Delay Line–Pin 2}}$. |

TABLE FF

| FF-NO. | FF-NAME (OR ABBR.) | FF-NAME IN FULL | FIG. NO. |
|---|---|---|---|
| 1. | ADD | ADD | 87 |
| 2. | C & B | CARRY & BORROW | 33 |
| 3. | CHG. SGN. | CHANGE SIGN | 35 |
| 4. | CLR. ALL | CLEAR ALL | 37 |
| 5. | CLR. ENT. | CLEAR ENTRY | 39 |
| 6. | CLK | CLOCK | 41 |
| 7. | COM. DIG. | COMMON DIGIT | 43 |
| 8. | C. F. | COMMON FUNCTION | 45 |
| 9. | C. F. STG. | COMMON FUNCTION STORAGE | 47 |
| 10. | COMP. | COMPLEMENT | 49 |
| 11. | DPC 1 | DECIMAL POINT COUNTER 1 | 51 |
| 12. | DPC 2 | DECIMAL POINT COUNTER 2 | 53 |
| 13. | DPC 4 | DECIMAL POINT COUNTER 4 | 55 |
| 14. | DPC 8 | DECIMAL POINT COUNTER 8 | 57 |
| 15. | D. P. ST. | DECIMAL POINT STORAGE | 59 |
| 16. | DISP. C. | DISPLAY CONTROL | 61 |
| 17. | DIV | DIVIDE | 63 |
| 18. | EPC 1 | ENTRY PHASE COUNTER 1 | 65 |
| 19. | EPC 2 | ENTRY PHASE COUNTER 2 | 67 |
| 20. | EPC 4 | ENTRY PHASE COUNTER 4 | 69 |
| 21. | MSD STG. | MOST SIGNIFICANT DIGIT STORAGE | 71 |
| 22. | MULT | MULTIPLY | 73 |
| 23. | O. C. | OSCILLATOR CONTROL | 75 |
| 24. | O'FLOW | OVERFLOW | 77 |
| 25. | RECALL | RECALL | 79 |
| 26. | REPT. | REPEAT | 81 |

[1] Overscore terminal denotes shielded connection.

NOTE A.—End of shield adjacent this pin designated in left-hand ("Pin") column grounded at nearest No. 2 contact.

TABLE FF (CONT.)

| FF-NO. | FF-NAME (OR ABBR.) | FF-NAME IN FULL | FIG. NO. |
|---|---|---|---|
| 27. | SGN. C. | SIGN CONTROL | 83 |
| 28. | STORE | STORE | 85 |
| 29. | SUB. | SUBTRACT | 87 |
| 30. | A1 | | 89. |
| 31. | A2 | | 91 |
| 32. | A3 | | 93 |
| 33. | A4 | | 95 |
| 34. | A5 | | 97 |
| 35. | B1 | | 99 |
| 36. | B2 | | 101 |
| 37. | B3 | | 103 |
| 38. | B4 | | 105 |
| 39. | B5 | | 107 |
| 40. | C1 | | 109 |
| 41. | C2 | | 111 |
| 42. | C3 | | 113 |
| 43. | C4 | | 115 |
| 44. | C5 | | 117 |
| 45. | D1 | | 119 |
| 46. | D2 | | 121 |
| 47. | D3 | | 123 |
| 48. | D4 | | 125 |
| 49. | D5 | | 127 |
| 50. | A | | 129 |
| 51. | B | | 131 |
| 52. | C | | 133 |

TABLE FF (CONT.)

| FF-NO. | FF-NAME (OR ABBR.) | FF-NAME IN FULL | FIG. NO. |
|---|---|---|---|
| 53. | D | | 135 |
| 54. | E | | 137 |
| 55. | F | | 139 |
| 56. | G | | 141 |
| 57. | H | | 143 |
| 58. | J | | 145 |
| 59. | K | | 147 |
| 60. | L | | 149 |
| 61. | M | | 151 |
| 62. | N | | 153 |

TABLE SS (Location of Signal Sources on Logic Diagram--Figs. 296 to 313)

| Signal Source | Origin | Signal Generating Subcircuit |
|---|---|---|
| A→B SG. S. | 5:2b | GATE 86 |
| A→C SG. S. | 5:2a | GATE 80 |
| A→D SG. S. | 5:2a | GATE 81 |
| ADD SG. S. | 3:1c | GATE 26 |
| AFF' OUT. | 8:1c | TIMING UNIT |
| ADD FF' OUT. | 1:1a | ENTRY UNIT |
| ADV. A SG. S. | 5:2e | INVERTER 26 |
| A1 FF' OUT. | 5:1d | A1 FF |
| A2 FF' OUT. | 5:1d | A2 FF |
| A3 FF' OUT. | 5:1d | A3 FF |
| A4 FF' OUT. | 5:1c | A4 FF |
| A5 FF' OUT. | 5:1c | A5 FF |
| A CNTR. Z SG. S. | 5:1e | GATE 94 |
| ADD 1 TO 2 REG. SG. S. | 4:2c | |
| B→C SG. S. | 5:2b | GATE 85 |
| $B_0+B_1$ SG. S. | 8:1c | TIMING UNIT |
| $B_{14}+B_{15}$ SG. S. | 8:1c | TIMING UNIT |
| $B_{15}$ SG. S. | 8:1c | TIMING UNIT |
| B FF' OUT. | 8:1c | TIMING UNIT |
| B1 FF' OUT. | 6:1d | B1 FF |
| B2 FF' OUT. | 6:1d | B2 FF |
| B3 FF' OUT. | 6:1d | B3 FF |
| B4 FF' OUT. | 6:1c | B4 FF |
| B5 FF' OUT. | 6:1c | B5 FF |
| COMP'. SG. S. | 6:1e | GATE 96 |
| COMPARE SG. S. | 8:2c | COMPARE SIGNAL GENERATOR |
| $C_0$ SG. S. | 8:1c | TIMING UNIT |
| $C_1$ SG. S. | 8:1b | TIMING UNIT |
| $C_2$ SG. S. | 8:1b | TIMING UNIT |
| $C_{15}$ SG. S. | 8:1b | TIMING UNIT |
| $C_0+C_1+C_{15}$ SG. S. | 8:1b | TIMING UNIT |
| C FF' OUT. | 8:1c | TIMING UNIT |
| C1 FF' OUT. | 7:1d | C1 FF |
| C2 FF' OUT. | 7:1d | C2 FF |
| C3 FF' OUT. | 7:1d | C3 FF |
| C4 FF' OUT. | 7:1c | C4 FF |
| C5 FF' OUT. | 7:1c | C5 FF |
| C & B FF' OUT. | 5:1e | C & B FF |
| C. F. FF' OUT. | 1:1a | ENTRY UNIT |
| CLK FF. OUT. | 8:1c | TIMING UNIT |
| COMP FF' OUT. | 6:1c | COMP FF |
| CRT BLANK SG. S. | 7:2e | GATES 108, 109, 110, 111 and 112 |
| C CTR. Z SG. S. | 7:1e | GATE 101 |
| C. F. STG. FF' OUT. | 2:1d | C. F. STG. FF |
| CHG. SGN. FF' OUT. | 1:1a | ENTRY UNIT |
| CLR. ALL FF' OUT. | 1:1a | ENTRY UNIT |
| CLR. ENT FF' OUT. | 1:1a | ENTRY UNIT |
| COM. DIG. FF' OUT. | 1:1a | ENTRY UNIT |
| D→A SG. S. | 5:2b | GATE 84 |
| D→B SG. S. | 5:2b | GATE 82 |
| D FF' OUT. | 8:1c | TIMING UNIT |
| D1 FF' OUT. | 6:2d | D1 FF |
| D2 FF' OUT. | 6:2d | D2 FF |
| D3 FF' OUT. | 6:2c | D3 FF |
| D4 FF' OUT. | 6:2c | D4 FF |
| D5 FF. OUT. | 6:2c | D5 FF |

TABLE SS (Cont.)

| Signal Source | Origin | Signal Generating Subcircuit |
|---|---|---|
| DIV FF' OUT. | 1:1a | ENTRY UNIT |
| D CTR. Z SG. S. | 6:2f | GATE 98 |
| D. P. STG. FF' OUT. | 2:1d | D. P. STG. FF |
| DIGIT 1 OFFSET SG. S. | 7:2b | DISPLAY MATRIX |
| DIGIT 7 OFFSET SG. S. | 7:2b | DISPLAY MATRIX |
| DISP. C. FF' OUT. | 8:2c | DISP. C. FF |
| DPC 1 FF' OUT. | 3:2f | DPC 1 FF |
| DPC 2 FF' OUT. | 3:2f | DPC 2 FF |
| DPC 4 FF' OUT. | 3:2D | DPC 4 FF |
| DPC 8 FF' OUT. | 3:2d | DPC 8 FF |
| DPCZ SG. S. | 3:2e | GATE 40 |
| ΔLO SG. S. | 6:2e | MEMORY UNIT |
| EPCA SG. S. | 3:2e | GATE 39 |
| EPCB SG. S. | 3:1f | GATE 38 |
| EPCC SG. S. | 3:1f | GATE 37 |
| EPCD SG. S. | 3:1f | GATE 36 |
| EPCE SG. S. | 3:1f | GATE 35 |
| EPCF SG. S. | 3:1f | GATE 34 |
| EPCG SG. S. | 3:1e | GATE 33 |
| EPCH SG. S. | 3:1e | GATE 32 |
| EPCI SG. S. | 3:1e | GATE 31 |
| EPCZ SG. S. | 3:2c | GATE 29 |
| E FF' OUT. | 8:1c | TIMING UNIT |
| EPC 1 FF' OUT. | 3:1c | EPC 1 FF |
| EPC 2 FF' OUT. | 3:1c | EPC 2 FF |
| EPC 4 FF' OUT. | 3:1c | EPC 4 FF |
| F FF' OUT. | 8:1c | TIMING UNIT |
| G FF' OUT. | 8:1c | TIMING UNIT |
| H FF' OUT. | 8:1c | TIMING UNIT |
| HOME SG. S | 8:1c | TIMING UNIT |
| J FF' OUT. | 8:1c | TIMING UNIT |
| K FF' OUT. | 8:1c | TIMING UNIT |
| L FF' OUT. | 8:1c | TIMING UNIT |
| M FF' OUT. | 8:2a | TIMING UNIT |
| MSD STG. FF' OUT. | 4:1c | MSD STG. FF |
| MULT FF' OUT. | 1:1a | ENTRY UNIT |
| N FF' OUT. | 8:2c | TIMING UNIT |
| O'FLOW FF' | 4:1c | O'FLOW FF |
| $R_0$ SG. S. | 8:1c | TIMING UNIT |
| $R_1$ SG. S. | 8:1c | TIMING UNIT |
| $R_4$ SG. S. | 8:1c | TIMING UNIT |
| REC. C SG. S. | 7:1e | GATE 103 |
| REC. D SG. S. | 5:2e | GATE 88 |
| RECALL FF' OUT. | 1:1a | ENTRY UNIT |
| REPT. FF' OUT. | 1:1a | ENTRY UNIT |
| RESET A SG. S. | 5:2a | GATE 78 |
| RESET D SG. S. | 5:2b | GATE 83 |
| SEG. SG. S. | 7:2d | SEGMENT GENERATOR |
| SUB SG. S. | 3:1c | GATE 26 |
| STORE FF' OUT. | 1:1a | ENTRY UNIT |
| SUB FF' OUT. | 1:1a | ENTRY UNIT |
| SET BOR. FF SG. S. | 5:2e | GATE 89 |
| SGN. C. FF' OUT. | 2:1e | SGN. C. FF |

TABLE ST

Digit Entry

Entry phase counter:
0
1
2 Shift up (if necessary)
3
4
5
6 Shift 1 left
7
0

Add

Entry phase counter:
0 Align decimal point
1 Shift down (check sign)
2
3
4 Add
5
6
7
0

Subtract

0 Align decimal point
1 Shift down (check sign)
2 Sub.
3
4
5
6
7
0

Clear entry

Entry phase counter:
0 Align decimal point
1
2
3
4
5
6
7 Shift down
0

Divide

Entry phase counter:
0 Align decimal point
1 Trans. Reg. 1–Reg. M/D
2 Sub.
3 Add 1 to Reg. 2
4 Add
5 Shift Reg. 2 left
6 Shift Reg. 1 left
7 Shift down
0

Store

Entry phase counter:
0 Align decimal point
1
2 Shift down
3 Shift down Reg. M/D
4
5
6
7
0

TABLE ST—Continued

Repeat

Entry phase counter:
- 0 Align decimal point
- 1
- 2 Shift up
- 3
- 4
- 5
- 6
- 7
- 0

Multiply

Entry phase counter:
- 0 Align decimal point
- 1 Trans. Reg. 1–Reg. M/D
- 2 Shift Reg. 1 left
- 3 Shift Reg. 2 left
- 4 Add
- 5 Add 1 to Reg 2
- 6
- 7 Shift down
- 0

Recall

Entry phase counter:
- 0 Align decimal point
- 1
- 2 Shift up
- 3 Trans Reg. S–Reg. M/D
- 4
- 5
- 6
- 7
- 0

Change sign

Entry phase counter:
- 0 Align decimal point
- 1
- 2 Add 1 to Reg. 1
- 3
- 4
- 5
- 6
- 7
- 0

What is claimed is:

1. Computing apparatus comprising processing means for processing data words to produce resultant data words, last-in-first-out storage means for the storage of a plurality of data words and resultant data words, transfer means coupled between said processing means and said storage means for entering resultant data words from said processing means into said storage means, and entry means coupled to said storage means and said processing means for entering data words into said storage means and instructions, designating computing steps to be performed by said processing means, directly into said processing means, the entry of an instruction occurring after the entry or the storage of all the data and resultant data words to which the instruction is applicable, the entry of said instruction causing the processing means to operate upon one or more stored data and resultant data words so as to perform the computing step designated by the directly entered instruction.

2. Computing apparatus comprising processing means for processing data words to produce resultant data words, last-in-first-out storage means for the storage of a plurality of data words and resultant data words, transfer means coupled between said processing means and said storage means for entering resultant data words from said processing means into said storage means, and entry means coupled to said storage means and said processing means operative by an operator for entering data words into said storage means and instructions designating computing steps to be performed by said processing means, directly into said processing means, the entry of an instruction occurring after the entry or the storage of all the data and resultant data words to which the instruction is applicable, the entry of said instruction causing the processing means to operate upon one or more stored data and resultant words so as to perform the computing step designated by the directly entered instruction.

3. Computing apparatus comprising processing means for processing data words to produce resultant data words, last-in-first-out storage means for the storage of a plurality of data words and resultant data words, transfer entry means coupled to said storage means and said processing means operative by an operator for entering data words into said storage means and instructions designating computing steps to be performed by said processing means directly into the processing means, said entry of an instruction occurring after the entry or the storage of all the data and resultant data words to which the instruction is applicable, the entry of said instruction causing the processing means to operate upon one or more stored data words so as to perform the computing step designated by the directly entered instruction, and output means for making the resultant data known to the operator.

4. Computing apparatus comprising computing means for performing computations on numbers to produce resultant numbers, last-in-first-out storage means for the storage of a plurality of numbers and resultant numbers, transfer means coupled between said computing means and said storage means for entering resultant numbers from said computing means into said storage means, manually operated entry means coupled to said storage means and said computing means for entering numbers into said storage means and instructions, designating the computing steps to be performed by said computing means, directly into said computing means, the entry of an instruction occurring after the entry or the storage of all the numbers and resultant numbers to which the instruction is applicable, the entry of said instruction causing said computing means to operate upon one or more stored numbers and resultant numbers so as to perform the computing step designated by the directly entered instruction, and output means for making the result of a computation known to the operator.

5. Computing apparatus comprising last-in-first-out storage means having a plurality of adjacent storage registers including a keyboard storage register for the storage of a plurality of numbers, computing means coupled to said storage means for performing computations on one or more numbers stored in said storage means so as to produce a resultant number, transfer means coupled between said computing means and said storage means for entering said resultant number into said keyboard storage register of said storage means manually operated keyboard means, coupled to said keyboard storage register of said storage means and said computing means for entering a number into said keyboard register of said storage means and instructions, designating the computing steps to be performed by said computing means directly into said computing means, the entry of and instruction occurring after the entry or the storage of all the numbers and resultant numbers to which the instruction is applicable, the entry of said instruction causing said computing means to operate upon one or more stored numbers and resultant numbers depending upon the particular instruction designated, to perform the computation step designated by said directly entered instruction and to store the resultant number in the keyboard register of said storage means, and output means for making the contents of the keyboard register of said storage means known to the operator.

6. Apparatus according to claim 5 wherein one of said stored numbers required by said computing means is obtained from said keyboard register of said storage means and said additional stored numbers, when more than one is required, are obtained from the storage register or registers of said storage means next adjacent to the keyboard register of said storage means.

7. Computing apparatus comprising last-in-first-out storage menas having a plurality of adjacent storage registers including a keyboard storage register, for the storage of a plurality of multi-digit numbers, computing means coupled to said storage means for performing computations on one or two numbers stored in said storage means so as to produce a resultant number, transfer means coupled between said computing means and said storage means for entering said resultant number into said keyboard storage register of said storage means, manually operated keyboard means having digit keys for entering numbers into said keyboard storage register of said storage means and function keys for directly entering instructions, designating the computing steps to be performed by said computing means, into said computing means, shift means coupled to said storage means, said computing means, and said keyboard means, the operation of a digit key of said keyboard means, representing the first digit of a number, causing the operation of said shift means to shift the contents of each storage register of said storage means to their next adjacent storage register in a direction away from said keyboard register, leaving said keyboard register in a condition to receive and store said first digit, the operation of further digit keys of said keyboard means, representing succeeding digits of the same multi-digit number, causing said succeeding digits to be combined with said first digit in said keyboard register so as to enter a complete number into said keyboard register, the depression of a function key of said keyboard means, directly causing said computing means to operate upon one or two stored numbers which are obtained from said keyboard register and the next adjacent storage register of said storage means when more than one such number is required, to produce a resultant number, said computing means then causing the operation of said shift means to cause the storage of said resultant number in said keyboard storage register and the shifting of the contents of the storage registers of said storage means, other than said keyboard register, in a direction towards said keyboard register whereby numbers employed in computing said resultant number are removed from said storage means, and output means for making the contents of the keyboard register known to the operator.

8. Computing apparatus comprising last-in-first-out storage means having a plurality of adjacent storage registers including a keyboard storage register, for the storage of a plurality of multi-digit numbers, computing means coupled to said storage means for performing computations on one or more numbers stored in said storage means so as to produce a resultant number, transfer means coupled between said computing means and said storage means for entering said resultant number into said keyboard storage register of said storage means, manually operated keyboard means having digit keys for entering numbers into said keyboard storage register of said storage means and function keys for entering instructions, designating the computing steps to be performed by said computing means, into said computing means, shift means coupled to said storage means, said computing means and said keyboard means; said shift means operative upon the operation of a digit key representing the first digit of a number to shift the contents of each storage register of said storage means to their next adjacent storage register in a direction away from said keyboard register, leaving said keyboard register in a condition to receive and store said first digit, the operation of further digit keys of said keyboard means, representing succeeding digits of the same multi-digit number, failing to operate said shift means and causing said succeeding digits to be combined with said first digit in the said keyboard register so as to enter a complete number into said keyboard register, the depression of a function key of said keyboard means directly causing said computing means to operate upon one or more stored numbers which are obtained from said keyboard register and the next adjacent register or registers when more than one such number is required to produce a resultant number, said computing means operating said shift means to store said resultant number in said keyboard register and cause the contents of each register other than said keyboard register to transfer to the next adjacent register in a direction towards said keyboard register wherein said transfer is repeated a plurality of times equal to the quantity of numbers in excess of one required by the instruction, and output means for making the contents of said keyboard register known to the operator.

9. Computing apparatus comprising last-in-first-out storage means having a plurality of adjacent storage registers including a keyboard storage register, for the storage of a plurality of multi-digit numbers, computing means coupled to said storage means for performing computations on one or more numbers so as to produce a resultant number, transfer means coupled between said computing means and said storage means for entering said resultant number into said keyboard storage register of said storage means, manually operated keyboard means having digit keys for entering numbers into said keyboard storage register of said storage means and function keys for directly entering instructions, designating the computing steps to be performed by said computing means, into said computing means, shift means, including a bistable element, coupled to said storage means, said computing means and said keyboard means, said shift means being operative, when said bistable element is in a first stable condition, upon the operation of a digit key representing the first digit of a number to shift the contents of each storage register of said storage means to their next adjacent storage register in a direction away from said keyboard register, leaving said keyboard register in a condition to receive and store said first digit, the storage of said first digit in said keyboard register causing said bistable element to be set to a second stable condition permitting any additional digits of said multi-digit number to be combined with said first digit in said keyboard register to provide the complete number in said keyboard register while preventing the further shifting of the contents of the storage registers of said storage means, the depression of a function key of said keyboard means directly causing said computing means to operate upon one or more stored numbers which are obtained from said keyboard register and the next adjacent register or registers when more than one such number is required to produce a resultant number, said computing means operating said shift means to store said resultant number in said keyboard register and cause the contents of each register, other than said keyboard register, to transfer to the next adjacent register in a direction towards said keyboard register wherein said transfer is repeated a plurality of times equal to the quantity of numbers in excess of one required by the instruction, and even further causes the bistable element to change to said first condition, and output means for making the contents of said keyboard register known to the operator.

10. A computing system for computing according to mathematical expressions employing basic computing procedures comprising a computing device for computing upon operands according to predetermined instructions to produce intermediate or final results; last-in-first-out storage means having a number of sections, each section adapted to store an operand or an intermediate result, said sections being arranged in a straight line so that the contents of each section can be transmitted only to the next adjacent section at each side; said storage means coupled to said computing device; keyboard means coupled to said storage means and said computing device, said keyboard means having digit keys for entering operands into said storage means and function keys for entering instructions directly into said computing device; shifting means coupled to said keyboard means, said storage means and said computing device; the depression of a digit key causing the operation of said shifting means to cause the shifting of stored operands or intermediate results in a direction away from a first section of said storage means and then causing the entry of an operand into said first section; the depression of one of said function keys causing the shifting of said storage means to present one or more stored operands or intermediate results to said computing device and causing the computing device to perform the mathematical operation called for by the function key on the operand stored in said first section of said storage means as well as on the other operands in the next adjacent sections of said storage means when more than one operand is required, the depressing of a function key further causing the storing of the result of such a mathematical operation in said first section of said storage means whereby one of the operands is replaced and can then be utilized as an intermediate result for further computations, and it further causes the remaining contents of said storage means which were not utilized for the mathematical operation, to be shifted through one or more sections in the direction of the first section of said storage means whereby the number of the sections through which said contents are shifted is equal to the number of operands required beyond one operand to thereby cause the remaining operands of said mathematical operation to be replaced by previously entered operands or intermediate results.

References Cited

UNITED STATES PATENTS

| | | | |
|---|---|---|---|
| 3,289,171 | 11/1966 | Scherr et al. | 340—172.5 |
| 3,191,149 | 6/1965 | Andrews | 340—172.5 |
| 3,156,815 | 11/1964 | Smeltzer | 340—172.5 |
| 3,064,241 | 11/1962 | Schneider | 340—172.5 |
| 2,913,176 | 11/1959 | Berezin | 340—172.5 |
| 2,901,166 | 8/1959 | Hamilton et al. | 340—172.5 |

GARETH D. SHAW, Examiner

PO-1050
(5/69)

UNITED STATES PATENT OFFICE
CERTIFICATE OF CORRECTION

Patent No. 3,546,676 Dated December 8, 1970

Inventor(s) Robert A. Ragen

It is certified that error appears in the above-identified patent and that said Letters Patent are hereby corrected as shown below:

Column 1: in the Table of Contents: in 11.1.3. change "B. Input" to -- B' Input --.

Column 4: line 7, change digt" to -- digit --;
line 8, change "numercal" to -- numerical --;
line 11, change "ntation" to -- notation --;
line 38, change "pulse,count," to -- pulse-count, --.

Column 6: line 9, change "circuits" to -- circuit --;
line 69, change "explaination" to -- explanation --.

Column 7: line 51, change "(TU)" to -- (T/U) --;
line 66, change "T/:U" to -- T/U: --.

Column 10: line 22, after "pulses", first occurrence, insert a period (.).

Column 11: line 5, after "From" insert -- the --;
line 24, after "viz" insert a period (.).

Column 13: line 55, after "signal" insert -- symbol associated with the assertion legend indicates the signal --.

PO-1050
(5/69)

UNITED STATES PATENT OFFICE
CERTIFICATE OF CORRECTION

Patent No. 3,546,676 Dated December 8, 1970

Inventor(s) Robert A. Ragen

It is certified that error appears in the above-identified patent and that said Letters Patent are hereby corrected as shown below:

Column 18: line 30, change "FF'" to -- FF. --.

Column 21: line 52, after "gates" insert -- herein --.

Column 23: line 74, after "flip-flop" insert -- signified by that block symbol. Reference to the flip-flop --.

Column 25: line 21, change "flip-flip" to -- flip-flop --.

Column 27: line 20, after "to" insert -- the --.

Column 28: line 54, after "Left Set" change the colon (:) to a semi-colon (;); and after "X'" change the comma (,) to a semi-colon (;).

Column 33: line 3, change "along" to -- alone --.

Column 37: line 66, change "occurrenceof" to -- occurrence of --.

Column 38: line 49, change the colon (:) after "Amplifier" to a period (.).

Column 39: line 33, after "1963," add -- entitled "Current Pulse Generator" assigned to the same assignee, --;

PO-1050
(5/69)

UNITED STATES PATENT OFFICE
CERTIFICATE OF CORRECTION

Patent No. 3,546,676 Dated December 8, 1970

Inventor(s) Robert A. Ragen

It is certified that error appears in the above-identified patent and that said Letters Patent are hereby corrected as shown below:

Column 39: line 34, after "1966." add -- As indicated, the Write Amplifier of Fig. 202 is located upon printed circuit card K18 HAG. --.

Column 41: line 23, after "be" insert -- so --.

Column 42: line 24, change "percision" to -- precision --;
line 50, change "dirft" to -- drift --;
line 59, change "along" to -- among --.

Column 43: line 62, change "wether" to -- whether --.

Column 44: line 53, change "ticclar" to -- ticular --;
line 67, change "S shown" to -- S. (shown --.

Column 45: line 59, change "words" to -- word --.

Column 48: line 27, change "leg-end" to -- legend --.

Column 53: line 27, change "CARL" to -- CARD --.

Column 57: line 17, change "16.1.5" to -- 16.1.4 --;
line 55, change "outpts" to -- outputs --;
line 75, change "digesters" to -- digisters --.

Column 59: line 5, change "their" to -- there --;
line 15, change "present" to -- presented --.

PO-1050
(5/69)

UNITED STATES PATENT OFFICE
CERTIFICATE OF CORRECTION

Patent No. 3,546,676 Dated December 8, 1970

Inventor(s) Robert A. Ragen

It is certified that error appears in the above-identified patent and that said Letters Patent are hereby corrected as shown below:

Column 60: line 51, change "conut" to -- count --.

Column 61: line 49, change "transulated" to -- translated --; line 71, change "signinficant" to -- significant --.

Column 63: line 1, change "logical" to -- logic --; line 56, change "Logis" to -- Logic --; line 71, change "hereto" to -- thereto --.

Column 64: line 35, change "callel" to -- called --.

Column 69: line 13, change "colmun" to -- column --; line 14, change "corresond" to -- correspond --; line 69, change "subopertaion" to -- suboperation --.

Column 70: line 5, change "digesters" to -- digisters --;

Column 71: line 35, change "digester" to -- digister --; line 37, change "DA-to-A" to -- D-to-A --.

Column 72: line 2, change "D-regis-" to -- D-digis- --; line 18, change "ono" to -- onto --.

Column 73: line 17, change "immediatey" to -- immediately --; line 58, change "flp-flop" to -- flip-flop --; line 71, change "digester" to -- digister --.

PO-1050
(5/69)

UNITED STATES PATENT OFFICE
CERTIFICATE OF CORRECTION

Patent No. 3,546,676 Dated December 8, 1970

Inventor(s) Robert A. Ragen

It is certified that error appears in the above-identified patent and that said Letters Patent are hereby corrected as shown below:

| | | |
|---|---|---|
| Column 74: | line 10, | change "ouput" to -- output --. |
| Column 75: | line 28, | change "digester" to -- digister --; |
| | line 30, | change "digester" to -- digister --; |
| | line 31, | change "digester", both occurrences, to -- digister --; |
| | line 58, | delete "this", first occurrence. |
| Column 78: | line 57, | change "csae" to -- case --. |
| Column 79: | line 72, | change "refere" to -- refer --. |
| Column 80: | line 75, | change "91", last word, to -- 81 --. |
| Column 82: | line 42, | change "digster" to -- digister --; |
| | line 68, | change "digsters" to -- digisters --; |
| | line 71, | change "digster" to -- digister --. |
| Column 83: | line 2, | change "scribed" to -- scribe --; |
| | line 69, | change "state; through" to -- state, though --; |
| | line 70, | change "FF" to -- FF'--. |
| Column 84: | line 13, | change "flipflop" to -- flip-flop --; |
| | line 14, | change "flipflop" to -- flip-flop --; |

PO-1050
(5/69)

UNITED STATES PATENT OFFICE
CERTIFICATE OF CORRECTION

Patent No. 3,546,676 Dated December 8, 1970

Inventor(s) Robert A. Ragen

It is certified that error appears in the above-identified patent and that said Letters Patent are hereby corrected as shown below:

Column 84: line 21, change (5.2) to -- (5:2) --;
lines 49-50, change "pri-mary" to -- memory --.

Column 85: line 7, change "flip flop" to -- flip-flop --;
line 13, change "reset" to -- set --.

Column 86: line 39, after "just", (last word), insert a hyphen (-).

Column 87: line 8, change "EPCZ"' to -- "EPCZ'" --;
line 24, change "endof" to -- end of --.

Column 90: line 50, change the colon (:) to a period (.);
line 70, change the colon (:) to a period (.).

Column 91: line 8, change "our-sequencing" to -- out-sequencing --;
line 14, change the colon (:) to a period (.);
line 35, change the colon (:) to a period (.);
line 60, change the colon (:) to a period (.);
line 75, change the colon (:) to a period (.).

Column 92: line 34, change the colon (:) to a period (.);
line 69, change the colon (:) to a period (.).

PO-1050
(5/69)

UNITED STATES PATENT OFFICE
CERTIFICATE OF CORRECTION

Patent No. 3,546,676 Dated December 8, 1970

Inventor(s) Robert A. Ragen

It is certified that error appears in the above-identified patent and that said Letters Patent are hereby corrected as shown below:

Column 93: line 15, change the colon (:) to a period (.);
line 55, change the colon (:) to a period (.).

Column 94: line 9, change the colon (:) to a period (.);
line 36, change the colon (:) to a period (.);
line 52, change the colon (:) to a period (.).

Column 96: line 26, change "Pase" to -- Phase --.

Column 97: line 38, change "Suboperating" to -- Suboperation --;
line 70, delete "of the memory", first occurrence.

Column 98: line 42, delete "novel".

Column 99: line 52, change "Similiarly" to -- Similarly --.

Column 110: Card No. F13, change Pin 9 from "$\overline{\text{P2-5}}$" to -- $\overline{\text{P2-3}}$ --;
Card G14, change "13-3" to -- J3-13 --.

Column 111: Card No. G17, change "$\overline{\text{2-11}}$" to -- $\overline{\text{P2-11}}$;
Card No. H7, pin 11, change "H7-10; $\overline{\text{K16-10}}$; H7-12." to -- F14-16; J1-10; H8-10; H8-12. --.

Column 113: Card No. J15, Pin 6, change "F17-5" to -- $\overline{\text{F17-5}}$ --;
Card No. J16, Pin 5, change "$\overline{\text{J1-2}}$" to -- $\overline{\text{J1-12}}$ --.

UNITED STATES PATENT OFFICE

CERTIFICATE OF CORRECTION

Patent No. 3,546,676 Dated December 8, 1970

Inventor(s) Robert A. Ragen

It is certified that error appears in the above-identified patent and that said Letters Patent are hereby corrected as shown below:

Column 121, line 8, change "menas" to -- means --.

Signed and sealed this 31st day of August 1971.

(SEAL)
Attest:

EDWARD M.FLETCHER,JR.
Attesting Officer

ROBERT GOTTSCHALK
Acting Commissioner of Patents

RM PO-1050 (10-69)

USCOMM-DC 60376-P69
☆ U.S. GOVERNMENT PRINTING OFFICE : 1969 O—366-334